US011172298B2

(12) United States Patent
Carrigan et al.

(10) Patent No.: US 11,172,298 B2
(45) Date of Patent: Nov. 9, 2021

(54) SYSTEMS, METHODS, AND USER INTERFACES FOR HEADPHONE FIT ADJUSTMENT AND AUDIO OUTPUT CONTROL

(71) Applicant: Apple Inc., Cupertino, CA (US)

(72) Inventors: Taylor G. Carrigan, San Francisco, CA (US); David C. Graham, San Jose, CA (US); Andrew E. Greenwood, San Francsico, CA (US); Thomas S. Hulbert, Palo Alto, CA (US); Hugo D. Verweij, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 16/920,303

(22) Filed: Jul. 2, 2020

(65) Prior Publication Data

US 2021/0014610 A1 Jan. 14, 2021

Related U.S. Application Data

(60) Provisional application No. 63/033,058, filed on Jun. 1, 2020, provisional application No. 62/907,525, filed
(Continued)

(51) Int. Cl.
*H04R 3/12* (2006.01)
*G06F 3/16* (2006.01)
*H04R 1/10* (2006.01)

(52) U.S. Cl.
CPC .............. *H04R 3/12* (2013.01); *G06F 3/165* (2013.01); *H04R 1/1008* (2013.01); *H04R 1/1016* (2013.01)

(58) Field of Classification Search
None
See application file for complete search history.

(56) References Cited

U.S. PATENT DOCUMENTS 8,290,537 B2 10/2012 Lee et al.
9,398,367 B1 7/2016 Scott et al.
(Continued)

FOREIGN PATENT DOCUMENTS

EP 2190213 A1 5/2010
EP 3188495 A1 7/2017
(Continued)

OTHER PUBLICATIONS

Office Action, dated Jan. 1, 2021, received in U.S. Appl. No. 17/028,936, 16 pages.
(Continued)

*Primary Examiner* — Paul W Huber
(74) *Attorney, Agent, or Firm* — Morgan, Lewis & Bockius LLP

(57) ABSTRACT

While a first wearable audio output component of a wearable audio output device is in a first position relative to a first ear of a user and a second wearable audio output component of the wearable audio output device is in the first position relative to a second ear, a computer system operates the wearable audio output device in a first mode. While doing so, the computer system detects a change in position of the first component from the first position to a second position; and, in response, while the second component is maintained in the first position, the computer system transitions the wearable audio output device from the first mode to a different, second mode that is a pass-through mode in which audio outputs provided via the wearable audio output device include pass-through audio components that include at least a portion of ambient sound from the physical environment.

24 Claims, 213 Drawing Sheets

Related U.S. Application Data on Sep. 27, 2019, provisional application No. 62/897,819, filed on Sep. 9, 2019, provisional application No. 62/871,634, filed on Jul. 8, 2019.

(56) References Cited

U.S. PATENT DOCUMENTS

| | | |
|---|---|---|
| 9,894,452 B1 | 2/2018 | Termeulen et al. |
| 10,133,358 B1 | 11/2018 | Chen et al. |
| 2010/0074451 A1 | 3/2010 | Usher et al. |
| 2010/0310087 A1 | 12/2010 | Ishida |
| 2011/0116643 A1 | 5/2011 | Tiscareno et al. |
| 2011/0222701 A1 | 9/2011 | Donaldson et al. |
| 2013/0121494 A1 | 5/2013 | Johnston |
| 2013/0182867 A1 | 7/2013 | Knowles |
| 2014/0016803 A1 | 1/2014 | Puskarich |
| 2014/0126734 A1 | 5/2014 | Gauger, Jr. et al. |
| 2014/0247948 A1 | 9/2014 | Goldstein |
| 2014/0270200 A1 | 9/2014 | Usher et al. |
| 2015/0281830 A1 | 10/2015 | Gauger, Jr. et al. |
| 2015/0294662 A1* | 10/2015 | Ibrahim .......... G10K 11/17837 381/71.6 |
| 2016/0072936 A1 | 3/2016 | Kim et al. |
| 2017/0251295 A1 | 8/2017 | Pergament et al. |
| 2017/0318374 A1 | 11/2017 | Dolenc et al. |
| 2018/0048960 A1 | 2/2018 | Jeffrey et al. |
| 2018/0114518 A1 | 4/2018 | Scanlan et al. |
| 2018/0152781 A1 | 5/2018 | Boyer et al. |
| 2018/0206022 A1 | 7/2018 | Hsieh |
| 2018/0242085 A1 | 8/2018 | Dohmen et al. |
| 2018/0249266 A1 | 8/2018 | Termeulen et al. |
| 2018/0295439 A1 | 10/2018 | Garrett |
| 2018/0295455 A1 | 10/2018 | Eichfeld et al. |
| 2018/0301134 A1 | 10/2018 | Le et al. |
| 2019/0215611 A1* | 7/2019 | Lou ..................... G06F 1/163 |
| 2019/0278556 A1 | 9/2019 | Usher et al. |
| 2019/0361666 A1* | 11/2019 | Oide ................... H04R 29/001 |
| 2020/0275223 A1 | 8/2020 | Usher et al. |
| 2021/0014611 A1 | 1/2021 | Carrigan et al. |
| 2021/0014612 A1 | 1/2021 | Carrigan |
| 2021/0014613 A1 | 1/2021 | Carrigan et al. |

FOREIGN PATENT DOCUMENTS

| | | |
|---|---|---|
| EP | 3456299 A1 | 3/2019 |
| JP | 2017/126873 A | 7/2017 |
| WO | WO 2008/000304 A1 | 1/2008 |
| WO | WO 2013/064747 A1 | 5/2013 |
| WO | WO 2020/204611 A1 | 10/2020 |

OTHER PUBLICATIONS

Office Action, dated Dec. 24, 2020, received in U.S. Appl. No. 17/028,947, 10 pages.

Invitation to Pay Additional Fees, dated Oct. 8, 2020, received in International Patent Application No. PCT/2020/041074, which corresponds with U.S. Appl. No. 16/920,303, 24 pages.

International Search Report and Written Opinion, dated Dec. 3, 2020, received in International Patent Application No. PCT/US2020/041074, which corresponds with U.S. Appl. No. 16/920,303, 28 pages.

Office Action, dated Dec. 21, 2020, received in Danish Patent Application No. 2020-70630, which corresponds with U.S. Appl. No. 16/920,303, 8 pages.

Office Action, dated Mar. 3, 2021, received in Danish Patent Application No. 2020-70630, which corresponds with U.S. Appl. No. 16/920,303, 2 pages.

Final Office Action, dated Apr. 9, 2021, received in U.S. Appl. No. 17/028,936, 17 pages.

Office Action, dated Jan. 29, 2021, received in Danish Patent Application No. 2020-70718, which corresponds with U.S. Appl. No. 17,028,936, 7 pages.

Office Action, dated Jan. 29, 2021, received in Danish Patent Application No. 2020-70719, which corresponds with U.S. Appl. No. 17/028,936, 7 pages.

Final Office Action, dated Mar. 17, 2021, received in U.S. Appl. No. 17/028,947, 8 pages.

Office Action, dated Feb. 2, 2021, received in Danish Patent Application No. 202070720, which corresponds with U.S. Appl. No. 17/028,947, 3 pages.

Notice of Allowance, dated Jun. 10, 2021, received in Danish Patent Application No. 2020-70630, which corresponds with U.S. Appl. No. 16/920,303, 2 pages.

Intention to Grant, dated Aug. 27, 2021, received in Danish Patent Application No. 2020-70719, which corresponds with U.S. Appl. No. 17/028,936, 2 pages.

Office Action, dated Sep. 10, 2021, received in Australian Patent Application No. 2020-239693, which corresponds with U.S. Appl. No. 16/920,303, 2 pages.

* cited by examiner

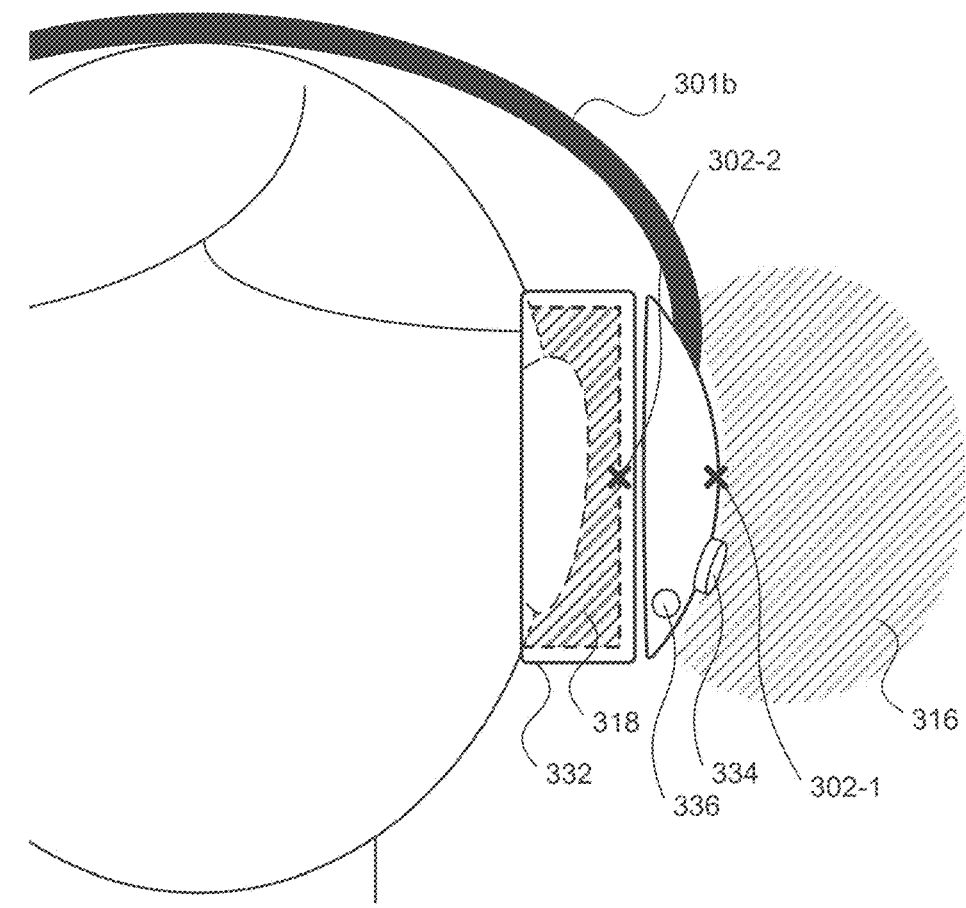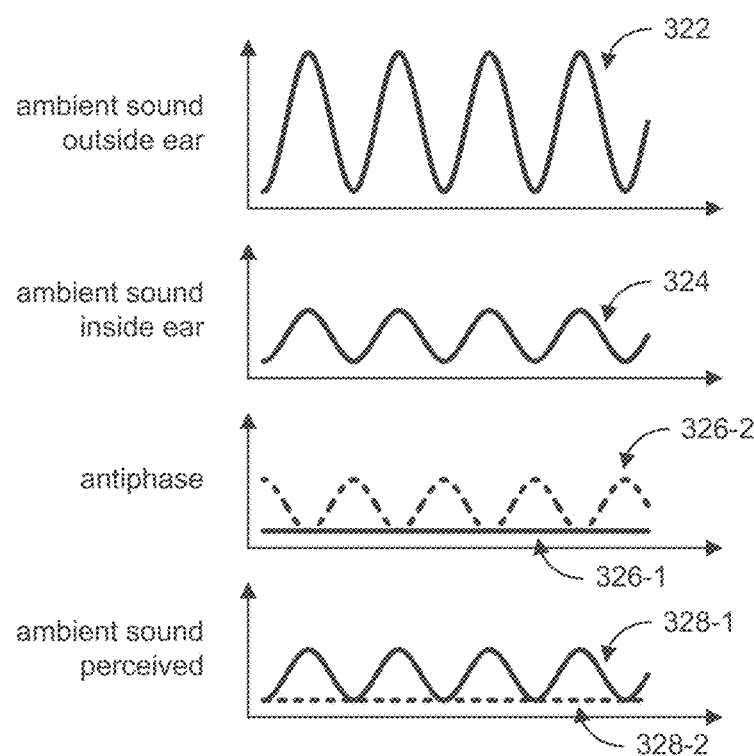
Figure 3D

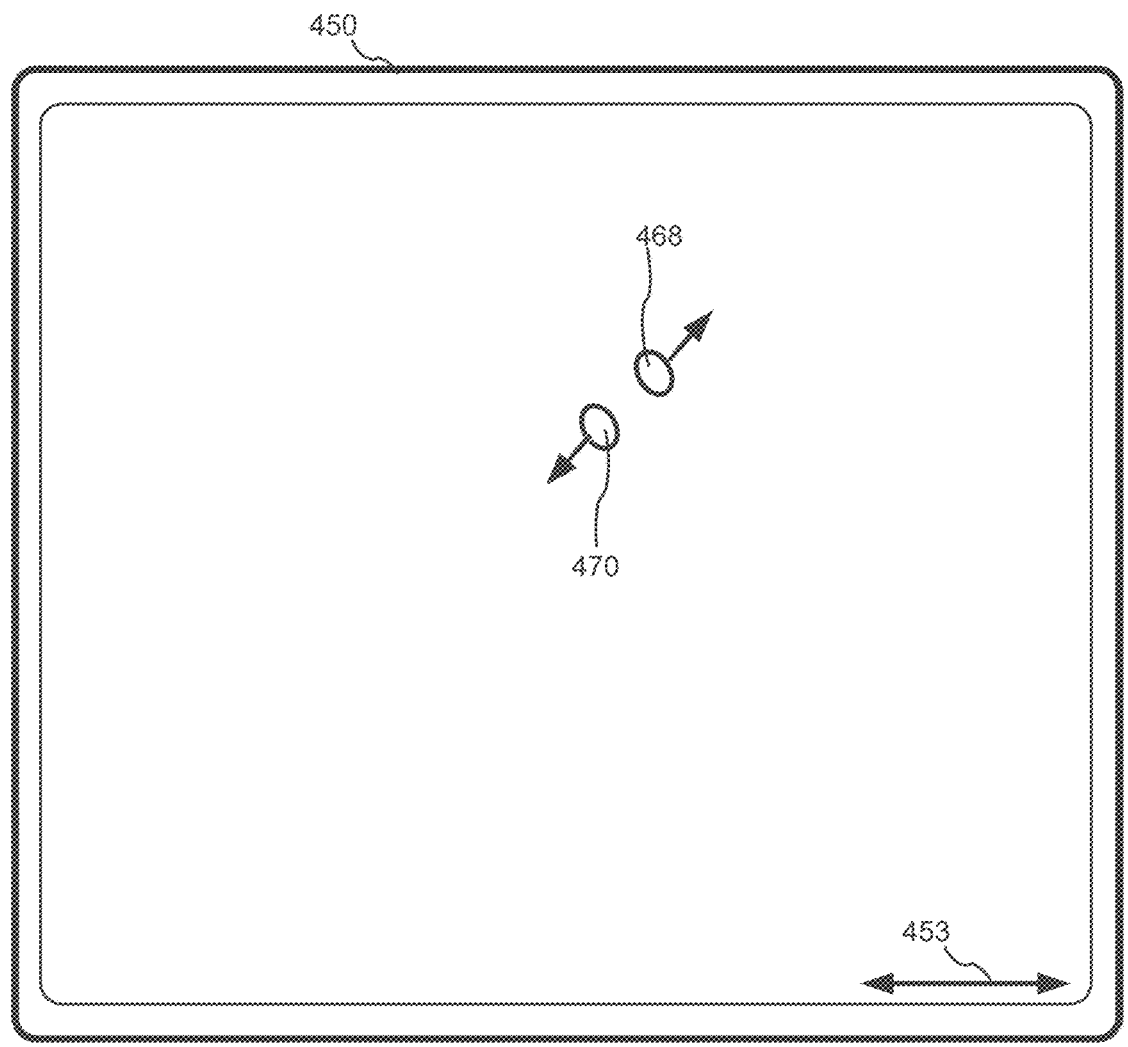
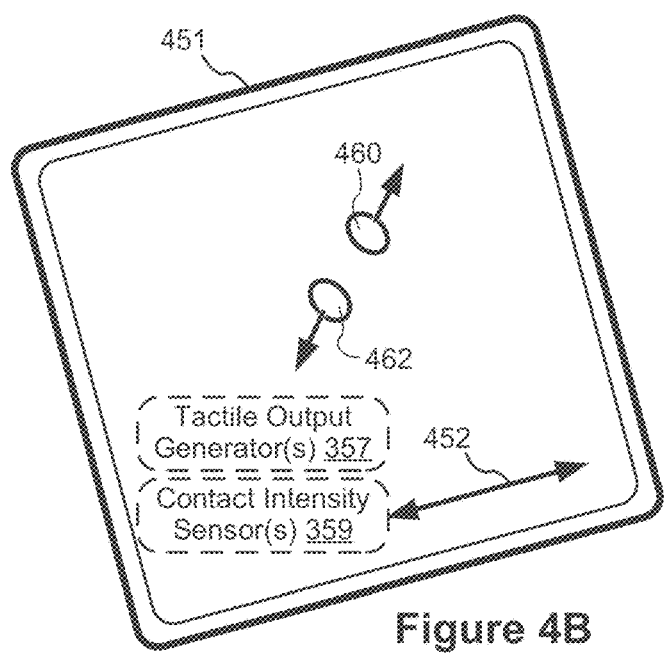
Figure 4B

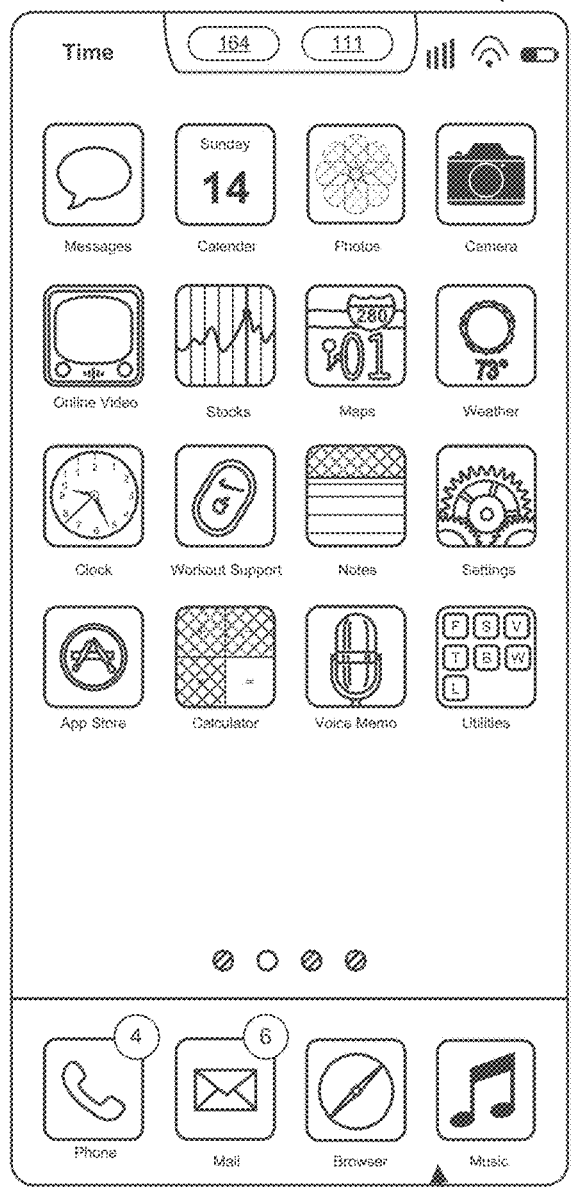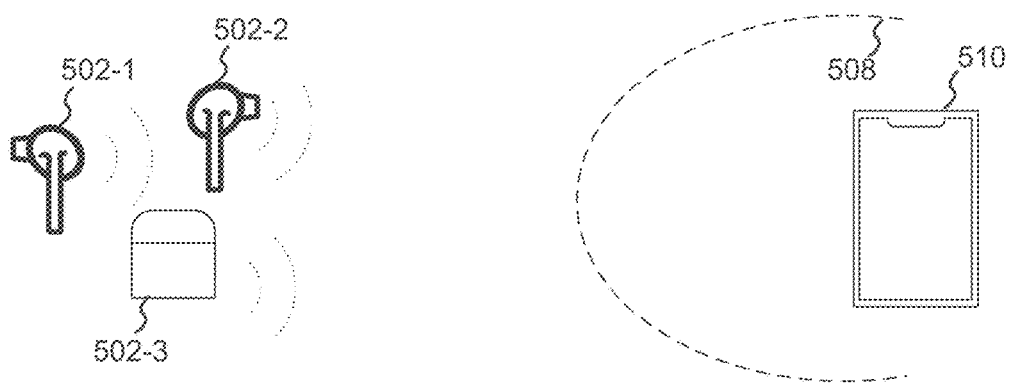
Figure 5A

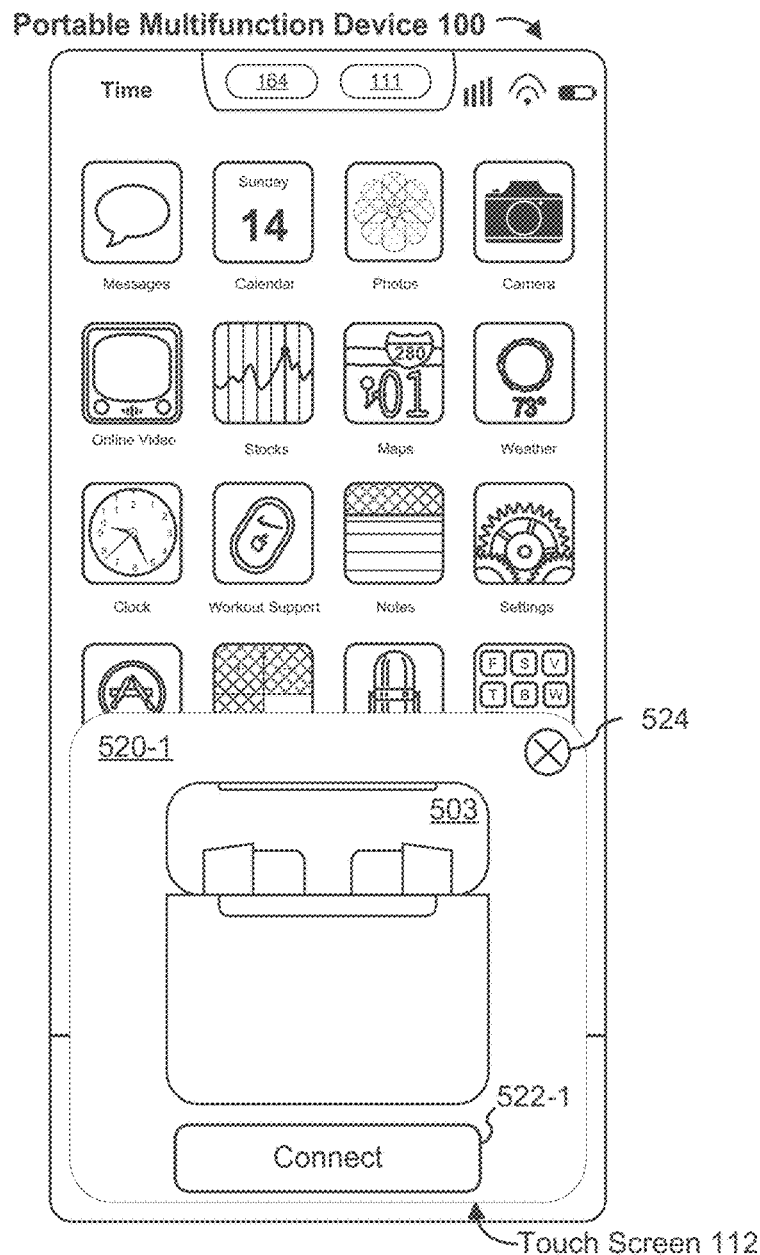
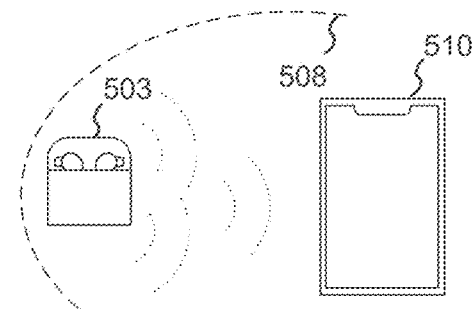
Figure 5B

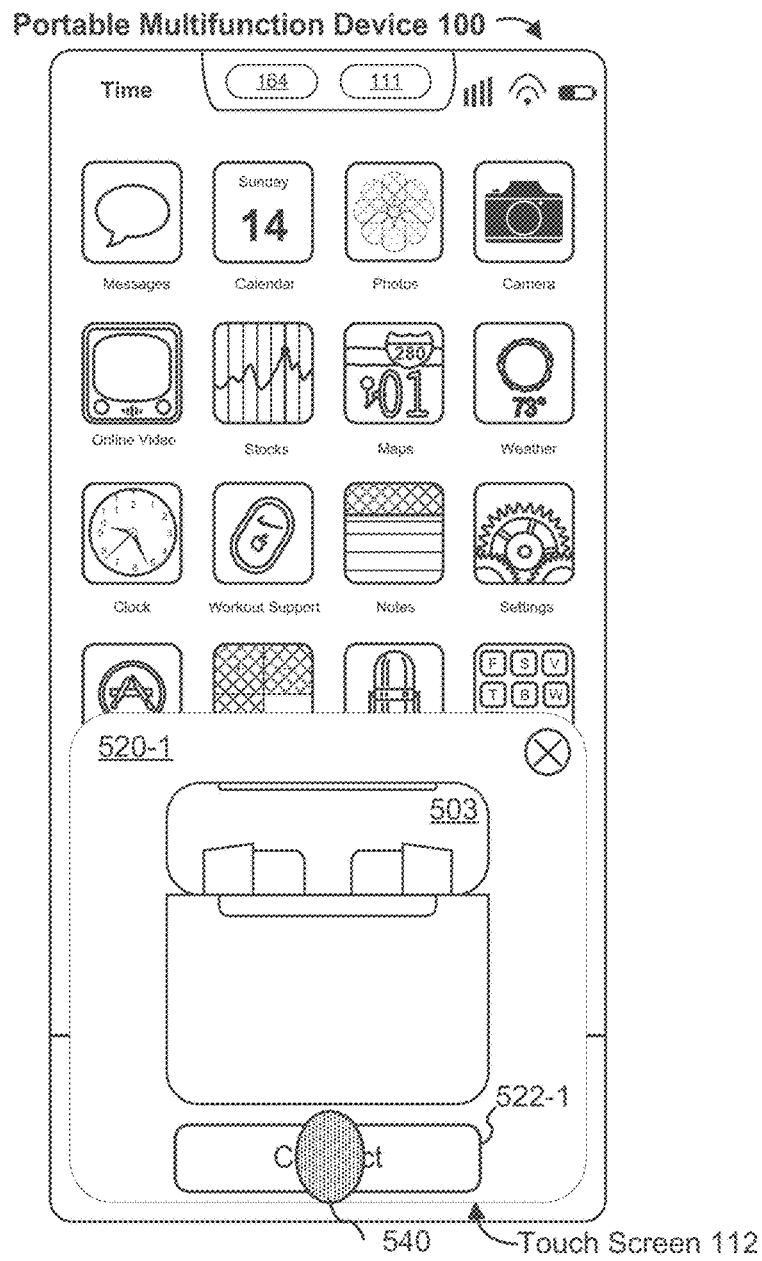
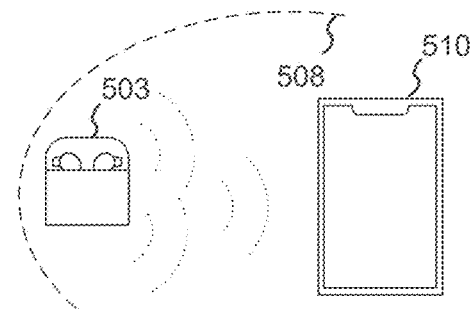
Figure 5C

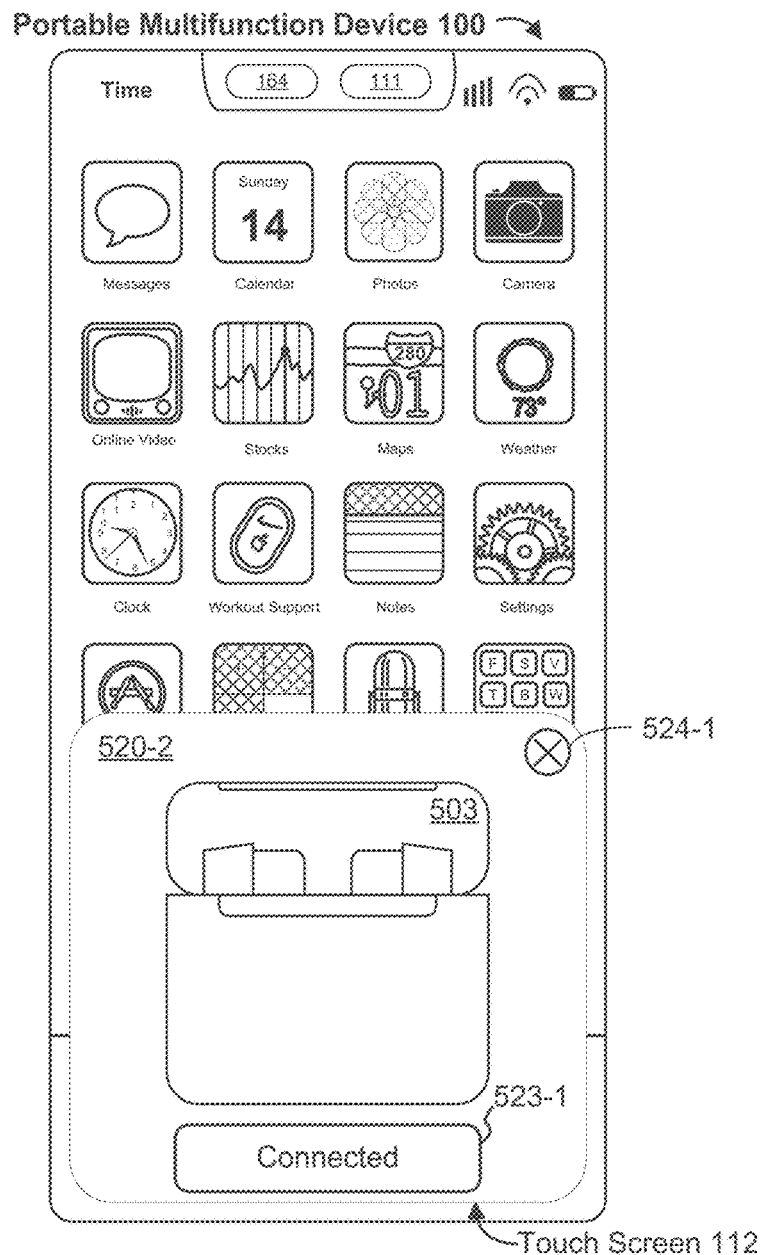
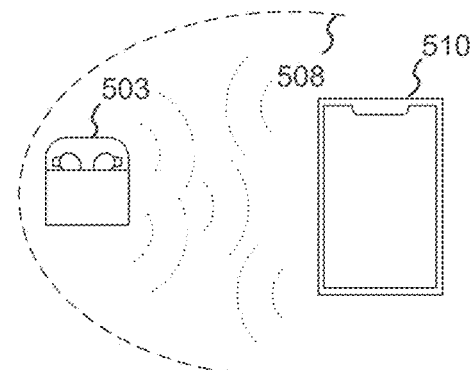
Figure 5D

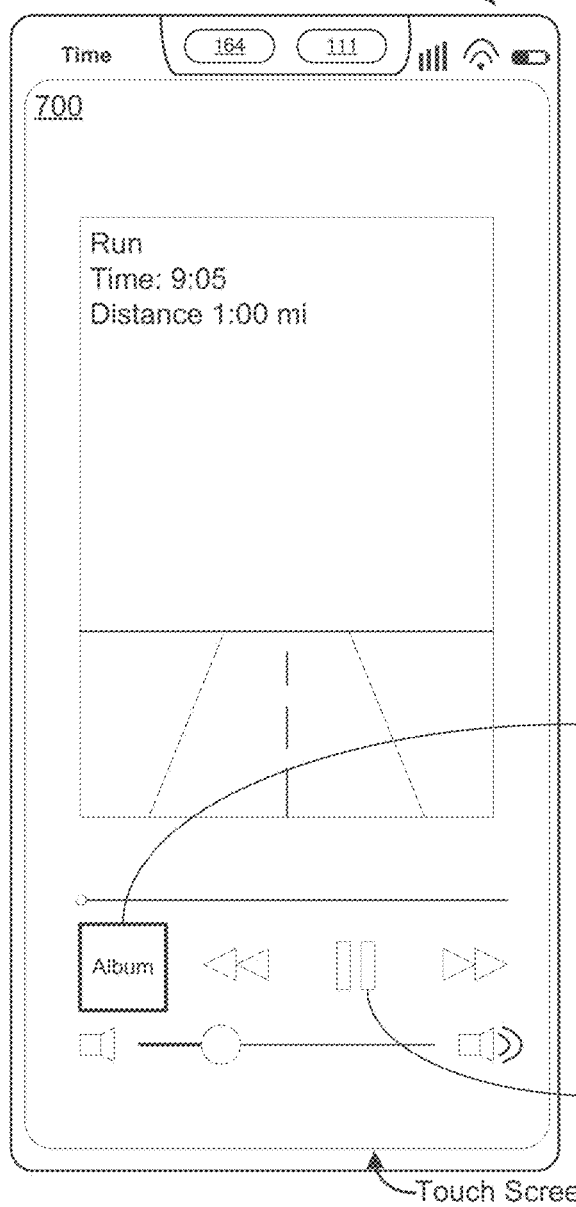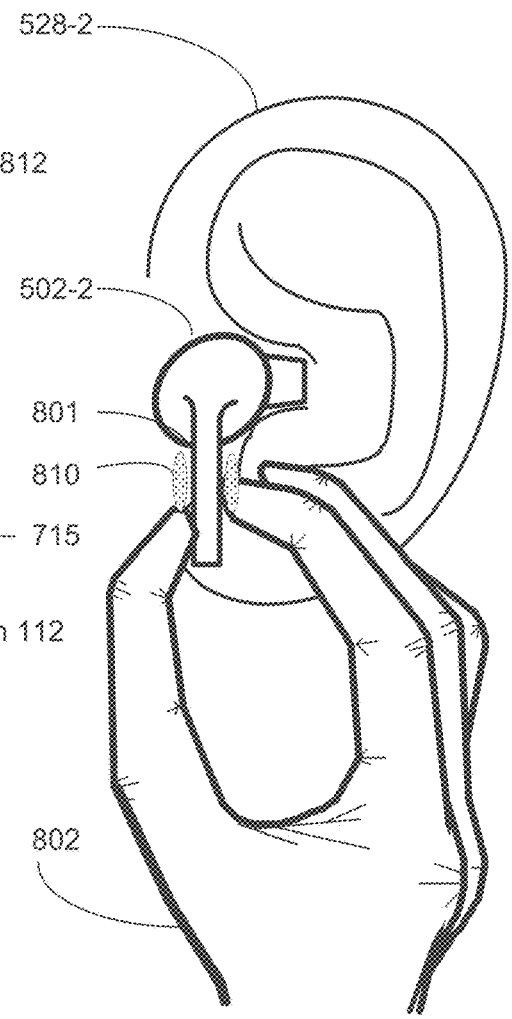
Figure 8E

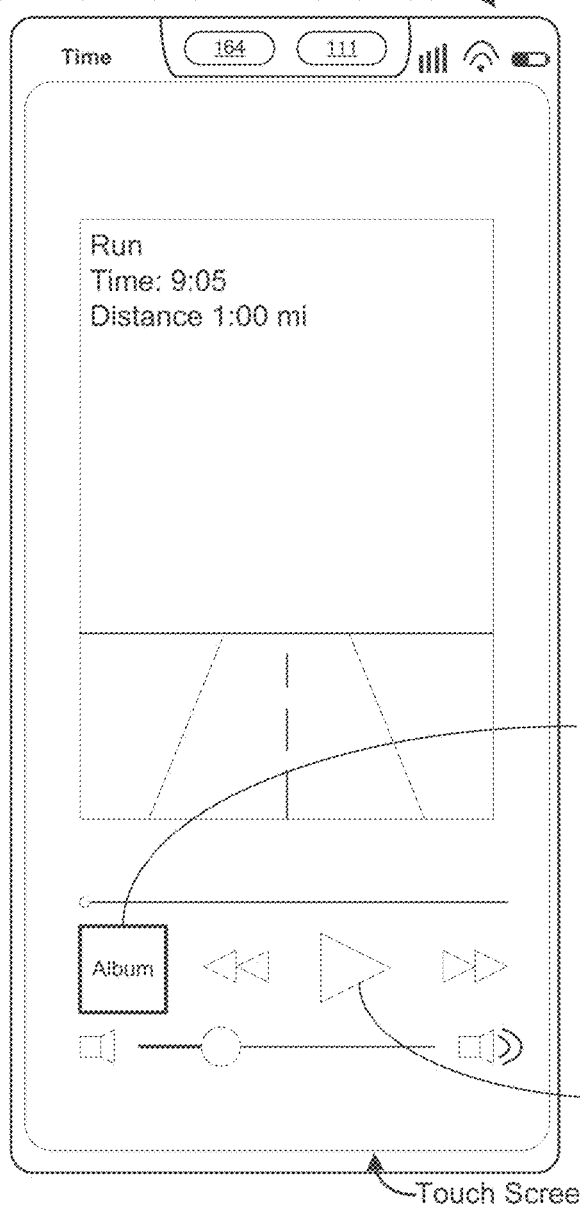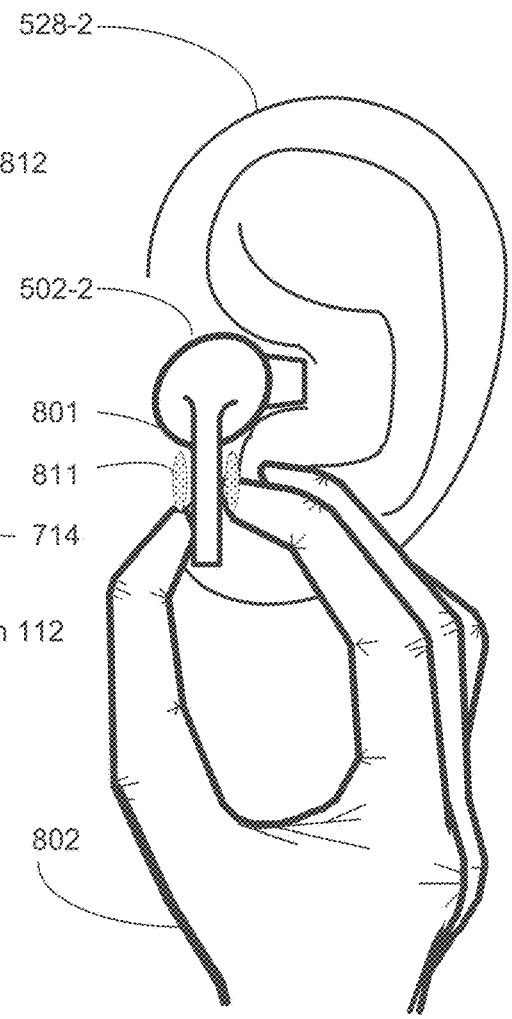
Figure 8F

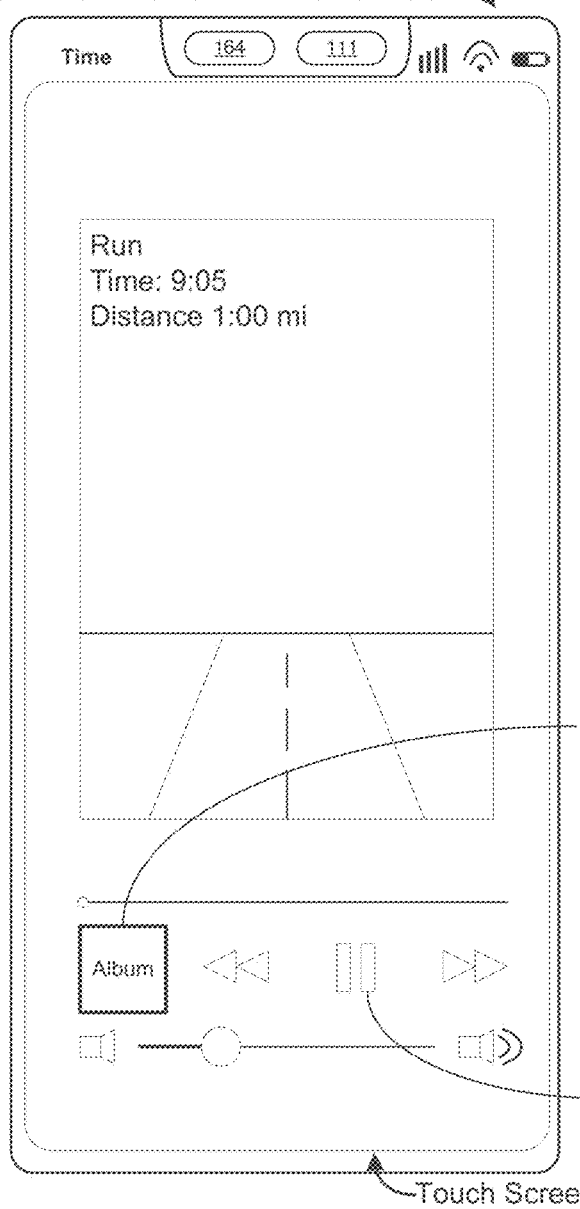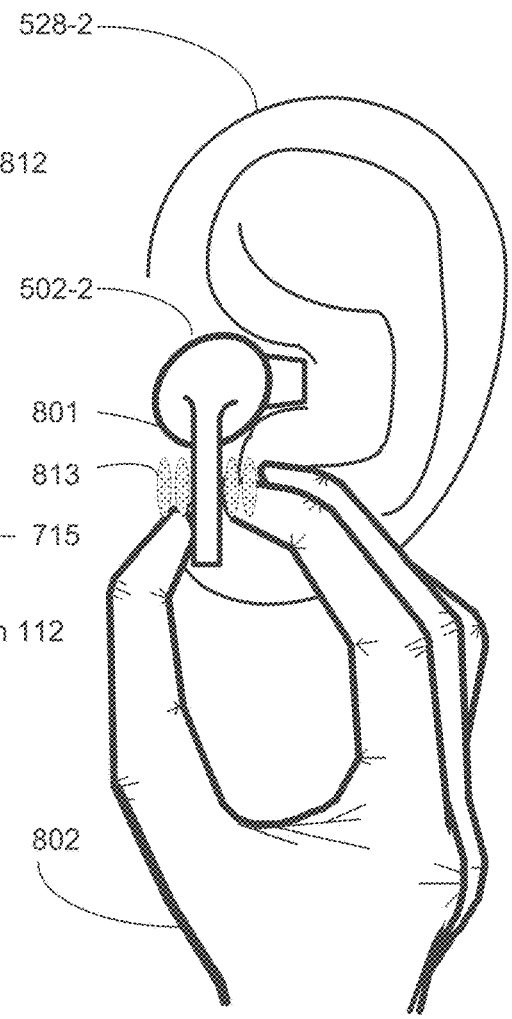
Figure 8G

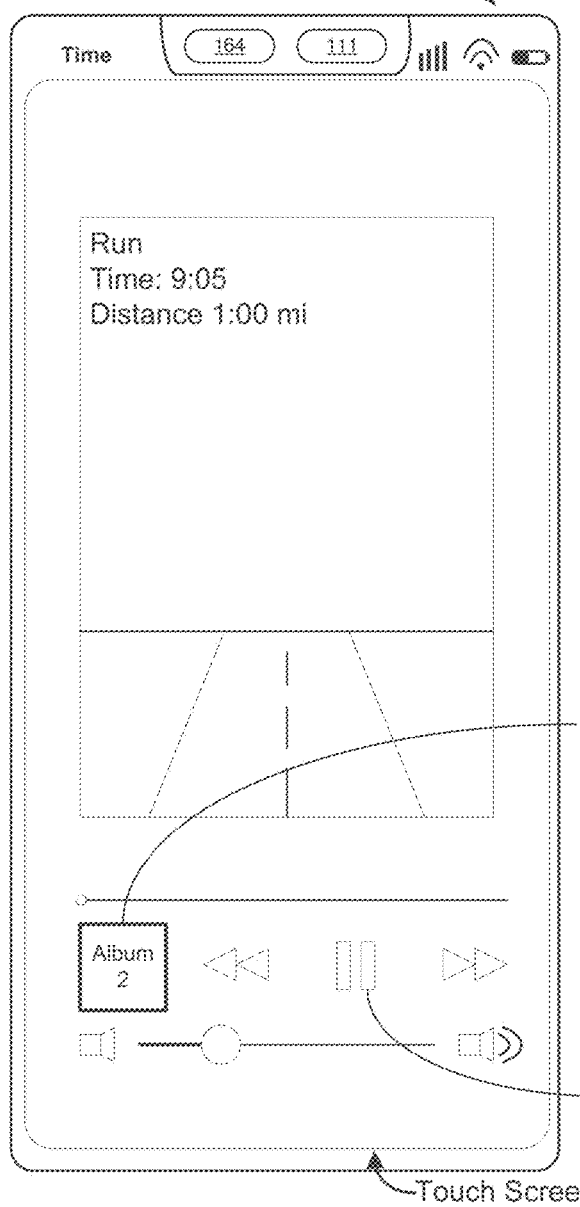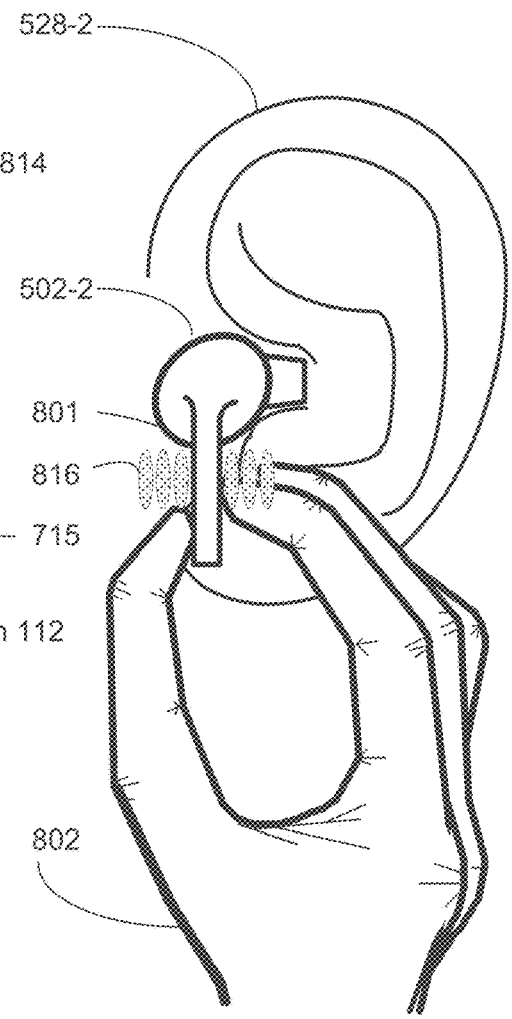
Figure 8I

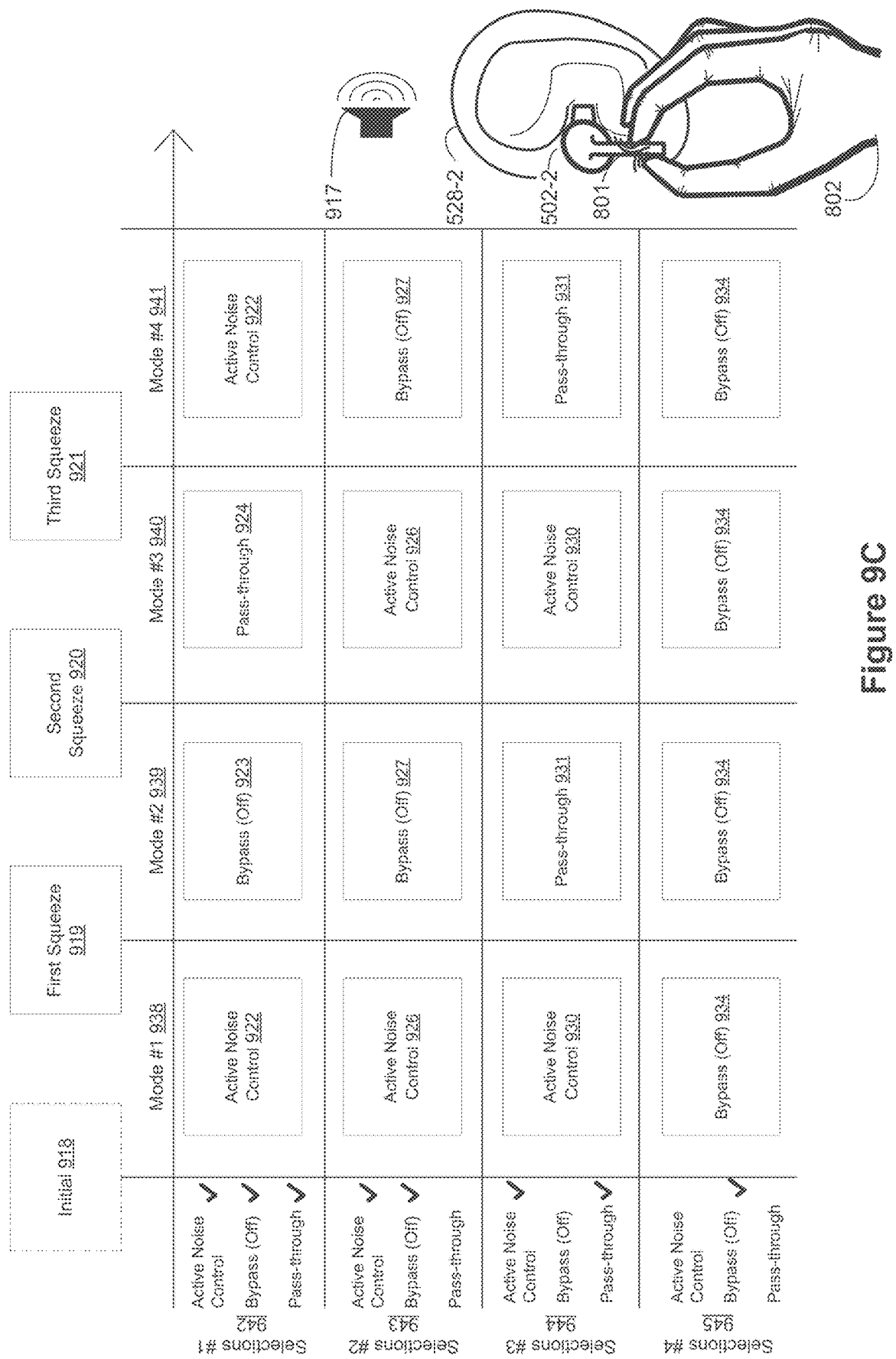

1000

(D)

────────────────────────────────────────
The adjustment of a respective wearable audio output device includes repositioning the respective wearable audio output device in an ear of the user. —1024, 1034

The first wearable audio output device is coupled to a first attachment, and the second wearable audio output device is coupled to a second attachment, and the method further includes:
   after detecting repositioning of the first wearable audio output device and the second wearable audio output device:
       outputting a second calibration tone via the first wearable audio output device and the second wearable audio output device;
       detecting third audio via the one or more first microphones of the first wearable audio output device;
       detecting fourth audio via the one or more second microphones of the second wearable audio output device;
       in accordance with a determination that the detected third audio does not satisfy device fit criteria associated with the second calibration tone, displaying, via the display device, an alert prompting the user to change the first attachment that is coupled to the first wearable audio output device to a third attachment; and
       in accordance with a determination that the detected fourth audio does not satisfy the device fit criteria associated with the second calibration tone, displaying, via the display device, an alert prompting the user to change the second attachment that is coupled to the second wearable audio output device to a fourth attachment. —1036

────────────────────────────────────────
The adjustment of a respective wearable audio output device includes changing a respective attachment that is coupled to the respective wearable audio output device to a different attachment. —1038

(F)

────────────────────────────────────────
whether the adjustment of a respective wearable audio output device includes changing a respective attachment that is coupled to the respective wearable audio output device with a different attachment or repositioning the respective wearable audio output device in an ear of the user is based on a manner in which the respective detected audio does not satisfy the device fit criteria. —1040

in accordance with a determination that the detected first audio satisfies the device fit criteria associated with the calibration tone, displaying, via the display device, an indication that the first wearable audio output device is fitted to an ear of the user; and in accordance with a determination that the detected second audio satisfies the device fit criteria associated with the calibration tone, displaying, via the display device, an indication that the second wearable audio output device is fitted to an ear of the user. ⁓1044 displaying the alert prompting the user to perform an adjustment of the first wearable audio output device is performed independently of whether the detected second audio satisfies the device fit criteria; and displaying the alert prompting the user to perform an adjustment of the second wearable audio output device is performed independently of whether the detected first audio satisfies the device fit criteria. ⁓1046

The first wearable audio output device is coupled to a first attachment while detecting the first audio, and the second wearable audio output device is coupled to a second attachment while detecting the second audio, and the method further includes: — 1038 in accordance with the determination that the detected first audio does not satisfy the device fit criteria and in accordance with the determination that the detected second audio does not satisfy the device fit criteria:

after detecting that the first attachment coupled to the first wearable audio output device is changed to a third attachment and that the second attachment coupled to the second wearable audio output device is changed to a fourth attachment:

outputting a second calibration tone via the first wearable audio output device and the second wearable audio output device;

detecting third audio via the one or more first microphones of the first wearable audio output device;

detecting fourth audio via the one or more second microphones of the second wearable audio output device; — 1048 in accordance with a determination that the detected third audio does not satisfy device fit criteria associated with the second calibration tone:

determining whether the detected first audio or the detected third audio came closer to satisfying the device fit criteria; and displaying, via the display device, an alert prompting the user to use a respective attachment of the first attachment and the third attachment that came closer to satisfying the device fit criteria;

in accordance with a determination that the detected fourth audio does not satisfy the device fit criteria associated with the second calibration tone:

determining whether the detected second audio or the detected fourth audio came closer to satisfying the device fit criteria; and displaying, via the display device, an alert prompting the user to use a respective attachment of the second attachment and the fourth attachment that came closer to satisfying the device fit criteria.

after detecting that the first wearable audio output device has been replaced in an ear of the user, and that the second wearable audio output device has been replaced in an ear of the user, displaying, via the display device, a user interface that includes a user interface object that, when selected, causes the computer system to:

output a second calibration tone via the first wearable audio output device and the second wearable audio output device;

detect third audio via the one or more first microphones of the first wearable audio output device;

detect fourth audio via the one or more second microphones of the second wearable audio output device;

in accordance with a determination that the detected second audio does not satisfy device fit criteria associated with the second calibration tone, display, via the display device, an alert prompting the user to perform an adjustment of the first wearable audio output device; and in accordance with a determination that the detected third audio does not satisfy the device fit criteria associated with the second calibration tone, display, via the display device, an alert prompting the user to perform an adjustment of the second wearable audio output device.

1102 — Performing a method at a computer system that includes a display device and that is in communication with one or more wearable audio output devices, wherein the computer system is configured to execute a plurality of applications, and the one or more wearable audio output devices include one or more sensors for detecting placement of the one or more wearable audio output devices and one or more microphones;

1104 — while the one or more wearable audio output devices are in one or more respective positions relative to a user's ears, and while a media presentation application on the computer system is being used to play media via the one or more wearable audio output devices without displaying a settings user interface for configuring a fit of the one or more wearable audio output devices;

1106 — providing, via the one or more wearable audio output devices, audio output based on media from the media presentation application, wherein the media presentation application is separate from the settings user interface;

(B)

1108 — determining, based on the audio output based on the media from the media presentation application, that the one or more wearable audio output devices have ceased to satisfy device fit criteria; and (C)

1110 — in response to determining that the one or more wearable audio output devices have ceased to satisfy the device fit criteria, displaying, on the display device, an alert corresponding to information about a fit of the one or more wearable audio output devices.

1202 While ambient sound from the physical environment is being detected by the one or more microphones:

1204 While the wearable audio output device is in a first audio output mode, provide a first audio output based at least in part on the ambient sound from the physical environment. The first audio output includes one or more pass-through audio components selected so as to increase audio pass-through of the ambient sound from the physical environment

1206 Detect a first input via the input device

1208 In response to detecting the first input, and in accordance with a determination that the first input is a first type of gesture, transition the wearable audio output device from the first audio output mode to a second audio output mode

1210 While the wearable audio output device is in the second audio output mode, provide a second audio output based at least in part on the ambient sound from the physical environment. The second audio output includes one or more cancellation audio components selected so as to increase audio cancellation of the ambient sound from the physical environment

---

1212 The first audio output includes:
  the one or more pass-through audio components at a first ambient-sound audio level; and
  the one or more cancellation audio components at a first audio-cancelling audio level; and
  the second audio output includes:
    the one or more pass-through audio components at a second ambient-sound audio level that is different from the first ambient-sound audio level; and
    the one or more cancellation audio components at a second audio-cancelling audio level that is different from the first audio-cancelling audio level

Figure 12A

1214 The wearable audio output device is in communication with an electronic device;

in accordance with a determination that the first input is a second type of gesture, toggle playing, via the wearable audio output device, a first media audio component that is based on first media that is independent of the ambient sound from the physical environment 1216 In accordance with a determination that the first input is a third type of gesture:

in accordance with a determination that the first input is detected while playing, via the wearable audio output device, the first media audio component that is based on the first media, cease to play the first media audio component that is based on the first media; and play, via the wearable audio output device, a second media audio component that is based on second media that is independent of the ambient sound from the physical environment and that is different from the first media.

1218 An operation associated with the first type of gesture is configurable using a settings user interface and selected from a first set of operations that includes transitioning a respective audio output mode of the wearable audio output device;

an operation associated with the second type of gesture is configurable using the settings user interface and selected from a second set of operations that includes toggling playing a respective media audio component; and an operation associated with the third type of gesture is configurable using the settings user interface and selected from a third set of operations that includes ceasing to play a first respective media audio component in combination with playing a second respective media audio component

Figure 12B

1220 Detect, at an electronic device with a display and a second input, a second input via the second input device;
    in response to detecting the second input, display, on the display of the electronic device, a control center user interface; and
    display, in the control center user interface, an output-mode affordance for controlling an audio output mode of the wearable audio output device > 1222 The output-mode affordance is displayed in the control center user interface in accordance with a determination that the wearable audio output device is in communication with the electronic device > 1224 The output-mode affordance includes a representation of a first respective audio output mode that is a current audio output mode of the wearable audio output device without including representations of any other audio output modes of the wearable audio output device >> 1226 Detect, via the second input device, a third input that corresponds to the output-mode affordance;
>>     in response to detecting the third input, display respective representations of a plurality of audio output modes of the wearable audio output device;
>>     detect, via the second input device, a fourth input that corresponds to a representation of a second respective audio output mode that is distinct from the first respective audio output mode; and
>>     in response to detecting the fourth input:
>>         transition the wearable audio output device from the first respective audio output mode to the second respective audio output mode >>> 1228 The first respective audio output mode is distinct from a third audio output mode in which the wearable audio output device provides audio outputs independently of the ambient sound from the physical environment, and the second respective audio output mode is distinct from the third audio output mode

Figure 12C

1230 Detecting the first input includes detecting an increase in intensity that satisfies an activation intensity threshold;
    in response to detecting the increase in intensity that satisfies the activation intensity threshold, provide an activation audio output;
    detect a decrease in intensity that satisfies a release intensity threshold; and
    in response to detecting the decrease in intensity that satisfies the release intensity threshold, provide a release audio output 1232 The wearable audio output device includes a first wearable audio output component having a first respective input device and a second wearable audio output component having a second respective input device;
    detecting a respective input via the input device includes detecting the input via the first respective input device of the first wearable audio output component or detecting the input via the second respective input device of the second wearable audio output component; and
    providing a respective audio output via the wearable audio output device includes providing the respective audio output via the first wearable audio output component and providing the respective audio component via the second wearable audio component 1234 The wearable audio output device includes a first wearable audio output component that is in a first position relative to a first ear of a user, and a second wearable audio output component that is in a second position relative to a second ear of the user;
    the second audio output includes a respective media audio component that is based on respective media that is independent of the ambient sound from the physical environment;
    while the wearable audio output device is in the second audio output mode:
        in accordance with a determination that the first wearable audio output component is removed from the first position relative to the first ear of the user:
            pause the respective media audio component; and
            transition the wearable audio output device from the second audio output mode to the first audio output mode, and, while the wearable audio output device is in the first audio output mode, provide the first audio output based at least in part on the ambient sound from the physical environment

Figure 12D

1236 While the wearable audio output device is in the second audio output mode, detect speech by a user of the wearable audio output device; and
in response to detecting the speech by the user, transition the wearable audio output device from the second audio output mode to the first audio output mode 1238 While the wearable audio output device is in the second audio output mode:
in accordance with a determination that the ambient sound from the physical environment includes a name of a user of the wearable audio output device, transition the wearable audio output device from the second audio output mode to the first audio output mode 1240 In accordance with the determination that the first input is the first type of gesture, provide an audio output associated with transitioning an audio output mode of the wearable audio output device 1242 A set of audio output modes, through which the wearable audio output device is configured to transition in response to inputs that are the first type of gesture, is configurable using a settings user interface 1244 The set of audio output modes includes a plurality of audio output modes;
while displaying the settings user interface on a display of an electronic device, detect, via a second input device of the electronic device, an input to reorder two or more audio output modes in the set of audio output modes to form a modified set of audio output modes;
after detecting the input to reorder the two or more audio output modes in the set of audio output modes to form the modified set of audio output modes, detect, via the input device of the wearable audio output device, a subsequent input that is the first type of gesture; and
in response to detecting the subsequent input that is the first type of gesture, transition the wearable audio output device from a current audio output mode to a next audio output mode in the modified set of audio output modes.

Figure 12E

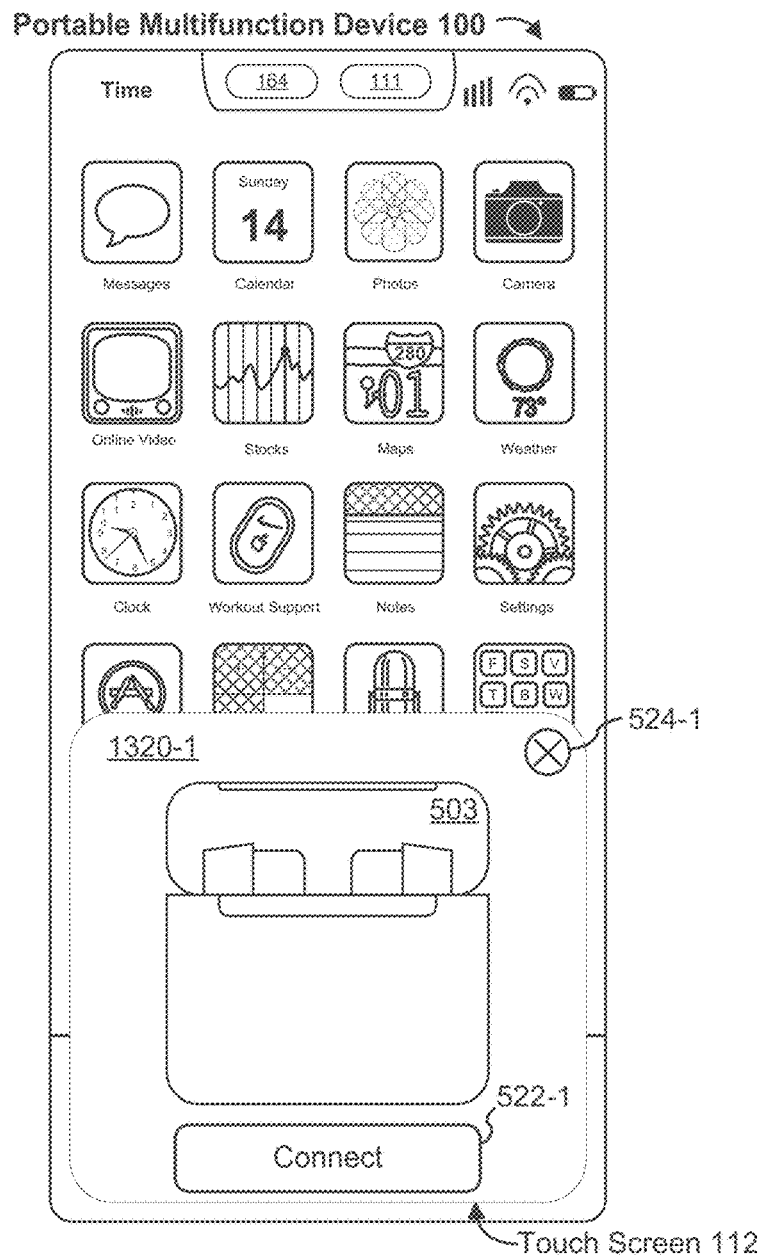
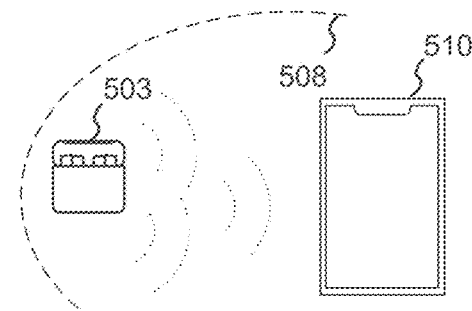
Figure 13A

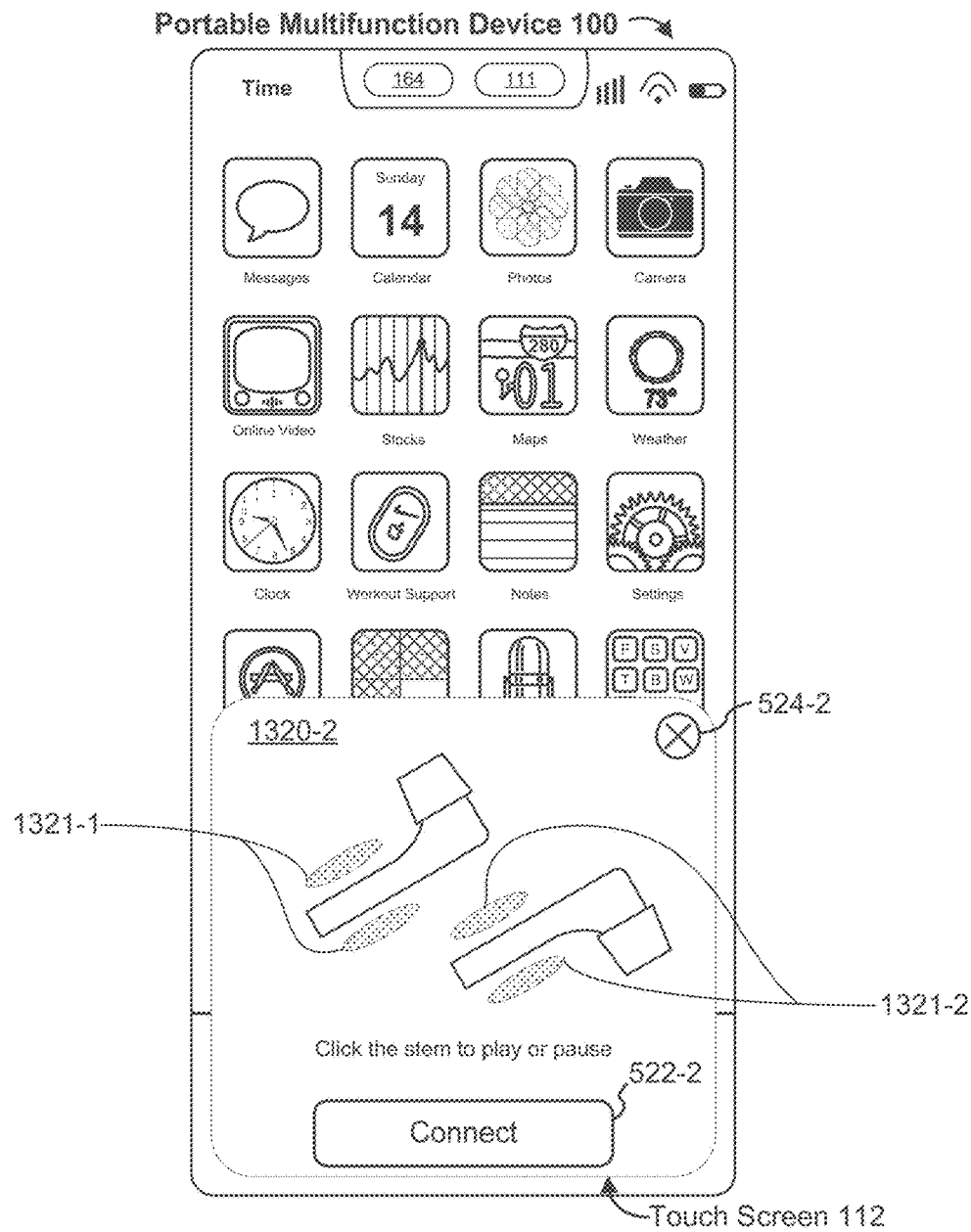
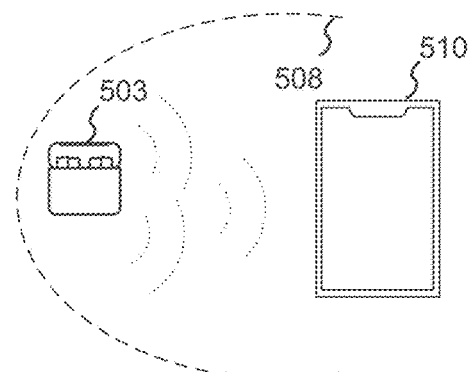
Figure 13B

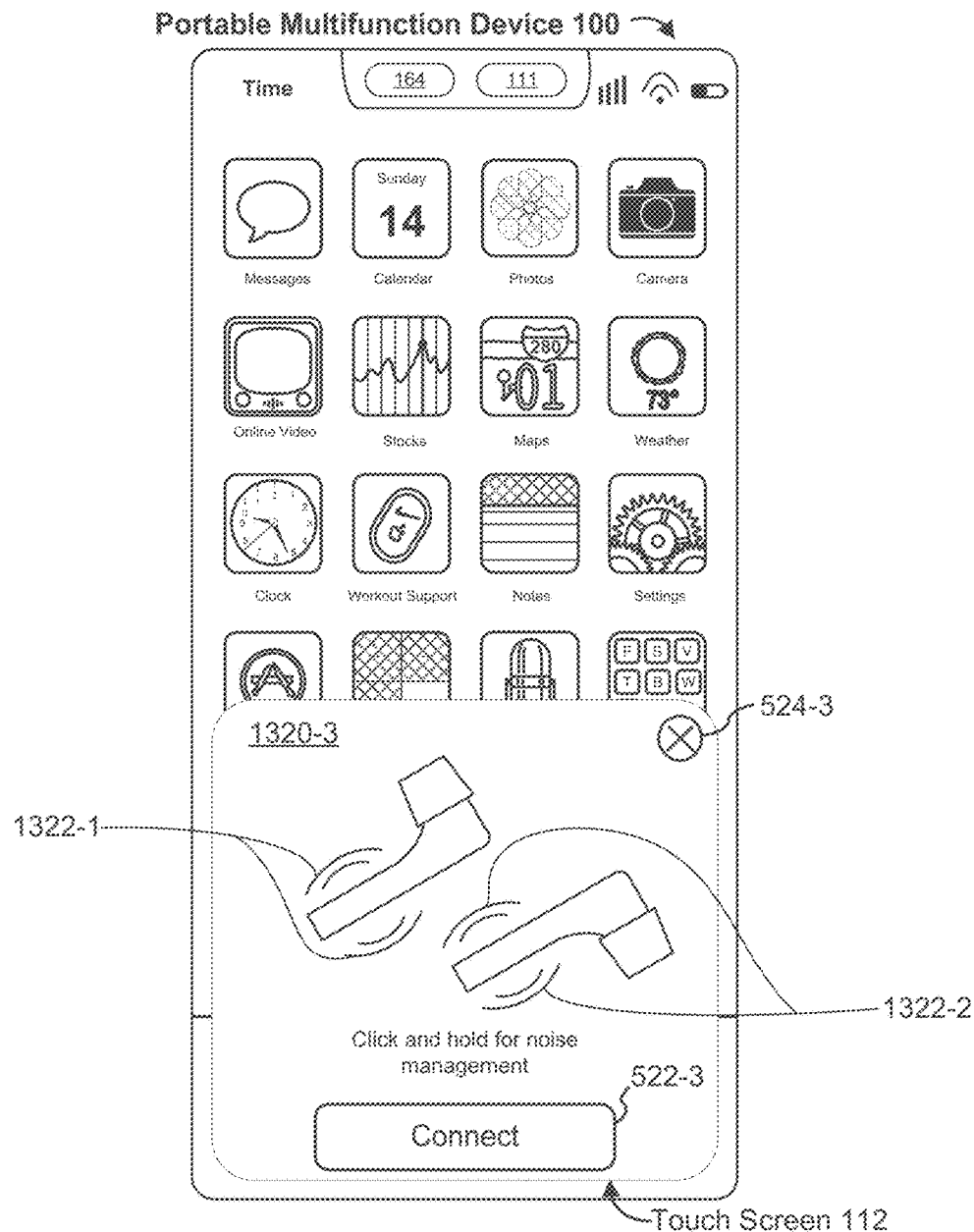
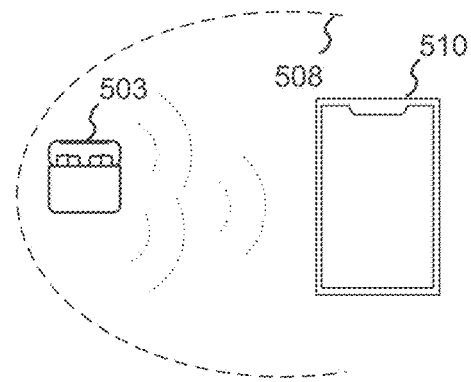
Figure 13C

1814 The wearable audio output device includes a respective input device, and the first input includes a predefined gesture detected via the respective input device of the wearable audio output device 1816 The first input is received while the predefined gesture is associated with one or more noise control operations;
   receive, via the one or more input devices, an input to associate the predefined gesture with a virtual assistant;
   while the predefined gesture is associated with the virtual assistant, receive, via the respective input device of the wearable audio output device, a second input that includes the predefined gesture; and
   in response to receiving the second input, invoke the virtual assistant 1818 The first input is received while the predefined gesture is associated with one or more noise control operations;
   transitioning the wearable audio output device from the first audio output mode to the noise-cancellation mode is performed in accordance with a determination that the predefined gesture is associated with one or more noise control operations;
   forgoing transitioning the wearable audio output device from the first audio output mode to the noise-cancellation mode is performed in accordance with the determination that the predefined gesture is associated with one or more noise control operations; and
   in response to receiving the first input:
      in accordance with a determination that the predefined gesture is associated with a virtual assistant, invoke the virtual assistant 1820 In response to receiving the first input, and in accordance with the determination that one of the first wearable audio output component or the second wearable audio output component is not in an in-ear position relative to a respective ear of the user:
   provide, via the one or more tactile output generators, a tactile output indicating that one of the first wearable audio output component or the second wearable audio output component is not in an in-ear position relative to a respective ear of the user 1822 In response to receiving the first input, and in accordance with the determination that one of the first wearable audio output component or the second wearable audio output component is not in an in-ear position relative to a respective ear of the user:
   display, via the display device, a visual alert indicating that one of the first wearable audio output component or the second wearable audio output component is not in an in-ear position relative to a respective ear of the user

Figure 18B

1824 In response to receiving the first input, and in accordance with the determination that one of the first wearable audio output component or the second wearable audio output component is not in an in-ear position relative to a respective ear of the user:
  provide, via the wearable audio output device, an audio output indicating that one of the first wearable audio output component or the second wearable audio output component is not in an in-ear position relative to a respective ear of the user 1826 While at least one of the first wearable audio output component or the second wearable audio output component is in an in-ear position relative to a respective ear of the user, receive, via the one or more input devices, a third input corresponding to a request to transition the wearable audio output device to a pass-through mode, wherein, while the wearable audio output device is in the pass-through mode, audio outputs that are provided via the wearable audio output device include one or more pass-through audio components that include at least a portion of ambient sound from the physical environment;
  in response to receiving the third input, transition the wearable audio output device to the pass-through mode 1828 In response to receiving the first input, and in accordance with the determination that one of the first wearable audio output component or the second wearable audio output component is not in an in-ear position relative to a respective ear of the user:
  transition the wearable audio output device from the first audio output mode to a third audio output mode, wherein the first audio output mode and the third audio output mode are distinct from the noise-cancellation mode 1830 Receive, via the one or more input devices, a fourth input corresponding to a request to transition the wearable audio output device to a noise control off mode, wherein, while the wearable audio output device is in the noise control off mode, audio outputs that are provided via the wearable audio output device do not include one or more pass-through audio components that include at least a portion of ambient sound from the physical environment and do not include one or more cancellation audio components selected so as to at least partially cancel ambient sound from the physical environment;
  in response to receiving the fourth input, transition the wearable audio output device to the noise control off mode

Figure 18C

1832 Forgoing transitioning the wearable audio output device from the first audio output mode to the noise-cancellation mode is performed in accordance with a determination that the computer system is not in a predefined mode of operation;
   in accordance with the determination that the first wearable audio output component or the second wearable audio output component is not in an in-ear position relative to a respective ear of the user, and in accordance with a determination that the computer system is in the predefined mode of operation, transition the wearable audio output device from the first audio output mode to the noise-cancellation mode 1834 Display, via the display device, a settings user interface, including displaying one or more first activatable user interface elements each corresponding to a respective audio output mode in a first portion of the settings user interface;
   while displaying the settings user interface, detect an input corresponding to a request to scroll at least the first portion of the settings user interface;
   in response to detecting the input corresponding to the request to scroll at least the first portion of the settings user interface, scroll at least the first portion of the settings user interface, including:
      ceasing to display at least one of the one or more first activatable user interface elements; and
      displaying, via the display device, one or more second activatable user interface elements each corresponding to a respective audio output device of the one or more audio output devices that are in communication with the wearable electronic device 1836 Operating the wearable audio output device in any respective audio output mode is performed after establishing a wireless connection between the electronic device and the wearable audio output device; and
   prior to establishing the wireless connection between the electronic device and the wearable audio output device:
      receive, at the electronic device, an input to initiate a process to establish the wireless connection between the wearable audio output device and the electronic device; and
      while performing the process to establish the wireless connection in response to receiving the input, display a series of user interfaces, including:
         displaying a first user interface that includes information about a first type of input for performing a first operation with the wearable audio output device; and
         after displaying the first user interface, displaying a second user interface that includes information about a second type of input for performing a second type of operation with the wearable audio output device

Figure 18D

1838 In conjunction with transitioning the wearable audio output device from a first respective audio output mode to a second respective audio output mode, generate, via the one or more tactile output generators of the electronic device, a tactile output 1840 Display, via the display device, a settings user interface that includes a plurality of user interface elements each corresponding to a respective audio output mode of the wearable audio output device, including a first user interface element corresponding to the first audio output mode and a second user interface element corresponding to the noise-cancellation mode;
    prior to receiving the first input, display a selection indicator indicating selection of the first user interface element, wherein the selection indicator has a first appearance;
    wherein receiving the first input includes, while displaying the settings user interface, receiving the first input at an initial location on the touch-sensitive surface that corresponds to the selection indicator, and detecting movement of the first input across the touch-sensitive surface;
    in response to detecting the movement of the first input:
        move the selection indicator based at least in part on the movement of the first input; and
        in accordance with a determination that movement of the selection indicator based at least in part on the movement of the first input includes movement of the selection indicator settling into a predetermined snap position corresponding to a respective user interface element of the plurality of user interface elements, generate, via the one or more tactile output generators, a tactile output

Figure 18E

1842 Display, via the display device, a settings user interface that includes a plurality of user interface elements each corresponding to a respective audio output mode of the wearable audio output device, including a first user interface element corresponding to the first audio output mode and a second user interface element corresponding to the noise-cancellation mode; and prior to receiving the first input, display a selection indicator corresponding to the first user interface element, wherein the selection indicator has a first appearance;

wherein receiving the first input includes, while displaying the settings user interface, receiving the first input at an initial location on the touch-sensitive that corresponds to the selection indicator, and detecting movement of the first input across the touch-sensitive surface;

in response to detecting the movement of the first input, move the selection indicator based at least in part on the movement of the first input;

in accordance with a determination that the selection indicator corresponds to a respective user interface element that corresponds to a respective audio output mode to which the wearable audio output device can be transitioned, display the selection indicator with the first appearance; and in accordance with a determination that the selection indicator does not correspond to a respective user interface element that corresponds to a respective audio output mode to which the wearable audio output device can be transitioned, display the selection indicator with a second appearance that is different from the first appearance > 1844 The determination that the selection indicator does not correspond to a respective user interface element that corresponds to a respective audio output mode to which the wearable audio output device can be transitioned includes a determination that the selection indicator corresponds to the second user interface element corresponding to the noise-cancellation mode and that one of the first wearable audio output component or the second wearable audio output component is not in an in-ear position relative to a respective ear of the user 1846 Detect an input via the volume control hardware element; and
    in response to detecting the input via the volume control hardware element, display a volume control;
    wherein the settings user interface is displayed in response to an input corresponding to the displayed volume control 1848 In accordance with a determination that the computer system is configured to output audio via a respective audio output device, the settings user interface includes a graphical representation of the respective audio output device

Figure 18F

1850 Display, via the display device, a settings user interface that includes a plurality of user interface elements including a first user interface element corresponding to the first audio output mode of the wearable audio output device and a second user interface element corresponding to a second audio output mode of the wearable audio output device, wherein the second audio output mode is the noise-cancellation mode;
  prior to receiving the first input, display a selection indicator over the first user interface element;
  in response to receiving a first portion of the first input that includes an initial contact at a location on the touch-sensitive surface that corresponds to selection of a respective user interface element of the plurality of user interface elements:
    display a selection indicator over the respective user interface element; and
    in accordance with a determination that the respective user interface element corresponds to a respective audio output mode to which the wearable audio output device can be transitioned, transition the wearable audio output device to the respective audio output mode.

1852 In response to detecting a second portion of the first input that follows the first portion of the first input and that includes lift off of the contact from the touch-sensitive surface while the selection indicator is displayed over a respective user interface element of the plurality of user interface elements that corresponds to the noise-cancellation mode:
  in accordance with a determination that the noise-cancellation mode is an audio output mode to which the wearable audio output device cannot be transitioned, provide, via the one or more tactile output generators, an error tactile output 1854 The plurality of user interface elements is displayed in response to receiving a prior input corresponding to activation of an output-mode affordance, wherein the output-mode affordance includes a representation of the first audio output mode without including representations of any other audio output modes of the wearable audio output device; and, after at least a predetermined amount of time has elapsed since detecting the first input, cease to display the plurality of user interface elements and redisplay the output-mode affordance, wherein the output-mode affordance includes a representation of a respective audio output mode corresponding to a respective user interface element over which the selection indicator was displayed when the predetermined amount of time elapsed 1856 While displaying the selection indicator over a respective user interface element, animate at least a portion of the respective user interface element

Figure 18G

1858 In response to receiving a respective portion of the first input that corresponds to selection of a respective user interface element of the plurality of user interface elements, provide a respective selection tactile output 1860 The selection tactile output is provided without regard to whether the selected respective user interface element corresponds to a respective audio output mode to which the wearable audio output device can be transitioned

Figure 18H

1910 A respective wearable audio output component being in the first position relative to a respective ear of the user includes the respective wearable audio output component being placed at least partially within the respective ear, and a respective wearable audio output component being in the second position relative to a respective ear of the user includes the respective wearable audio output component being outside of the respective ear 1912 In response to detecting a change in position of the second wearable audio output component from the first position relative to the second ear of the user to the second position relative to the second ear of the user, while the first wearable audio output component is maintained in the second position relative to the first ear of the user:
    transition the wearable audio output device from the second audio output mode to a third audio output mode that is a noise control off mode, wherein, while the wearable audio output device is in the noise control off mode, audio outputs that are provided via the wearable audio output device do not include one or more pass-through audio components that include at least a portion of ambient sound from the physical environment and do not include one or more cancellation audio components selected so as to at least partially cancel ambient sound from the physical environment 1914 After detecting the change in position of the first wearable audio output component from the first position relative to the first ear of the user to a second position relative to the first ear of the user, in response to detecting a change in position of the first wearable audio output component from the second position relative to the first ear of the user back to the first position relative to the first ear of the user, while the second wearable audio output component is maintained in the first position relative to the first ear of the user:
    transition the wearable audio output device from the second audio output mode to the first audio output mode

Figure 19B

1916 A respective wearable audio output device being in the first position relative to a respective ear of the user includes the respective wearable audio output device being outside of the respective ear, and a respective wearable audio output device being in the second position relative to a respective ear of the user includes the respective wearable audio output device being placed at least partially in the respective ear 1918 Prior to operating the wearable audio output device in the first audio output mode:
    while the first wearable audio output component is in the second position relative to the first ear of the user and the second wearable audio output component is in the second position relative to the second ear of the user, operate the wearable audio output device in a respective audio output mode;
    after detecting the change in position of the first wearable audio output component from the first position relative to the first ear of the user to the second position relative to the first ear of the user:
        in response to detecting a change in position of the second wearable audio output component from the first position relative to the second ear of the user to the second position relative to the second ear of the user, while the first wearable audio output component is maintained in the second position relative to the first ear of the user:
            transition the wearable audio output device from the second audio output mode to the respective audio output mode 1920 While operating the wearable audio output device in a respective audio output mode, receive an alert of an incoming phone call;
    detect an input that corresponds to a request to answer the incoming phone call;
    in response to detecting the input corresponding to a request to answer the incoming phone call:
        transition the wearable audio output device from the respective audio output mode to the second audio output mode 1922 Detect termination of the phone call; and
    in response to detecting the termination of the phone call:
        transition the wearable audio output device from the second audio output mode to the respective audio output mode

Figure 19C

2014 Indicate the quality of the first acoustic seal relative to the quality of the second acoustic seal 2016 The quality of the first acoustic seal relative to the quality of the second acoustic seal is indicated using text 2018 Displaying the acoustic seal information for the wearable audio output device includes:
  in accordance with a determination that the quality of the first acoustic seal does not meet an acoustic seal quality threshold and/or that the quality of the second acoustic seal does not meet the acoustic seal quality threshold, display, via the display device, one or more instructions prompting the user to perform one or more adjustments of the wearable audio output device 2020 Displaying the acoustic seal information for the wearable audio output device includes:
  in accordance with a determination that the quality of the first acoustic seal meets an acoustic seal quality threshold and that the quality of the second acoustic seal meets the acoustic seal quality threshold, forgo displaying one or more instructions prompting the user to perform one or more adjustments of the wearable audio output device 2022 Displaying the acoustic seal information for the wearable audio output device includes indicating the quality of the first acoustic seal relative to the quality of the second acoustic seal without regard to whether the quality of the first acoustic seal meets an acoustic seal quality threshold and without regard to whether the quality of the second acoustic seal meets the acoustic seal quality threshold

Figure 20B

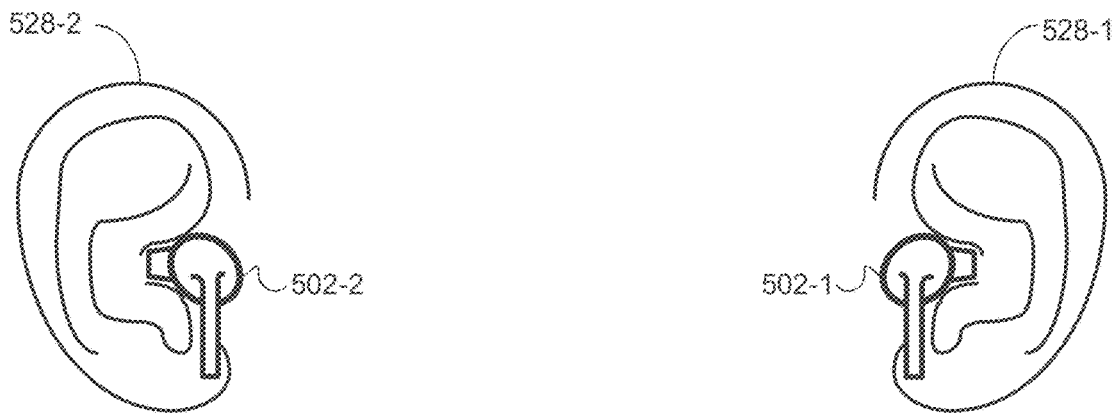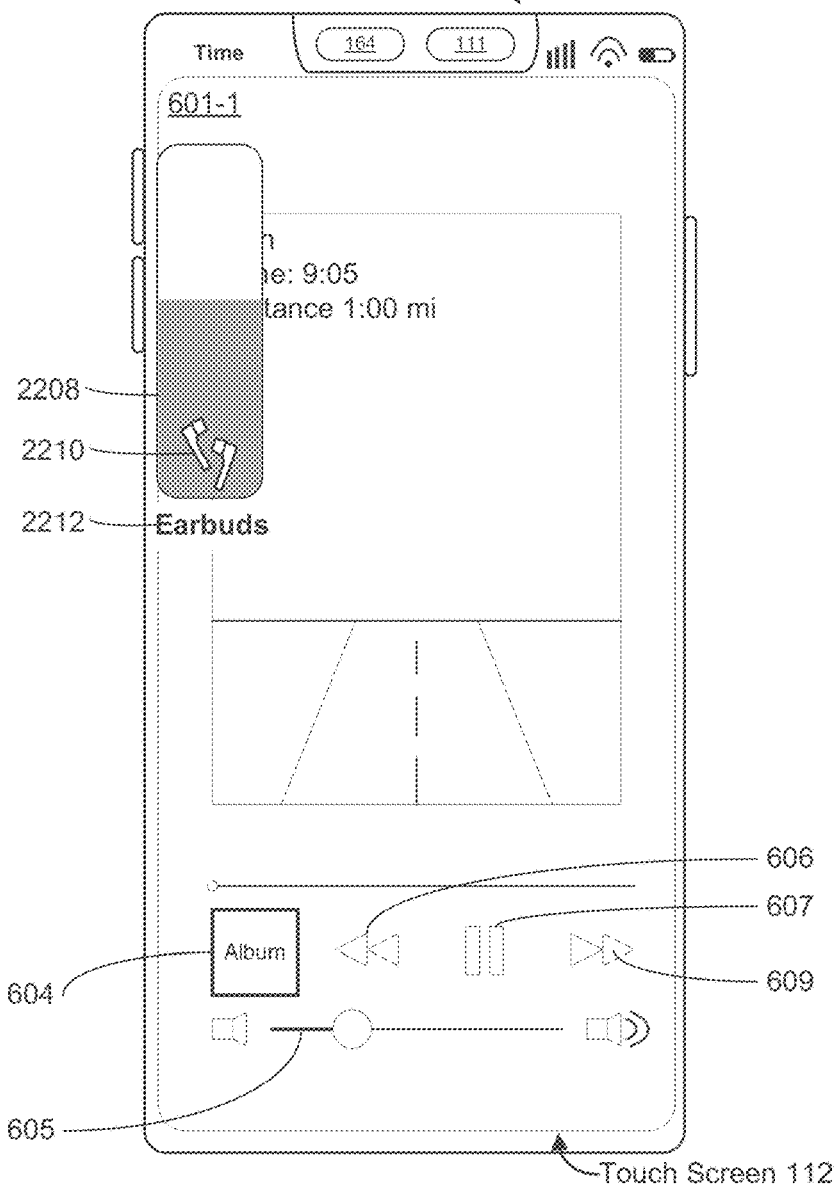
Figure 22B

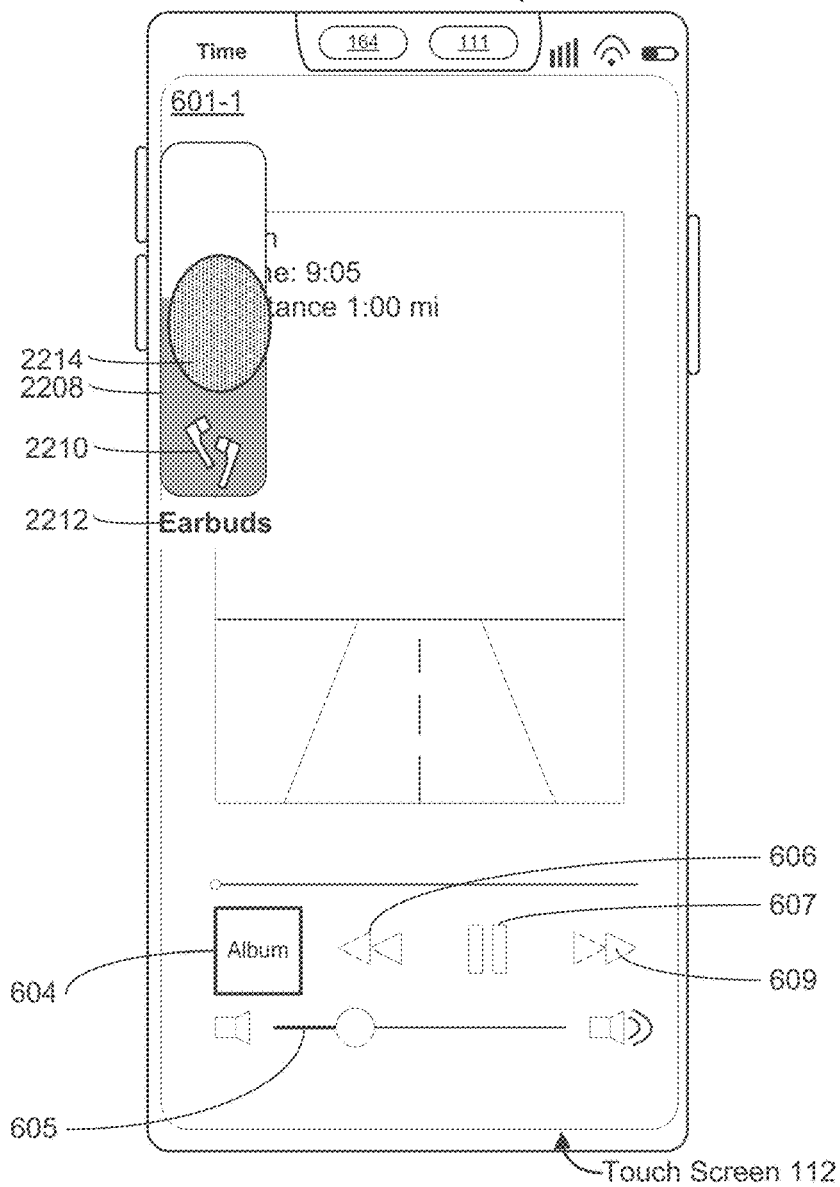
Figure 22C

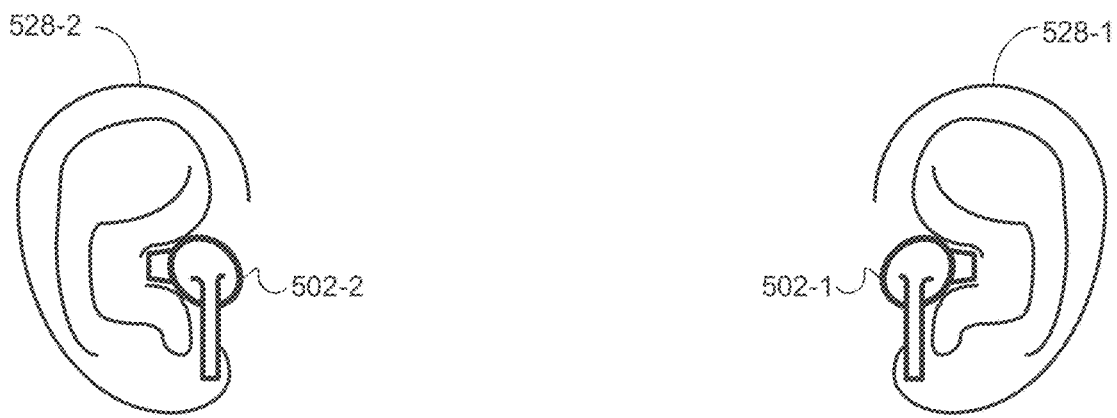
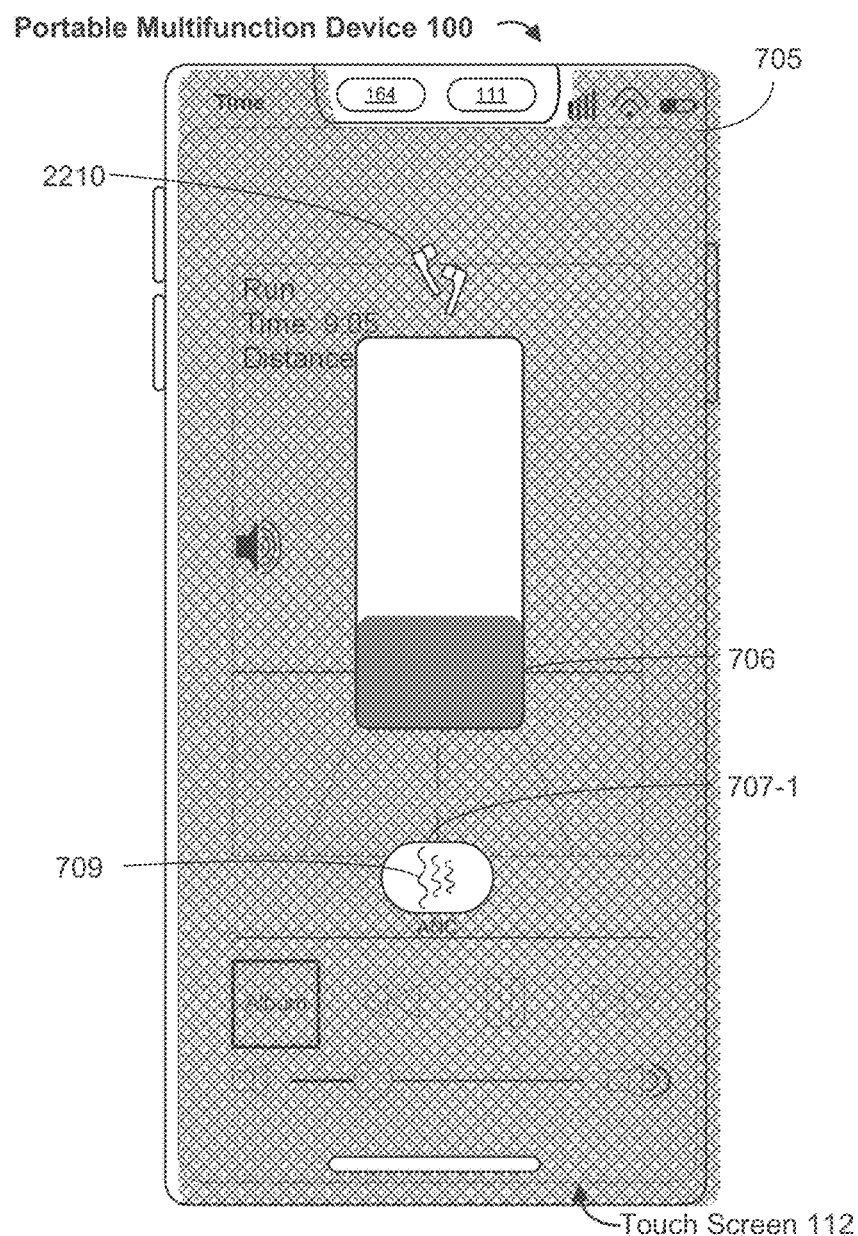
Figure 22D

2412 While displaying the audio output settings user interface, receive a second input corresponding to a request to change an output volume level of a respective set of wearable audio output devices; and
   in response to receiving the second input:
      in accordance with a determination that the second input corresponds to the first set of wearable audio output devices, change the output volume level of the first set of wearable audio output devices and update the first volume control to indicate the changed output volume level of the first set of wearable audio output devices without changing the output volume level of the second set of wearable audio output devices; and
      in accordance with a determination that the second input corresponds to the second set of wearable audio output devices, change the output volume level of the second set of wearable audio output devices and update the second volume control to indicate the changed output volume level of the second set of wearable audio output devices without changing the output volume level of the first set of wearable audio output devices 2414 Receive a third input that corresponds to activation of the representation of the first audio output mode; and
   in response to receiving the third input, display representations of a first plurality of audio output modes of the first set of wearable audio output devices, wherein the representations of the first plurality of audio output modes include a representation of the first audio output mode and a representation of a second audio output mode that is different from the first audio output mode 2416 Prior to detecting the third input, the second volume control indicating a current output volume level of the second set of wearable audio output devices is concurrently displayed with a representation of a second audio output mode that is a current audio output mode of the second plurality of audio output modes available at the second set of wearable audio output devices, wherein the representation of the second audio output mode is visually associated with the second volume control; and
   in response to receiving the third input, cease to display the representation of the second audio output mode (A)

Figure 24B

2414 Receive a third input that corresponds to activation of the representation of the first audio output mode; and
  in response to receiving the third input, display representations of a first plurality of audio output modes of the first set of wearable audio output devices, wherein the representations of the first plurality of audio output modes include a representation of the first audio output mode and a representation of a second audio output mode that is different from the first audio output mode

2418 While displaying the respective representations of the first plurality of audio output modes of the first set of wearable audio output devices, receive a fifth input that corresponds to a request to change an output volume level of the second set of wearable audio output devices using the second volume control; and
  in response to receiving the fifth input, forgo changing the output volume level of the second set of wearable audio output devices 2420 While displaying the respective representations of the first plurality of audio output modes of the first set of wearable audio output devices, in accordance with a determination that the current output volume level of the second set of wearable audio output devices has changed, update the second volume control to indicate the changed output volume level of the second set of wearable audio output devices 2422 While displaying the respective representations of the first plurality of audio output modes of the first set of wearable audio output devices, receive a sixth input that corresponds to a request to change an output volume level of the first set of wearable audio output devices using the first volume control; and
  in response to receiving the sixth input, change the output volume level of the first set of wearable audio output devices and update the first volume control to indicate the changed output volume level of the first set of wearable audio output devices

Figure 24C

2424 In response to receiving the third input, emphasize an appearance of the first volume control relative to an appearance of the second volume control 2426 While displaying the respective representations of the first plurality of audio output modes of the first set of wearable audio output devices, receive a fourth input that corresponds to selection of a representation of a respective audio output mode in the first plurality of audio output modes that is different from the first audio output mode; and
    after receiving the fourth input:
        cease to emphasize the appearance of the first volume control relative to the appearance of the second volume control 2428 After receiving the fourth input, maintain display of the selected representation of the respective audio output mode and cease to display the representations of audio output modes other than the respective audio output mode, and redisplay the representation of the second audio output mode that is the current audio output mode of the second set of wearable audio output devices 2430 Receive a respective input directed to the second volume control; and
    in response to receiving the respective input directed to the second volume control:
        in accordance with a determination that the respective representations of the first plurality of audio output modes of the first set of wearable audio output devices are not displayed, change the output volume level of the second set of wearable audio output devices and update the second volume control to indicate the changed output volume level of the second set of wearable audio output devices; and
        in accordance with a determination that the respective representations of the first plurality of audio output modes of the first set of wearable audio output devices are displayed, forgo changing the output volume level of the second set of wearable audio output devices

Figure 24D

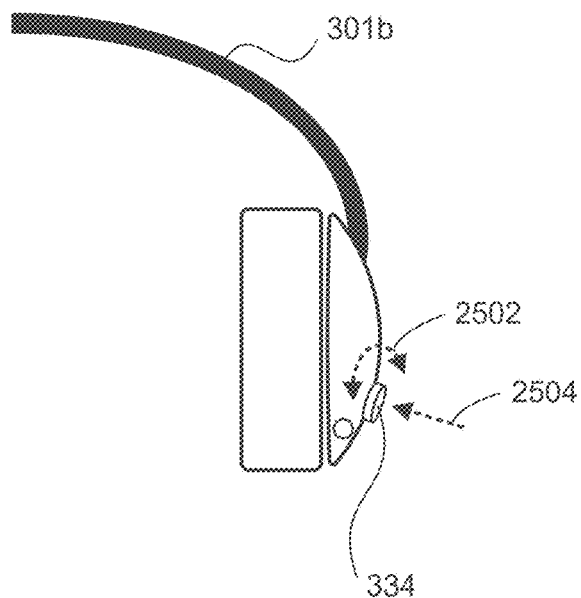
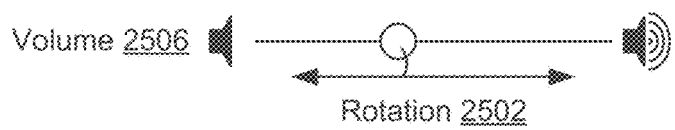
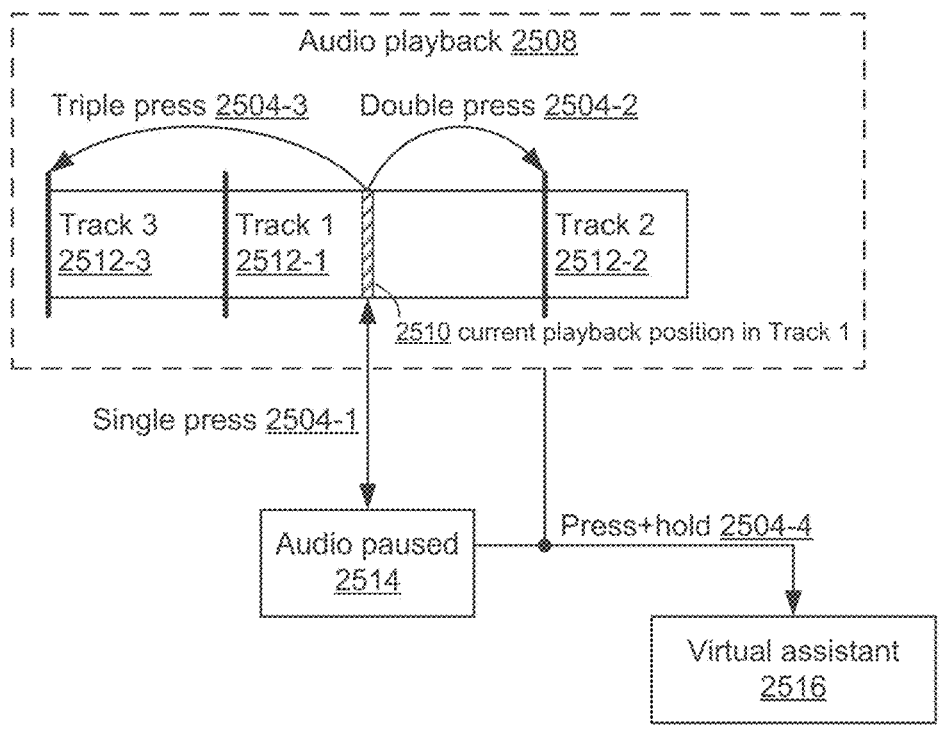
Figure 25A

2618 In response to receiving the first input, in accordance with the determination that the first input is the second type of input to the rotatable input mechanism:
  invoke a virtual assistant 2620 The wearable audio output device is in communication with an electronic device;
  receive an alert of a first phone call received at the electronic device;
  while receiving the alert of the first phone call, receive, via the rotatable input mechanism, a third input; and
  in response to receiving the third input:
    in accordance with a determination that the third input is a first respective type of input to the rotatable input mechanism, output audio of the first phone call; and
    in accordance with a determination that the third input is a second respective type of input to the rotatable input mechanism, wherein the second respective type of input is different from the first respective type of input, forgo outputting audio of the phone call 2622 While outputting audio of the first phone call, receive, via the rotatable input mechanism, a fourth input that is the first respective type of input; and
  in response to receiving the fourth input, disconnect the first phone call, and cease to output audio of the first phone call 2624 While the electronic device is concurrently connected to the first phone call and a second phone call, and while outputting audio of the first phone call, receive, via the rotatable input mechanism, a fifth input; and
  in response to receiving the fifth input:
    in accordance with a determination that the fifth input is the first respective type of input:
      output audio of the second phone call, and cease to output audio of the first phone call; and
      while outputting audio of the second phone call, receive, via the rotatable input mechanism, a sixth input that is the first respective type of input; and
        in response to receiving the sixth input:
          cease to output audio of the second phone call, and output audio of the first phone call 2626 In response to receiving the fifth input:
  in accordance with a determination that the fifth input is the second respective type of input:
    output audio of the second phone call, and cease to output audio of the first phone call

Figure 26B

2628 The wearable audio output device includes an input device;
  receive, via the input device, an input; and
  in response to receiving the input via the input device, transition from a first audio output mode to a second audio output mode, wherein the first and second audio output modes are selected from a set of noise control audio output modes including a noise-cancellation audio output mode, a pass-through audio output mode, and a noise control off mode 2630 In response to receiving the input via the input device, output one or more audio outputs that correspond to the input via the input device 2632 In response to receiving the first input:
  in accordance with the determination that the first input is the first type of input to the rotatable input mechanism that includes rotation of the rotatable input mechanism, output one or more audio outputs corresponding to the rotation of the rotatable input mechanism 2634 Outputting a respective audio output in response to receiving an input via a respective input device includes generating the respective audio output with a respective simulated spatial location that corresponds to a physical location of the respective input device 2636 Prior to outputting the first audio that is based on first media:
  in accordance with a determination that the first audio includes audio associated with one or more physical spatial locations, output respective audio indicating that the first audio includes audio associated with one or more physical spatial locations 2638 Prior to outputting the first audio that is based on first media:
  detect placement of the wearable audio output device on a user;
  in response to detecting placement of the wearable audio output device on a user, play an audio indication, wherein:
    in accordance with a determination that the wearable audio output device is in communication with an electronic device, the audio indication is a first audio indication; and
    in accordance with a determination that the wearable audio output device is not in communication with an electronic device, the audio indication is a second audio indication that is different from the first audio indication

Figure 26C

2640 While the first wearable component is in a respective position relative to a first ear of a user and the second wearable component is in the respective position relative to a second ear of the user, and while the second wearable component is operating in a first audio output mode, detect a change in position of the first wearable component to a position other than the respective position; and in response to detecting the change in position of the first wearable component to a position other than the respective position:

operate the second wearable component of the wearable audio output device in a second audio output mode that includes a greater degree of audio transparency than the first audio output mode

Figure 26D

SYSTEMS, METHODS, AND USER INTERFACES FOR HEADPHONE FIT ADJUSTMENT AND AUDIO OUTPUT CONTROL

RELATED APPLICATIONS

This application claims priority to U.S. Provisional Patent Application No. 63/033,058, filed Jun. 1, 2020, U.S. Provisional Patent Application No. 62/907,525, filed Sep. 27, 2019, U.S. Provisional Patent Application No. 62/897,819, filed Sep. 9, 2019, and U.S. Provisional Patent Application No. 62/871,634, filed Jul. 8, 2019, which are hereby incorporated by reference in their entireties.

TECHNICAL FIELD

This relates generally to audio output devices such as wearable audio output devices, including but not limited to wearable audio output devices where the fit of the wearable audio output devices in a user's ears is adjustable, and where audio output control can be performed using inputs at the wearable audio output devices.

BACKGROUND

Audio output devices, including wearable audio output devices such as earbuds and earphones, are widely used to provide audio outputs to a user. But conventional methods of providing audio outputs using audio output devices are cumbersome, inefficient, and limited. In some cases, conventional methods fail to ensure that wearable audio output devices are properly calibrated and fitted to a user's ears (e.g., so as to enable effective active noise control) and that information about the fit of the wearable audio output devices is effectively conveyed to the user. In some cases, conventional methods fail to ensure that the wearable audio output devices continue to be fitted to the user's ears as the user performs various activities over time. In some cases, limited control over audio outputs is given to inputs provided at the wearable audio output devices; for example, an input may be limited to having control over a single predefined feature of audio output, such as increasing output volume or toggling a feature on or off. In some cases, this limited control over audio outputs interferes with a user's ability to control the amount of sound that the user is able to hear from the surrounding physical environment while wearing the earbuds or earphones. In other cases, the control over audio outputs given to inputs provided at the wearable audio output devices results in undesired acoustic effects when the wearable audio output devices are not placed in both ears. Moreover, in some cases, it would be beneficial to automatically change the manner in which audio outputs are provided in response to certain types of events occurring relative to the wearable audio output devices, but conventional methods provide audio outputs in a static manner irrespective of events occurring relative to the wearable audio output devices. In some cases, user interfaces for controlling audio output settings provide too few controls, for example by providing controls for only one audio output device, thus requiring a user to provide numerous inputs and navigate through different menus or user interfaces to perform a particular operation, or provide too many controls, thus cluttering the user interface and increasing the likelihood that the user will mistakenly interact with the wrong control, particularly for implementations where display area is limited. In addition, conventional methods take longer and require more user interaction than necessary to calibrate the wearable audio output devices and control audio outputs, thereby wasting energy. This latter consideration is particularly important in battery-operated devices.

SUMMARY

Accordingly, there is a need for wearable audio output devices and associated computer systems with improved methods and interfaces for determining and adjusting the fit of the wearable audio output devices and for controlling audio outputs using inputs at the wearable audio output devices. Such methods and interfaces optionally complement or replace conventional methods of calibrating audio output devices and controlling audio outputs. Such methods and interfaces reduce the number, extent, and/or nature of the inputs from a user and produce a more efficient human-machine interface. For battery-operated systems and devices, such methods and interfaces conserve power and increase the time between battery charges.

The above deficiencies and other problems associated with calibrating audio output devices and controlling audio outputs are reduced or eliminated by the disclosed computer systems and wearable audio output devices. In some embodiments, the computer system includes a desktop computer. In some embodiments, the computer system is portable (e.g., a notebook computer, tablet computer, or handheld device). In some embodiments, the computer system includes a personal electronic device (e.g., a wearable electronic device, such as a watch). In some embodiments, the computer system includes (and/or is in communication with) the wearable audio output devices (e.g., in-ear earphones, earbuds, over-ear headphones, etc.). In some embodiments, the computer system has (and/or is in communication with) a touch-sensitive surface (also known as a "touchpad"). In some embodiments, the computer system has (and/or is in communication with) a display device, which in some embodiments is a touch-sensitive display (also known as a "touch screen" or "touch-screen display"). In some embodiments, the computer system has a graphical user interface (GUI), one or more processors, memory and one or more modules, programs or sets of instructions stored in the memory for performing multiple functions. In some embodiments, the user interacts with the GUI primarily through stylus and/or finger contacts and gestures on the touch-sensitive surface. In some embodiments, the functions optionally include image editing, drawing, presenting, word processing, spreadsheet making, game playing, telephoning, video conferencing, e-mailing, instant messaging, workout support, digital photographing, digital videoing, web browsing, audio output device pairing and calibration, digital music/audio playing, note taking, and/or digital video playing. Executable instructions for performing these functions are, optionally, included in a non-transitory computer readable storage medium or other computer program product configured for execution by one or more processors.

In accordance with some embodiments, a method is performed at a computer system that includes a display device and a touch-sensitive surface. The method includes establishing a wireless connection with a pair of wearable audio output devices that includes: a first wearable audio output device with one or more first microphones; and a second wearable audio output device with one or more second microphones. The method includes detecting that the first wearable audio output device has been placed in an ear of a user; and detecting that the second wearable audio output device has been placed in an ear of the user. The method includes, after detecting that the first wearable audio output device has been placed in an ear of the user and that the second wearable audio output device has been placed in an ear of the user: outputting a first calibration tone via the first wearable audio output device and the second wearable audio output device; detecting first audio via the one or more first microphones of the first wearable audio output device; and detecting second audio via the one or more second microphones of the second wearable audio output device. The method includes, in accordance with a determination that the detected first audio does not satisfy device fit criteria associated with the first calibration tone, displaying, via the display device, an alert prompting the user to perform an adjustment of the first wearable audio output device; and, in accordance with a determination that the detected second audio does not satisfy the device fit criteria associated with the first calibration tone, displaying, via the display device, an alert prompting the user to perform an adjustment of the second wearable audio output device.

In accordance with some embodiments, a method is performed at a computer system that includes a display device and that is in communication with one or more wearable audio output devices. The computer system is configured to execute a plurality of applications, and the one or more wearable audio output devices include one or more sensors for detecting placement of the one or more wearable audio output devices and one or more microphones. The method includes, while the one or more wearable audio output devices are in one or more respective positions relative to a user's ears, and while a media presentation application on the computer system is being used to play media via the one or more wearable audio output devices without displaying a settings user interface for configuring a fit of the one or more wearable audio output devices: providing, via the one or more wearable audio output devices, audio output based on media from the media presentation application, wherein the media presentation application is separate from the settings user interface; determining, based on the audio output based on the media from the media presentation application, that the one or more wearable audio output devices have ceased to satisfy device fit criteria; and, in response to determining that the one or more wearable audio output devices have ceased to satisfy the device fit criteria, displaying, on the display device, an alert corresponding to information about a fit of the one or more wearable audio output devices.

In accordance with some embodiments, a method is performed at a wearable audio output device that includes an input device and one or more microphones and that is in a physical environment. The method includes, while ambient sound from the physical environment is being detected by the one or more microphones: while the wearable audio output device is in a first audio output mode, providing a first audio output based at least in part on the ambient sound from the physical environment, wherein the first audio output includes one or more pass-through audio components selected so as to increase audio pass-through of the ambient sound from the physical environment; detecting a first input via the input device, and in response to detecting the first input, and in accordance with a determination that the first input is a first type of gesture, transitioning the wearable audio output device from the first audio output mode to a second audio output mode. The method includes, while the wearable audio output device is in the second audio output mode, providing a second audio output based at least in part on the ambient sound from the physical environment, wherein the second audio output includes one or more cancellation audio components selected so as to increase audio cancellation of the ambient sound from the physical environment.

In accordance with some embodiments, a method is performed at a computer system that includes a wearable audio output device, where the wearable audio output device is in a physical environment, and one or more input devices. The method includes operating the wearable audio output device in a first audio output mode; and while operating the wearable audio output device in the first audio output mode, receiving, via the one or more input devices, a first input corresponding to a request to transition the wearable audio output device from the first audio output mode to a noise-cancellation mode. While the wearable audio output device is in the noise-cancellation mode, audio outputs that are provided via the wearable audio output device include one or more cancellation audio components selected so as to at least partially cancel ambient sound from the physical environment. The method includes, in response to receiving the first input: in accordance with a determination that a first wearable audio output component of the wearable audio output device is in an in-ear position relative to a first ear of a user and that a second wearable audio output component of the wearable audio output device is in an in-ear position relative to a second ear of the user, transitioning the wearable audio output device from the first audio output mode to the noise-cancellation mode; and in accordance with a determination that one of the first wearable audio output component or the second wearable audio output component is not in an in-ear position relative to a respective ear of the user, forgoing transitioning the wearable audio output device from the first audio output mode to the noise-cancellation mode.

In accordance with some embodiments, a method is performed at a computer system that includes a wearable audio output device in a physical environment. The method includes, while a first wearable audio output component of the wearable audio output device is in a first position relative to a first ear of a user and a second wearable audio output component of the wearable audio output device is in the first position relative to a second ear of the user, operating the wearable audio output device in a first audio output mode, and, while operating the wearable audio output device in the first audio output mode, detecting a change in position of the first wearable audio output component from the first position relative to the first ear of the user to a second position relative to the first ear of the user. The method includes, in response to detecting the change in position of the first wearable audio output component from the first position relative to the first ear of the user to the second position relative to the first ear of the user, while the second wearable audio output component is maintained in the first position relative to the second ear of the user: transitioning the wearable audio output device from the first audio output mode to a second audio output mode that is a pass-through audio output mode that is different from the first audio output mode. While the wearable audio output device is in the pass-through audio output mode, audio outputs that are provided via the wearable audio output device include one or more pass-through audio components that include at least a portion of ambient sound from the physical environment.

In accordance with some embodiments, a method is performed at a computer system that includes a display device and a wearable audio output device. The wearable audio output device includes a first wearable audio output component and a second wearable audio output component. The method includes detecting an occurrence of a respective event; and, in response to detecting the occurrence of the respective event, in accordance with a determination that the first wearable audio output component is at least partially in a first ear of the user and that the second wearable audio output component is at least partially in a second ear of the user, displaying acoustic seal information for the wearable audio output device, including concurrently displaying, via the display device: a first indication of a quality of a first acoustic seal between the first wearable audio output component and the first ear of the user; and a second indication, distinct from the first indication, of a quality of a second acoustic seal between the second wearable audio output component and the second ear of the user.

In accordance with some embodiments, a method is performed at a computer system that includes a display device and that is in communication with one or more sets of wearable audio output devices. The method includes receiving a first input that corresponds to a request to display an audio output settings user interface; and, in response to receiving the first input, displaying the audio output settings user interface. In accordance with a determination that the computer system is in communication with at least a first set of one or more wearable audio output devices and a second set of one or more wearable audio output devices, the audio output settings user interface includes: a first set of audio output controls corresponding to the first set of wearable audio output devices, including a first volume control indicating a current output volume level of the first set of wearable audio output devices, and a representation of a first audio output mode that is a current audio output mode of a first plurality of audio output modes available at the first set of wearable audio output devices, where the representation of the first audio output mode is visually associated with the first volume control; and a second set of audio output controls corresponding to the second set of wearable audio output devices, including a second volume control indicating a current output volume level of the second set of wearable audio output devices.

In accordance with some embodiments, a method is performed at a wearable audio output device with a rotatable input mechanism. The method includes outputting, via the wearable audio output device, first audio that is based on first media. The method includes, while outputting the first audio, receiving a first input via the rotatable input mechanism. The method includes, in response to receiving the first input: in accordance with a determination that the first input is a first type of input to the rotatable input mechanism that includes rotation of the rotatable input mechanism, changing an audio output volume of the first audio based on the rotation of the rotatable input mechanism while continuing to output the first audio; and, in accordance with a determination that the first input is a second type of input to the rotatable input mechanism, where the second type of input is different from the first type of input, ceasing to output the first audio.

In accordance with some embodiments, a computer system includes or is in communication with one or more wearable audio output devices, a display device, optionally a touch-sensitive surface, one or more processors, and memory storing one or more programs; the one or more programs are configured to be executed by the one or more processors and the one or more programs include instructions for performing or causing performance of the operations of any of the methods described herein. In accordance with some embodiments, a computer readable storage medium has stored therein instructions that, when executed by a computer system as described herein, cause the computer system to perform or cause performance of the operations of any of the methods described herein. In accordance with some embodiments, a graphical user interface (e.g., on an electronic device) in a computer system as described herein includes one or more of the elements displayed in any of the methods described herein, which are updated in response to inputs, as described in any of the methods described herein. In accordance with some embodiments, a computer system as described herein includes means for performing or causing performance of the operations of any of the methods described herein. In accordance with some embodiments, an information processing apparatus, for use in a computer system as described herein, includes means for performing or causing performance of the operations of any of the methods described herein.

In accordance with some embodiments, a wearable audio output device as described herein includes one or more microphones, optionally an input device (e.g., which may be pressure-sensitive and/or touch-sensitive), optionally one or more attachments (e.g., in-ear eartips), optionally one or more sensors for detecting placement of the wearable audio output device, one or more processors, and memory storing one or more programs; the one or more programs are configured to be executed by the one or more processors and the one or more programs include instructions for performing or causing performance of the operations of any of the methods described herein. In accordance with some embodiments, a computer readable storage medium has stored therein instructions that, when executed by a wearable audio output device as described herein, cause the wearable audio output device to perform or cause performance of the operations of any of the methods described herein. In accordance with some embodiments, a wearable audio output device as described herein includes means for performing or causing performance of the operations of any of the methods described herein. In accordance with some embodiments, an information processing apparatus, for use in a wearable audio output device as described herein, includes means for performing or causing performance of the operations of any of the methods described herein.

Thus, computer systems that include or are in communication with one or more wearable audio output devices, a display device, and optionally a touch-sensitive surface, and wearable audio output devices that include one or more microphones, optionally an input device (e.g., which may be pressure-sensitive and/or touch-sensitive), optionally one or more attachments (e.g., in-ear eartips), and optionally one or more sensors for detecting placement of the wearable audio output device, are provided with improved methods and interfaces for adjusting the fit of the wearable audio output devices and for controlling audio outputs using inputs at the wearable audio output devices, thereby increasing the effectiveness, efficiency, and user satisfaction with such systems and devices. Such methods and interfaces may complement or replace conventional methods for calibrating audio output devices and controlling audio outputs.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIGS. 3C-3D illustrate example audio control by a wearable audio output device in accordance with some embodiments.

FIG. 4B illustrates an example user interface for a multifunction device with a touch-sensitive surface that is separate from the display in accordance with some embodiments.

FIGS. 8A-8J illustrate example user interactions with wearable audio output devices to control audio outputs in accordance with some embodiments.

FIGS. 9A-9C illustrate an example settings user interface for controlling various features associated with wearable audio output devices and examples of controlling audio output mode in accordance with some embodiments.

FIGS. 10A-10H are flow diagrams of a process for pairing and calibrating wearable audio output devices in accordance with some embodiments.

FIGS. 11A-11D are flow diagrams of a process for monitoring the fit of wearable audio output devices during use in accordance with some embodiments.

FIGS. 12A-12E are flow diagrams of a process for controlling audio outputs using inputs at a wearable audio output device in accordance with some embodiments.

FIGS. 13A-13D illustrate example user interfaces for pairing wearable audio output devices in accordance with some embodiments.

FIGS. 18A-18H are flow diagrams of a process for controlling audio output mode of a wearable audio output device in accordance with some embodiments.

FIGS. 19A-19C are flow diagrams of a process for transitioning audio output mode of a wearable audio output device in response to detected events in accordance with some embodiments.

FIGS. 20A-20B are flow diagrams of a process for displaying information about acoustic seal quality of a wearable audio output device in accordance with some embodiments.

FIGS. 22A-22D illustrate example user interfaces and user interactions for accessing a settings user interface for controlling various features associated with wearable audio output devices in accordance with some embodiments.

FIGS. 24A-24D are flow diagrams of a process for controlling audio output settings for multiple wearable audio output devices using a single settings user interface in accordance with some embodiments.

FIGS. 25A-25G illustrate example user interactions for controlling audio outputs from a wearable audio output device and example audio and visual alerts responsive to such user interactions in accordance with some embodiments.

FIGS. 26A-26D are flow diagrams of a process for controlling audio outputs from a wearable audio output device in accordance with some embodiments.

DESCRIPTION OF EMBODIMENTS

As noted above, audio output devices such as wearable audio output devices are widely used to provide audio outputs to a user. Many computer systems that include or are in communication with wearable audio output devices fail to ensure that the wearable audio output devices are properly calibrated and remain fitted to a user's ears, or give a user only limited control over audio outputs in response to inputs at the wearable audio output devices, or provide user interfaces with too few or too many audio output controls. The methods, systems, and user interfaces/interactions described herein improve how audio outputs are provided in multiple ways. For example, embodiments disclosed herein describe improved ways to determine and adjust the fit of the wearable audio output devices, to control audio outputs using inputs at the wearable audio output devices, and to provide improved user interfaces for controlling audio output settings.

Figure 6A:
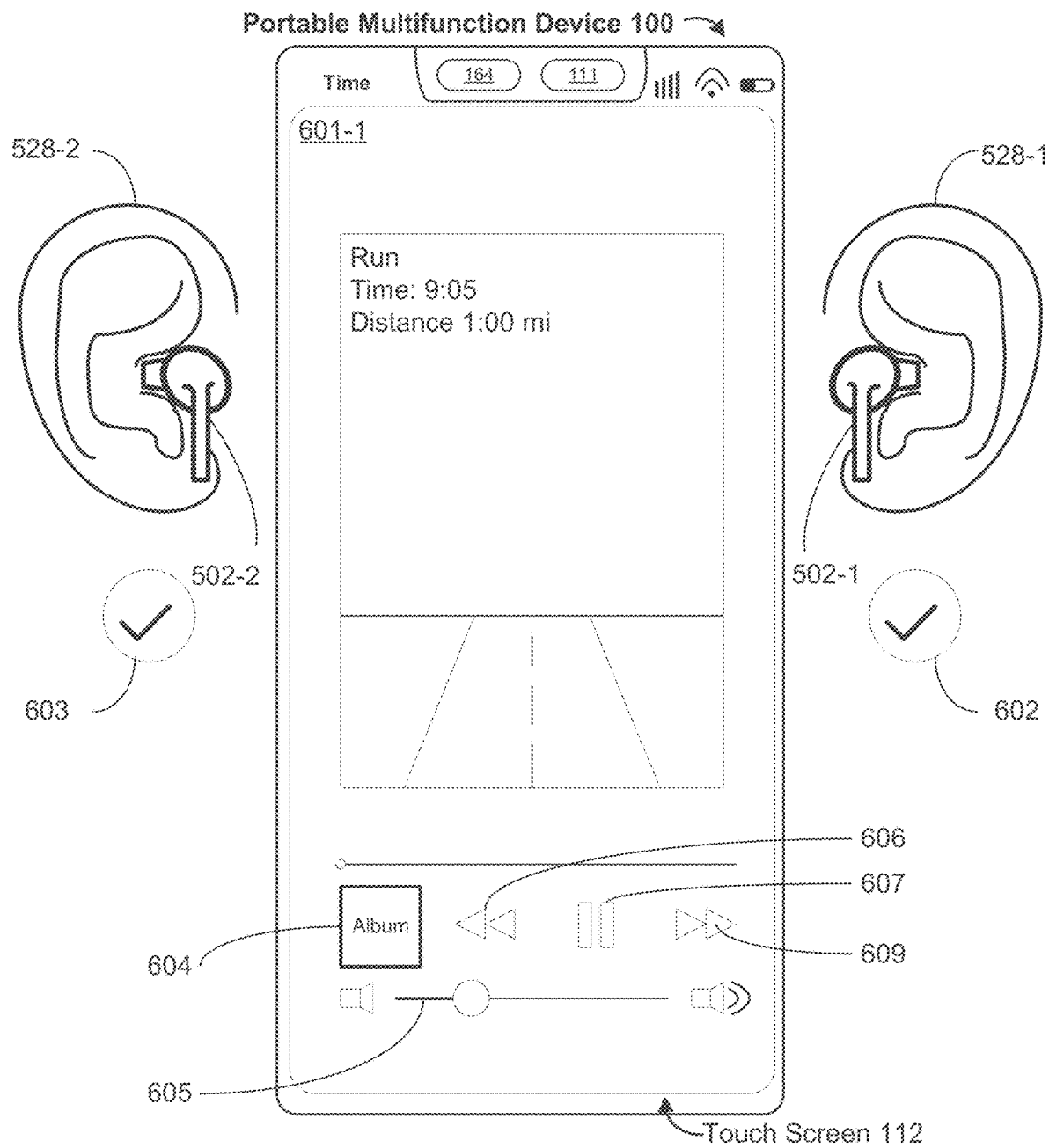
FIGS. 6A-6O illustrate example user interfaces for alerting a user when wearable audio output devices no longer satisfy fit criteria during use in accordance with some embodiments.
Figure 6O:
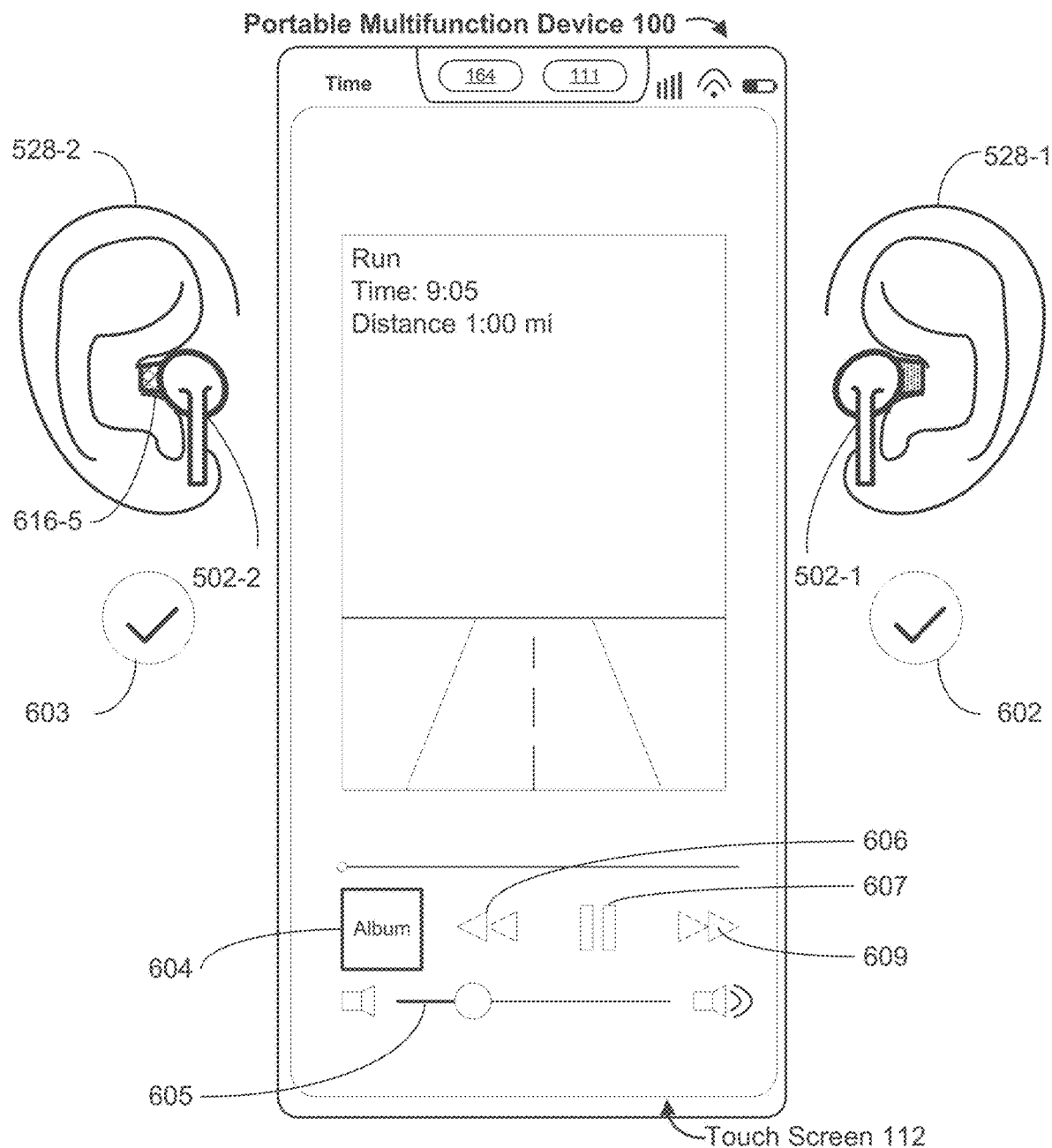
Figure 7A:
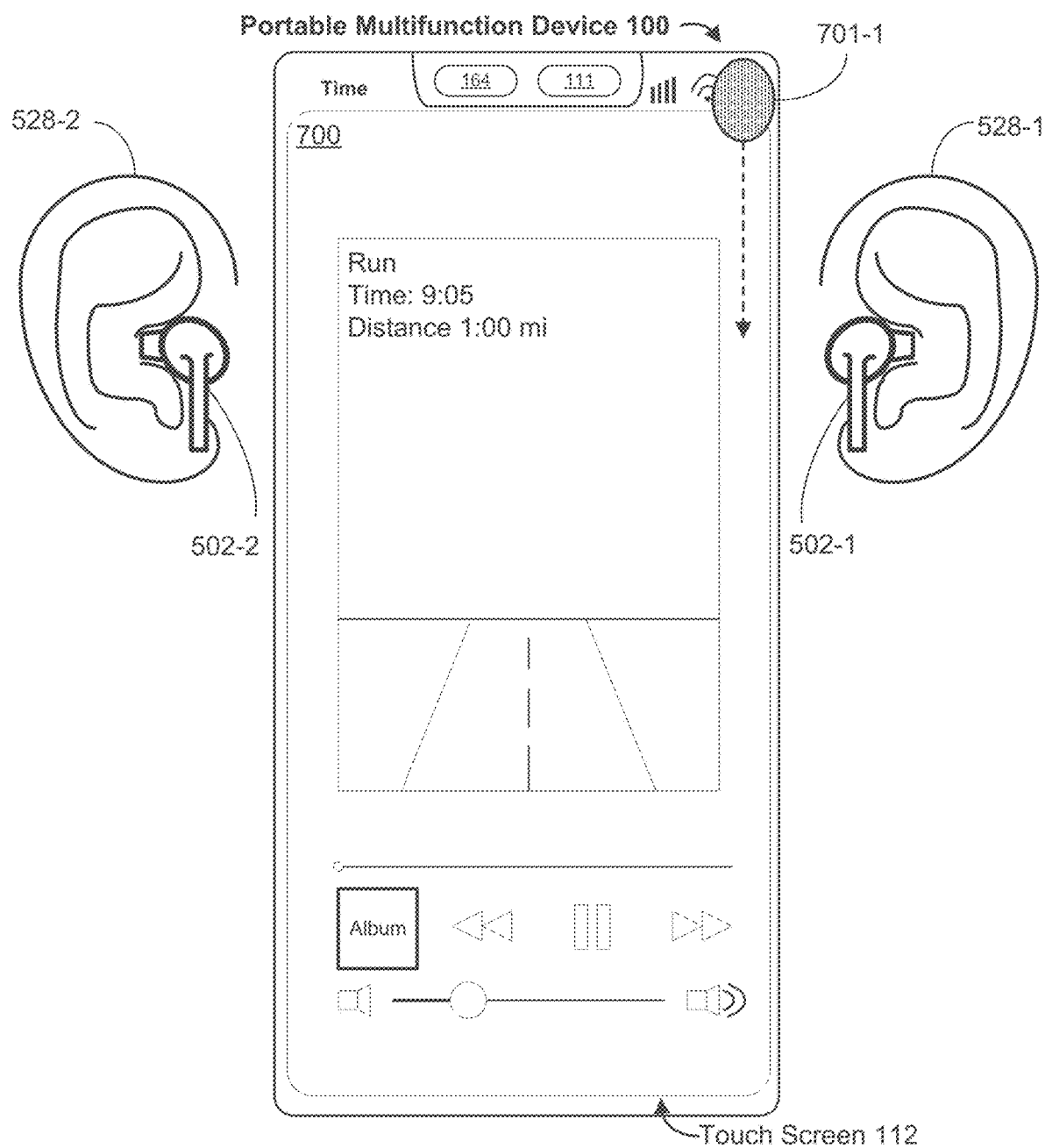
FIGS. 7A-7Q illustrate example user interfaces and user interactions for changing the audio output mode of a wearable audio output device in accordance with some embodiments.

Below, FIGS. 1A-1B, 2, and 3A-3D provide a description of example devices and examples of their operation. FIGS. 4A-4B illustrate example user interface for example devices on which the embodiments disclosed herein are implemented. FIGS. 5A-5V illustrate example user interfaces for pairing and calibrating wearable audio output devices. FIGS. 6A-6O illustrate example user interfaces for alerting a user when wearable audio output devices no longer satisfy fit criteria during use. FIGS. 7A-7Q illustrate example user interfaces and user interactions for changing the audio output mode of a wearable audio output device. FIGS. 8A-8J illustrate example user interactions with wearable audio output devices to control audio outputs. FIGS. 9A-9C illustrate an example settings user interface for controlling various features associated with wearable audio output devices and examples of controlling audio output mode. FIGS. 10A-10H are flow diagrams of a process for pairing and calibrating wearable audio output devices. FIGS. 11A-11D are flow diagrams of a process for monitoring the fit of wearable audio output devices during use. FIGS. 12A-12E are flow diagrams of a process for controlling audio outputs using inputs at a wearable audio output device. FIGS. 13A-13D illustrate example user interfaces for pairing wearable audio output devices. FIGS. 14A-14Z illustrate example user interfaces and user interactions for changing the audio output mode of wearable audio output devices. FIGS. 15A-15E illustrate an example settings user interface for controlling various features associated with wearable audio output devices and examples of controlling audio output mode. FIGS. 16A-16G illustrate example user interfaces for calibrating and displaying information about acoustic seal quality of wearable audio output devices. FIGS. 17A-17J illustrate example user interfaces and user interactions for selecting an audio output device, such as a wearable audio output device, and changing the audio output mode of the selected audio output device via (e.g., using) a wearable electronic device. FIGS. 21A-21J illustrate example user interfaces and user interactions for changing the audio output mode of wearable audio output devices. FIGS. 22A-22D illustrate example user interfaces and user interactions for accessing a settings user interface for controlling various features associated with wearable audio output devices. FIGS. 23A-23AA illustrate example user interfaces and user interactions for controlling audio output settings for multiple wearable audio output devices using a single settings user interface. FIGS. 25A-25G illustrate example user interactions for controlling audio outputs from a wearable audio output device and example audio and visual alerts responsive to such user interactions. The user interfaces and user interactions in FIGS. 5A-5V, 6A-6O, 7A-7Q, 8A-8J, 9A-9C, 13A-13D, 14A-14Z, 15A-15E, 16A-16G, 17A-17J, 21A-21J, 22A-22D, 23A-23AA, and 25A-25G are used to illustrate the processes in FIGS. 10A-10H, 11A-11D, 12A-12E, 18A-18H, 19A-19C, 20A-20B, 24A-24D, and 26A-26D.

Example Devices

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first audio output could be termed a second audio output, and, similarly, a second audio output could be termed a first audio output, without departing from the scope of the various described embodiments. The first audio output and the second audio output are both audio outputs, but they are not the same audio output, unless the context clearly indicates otherwise.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of computer systems that include or are in communication with wearable audio output devices, user interfaces for such systems, and associated processes for using such systems and devices are described. In some embodiments, the computer system includes a portable communications device, such as a mobile telephone, that also contains other functions, such as PDA and/or music player functions. Example embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch-screen displays and/or touchpads), are, optionally, used. It should also be understood that, in some embodiments, the computer system includes not a portable communications device, but a desktop computer with a touch-sensitive surface (e.g., a touch-screen display and/or a touchpad).

In the discussion that follows, a computer system that includes an electronic device with a display device and a touch-sensitive surface is described. It should be understood, however, that the computer system optionally includes one or more other physical user-interface devices, such as a physical keyboard, a mouse and/or a joystick.

The computer system typically supports a variety of applications, such as one or more of the following: a note taking application, a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the computer system optionally use at least one common physical user-interface device, such as the touch-sensitive surface. One or more functions of the touch-sensitive surface as well as corresponding information displayed on the computer system are, optionally, adjusted and/or varied from one application to the next and/or within a respective application. In this way, a common physical architecture (such as the touch-sensitive surface) of the computer system optionally supports the variety of applications with user interfaces that are intuitive and transparent to the user.

Figure 1A:
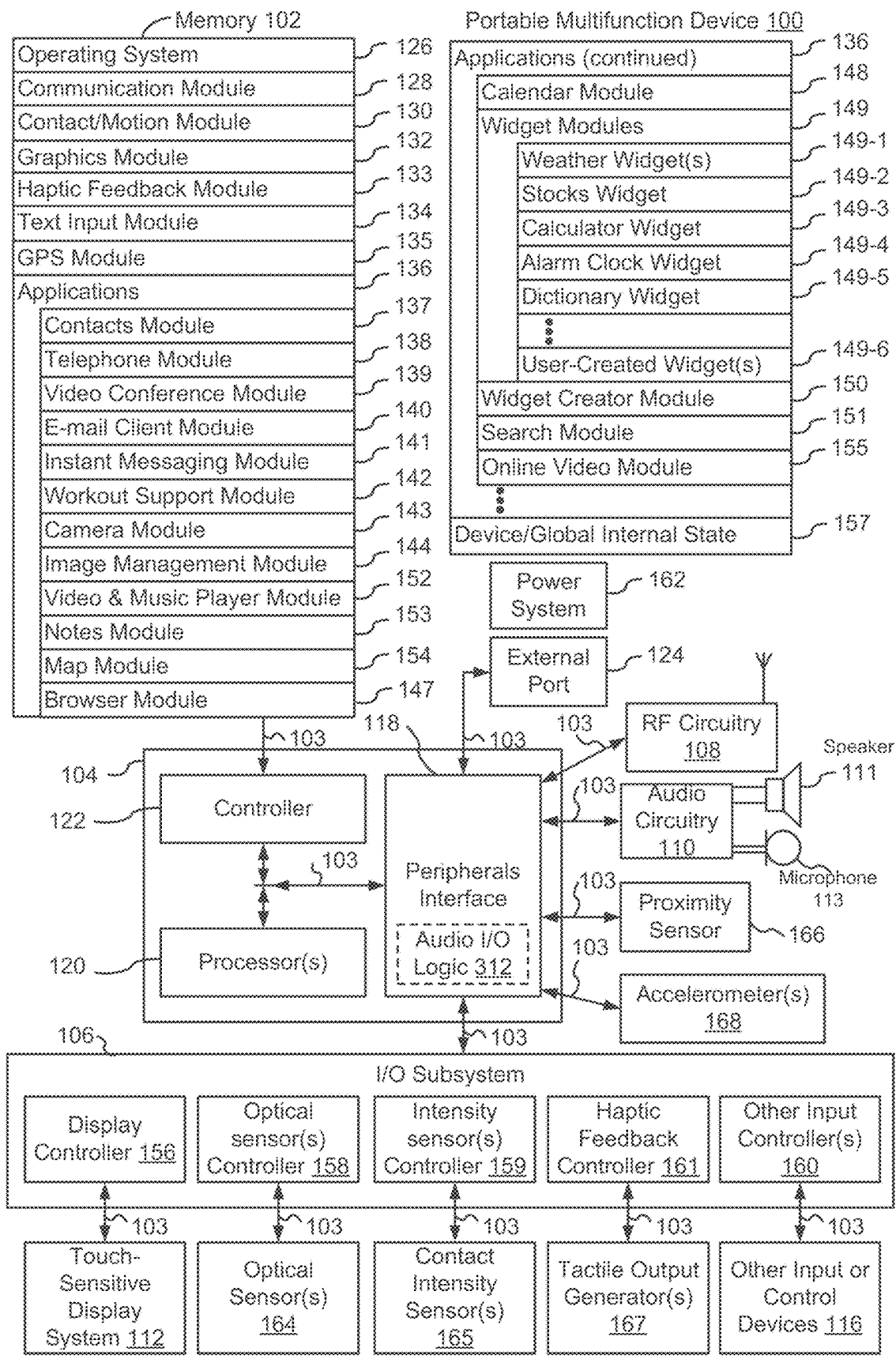
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display system 112 is sometimes called a "touch screen" for convenience, and is sometimes simply called a touch-sensitive display. Device 100 includes memory 102 (which optionally includes one or more computer readable storage mediums), memory controller 122, one or more processing units (CPUs) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensities of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user. Using tactile outputs to provide haptic feedback to a user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, a tactile output pattern specifies characteristics of a tactile output, such as the amplitude of the tactile output, the shape of a movement waveform of the tactile output, the frequency of the tactile output, and/or the duration of the tactile output.

When tactile outputs with different tactile output patterns are generated by a device (e.g., via one or more tactile output generators that move a moveable mass to generate tactile outputs), the tactile outputs may invoke different haptic sensations in a user holding or touching the device. While the sensation of the user is based on the user's perception of the tactile output, most users will be able to identify changes in waveform, frequency, and amplitude of tactile outputs generated by the device. Thus, the waveform, frequency and amplitude can be adjusted to indicate to the user that different operations have been performed. As such, tactile outputs with tactile output patterns that are designed, selected, and/or engineered to simulate characteristics (e.g., size, material, weight, stiffness, smoothness, etc.); behaviors (e.g., oscillation, displacement, acceleration, rotation, expansion, etc.); and/or interactions (e.g., collision, adhesion, repulsion, attraction, friction, etc.) of objects in a given environment (e.g., a user interface that includes graphical features and objects, a simulated physical environment with virtual boundaries and virtual objects, a real physical environment with physical boundaries and physical objects, and/or a combination of any of the above) will, in some circumstances, provide helpful feedback to users that reduces input errors and increases the efficiency of the user's operation of the device. Additionally, tactile outputs are, optionally, generated to correspond to feedback that is unrelated to a simulated physical characteristic, such as an input threshold or a selection of an object. Such tactile outputs will, in some circumstances, provide helpful feedback to users that reduces input errors and increases the efficiency of the user's operation of the device.

In some embodiments, a tactile output with a suitable tactile output pattern serves as a cue for the occurrence of an event of interest in a user interface or behind the scenes in a device. Examples of the events of interest include activation of an affordance (e.g., a real or virtual button, or toggle switch) provided on the device or in a user interface, success or failure of a requested operation, reaching or crossing a boundary in a user interface, entry into a new state, switching of input focus between objects, activation of a new mode, reaching or crossing an input threshold, detection or recognition of a type of input or gesture, etc. In some embodiments, tactile outputs are provided to serve as a warning or an alert for an impending event or outcome that would occur unless a redirection or interruption input is timely detected. Tactile outputs are also used in other contexts to enrich the user experience, improve the accessibility of the device to users with visual or motor difficulties or other accessibility needs, and/or improve efficiency and functionality of the user interface and/or the device. Tactile outputs are optionally accompanied with audio outputs and/or visible user interface changes, which further enhance a user's experience when the user interacts with a user interface and/or the device, and facilitate better conveyance of information regarding the state of the user interface and/or the device, and which reduce input errors and increase the efficiency of the user's operation of the device.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, firmware, or a combination thereof, including one or more signal processing and/or application specific integrated circuits.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU(s) 120 and the peripherals interface 118, is, optionally, controlled by memory controller 122.

Peripherals interface 118 can be used to couple input and output peripherals of the device to CPU(s) 120 and memory 102. The one or more processors 120 run or execute various software programs and/or sets of instructions stored in memory 102 to perform various functions for device 100 and to process data.

In some embodiments, peripherals interface 118, CPU(s) 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch-sensitive display system 112 and other input or control devices 116, with peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input or control devices 116. The other input or control devices 116 optionally include physical buttons (e.g., push buttons, rocker buttons, etc.), dials, slider switches, joysticks, click wheels, and so forth. In some alternate embodiments, input controller(s) 160 are, optionally, coupled with any (or none) of the following: a keyboard, infrared port, USB port, stylus, and/or a pointer device such as a mouse. The one or more buttons (e.g., 208, FIG. 2) optionally include an up/down button (e.g., or an up button and a separate down button) for volume control of speaker 111 and/or microphone 113. The one or more buttons optionally include a push button (e.g., 206, FIG. 2).

Touch-sensitive display system 112 provides an input interface and an output interface between the device and a user. Display controller 156 receives and/or sends electrical signals from/to touch-sensitive display system 112. In some embodiments, touch-sensitive display system 112 or display controller 156, or a combination of touch-sensitive display 112 and display controller 156, are referred to as a display generation component of device 100. Touch-sensitive display system 112 displays visual output to the user. The visual output optionally includes graphics, text, icons, video, and any combination thereof (collectively termed "graphics"). In some embodiments, some or all of the visual output corresponds to user interface objects. As used herein, the term "affordance" refers to a user-interactive graphical user interface object (e.g., a graphical user interface object that is configured to respond to inputs directed toward the graphical user interface object). Examples of user-interactive graphical user interface objects include, without limitation, a button, slider, icon, selectable menu item, switch, hyperlink, or other user interface control.

Touch-sensitive display system 112 has a touch-sensitive surface, sensor or set of sensors that accepts input from the user based on haptic and/or tactile contact. Touch-sensitive display system 112 and display controller 156 (along with any associated modules and/or sets of instructions in memory 102) detect contact (and any movement or breaking of the contact) on touch-sensitive display system 112 and converts the detected contact into interaction with user-interface objects (e.g., one or more soft keys, icons, web pages or images) that are displayed on touch-sensitive display system 112. In some embodiments, a point of contact between touch-sensitive display system 112 and the user corresponds to a finger of the user or a stylus.

Touch-sensitive display system 112 optionally uses LCD (liquid crystal display) technology, LPD (light emitting polymer display) technology, or LED (light emitting diode) technology, although other display technologies are used in other embodiments. Touch-sensitive display system 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch-sensitive display system 112. In some embodiments, projected mutual capacitance sensing technology is used, such as that found in the iPhone®, iPod Touch®, and iPad® from Apple Inc. of Cupertino, Calif.

Touch-sensitive display system 112 optionally has a video resolution in excess of 100 dpi. In some embodiments, the touch screen video resolution is in excess of 400 dpi (e.g., 500 dpi, 800 dpi, or greater). The user optionally makes contact with touch-sensitive display system 112 using any suitable object or appendage, such as a stylus, a finger, and so forth. In some embodiments, the user interface is designed to work with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch-sensitive display system 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled with optical sensor controller 158 in I/O subsystem 106. Optical sensor(s) 164 optionally include charge-coupled device (CCD) or complementary metal-oxide semiconductor (CMOS) phototransistors. Optical sensor(s) 164 receive light from the environment, projected through one or more lens, and converts the light to data representing an image. In conjunction with imaging module 143 (also called a camera module), optical sensor(s) 164 optionally capture still images and/or video. In some embodiments, an optical sensor is located on the back of device 100, opposite touch-sensitive display system 112 on the front of the device, so that the touch screen is enabled for use as a viewfinder for still and/or video image acquisition. In some embodiments, another optical sensor is located on the front of the device so that the user's image is obtained (e.g., for selfies, for videoconferencing while the user views the other video conference participants on the touch screen, etc.).

Device 100 optionally also includes one or more contact intensity sensors 165. FIG. 1A shows a contact intensity sensor coupled with intensity sensor controller 159 in I/O subsystem 106. Contact intensity sensor(s) 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor(s) 165 receive contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch-screen display system 112 which is located on the front of device 100.

Device 100 optionally also includes one or more proximity sensors 166. FIG. 1A shows proximity sensor 166 coupled with peripherals interface 118. Alternately, proximity sensor 166 is coupled with input controller 160 in I/O subsystem 106. In some embodiments, the proximity sensor turns off and disables touch-sensitive display system 112 when the multifunction device is placed near the user's ear (e.g., when the user is making a phone call).

Device 100 optionally also includes one or more tactile output generators 167. FIG. 1A shows a tactile output generator coupled with haptic feedback controller 161 in I/O subsystem 106. In some embodiments, tactile output generator(s) 167 include one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Tactile output generator(s) 167 receive tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch-sensitive display system 112, which is located on the front of device 100.

Device 100 optionally also includes one or more accelerometers 168. FIG. 1A shows accelerometer 168 coupled with peripherals interface 118. Alternately, accelerometer 168 is, optionally, coupled with an input controller 160 in I/O subsystem 106. In some embodiments, information is displayed on the touch-screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

In some embodiments, the software components stored in memory 102 include operating system 126, communication module (or set of instructions) 128, contact/motion module (or set of instructions) 130, graphics module (or set of instructions) 132, haptic feedback module (or set of instructions) 133, text input module (or set of instructions) 134, Global Positioning System (GPS) module (or set of instructions) 135, and applications (or sets of instructions) 136. Furthermore, in some embodiments, memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch-sensitive display system 112; sensor state, including information obtained from the device's various sensors and other input or control devices 116; and location and/or positional information concerning the device's location and/or attitude.

Operating system 126 (e.g., iOS, Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used in some iPhone®, iPod Touch®, and iPad® devices from Apple Inc. of Cupertino, Calif. In some embodiments, the external port is a Lightning connector that is the same as, or similar to and/or compatible with the Lightning connector used in some iPhone®, iPod Touch®, and iPad® devices from Apple Inc. of Cupertino, Calif.

Contact/motion module 130 optionally detects contact with touch-sensitive display system 112 (in conjunction with display controller 156) and other touch-sensitive devices (e.g., a touchpad or physical click wheel). Contact/motion module 130 includes various software components for performing various operations related to detection of contact (e.g., by a finger or by a stylus), such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts or stylus contacts) or to multiple simultaneous contacts (e.g., "multitouch"/multiple finger contacts). In some embodiments, contact/motion module 130 and display controller 156 detect contact on a touchpad.

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event. Similarly, tap, swipe, drag, and other gestures are optionally detected for a stylus by detecting a particular contact pattern for the stylus.

In some embodiments, detecting a finger tap gesture depends on the length of time between detecting the finger-down event and the finger-up event, but is independent of the intensity of the finger contact between detecting the finger-down event and the finger-up event. In some embodiments, a tap gesture is detected in accordance with a determination that the length of time between the finger-down event and the finger-up event is less than a predetermined value (e.g., less than 0.1, 0.2, 0.3, 0.4 or 0.5 seconds), independent of whether the intensity of the finger contact during the tap meets a given intensity threshold (greater than a nominal contact-detection intensity threshold), such as a light press or deep press intensity threshold. Thus, a finger tap gesture can satisfy particular input criteria that do not require that the characteristic intensity of a contact satisfy a given intensity threshold in order for the particular input criteria to be met. For clarity, the finger contact in a tap gesture typically needs to satisfy a nominal contact-detection intensity threshold, below which the contact is not detected, in order for the finger-down event to be detected. A similar analysis applies to detecting a tap gesture by a stylus or other contact. In cases where the device is capable of detecting a finger or stylus contact hovering over a touch sensitive surface, the nominal contact-detection intensity threshold optionally does not correspond to physical contact between the finger or stylus and the touch sensitive surface.

The same concepts apply in an analogous manner to other types of gestures. For example, a swipe gesture, a pinch gesture, a depinch gesture, and/or a long press gesture are optionally detected based on the satisfaction of criteria that are either independent of intensities of contacts included in the gesture, or do not require that contact(s) that perform the gesture reach intensity thresholds in order to be recognized. For example, a swipe gesture is detected based on an amount of movement of one or more contacts; a pinch gesture is detected based on movement of two or more contacts towards each other; a depinch gesture is detected based on movement of two or more contacts away from each other; and a long press gesture is detected based on a duration of the contact on the touch-sensitive surface with less than a threshold amount of movement. As such, the statement that particular gesture recognition criteria do not require that the intensity of the contact(s) meet a respective intensity threshold in order for the particular gesture recognition criteria to be met means that the particular gesture recognition criteria are capable of being satisfied if the contact(s) in the gesture do not reach the respective intensity threshold, and are also capable of being satisfied in circumstances where one or more of the contacts in the gesture do reach or exceed the respective intensity threshold. In some embodiments, a tap gesture is detected based on a determination that the finger-down and finger-up event are detected within a predefined time period, without regard to whether the contact is above or below the respective intensity threshold during the predefined time period, and a swipe gesture is detected based on a determination that the contact movement is greater than a predefined magnitude, even if the contact is above the respective intensity threshold at the end of the contact movement. Even in implementations where detection of a gesture is influenced by the intensity of contacts performing the gesture (e.g., the device detects a long press more quickly when the intensity of the contact is above an intensity threshold or delays detection of a tap input when the intensity of the contact is higher), the detection of those gestures does not require that the contacts reach a particular intensity threshold so long as the criteria for recognizing the gesture can be met in circumstances where the contact does not reach the particular intensity threshold (e.g., even if the amount of time that it takes to recognize the gesture changes).

Contact intensity thresholds, duration thresholds, and movement thresholds are, in some circumstances, combined in a variety of different combinations in order to create heuristics for distinguishing two or more different gestures directed to the same input element or region so that multiple different interactions with the same input element are enabled to provide a richer set of user interactions and responses. The statement that a particular set of gesture recognition criteria do not require that the intensity of the contact(s) meet a respective intensity threshold in order for the particular gesture recognition criteria to be met does not preclude the concurrent evaluation of other intensity-dependent gesture recognition criteria to identify other gestures that do have a criteria that is met when a gesture includes a contact with an intensity above the respective intensity threshold. For example, in some circumstances, first gesture recognition criteria for a first gesture—which do not require that the intensity of the contact(s) meet a respective intensity threshold in order for the first gesture recognition criteria to be met—are in competition with second gesture recognition criteria for a second gesture—which are dependent on the contact(s) reaching the respective intensity threshold. In such competitions, the gesture is, optionally, not recognized as meeting the first gesture recognition criteria for the first gesture if the second gesture recognition criteria for the second gesture are met first. For example, if a contact reaches the respective intensity threshold before the contact moves by a predefined amount of movement, a deep press gesture is detected rather than a swipe gesture. Conversely, if the contact moves by the predefined amount of movement before the contact reaches the respective intensity threshold, a swipe gesture is detected rather than a deep press gesture. Even in such circumstances, the first gesture recognition criteria for the first gesture still do not require that the intensity of the contact(s) meet a respective intensity threshold in order for the first gesture recognition criteria to be met because if the contact stayed below the respective intensity threshold until an end of the gesture (e.g., a swipe gesture with a contact that does not increase to an intensity above the respective intensity threshold), the gesture would have been recognized by the first gesture recognition criteria as a swipe gesture. As such, particular gesture recognition criteria that do not require that the intensity of the contact(s) meet a respective intensity threshold in order for the particular gesture recognition criteria to be met will (A) in some circumstances ignore the intensity of the contact with respect to the intensity threshold (e.g. for a tap gesture) and/or (B) in some circumstances still be dependent on the intensity of the contact with respect to the intensity threshold in the sense that the particular gesture recognition criteria (e.g., for a long press gesture) will fail if a competing set of intensity-dependent gesture recognition criteria (e.g., for a deep press gesture) recognize an input as corresponding to an intensity-dependent gesture before the particular gesture recognition criteria recognize a gesture corresponding to the input (e.g., for a long press gesture that is competing with a deep press gesture for recognition).

Graphics module 132 includes various known software components for rendering and displaying graphics on touch-sensitive display system 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions (e.g., instructions used by haptic feedback controller 161) to produce tactile outputs using tactile output generator(s) 167 at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the computer system and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 optionally include the following modules (or sets of instructions), or a subset or superset thereof:
- contacts module 137 (sometimes called an address book or contact list);
- telephone module 138;
- video conferencing module 139;
- e-mail client module 140;
- instant messaging (IM) module 141;
- workout support module 142;
- camera module 143 for still and/or video images;
- image management module 144;
- browser module 147;
- calendar module 148;
- widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;

widget creator module 150 for making user-created widgets 149-6;

search module 151;

video and music player module 152, which is, optionally, made up of a video player module and a music player module;

notes module 153;

map module 154; and/or online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch-sensitive display system 112, display controller 156, contact module 130, graphics module 132, and text input module 134, contacts module 137 includes executable instructions to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers and/or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch-sensitive display system 112, display controller 156, contact module 130, graphics module 132, and text input module 134, telephone module 138 includes executable instructions to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch-sensitive display system 112, display controller 156, optical sensor(s) 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch-sensitive display system 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch-sensitive display system 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, Apple Push Notification Service (APNs) or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, APNs, or IMPS).

In conjunction with RF circuitry 108, touch-sensitive display system 112, display controller 156, contact module 130, graphics module 132, text input module 134, GPS module 135, map module 154, and video and music player module 152, workout support module 142 includes executable instructions to create workouts (e.g., with time, distance, and/or calorie burning goals); communicate with workout sensors (in sports devices and smart watches); receive workout sensor data; calibrate sensors used to monitor a workout; select and play music for a workout; and display, store and transmit workout data.

In conjunction with touch-sensitive display system 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, and/or delete a still image or video from memory 102.

In conjunction with touch-sensitive display system 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch-sensitive display system 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch-sensitive display system 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch-sensitive display system 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch-sensitive display system 112, display system controller 156, contact module 130, graphics module 132, text input module 134, and browser module 147, the widget creator module 150 includes executable instructions to create widgets (e.g., turning a user-specified portion of a web page into a widget).

In conjunction with touch-sensitive display system 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch-sensitive display system 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch-sensitive display system 112, or on an external display connected wirelessly or via external port 124). In some embodiments, device 100 optionally includes the functionality of an MP3 player, such as an iPod (trademark of Apple Inc.).

In conjunction with touch-sensitive display system 112, display controller 156, contact module 130, graphics module 132, and text input module 134, notes module 153 includes executable instructions to create and manage notes, to do lists, and the like in accordance with user instructions.

In conjunction with RF circuitry 108, touch-sensitive display system 112, display system controller 156, contact module 130, graphics module 132, text input module 134, GPS module 135, and browser module 147, map module 154 includes executable instructions to receive, display, modify, and store maps and data associated with maps (e.g., driving directions; data on stores and other points of interest at or near a particular location; and other location-based data) in accordance with user instructions.

In conjunction with touch-sensitive display system 112, display system controller 156, contact module 130, graphics module 132, audio circuitry 110, speaker 111, RF circuitry 108, text input module 134, e-mail client module 140, and browser module 147, online video module 155 includes executable instructions that allow the user to access, browse, receive (e.g., by streaming and/or download), play back (e.g., on the touch screen 112, or on an external display connected wirelessly or via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (e.g., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
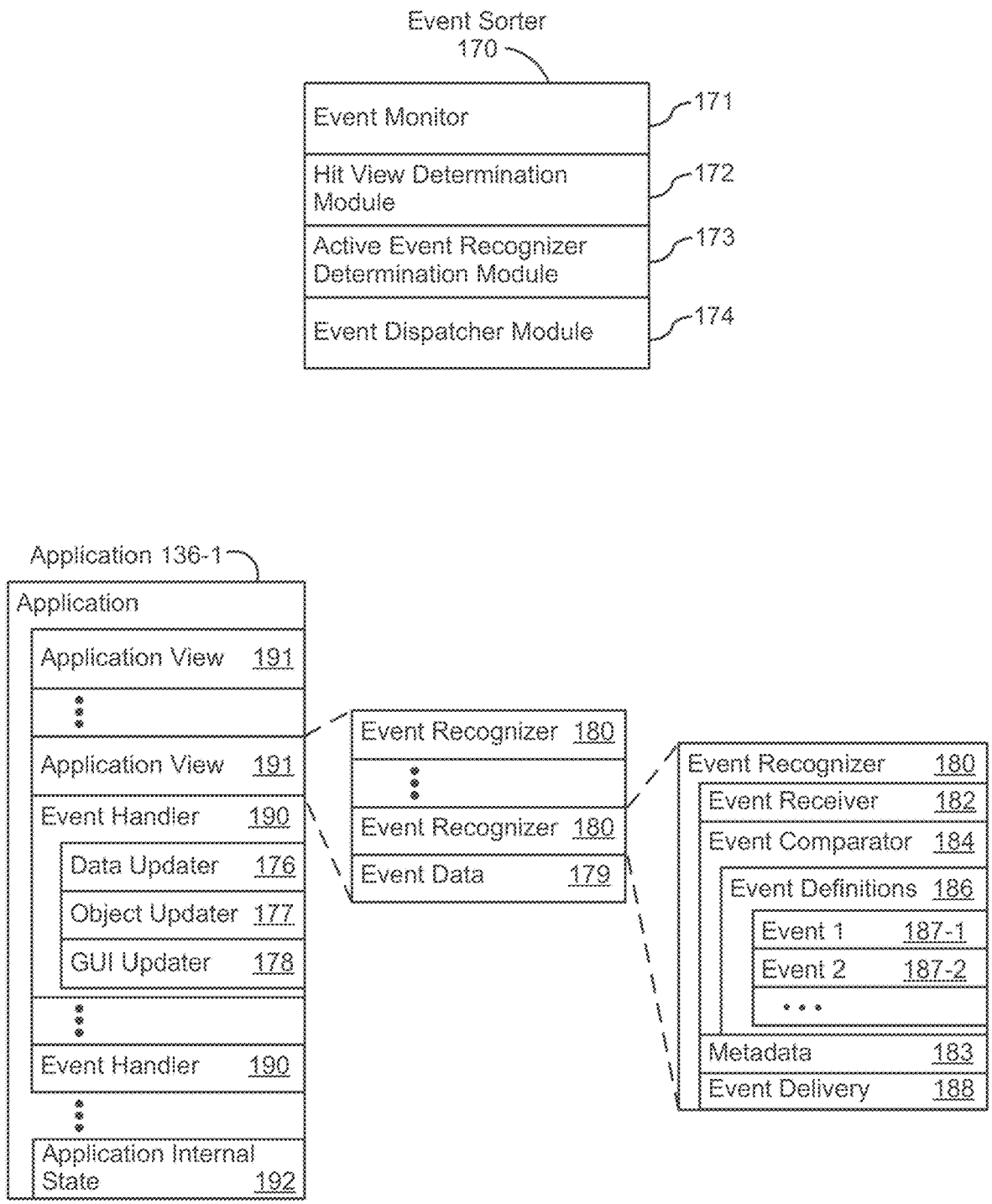
FIG. 1B is a block diagram illustrating example components for event handling in accordance with some embodiments.

FIG. 1B is a block diagram illustrating example components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 136, 137-155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display system 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display system 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display system 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch-sensitive display system 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display system 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display system 112, when a touch is detected on touch-sensitive display system 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video and music player module 152. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

Figure 2:
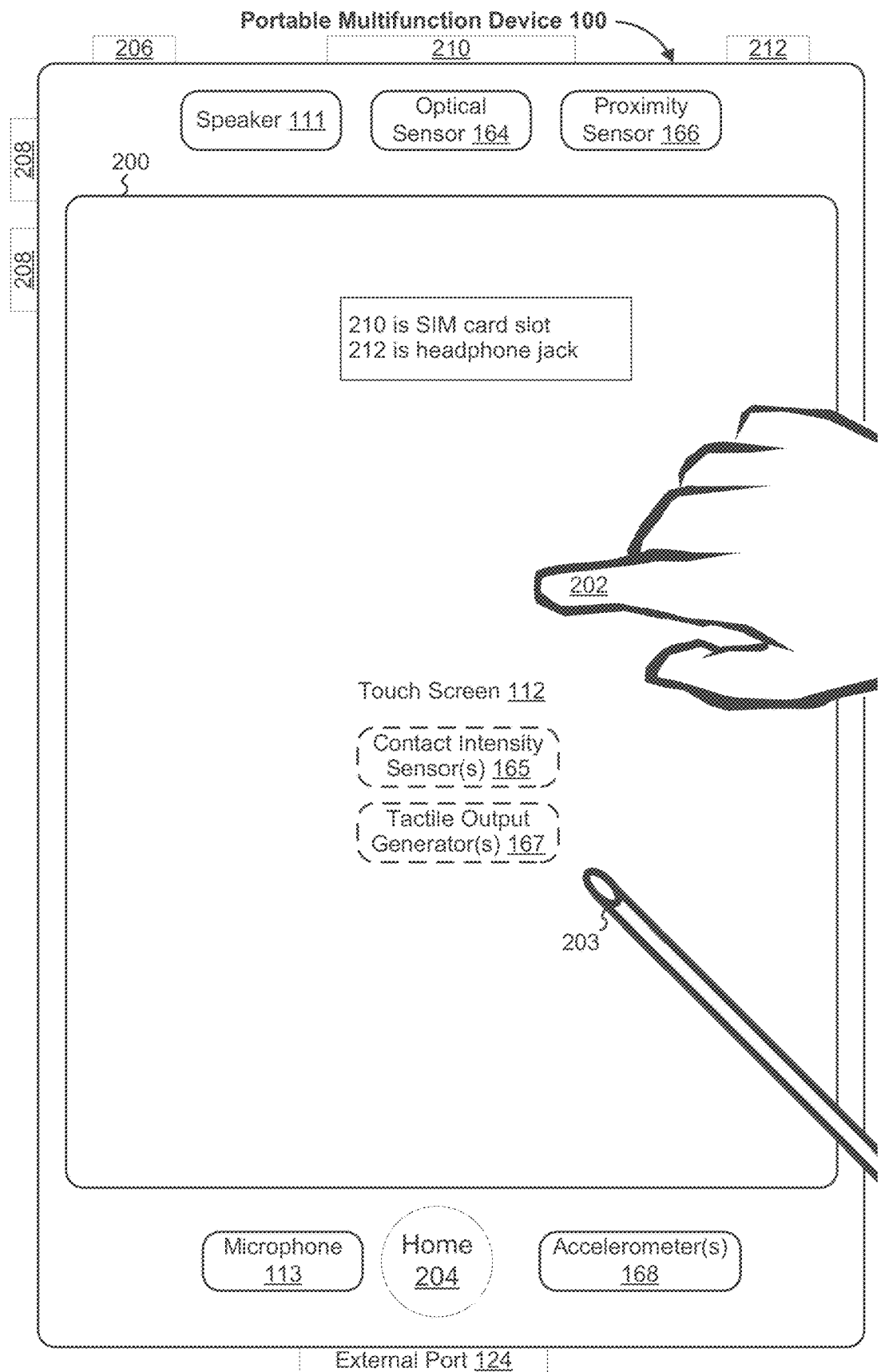
FIG. 2 illustrates a portable multifunction device having a touch screen in accordance with some embodiments.

FIG. 2 illustrates a portable multifunction device 100 having a touch screen (e.g., touch-sensitive display system 112, FIG. 1A) in accordance with some embodiments. The touch screen optionally displays one or more graphics within user interface (UI) 200. In these embodiments, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on the touch-screen display.

In some embodiments, device 100 includes the touch-screen display, menu button 204 (sometimes called home button 204), push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In some embodiments, device 100 also accepts verbal input for activation or deactivation of some functions through microphone 113. Device 100 also, optionally, includes one or more contact intensity sensors 165 for detecting intensities of contacts on touch-sensitive display system 112 and/or one or more tactile output generators 167 for generating tactile outputs for a user of device 100.

Figure 3A:
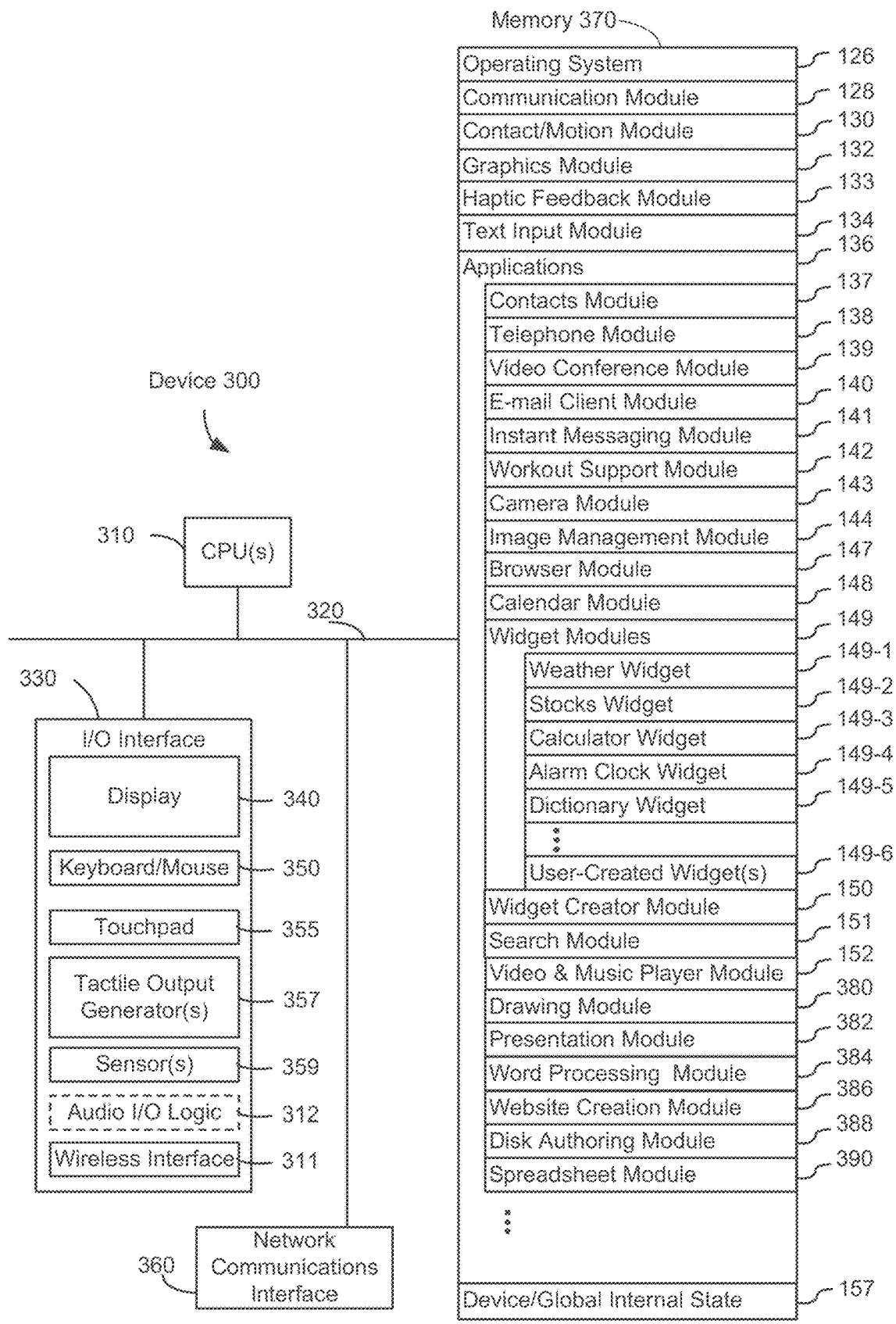
FIG. 3A is a block diagram of an example multifunction device with a display and a touch-sensitive surface in accordance with some embodiments.
Figure 4A:
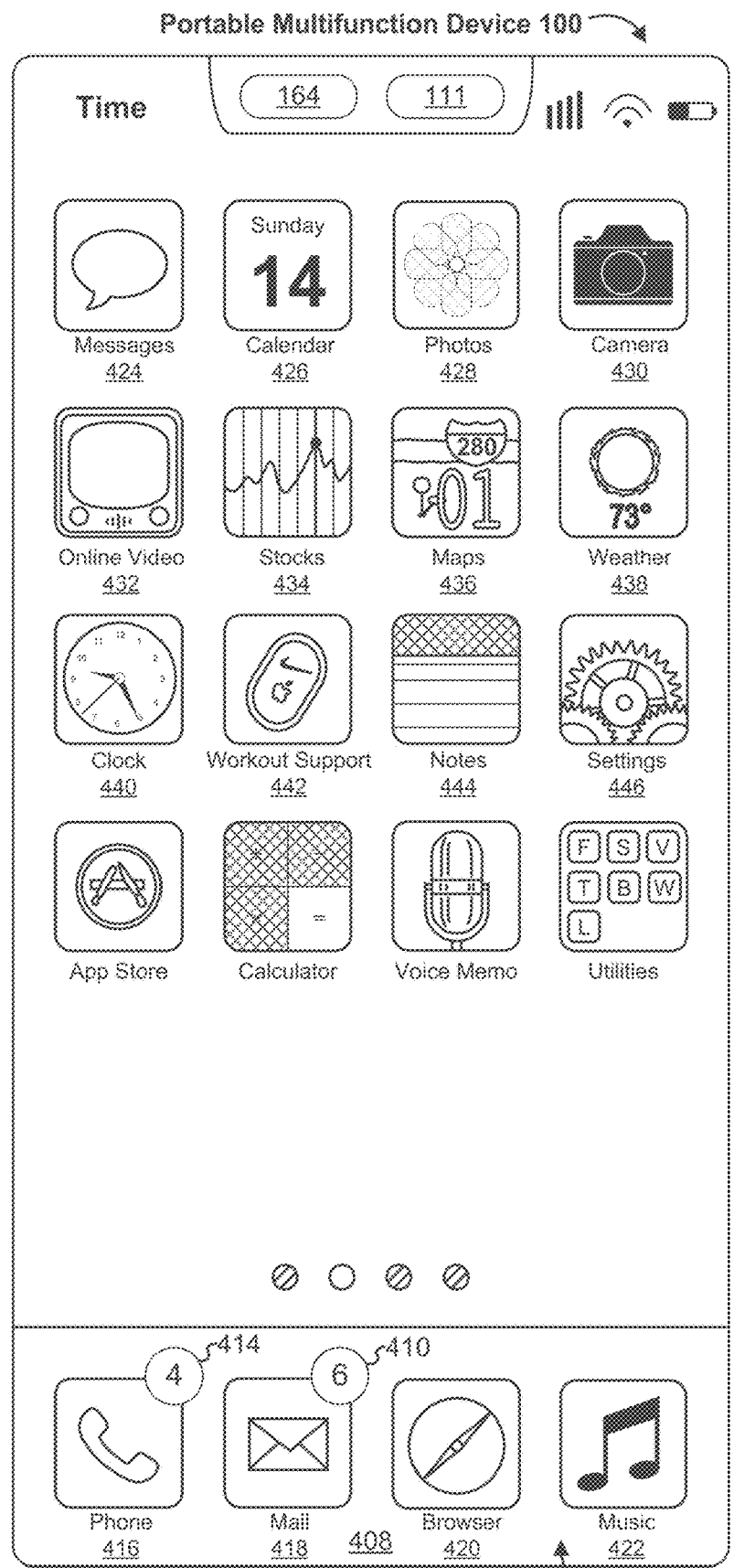
FIG. 4A illustrates an example user interface for a menu of applications on a portable multifunction device in accordance with some embodiments.

FIG. 3A is a block diagram of an example multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch-screen display. In some embodiments, display 340 is referred to as a display generation component. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). In some embodiments, device 300 includes a wireless interface 311 for communication with one or more wearable audio output devices 301.

Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above identified elements in FIG. 3A are, optionally, stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Figure 3B:
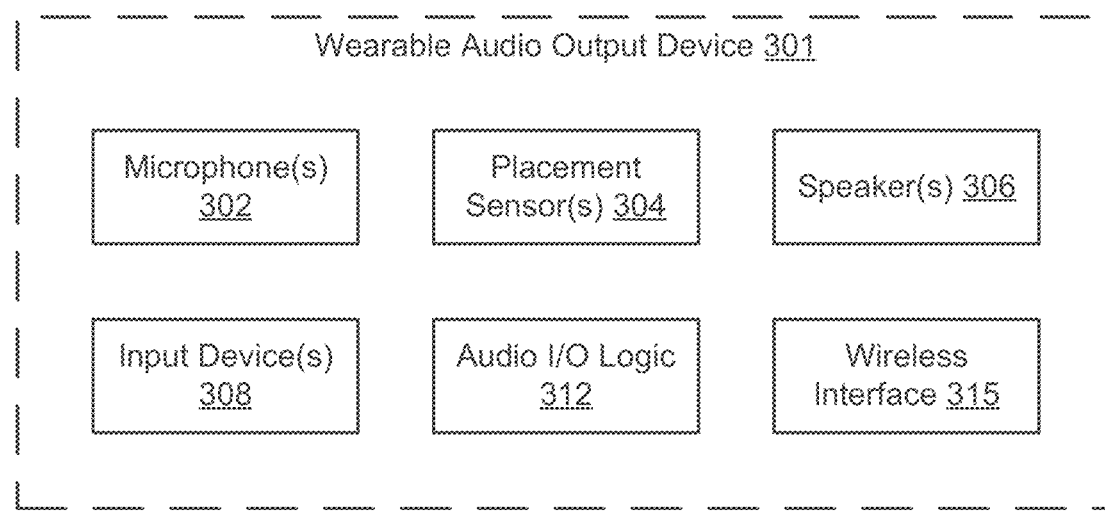
FIG. 3B is a block diagram of an example wearable audio output device in accordance with some embodiments.

FIG. 3B is a block diagram of an example wearable audio output device 301 in accordance with some embodiments. In some embodiments, wearable audio output device 301 is one or more in-ear earphone(s), earbud(s), over-ear headphone(s), or the like. In some examples, wearable audio output device 301 is a single earphone or earbud. In some examples, wearable audio output device 301 includes a pair of earphones or earbuds (e.g., one for each of a user's ears). In some examples, wearable audio output device 301 includes over-ear headphones (e.g., headphones with two over-ear earcups to be placed over a user's ears and optionally connected by a headband). In some embodiments, wearable audio output device 301 includes one or more speakers 306 for providing audio output (e.g., to a user's ear). In some embodiments, wearable audio output device 301 includes one or more placement sensors 304 to detect positioning or placement of wearable audio output device 301 relative to a user's ear, such as to detect placement of wearable audio output device 301 in a user's ear. In some embodiments, wearable audio output device 301 conditionally outputs audio based on whether wearable audio output device 301 is in or near a user's ear (e.g., wearable audio output device 301 forgoes outputting audio when not in a user's ear, so as to reduce power usage). In some embodiments where wearable audio output device 301 includes multiple (e.g., a pair) of wearable audio output components (e.g., earphones, earbuds, or earcups), each component includes one or more respective placement sensors, and wearable audio output device 301 conditionally outputs audio based on whether one or both components is in or near a user's ear, as described herein. In some embodiments, wearable audio output device 301 includes audio I/O logic 312, which determines the positioning or placement of wearable audio output device 301 relative to a user's ear based on information received from placement sensor(s) 304, and, in some embodiments, audio I/O logic 312 controls the resulting conditional outputting of audio. In some embodiments, wearable audio output device 301 includes a wireless interface 315 for communication with a multifunction device, such as device 100 (FIG. 1A) or device 300 (FIG. 3A). In some embodiments, interface 315 is a wired interface for connection with a multifunction device, such as device 100 (FIG. 1A) or device 300 (FIG. 3A) (e.g., via a headphone jack or other audio port). In some embodiments, a user can interact with and provide inputs (e.g., remotely) to wearable audio output device 301 via interface 315.

In some embodiments, wearable audio output device 301 includes one or more microphones 302 for receiving audio input. In some embodiments, microphone(s) 302 detect speech from a user wearing wearable audio output device 301 and/or ambient noise around wearable audio output device 301. In some embodiments, as described in more detail herein with reference to FIG. 3C, multiple microphones of microphones 302 are positioned at different locations on wearable audio output device 301 to measure speech and/or ambient noise at different locations around wearable audio output device 301. In some embodiments where wearable audio output device 301 includes multiple (e.g., a pair) of wearable audio output components (e.g., earphones or earbuds), each component includes one or more respective microphones. In some embodiments, audio I/O logic 312 detects or recognizes speech or ambient noise based on information received from microphone(s) 302.

Figure 3C:
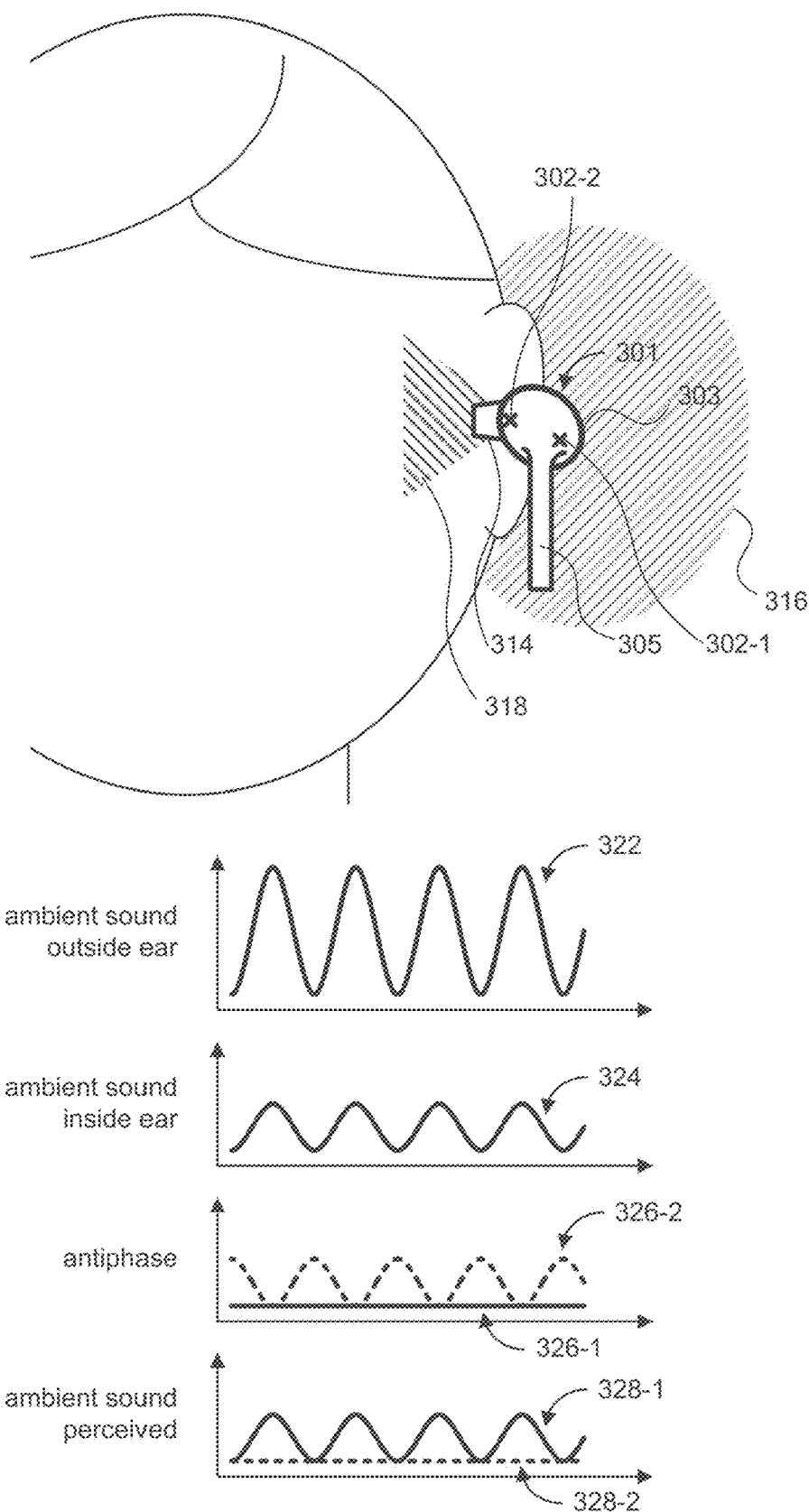

In some embodiments, wearable audio output device 301 includes one or more input devices 308. In some embodiments where wearable audio output device 301 includes multiple (e.g., a pair) of wearable audio output components (e.g., earphones, earbuds, or earcups), each component includes one or more respective input devices. In some embodiments, input device(s) 308 includes a pressure-sensitive (e.g., intensity-sensitive) input device, which in some embodiments is located within a portion of wearable audio output device 301, sometimes called a "stem," that physically extends from a portion of wearable audio output device 301 that is configured to be inserted in a user's ear (e.g., stem 305 as shown in FIG. 3C). In some embodiments, the pressure-sensitive input device detects inputs from a user in response to the user squeezing the input device (e.g., by pinching the stem of wearable audio output device 301 between two fingers). In some embodiments, input device(s) 308 include a touch-sensitive surface (for detecting touch inputs), accelerometer(s) and/or attitude sensor(s) (for determining an attitude of wearable audio output device 301 relative to a physical environment and/or changes in attitude of the device, and/or other input device by which a user can interact with and provide inputs to wearable audio output device 301. In some embodiments, input device(s) 308 include one or more volume control hardware elements (e.g., an up/down button for volume control, or an up button and a separate down button, as described herein with reference to FIG. 1A) for volume control (e.g., locally) of wearable audio output device 301. In some embodiments, inputs provided via input device(s) 308 are processed by audio I/O logic 312. In some embodiments, audio I/O logic 312 is in communication with a separate device (e.g., device 100, FIG. 1A, or device 300, FIG. 3A) that provides instructions or content for audio output, and that optionally receives and processes inputs (or information about inputs) provided via microphone(s) 302, placement sensor(s) 304, and/or input device(s) 308, or via one or more input devices of the separate device. In some embodiments, audio I/O logic 312 is located in device 100 (e.g., as part of peripherals interface 118, FIG. 1A) or device 300 (e.g., as part of I/O interface 330, FIG. 3A), instead of device 301, or alternatively is located in part in device 100 and in part in device 301, or in part in device 300 and in part in device 301.

FIG. 3C illustrates example audio control by a wearable audio output device in accordance with some embodiments. In some embodiments, when a wearable audio output device having earbuds to which interchangeable eartips may be attached are worn in a user's ears, the earbuds and eartips together act as physical barriers that block at least some ambient sound from the surrounding physical environment from reaching the user's ear. For example, in FIG. 3C, wearable audio output device 301 is worn by a user such that earbud 303 and eartip 314 are in the user's left ear. Eartip 314 extends at least partially into the user's ear canal. Preferably, when earbud 303 and eartip 314 are inserted into the user's ear, a seal is formed between eartip 314 and the user's ear so as to isolate the user's ear canal from the surrounding physical environment. However, in some circumstances, earbud 303 and eartip 314 together block some, but not necessarily all, of the ambient sound in the surrounding physical environment from reaching the user's ear. Accordingly, in some embodiments, a first microphone (or, in some embodiments, a first set of one or more microphones) 302-1 (e.g., of microphones 302, FIG. 3B) is located on wearable audio output device 301 so as to detect ambient sound, represented by waveform 322, in region 316 of a physical environment surrounding (e.g., outside of) earbud 303. In some embodiments, a second microphone (or, in some embodiments, a second set of one or more microphones) 302-2 (e.g., of microphones 302, FIG. 3B) is located on wearable audio output device 301 so as to detect any ambient sound, represented by waveform 324, that is not completely blocked by earbud 303 and eartip 314 and that can be heard in region 318 inside the user's ear canal.

Accordingly, in some circumstances in which wearable audio output device 301 is not producing a noise-cancelling (also called "antiphase") audio signal to cancel (e.g., attenuate) ambient sound from the surrounding physical environment, as indicated by waveform 326-1, ambient sound waveform 324 is perceivable by the user, as indicated by waveform 328-1. In some circumstances in which wearable audio output device 301 is producing an antiphase audio signal to cancel ambient sound, as indicated by waveform 326-2, ambient sound waveform 324 is not perceivable by the user, as indicated by waveform 328-2.

In some embodiments, ambient sound waveform 322 is compared to attenuated ambient sound waveform 324 (e.g., by wearable audio output device 301 or a component of wearable audio output device 301, such as audio I/O logic 312, or by an electronic device that is in communication with wearable audio output device 301) to determine the passive attenuation provided by wearable audio output device 301. In some embodiments, the amount of passive attenuation provided by wearable audio output device 301 is taken into account when providing the antiphase audio signal to cancel ambient sound from the surrounding physical environment. For example, antiphase audio signal waveform 326-2 is configured to cancel attenuated ambient sound waveform 324 rather than unattenuated ambient sound waveform 322.

In some embodiments, wearable audio output device 301 is configured to operate in one of a plurality of available audio output modes, such as an active noise control audio output mode, an active pass-through audio output mode, and a bypass audio output mode (also sometimes called a noise control off audio output mode). In the active noise control mode (also called "ANC"), wearable audio output device 301 outputs one or more audio-cancelling audio components (e.g., one or more antiphase audio signals, also called "audio-cancellation audio components") to at least partially cancel ambient sound from the surrounding physical environment that would otherwise be perceivable to the user. In the active pass-through audio output mode, wearable audio output device 301 outputs one or more pass-through audio components (e.g., plays at least a portion of the ambient sound from outside the user's ear, received by microphone 302-1, for example) so that the user can hear a greater amount of ambient sound from the surrounding physical environment than would otherwise be perceivable to the user (e.g., a greater amount of ambient sound than would be audible with the passive attenuation of wearable audio output device 301 placed in the user's ear). In the bypass mode, active noise management is turned off, such that wearable audio output device 301 outputs neither any audio-cancelling audio components nor any pass-through audio components (e.g., such that any amount of ambient sound that the user perceives is due to physical attenuation by wearable audio output device 301). In some embodiments, in response to particular types of inputs, such as click-and-hold gestures, at stem 305 of the wearable audio output device 301, wearable audio output device 301 cycles through one or more of the above-discussed audio output modes, as described in further detail herein, for example with reference to FIGS. 8A-8J and 9A-9C.

FIG. 3D is similar to FIG. 3C, except that FIG. 3D illustrates wearable audio output device 301b as a set of headphones with over-ear earcups worn over a user's ear, rather than one or more earbuds worn in the user's ears. In the example in FIG. 3D, the earcups of wearable audio output device 301b, such as earcup 332 worn over the user's left ear (and typically a second earcup to be worn over the user's right ear), act as the physical barriers that block at least some ambient sound from the surrounding physical environment from reaching the user's ear. Microphones 302-1 and 302-2 located on earcup 332 detect, respectively, ambient sound in region 316 of the physical environment (represented by waveform 322) and ambient sound that is not completely blocked by earcup 332 (represented by waveform 324) and that can be heard in region 318 inside earcup 332, as described in more detail herein with reference to FIG. 3C. FIG. 3D also shows generated antiphase waveforms 326-1 and 326-2 and resulting perceived ambient sound waveforms 328-1 and 328-2, respectively, also as described in more detail herein with reference to FIG. 3C.

In addition, in the example in FIG. 3D, wearable audio output device 301b includes dial 334 and button 336 (e.g., as part of input device(s) 308, FIG. 3B). In some embodiments, rotation of dial 334 controls one or more aspects of audio output (e.g., cycles through a set of possible values for the aspect(s) of audio output), such as an audio output volume level or a degree of noise cancellation. For example, rotation of dial 334 controls audio output volume (e.g., rotation in one direction, such as clockwise, increases the volume, and rotation in the other direction, such as counterclockwise, decreases the volume). In some embodiments, dial 334 is configured to receive inputs other than rotational inputs. For example, dial 334 also is a push-button switch or includes a touch-sensitive and/or input intensity-sensitive surface, and is used by a user to provide touch, press, or click inputs to wearable audio output device 301b, as described in more detail herein with reference to FIGS. 25A-25D.

In some embodiments, button 336 is a push-button switch or includes a touch-sensitive and/or input intensity-sensitive surface, and controls a respective aspect of audio output (optionally, a different aspect from the one(s) controlled using dial 334). In some embodiments, pressing (or tapping, actuating, etc.) button 336 transitions wearable audio output device 301b between different audio output modes, as described in more detail herein with reference to FIG. 9C (e.g., a press input on button 336 on a set of over-ear headphones performs operations analogous to one or more of the operations described herein that are performed in response to detecting a click-and-hold gesture on a stem of an earbud).

Attention is now directed towards embodiments of user interfaces ("UI") that are, optionally, implemented on portable multifunction device 100.

FIG. 4A illustrates an example user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) for wireless communication(s), such as cellular and Wi-Fi signals;
Time;
a Bluetooth indicator;
a Battery status indicator;
Tray 408 with icons for frequently used applications, such as:
Icon 416 for telephone module 138, labeled "Phone," which optionally includes an indicator 414 of the number of missed calls or voicemail messages;
Icon 418 for e-mail client module 140, labeled "Mail," which optionally includes an indicator 410 of the number of unread e-mails;
Icon 420 for browser module 147, labeled "Browser;" and Icon 422 for video and music player module 152, labeled "Music;" and
Icons for other applications, such as:
Icon 424 for IM module 141, labeled "Messages;"
Icon 426 for calendar module 148, labeled "Calendar;"
Icon 428 for image management module 144, labeled "Photos;"
Icon 430 for camera module 143, labeled "Camera;"
Icon 432 for online video module 155, labeled "Online Video;"
Icon 434 for stocks widget 149-2, labeled "Stocks;"
Icon 436 for map module 154, labeled "Maps;"
Icon 438 for weather widget 149-1, labeled "Weather;"
Icon 440 for alarm clock widget 149-4, labeled "Clock;"
Icon 442 for workout support module 142, labeled "Workout Support;"
Icon 444 for notes module 153, labeled "Notes;" and
Icon 446 for a settings application or module, which provides access to settings for device 100 and its various applications 136.

It should be noted that the icon labels illustrated in FIG. 4A are merely examples. For example, other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an example user interface on a device (e.g., device 300, FIG. 3) with a touch-sensitive surface 451 (e.g., a tablet or touchpad 355, FIG. 3) that is separate from the display 450. Although in some examples, inputs may be received on touch screen display 112 (where the touch sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

User Interfaces and Associated Processes

Attention is now directed towards embodiments of user interfaces ("UI") and associated processes that may be implemented on a computer system (e.g., that includes an electronic device such as portable multifunction device 100, FIG. 1A, or device 300, FIG. 3A) with a display device (e.g., touch-sensitive display system 112, FIG. 1A, or display 340, FIG. 3A) and a touch-sensitive surface (e.g., touch-sensitive display system 112, FIG. 1A, or touchpad 355, FIG. 3A), and that includes or is in communication with one or more wearable audio output devices (e.g., one or more wearable audio output devices 301).

FIGS. 5A-5V illustrate example user interfaces for pairing and calibrating wearable audio output devices in accordance with some embodiments. FIGS. 6A-6O illustrate example user interfaces for alerting a user when earbuds no longer satisfy fit criteria during use in accordance with some embodiments. FIGS. 7A-7Q illustrate example user interfaces and user interactions for changing the audio output mode of a wearable audio output device in accordance with some embodiments. FIGS. 8A-8H illustrate example user interactions with wearable audio output devices to control audio outputs in accordance with some embodiments. FIGS. 9A-9C illustrate an example settings user interface for controlling various features associated with wearable audio output devices and examples of controlling audio output mode in accordance with some embodiments. FIGS. 13A-13D illustrate example user interfaces for pairing wearable audio output devices in accordance with some embodiments. FIGS. 14A-14Z illustrate example user interfaces and user interactions for changing the audio output mode of wearable audio output devices in accordance with some embodiments. FIGS. 15A-15E illustrate an example settings user interface for controlling various features associated with wearable audio output devices and examples of controlling audio output mode in accordance with some embodiments. FIGS. 16A-16G illustrate example user interfaces for calibrating and displaying information about acoustic seal quality of wearable audio output devices in accordance with some embodiments. FIGS. 17A-17J illustrate example user interfaces and user interactions for selecting an audio output device, such as a wearable audio output device, and changing the audio output mode of the selected audio output device via (e.g., using) a wearable electronic device in accordance with some embodiments. FIGS. 21A-21J illustrate example user interfaces and user interactions for changing the audio output mode of wearable audio output devices. FIGS. 22A-22D illustrate example user interfaces and user interactions for accessing a settings user interface for controlling various features associated with wearable audio output devices. FIGS. 23A-23AA illustrate example user interfaces and user interactions for controlling audio output settings for multiple wearable audio output devices using a single settings user interface. FIGS. 25A-25G illustrate example user interactions for controlling audio outputs from a wearable audio output device and example audio and visual alerts responsive to such user interactions. The user interfaces, inputs, and audio outputs in these figures are used to illustrate the processes described below, including the processes in FIGS. 10A-10H, 11A-11D, 12A-12E, 18A-18H, 19A-19C, 20A-20B, 24A-24D, and 26A-26D. For convenience of explanation, some of the embodiments will be discussed with reference to operations performed using a wearable audio output device that is worn by a user and that is in communication with and separate from a computer system having a touch-sensitive display system 112 or display 340 that is separate from a touch-sensitive input device such as touchpad 355. In some embodiments, the operations are performed in response to instructions received by the wearable audio output device from the electronic device, based on processing performed at the electronic device. In some embodiments, the operations are performed by the wearable audio output device based on processing performed at the wearable audio output device. However, in some cases, analogous operations are optionally performed using audio output devices that are part of a device having a display generation component and/or touch-sensitive input device (e.g., a wearable device, such as headphones or a headset, that integrates the one or more audio output devices with a display and/or touch-sensitive input device).

FIGS. 5A-5V illustrate example user interfaces for pairing and calibrating wearable audio output devices in accordance with some embodiments.

FIG. 5A illustrates an example user interface on display 112 of device 100. While displaying the user interface, device 100 periodically and repeatedly listens for wireless broadcast signals (e.g., pairing requests) from one or more peripherals (e.g., earbuds 502-1 and 502-2 as well as earbud case 502-3) to pair the peripheral(s) with device 100. In one embodiment, as illustrated throughout FIGS. 5A-5D, device 100 can detect pairing requests from peripherals when the peripheral is within threshold distance 508 of device 100 and cannot detect pairing requests from peripherals when the peripheral is outside of threshold distance 508. For example, at the bottom of FIG. 5A, FIG. 5A illustrates an example spatial relationship (e.g., physical distance) between device 100 and earbuds 502-1 and 502-2 as well as earbud case 502-3, where earbuds 502-1 and 502-2 as well as earbud case 502-3 are outside of threshold distance 508 of device 100. In contrast, FIG. 5B illustrates when earbud 502-1, earbud 502-2, and earbud case 502-3 (illustrated and hereinafter referred to collectively as earbud set 503) are within threshold distance 508 of device 100, where the device is capable of detecting pairing requests from the peripherals.

FIG. 5B illustrates an example user interface, displayed subsequent to the user interface in FIG. 5A, and in some embodiments in response to detecting movement of a peripheral (e.g., earbud 502-1) or set of peripherals (e.g., earbud set 503), from outside of threshold distance 508 to within threshold distance 508, for initiating pairing of device 100 with the peripheral (e.g. earbud 502-1) or set of peripherals (e.g., earbud set 503). In FIG. 5B, device 100 detects a pairing request from a peripheral (e.g., earbud 502-1, which is shown in FIG. 5A and part of earbud set 503 in FIG. 5B) within threshold distance 508. In some embodiments, in response to detecting the pairing request from earbud 502-1, device 100 determines whether earbud 502-1 meets coupling criteria. In the example shown in FIG. 5B, coupling criteria is met when an earbud (e.g., earbud 502-1) is placed within and/or is electrically coupled to an earbud case (e.g., earbud case 502-3) (e.g., to form earbud set 503). After device 100 determines that earbud 502-1 meets coupling criteria (e.g., in response to device 100 determining that earbud 502-1 meets the coupling criteria), device 100 displays window 520-1 overlaid on the user interface of FIG. 5A. Window 520-1 includes a representation of earbud set 503 and button 522-1 (labeled "Connect"), which, when activated by a user input, initiates pairing of device 100 with the peripherals (e.g., earbuds 502-1 and 502-2 and earbud case 502-3 shown in FIG. 5A) of earbud set 503. In some embodiments, the user interface(s) shown in window 520-1 are instead displayed on the entirety (or substantially all, e.g., greater than 95%, 96%, 97%, 98%, or 99%) of touch screen 112. Device 100 also displays an exit button 524-1 that, when activated by a user input, such as a tap gesture, causes window 520-1 to cease to be displayed so that the user can perform other operations on device 100. Where exit button 524-1 accompanies another user interface described herein (e.g., a user interface that is part of the pairing process or fit test), exit button 524-1, when activated by a user input, causes that user interface to cease to be displayed.

FIGS. 5C-5D illustrate transitions from FIG. 5B. In particular, FIG. 5C shows input 540 (e.g., a tap gesture) on button 522-1 in window 520-1. In response to detecting input 540, device 100 initiates pairing of device 100 with the peripherals of earbud set 503. In FIG. 5D, after device 100 has paired with the peripherals of earbud set 503, device 100 displays an indication 523-1 (labeled "Connected") in window 520-2 to indicate that device 100 is paired with (e.g., connected to) earbud set 503. In some embodiments, device 100 displays, in window 520-2, a button that, when activated, causes device 100 to proceed from the pairing process to a fit test for determining and optimizing the fit of earbuds 502-1 and 502-2 in a user's ears.

Figure 5E:
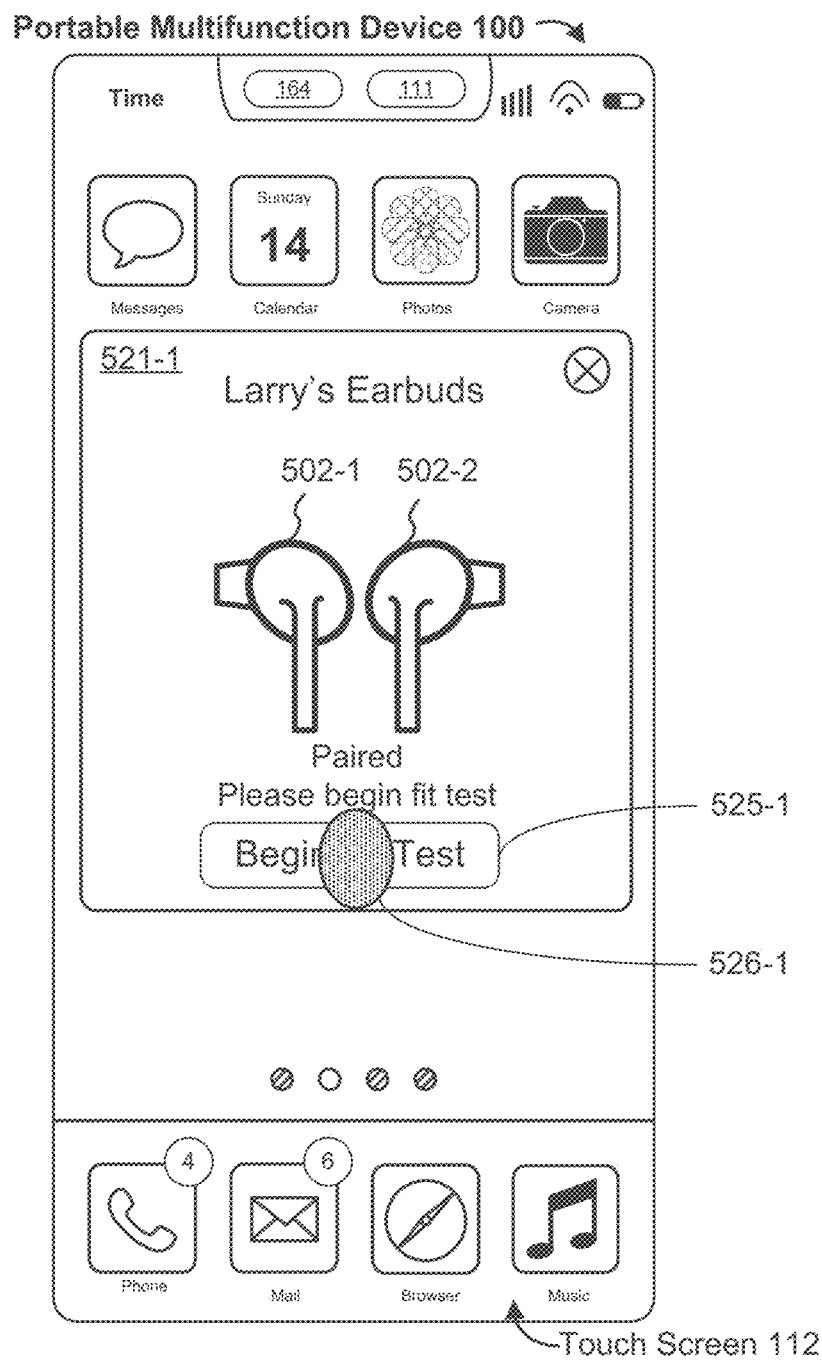
FIGS. 5A-5V illustrate example user interfaces for pairing and calibrating wearable audio output devices in accordance with some embodiments.

FIG. 5E illustrates example user interface 521-1 for initiating a fit test to determine and optimize the fit of earbud 502-1 and earbud 502-2 in the user's ears. In some embodiments, instead of being displayed in a window as shown in FIGS. 5E-5V, user interface 521 is displayed on the entirety (or substantially all, e.g., greater than 95%, 96%, 97%, 98%, or 99%) of touch screen 112. In some embodiments, user interface 521-1 is displayed in response to a user input on a button displayed in an immediately preceding user interface (e.g., a button displayed in window 520-2, FIG. 5D, for proceeding from the pairing process to the fit test). FIG. 5E shows button 525-1 (labeled "Begin Test"), which, when activated, initiates the fit test. FIG. 5E also shows input 526-1 (e.g., a tap gesture) on button 525-1 to activate button 525-1 and begin the fit test. As described in further detail below, during the fit test, earbud 502-1 and earbud 502-2 obtain audio data (e.g., based on audio detected using a microphone configured to detect in-ear audio and audio detected using a microphone configured to detect ambient audio), and, based at least in part on the obtained audio data, device 100 displays suggestions to the user to improve the fit of earbud 502-1 and/or earbud 502-2 in the user's ears.

Figure 5F:
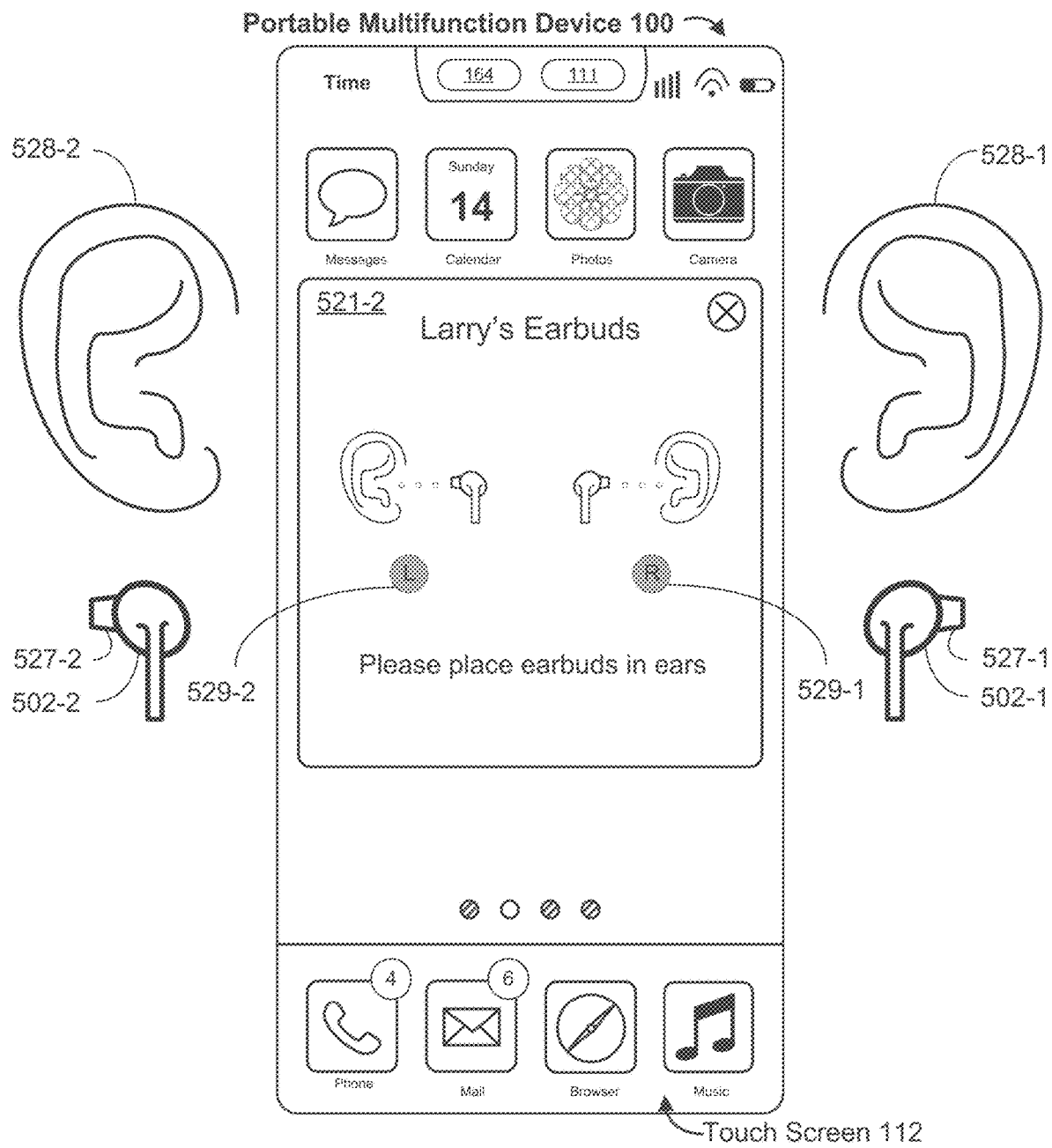

FIG. 5F illustrates a transition from FIG. 5E. In particular, FIG. 5F illustrates example user interface 521-2 displayed in response to a user input (e.g., on button 525-1, FIG. 5E) to begin the fit test. FIG. 5F also illustrates earbud 502-1 and earbud 502-2 in relation to ears 528-1 and 528-2 of the user. In particular, FIG. 5F shows that earbud 502-1 and earbud 502-2 are not placed in ears 528-1 and 528-2 of the user. As illustrated in FIG. 5F, earbuds 502-1 and 502-2 are coupled to eartips 527-1 and 527-2 (e.g., attachments to the earbuds, which may be made of rubber or a rubber-like material such as silicone to help create a seal between a respective earbud and a respective ear in which the earbud is placed). Eartips 527-1 and 527-2 can be removed, and swapped for different eartips, by the user. User interface 521-2 in FIG. 5F includes instructions to the user to place earbuds 502 in his or her ears, in the form of the text "Please place earbuds in ears" and two representations of ears, each associated with a respective representation of an earbud. User interface 521-2 also includes indicators 529-1 and 529-2, displayed underneath the representations of the ears, indicating with gray circles that the earbuds are not placed in the ears of the user (or that device 100 is unable to detect that the earbuds have been placed in the user's ears). The letter 'R' in indicator 529-1 indicates that indicator 529-1 represents (e.g., a state of) an earbud for right ear 528-1, which in this example is earbud 502-1. The letter 'L' in indicator 529-2 indicates that indicator 529-2 represents (e.g., a state of) an earbud for left ear 528-2, which in this example is earbud 502-2. Although some embodiments (e.g., as shown in the example in FIG. 5F) use gray circles to indicate that earbuds 502-1 and 502-2 have not been detected as being in the user's ears, one of ordinary skill in the art will recognize that other forms of status indicator can be used instead.

Figure 5G:
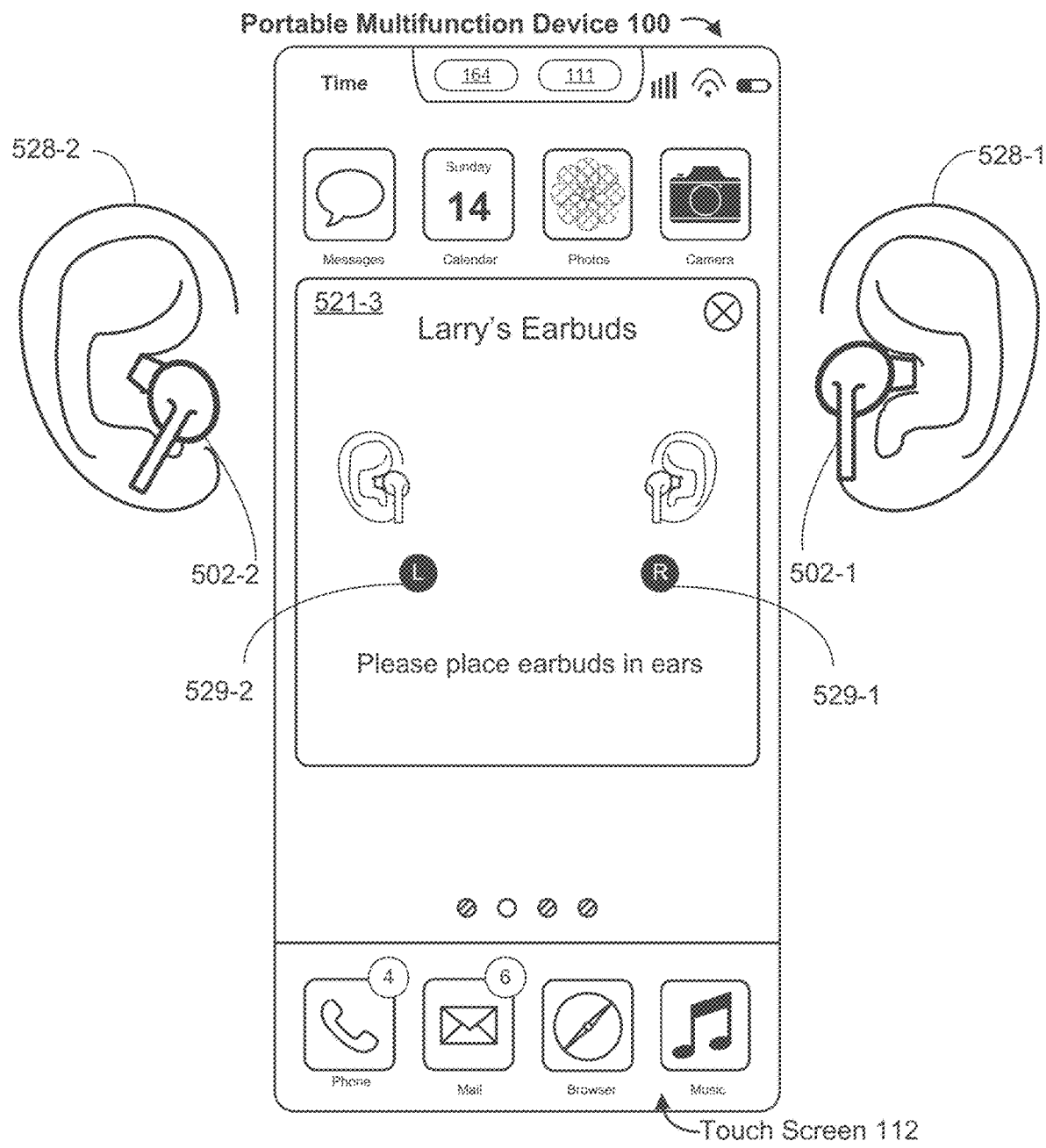

FIG. 5G illustrates a transition from FIG. 5F. In particular, FIG. 5G shows earbud 502-1 placed in ear 528-1 of the user, and earbud 502-2 placed in ear 528-2 of the user. Accordingly, indicators 529-1 and 529-2 have changed from gray circles, which indicate that earbuds 502-1 and 202-2 are not in the user's ears, to black circles, which indicate that earbuds 502-1 and 202-2 have been detected as being placed in the user's ears and that a next step of the fit test has not yet been performed. Although some embodiments (e.g., as shown in the example in FIG. 5G) use black circles to indicate that earbuds 502-1 and 502-2 have been placed in the user's ears (e.g., prior to performing a next step of the fit test, such as a calibration step), one of ordinary skill in the art will recognize that other forms of status indicator can be used instead.

Figure 5H:
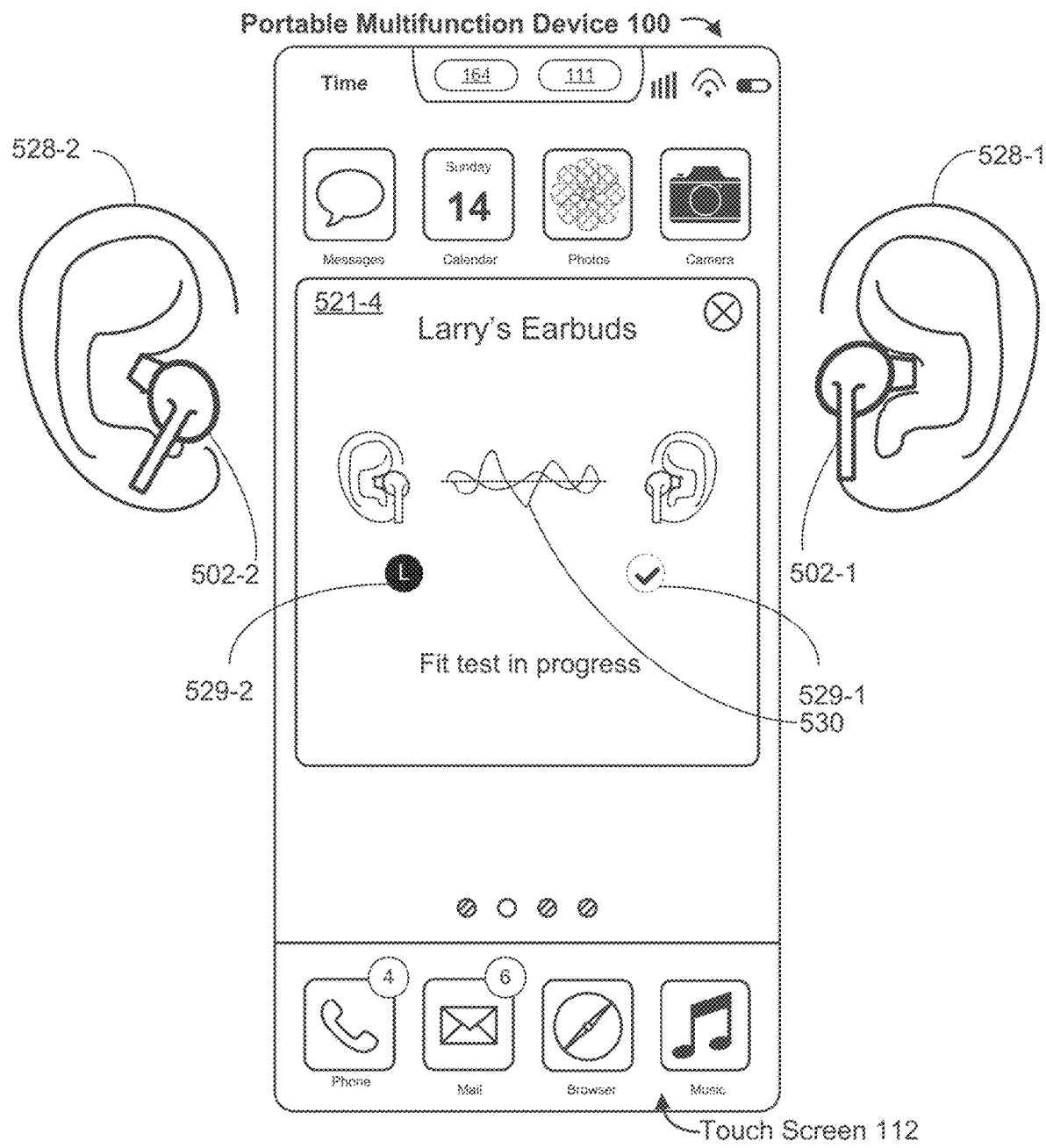

FIG. 5H illustrates a transition from FIG. 5G. In particular, FIG. 5H shows example user interface 521-4, which includes one or more indications that the fit test is in progress, such as animation 530 and the text "Fit test in progress" as shown in FIG. 5H. In some embodiments, user interface 521-4 is displayed in response to device 100 detecting that both earbuds 502-1 and 502-2 have been placed in the user's ears. In some embodiments, user interface 521-4 is displayed in response to a user input activating a button displayed in user interfaces 521-2 (FIG. 5F) and 521-3 (FIG. 5G) for continuing with the fit test after earbuds 502-1 and 502-2 have been placed in the user's ears (and optionally, in some embodiments, the button is displayed for the first time, or becomes activatable after having been displayed as non-activatable (e.g., grayed out), in response to detecting placement of earbuds 502-1 and 502-2 in the user's ears). In some embodiments, performing the fit test includes outputting a calibration tone via earbuds 502 (e.g., using speaker(s) 306, FIG. 3B), detecting audio via earbud 502-1 and 502-2 (e.g., using one or more microphones on each earbud, such as microphone 302-2 in FIG. 3B), and determining whether the detected audio indicates that earbuds 502 satisfy device fit criteria (e.g., by comparing the detected audio to the calibration tone to determine whether and how much ambient audio is included in the detected audio; if the detected audio includes greater than a threshold amount of ambient audio, the device fit criteria is not satisfied).

Additionally, in FIG. 5H, indicator 529-1 has changed to a green circle with a checkmark, which indicates that earbud 502-1 has met fit criteria (also called "device fit criteria") assessed by the fit test. In contrast, indicator 529-2 has not changed in appearance. Although the example in FIG. 5J illustrates that indicator 529-1 has been updated during the fit test to reflect whether earbud 502-1 meets the fit criteria separately from (e.g., here, prior to) updating indicator 529-2 to reflect whether earbud 502-2 meets the fit criteria, one of ordinary skill will recognize that, in some embodiments, the indicators are updated concurrently, and optionally after the end of the fit test (e.g., such that indicator 529-1 would continue to have the same appearance in FIG. 5H as in FIG. 5G, similarly to indicator 529-2).

Figure 5I:
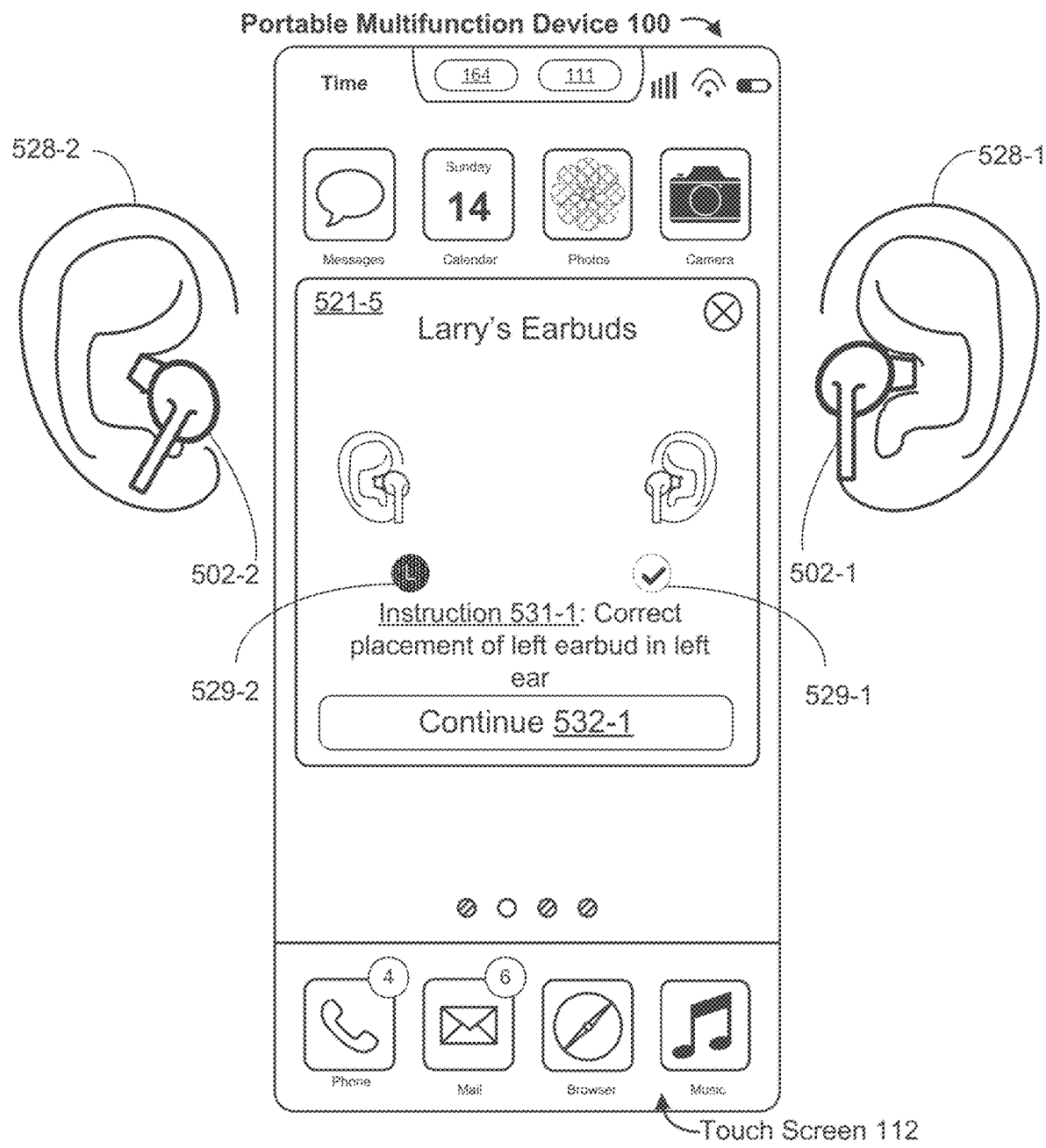

FIG. 5I illustrates a transition from FIG. 5H. In particular, FIG. 5I shows example user interface 521-5, which is displayed after the fit test has been performed and which presents results of the fit test. Indicators 529-1 and 529-2 in user interface 521-5 show the status of earbuds 502-1 and 502-2, respectively. In particular, indicator 529-2 in FIG. 5I is displayed in a different color (e.g., yellow), which is represented by the changed fill pattern, signifying that the fit test has been performed and that earbud 502-2 does not satisfy the fit criteria (e.g., because earbud 502-2 was not placed in the ear of the user correctly). Furthermore, user interface 521-5 includes instruction 531-1 prompting the user to adjust the placement of left earbud 502-2 in the user's left ear. Below instruction 531-1, button 532-1 (labeled "Continue") is displayed for continuing the fit test. In some embodiments, button 532-1 is non-activatable (e.g., grayed out) until device 100 determines that the user has complied with instruction 531-1 (e.g., by detecting or receiving information indicating that earbud 502-2 has been removed from and replaced in an ear (e.g., ear 528-2)), after which button 532-1 becomes activatable.

Figure 5J:
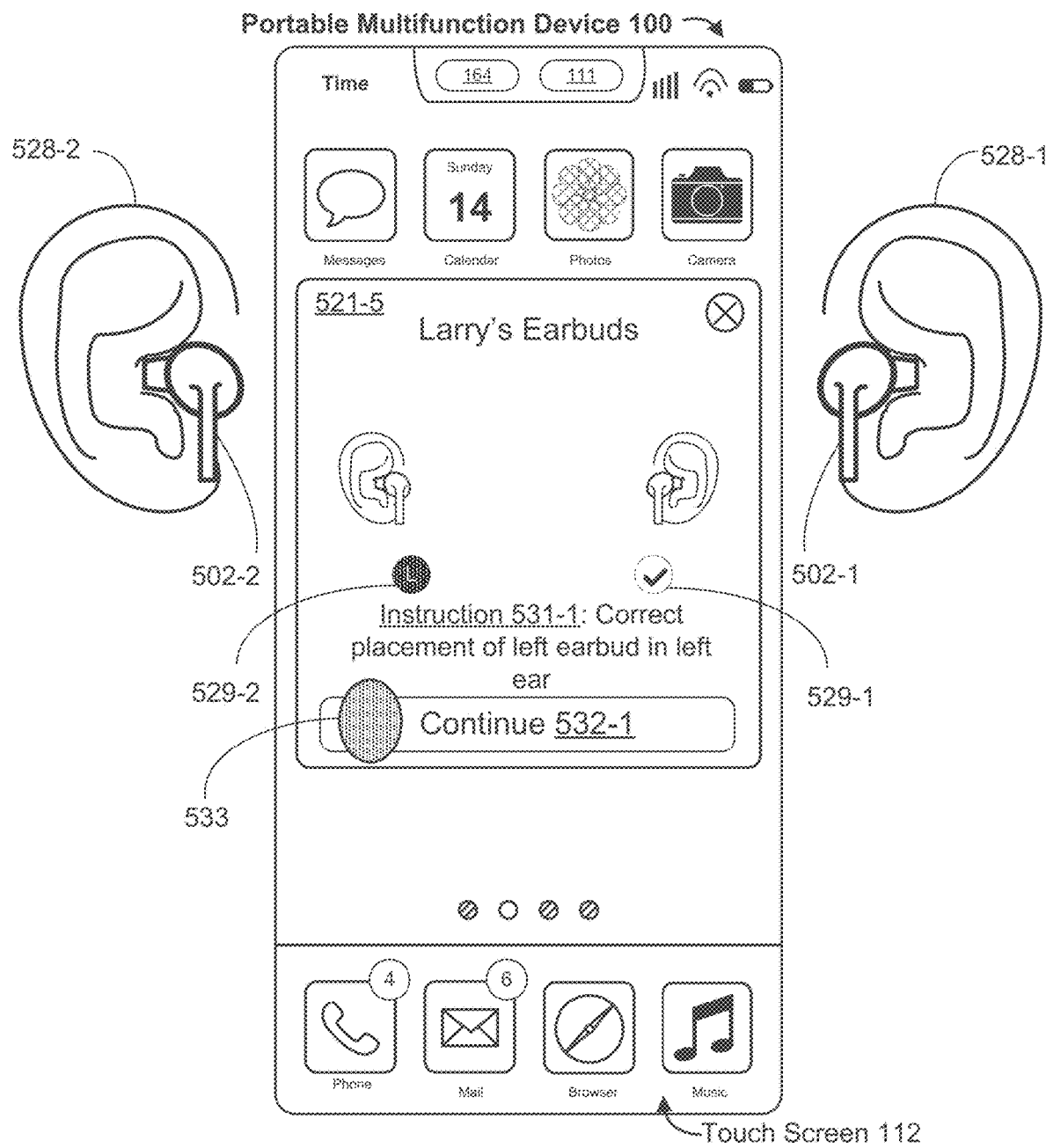

FIG. 5J shows the same user interface 521-5 as FIG. 5I. FIG. 5J also shows earbud 502-2 now properly aligned in ear 528-2 (e.g., in response to instruction 531-1), and input 533 received at user interface 521-5, specifically at button 532-1, to continue the fit test (e.g., repeat the fit test as a result of left earbud 502-2 failing the fit test). Although FIG. 5J shows indicator 529-2 with the same appearance as in FIG. 5I, prior to the adjustment of left earbud 502-2, in some embodiments indicator 529-2 is changed to a gray circle in response to earbud 502-2 being removed (e.g., while earbud 502-2 is not detected as being placed in an ear of the user) and changed to a black circle in response to earbud 502-2 being replaced in the user's ear (e.g., to indicate that earbud 502-2 has been detected as being placed in an ear of the user and that a next step of the fit test has not yet been performed).

Figure 5K:
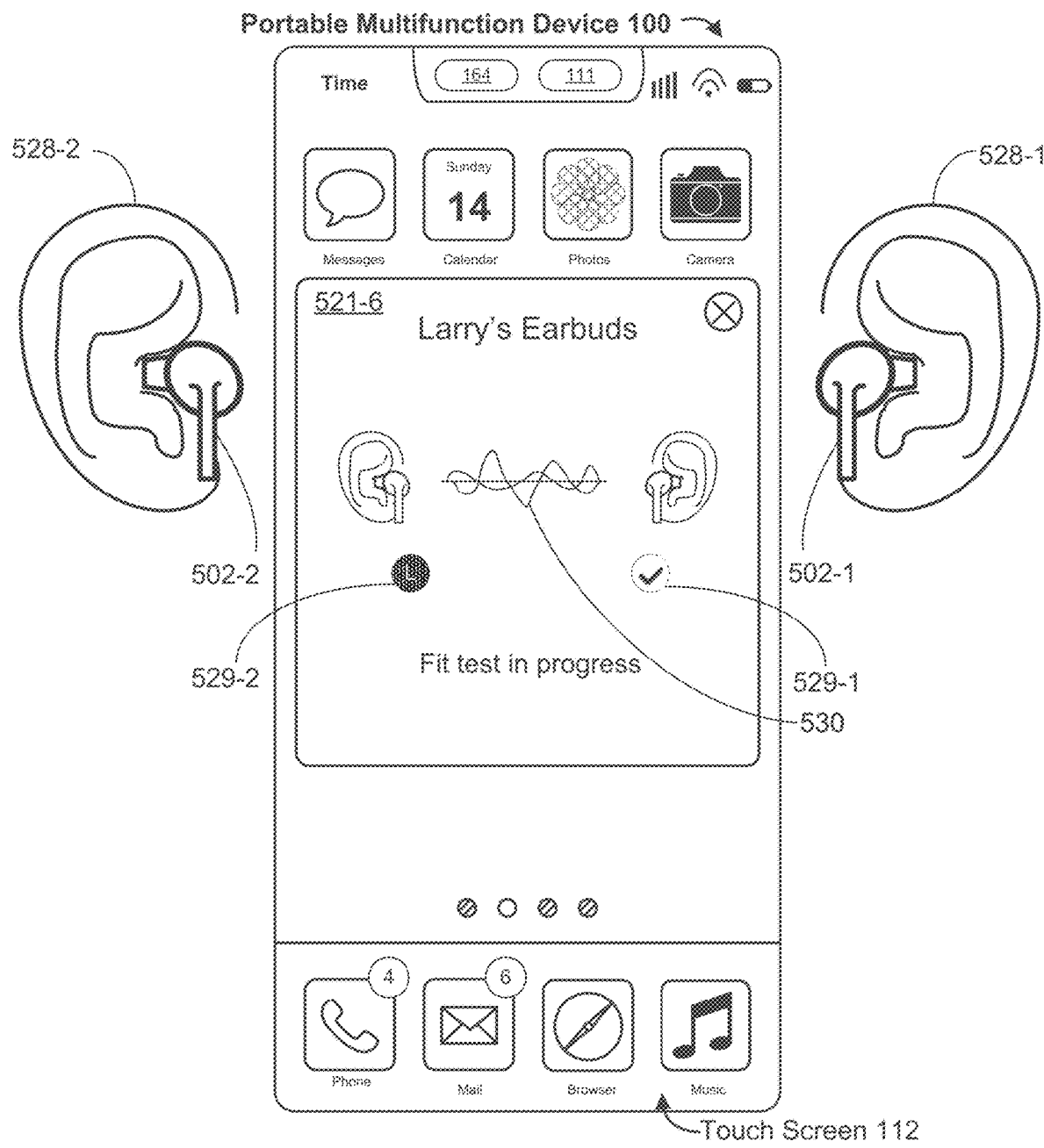

FIG. 5K shows example user interface 521-6, displayed in response to input 533 (FIG. 5J). User interface 521-6 includes one or more indications that the fit test is in progress (e.g., in this case, for a second time), such as animation 530 and the text "Fit test in progress." In FIG. 5K, user interface 521-6 continues to indicate that left earbud 502-2 does not satisfy the fit criteria, as indicated by the patterned fill of indicator 529-2. As explained above with reference to FIG. 5H, in some embodiments, the appearance of indicator 529-2 is not updated during the fit test, but rather is updated after the fit test has been performed, based on results of the fit test (e.g., the appearance of indicator 529-2 is the same in FIG. 5J as in FIG. 5K).

Figure 5L:
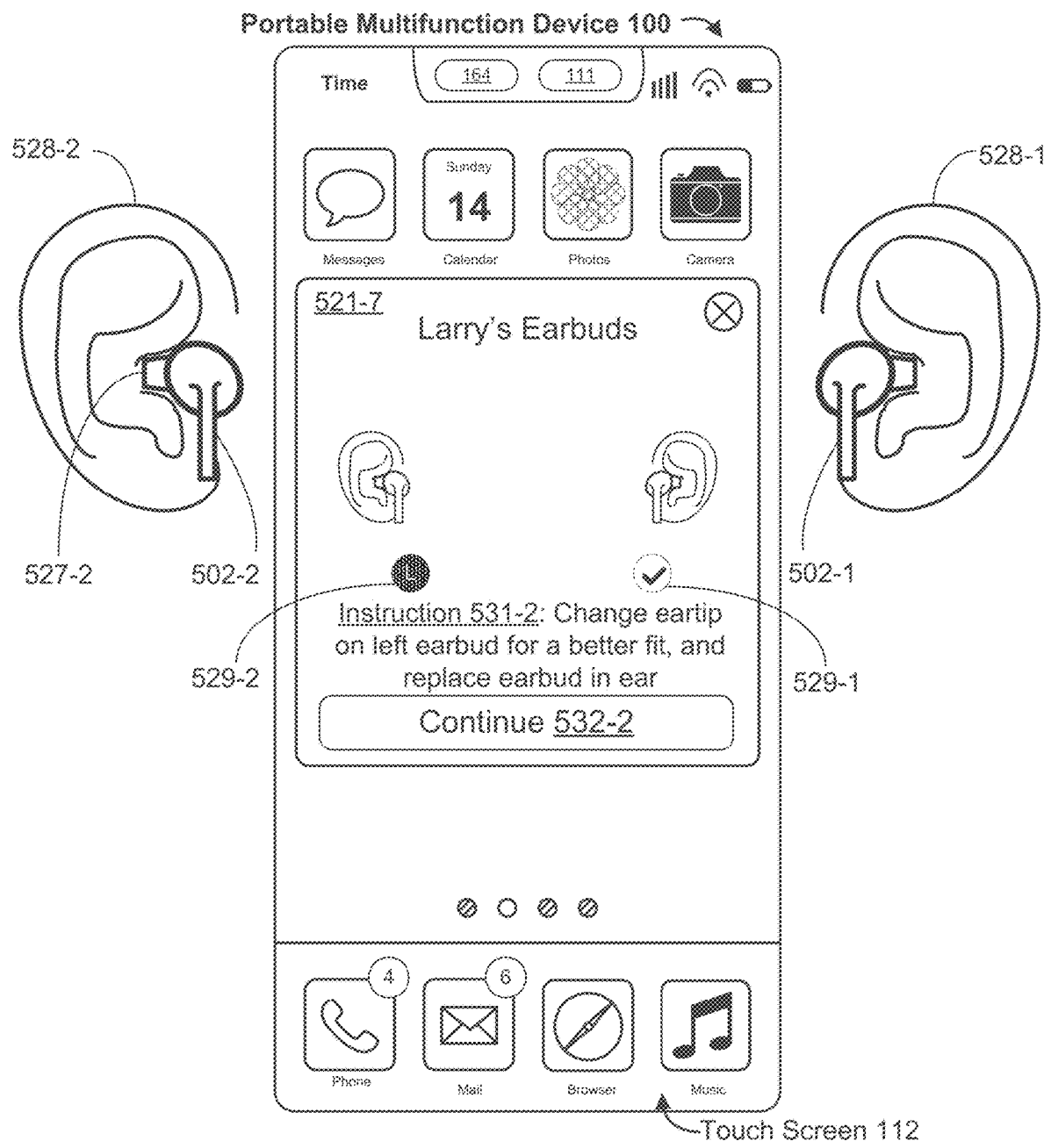

FIG. 5L illustrates example user interface 521-7, which is displayed after the fit test has been performed (e.g., in response to completion of the fit test) and which presents results of the fit test. Indicators 529-1 and 529-2 in user interface 521-7 show the status of earbuds 502-1 and 502-2, respectively. In particular, indicator 529-2 indicates that earbud 502-2 still does not satisfy the fit criteria, while indicator 529-1 indicates that earbud 502-1 continues to satisfy the fit criteria. Furthermore, user interface 521-7 includes instruction 531-2 prompting the user to replace eartip 527-2 on earbud 502-2 for a better fit and to subsequently re-insert the earbud with the new eartip in ear 528-2. Below instruction 531-2, button 532-2 is displayed for continuing the fit test. In some embodiments, button 532-2 is non-activatable (e.g., grayed out) until device 100 determines that the user has complied with instruction 531-2 (e.g., by detecting or receiving information indicating that earbud 502-2 has been removed from and replaced in an ear, or, in some embodiments where device 100 is able to identify which eartip is attached to a particular earbud, by detecting that the eartip attached to earbud 502-2 has been changed), after which button 532-2 becomes activatable. For example, in some embodiments button 532-2 is non-activatable prior to detecting that earbud 502-2 has been replaced in an ear of the user (FIG. 5O).

Figure 5M:
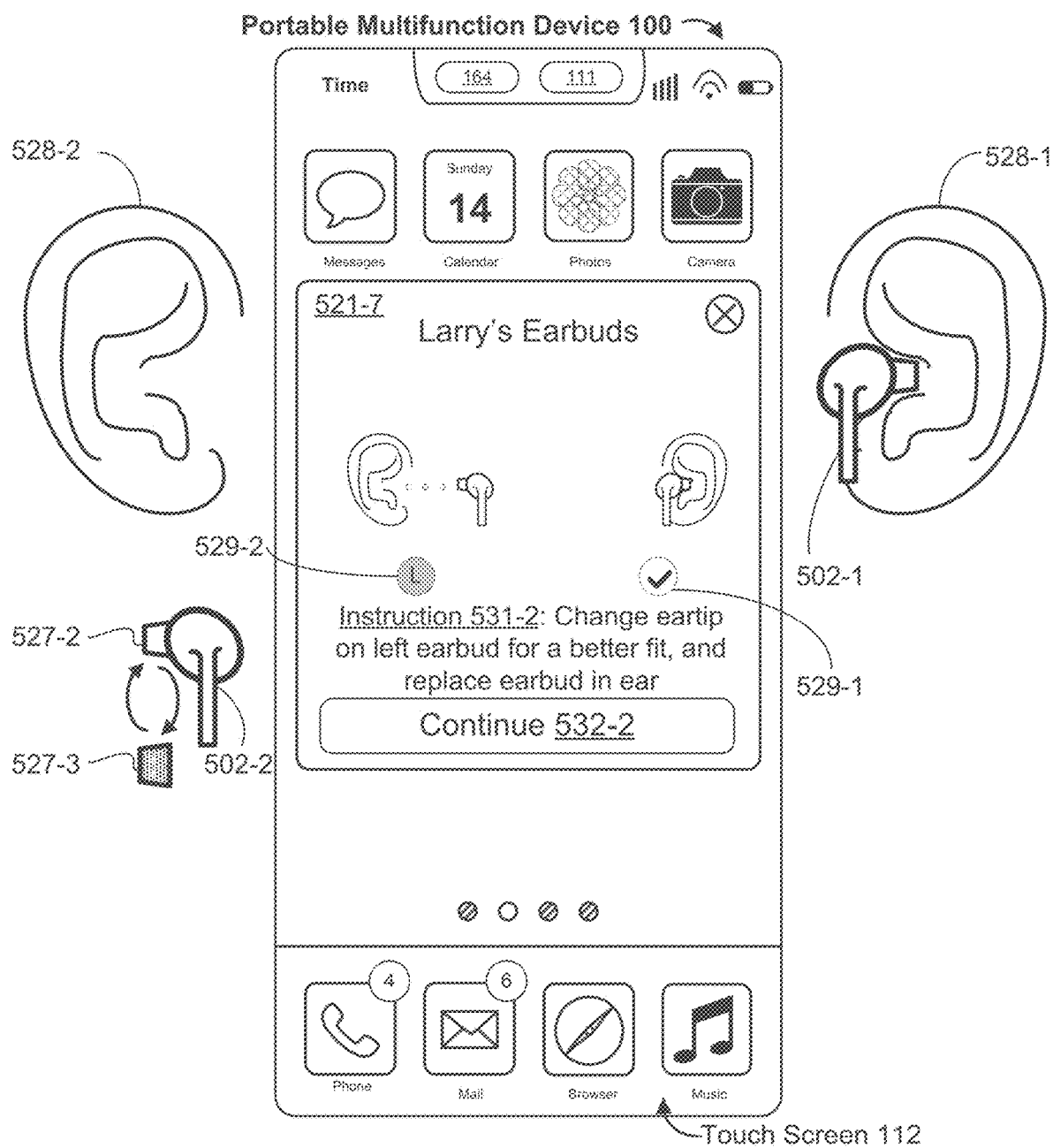
Figure 5N:
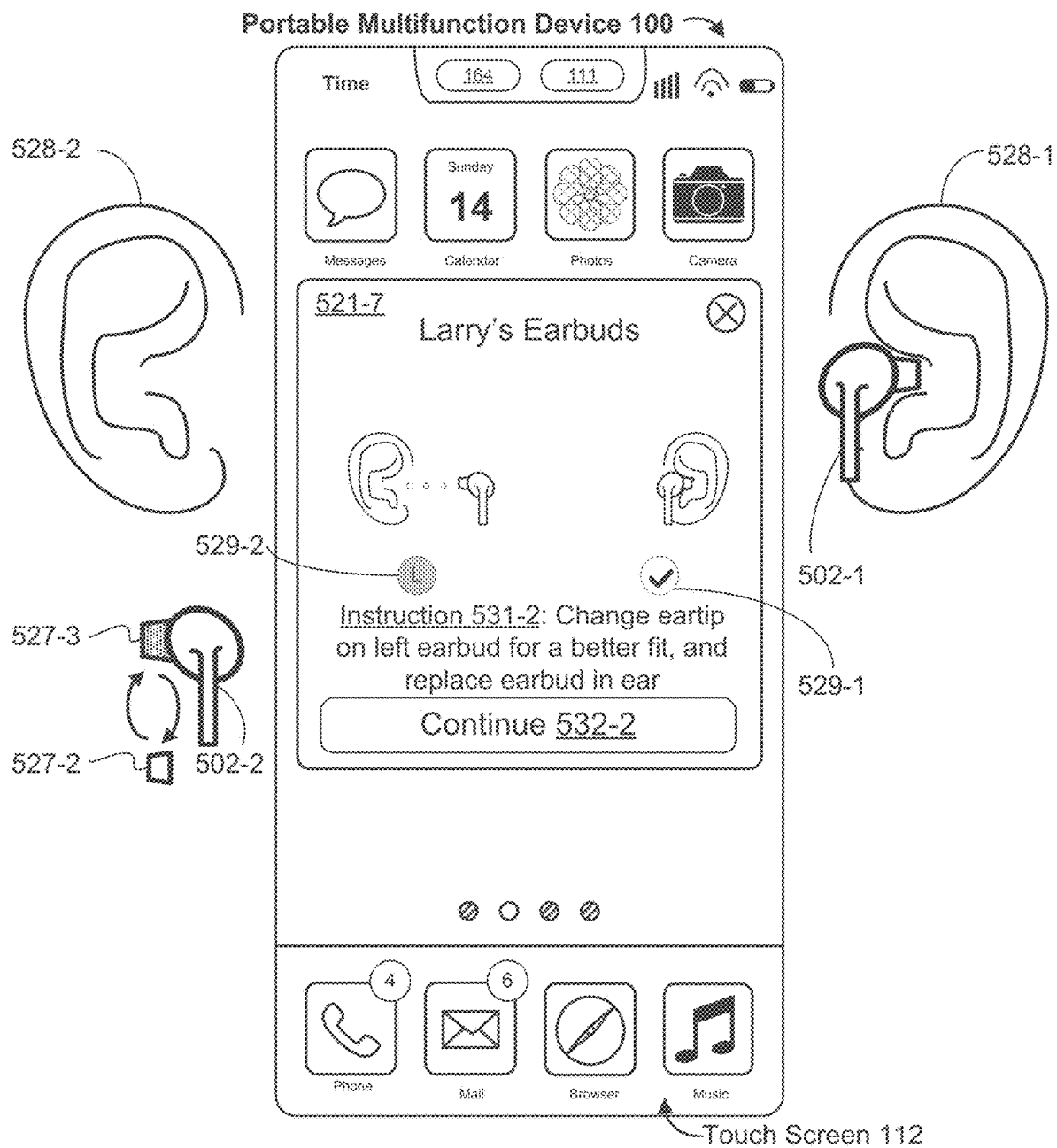

FIGS. 5M-5N illustrate changing of the eartip attached to earbud 502-2. FIGS. 5M-5N show the same user interface 521-7 as FIG. 5L, except that FIGS. 5M-5N show that earbud 502-2 has been removed from ear 528-2. Accordingly, indicator 529-2 has changed to a gray circle to indicate that earbud 502-2 is no longer in an ear of the user. In addition, FIGS. 5M-5N illustrate eartip 527-2 being exchanged for a different eartip 527-3 (e.g., a larger eartip to accommodate a larger ear).

Figure 5O:
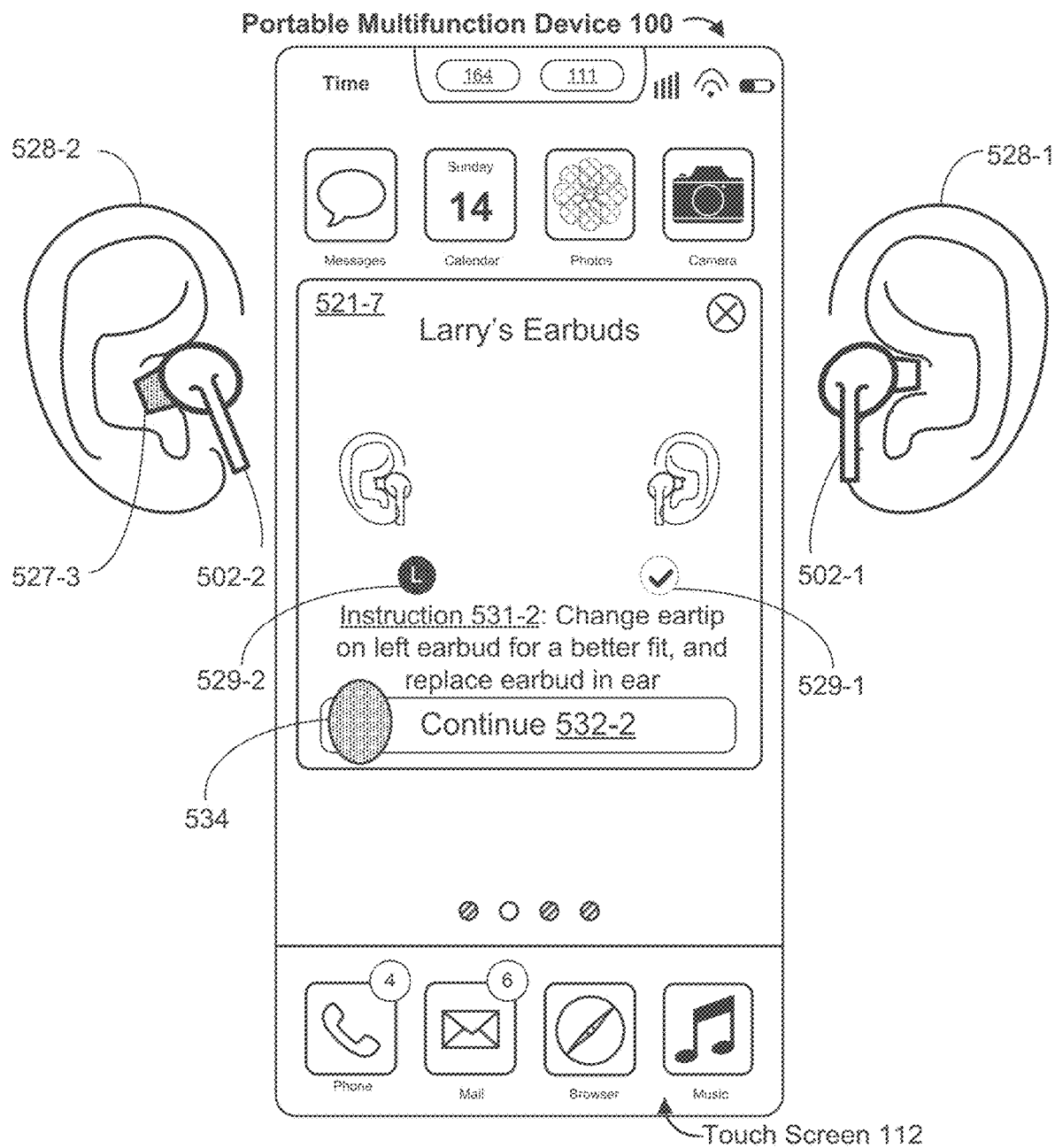

FIG. 5O shows that earbud 502-2, now with eartip 527-3 attached, has been replaced (e.g., placed back) in ear 528-2. In response to the user replacing left earbud 502-2 back in ear 528-2, indicator 529-2 changes from a gray circle to a black circle, which indicates that earbud 502-2 has been detected as being placed in an ear of the user and that a next step of the fit test has not yet been performed. FIG. 5O also illustrates input 534 received at button 532-2 (labeled "Continue") to continue the fit test.

Figure 5P:
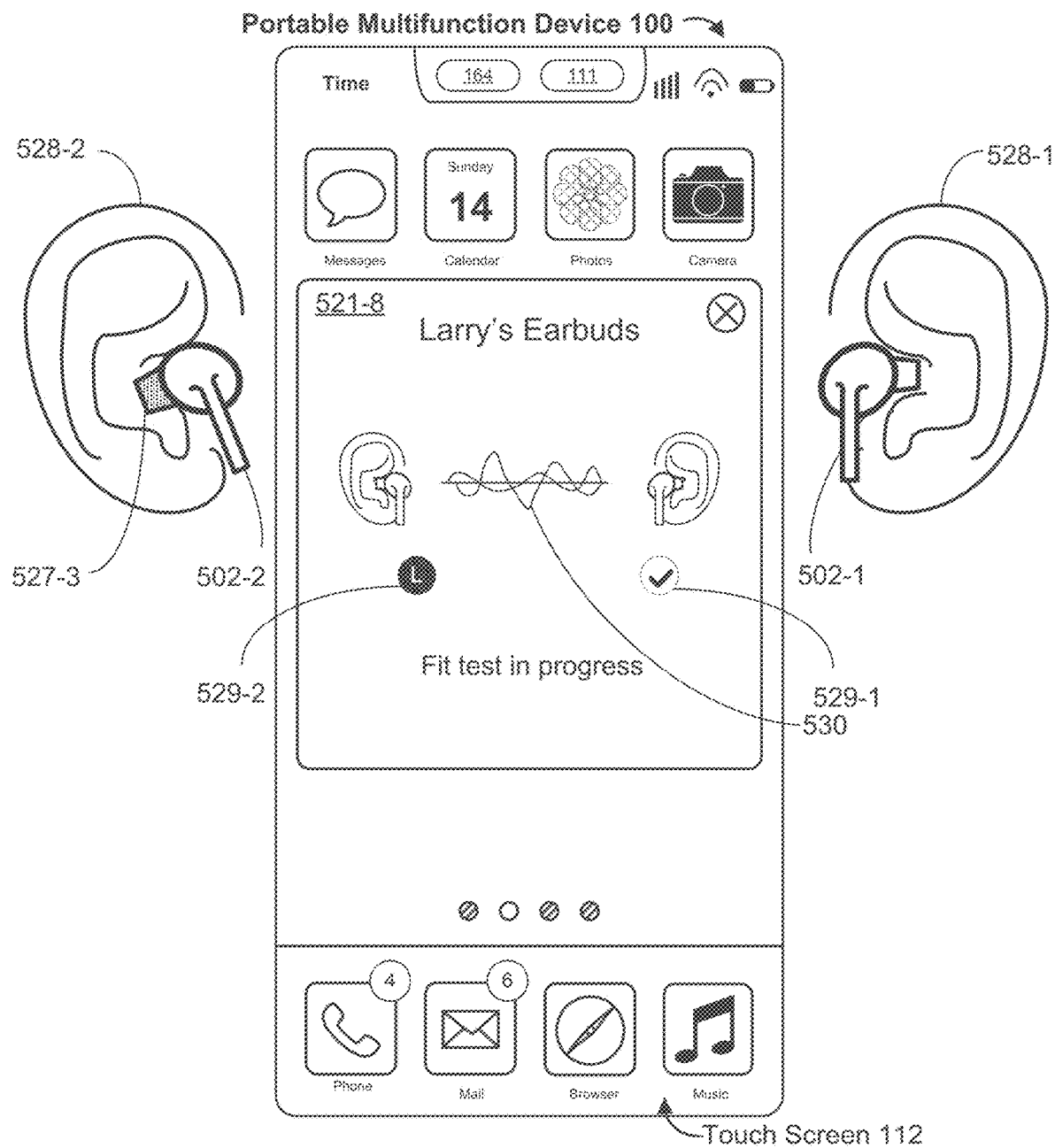

FIG. 5P illustrates a transition from FIG. 5O. In particular, FIG. 5P shows example user interface 521-8, which is displayed in response to input 534 at button 532-2, and which includes one or more indications that the fit test is in progress (e.g., in this case, for a third time), such as animation 530 and the text "Fit test is in progress." In the example shown in FIG. 5P, indicators 529-1 and 529-2 have the same appearance during the fit test (e.g., as shown in FIG. 5P) as before performing the fit test (e.g., as shown in FIG. 5O).

Figure 5Q:
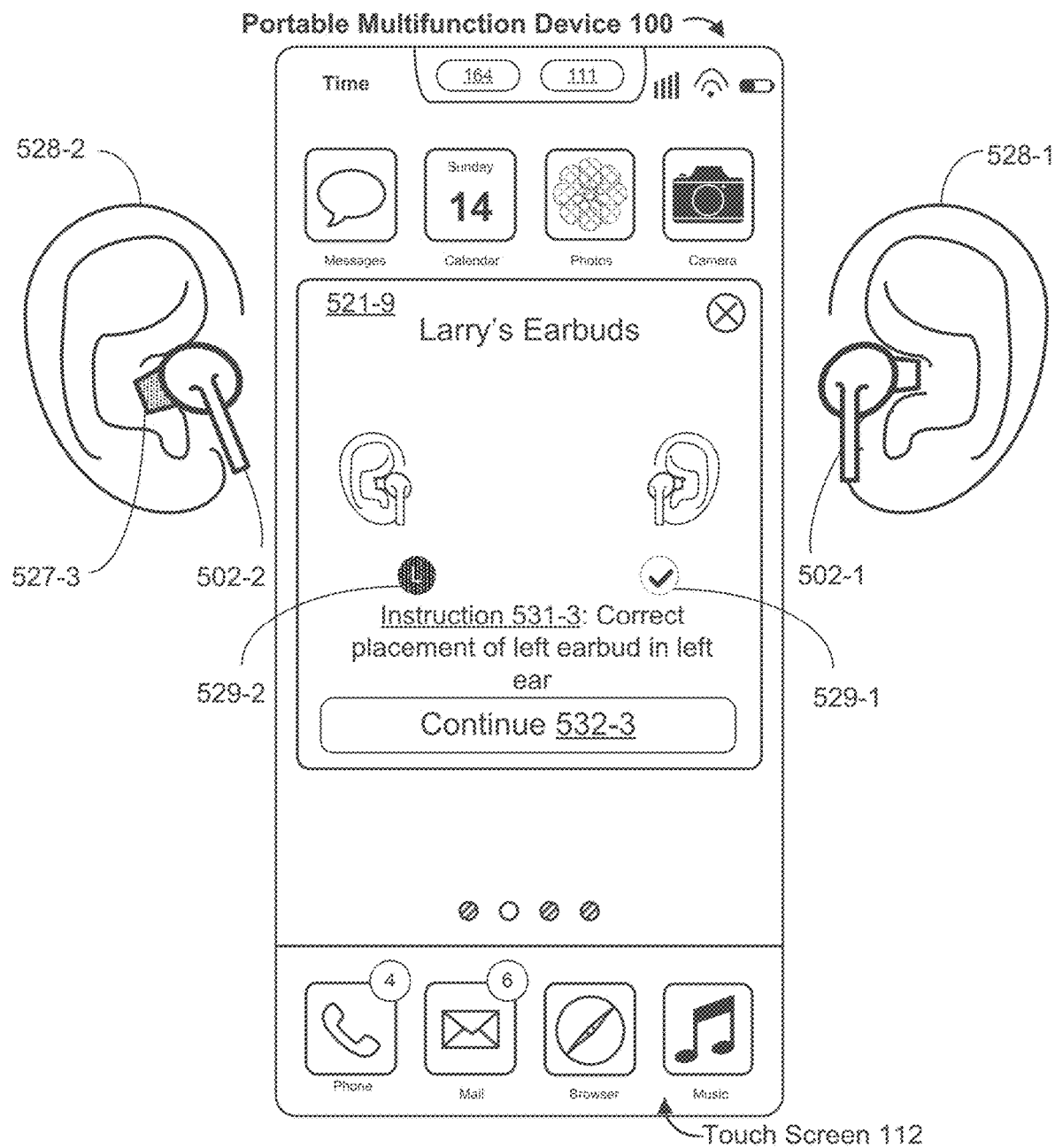

FIG. 5Q illustrates an example user interface 521-9, which is displayed after the fit test has been performed (e.g., in response to completion of the fit test) and which presents results of the fit test. Indicators 529-1 and 529-2 in user interface 521-9 show the status of earbuds 502-1 and 502-2, respectively. In particular, indicator 529-1 (e.g., a green circle with a checkmark) indicates that earbud 502-1 (e.g., still) satisfies the fit criteria assessed by the fit test. Indicator 529-2 has been updated to a different color (e.g., yellow), which is represented by the changed fill pattern, signifying that earbud 502-2 (e.g., still) does not satisfy the fit criteria (e.g., because earbud 502-2 is still not properly aligned in ear 528-2). Furthermore, user interface 521-9 includes instruction 531-3 prompting the user to adjust the placement of left earbud 502-2 in the user's left ear. Below instruction 531-3, button 532-3 (labeled "Continue") is displayed for continuing the fit test. In some embodiments, button 532-3 is non-activatable (e.g., grayed out) until device 100 determines that the user has complied with instruction 531-3 (e.g., by detecting or receiving information indicating that earbud 502-2 has been removed from and replaced in an ear (e.g., ear 528-2)), after which button 532-3 becomes activatable.

Figure 5R:
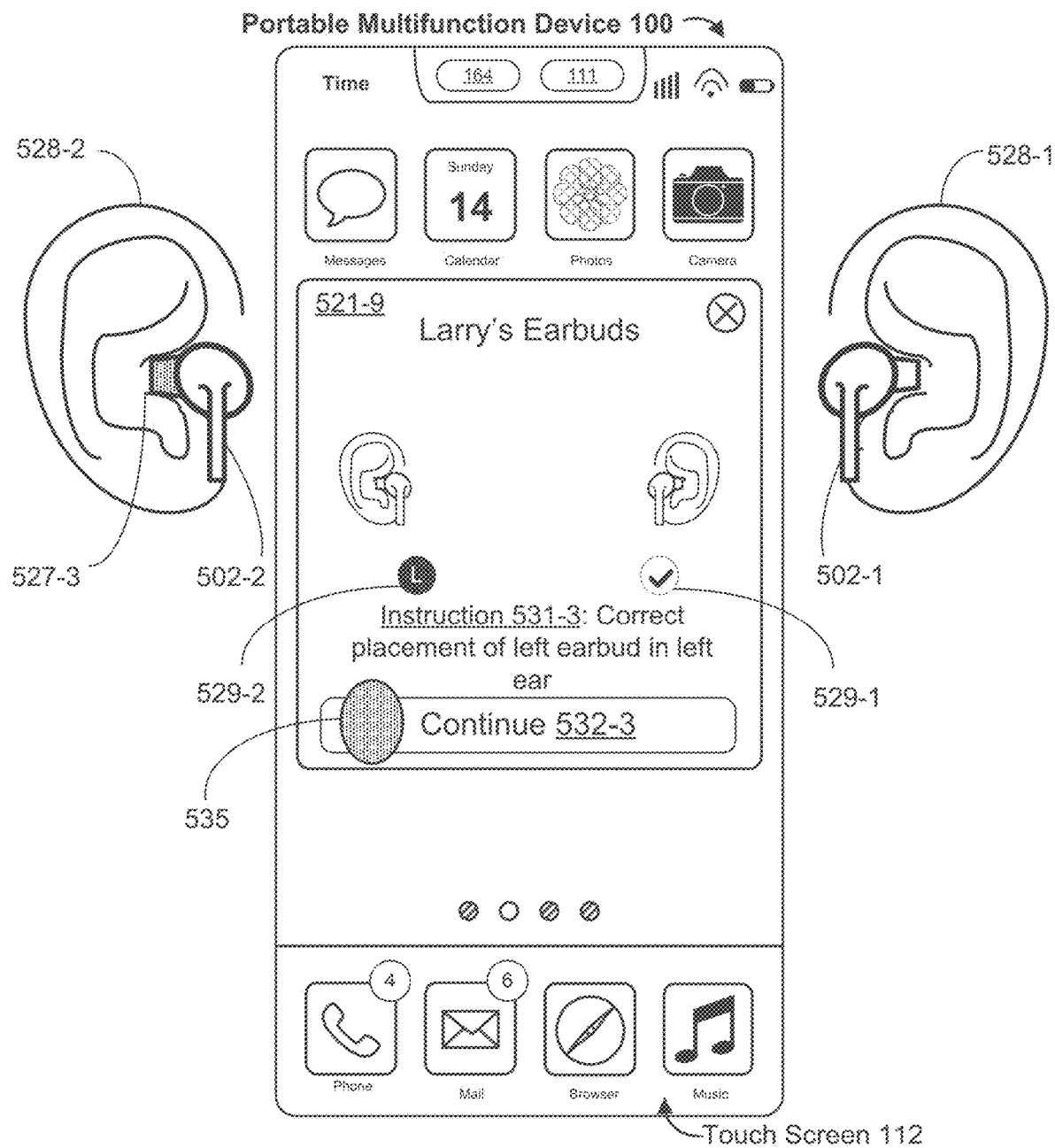

FIG. 5R shows earbud 502-2 with eartip 527-3 now properly aligned in ear 528-2 (e.g., in response to instruction 531-3). In addition, FIG. 5R shows the same user interface 521-9 as FIG. 5Q, except that indicator 529-2 in FIG. 5R has been changed to a black circle in response to earbud 502-2 being replaced in the user's ear, optionally after having been changed to a gray circle in response to earbud 502-2 being removed. FIG. 5R also shows input 535 at button 532-3 to continue the fit test.

Figure 5S:
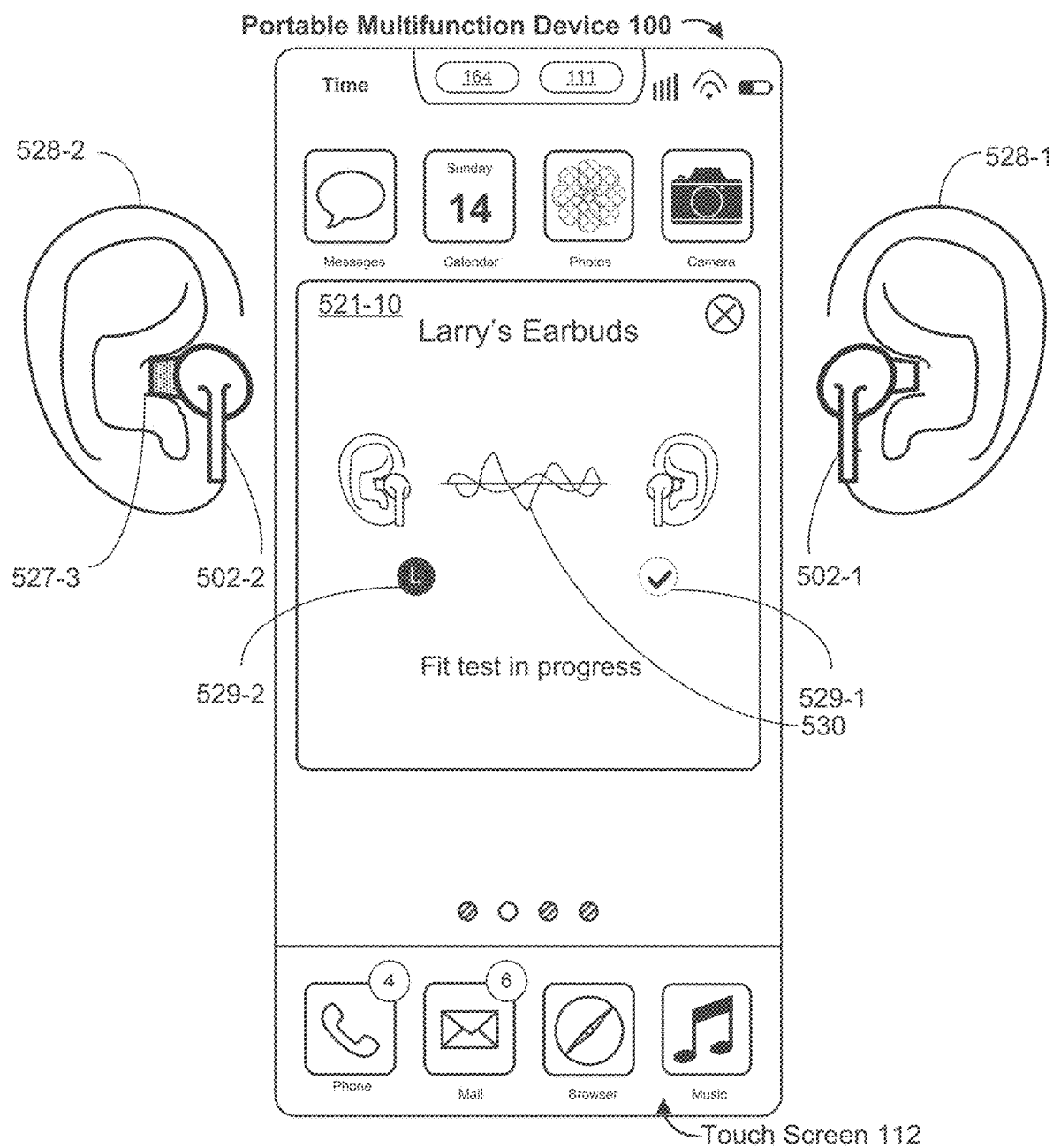

FIG. 5S shows example user interface 521-10, displayed in response to input 535 (FIG. 5R). User interface 521-10 includes one or more indications that the fit test is in progress (e.g., in this case, for a fourth time), such as animation 530 and the text "Fit test in progress." In the example shown in FIG. 5S, indicators 529-1 and 529-2 have the same appearance during the fit test (e.g., as shown in FIG. 5S) as before performing the fit test (e.g., as shown in FIG. 5R).

Figure 5T:
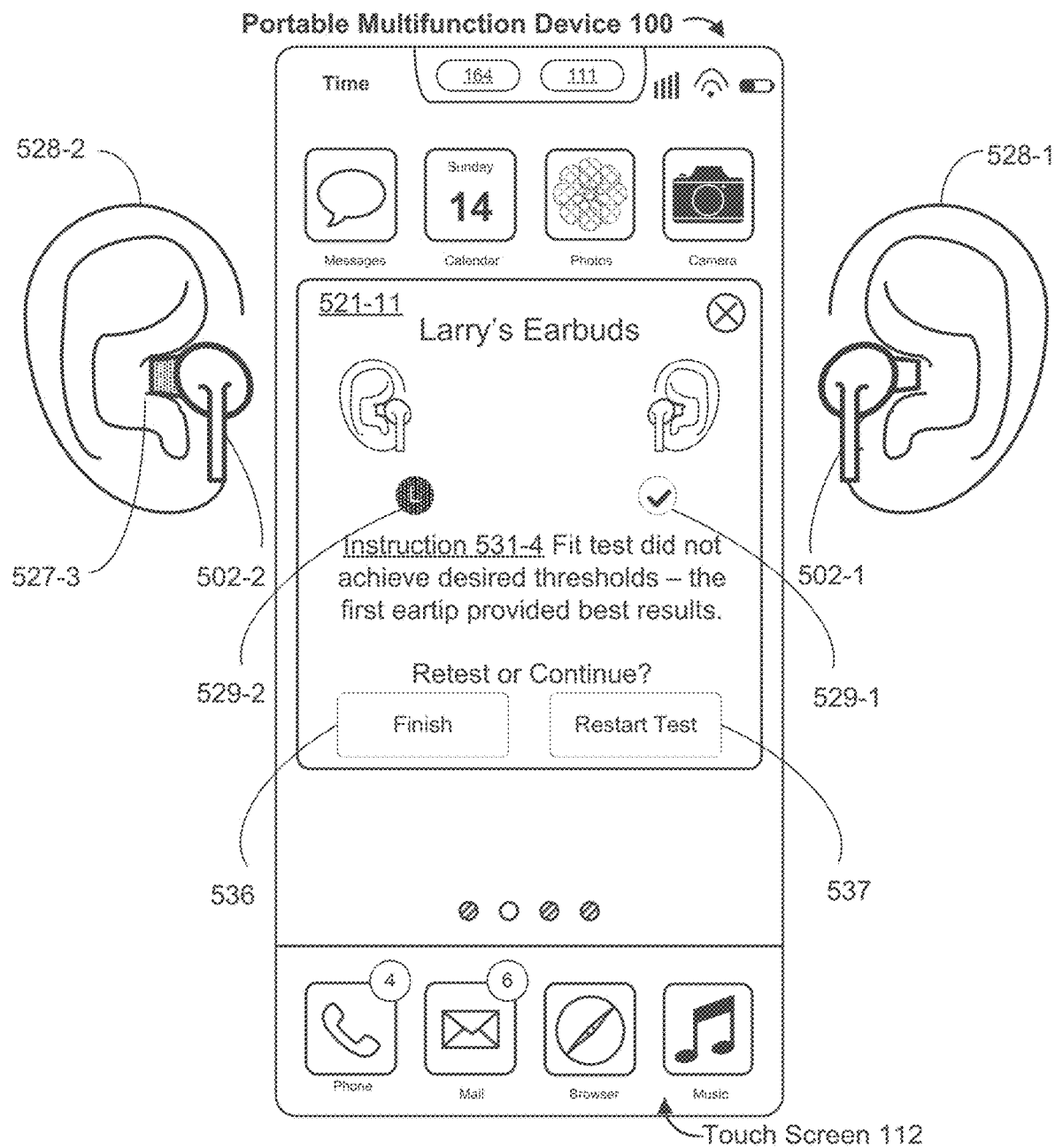

FIG. 5T illustrates example user interface 521-11, which is displayed after the fit test has been performed (e.g., in response to completion of the fit test) and which presents results of the fit test. Indicators 529-1 and 529-2 in user interface 521-11 show the status of earbuds 502-1 and 502-2, respectively. In particular, indicator 529-1 (e.g., a green circle with a checkmark) indicates that earbud 502-1 (e.g., still) satisfies the fit criteria assessed by the fit test. Indicator 529-2 has been updated to a different color (e.g., yellow), which is represented by the changed fill pattern, signifying that earbud 502-2 (e.g., still) does not satisfy the fit criteria. Furthermore, user interface 521-11 includes instruction 531-4 notifying the user that the fit test did not achieve desired thresholds (e.g., for the amount of ambient audio and/or calibration tone detected during the fit test). User interface 521-11 also includes an identification of the eartip that produced the best fit test results (e.g., "the first eartip"). In some embodiments, user interface 521-11 is displayed based at least partially on a determination that fit test attempts were performed using a plurality of eartips, where none of the fit test attempts succeeded (e.g., none of the eartips satisfied the fit criteria during any of the fit test attempts). Below instruction 531-4, two buttons are shown: button 536 (labeled "Finish") and button 537 (labeled "Restart Test"). "Finish" button 536, when selected, exits the fit test user interfaces, regardless of the outcome of the test. "Restart Test" button 537, when selected, will restart the fit test sequence (e.g., by redisplaying a user interface similar to user interface 521-2 in FIG. 5F (or, alternatively, user interface 521-4 in FIG. 5H) and repeating the fit test process, as described herein with reference to FIGS. 5F-5S.

Figure 5U:
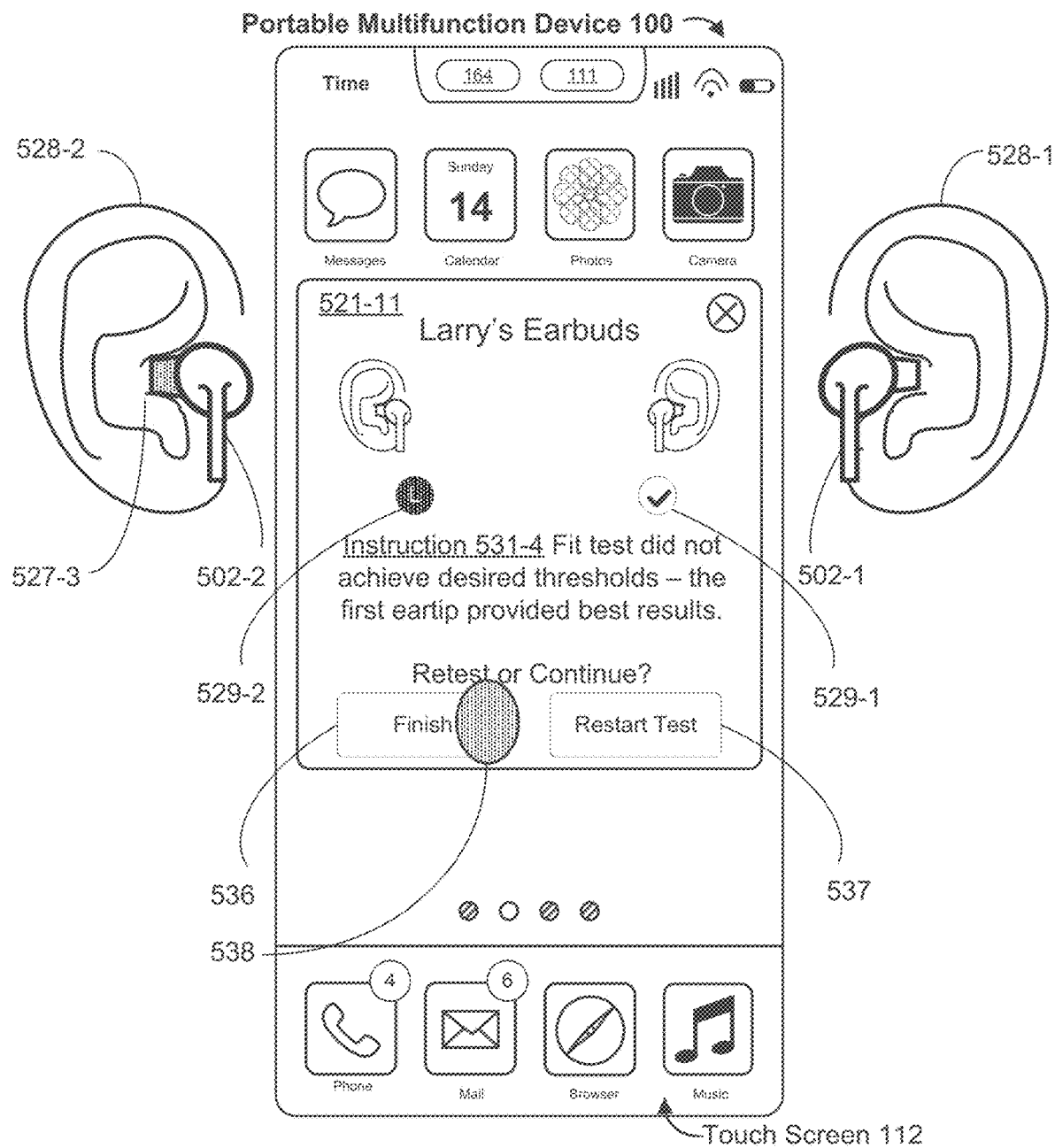
Figure 5V:
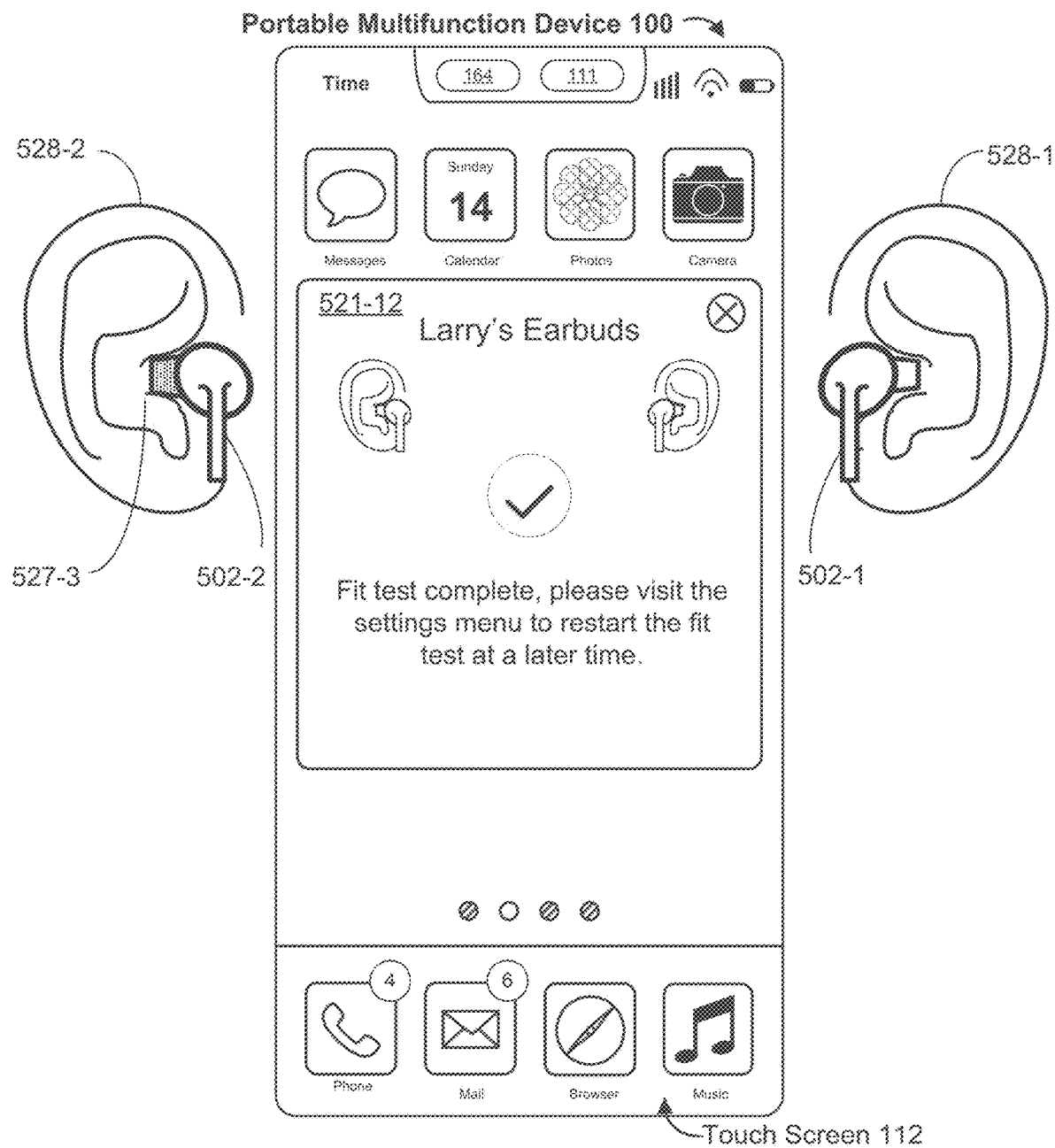

FIGS. 5U-5V illustrate conclusion of the fit test. In particular, FIG. 5U illustrates the same user interface 521-11 as FIG. 5T and input 538 at "Finish" button 536. FIG. 5V illustrates example user interface 521-12, displayed in response to input 538. User interface 521-12 indicates that the fit test has been completed and can be subsequently accessed via the settings menu. Example user interfaces for a settings menu are shown in FIGS. 9A-9B. In some embodiments, as in the example shown in FIG. 5V, user interface 521-12 includes a visual indicator to signify that the test is complete (e.g., a single green checkmark).

FIGS. 6A-6O illustrate example user interfaces for alerting a user when the user's earbuds no longer satisfy fit criteria during use in accordance with some embodiments. FIG. 6A illustrates a portable multifunction device 100 that is paired to earbuds 502-1 and 502-2. Unlike FIG. 5A-5V, the notifications (also called "alerts") in FIGS. 6A-6O are triggered during use of earbuds 502 outside of pairing and calibration using a setup menu, and optionally while using earbuds 502 to listen to media content (e.g., music, audio tracks for movies and TV shows, etc.). In some embodiments, where one or more portions of the audio being played via earbuds 502 is similar to the calibration tone used for the fit test (e.g., as described herein with reference to FIG. 5H), device 100 performs the fit test using a respective such portion of the audio (e.g., so that the fit test can be performed without playing the calibration tone, which would likely interfere with the media content being played). In this way, the fit test can be performed, and notifications about earbud fit can thereby be provided (e.g., notifications 610, 615, 617, 618, and 619 as described herein with reference to FIGS. 6A-6O), while the user is using the earbuds outside of the earbud setup process.

In FIG. 6A, earbuds 502 have been placed in ears 528-1 and 528-2 of the user, and, as indicated by status indicators 602 and 603 (e.g., two green circles with checkmarks), the fit of earbud 502-1 in ear 528-1 and the fit of earbud 502-2 in ear 528-2 satisfy the fit criteria. FIG. 6A also illustrates example user interface 601-1 for a fitness application that is associated with a current activity of the user (e.g., running) and that is being used to play media content (e.g., music) via earbuds 502, which are (e.g., wired or wirelessly) in communication with device 100. Although the examples in FIGS. 6A-6O are based on a fitness application, one of ordinary skill will recognize that the notifications described in FIGS. 6A-6O may be presented while the user is using a different application (e.g., so long as the application is distinct from an earbud settings application for managing earbud settings and performing earbud setup and, optionally, while the application in use is being used to play media content via earbuds 502). In some embodiments, the notifications described in FIGS. 6A-6O are displayed over at least a portion of a user interface of the application that the user is using. In some embodiments, the notifications described in FIGS. 6A-6O are triggered while touch screen 112 of device 100 is turned off, causing touch screen 112 to be turned on, such that the notifications are displayed on a lock screen of device 100. In the example shown in FIG. 6A, media content (e.g., a song or track) from album 604 (titled "Album") is being played. User interface 601-1 also includes audio playback controls such as previous button 606 for moving to the previous track or rewinding the audio being played, play/pause button 607 for toggling audio playback between on and off, and next button 608 for moving to the next track or fast forwarding through the audio being played. Volume control 605 is also displayed below the audio playback controls.

Figure 6B:
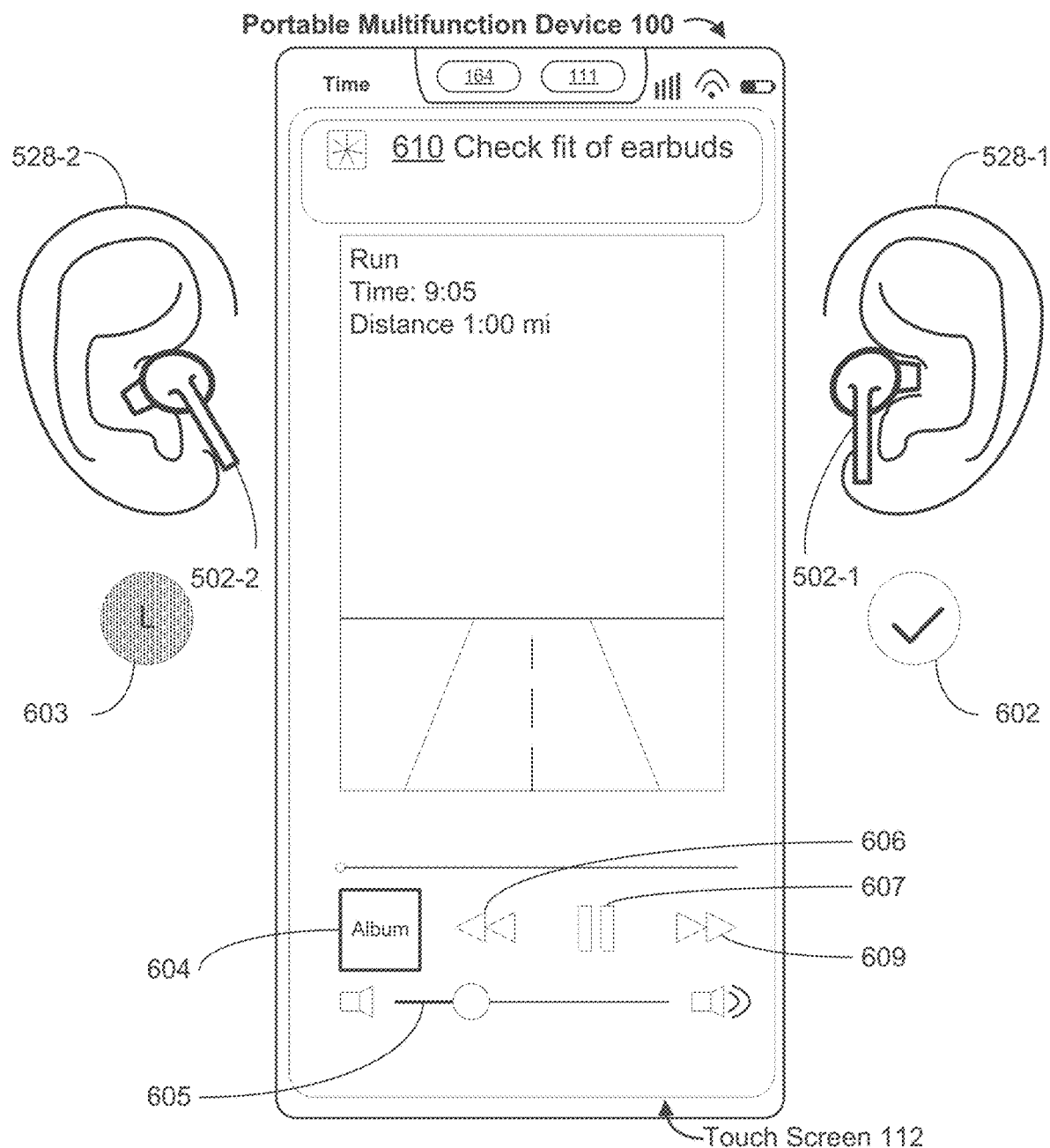

FIG. 6B illustrates that earbud 502-2 in ear 528-1 has become misaligned. Accordingly, status indicator 603 has changed (e.g., to a yellow circle with the letter 1') to indicate that earbud 502-2 no longer meets the fit criteria. In addition, notification 610 is displayed to alert the user of issue(s) with the fit of earbuds 502 and to prompt the user to check the fit of earbuds 502 in the user's ears. Although notification 610 and other notifications in FIGS. 6A-6O are shown as banner-style notifications (e.g., overlaid over a portion of a user interface of an application such as the fitness application), a respective notification may also or alternatively be shown on a lock screen of device 100 and/or in a notifications user interface. In some embodiments, an audio output that corresponds to notification 610 is played (e.g., via earbuds 502) and/or a tactile output that corresponds to notification 610 is provided. One of ordinary skill in the art will recognize that any combination of alerts (e.g., visual, audio, and/or tactile, etc.) may be used to alert the user that one or more earbuds no longer meets the fit criteria.

Figure 6C:
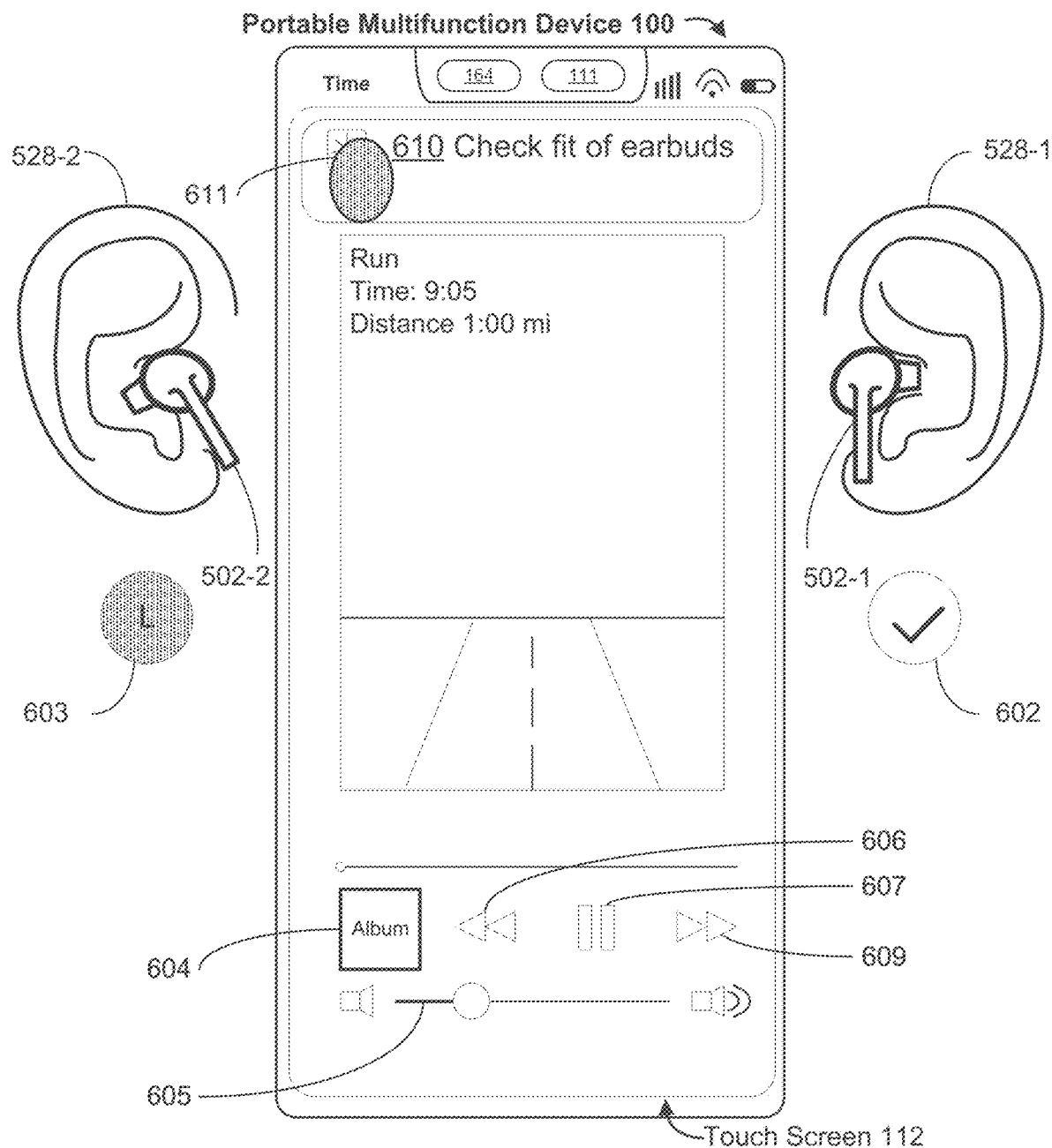
Figure 6D:
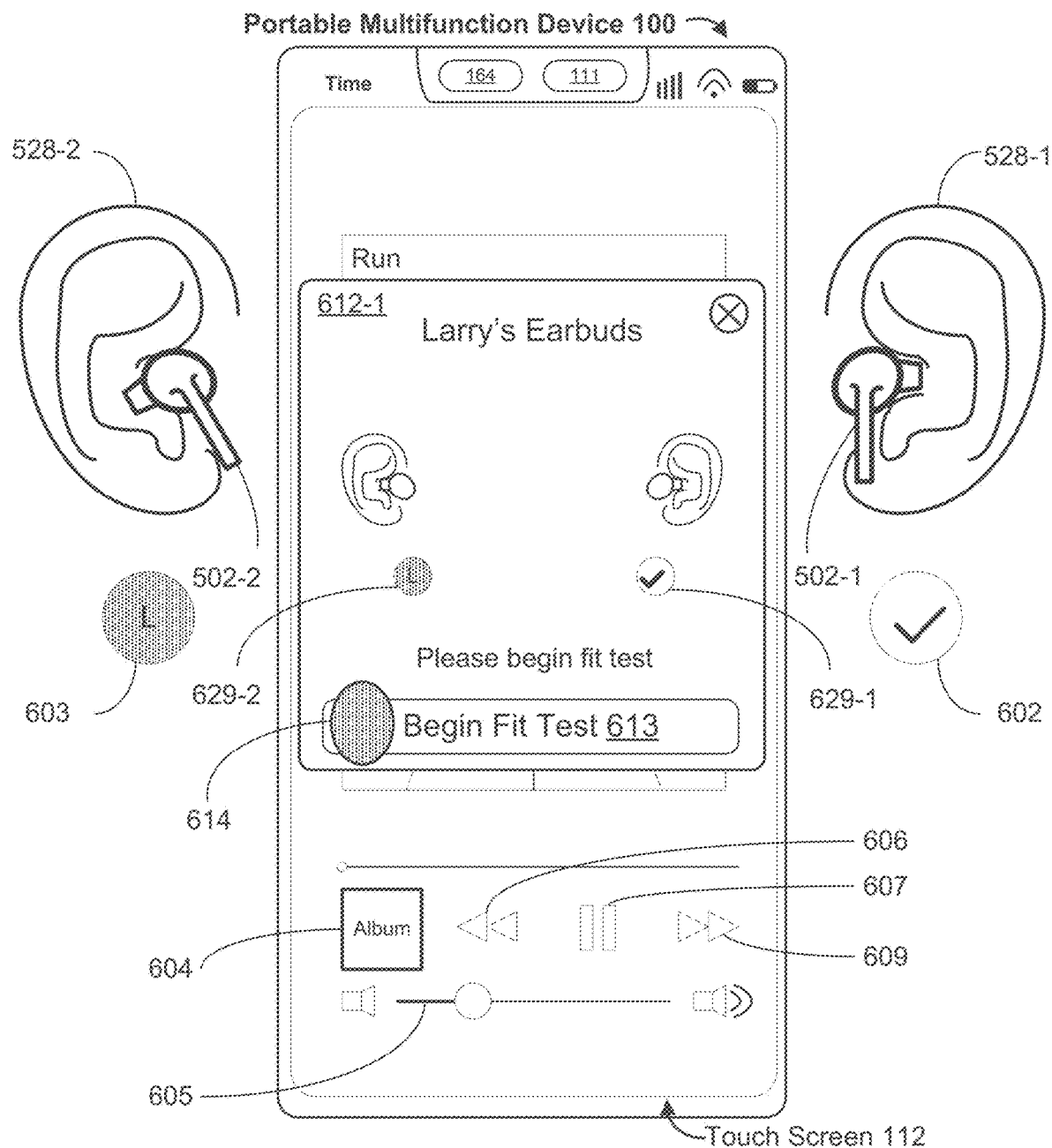
Figure 6E:
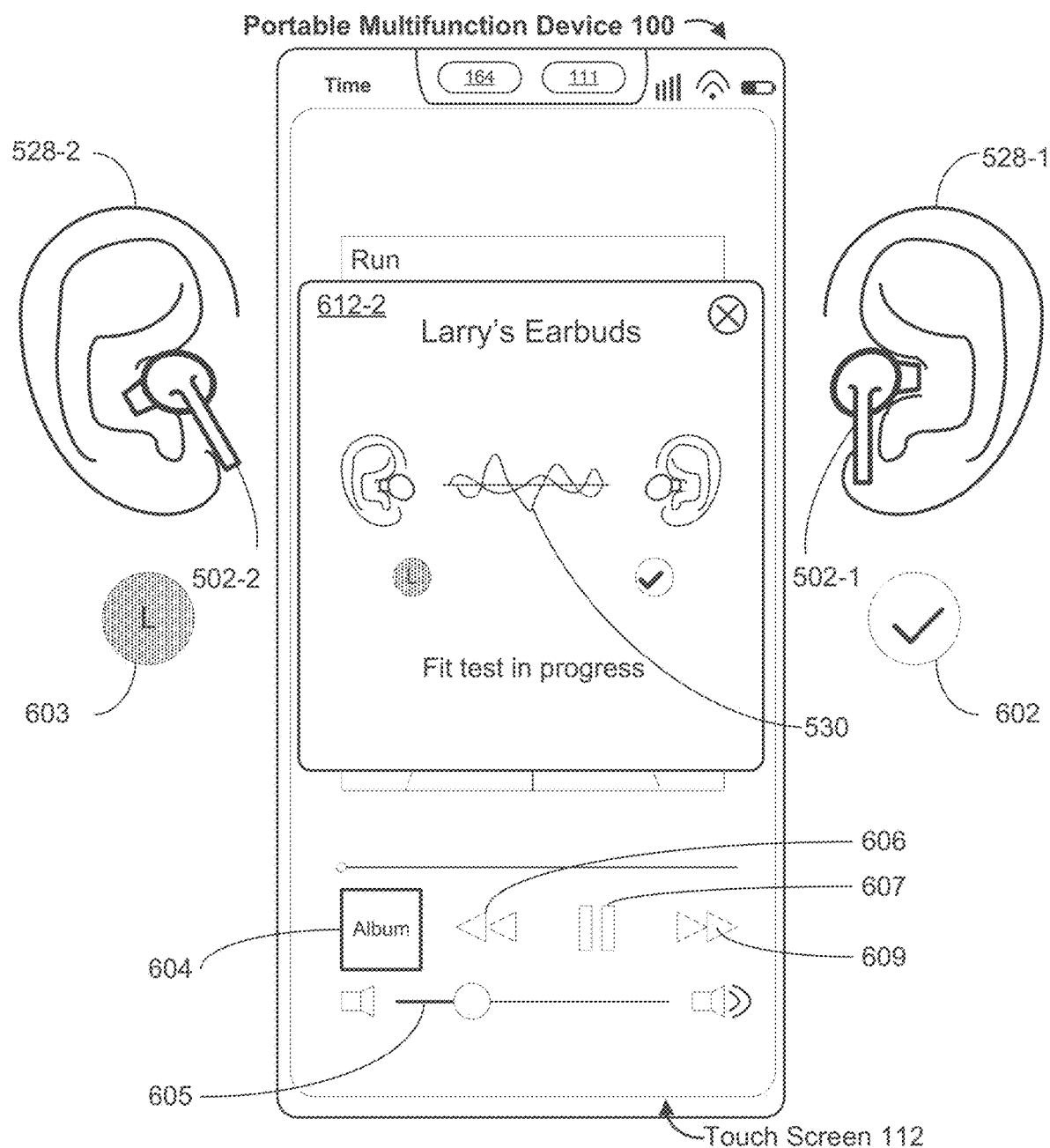

FIGS. 6C-6E illustrate an example user response to notification 610 alerting the user of the issue(s) with the fit of earbuds 502. In particular, FIG. 6C illustrates input 611 received at notification 610 to launch the fit test user interface. FIG. 6D illustrates that, in response to input 611 at notification 610, fit test user interface 612-1 (e.g., which is similar to user interface 521-3 shown in FIG. 5G) is displayed. User interface 612-1 includes indicators 629-1 and 629-2 that indicate the status of right earbud 502-1 and left earbud 502-2, respectively, and that correspond to status indicators 602 and 603, respectively. In addition, user interface 612-1 includes button 613, which can be activated to begin a fit test, and input 614 received at button 613 to begin the fit test. FIG. 6E shows user interface 612-2, which replaces user interface 612-1 of FIG. 6D, in response to input 614 being received at button 613 to begin the fit test. User interface 612-2 includes one or more indications that the fit test is being performed (e.g., in progress), such as animation 530 and the text "Fit test in progress." It is noted that in the example shown in FIGS. 6D-6E, user interface 612 is displayed in a window. In some embodiments, instead of being displayed in a window, user interface 612 is displayed on the entirety (or substantially all, e.g., greater than 95%, 96%, 97%, 98%, or 99%) of touch screen 112.

Figure 6F:
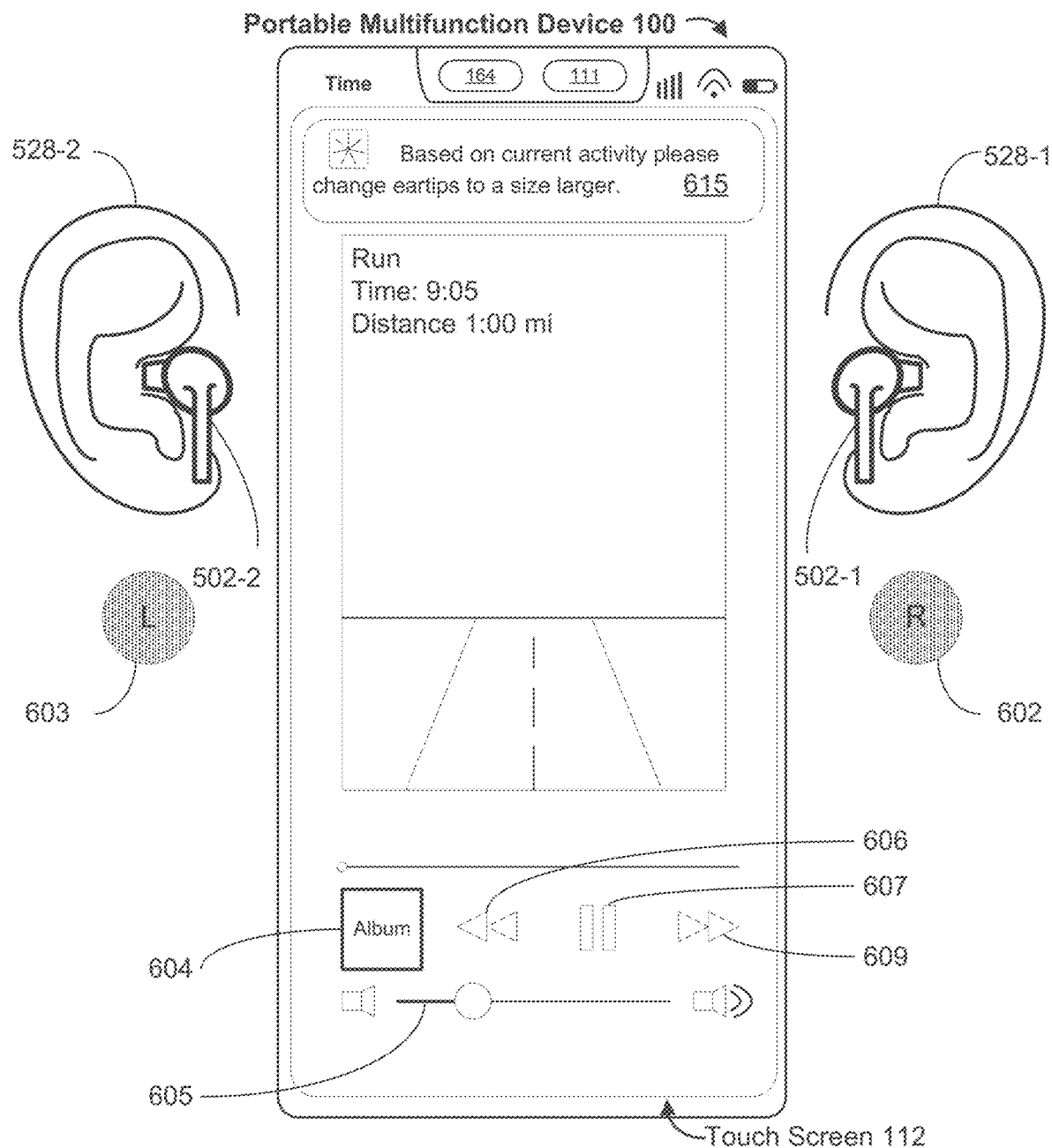

FIG. 6F illustrates alerting a user while the user is engaged in a particular activity when the user's earbuds no longer satisfy fit criteria during use. Status indicators 602 and 603 indicate that earbuds 502 do not meet the fit criteria (e.g., as indicated by the patterned fill of status indicators 602 and 603, representing a yellow color). Accordingly, notification 615 is displayed to prompt the user to change the eartips attached to earbuds 502 to larger eartips based on the user's current activity (e.g., based on the fact that the user is running, to achieve a better earbud fit during running). In some embodiments, device 100 (e.g., automatically) detects the current activity of the user. In some embodiments, the user indicates his or her current activity to device 100 (e.g., by launching the fitness application). In some embodiments, monitoring of the fit of earbuds 502 is performed during particular activities, such as exercise (e.g., running).

Figure 6G:
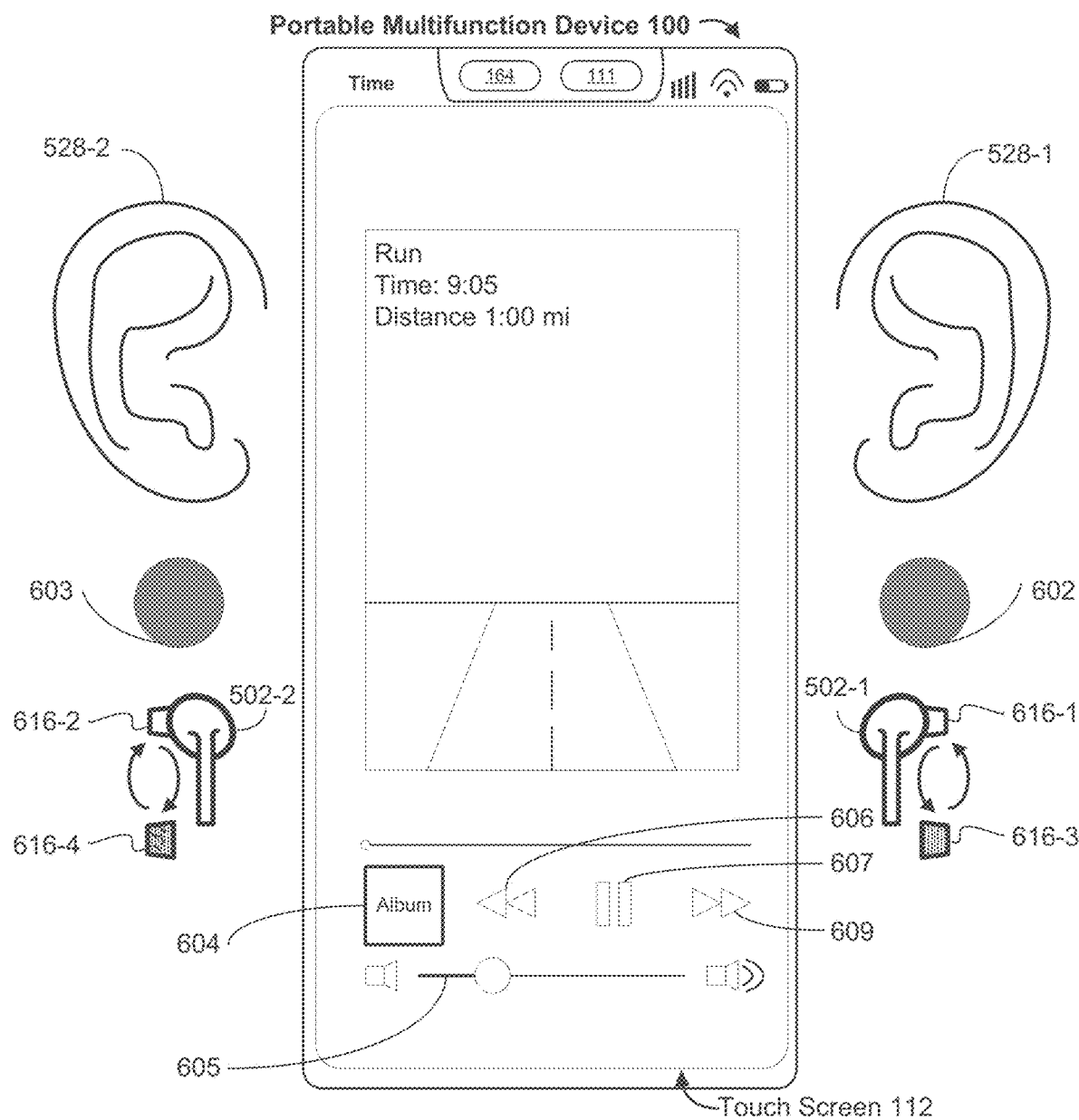
Figure 6H:
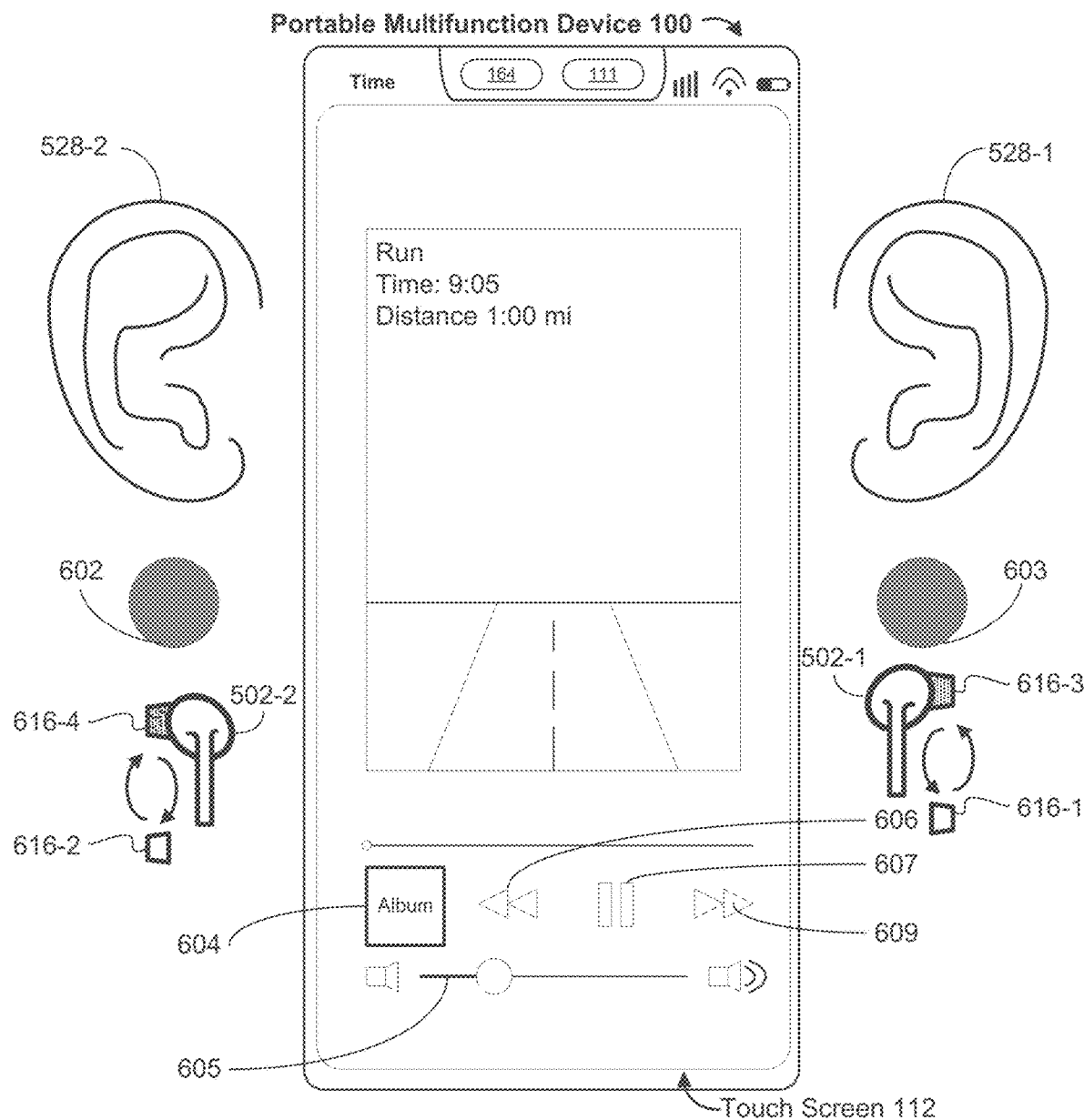

FIGS. 6G-6H show earbuds 502-1 and 502-2 removed from ears 528-1 and 528-2 of the user, as indicated by status indicators 602 and 603 having changed to solid gray circles. FIG. 6G also illustrates the currently-attached eartips 616-1 and 616-2 being exchanged for larger eartips 616-3 and 616-4, respectively. Notably, eartip 616-4 is in poor condition (e.g., having some debris (e.g., earwax) or damage (e.g., a tear in the eartip)). FIG. 6H shows earbuds 502-1 and 502-2 no longer coupled to eartips 616-1 and 616-2, respectively, and instead now coupled with eartips 616-3 and 616-4, respectively. In some embodiments, as in the example shown in FIGS. 6G-6H, notification 615 ceases to be displayed in response to the user at least partially complying with the prompt in notification 615 (e.g., by removing earbuds 502). Optionally, in some embodiments, notification 615 continues to be displayed after earbuds 502 are removed. In addition, in some embodiments, as in the example shown in FIGS. 6G-6H, device 100 continues to play audio while earbuds 502 are removed from the user's ears. Optionally, in some embodiments, device 100 pauses audio playback in response to one or both earbuds being removed, and optionally resumes playback when the earbud(s) are replaced in the ear(s).

Figure 6I:
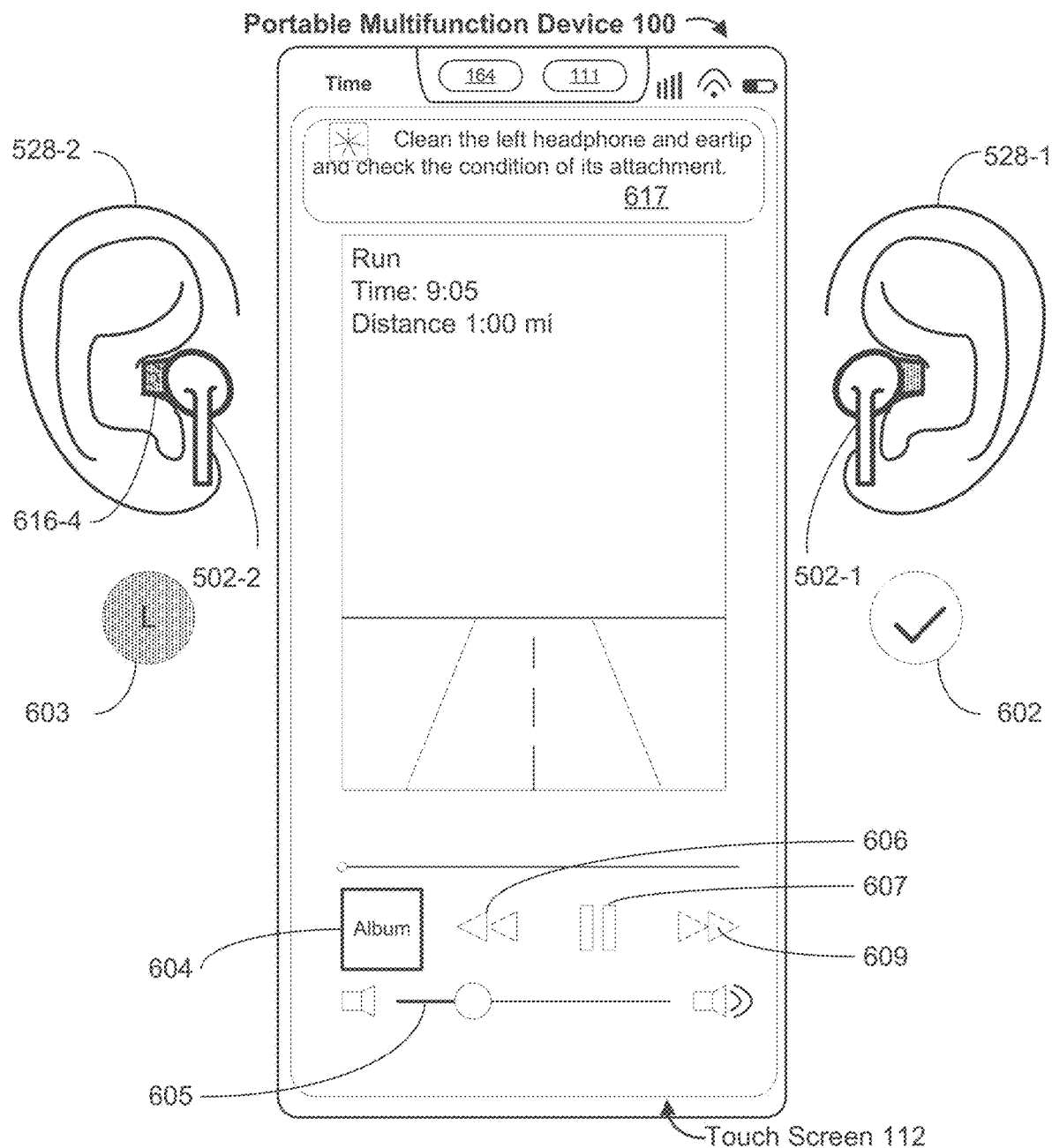

FIG. 6I illustrates earbuds 502-1 and 502-2 placed back in ears 528-1 and 528-2 of the user, respectively. Indicator 602 indicates that right earbud 502-1 and eartip 616-3 placed in right ear 528-1 meet fit criteria, while indicator 603 indicates that left earbud 502-2 and eartip 616-4 placed in left ear 528-2 do not meet fit criteria (e.g., as indicated by the patterned fill of status indicator 603, which represents a yellow color). In this example situation, earbud 502-2 and eartip 616-4 do not meet the fit criteria because eartip 616-4 is in poor condition (e.g., damaged or dirty) and is not creating a seal (or a sufficient seal) within ear 528-2. In accordance with eartip 616-4 attached to earbud 502-2 being in poor condition (e.g., damaged or dirty), notification 617 is displayed to notify the user that the earbud 502-2 and eartip 616-4 should be cleaned and/or eartip 616-4 replaced.

Figure 6J:
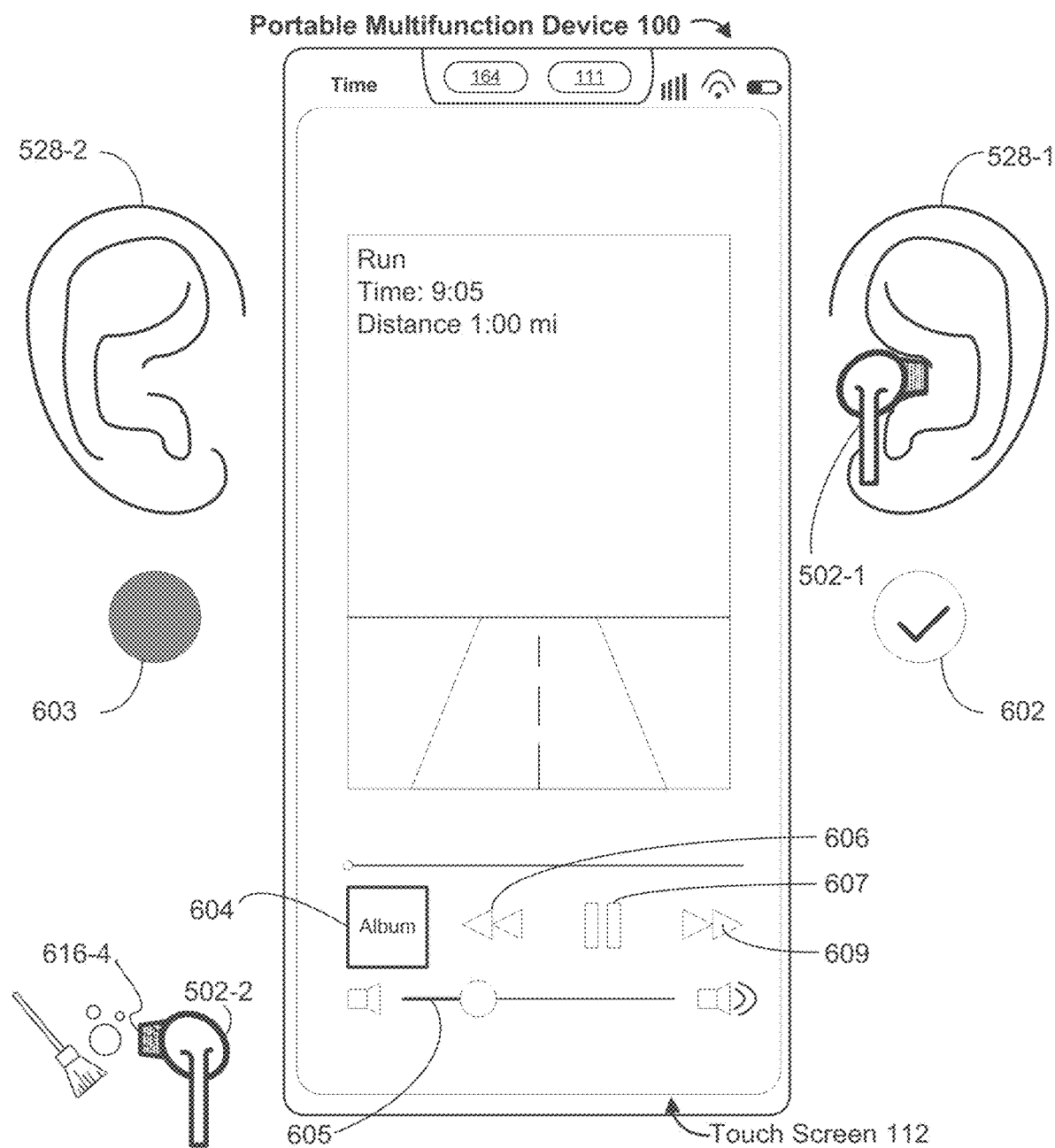

FIG. 6J shows earbud 502-2 removed from ear 528-2, as indicated by status indicator 603 having changed to a solid gray circle. FIG. 6J also illustrates eartip 616-4 being cleaned. In some embodiments, as in the example shown in FIG. 6J, notification 617 ceases to be displayed in response to the user at least partially complying with the prompt in notification 617 (e.g., by removing earbud 502-2). Optionally, in some embodiments, notification 617 continues to be displayed after earbud 502-2 is removed.

Figure 6K:
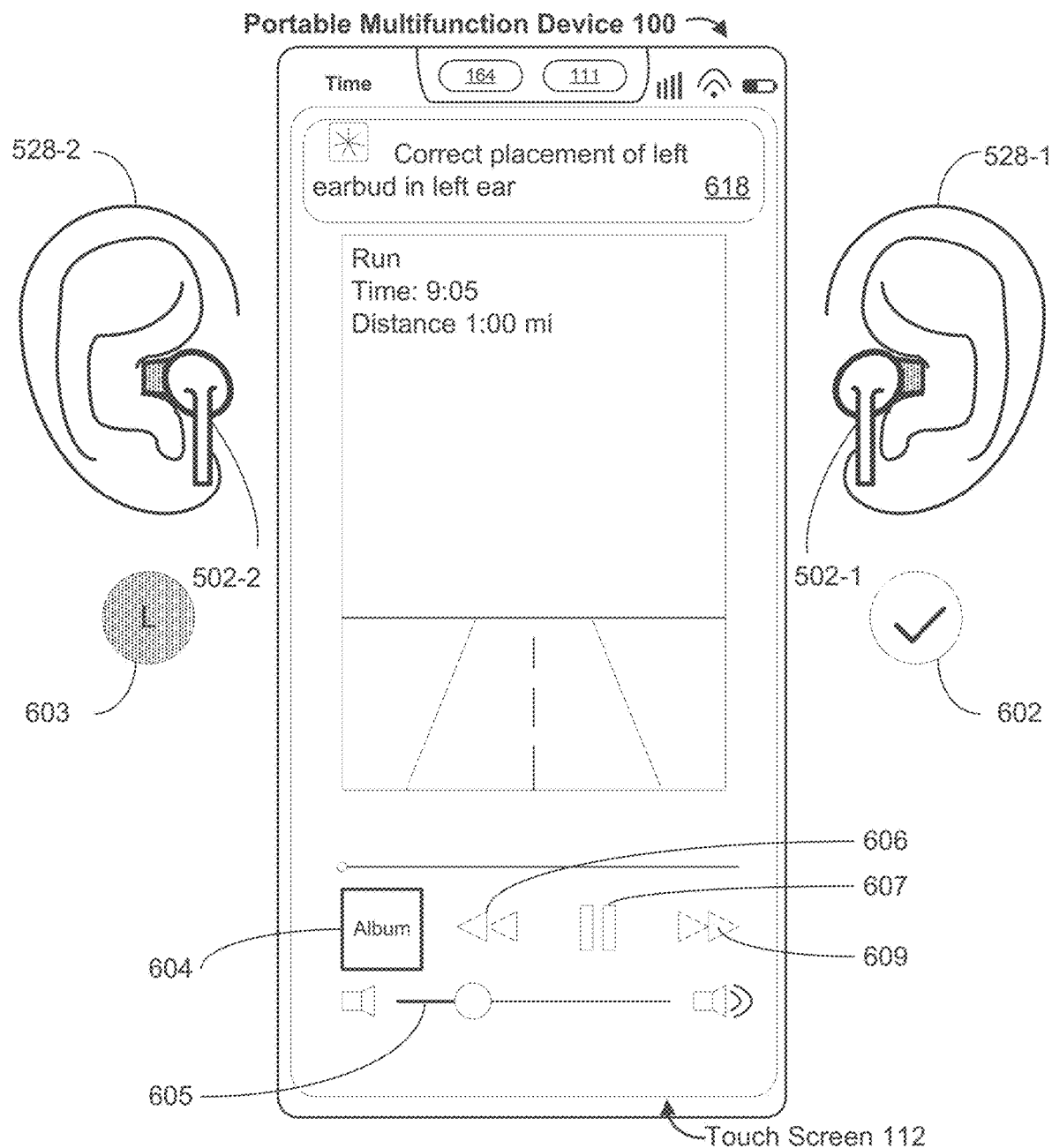

FIG. 6K illustrates earbud 502-2 placed back in ear 528-2 after being cleaned. However, earbud 502-2 has not been correctly placed in ear 528-2 and thus does not meet the fit criteria, as indicated by status indicator 603 (e.g., with a patterned fill representing a yellow color). Accordingly, device 100 displays notification 618 to prompt the user to correct the placement of left earbud 502-2 in left ear 528-2.

Figure 6L:
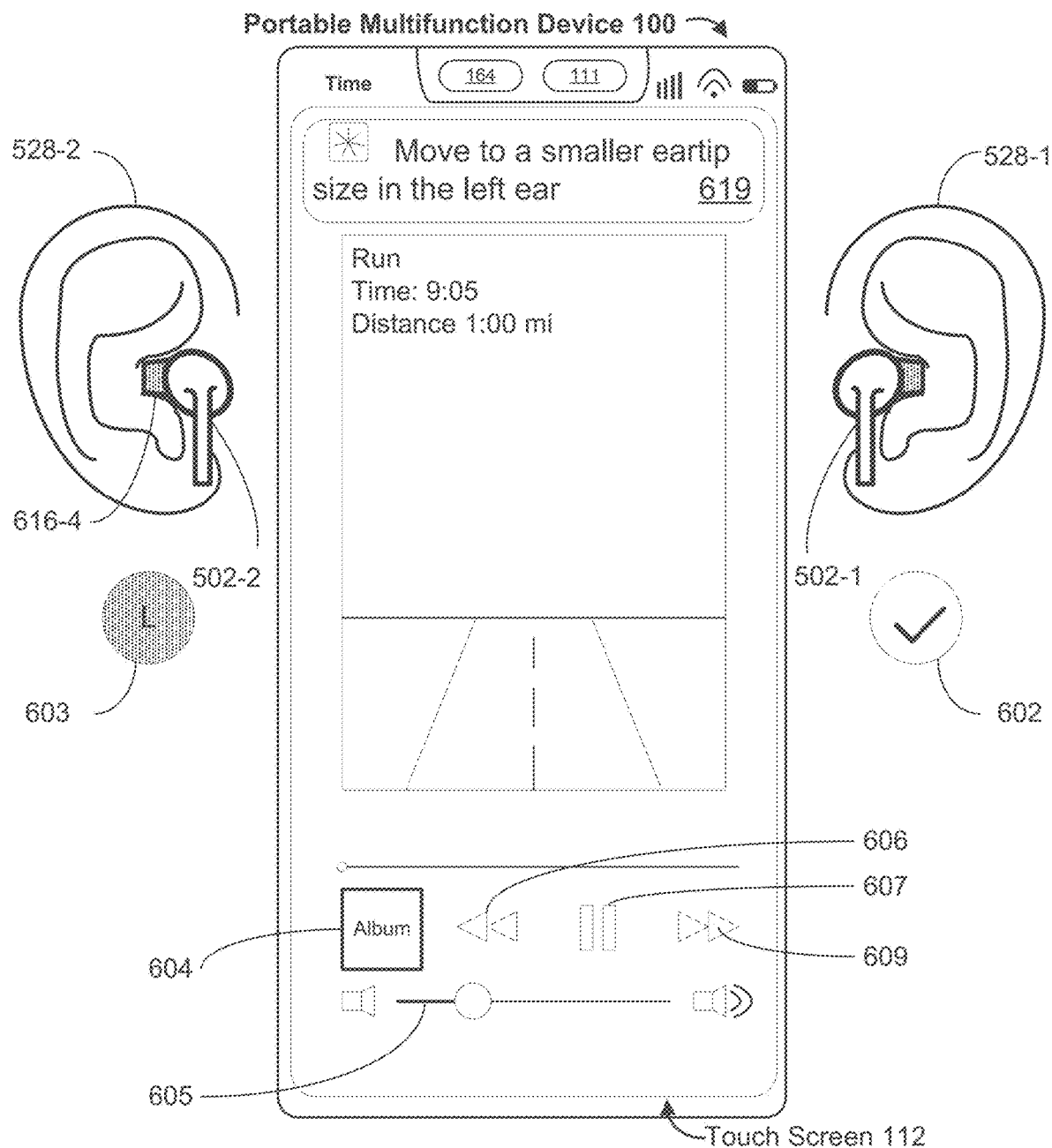

FIG. 6L illustrates earbud 502-2 properly aligned in ear 528-2 (e.g., after being repositioned in response to notification 618, FIG. 6K). However, earbud 502-2 (e.g., still) does not meet the fit criteria, as indicated by status indicator 603 (e.g., with the patterned fill representing the yellow color). Accordingly, device 100 displays notification 619 to prompt the user to change the current eartip 616-4 to a different size (e.g., smaller) eartip to try to improve the earbud fit.

Figure 6M:
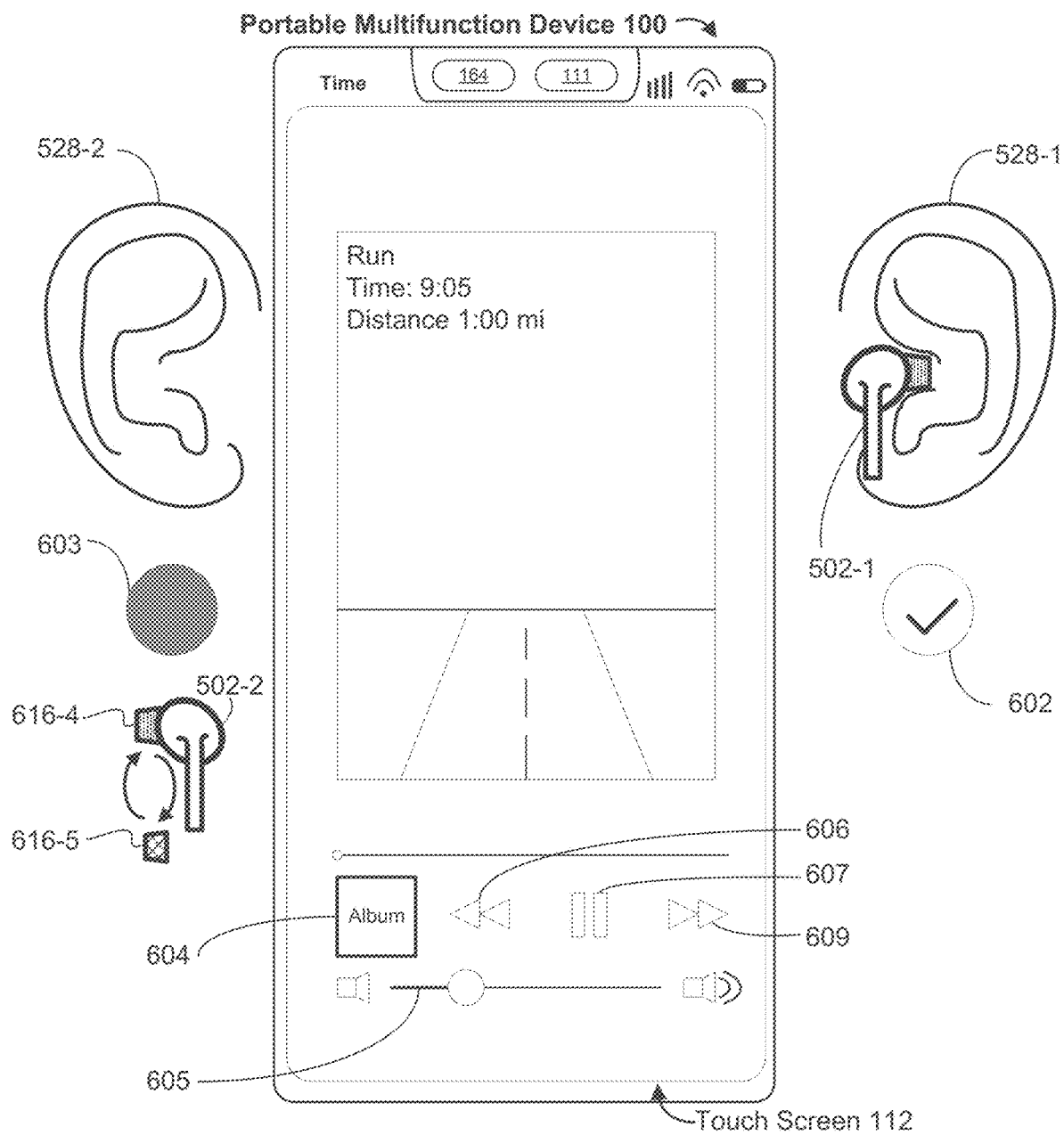
Figure 6N:
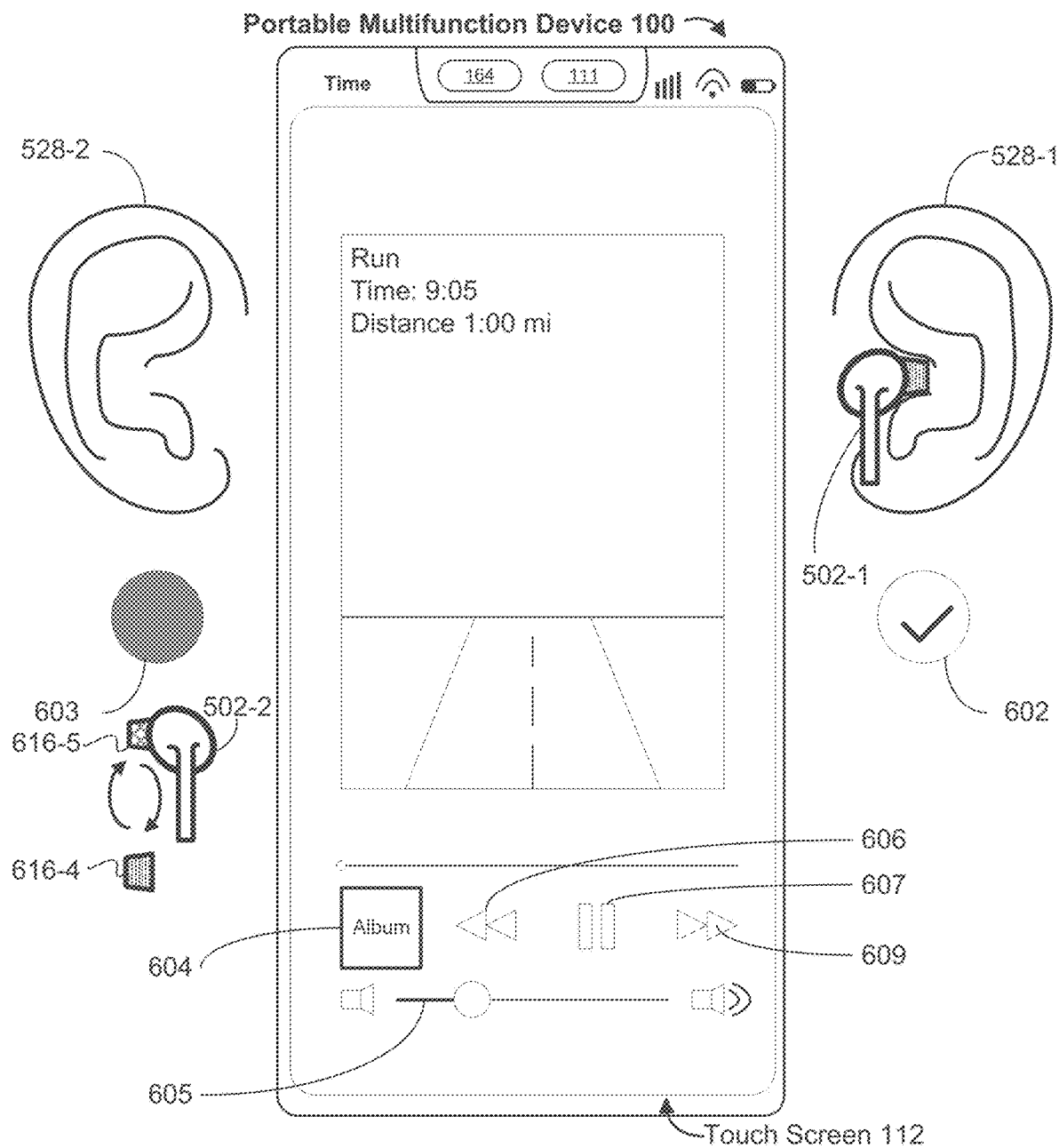

FIGS. 6M-6N illustrate earbud 502-2 removed from ear 528-2, as indicated by status indicator 603 having changed to a solid gray circle. FIG. 6M also illustrates eartip 616-4, the eartip currently attached to earbud 502-2, being exchanged for smaller eartip 616-5. FIG. 6N earbud 502-2 no longer coupled to eartip 616-4 and instead now coupled to smaller eartip 616-5. The currently attached eartip 616-4 is then placed next to the smaller eartip 616-5.

FIG. 6O illustrates earbud 502-2, now with eartip 616-5 attached, placed back in ear 528-2 of the user. Status indicator 603 indicates that earbud 502-2 is now properly fitted in ear 528-2. In some embodiments, device 100 displays an indication that earbud 502-2 is now properly fitted in an ear of the user (e.g., an indication that both earbuds 502 are now properly fitted in the user's ears) (e.g., after repeating the fit test after earbud 502-2, with eartip 616-5 attached, has been replaced in ear 528-2, and in accordance with a determination that earbud 502-2 meets the fit criteria).

FIGS. 7A-7Q illustrate example user interfaces and user interactions for changing the audio output mode of a wearable audio output device in accordance with some embodiments.

FIG. 7A illustrates example user interface 700, which is similar to user interface 601-1 as shown in and described with reference to FIG. 6A. User interface 700 is a user interface of a fitness application that is associated with a current activity of the user (e.g., running) and that is being used to play media content (e.g., music) via earbuds 502. Additionally, FIG. 7A shows swipe gesture 701 beginning from an initial position 701-1 in the upper right corner of touch screen 112 and moving downward across touch screen 112.

Figure 7B:
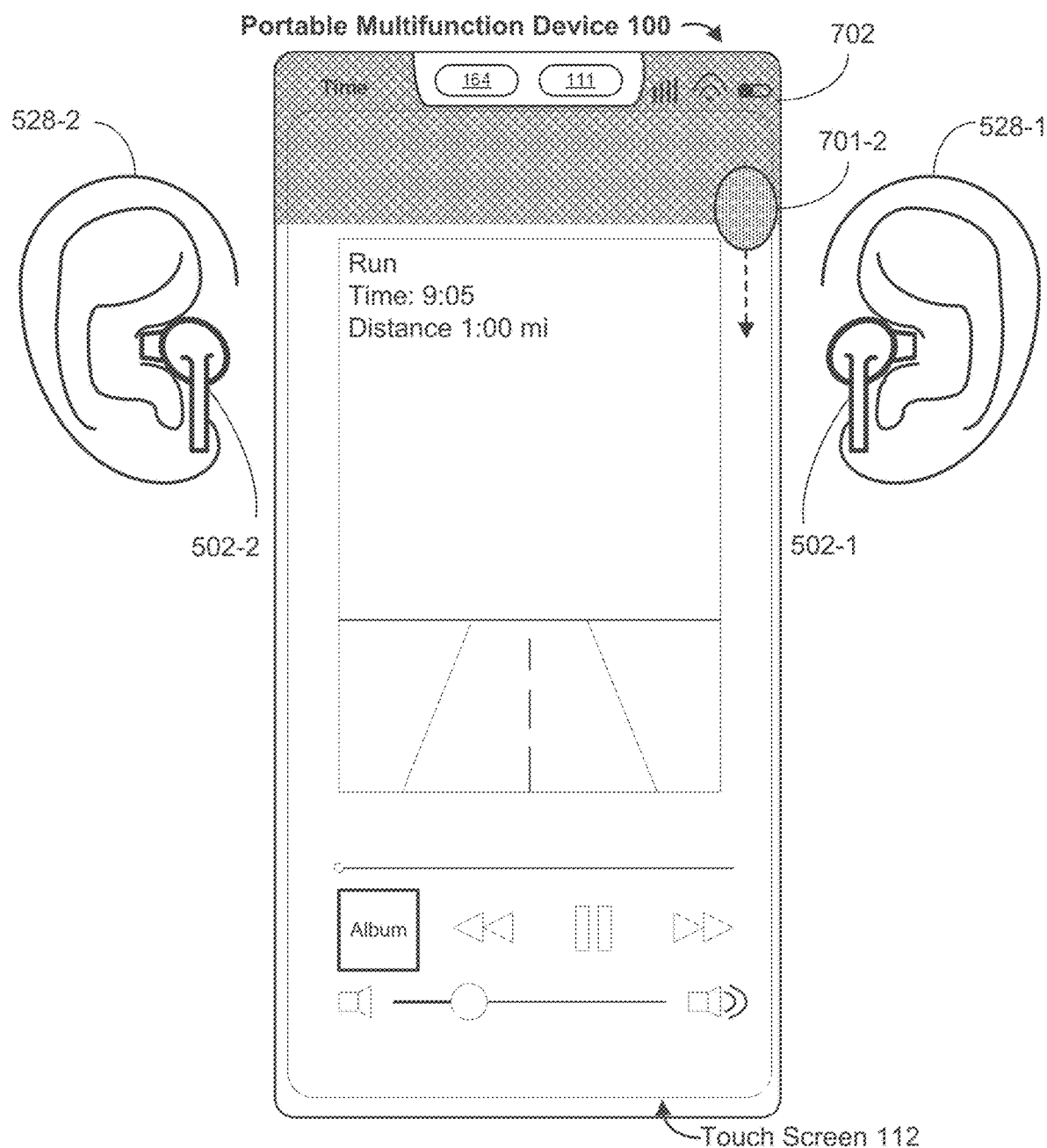

FIG. 7B illustrates that in response to a first portion of swipe gesture 701 from initial position 701-1 to second position 701-2, device 100 displays a first portion of a settings user interface 702 (sometimes also called a control panel user interface) over at least a portion of user interface 700.

Figure 7C:
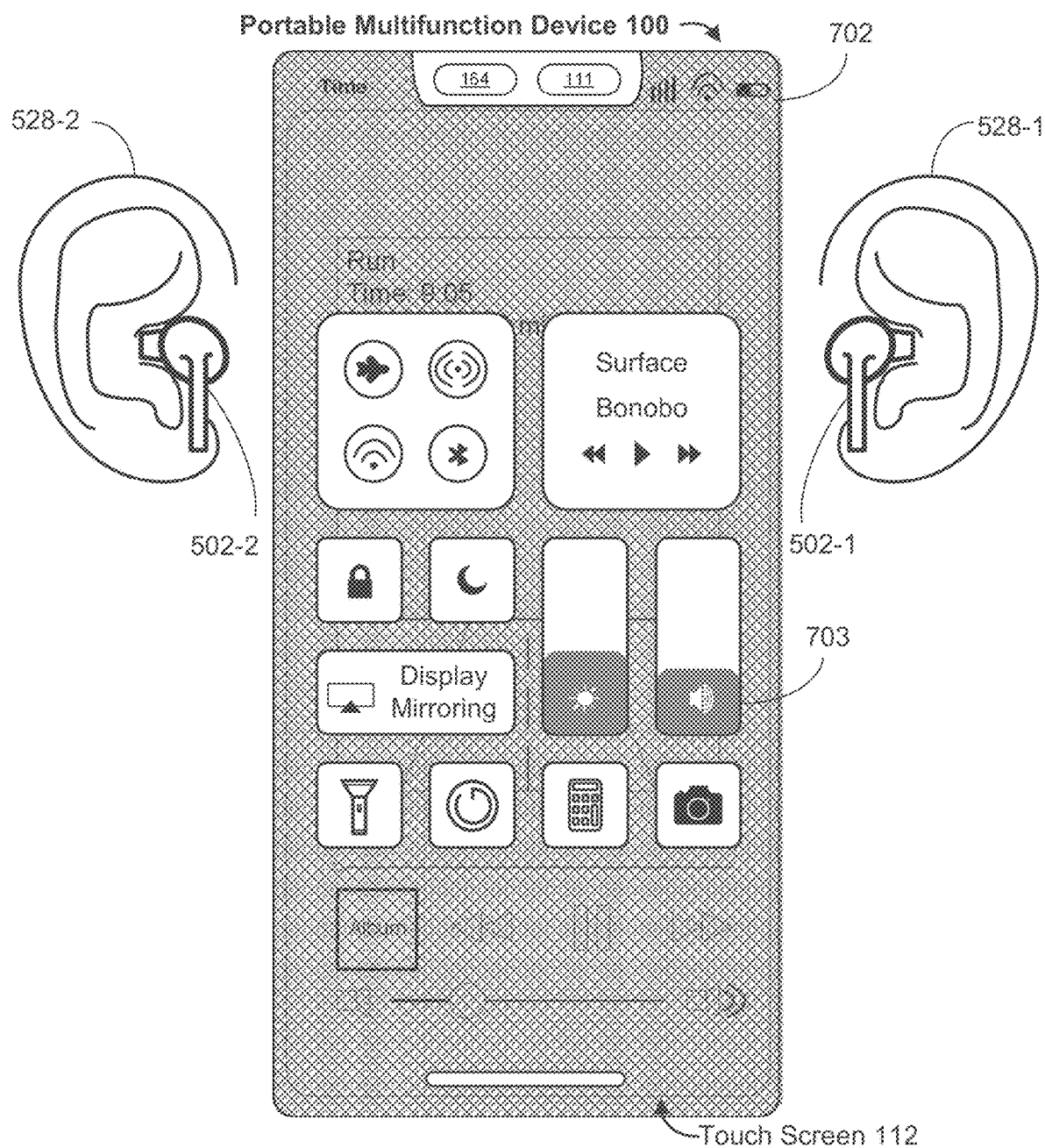

FIG. 7C illustrates settings user interface 702 displayed over the entirety (or substantially all, e.g., greater than 95%, 96%, 97%, 98%, or 99%) of user interface 700 (e.g., in response to ceasing to detect swipe gesture 701, optionally after further downward movement of swipe gesture 701 across touch screen 112). In some embodiments, user interface 700 is at least partially obscured or blurred behind settings user interface 702 such that distinct features of user interface 700 are not discernible. Settings user interface 702 includes a plurality of controls for various features of device 100. Notably, settings user interface 702 includes volume control 703. Upward and downward swipe inputs on volume control 703 may be provided to increase or decrease, respectively, the volume of audio outputs from device 100 (e.g., via earbuds 502).

Figure 7D:
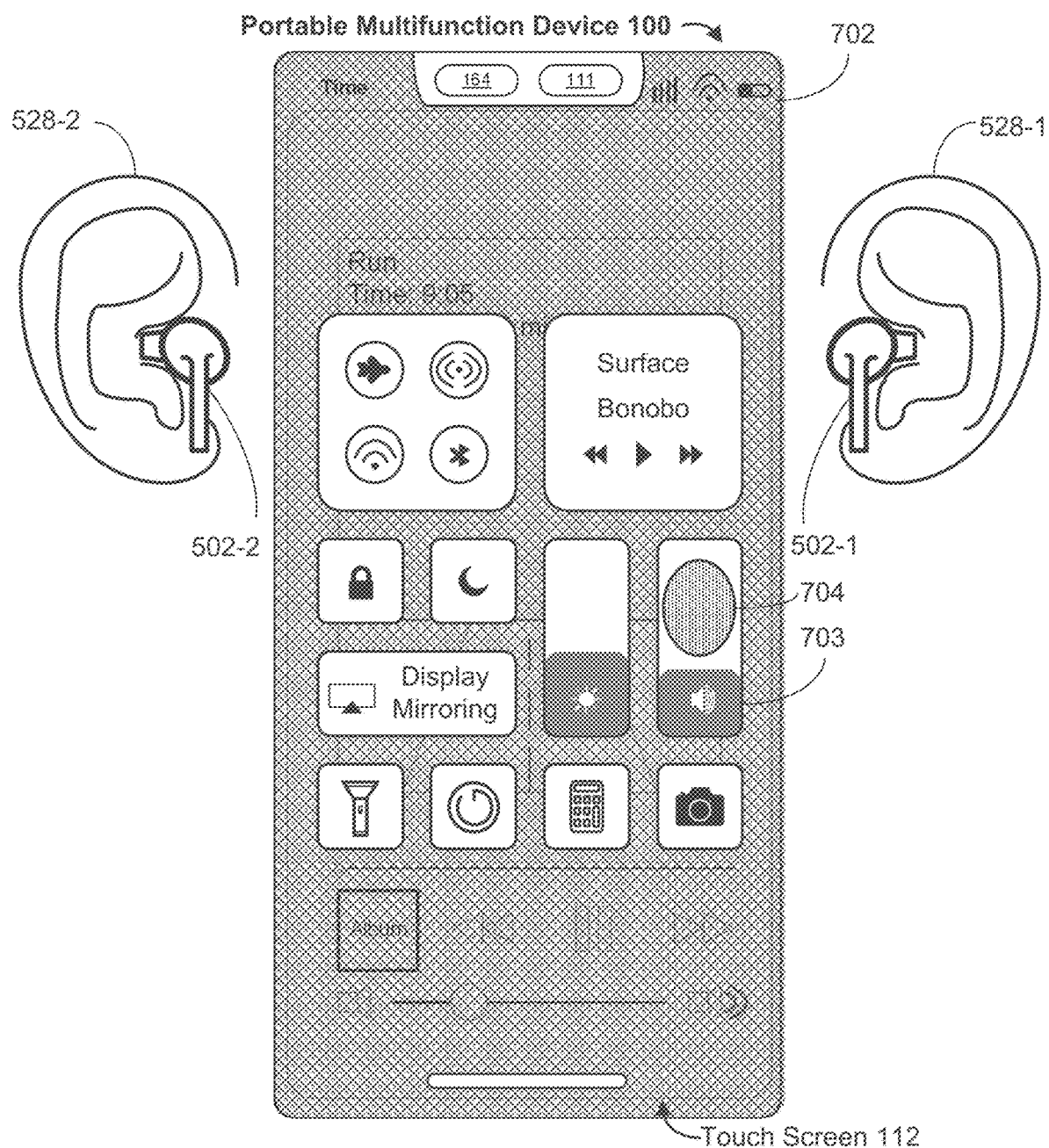

FIG. 7D illustrates input 704 (e.g., a press gesture that meets an intensity threshold that is above a nominal contact detection intensity threshold, or a long press gesture that is maintained on touch screen 112 for at least a threshold amount of time) at volume control slider.

Figure 7E:
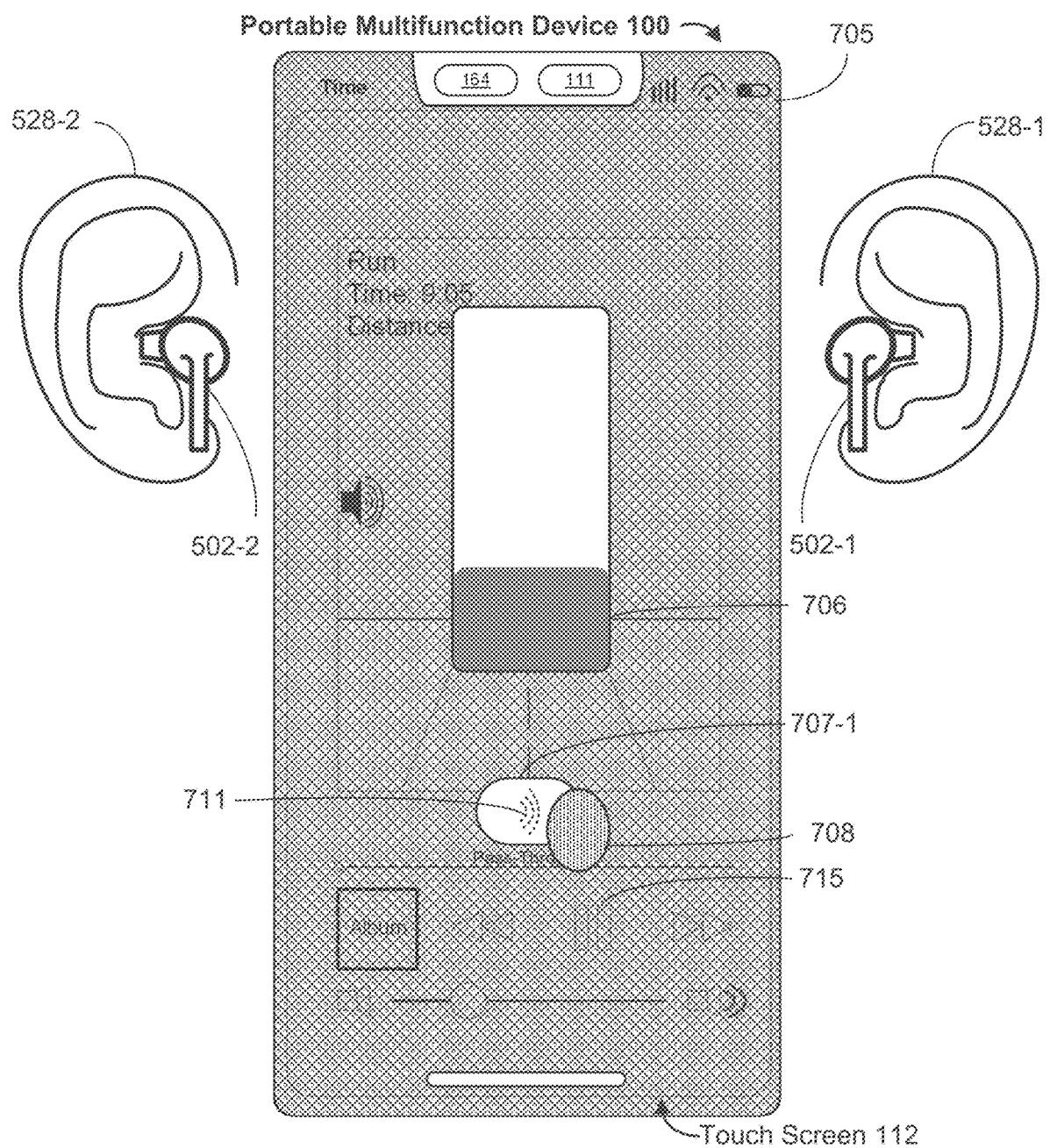

FIG. 7E illustrates a transition from FIG. 7D. In particular, FIG. 7E shows enhanced volume control user interface 705, which is displayed in response to input 704 on volume control 703 (FIG. 7D). Enhanced volume control user interface 705 includes volume control 706, which is an enlarged version of volume control 703 (FIG. 7D) is enlarged, and which allows for finer (e.g., more granular) volume control. Additionally, user interface 705 includes noise management control 707-1 that indicates the audio output mode in which earbuds 502 are currently operating. As shown in FIG. 7E, earbuds 502 are operating in an active pass-through audio output mode in which one or more pass-through audio components are output so that the user can hear a greater amount of ambient sound from the surrounding physical environment than would otherwise be perceivable to the user (e.g., as described herein with reference to FIG. 3C), which is indicated by pass-through icon 711 within noise management control 707-1. FIG. 7E also shows input 708 (e.g., a tap gesture) at noise management control 707-1.

Figure 7F:
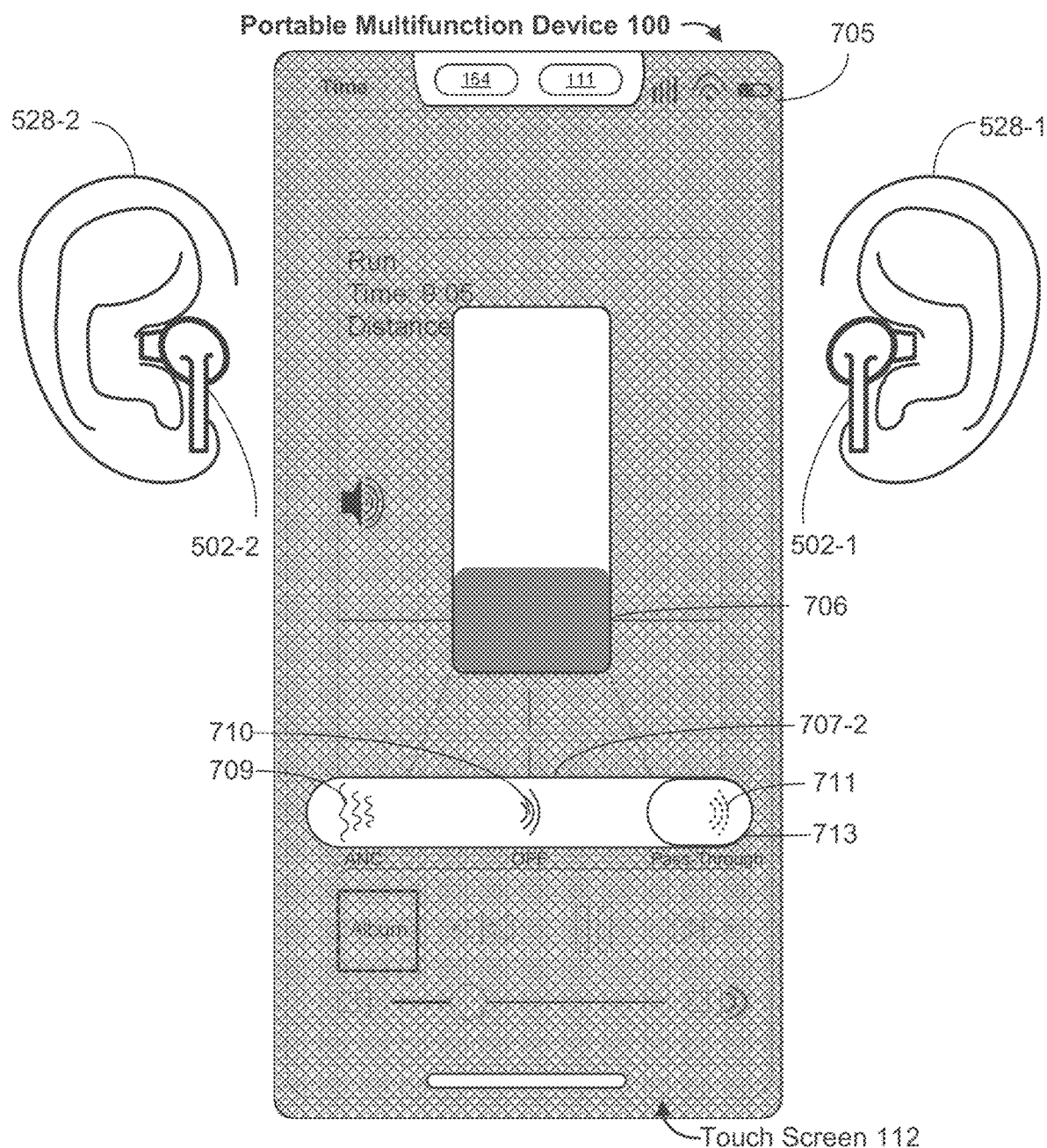

FIG. 7F shows expanded noise management control 707-2, which includes representations of three available audio output modes for earbuds 502, each of which is associated with a different audio output mode available for earbuds 502. In particular, expanded noise management control 707-2 includes pass-through icon 711, bypass icon 710, and active noise control icon 709. Active noise control icon 709 represents an active noise control ("ANC") audio output mode in which one or more audio-cancelling audio components are output to at least partially cancel ambient sound from the surrounding physical environment that would otherwise be perceivable to the user. Bypass icon 710 represents a bypass audio output mode in which neither audio-cancelling audio components nor pass-through audio components are provided (e.g., any amount of ambient sound that the user perceives is due to physical attenuation by the earbuds 502 (and any attached eartips) in the user's ears). Selection indicator 713 displayed over pass-through icon 711 (e.g., and not displayed over either bypass icon 710 or active noise control icon 709) indicates that the audio pass-through mode represented by pass-through icon 711 is the mode in which earbuds 502 are currently operating.

Figure 7G:
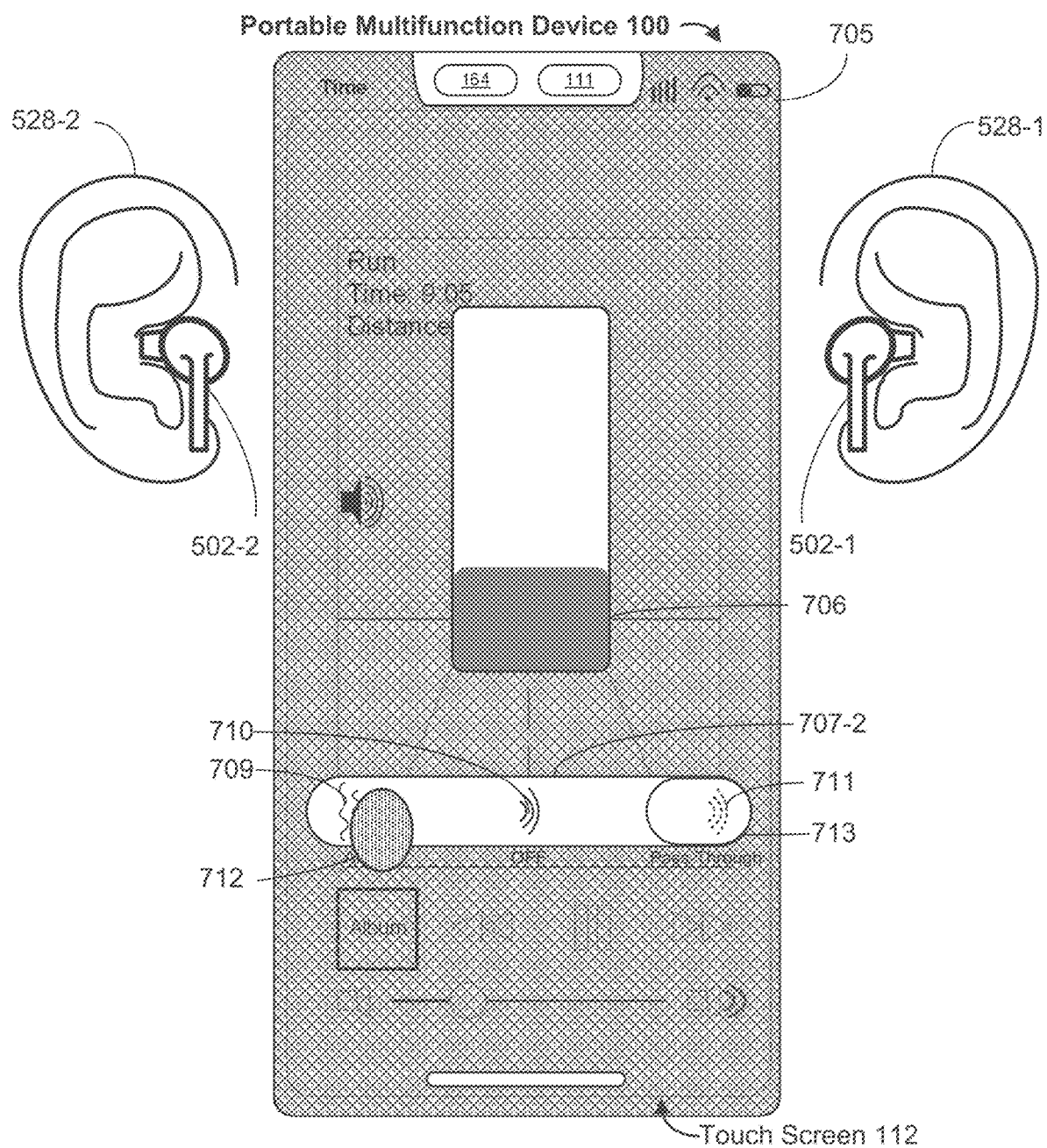
Figure 7H:
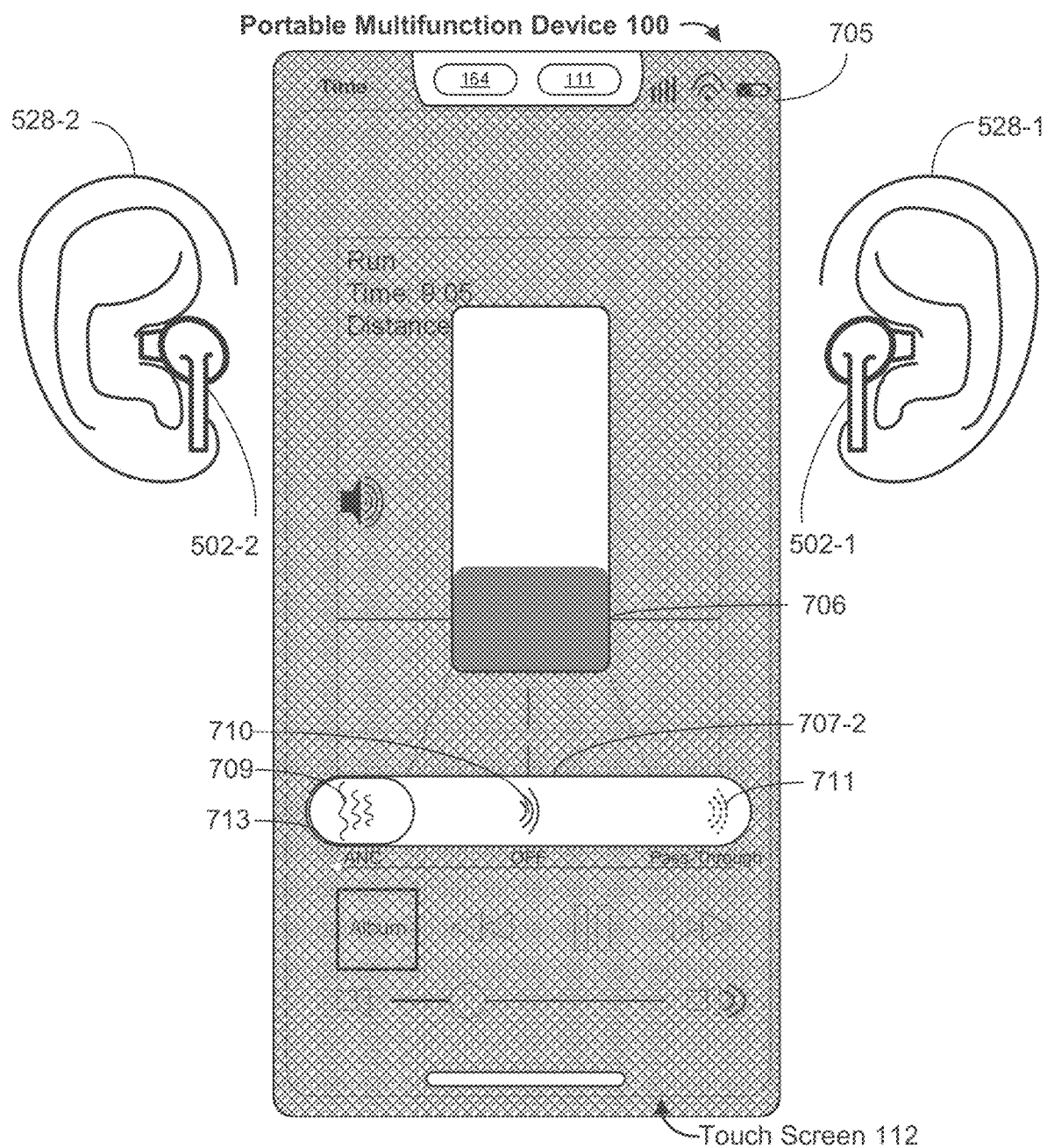

FIG. 7G illustrates input 712 (e.g., a tap gesture) at active noise control icon 709. FIG. 7H illustrates that, in response to detecting input 712 at active noise control icon 709, selection indicator 713 ceases to be displayed over pass-through icon 711 and is instead displayed over active noise control icon 709. In addition, the audio output mode of earbuds 502 is changed from the audio pass-through mode represented by pass-through icon 711 to the active noise control mode represented by active noise control icon 709. In some embodiments, an audible tone is output to indicate that the audio output mode has been changed.

Figure 7I:
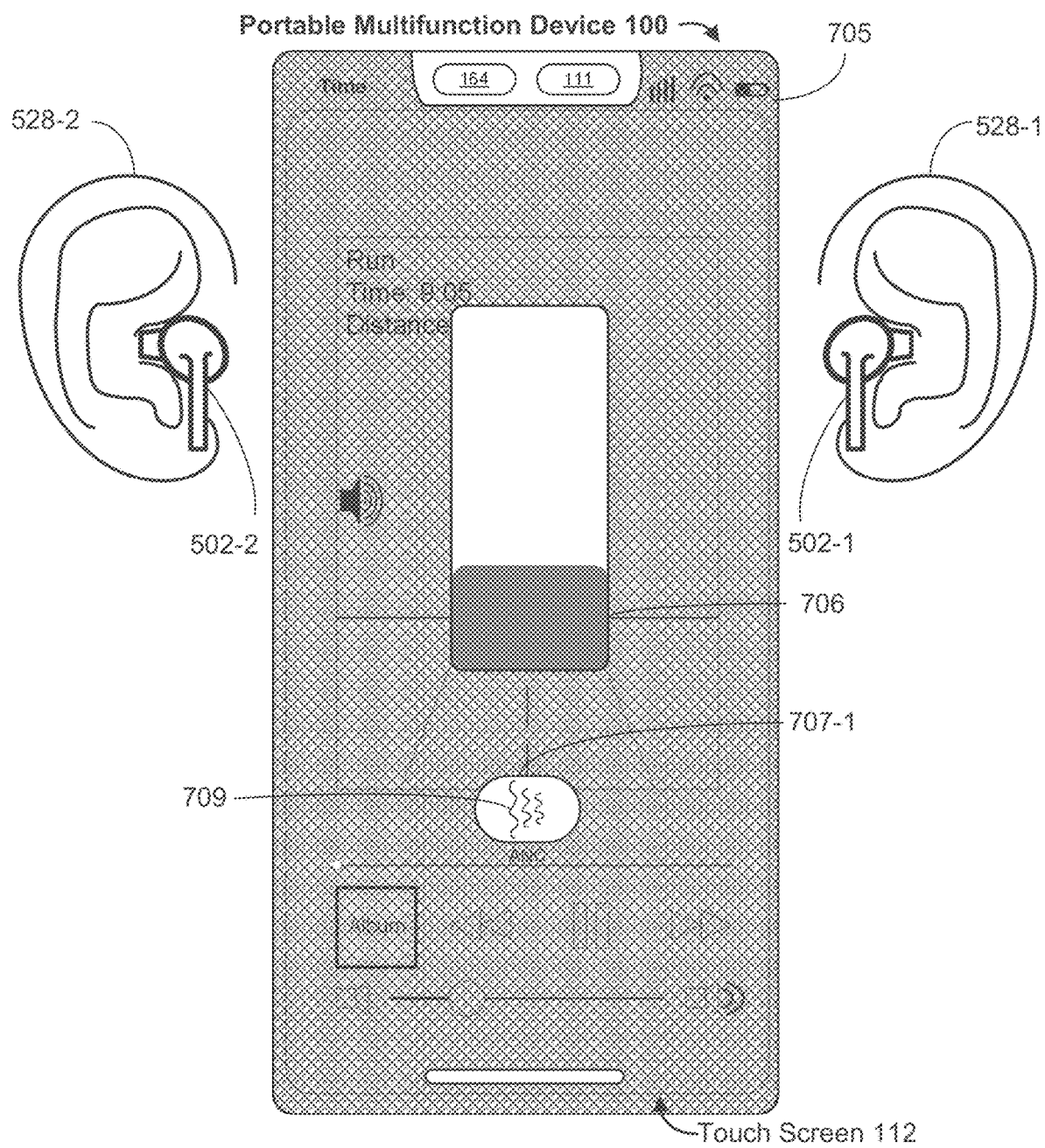

FIG. 7I illustrates that expanded noise management control 707-2 has been collapsed to noise management control 707-1, which indicates (e.g., only) the audio output mode in which earbuds 502 are currently operating (e.g., the active noise control mode represented by active noise control icon 709) without displaying representations of any other audio output modes (e.g., without displaying bypass icon 710 or pass-through icon 711).

Figure 7J:
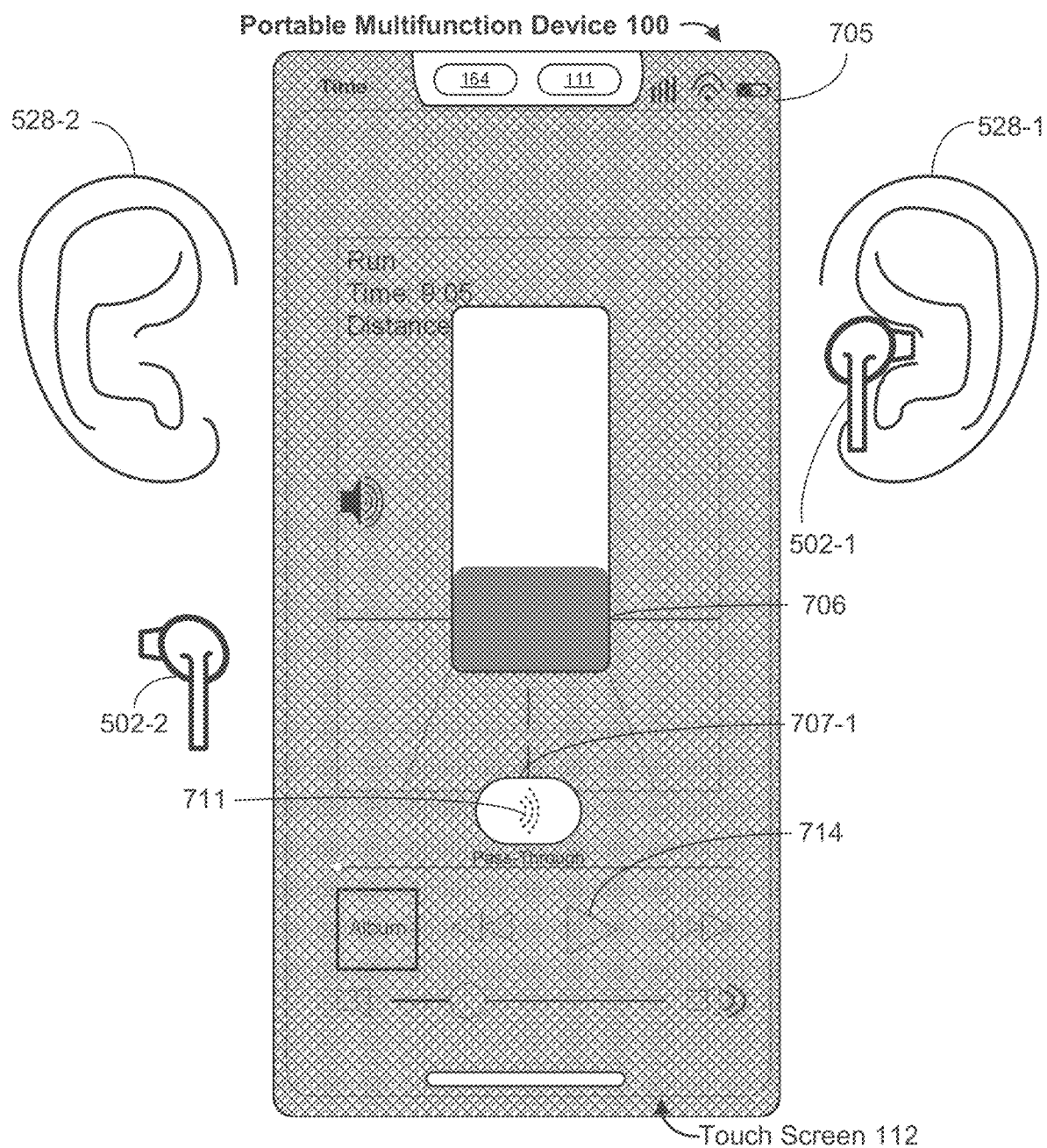
Figure 7K:
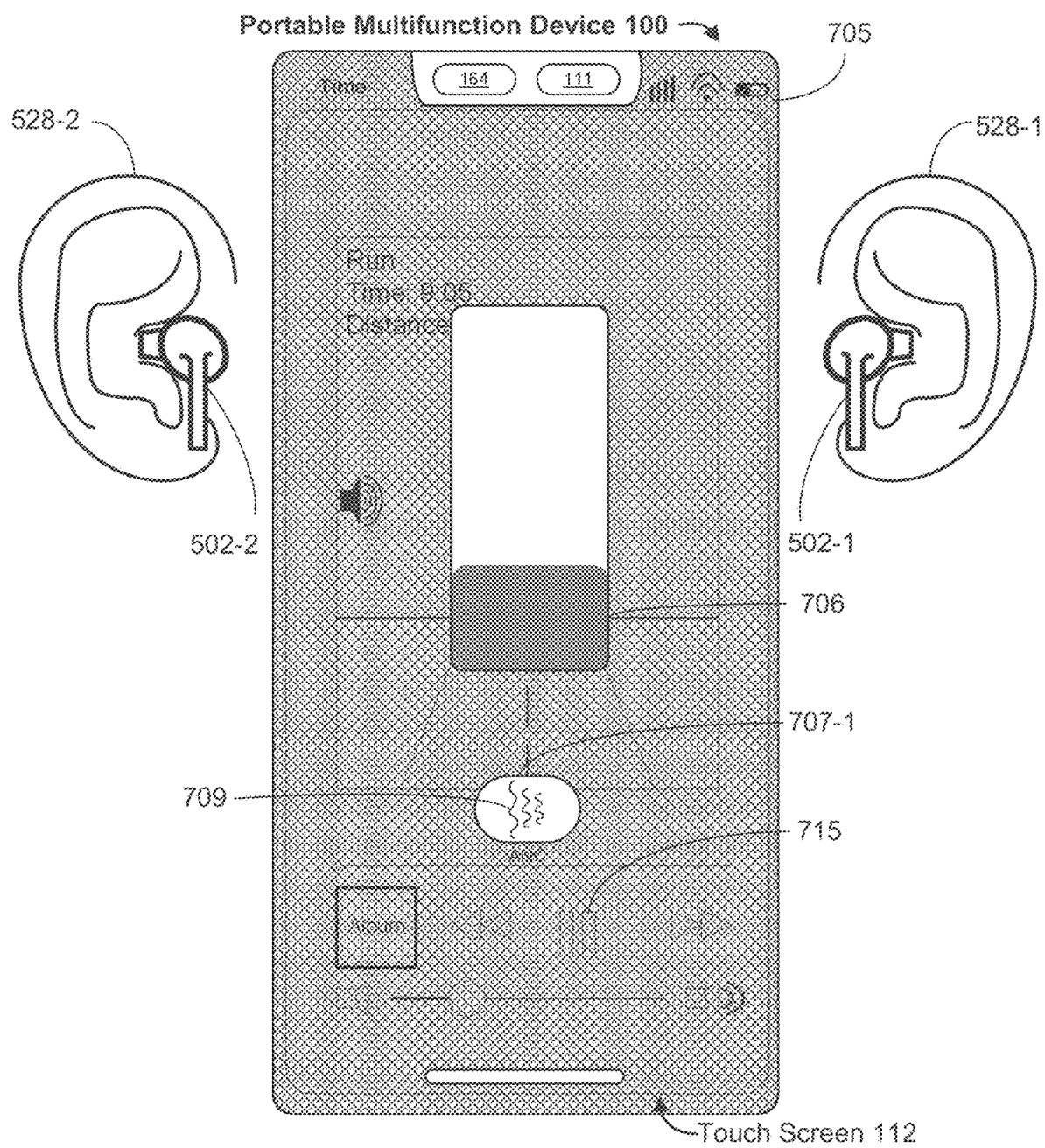
Figure 7L:
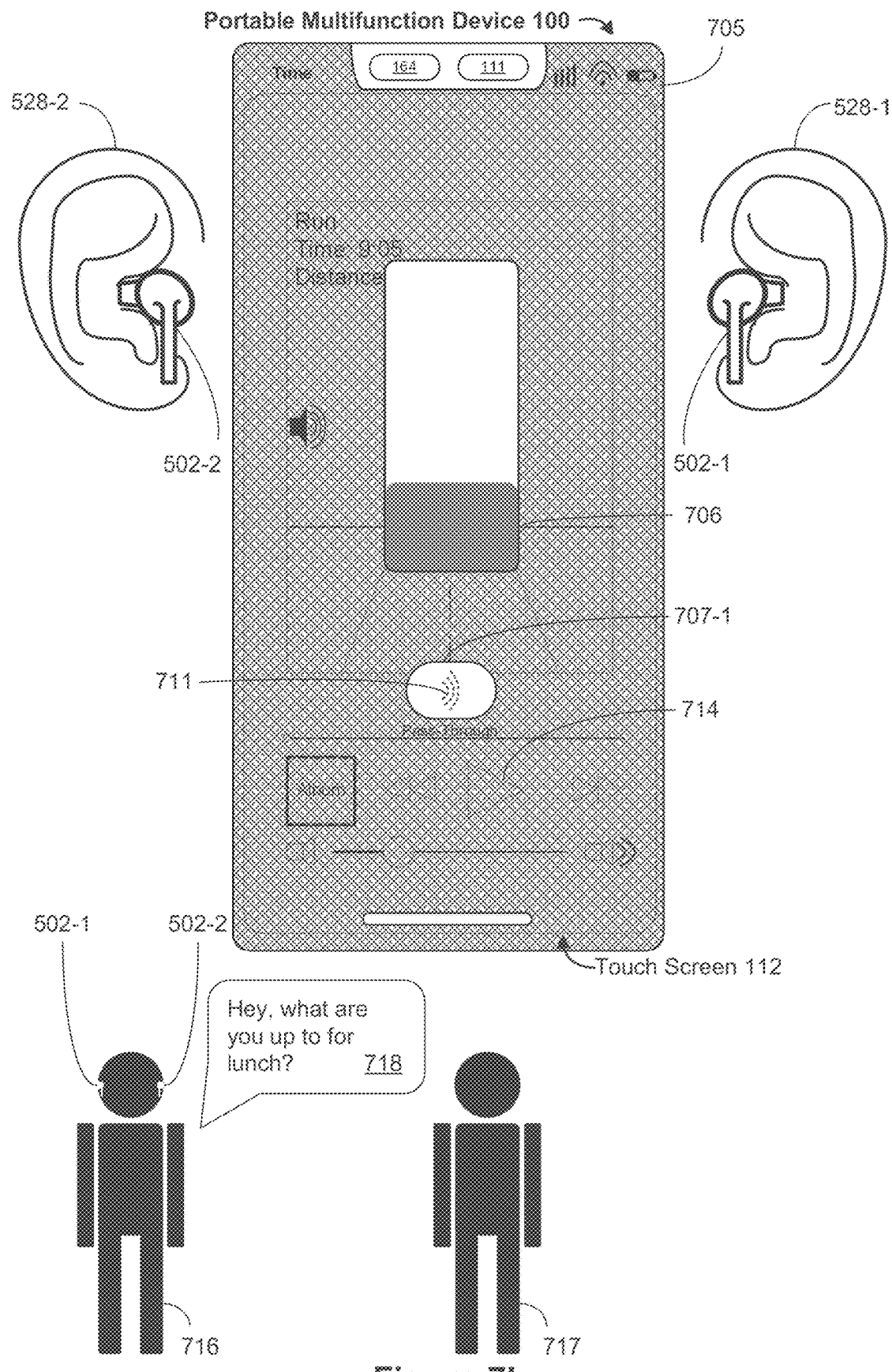
Figure 7M:
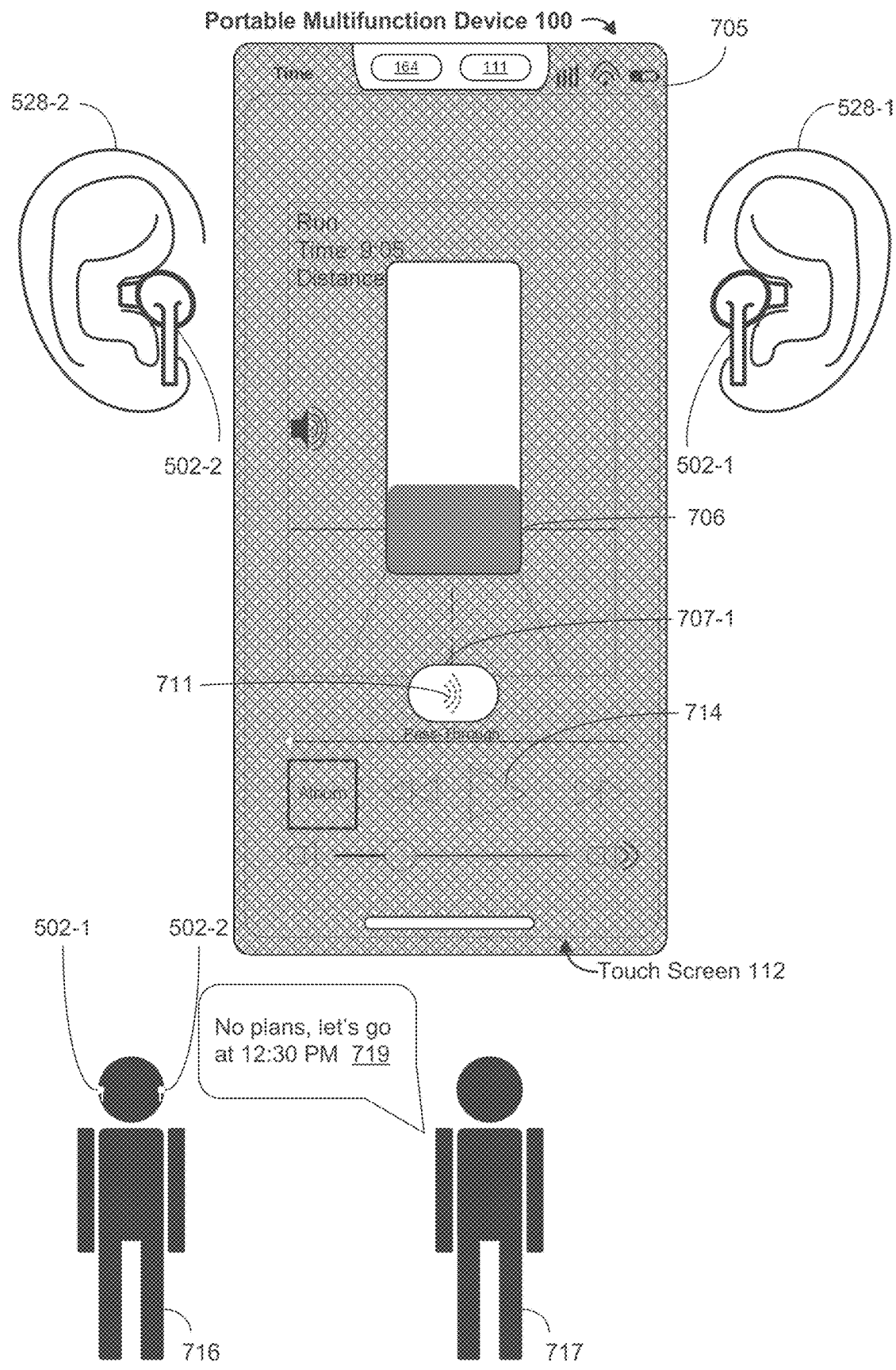
Figure 7N:
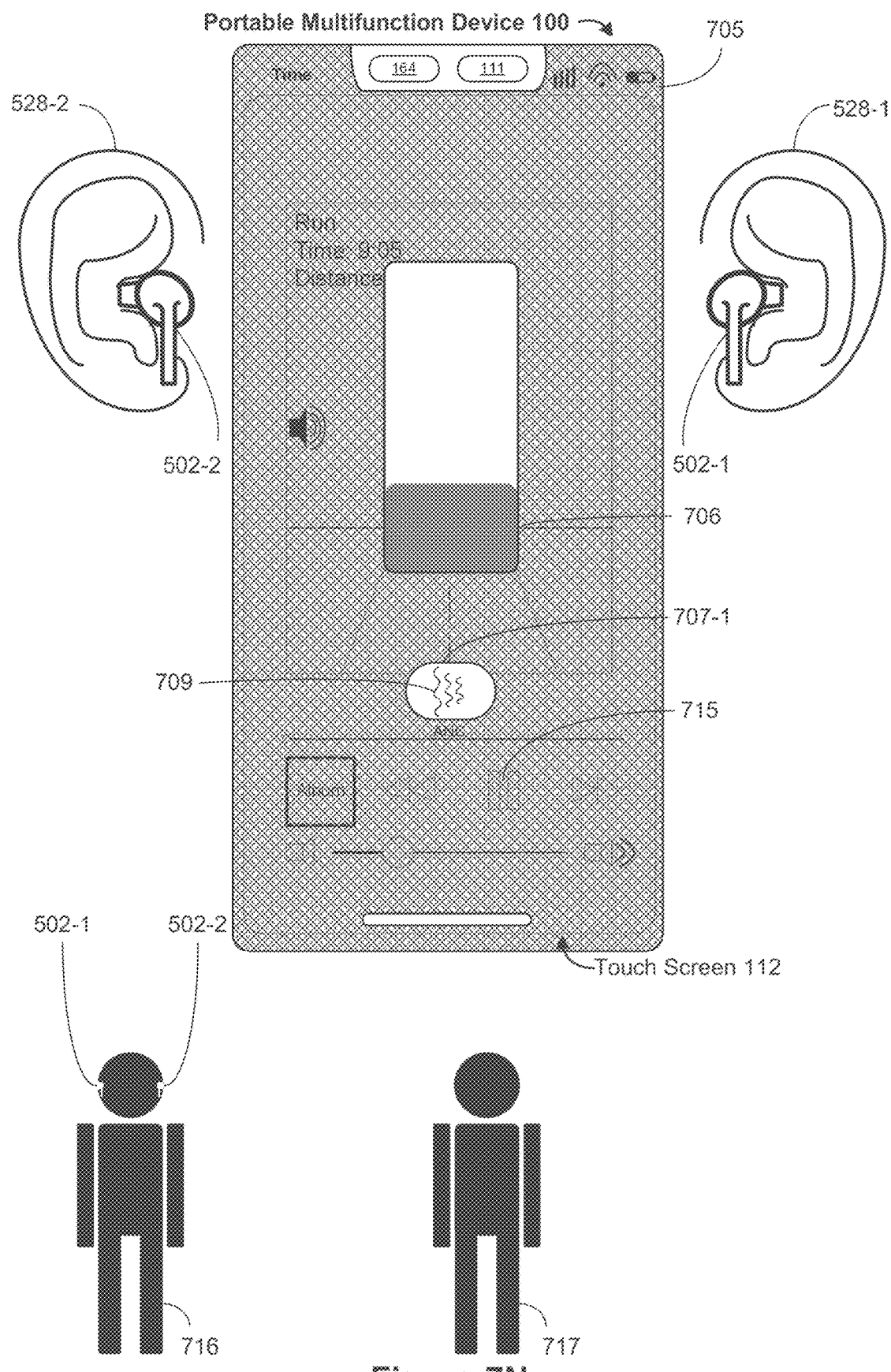
Figure 7O:
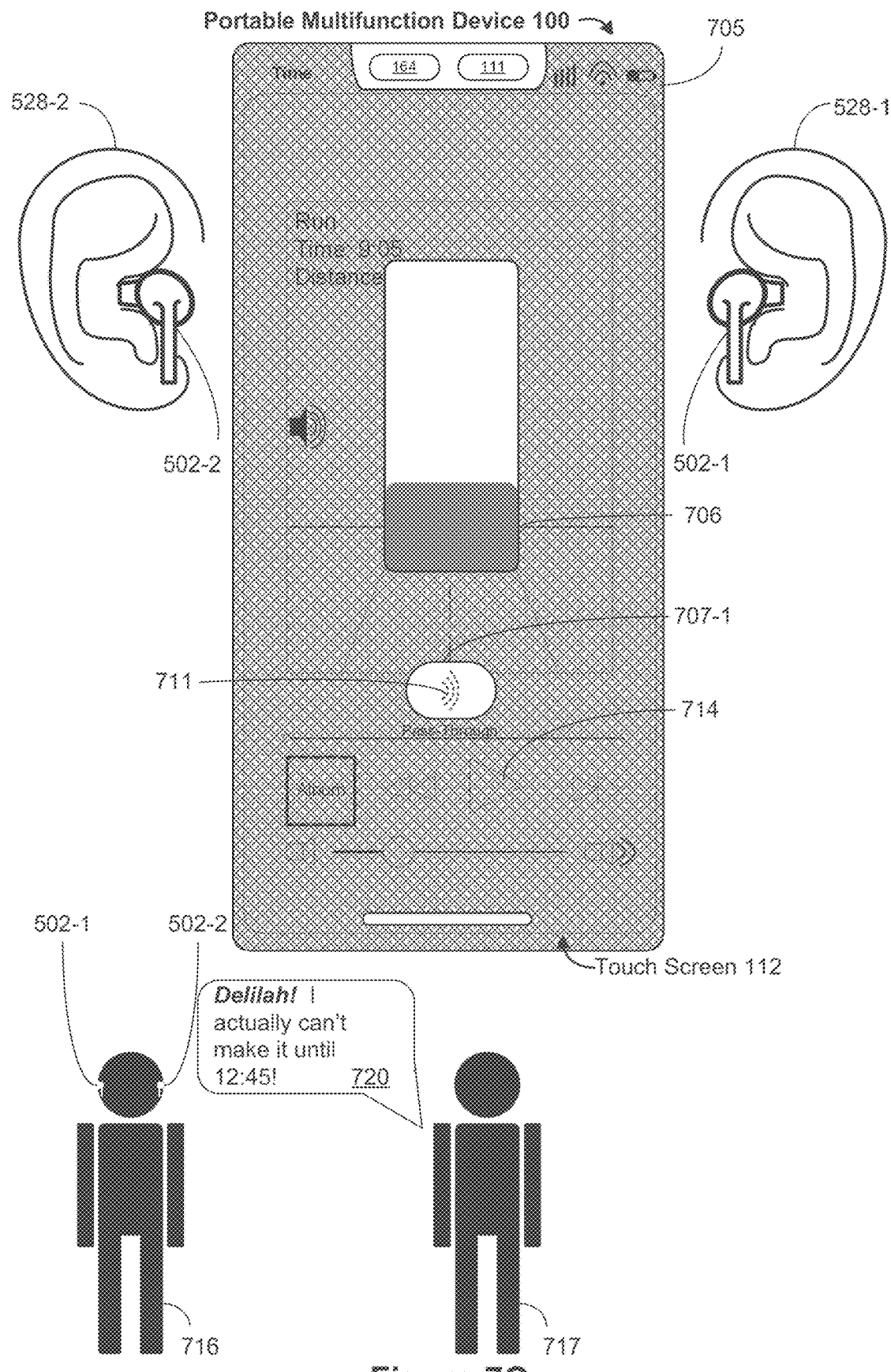
Figure 7P:
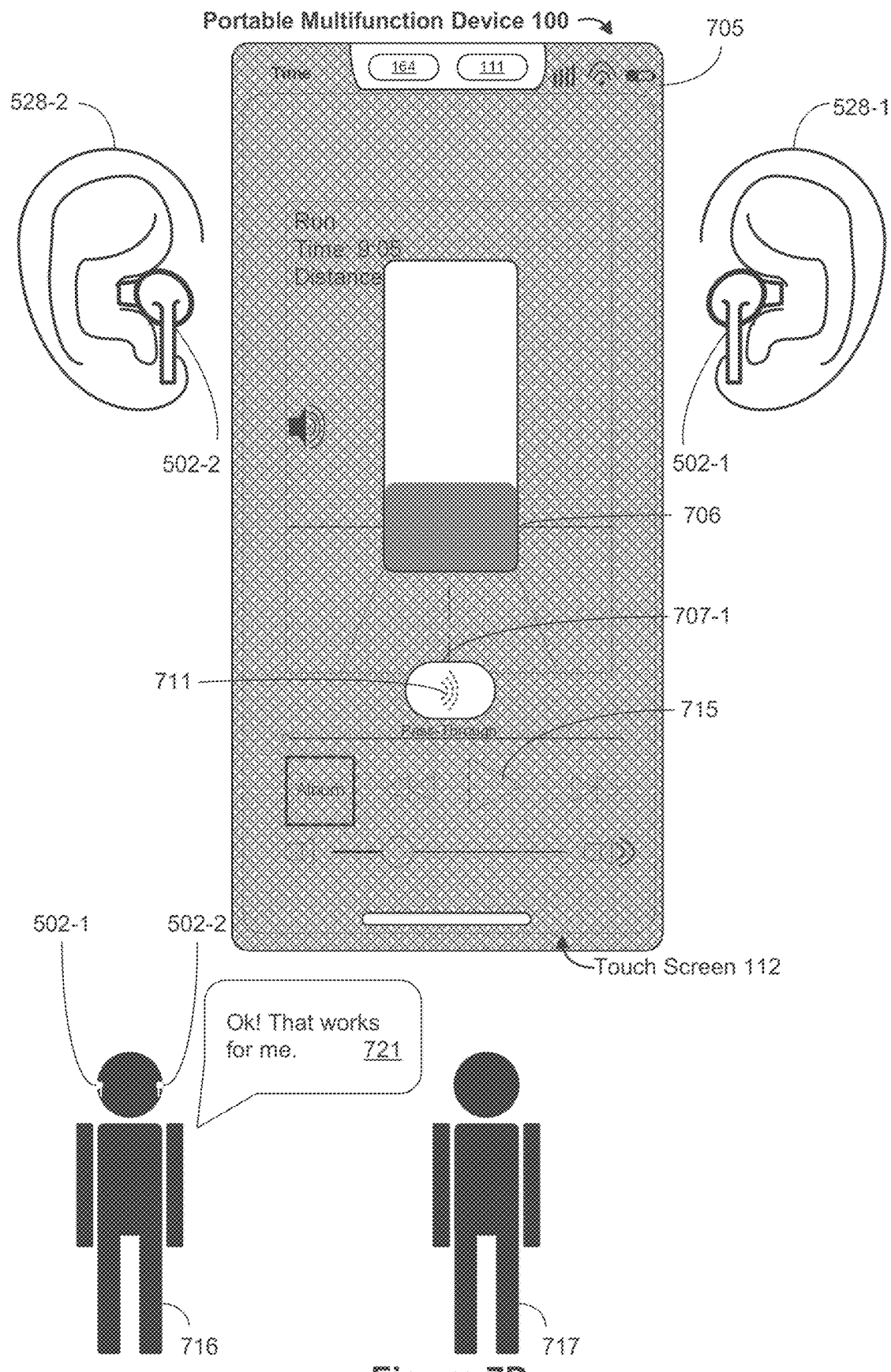
Figure 7Q:
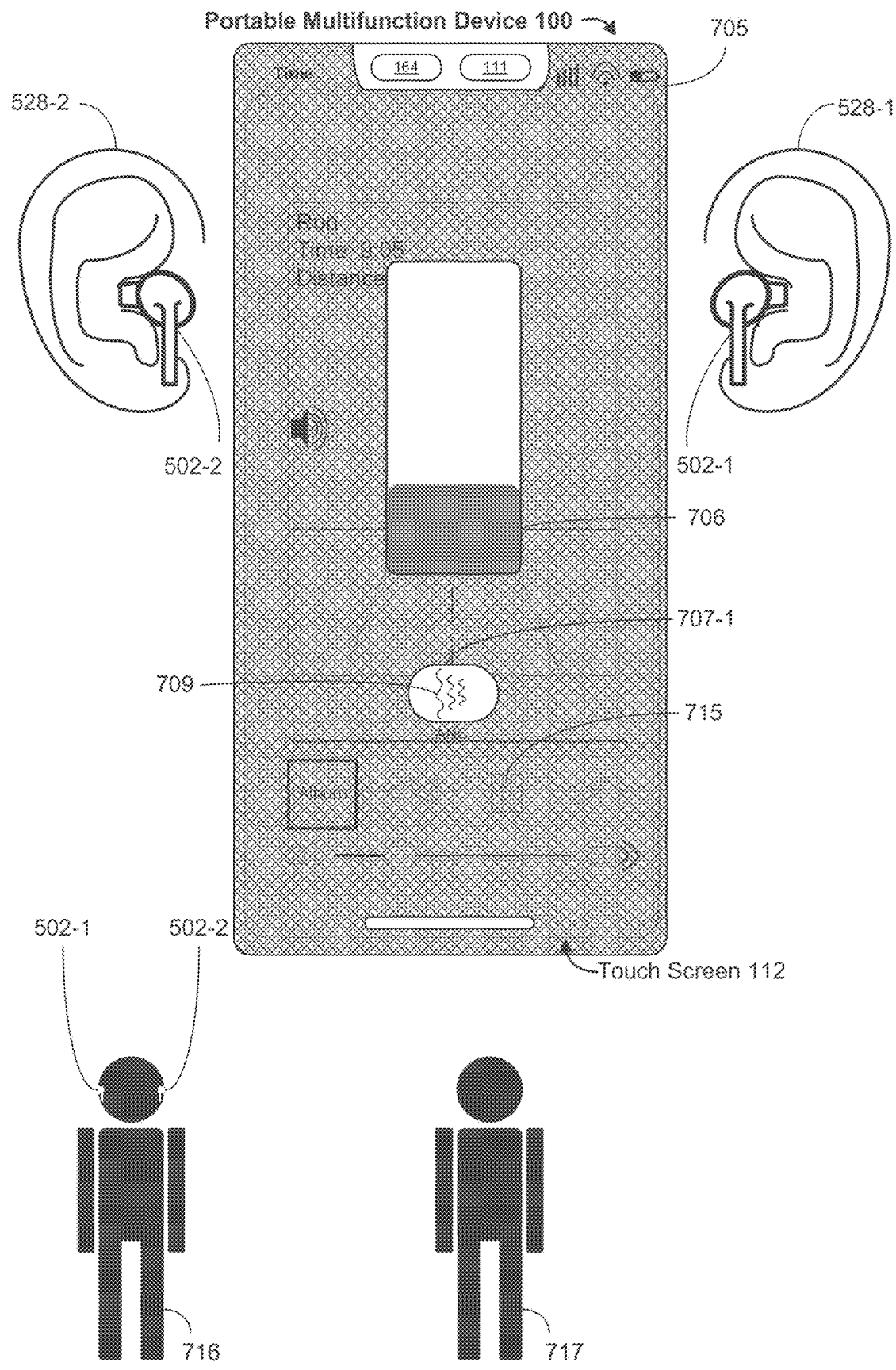

FIGS. 7J-7Q illustrate automatic switching of audio output mode in response to different types of inputs. In particular, FIGS. 7J-7K illustrate behavior in response to a user removing an earbud from his or her ear.

FIG. 7J illustrates earbud 502-2 removed from ear 528-2 of the user. In response to the removal of earbud 502-2, earbuds 502-1 and 502-2 switch from the active noise control mode to the pass-through mode, as indicated by pass-through icon 711 now displayed in noise management control 707-1. In some embodiments, as illustrated in FIG. 7J, both earbuds 502 switch to the pass-through mode in response to either earbud 502-1 or 502-2 being removed from an ear of the user (e.g., based on an assumption that that the user removed an earbud to hear ambient audio better). In addition, media content being played to the user via earbuds 502 is paused, as indicated by play button 714 being displayed instead of a pause button as shown in FIG. 7I.

FIG. 7K illustrates earbud 502-2 placed back in ear 528-2. In response to earbud 502-2 being replaced in ear 528-2, earbuds 502-1 and 502-2 switch from the pass-through mode back to the previous mode, which in this case is the active noise control mode as indicated by active noise control icon 709. In addition, device 100 resumes media playback, as indicated by pause button 715 being displayed instead of play button 714 as shown in FIG. 7J.

FIGS. 7L-7Q illustrate changes in audio output mode in response to detecting particular types of speech. FIG. 7L is an example transition from FIG. 7K or FIG. 7I. In FIG. 7L, user 716, who is wearing earbuds 502-1 and 502-2, is engaged in a conversation with a second individual 717. FIG. 7L shows user 716 speaking (e.g., in the form of speech 718). In response to detecting speech 718 by user 716, earbuds 502 switch from the active noise control mode (e.g., as indicated by active noise control icon 709 shown in FIG. 7K and FIG. 7I) to the pass-through mode, as indicated by pass-through icon 711 in noise management control 707-1. Optionally, as in the example shown in FIG. 7L, media content playback is paused in response to detecting speech 718, as indicated by play button 714 being displayed instead of pause button 715 (FIG. 7K). In some embodiments, in response to detecting speech 718, media content playback is not paused (e.g., continues to be played), although optionally in some embodiments, the volume at which the media content is played is lowered.

FIG. 7M illustrates that earbuds 502 remain in the pass-through mode as the conversation between user 716 and individual 717 continues with response (e.g., speech) 719 from 717. In some embodiments, earbuds 502 remain in the pass-through mode for a predetermined amount of time since detecting speech (e.g., speech 718 by user 716, FIG. 7L). In some embodiments, earbuds 502 remain in the pass-through mode (or transition back to the pass-through mode) in response to detecting that user 716 is being spoken to (e.g., in the form of response 719) for the predetermined amount of time.

FIG. 7N shows user 716 and individual 717 no longer engaging in conversation. As a result, earbuds 502 have reverted (e.g., upon a predetermined amount of time elapsing since speech was last detected) to the previous mode, which in this example was the active noise control mode, as indicated by active noise control icon 709 in noise management control 707-1. Optionally, as in the example shown in FIG. 7N, where media content playback was paused in response to detecting speech by user 716 (e.g., speech 718, FIG. 7L), media content playback is resumed after the conversation ends (e.g., upon a predetermined amount of time elapsing since speech was last detected), as indicated by pause button 715 being displayed in FIG. 7N instead of play button 714 (FIG. 7M). In some embodiments where media content was not paused in response to detecting speech (e.g., speech 718, FIG. 7L), media content playback continues to be played during the conversation as well as after the conversation ends, although optionally in some embodiments where the volume at which the media content is played was lowered (e.g., to a level above zero), the volume is restored (e.g., raised to the same level as before the speech was detected).

FIG. 7O illustrates individual 717 reinitiating conversation with user 716 in the form of speech 720, which begins with user 716's name (e.g., "Delilah"). In response to detecting user 716's name spoken, earbuds 502 switch to the pass-through mode, as indicated by pass-through icon 711 in noise management control 707-1. Optionally, as in the example shown in FIG. 7O, media content playback is paused in response to detecting speech 720, as indicated by play button 714 being displayed instead of pause button 715 (FIG. 7N).

FIG. 7P illustrates user 716's response 721 to individual 717, while earbuds 502 remain in the pass-through mode (e.g., to make it easier for user 716 to hear and respond to individual 717), as indicated by pass-through icon 711 in noise management control 707-1.

FIG. 7Q shows user 716 and individual 717 no longer engaging in conversation. As a result, earbuds 502 have reverted (e.g., upon a predetermined amount of time elapsing since speech was last detected) to the previous mode, which in this example was the active noise control mode, as indicated by active noise control icon 709 in noise management control 707-1. Optionally, as described herein with reference to FIG. 7N, media playback is resumed, as indicated by pause button 715 being displayed in FIG. 7Q instead of play button 714 (FIG. 7P) or alternatively, media playback volume is restored after having been lowered.

Figure 8A:
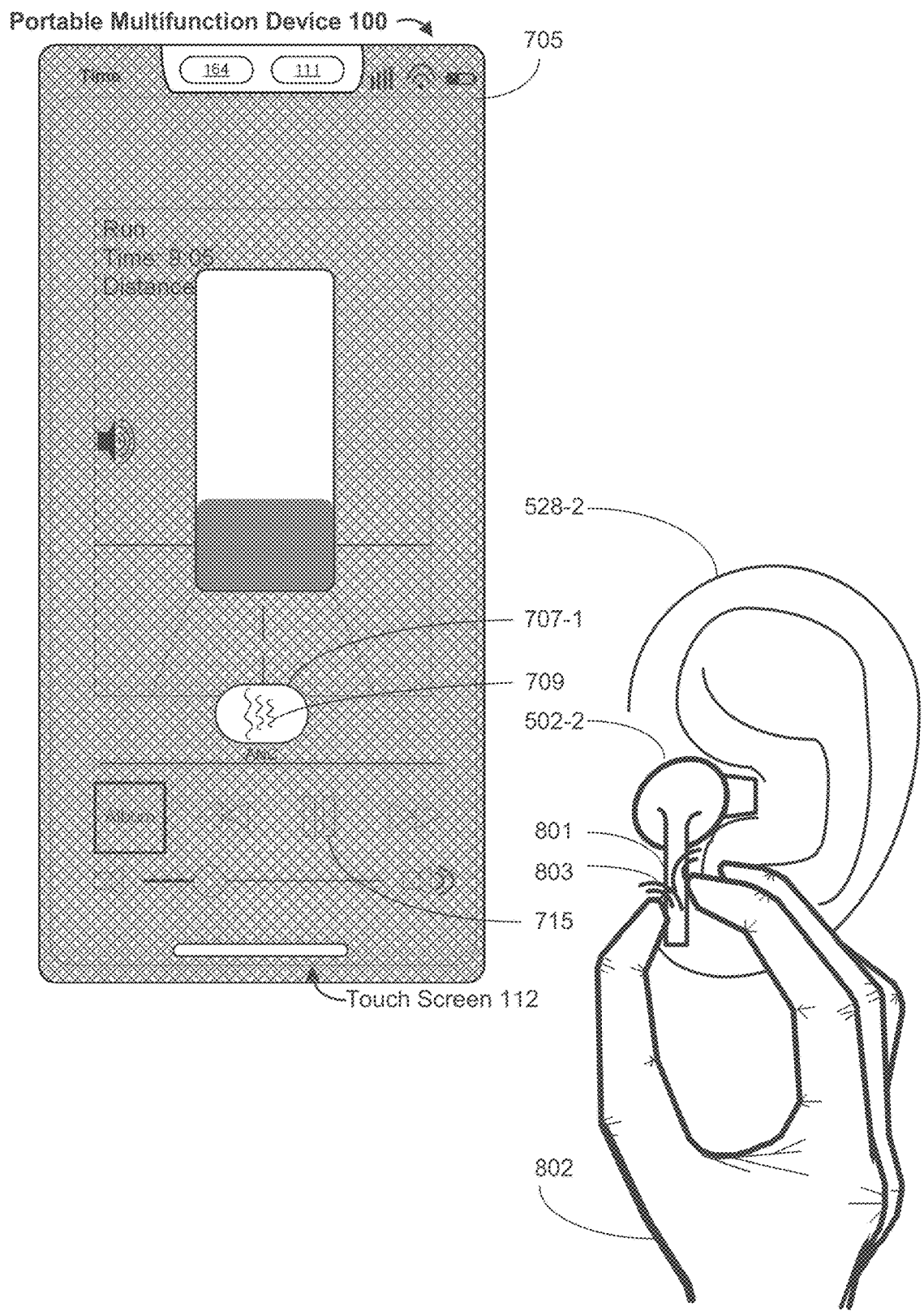

FIGS. 8A-8J illustrate example user interactions with earbuds to control audio outputs in accordance with some embodiments. In some embodiments, the earbuds each include a stem (e.g., that extends from the portion of the earbud that is inserted in a user's ear) that the user can use to provide inputs to the earbuds. As shown in FIG. 8A, earbud 502-2 includes stem 801. In some embodiments, stem 801 is or includes a pressure-sensitive input device that responds to press inputs applied to stem 801 when held and squeezed between two fingers of hand 802 as illustrated in FIG. 8A. Although only one earbud with a stem (e.g., earbud 502-2 with stem 801) is shown, one of ordinary skill will recognize that earbud 502-1 can have an analogous structure with a corresponding stem, and that the same functionality described herein with reference to earbud 502-2 and stem 801 may be available using earbud 502-1 and its corresponding stem as well. FIG. 8A also illustrates input 803 received at stem 801 (e.g., a long squeeze gesture that includes a squeeze of stem 801 that is maintained for at least a threshold amount of time) while the current audio output mode of earbuds 502 is the active noise control mode, as indicated by active noise control icon 709 in noise management control 707-1. In some embodiments, an audible tone is output to indicate a "down click," which occurs when intensity of an input received at stem 801 has met or exceeded an input intensity threshold (e.g., associated with squeeze gestures). In some embodiments, an audible tone (e.g., the same or different from the "down click" audible tone) is output to indicate an "up click," which occurs when an input whose intensity has met or exceeded the input intensity threshold has been released so that the input intensity decreases to or below the input intensity threshold. In some embodiments, setting the "down click" intensity threshold to be higher than the "up click" intensity threshold provides hysteresis so that inadvertent fluctuations in input intensity (e.g., due to unsteadiness of a user's fingers when applying pressure to the input device) do not result in the wearable audio output device inadvertently detecting release of the input. In some embodiments, wearable audio output device 301 includes one or more tactile output generators, optionally located in stem 801. In some such embodiments, an activation tactile output is output to indicate a "down click," and/or a release tactile output is output to indicate an "up click." In some embodiments, the activation tactile output is the same (e.g., has the same tactile output amplitude, frequency, and pattern) as the release tactile output. In some embodiments, the activation tactile output is different (e.g., in amplitude, frequency and/or pattern) from the release tactile output (e.g., so the user can differentiate between detection of activation and detection of release).

Figure 8B:
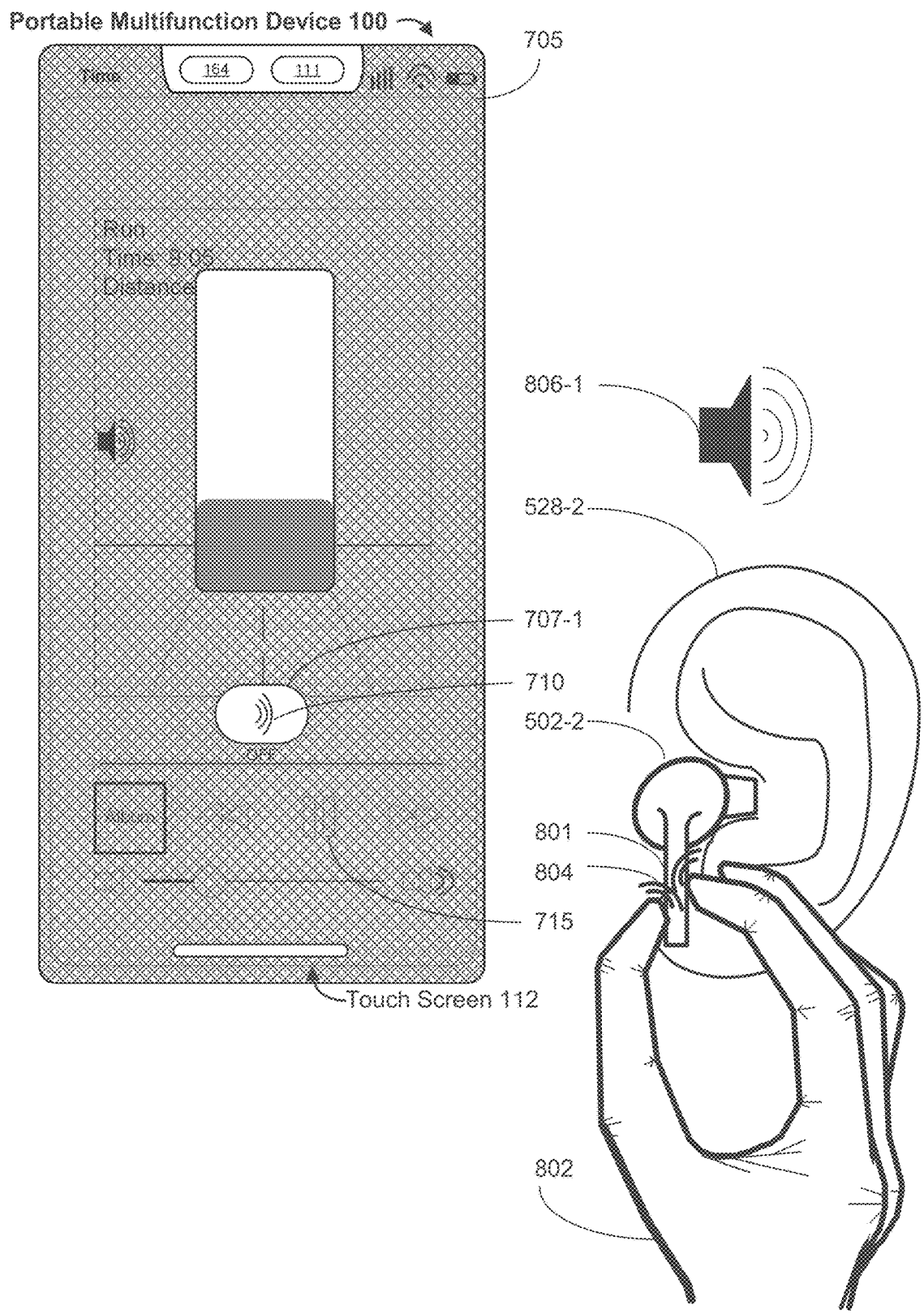
Figure 9A:
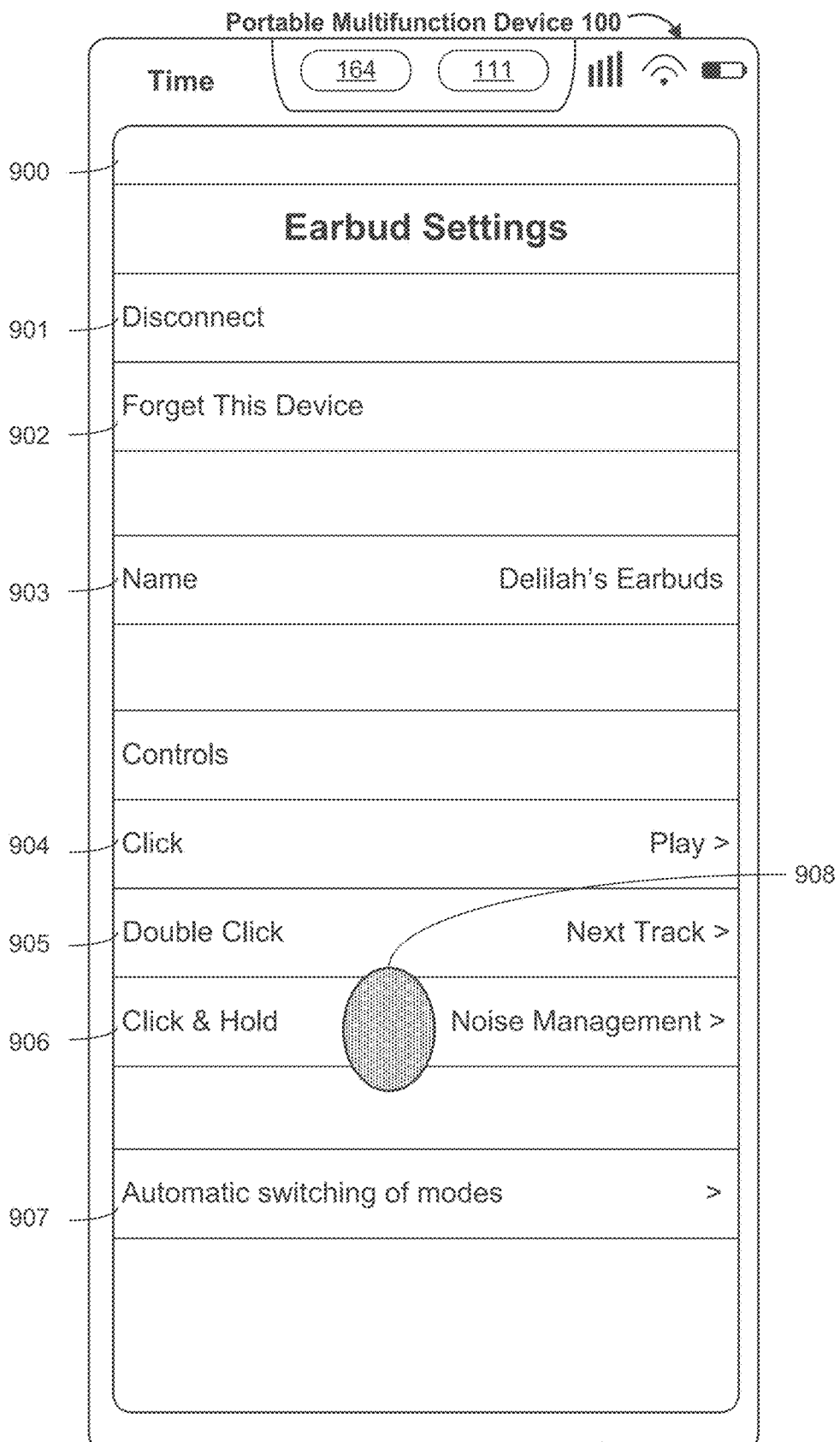
Figure 9B:
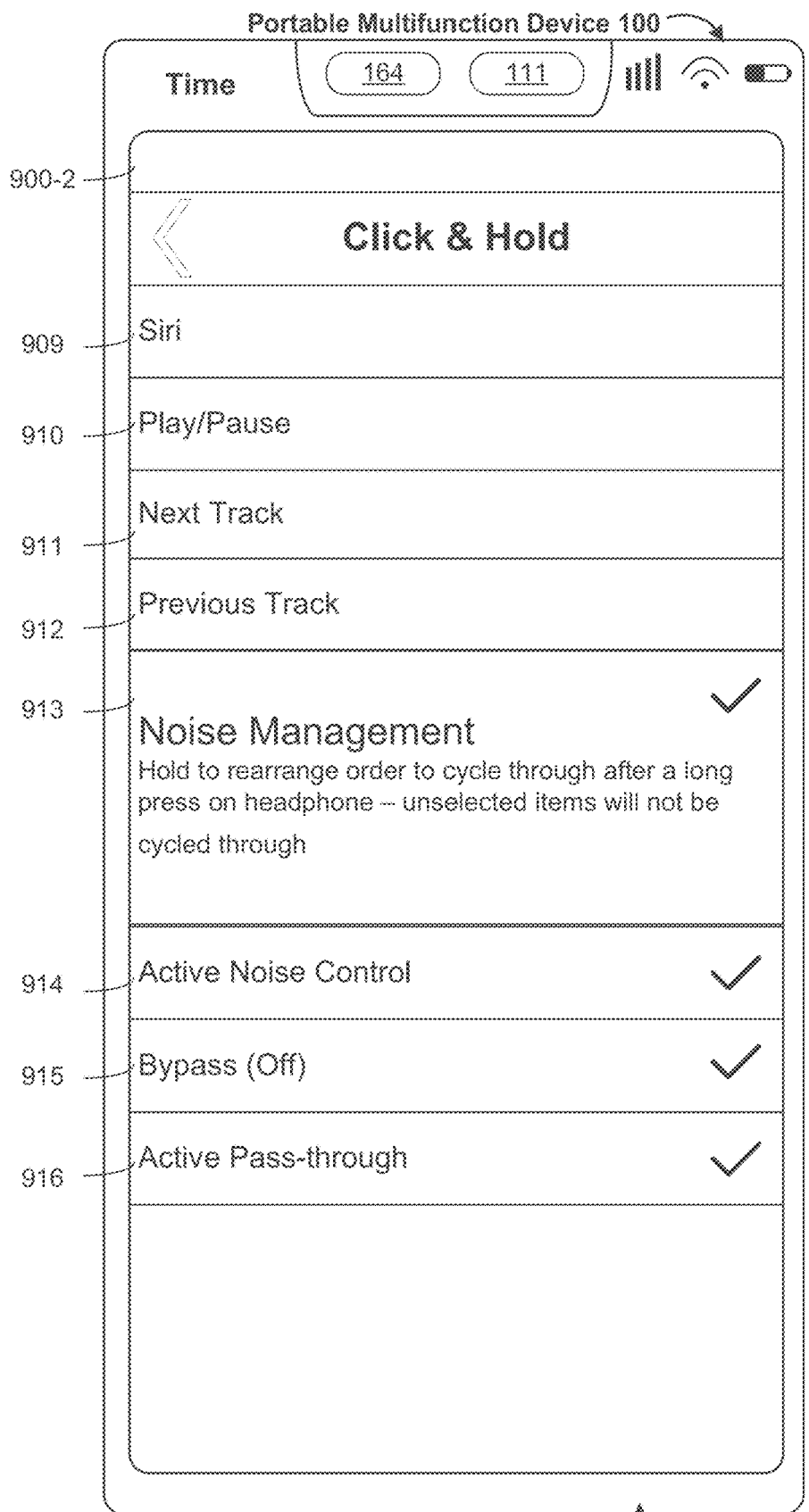

FIG. 8B illustrates a transition from FIG. 8A in response to input 803. In response to input 803 (e.g., and in accordance with a determination that input 803 is a long squeeze gesture), earbuds 502 switch from the active noise control mode to the next audio output mode in a predefined order of audio output modes, which in this example is the bypass mode, as indicated by bypass icon 710 in noise management control 707-1 in FIG. 8B. In some embodiments, the predefined order of audio output modes is configurable using a settings menu (e.g., as described herein with reference to FIGS. 9A-9C). In combination with changing audio output mode, earbuds 502 output an audible tone 806-1 to indicate that the audio output mode has been changed. In some embodiments, the audible tone to indicate that the audio output mode has been changed is different from the audible tone that is output to indicate a "down click" and from the audible tone that is output to indicate an "up click," so that the user can distinguish between different types of operations performed in response to an input. FIG. 8B also illustrates a subsequent input 804 (e.g., another long squeeze gesture) at stem 801.

Figure 8C:
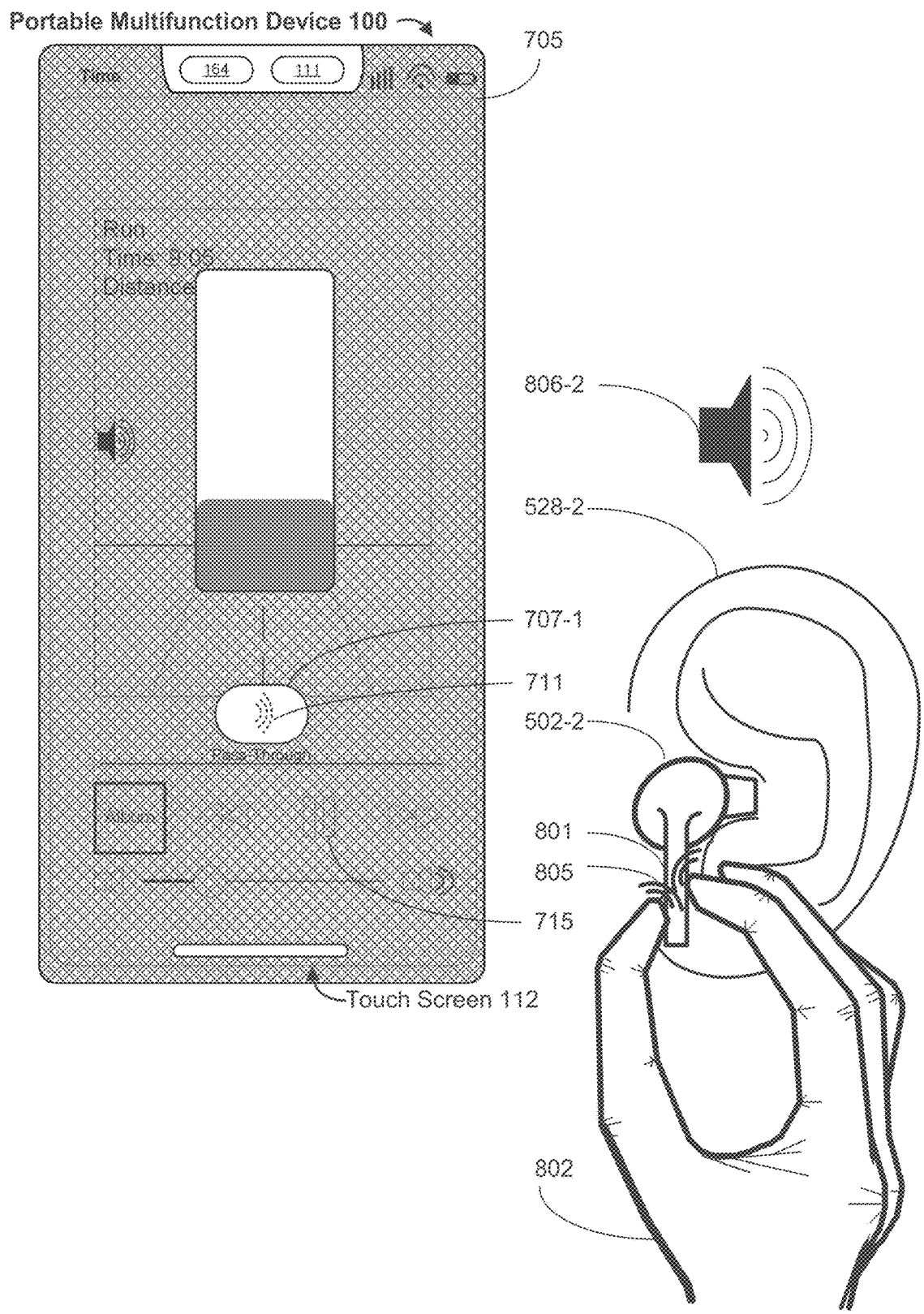

FIG. 8C illustrates a transition from FIG. 8B in response to input 804. In response to input 804 (e.g., and in accordance with a determination that input 804 is a long squeeze gesture), earbuds 502 switch from the bypass mode to the next audio output mode in the predefined order, which in this example is the pass-through mode, as indicated by pass-through icon 711 in noise management control 707-1 in FIG. 8C. in combination with changing output mode, earbuds 502 output audible tone 806-2 to indicate that the audio output mode has been changed. FIG. 8C also illustrates a subsequent input 805 (e.g., another long squeeze gesture) at stem 801.

Figure 8D:
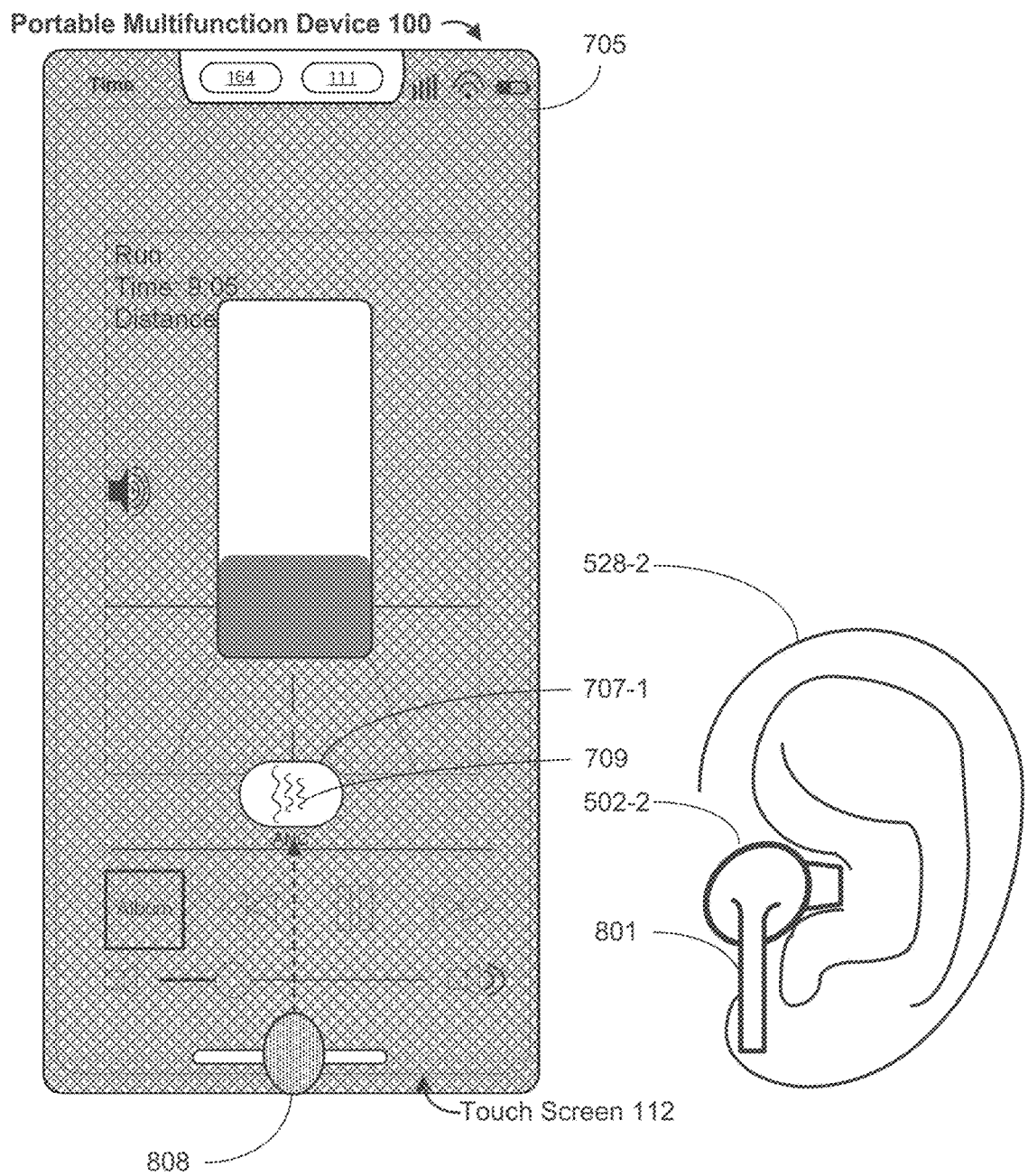

FIG. 8D illustrates a transition from FIG. 8C in response to input 805. In response to input 805 (e.g., and in accordance with a determination that input 805 is a long squeeze gesture), earbuds 502 switch from the pass-through mode to the next audio output mode in the predefined order. In the example shown in FIGS. 8A-8D, the pass-through mode is the last audio output mode in the predefined order (e.g., the predefined order includes the active noise control mode, followed by the bypass mode, followed by the pass-through mode). Accordingly, earbuds 502 cycle back to the active noise control mode (e.g., in which earbuds 502 were operating as shown in FIG. 8A), as indicated by active noise control icon 709 in noise management control 707-1. In addition, FIG. 8D illustrates an upward swipe gesture 808 from the bottom of touch screen 112 to dismiss enhanced volume control user interface 705.

FIG. 8E illustrates user interface 700 redisplayed after enhanced volume control user interface 705 is dismissed. User interface 700 is being used to play media content (e.g., music) from album 812 via earbuds 502, as indicated by pause button 715. FIG. 8E also shows input 810 at stem 801 of earbud 502-2 (e.g., a short, single squeeze gesture that includes a squeeze of stem 801 that is released within the threshold amount of time (e.g., the same threshold amount of time described with reference to the long squeeze gesture in FIG. 8A)).

FIG. 8F illustrates a transition from FIG. 8E in response to input 810. In response to input 810 (e.g., and in accordance with a determination that input 810 is a single squeeze gesture), playback of the media content from album 812 is paused, as indicated by play button 714 being displayed in FIG. 8F instead of pause button 715 (FIG. 8E). FIG. 8F also shows a subsequent input 811 (e.g., another single squeeze gesture) at stem 801.

FIG. 8G illustrates a transition from FIG. 8F in response to input 811. In response to input 811 (e.g., and in accordance with a determination that input 811 is a single squeeze gesture) playback of the media content from album 812 is resumed, as indicated by pause button 715 being redisplayed in FIG. 8G instead of play button 714 (FIG. 8F). FIG. 8G also shows a subsequent input 813 (e.g., a double squeeze gesture that includes two single squeeze gestures made within a threshold amount of time of each other) at stem 801.

Figure 8H:
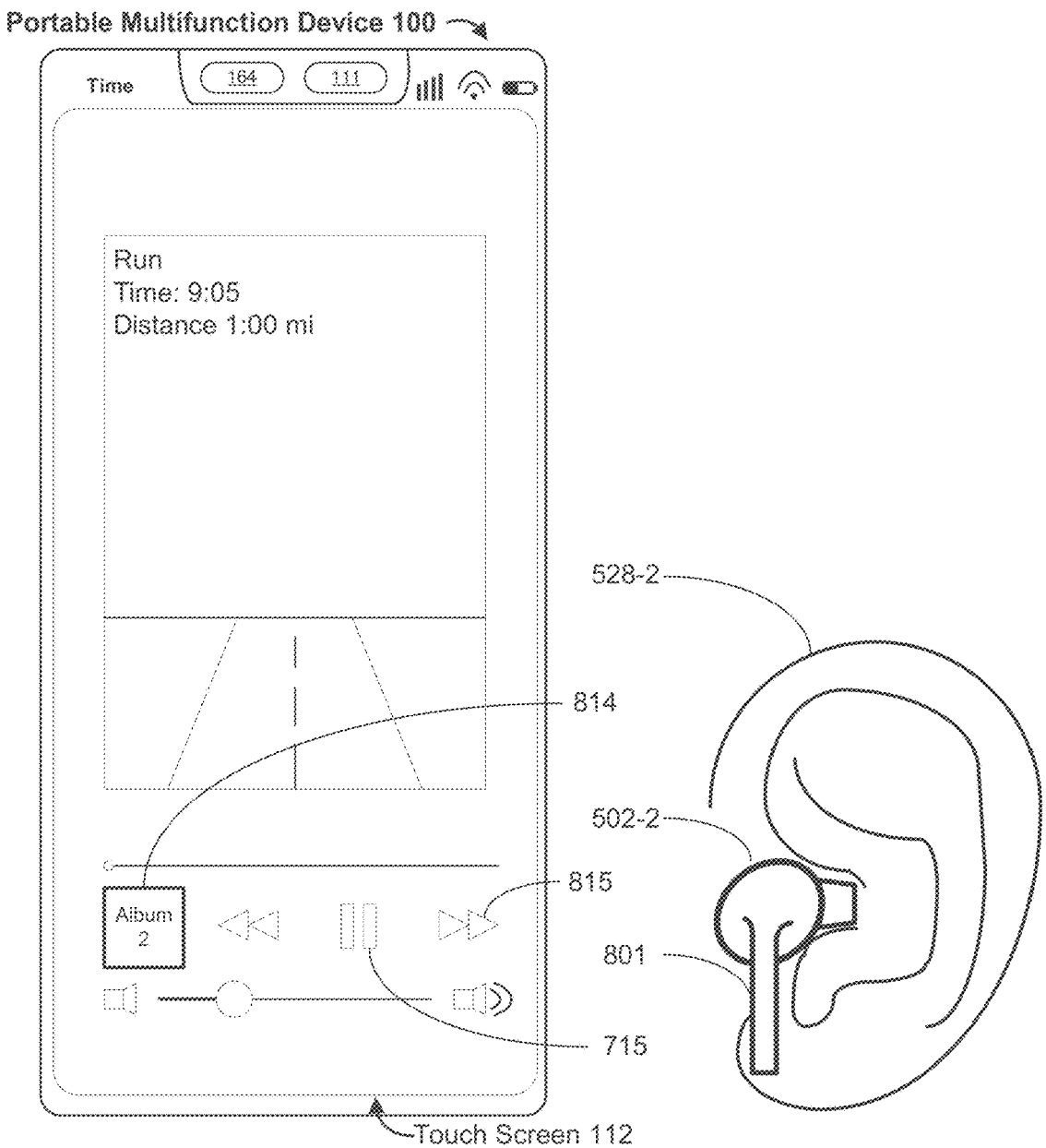

FIG. 8H illustrates a transition from FIG. 8G in response to input 813. In response to input 813 (e.g., and in accordance with a determination that input 813 is a double squeeze gesture), device 100 ceases playing the media content from album 812 and skips ahead to the next audio track, which is from album 814 (titled "Album 2"). Functionally, the double squeeze gesture is analogous to a tap gesture on next button 815.

FIG. 8I illustrates the same user interface as FIG. 8H, and also shows an input 816 (e.g., a triple squeeze gesture) made by two fingers of hand 802 at the stem 801 of the earbud 502-2.

Figure 8J:
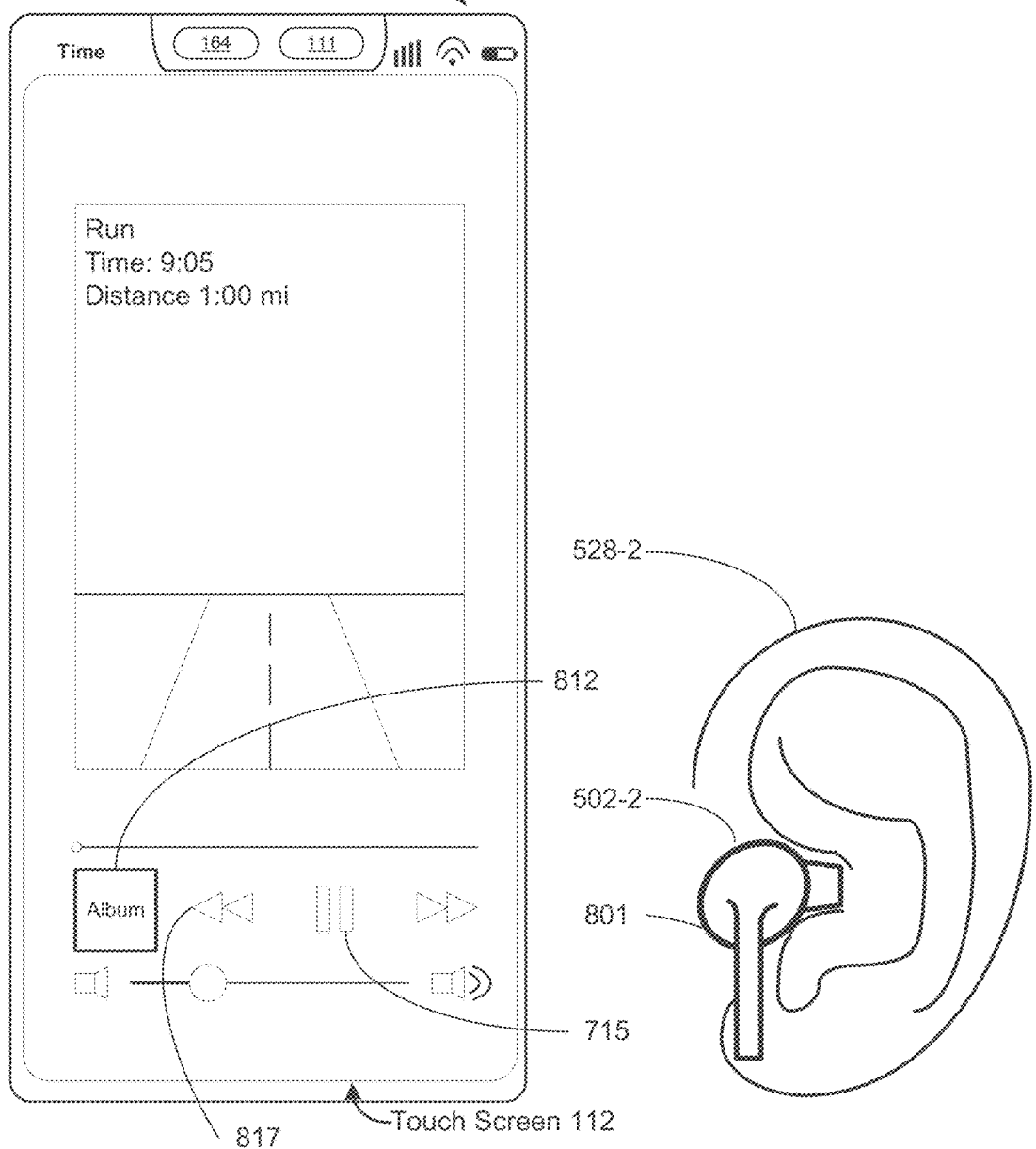

FIG. 8J illustrates a transition from FIG. 8I in response to input 816. In response to input 816 (e.g., and in accordance with a determination that input 816 is a triple squeeze gesture), device 100 ceases playing the media content from album 814 and returns to the previous track, which is from album 812 (titled "Album"). Functionally, the triple squeeze gesture is analogous to a tap gesture on previous button 817.

FIGS. 9A-9C illustrate settings user interface 900 for controlling various features associated with earbuds (e.g., earbuds 502) and examples of controlling audio output mode in accordance with some embodiments. In particular, FIG. 9A shows settings user interface 900-1, which includes a plurality of activatable control options, such as the following, or a subset or superset thereof:

Control option 901, labeled "Disconnect," for disconnecting the earbuds from device 100;

Control option 902, labeled "Forget This Device," for dissociating (e.g., unpairing) the earbuds from device 100;

Control option 903, labeled "Name," for assigning a name to the earbuds (e.g., "Delilah's Earbuds" in the example shown in FIG. 9A);

Control option 904, labeled "Click," for assigning a type of operation (e.g., currently the "Play/Pause" operation type) to be performed in response to receiving single click (e.g., herein also called "single squeeze") gestures at an earbud (e.g., using a stem of the earbud);

Control option 905, labeled "Double Click," for assigning a type of operation (e.g., currently the "Next Track" operation type) to be performed in response to receiving double click (e.g., herein also called "double squeeze") gestures at an earbud (e.g., using a stem of the earbud);

Control option 906, labeled "Click & Hold," for assigning a type of operation (e.g., currently the "Noise Management" operation type) to be performed in response to receiving click-and-hold (e.g., herein also called "long squeeze") gestures at an earbud (e.g., using a stem of the earbud); and Control option 907, labeled "Automatic switching of modes," for controlling automatic switching (e.g., by the earbuds) between different audio output modes.

In addition, FIG. 9A shows input 908 (e.g., a tap gesture) received at control option 906.

FIG. 9B illustrates user interface 900-2 (e.g., a sub-menu of settings user interface 900-1) displayed in response to input 908 (e.g., replacing display of settings user interface 900-1). User interface 900-2 allows the user to select a type of operation to be performed in response to click-and-hold gestures (e.g., on stem 801 or other input device 308 (FIG. 3B) of an earbud 502). The options for the type of operation to be performed include the following, or a subset or superset thereof:

Option 909, labeled "Siri," selection of which causes click-and-hold gestures to invoke a virtual assistant;

Option 910, labeled "Play/Pause," selection of which causes click-and-hold gestures to toggle playback of media content (e.g., music, audio tracks for TV shows or movies, etc.);

Option 911, labeled "Next Track," selection of which causes click-and-hold gestures to switch to playing a next audio track (e.g., in a list of audio tracks, such as a playlist or album list);

Option 912, labeled "Previous Track," selection of which causes click-and-hold gestures to switch to playing a previous audio track (e.g., in the list of audio tracks); and Option 913, labeled "Noise Management," selection of which causes click-and-hold gestures to switch between selected options for audio output mode listed under option 913, such as:

Active noise control mode option 914, labeled "Active Noise Control," in which the earbuds output one or more audio-cancelling audio components to at least partially cancel ambient sound;

Bypass mode option 915, labeled "Bypass (Off)," in which the earbuds output neither audio-cancelling audio components nor pass-through audio components; and Pass-through mode option 916, labeled "Active Pass-through," in which the earbuds output one or more pass-through audio components so that the user can hear a greater amount of ambient sound (e.g., a greater amount of ambient sound than would be audible with the passive attenuation of the earbuds placed in the ears).

In some embodiments, selecting an option above assigns the selected type of operation to the operation of both earbuds in a pair of earbuds (e.g., both earbud 502-1 and 502-2 of earbuds 502). In some embodiments, the two earbuds in a pair of earbuds can be configured (e.g., via settings user interface 900) to perform different operations in response to a particular input gesture.

FIG. 9B shows that option 913 (e.g., "Noise Management") is selected as the type of operation to be performed in response to click-and-hold gestures. Under option 913, all three audio output mode options (e.g., "Active Noise Control," "Bypass (Off)," and "Active Pass-through") are selected. Accordingly, in response to click-and-hold gestures, the audio output mode of the earbuds will cycle through the active noise control mode, the bypass mode, and the active pass-through mode, then looping back to the active noise control mode, etc. In addition, mode options 914, 915, and 916 may be reordered (e.g., by an input on touch screen 112 that includes a long press at a respective option followed by movement of the input to a different position in the list of mode options 914, 915, and 916. For example, the user may reorder the list of mode options such that the bypass mode option precedes the active noise control mode option, which in turn is followed by the active pass-through mode option. In such an example, in response to click-and-hold gestures, the audio output mode of the earbuds will cycle through the bypass mode, the active noise control mode, and the active pass-through mode, then looping back to the bypass mode, etc.

Additionally, the user can deselect one or more of the mode options 914, 915, and 916 to remove the deselected mode options from the cycle, as described in more detail with reference to FIG. 9C as follows.

FIG. 9C illustrates transitions through different audio output modes in response to multiple inputs of a particular type (e.g., click-and-hold gestures in accordance with click-and-hold gestures being configured to control audio output mode (e.g., by being assigned to option 913 as described herein with reference to FIG. 9B)) while different combinations of audio output mode options are selected (e.g., one or more of mode options 914 (e.g., "Active Noise Control"), 915 (e.g., "Bypass (Off)"), and 916 (e.g., "Active Pass-through") under option 913 (e.g., "Noise Management") as described herein with reference to FIG. 9B). Although only one earbud with a stem (e.g., earbud 502-2 with stem 801) is shown, one of ordinary skill will recognize that earbud 502-1 can have an analogous structure with a corresponding stem, and that the same functionality described herein with reference to earbud 502-2 and stem 801 may be available using earbud 502-1 and its corresponding stem as well. One of ordinary skill will recognize that, alternatively or in addition, some inputs may be received at one earbud, and some inputs may be received at the other earbud. In some embodiments, analogous functionality is available using inputs such as button presses on a designated noise control button (e.g., button 336, FIG. 3D) on a wearable audio output device (e.g., a set of headphones such as wearable audio output device 301b, FIG. 3D). In some embodiments, each time the audio output mode is changed from one mode to the next, an audible tone 917 is played through earbud 502-1 and/or earbud 502-2 (or through one or both earcups 332 of the headphones, FIG. 3D).

FIG. 9C shows four rows and four columns. Each row represents one of four distinct sets of audio output mode selections, labeled "Selections #1" 942, "Selections #2" 943, "Selections #3" 944, and "Selections #4" 945, respectively (e.g., through which earbuds 502 will cycle in response to click-and-hold gestures, also called long squeeze gestures). The selected mode option(s) in a respective set are indicated by checkmarks next to the mode name(s). The first column, labeled "Mode #1" 938 and positioned to the right of initial state indicator 918, indicates the initial audio output mode of earbuds 502. The remaining columns, labeled "Mode #2" 939, "Mode #3" 940, and "Mode #4" 941, indicate the sequence of audio output modes to which earbuds 502 transition after (e.g., in response to) three distinct inputs—first squeeze gesture 919, second squeeze gesture 920, and third squeeze gesture 921 (e.g., click-and-hold gestures)—respectively, each input being associated with the respective column to the right of the respective input. Although a few combinations are shown, one of ordinary skill will recognize that many other combinations of audio output mode selections are possible (e.g., by changing which mode options are selected, how many mode options are selected, and/or the order of the mode options).

Moving to the first row, labeled "Selections #1" 942, the user has selected all three mode options: the active noise control mode option, the bypass mode option, and the pass-through mode option. Before receiving first squeeze gesture 919, earbuds 502 are in "Mode #1" 938, which in this example is active noise control mode 922. In response to receiving first squeeze gesture 919, earbuds 502 transition from "Mode #1" 938 to "Mode #2" 939—namely, from active noise control mode 922 to bypass mode 923. In response to receiving second squeeze gesture 920, earbuds 502 transition from "Mode #2" 939 to "Mode #3" 940—namely, from bypass mode 923 to pass-through mode 924. In response to receiving third squeeze gesture 921, earbuds 502 transition from "Mode #3" 940 to "Mode #4" 941—namely, from pass-through mode 924 back to active noise control mode 922. Thus, the user has cycled through all three selected mode options.

Similarly, in embodiments where a set of over-ear headphones (e.g., wearable audio output device 301b, FIG. 3D) includes a button for noise control (e.g., button 336, FIG. 3D), pressing (or tapping, actuating, etc.) the button transitions the headphones between all three mode options shown in the first row, labeled "Selections #1" 942, of FIG. 9C. For example, while the headphones are in "Mode #1" 938 (e.g., active noise control mode 922 in this example), a first button press transitions the headphones from "Mode #1" 938 to "Mode #2" 939 (here, from active noise control mode 922 to bypass mode 923). In response to receiving a second button press, the headphones transition from "Mode #2" 939 to "Mode #3" 940 (here, from bypass mode 923 to pass-through mode 924). In response to receiving a third button press, the headphones transition from "Mode #3" 940 to "Mode #4" 941 (here, from pass-through mode 924 back to active noise control mode 922). Thus, the user has cycled through all three selected mode options.

Moving to the second row, labeled "Selections #2" 943, the user has selected only two of the three mode options: the active noise control mode option and the bypass mode option (e.g., and not the pass-through mode option). Before receiving first squeeze gesture 919, earbuds 502 are in "Mode #1" 938, which in this example is active noise control mode 926. In response to receiving first squeeze gesture 919, earbuds 502 transition from "Mode #1" 938 to "Mode #2" 939—namely, from active noise control mode 926 to bypass mode 927. In response to receiving second squeeze gesture 920, earbuds 502 transition from "Mode #2" 939 to "Mode #3" 940—namely, from bypass mode 927 back to active noise control mode 926. In response to receiving third squeeze gesture 921, earbuds 502 transition from "Mode #3" 940 to "Mode #4" 941—namely, from active noise control mode 926 back to bypass mode 927. Thus, the user has cycled through both of the selected mode options. Similarly, in embodiments where a set of over-ear headphones (e.g., wearable audio output device 301b, FIG. 3D) includes a button for noise control (e.g., button 336, FIG. 3D), pressing the button transitions the headphones alternately between the two selected mode options shown in the second row, labeled "Selections #2" 943, of FIG. 9C. For example, while the headphones are in "Mode #1" 938 (e.g., active noise control mode 926 in this example), a first button press transitions the headphones from "Mode #1" 938 to "Mode #2" 939 (here, from active noise control mode 926 to bypass mode 927). In response to receiving a second button press, the headphones transition from "Mode #2" 939 to "Mode #3" 940 (here, from bypass mode 927 back to active noise control mode 926). In response to receiving a third button press, the headphones transition from "Mode #3" 940 to "Mode #4" 941 (here, from active noise control mode 926 back to bypass mode 927).

Moving to the third row, labeled "Selections #3" 944, the user has selected a different two of the three mode options: the active noise control mode option and the pass-through mode option (e.g., and not the bypass mode option). Before receiving first squeeze gesture 919, earbuds 502 are in "Mode #1" 938, which in this example is active noise control mode 930. In response to receiving first squeeze gesture 919, earbuds 502 transition from "Mode #1" 938 to "Mode #2" 939—namely, from active noise control mode 930 to pass-through mode 931. In response to receiving second squeeze gesture 920, earbuds 502 transition from "Mode #2" 939 to "Mode #3" 940—namely, from pass-through mode 931 back to active noise control mode 930. In response to receiving third squeeze gesture 921, earbuds 502 transition from "Mode #3" 940 to "Mode #4" 941—namely, from active noise control mode 930 back to pass-through mode 931. Thus, the user has cycled through both of the selected mode options. Similarly, in embodiments where a set of over-ear headphones (e.g., wearable audio output device 301b, FIG. 3D) includes a button for noise control (e.g., button 336, FIG. 3D), pressing the button transitions the headphones alternately between the two selected mode options shown in the third row, labeled "Selections #3" 944, of FIG. 9C. For example, while the headphones are in "Mode #1" 938 (e.g., active noise control mode 930 in this example), a first button press transitions the headphones from "Mode #1" 938 to "Mode #2" 939 (here, from active noise control mode 930 to pass-through mode 931). In response to receiving a second button press, the headphones transition from "Mode #2" 939 to "Mode #3" 940 (here, from pass-through mode 931 back to active noise control mode 930). In response to receiving a third button press, the headphones transition from "Mode #3" 940 to "Mode #4" 941 (here, from active noise control mode 930 back to pass-through mode 931).

Finally, moving to the fourth row, labeled "Selections #4" 945, the user has selected only one of the three mode options: the bypass mode option. Before receiving first squeeze gesture 919, earbuds 502 are in "Mode #1" 938, which in this example is bypass mode 934. In response to receiving first squeeze gesture 919, because only one mode option has been selected, earbuds 502 remain in bypass mode 934 (e.g., "Mode #1" 938 and "Mode #2" 939 are the same). Similarly, in response to receiving second squeeze gesture 920, earbuds 502 remain in bypass mode 934 (e.g., "Mode #2" 939 and "Mode #3" 940 are also the same). Likewise, in response to receiving third squeeze gesture 921, earbuds 502 remain in bypass mode 934 (e.g., "Mode #3" 940 and "Mode #4" 941 are the same). Thus, so long as only one audio output mode option is selected, the squeeze gestures do not change the audio output mode in which earbuds 502 operate. Similarly, in embodiments where a set of over-ear headphones (e.g., wearable audio output device 301b, FIG. 3D) includes a button for noise control (e.g., button 336, FIG. 3D), if only one audio output mode has been selected (e.g., bypass mode 934), the headphones operate in the selected audio output mode, and pressing the button does not change the audio output mode in which the headphones operate.

FIGS. 10A-10H are flow diagrams illustrating method 1000 of pairing and calibrating wearable audio output devices in accordance with some embodiments. Method 1000 is performed at a computer system (e.g., portable multifunction device 100 in FIG. 1A, or device 300 in FIG. 3A) that includes a display device (e.g., touch-sensitive display system 112 in FIG. 1A or display 340 in FIG. 3A) and a touch-sensitive surface (e.g., touch-sensitive display system 112 in FIG. 1A or touchpad 355 in FIG. 3A). Some operations in method 1000 are, optionally, combined and/or the order of some operations is, optionally, changed.

As described below, method 1000 provides an improved interface for pairing and calibrating wearable audio output devices (e.g., headphones) to a display device (e.g., a smartphone, tablet, or personal computer) in a computer system, so as to optimize the fit and thereby optimize the audio experience of the wearable audio output devices. During the pairing and calibration process, a user is prompted to place the wearable audio output devices in his or her ears, a calibration tone is output via the wearable audio output devices, and a fit of the wearable audio output devices is determined based on whether audio that is detected while outputting the calibration tone meets particular criteria. If the detected audio does not meet the particular criteria, the user is prompted to adjust (e.g., one or both of) the wearable audio output devices. Displaying, on the display device, prompts related to placement and adjustment of the wearable audio output devices guides the user through the pairing and calibration process and provides the user at various points during the process with visual feedback as to actions to perform, whether the process is being performed properly, and/or whether the wearable audio output devices are properly fitted. Providing improved feedback to the user enhances the operability of the computer system and associated devices (e.g., the wearable audio output devices and/or the display device) and makes the user-device interface more efficient (e.g., by helping the user to achieve an intended outcome and reducing user mistakes when operating/interacting with the devices), which, additionally, reduces power usage and improves battery life of the devices by enabling the user to use the devices more quickly and efficiently. In addition, improving the fit of the wearable audio output devices improves the seal between the wearable audio output devices and the user's ears, which enables audio to be played at a lower volume to produce the same effective audio volume perceived by the user (e.g., relative to when the wearable audio output devices are not properly fitted, in which case hearing some ambient noise may cause the user to increase the audio output volume), thereby further reducing power usage and improving battery life of the devices.

The method includes, establishing 1004 a wireless connection with a pair of wearable audio output devices that includes: a first wearable audio output device (e.g., an earbud or earphone that in some embodiments is one of a pair (e.g., earbuds 502-1 and 502-2 in FIG. 5A) with one or more first microphones, and a second wearable audio output device (e.g., an earbud or earphone that in some embodiments is one of a pair) with one or more second microphones. In some embodiments, the first wearable audio output device includes one or more first sensors for detecting placement of the first wearable audio output device; and in some embodiments, the second wearable audio output device includes one or more second sensors for detecting placement of the second wearable audio output device (e.g., microphones 302-1 and 302-2 in FIG. 3C).

In some embodiments, after establishing (1006) the wireless connection with the pair of wearable audio output devices, displaying, via the display device, a user interface object that prompts the user to place the first wearable audio output device in an ear of the user and to place the second wearable audio output device in an ear of the user. In some embodiments, the display device may display a visual indicator that the audio output devices are not placed in the ears of the user, as shown by status indicators 529-1 and 529-2 in FIGS. 5F-5U.

Displaying, on the display device, a prompt to the user to place the wearable audio output devices in his or her ears provides the user with visual feedback as to an action to perform to advance the pairing and calibration process. Providing improved feedback to the user enhances the operability of the devices and makes the user-device interface more efficient (e.g., by helping the user to achieve an intended outcome and reducing user mistakes when operating/interacting with the devices), which, additionally, reduces power usage and improves battery life of the devices by enabling the user to use the devices more quickly and efficiently.

The method 1000 includes, detecting (1008) (e.g., via the one or more first sensors) that the first wearable audio output device has been placed in an ear of a user. In some embodiments, the user (e.g., the wearer of the wearable audio output device(s)) is a user of the computer system, as shown in FIGS. 7L-7Q. The method 1000 further includes, detecting 1010 (e.g., via the one or more second sensors) that the second wearable audio output device has been placed in an ear of the user.

The method 1000 includes, after (e.g., in response to) detecting 1012 that the first wearable audio output device has been placed in an ear of the user and that the second wearable audio output device has been placed in an ear of the user: In some embodiments, the operations that follow are performed in response to detecting that the first wearable audio output device has been placed in an ear of the user and that the second wearable audio output device has been placed in an ear of the user. In some embodiments, the operations that follow are performed after detecting that the first wearable audio output device has been placed in an ear of the user and that the second wearable audio output device has been placed in an ear of the user, and in response to an intervening trigger or input (e.g., a user input indicating that the user wants to proceed with calibration of the first and second wearable audio output devices, as shown in FIG. 5E where the user provides an input 526-1 over the button to begin the test 525-1).

Figure 10A:
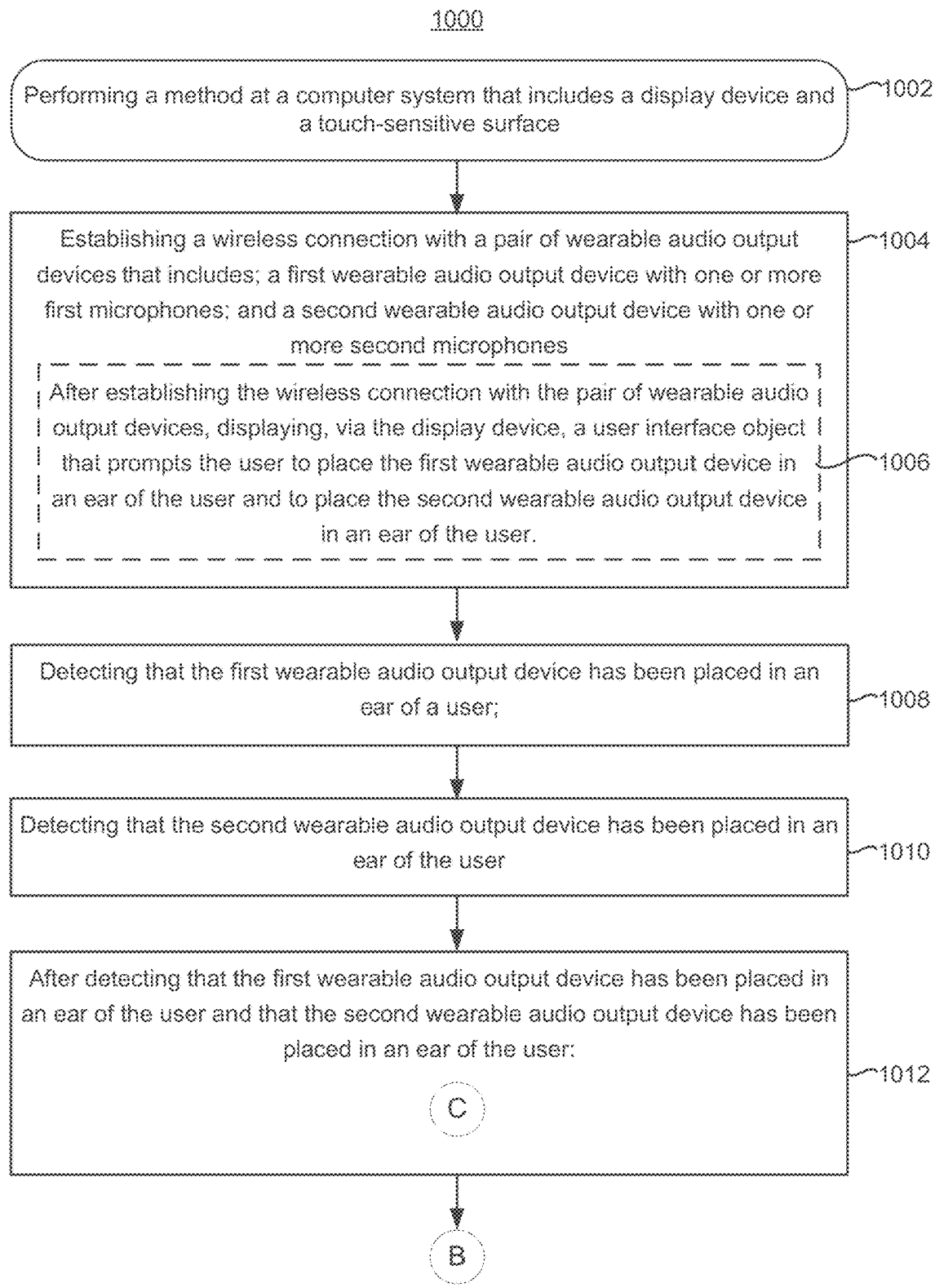
Figure 10B:
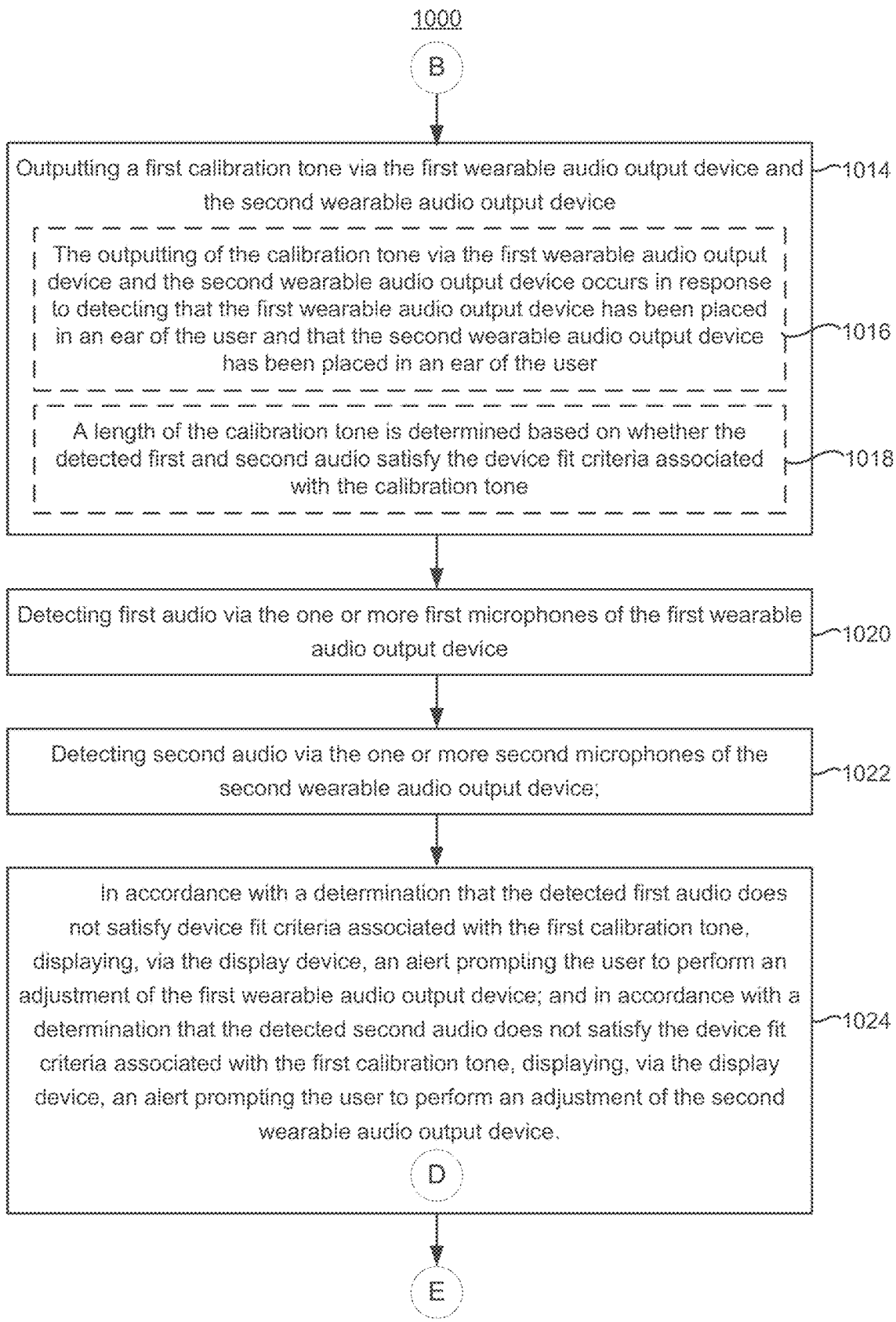

FIG. 10B illustrates the method 1000 continuing from section B in FIG. 10A. The method 1000 includes outputting 1014 a first calibration tone via the first wearable audio output device and the second wearable audio output device. In some embodiments, the outputting 1016 of the calibration tone via the first wearable audio output device and the second wearable audio output device occurs (e.g., automatically) in response to detecting that the first wearable audio output device has been placed in an ear of the user and that the second wearable audio output device has been placed in an ear of the user. In some embodiments, the automatic output of the calibration tone occurs each time both wearable audio output devices are placed in the ears of the user during setup (e.g., as illustrated by animation 530 in FIG. 5P).

Outputting the calibration tone in response to detecting placement of the wearable audio output devices in the user's ears progresses the calibration process without requiring the user to provide further input. Performing an operation (e.g., automatically) when a set of conditions has been met without requiring further user input reduces the number of inputs needed to perform the operation, which enhances the operability of the devices and makes the user-device interface more efficient (e.g., by helping the user to achieve an intended outcome and reducing user mistakes when operating/interacting with the devices), which, additionally, reduces power usage and improves battery life of the devices by enabling the user to use the devices more quickly and efficiently.

In some embodiments, a length of the calibration tone is determined (e.g., adjusted) based on whether the detected first and second audio satisfy the device fit criteria associated with the calibration tone 1018. In some embodiments, audio is detected (e.g., sampled) via the microphones of the first and second wearable audio output devices one or more times during the calibration tone. In some embodiments, the calibration tone continues to be output until the amount of audio other than the calibration tone in a respective detected audio sample is less than a threshold amount (e.g., as described herein with reference to operation 1024 of method 1000). In some embodiments, the calibration tone continues to be output until the amount of audio other than the calibration tone in the detected audio converges or plateaus (e.g., is less than a threshold amount for at least a threshold number of times). In some embodiments, the length of the calibration tone may be determined based on the number of attempts that have been made to satisfy the device fit criteria.

Dynamically varying the length of the calibration tone based on how long it takes to determine whether the detected audio meets particular criteria indicating that the wearable audio output devices are properly fitted reduces the number of times that the calibration needs to be repeated due to inconclusive test results during a fixed-length calibration. Reducing the number of inputs needed to perform an operation enhances the operability of the devices and makes the user-device interface more efficient (e.g., by helping the user to achieve an intended outcome and reducing user mistakes when operating/interacting with the devices), which, additionally, reduces power usage and improves battery life of the devices by enabling the user to use the devices more quickly and efficiently.

The method includes detecting 1020 first audio via the one or more first microphones of the first wearable audio output device (e.g., while outputting the first calibration tone, as illustrated by the animation 530 in FIG. 5H). The method also includes, detecting 1022 second audio via the one or more second microphones of the second wearable audio output device (e.g., while outputting the first calibration tone, as illustrated by the animation 530 in FIG. 5H).

The method 1000 includes, in accordance with a determination that the detected first audio does not satisfy device fit criteria (e.g., criteria associated with a quality of a seal formed by the device with the user's ear, which is shown in the sequence of FIGS. 5I to 5V where the user performs multiple adjustments in response to not satisfying the fit test) associated with the first calibration tone, displaying, via the display device, an alert prompting the user to perform an adjustment of the first wearable audio output device; and in accordance with a determination that the detected second audio does not satisfy the device fit criteria associated with the first calibration tone, displaying, via the display device, an alert prompting the user to perform an adjustment of the second wearable audio output device 1024.

In some embodiments, determining whether respective detected audio meets device fit criteria includes comparing the detected audio to the calibration tone and determining that the detected audio includes less than a threshold amount of audio (e.g., 50 dB, 40 dB, 30 dB, 25 dB, or 20 dB) other than the calibration tone. In some embodiments, in accordance with a determination that the detected first audio does not satisfy the device fit criteria and/or the detected second audio does not satisfy the device fit criteria (e.g., in accordance with a determination that at least one of the pair of wearable audio output devices does not satisfy the device fit criteria), an alert is displayed prompting the user to perform an adjustment to the pair of wearable audio output devices (e.g., to both the first wearable audio output device and the second wearable audio output device, without identifying a particular device to which to perform the adjustment, which is illustrated as instruction 610 in FIG. 6B). In some embodiments, the user is prompted to perform different actions for different wearable audio output devices of the pair (e.g., FIGS. 5I-5V where the user is prompted to fix only the earbud 502-2 in the ear 528-2 of the user. In some embodiments, the user is prompted to reposition a respective wearable audio output device in an ear of the user and/or change a respective attachment that is coupled to the respective wearable audio output device to a different attachment (e.g., FIG. 5M-5N where the user switches the eartip 527-2 to a larger eartip 527-3). In some embodiments, in accordance with a determination that a respective wearable audio output device satisfies the device fit criteria, the computer system forgoes displaying an alert prompting the user to perform an adjustment (e.g., changing attachment or repositioning) to the wearable audio output device. (e.g., as shown in FIG. 6A)

In some embodiments after displaying the alert(s) prompting the user to perform adjustment(s) of the wearable audio output device(s), the computer system detects that the user has performed the adjustment(s), for example by detecting that the wearable audio output device(s) have been placed (e.g., removed and subsequently replaced) in the user's ear(s). In some embodiments, for a respective wearable audio output device that has been replaced in an ear of the user, the computer system detects that the user has performed the adjustment by detecting that an attachment to the respective wearable audio output device has been changed (e.g., from a previously-detected attachment to a currently-detected attachment).

Figure 10C:
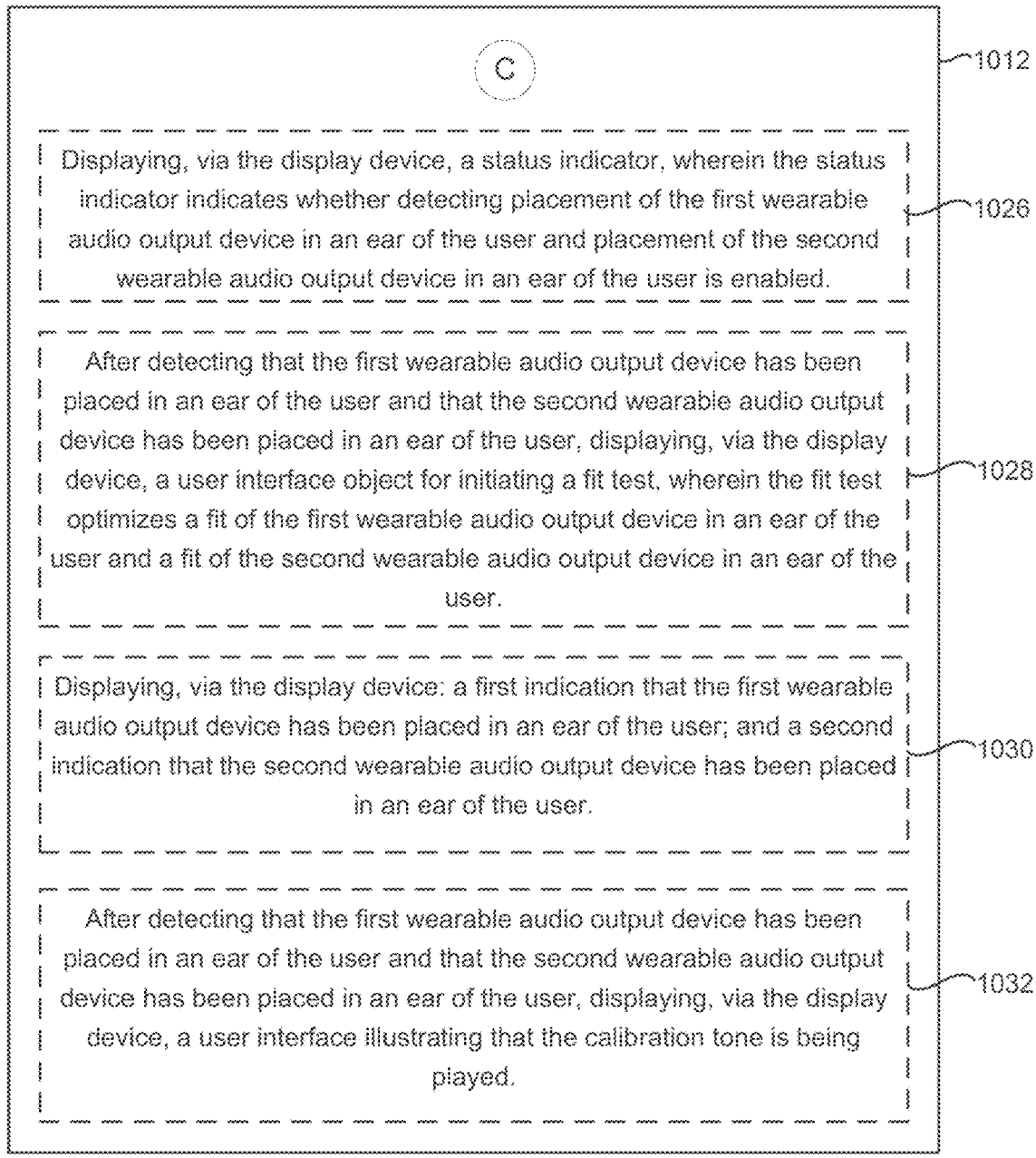

FIG. 10C continues from method flow block 1012. In some embodiments, displaying 1026, via the display device, a status indicator, wherein the status indicator indicates whether detecting placement of the first wearable audio output device in an ear of the user and placement of the second wearable audio output device in an ear of the user (e.g., in-ear detection of the wearable audio output devices) (e.g., by the computer system) is enabled. In some embodiments, the user has the option to turn off (e.g., disable) the in-ear-detection, in which case the computer system will not detect whether the first and second wearable audio devices are placed in the ears of the user, and, in some such cases, the first and second wearable audio output devices continue to operate in the same manner (e.g., perform the same functions) regardless of whether or not the first and second wearable audio output devices are placed in the ears of the user (e.g., FIGS. 9A-9C, where the user can select which modes to enable or disable).

Displaying, on the display device, a status indicator that indicates whether detection of placement of the wearable audio output devices in respective ears of the user (sometimes called "in-ear detection") is enabled provides visual feedback to the user indicating a relevant state of the computer system during the pairing and calibration process. Providing improved feedback to the user enhances the operability of the devices and makes the user-device interface more efficient (e.g., by helping the user to achieve an intended outcome and reducing user mistakes when operating/interacting with the devices), which, additionally, reduces power usage and improves battery life of the devices by enabling the user to use the devices more quickly and efficiently.

In some embodiments, after (e.g., in response to) detecting 1028 that the first wearable audio output device has been placed in an ear of the user and that the second wearable audio output device has been placed in an ear of the user, displaying, via the display device, a user interface object for initiating a fit test. The fit test optimizes (e.g., or assists the user in optimizing) a fit of the first wearable audio output device in an ear of the user and a fit of the second wearable audio output device in an ear of the user.

Displaying, on the display device, a user interface object that is selectable to initiate a fit test (e.g., to proceed with calibration following pairing) of the wearable audio output devices after or in response to detecting that the wearable audio output devices have been placed in the user's ears provides visual feedback to the user acknowledging the placement of the wearable audio output devices in the user's ears and facilitating performance of the next action in the calibration process. Providing improved feedback to the user enhances the operability of the devices and makes the user-device interface more efficient (e.g., by helping the user to achieve an intended outcome and reducing user mistakes when operating/interacting with the devices), which, additionally, reduces power usage and improves battery life of the devices by enabling the user to use the devices more quickly and efficiently. In addition, improving the fit of the wearable audio output devices improves the seal between the wearable audio output devices and the user's ears, which enables audio to be played at a lower volume to produce the same effective audio volume perceived by the user (e.g., relative to when the wearable audio output devices are not properly fitted, in which case hearing some ambient noise may cause the user to increase the audio output volume), thereby further reducing power usage and improving battery life of the devices.

In some embodiments, the method 1000 includes displaying (1030), via the display device: a first indication that the first wearable audio output device has been placed in an ear of the user (e.g., in response to detecting that the first wearable audio output device has been placed in an ear of the user (e.g., status indicator 529-1 in FIGS. 5I-5V)); and a second indication that the second wearable audio output device has been placed in an ear of the user (e.g., in response to detecting that the first wearable audio output device has been placed in an ear of the user (e.g., status indicator 529-2 in FIGS. 5I-5V)).

In some embodiments displaying a respective indication that a respective wearable audio output device has been placed in an ear of the user includes displaying a user interface object that indicates that the respective wearable audio output device has been placed in an ear of the user. In some embodiments, displaying the respective indication includes changing an appearance of a respective user interface object (e.g., that is already displayed) that represents the respective wearable audio output device, wherein the change in appearance indicates the placement of the respective wearable audio output device in an ear of the user. In some embodiments, the user interface object is a colored indicator (e.g., a black or yellow circle, as shown in FIG. 5I as status indicators 529-1 and 529-2). In some embodiments, the change in appearance of the user interface object includes a change in color (e.g., from gray to black, as shown in FIGS. 5F-5G) of the user interface object. In some embodiments, the user interface object includes an indication as to which wearable audio output device the user interface object represents (e.g., a user interface object for a left earbud includes the letter whereas a user interface object for a right earbud includes the letter 'L', as shown in FIG. 5F). In some embodiments, the user interface object also signifies whether the fit criteria was satisfied. In such an embodiment, when the fit criteria is satisfied, a different visual indicator is displayed (e.g., an appearance of the visual indicator is changed) (e.g., a green circle or a green circle with a checkmark within it, wherein the checkmark indicates that the wearable audio output device is in an ear of the user, as shown in FIG. 5J). If a user removes the audio device from their ear, a third visual indicator (e.g., a gray circle, as shown in FIG. 5M) is shown to indicate that the audio device has been removed from the user's ear.) Furthermore, in some embodiments, when a use has initially placed the wearable audio output device in the ear of the user, but before the electronic device determines if the fit criteria have been satisfied, the visual indicator will be black, and only once the device fit criteria has begun to be analyzed and/or has finished analyzing will the circles change to a yellow and/or green color.

Displaying indications that the wearable audio output devices have been placed in the user's ears provides visual feedback to the user indicating that the placement of the wearable audio output devices in the user's ears has been detected and acknowledged. Providing improved feedback to the user enhances the operability of the devices and makes the user-device interface more efficient (e.g., by helping the user to achieve an intended outcome and reducing user mistakes when operating/interacting with the devices), which, additionally, reduces power usage and improves battery life of the devices by enabling the user to use the devices more quickly and efficiently.

In some embodiments, after detecting 1032 that the first wearable audio output device has been placed in an ear of the user and that the second wearable audio output device has been placed in an ear of the user, displaying, via the display device, a user interface illustrating that the calibration tone is being played.

Transitioning to a next screen in the pairing and calibration process when the wearable audio output devices have been placed in the user's ears progresses the calibration process without requiring the user to provide further input. Performing an operation (e.g., automatically) when a set of conditions has been met without requiring further user input reduces the number of inputs needed to perform the operation, which enhances the operability of the devices and makes the user-device interface more efficient (e.g., by helping the user to achieve an intended outcome and reducing user mistakes when operating/interacting with the devices), which, additionally, reduces power usage and improves battery life of the devices by enabling the user to use the devices more quickly and efficiently.

Figure 10E:
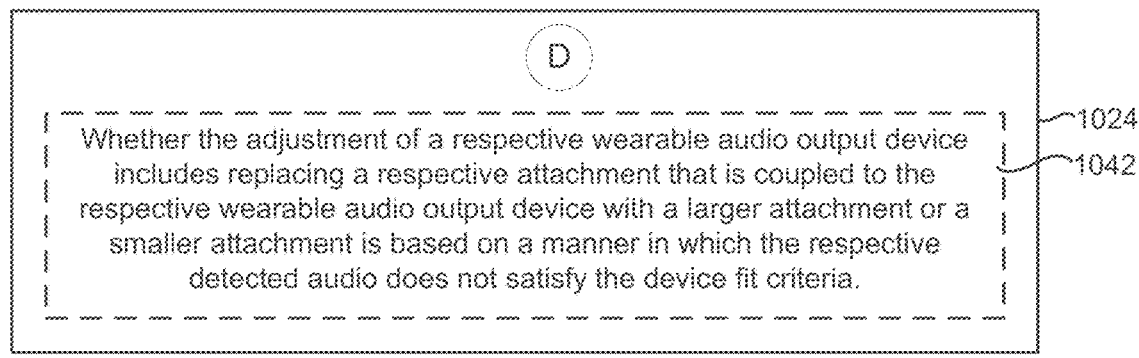

FIGS. 10D and 10E both depend from method flow block 1024 in FIG. 10B. The method 1000 includes, in some embodiments that the adjustment of a respective wearable audio output device includes repositioning 1034 the respective wearable audio output device in an ear of the user. In some embodiments, repositioning of a respective wearable audio output device is detected via one or more placement sensors on the respective wearable audio output device (e.g., as shown in FIGS. 5G-5I where the earbud 502-2 is not aligned in the ear, but corrected after the user has been alerted to its misalignment). In some embodiments, the attachment is a grommet that attaches to the wearable audio output device (e.g., a silicone ear-tip attachment on a pair of earbuds for creating a seal around the user's ear, which is illustrated in FIG. 5M-5N when the user swaps out the eartips).

Prompting the user to reposition the wearable audio output devices in his or her ears provides the user with visual feedback as to an action to perform to advance the pairing and calibration process and improve the fit of the wearable audio output devices. Providing improved feedback to the user enhances the operability of the devices and makes the user-device interface more efficient (e.g., by helping the user to achieve an intended outcome and reducing user mistakes when operating/interacting with the devices), which, additionally, reduces power usage and improves battery life of the devices by enabling the user to use the devices more quickly and efficiently. In addition, improving the fit of the wearable audio output devices improves the seal between the wearable audio output devices and the user's ears, which enables audio to be played at a lower volume to produce the same effective audio volume perceived by the user (e.g., relative to when the wearable audio output devices are not properly fitted, in which case hearing some ambient noise may cause the user to increase the audio output volume), thereby further reducing power usage and improving battery life of the devices.

In some embodiments, the first wearable audio output device is coupled to a first attachment (e.g., a first eartip), and the second wearable audio output device is coupled to a second attachment (e.g., a second eartip), and the method further includes: after (e.g., in response to) detecting repositioning of the first wearable audio output device and the second wearable audio output device: outputting a second calibration tone via the first wearable audio output device and the second wearable audio output device; detecting third audio via the one or more first microphones of the first wearable audio output device; detecting fourth audio via the one or more second microphones of the second wearable audio output device; in accordance with a determination that the detected third audio does not satisfy device fit criteria associated with the second calibration tone, displaying, via the display device, an alert prompting the user to change the first attachment that is coupled to the first wearable audio output device to a third attachment; and in accordance with a determination that the detected fourth audio does not satisfy the device fit criteria associated with the second calibration tone, displaying, via the display device, an alert prompting the user to change the second attachment that is coupled to the second wearable audio output device to a fourth attachment. In some embodiments, the reposition prompt is displayed before any attachment is added or removed from the audio output devices, as shown in FIG. 5I.

Prompting the user first to reposition the wearable audio output devices before prompting the user to change attachments, such as the eartips, on the wearable audio output devices provides the user with visual feedback as to a preferred order in which actions that are part of the pairing and calibration process should be performed to improve the fit of the wearable audio output devices. Providing improved feedback to the user enhances the operability of the devices and makes the user-device interface more efficient (e.g., by helping the user to achieve an intended outcome and reducing user mistakes when operating/interacting with the devices), which, additionally, reduces power usage and improves battery life of the devices by enabling the user to use the devices more quickly and efficiently. In addition, improving the fit of the wearable audio output devices improves the seal between the wearable audio output devices and the user's ears, which enables audio to be played at a lower volume to produce the same effective audio volume perceived by the user (e.g., relative to when the wearable audio output devices are not properly fitted, in which case hearing some ambient noise may cause the user to increase the audio output volume), thereby further reducing power usage and improving battery life of the devices.

In some embodiments of method 1000, the adjustment of a respective wearable audio output device includes changing 1038 a respective attachment that is coupled to the respective wearable audio output device to a different attachment. (e.g., an ear-tip to seal the earphone or earbud with the user's ear, which may help to maintain the placement of the earphone or earbud within the user's ear during movement, which is illustrated in FIGS. 5M-5N where the portable electronic device prompts the user to move to a larger eartip size.)

Prompting the user to change attachments, such as the eartips, on the wearable audio output devices provides the user with visual feedback as to an action to perform to advance the pairing and calibration process and improve the fit of the wearable audio output devices. Providing improved feedback to the user enhances the operability of the devices and makes the user-device interface more efficient (e.g., by helping the user to achieve an intended outcome and reducing user mistakes when operating/interacting with the devices), which, additionally, reduces power usage and improves battery life of the devices by enabling the user to use the devices more quickly and efficiently. In addition, improving the fit of the wearable audio output devices improves the seal between the wearable audio output devices and the user's ears, which enables audio to be played at a lower volume to produce the same effective audio volume perceived by the user (e.g., relative to when the wearable audio output devices are not properly fitted, in which case hearing some ambient noise may cause the user to increase the audio output volume), thereby further reducing power usage and improving battery life of the devices.

In some embodiments the method determines whether the adjustment of a respective wearable audio output device includes changing 1040 a respective attachment that is coupled to the respective wearable audio output device with a different attachment or repositioning the respective wearable audio output device in an ear of the user is based on a manner in which the respective detected audio does not satisfy the device fit criteria. In some embodiments, the attachment is a grommet that attaches to the wearable audio output device (e.g., a silicone ear-tip attachment on a pair of earbuds for creating a seal around the user's ear, as shown in eartip 527-2 and 527-3 in FIGS. 5M-5N).

Determining whether to suggest repositioning of the wearable audio output devices or changing attachments based on the results of the calibration test reduces the number of adjustments that the user needs to perform, thereby helping the user progress through the pairing and calibration process and achieve a good fit of the wearable audio output devices more quickly. Providing improved feedback to the user and reducing the number of inputs needed and time spent performing the pairing and calibration process enhances the operability of the devices and makes the user-device interface more efficient (e.g., by helping the user to achieve an intended outcome and reducing user mistakes when operating/interacting with the devices), which, additionally, reduces power usage and improves battery life of the devices by enabling the user to use the devices more quickly and efficiently. In addition, improving the fit of the wearable audio output devices improves the seal between the wearable audio output devices and the user's ears, which enables audio to be played at a lower volume to produce the same effective audio volume perceived by the user (e.g., relative to when the wearable audio output devices are not properly fitted, in which case hearing some ambient noise may cause the user to increase the audio output volume), thereby further reducing power usage and improving battery life of the devices.

The method 1000 includes, in some embodiments, determining whether the adjustment of a respective wearable audio output device includes replacing 1042 a respective attachment that is coupled to the respective wearable audio output device with a larger attachment or a smaller attachment (e.g., than the respective attachment) is based on a manner in which the respective detected audio (e.g., detected via the one or more microphones of the respective wearable audio output device, as shown by microphones in FIG. 3C) does not satisfy the device fit criteria.

Determining whether to suggest changing attachments to the wearable audio output devices to larger or smaller size attachments based on the results of the calibration test reduces the number of adjustments that the user needs to perform, thereby helping the user progress through the pairing and calibration process and achieve a good fit of the wearable audio output devices more quickly. Providing improved feedback to the user and reducing the number of inputs needed and time spent performing the pairing and calibration process enhances the operability of the devices and makes the user-device interface more efficient (e.g., by helping the user to achieve an intended outcome and reducing user mistakes when operating/interacting with the devices), which, additionally, reduces power usage and improves battery life of the devices by enabling the user to use the devices more quickly and efficiently. In addition, improving the fit of the wearable audio output devices improves the seal between the wearable audio output devices and the user's ears, which enables audio to be played at a lower volume to produce the same effective audio volume perceived by the user (e.g., relative to when the wearable audio output devices are not properly fitted, in which case hearing some ambient noise may cause the user to increase the audio output volume), thereby further reducing power usage and improving battery life of the devices.

Transitioning to FIG. 10F, which flows from block 1024, in some embodiments, includes that in accordance with a determination that the detected first audio satisfies the device fit criteria associated with the calibration tone, displaying 1044, via the display device, an indication that the first wearable audio output device is fitted to an ear of the user; and in accordance with a determination that the detected second audio satisfies the device fit criteria associated with the calibration tone, displaying, via the display device, an indication that the second wearable audio output device is fitted to an ear of the user.

In some embodiments, displaying a respective indication that a respective wearable audio output device has been placed in an ear of the user includes displaying a user interface object that indicates that the respective wearable audio output device has been placed in an ear of the user (e.g., FIG. 5F showing status indicators 529-1 and 529-2 in the gray color indicating that earbuds are not placed in the ears, and FIG. 5G showing the status indicators 529-1 and 529-2 in the black color denoting that they have been placed in the ears of the user). In some embodiments, displaying the respective indication includes changing an appearance of a respective user interface object (e.g., that is already displayed) that represents the respective wearable audio output device, wherein the change in appearance indicates the placement of the respective wearable audio output device in an ear of the user. In some embodiments, the user interface object is a colored indicator (e.g., FIG. 5F showing status indicators 529-1 and 529-2 in the gray color indicating that earbuds are not placed in the ears, and FIG. 5G showing the status indicators 529-1 and 529-2 in the black color denoting that they have been placed in the ears of the user). In some embodiments, the change in appearance of the user interface object includes a change in color (e.g., from gray to black, as shown in FIGS. 5F-5G) of the user interface object. In some embodiments, the user interface object includes an indication as to which wearable audio output device the user interface object represents (e.g., a user interface object for a left earbud includes the letter 'L', whereas a user interface object for a right earbud includes the letter 'R' which is shown in FIGS. 5F-5G). In some embodiments, the user interface object also signifies whether the fit criteria was satisfied. In such an embodiment, when the fit criteria is satisfied, a different visual indicator is displayed (e.g., an appearance of the visual indicator is changed) (e.g., a green circle or a green circle with a checkmark within it, wherein the checkmark indicates that the wearable audio output device is in an ear of the user, as shown in FIG. 5H by status indicator 529-1). If a user removes the audio device from their ear, a third visual indicator (e.g., a gray circle, as shown by 529-2 in FIG. 5M being a gray color when the user removes the earbud 502-2 to change out the eartips) is shown to indicate that the audio device has been removed from the user's ear.) Furthermore, In some embodiments, when a user has initially placed the wearable audio output device in the ear of the user, but before the electronic device determines if the fit criteria have been satisfied, the visual indicator will be black, and only once the device fit criteria has begun to be analyzed and/or has finished analyzing will the circles change to a yellow and/or green color (e.g., FIGS. 5H-5I where status indicator 529-2 transitions from a solid back background to a hashed background (or a yellow background).

Displaying, on the display device, an indication that the wearable audio output devices are fitted to the user's ears provides visual feedback to the user about the fit of the wearable audio output devices and indicating that the pairing and calibration process has been successfully completed. Providing improved feedback to the user enhances the operability of the devices and makes the user-device interface more efficient (e.g., by helping the user to achieve an intended outcome and reducing user mistakes when operating/interacting with the devices), which, additionally, reduces power usage and improves battery life of the devices by enabling the user to use the devices more quickly and efficiently. In addition, when the wearable audio output devices are fitted to the user's ears, the seal between the wearable audio output devices and the user's ears enables audio to be played at a lower volume to produce the same effective audio volume perceived by the user (e.g., relative to when the wearable audio output devices are not properly fitted, in which case hearing some ambient noise may cause the user to increase the audio output volume), thereby further reducing power usage and improving battery life of the devices.

In some embodiments, method 1000 includes displaying 1046 the alert prompting the user to perform an adjustment of the first wearable audio output device (e.g., in accordance with the determination that the detected first audio does not satisfy the device fit criteria) is performed independently of whether the detected second audio satisfies the device fit criteria; and displaying the alert prompting the user to perform an adjustment of the second wearable audio output device (e.g., in accordance with the determination that the detected second audio does not satisfy the device fit criteria) is performed independently of whether the detected first audio satisfies the device fit criteria.

In some embodiments the prompted adjustment of the first wearable audio output device is a first type of adjustment (e.g., repositioning in the user's ear), and no adjustment is prompted for the second wearable audio output device or the type of adjustment prompted for the second wearable audio output device is a different type of adjustment from the first adjustment (e.g., the type of adjustment prompted for the second wearable audio output device is a second type of adjustment, such as changing an attachment such as an eartip for the second wearable audio output device). In some embodiments, a status indicator (e.g., a green circle with a checkmark indicating that the fit test criteria was met) is presented for one of the wearable audio output devices, and a different status indicator (e.g., a yellow circle with a checkmark indicating that the fit test criteria was met) is presented for the other wearable audio output device as shown in FIG. 5I-5J.

Determining whether adjustment is needed and prompting the user to perform an adjustment for one of the wearable audio output devices separately from the other wearable audio output device (e.g., for a pair of wearable audio output devices) provides visual feedback to the user indicating which wearable audio output device(s) in particular need adjustment, which may reduce the number of adjustments that the user needs to perform, thereby helping the user progress through the pairing and calibration process and achieve a good fit of the wearable audio output devices more quickly. Providing improved feedback to the user and reducing the number of inputs needed and time spent performing the pairing and calibration process enhances the operability of the devices and makes the user-device interface more efficient (e.g., by helping the user to achieve an intended outcome and reducing user mistakes when operating/interacting with the devices), which, additionally, reduces power usage and improves battery life of the devices by enabling the user to use the devices more quickly and efficiently. In addition, improving the fit of the wearable audio output devices improves the seal between the wearable audio output devices and the user's ears, which enables audio to be played at a lower volume to produce the same effective audio volume perceived by the user (e.g., relative to when the wearable audio output devices are not properly fitted, in which case hearing some ambient noise may cause the user to increase the audio output volume), thereby further reducing power usage and improving battery life of the devices.

FIG. 10G includes additional optional method features stemming from flow box 1038 in FIG. 10D. In some embodiments, the first wearable audio output device is coupled to a first attachment (e.g., a first eartip) while detecting 1048 the first audio, and the second wearable audio output device is coupled to a second attachment (e.g., a second eartip) while detecting the second audio, and the method further includes: in accordance with the determination that the detected first audio does not satisfy the device fit criteria and in accordance with the determination that the detected second audio does not satisfy the device fit criteria: after (e.g., in response to) detecting that the first attachment coupled to the first wearable audio output device is changed to a third attachment and that the second attachment coupled to the second wearable audio output device is changed to a fourth attachment: outputting a second calibration tone via the first wearable audio output device and the second wearable audio output device; detecting third audio via the one or more first microphones of the first wearable audio output device; detecting fourth audio via the one or more second microphones of the second wearable audio output device; in accordance with a determination that the detected third audio does not satisfy device fit criteria associated with the second calibration tone: determining whether the detected first audio or the detected third audio came closer to satisfying the device fit criteria; and displaying, via the display device, an alert prompting the user to use a respective attachment of the first attachment and the third attachment that came closer to satisfying the device fit criteria; in accordance with a determination that the detected fourth audio does not satisfy the device fit criteria associated with the second calibration tone: determining whether the detected second audio or the detected fourth audio came closer to satisfying the device fit criteria; and displaying, via the display device, an alert prompting the user to use a respective attachment of the second attachment and the fourth attachment that came closer to satisfying the device fit criteria. In some embodiments, the computer system uses data retrieved from the first attempt to satisfy the device fit criteria (e.g., the calibration attempt while using the first and second attachments).

When calibration has been attempted with multiple attachments (e.g., eartips), prompting the user to use the attachments that came closest to satisfying the device fit criteria provides visual feedback to the user indicating which attachments will provide the best possible audio experience even when none of the attachments outright satisfy the device fit criteria. Providing improved feedback to the user enhances the operability of the devices and makes the user-device interface more efficient (e.g., by helping the user to achieve an intended outcome and reducing user mistakes when operating/interacting with the devices), which, additionally, reduces power usage and improves battery life of the devices by enabling the user to use the devices more quickly and efficiently. In addition, improving the fit of the wearable audio output devices improves the seal between the wearable audio output devices and the user's ears, which enables audio to be played at a lower volume to produce the same effective audio volume perceived by the user (e.g., relative to when the wearable audio output devices are not properly fitted, in which case hearing some ambient noise may cause the user to increase the audio output volume), thereby further reducing power usage and improving battery life of the devices.

FIG. 10H includes additional optional method features stemming from flow box 1038 in FIG. 10D. In some embodiments, after detecting that the first wearable audio output device has been replaced in (e.g., after being removed from) an ear of the user, and that the second wearable audio output device has been replaced in (e.g., after being removed from) an ear of the user, displaying, via the display device, a user interface that includes a user interface object that, when selected, causes the computer system to: output a second calibration tone via the first wearable audio output device and the second wearable audio output device; detect third audio via the one or more first microphones of the first wearable audio output device; detect fourth audio via the one or more second microphones of the second wearable audio output device; in accordance with a determination that the detected second audio does not satisfy device fit criteria (e.g., criteria associated with a quality of a seal formed by the device with the user's ear) associated with the second calibration tone, display, via the display device, an alert prompting the user to perform an adjustment of the first wearable audio output device; and in accordance with a determination that the detected third audio does not satisfy the device fit criteria associated with the second calibration tone, display, via the display device, an alert prompting the user to perform an adjustment of the second wearable audio output device.

In some embodiments, determining whether respective detected audio meets device fit criteria includes comparing the detected audio to the calibration tone and determining that the detected audio includes less than a threshold amount of audio (e.g., 50 dB, 40 dB, 30 dB, 25 dB, or 20 dB) other than the calibration tone. In some embodiments, when the user selects the second user interface object, the device will use previously detected audio to satisfy the device fit criteria.

After detecting that the wearable audio output devices have been replaced in the user's ears, providing a user interface object to re-output the calibration tone and repeat the calibration process provides the user with visual feedback as to a next action to be performed as part of the pairing and calibration process and reduces the number of inputs needed for the user to perform this next action. Providing improved feedback to the user and reducing the number of inputs needed to perform an operation enhances the operability of the devices and makes the user-device interface more efficient (e.g., by helping the user to achieve an intended outcome and reducing user mistakes when operating/interacting with the devices), which, additionally, reduces power usage and improves battery life of the devices by enabling the user to use the devices more quickly and efficiently.

It should be understood that the particular order in which the operations in FIGS. 10A-10H have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 1100, 1200, 1800, 1900, 2000, 2400, and 2600) are also applicable in an analogous manner to method 1000 described above with respect to FIGS. 10A-10H. For example, the devices, user interfaces, audio outputs, audio output modes, alerts, adjustments, and attachments described above with reference to method 1000 optionally have one or more of the characteristics of the devices, user interfaces, audio outputs, audio output modes, alerts, adjustments, and attachments described herein with reference to other methods described herein (e.g., methods 1100, 1200, 1800, 1900, 2000, 2400, and 2600). For brevity, these details are not repeated here.

FIGS. 11A-11D are flow diagrams illustrating method 1100 of monitoring the fit of wearable audio output devices during use (e.g., outside of a setup user interface) in accordance with some embodiments. Method 1000 is performed a computer system (e.g., portable multifunction device 100 in FIG. 1A, or device 300 in FIG. 3A) that includes a display device (e.g., touch-sensitive display system 112 in FIG. 1A or display 340 in FIG. 3A) and that is in communication with one or more wearable audio output devices (e.g., wearable audio output device 301, FIG. 3B), wherein the computer system is configured to execute a plurality of applications (e.g., applications 136 in FIG. 1A), and the one or more wearable audio output devices include one or more sensors for detecting placement of the one or more wearable audio output devices (e.g., placement sensor(s) 304, FIG. 3B) and one or more microphones (e.g., microphone(s) 302, FIG. 3B). Some operations in method 1100 are, optionally, combined and/or the order of some operations is, optionally, changed.

As described below, method 1100 provides an improved interface for optimizing the audio experience by intelligently suggesting adjustments to the wearable audio output devices (e.g., headphones) while the user is using the wearable audio output devices (e.g., outside of a pairing and calibration process) in response to detecting that the wearable audio devices no longer satisfy device fit criteria, which provides visual feedback to the user indicating that issues with the wearable audio output devices that may affect the audio experience have been detected and helping the user to improve the fit of the wearable audio output devices. Providing improved feedback to the user enhances the operability of the computer system and associated devices (e.g., the wearable audio output devices and/or the display device) and makes the user-device interface more efficient (e.g., by helping the user to achieve an intended outcome and reducing user mistakes when operating/interacting with the devices), which, additionally, reduces power usage and improves battery life of the devices by enabling the user to use the devices more quickly and efficiently. In addition, improving the fit of the wearable audio output devices improves the seal between the wearable audio output devices and the user's ears, which enables audio to be played at a lower volume to produce the same effective audio volume perceived by the user (e.g., relative to when the wearable audio output devices are not properly fitted, in which case hearing some ambient noise may cause the user to increase the audio output volume), thereby further reducing power usage and improving battery life of the devices.

The method 1100 includes, while the one or more wearable audio output devices are in one or more respective positions relative to a user's ears, and while a media presentation application on the computer system is being used to play media via the one or more wearable audio output devices without displaying a settings user interface for configuring a fit of the one or more wearable audio output devices 1104.

The method 1100 also includes providing 1106, via the one or more wearable audio output devices, audio output based on media from the media presentation application, wherein the media presentation application is separate from the settings user interface; In some embodiments, the computer system also monitors (e.g., continually or at repeated intervals) audio detected via one or more microphones (e.g., as shown by microphones 302 in FIG. 3C) on the one or more wearable audio output devices to determine whether the one or more wearable audio output devices satisfy the device fit criteria.

Furthermore, the method 1100 includes, determining 1108, based on the audio output based on the media from the media presentation application, that the one or more wearable audio output devices have ceased to satisfy device fit criteria; and in response to determining that the one or more wearable audio output devices have ceased to satisfy the device fit criteria, displaying 1110, on the display device, an alert corresponding to (e.g., including) information about a fit of the one or more wearable audio output devices. In some embodiments, in accordance with a determination that the user is not in a respective predefined context (e.g., the user is in a context other than one or more predefined contexts in which device fit is monitored, such as a workout application shown in FIGS. 6A-6L), the computer system does not display, on the display device (e.g., as shown in FIG. 6A), an alert to prompt the user to perform an adjustment of the one or more wearable audio output devices despite determining, based on the audio output based on the media from the media presentation application, that the one or more wearable audio output devices have ceased to satisfy the device fit criteria.

Figure 11B:
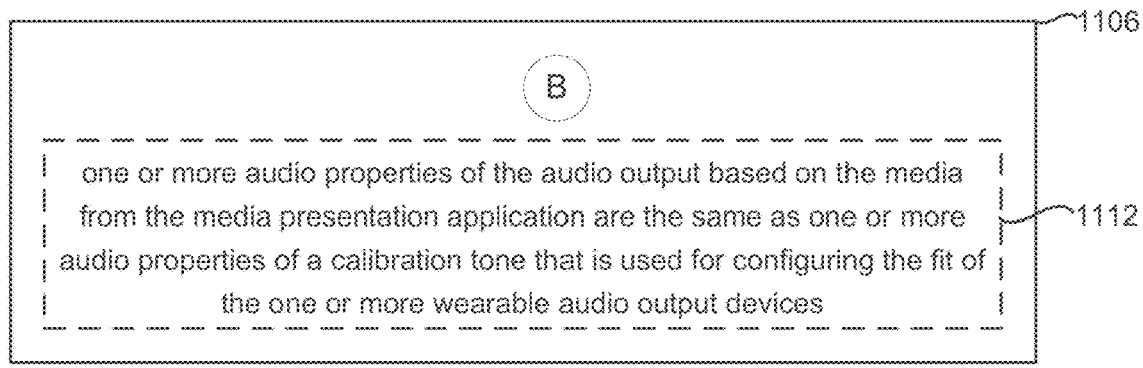

Referring to FIG. 11B, which stems from method block 1106 in FIG. 11A, optionally, one or more audio properties of the audio output based on the media from the media presentation application are the same as one or more audio properties of a calibration tone that is used for configuring the fit of the one or more wearable audio output devices (e.g., via the settings user interface as shown in FIG. 9A-9B). Stated another way, in some embodiments the audio output based on the media from the media presentation application has, for at least a short period of time, a similar sound profile (e.g., frequency profile) to the calibration tone. Alternatively, the audio output based on the media has, for at least the short period of time, sufficient energy in an audio frequency band corresponding to that of the calibration tone, to be used as the equivalent of the calibration tone.

Performing calibration while a user is using the wearable audio output devices to listen to audio (e.g., outside of the pairing and calibration process) efficiently monitors the fit of the wearable audio output devices and enables providing the user with feedback about the fit without interrupting the audio experience, and without requiring the user to separately navigate to the settings user interface to initiate the calibration process. Providing improved feedback and reducing the number of inputs needed to monitor device fit enhances the operability of the devices and makes the user-device interface more efficient (e.g., by helping the user to achieve an intended outcome and reducing user mistakes when operating/interacting with the devices), which, additionally, reduces power usage and improves battery life of the devices by enabling the user to use the devices more quickly and efficiently.

Figure 11C:
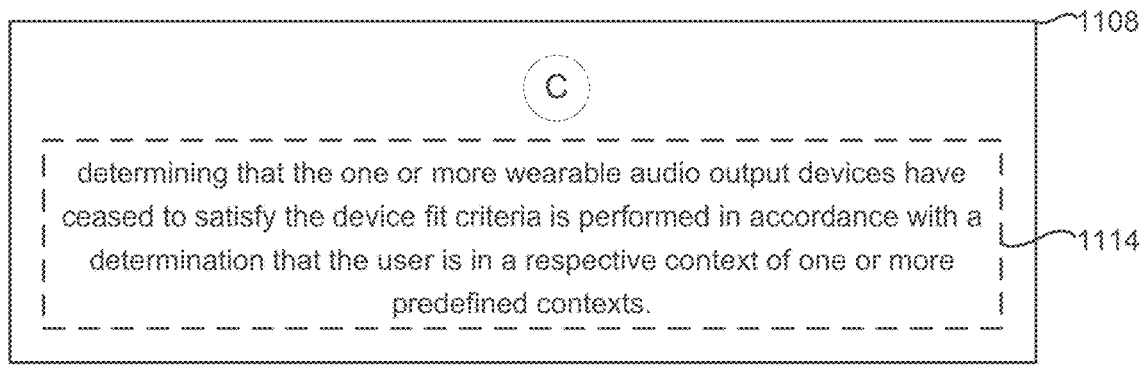

Now moving to FIG. 11C, which stems from method block 1108 in FIG. 11, in some embodiments optionally includes the feature of determining 1114 that the one or more wearable audio output devices have ceased to satisfy the device fit criteria is performed in accordance with a determination that the user is in a respective context of one or more predefined contexts.

In some embodiments the user is in a respective context of one or more predefined contexts when the user is performing a particular activity of one or more predefined activities (e.g., exercising, such as running, walking, swimming, etc. as shown in the workout application in FIGS. 6A-6L). The one or more predefined activities may be specified by the user or may be defined by the computer system (e.g., by default). Whether the user is in a respective context can be specified by the user (e.g., by launching an exercise application, as shown in FIGS. 6A-6L), or can be automatically detected by the computer system and/or the one or more wearable audio output devices (e.g., using one or more motion sensors, accelerometers, and/or gyroscopes, etc.). In some embodiments, in accordance with a determination that the user is not in a respective context of the one or more predefined contexts, the computer system forgoes determining whether the one or more wearable audio output devices have ceased to satisfy the device fit criteria while the media presentation application on the computer system is being used to play media without displaying the settings user interface.

Monitoring for device fit during particular contexts (e.g., during particular activities) enables providing the user with feedback about the fit of the wearable audio output devices when relevant or desired, without requiring the user to separately navigate to the settings user interface to initiate the calibration process. Providing improved feedback to the user and performing an operation (e.g., automatically) when a set of conditions has been met without requiring further user input reduces the number of inputs needed to perform the operation (e.g., monitoring device fit), which enhances the operability of the devices and makes the user-device interface more efficient (e.g., by helping the user to achieve an intended outcome and reducing user mistakes when operating/interacting with the devices), which, additionally, reduces power usage and improves battery life of the devices by enabling the user to use the devices more quickly and efficiently.

Figure 11D:
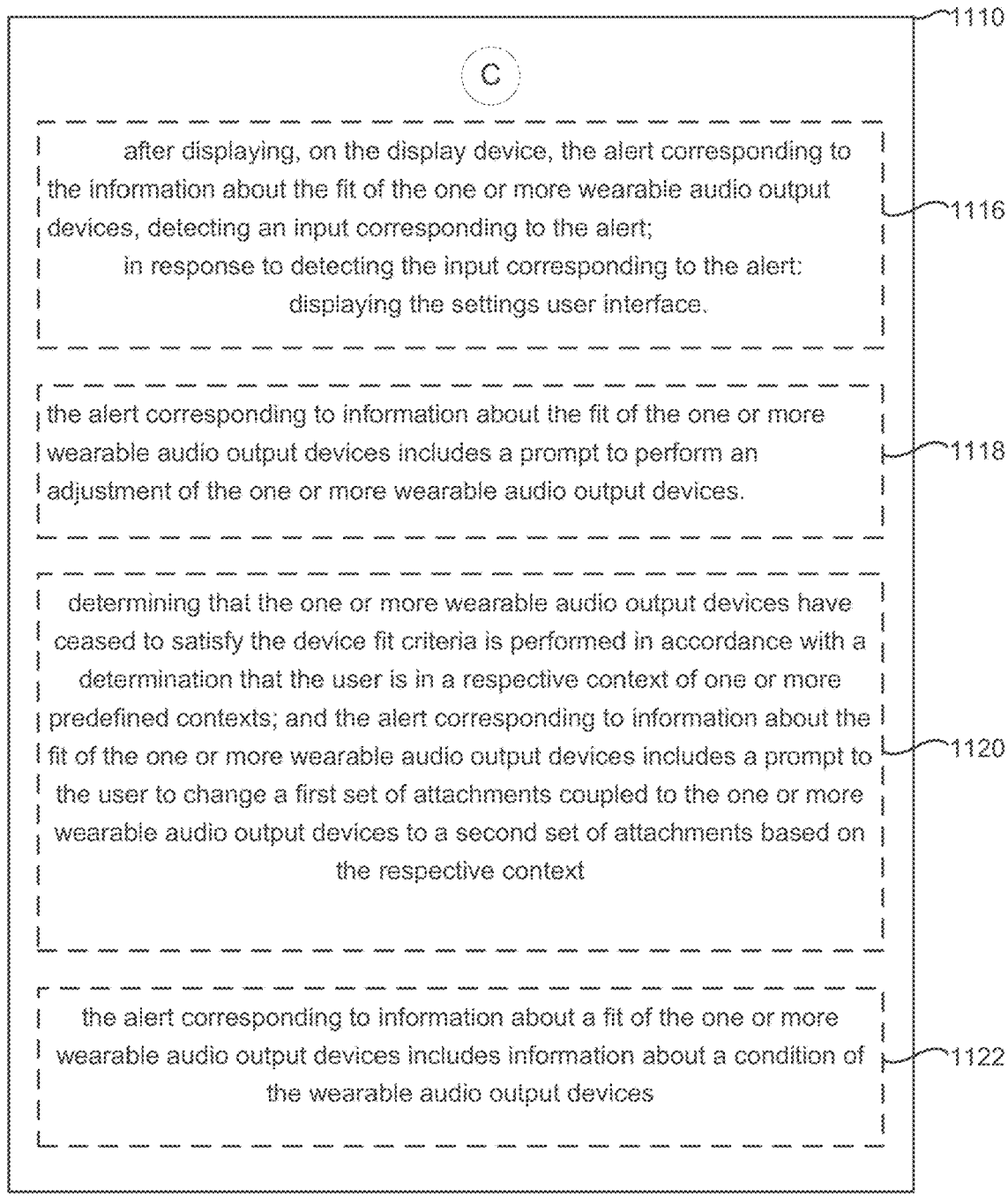

Moving to FIG. 11D, which stems from method block 1110 in FIG. 11A optionally includes additional features. The method 1100 optionally includes, after displaying 1116, on the display device, the alert corresponding to the information about the fit of the one or more wearable audio output devices, detecting an input corresponding to the alert (e.g., a tap input on a touch-sensitive surface of the computer system at a location on the touch-sensitive surface that corresponds to the displayed alert). In some embodiments, the alert is a notification displayed over at least a portion of a currently displayed user interface, as shown FIGS. 6B-1 to 6B-3. In some such embodiments, a corresponding alert is shown in a notification user interface. In some embodiments, the corresponding alert is an audio alert played at one or more of the audio output devices in response to detecting the input corresponding to the alert: displaying the settings user interface. In some embodiments, the settings user interface is an audio output-specific user interface (e.g., a settings user interface shown in FIGS. 9A-9B). In some embodiments, where the computer system is displaying a particular user interface, such as media application user interface (e.g., the workout application shown in FIGS. 6A-6L, when the input is detected the computer system ceases to display the particular user interface in combination with displaying the settings user interface (e.g., the settings user interface replaces the particular displayed user interface).

Displaying a settings user interface in response to an input corresponding to an alert with information about the fit of the wearable audio output devices provides the user with access to additional control options without requiring the user to separately navigate to the settings user interface. Reducing the number of inputs needed to access additional control options enhances the operability of the devices and makes the user-device interface more efficient (e.g., by helping the user to achieve an intended outcome and reducing user mistakes when operating/interacting with the devices), which, additionally, reduces power usage and improves battery life of the devices by enabling the user to use the devices more quickly and efficiently.

In some embodiments, the alert corresponding 1118 to information about the fit of the one or more wearable audio output devices includes a prompt to perform an adjustment of the one or more wearable audio output devices. For example, in some embodiments, the alert can suggest that the user recalibrate the audio output devices (e.g., via the settings user interface for configuring the fit of the one or more wearable audio output devices, as shown in FIGS. 5U, 6B-1 to 6B-3). In some embodiments, the alert can suggest that the user reposition the one or more audio output devices in the user's ear(s) (e.g., the banner 618 in FIG. 6H prompting the user to correct the placement of the earbud 502-2.

Prompting a user to perform an adjustment of the wearable audio output devices as part of an alert with information about the fit of the wearable audio output devices provides visual feedback to the user indicating a way in which issues with the fit of the wearable audio output devices can be resolved. Providing improved feedback to the user enhances the operability of the devices and makes the user-device interface more efficient (e.g., by helping the user to achieve an intended outcome and reducing user mistakes when operating/interacting with the devices), which, additionally, reduces power usage and improves battery life of the devices by enabling the user to use the devices more quickly and efficiently. In addition, improving the fit of the wearable audio output devices improves the seal between the wearable audio output devices and the user's ears, which enables audio to be played at a lower volume to produce the same effective audio volume perceived by the user (e.g., relative to when the wearable audio output devices are not properly fitted, in which case hearing some ambient noise may cause the user to increase the audio output volume), thereby further reducing power usage and improving battery life of the devices.

In some embodiments, the method 1000 optionally includes determining 1120 that the one or more wearable audio output devices have ceased to satisfy the device fit criteria is performed in accordance with a determination that the user is in a respective context of one or more predefined contexts; and the alert corresponding to information about the fit of the one or more wearable audio output devices includes a prompt to the user to change a first set of attachments coupled to the one or more wearable audio output devices to a second set of attachments based on the respective context. In some embodiments, the alert includes prompting the user to change an attachment (e.g., a silicone ear-tip attachment on a pair of earbuds for creating a seal around the user's ear, as displayed in FIG. 6D-6E) from one size (e.g., a small) to another size (e.g., a larger size to ensure a seal during an activity, as shown in FIG. 6D-6E).

Prompting the user to change to a particular set of attachments based on a current context (e.g., a current activity) of the user as part of an alert with information about the fit of the wearable audio output devices provides visual feedback to the user indicating a way in which issues with the fit of the wearable audio output devices can be resolved. Providing improved feedback to the user enhances the operability of the devices and makes the user-device interface more efficient (e.g., by helping the user to achieve an intended outcome and reducing user mistakes when operating/interacting with the devices), which, additionally, reduces power usage and improves battery life of the devices by enabling the user to use the devices more quickly and efficiently. In addition, improving the fit of the wearable audio output devices improves the seal between the wearable audio output devices and the user's ears, which enables audio to be played at a lower volume to produce the same effective audio volume perceived by the user (e.g., relative to when the wearable audio output devices are not properly fitted, in which case hearing some ambient noise may cause the user to increase the audio output volume), thereby further reducing power usage and improving battery life of the devices.

In some embodiments, the alert corresponding 1122 to information about a fit of the one or more wearable audio output devices includes information about a condition of the wearable audio output devices. In some embodiments, the condition is the physical condition of an attachment (e.g., an ear-tip), or a clogged attachment (e.g., an ear-tip clogged with earwax, which is illustrated in FIGS. 6D-6G where the eartip 616-4 is dirty and needs to be cleaned).

Providing information about a condition of the wearable audio output devices or of attachments to the devices (e.g., whether the devices or attachments are clogged, worn, or torn) as part of an alert with information about the fit of the wearable audio output devices provides visual feedback to the user indicating a way in which issues with the fit or condition of the wearable audio output devices can be resolved. Providing improved feedback to the user enhances the operability of the devices and makes the user-device interface more efficient (e.g., by helping the user to achieve an intended outcome and reducing user mistakes when operating/interacting with the devices), which, additionally, reduces power usage and improves battery life of the devices by enabling the user to use the devices more quickly and efficiently. In addition, improving the fit or condition of the wearable audio output devices improves the seal between the wearable audio output devices and the user's ears, which enables audio to be played at a lower volume to produce the same effective audio volume perceived by the user (e.g., relative to when the wearable audio output devices are not properly fitted, in which case hearing some ambient noise may cause the user to increase the audio output volume), thereby further reducing power usage and improving battery life of the devices.

It should be understood that the particular order in which the operations in FIGS. 11A-11D have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 1000, 1200, 1800, 1900, 2000, 2400, and 2600) are also applicable in an analogous manner to method 1100 described above with respect to FIGS. 11A-11D. For example, the devices, user interfaces, audio outputs, audio output modes, alerts, adjustments, and attachments described above with reference to method 1100 optionally have one or more of the characteristics of the devices, user interfaces, audio outputs, audio output modes, alerts, adjustments, and attachments described herein with reference to other methods described herein (e.g., methods 1000, 1200, 1800, 1900, 2000, 2400, and 2600). For brevity, these details are not repeated here.

FIGS. 12A-12E are flow diagrams illustrating method 1200 of controlling audio outputs using inputs at a wearable audio output device in accordance with some embodiments. Method 1200 is performed at a wearable audio output device (e.g., wearable audio output device 301, FIG. 3B) that includes an input device (e.g., input device 308, FIG. 3B) and one or more microphones (e.g., microphone(s) 302, FIG. 3B) and that is in a physical environment. In some embodiments, the input device is pressure-sensitive (also called "intensity-sensitive"). For example, the input device responds to squeeze inputs (e.g., inputs where intensity (also called pressure) is applied to the input device when held and pinched between two fingers) that satisfy an intensity threshold, which in some embodiments is greater than a nominal contact detection intensity threshold that would be used for touch inputs. In some embodiments, the input device is touch-sensitive (e.g., the input device responds to touch inputs, such as by a finger or stylus, that satisfy a nominal contact detection intensity threshold). Some operations in method 1200 are, optionally, combined and/or the order of some operations is, optionally, changed.

As described below, method 1200 provides an improved interface for controlling audio outputs by changing the audio output mode of an audio output device, such as a wearable device, between audio pass-through and audio cancellation in response to a particular type of gesture. Providing additional control options for controlling audio outputs, such as changing the audio output mode, without cluttering the user interface with additional displayed controls, as well as reducing the number of inputs needed to perform the additional control options, enhances the operability of the device and makes the user-device interface more efficient (e.g., by helping the user to achieve an intended outcome and reducing user mistakes when operating/interacting with the device), which, additionally, reduces power usage and improves battery life of the device by enabling the user to use the device more quickly and efficiently.

While ambient sound from the physical environment is being detected by the one or more microphones (1202): while the wearable audio output device is in a first audio output mode (1204) (e.g., a pass-through audio output mode, as shown in FIG. 8C, corresponding for example to pass-through mode 924, FIG. 9C, and described herein with reference to FIG. 3C), the wearable audio output device provides a first audio output based at least in part on the ambient sound from the physical environment. The first audio output includes one or more pass-through audio components selected so as to increase audio pass-through of the ambient sound from the physical environment (e.g., as described herein with reference to FIG. 3C).

The wearable audio output device detects (1206) a first input via the input device (e.g., input 805, FIG. 8C).

In response to detecting the first input (1208), and in accordance with a determination that the first input is a first type of gesture (e.g., the input satisfies first gesture criteria, such as long squeeze gesture criteria that require application, to the input device, of a squeeze input (e.g., above an intensity threshold) for at least a threshold amount of time), the wearable audio output device transitions from the first audio output mode (e.g., the pass-through mode) to a second audio output mode (e.g., an active noise control audio output mode, as shown in FIG. 8D, corresponding for example to active noise control mode 922, FIG. 9C, and described herein with reference to FIG. 3C). The first type of gesture is sometimes herein called a long squeeze gesture, click-and-hold input or click-and-hold gesture.

While the wearable audio output device is in the second audio output mode, the wearable audio output device provides (1210) a second audio output based at least in part on the ambient sound from the physical environment. The second audio output includes one or more cancellation audio components (e.g., one or more antiphase signals such as those indicated by waveform 326-2, FIG. 3C) selected so as to increase audio cancellation of the ambient sound from the physical environment. In some embodiments, the first audio output mode corresponds to a pass-through audio output mode (e.g., in which audio pass-through is in effect), and the second audio output mode corresponds to a noise-cancelling audio output mode (e.g., in which active noise control is in effect), and the first input that is a first type of gesture transitions the wearable audio output device directly from the pass-through mode to the noise-cancelling mode (or vice versa) without first transitioning the wearable audio output device through an intervening mode (e.g., a bypass mode, also called an "off" mode) in which active noise management is disabled such that neither pass-through nor active noise control are in effect.

In some embodiments, the first audio output includes (1212): the one or more pass-through audio components (e.g., corresponding to ambient sound that is actively being passed through from the physical environment) at a first ambient-sound audio level; and the one or more cancellation audio components (e.g., noise-cancelling audio, also called "antiphase" audio) at a first audio-cancelling audio level. In some embodiments, when ambient sound from the physical environment is being actively passed through (e.g., the first ambient-sound audio level is non-zero), noise-cancellation is disabled (e.g., the first audio-cancelling audio level is zero). In some embodiments, when noise-cancellation is enabled (e.g., the first audio-cancelling audio level is non-zero), no ambient sound from the physical environment is actively passed through (e.g., the first ambient-sound audio level is zero). In some embodiments, the second audio output includes: the one or more pass-through audio components at a second ambient-sound audio level that is different from the first ambient-sound audio level; and the one or more cancellation audio components at a second audio-cancelling audio level that is different from the first audio-cancelling audio level. In some embodiments, in accordance with the first audio output being selected or configured so as to increase audio pass-through of the ambient sound from the physical environment, the first ambient-sound audio level of the first audio output is greater than the second ambient-sound audio level of the second audio output. In some embodiments, in accordance with the second audio output being selected or configured to as to increase audio cancellation of the ambient sound from the physical environment, the second audio-cancelling audio level is greater than the first audio-cancelling audio level.

Using different respective levels of pass-through audio components and cancellation audio components in different audio output modes provides the user with flexibility between different levels of audio immersion (via ambient audio cancellation) or audio transparency (via ambient audio pass-through) that can be achieved with a single gesture. Providing this flexibility without cluttering the user interface with additional displayed controls, as well as reducing the number of inputs needed to access this flexibility, enhances the operability of the device and makes the user-device interface more efficient (e.g., by helping the user to achieve an intended outcome and reducing user mistakes when operating/interacting with the device), which, additionally, reduces power usage and improves battery life of the device by enabling the user to use the device more quickly and efficiently.

In some embodiments, the wearable audio output device is (1214) in communication (e.g., via a wireless connection, via a wired connection, or integrated) with an electronic device (e.g., portable multifunction device 100, FIG. 1A or device 300, FIG. 3). In some embodiments, in accordance with a determination that the first input is a second type of gesture (e.g., the input satisfies second gesture criteria, such as single squeeze gesture criteria that require that, after intensity applied by the input to the input device satisfies the intensity threshold, the intensity applied by the input to the input device decreases below the intensity threshold (e.g., due to the input ceasing to remain in contact with the input device) within a threshold amount of time since the input intensity satisfied the intensity threshold, or, alternatively, since initial detection of the input via the input device), the wearable audio output device toggles playing, via the wearable audio output device, a first media audio component that is based on first media (e.g., from the electronic device) that is independent of the ambient sound from the physical environment (e.g., music or video). The second type of gesture is sometimes herein called a single squeeze gesture, click input, or click gesture. In some embodiments, the second type of gesture toggles playback of a respective media audio component (e.g., that is independent of ambient sound from the physical environment, and that is based on media content from or obtained by the electronic device). For example, as shown in and described with reference to FIGS. 8E-8G, if the respective media audio component is being played when the input that is the second type of gesture (e.g., single squeeze gesture input 810, FIG. 8E) is detected, playing of the respective media audio component is paused (e.g., as indicated by play button 714 being displayed in FIG. 8F instead of pause button 715 (FIG. 8E)); if the respective media audio component is paused when the input that is the second type of gesture (e.g., single squeeze gesture input 811, FIG. 8F) is detected, playing of the respective media audio component is resumed (e.g., as indicated by pause button 715 being redisplayed in FIG. 8G instead of play button 714 (FIG. 8F)). In some embodiments, the media audio component is combined with one or more pass-through audio components (e.g., if the device is operating in the first mode) or one or more audio-cancellation audio components (e.g., if the device is operating in the second mode).

Toggling playback of media (e.g., that is independent of ambient sound) in response to a particular type of gesture, where the particular type of gesture is different from the gesture associated with changing audio output mode, provides the user with additional control over audio outputs that can be achieved with a single, unique gesture. Providing additional control options for controlling audio outputs without cluttering the user interface with additional displayed controls, as well as reducing the number of inputs needed to perform the additional control options, enhances the operability of the device and makes the user-device interface more efficient (e.g., by helping the user to achieve an intended outcome and reducing user mistakes when operating/interacting with the device), which, additionally, reduces power usage and improves battery life of the device by enabling the user to use the device more quickly and efficiently.

In some embodiments, in accordance with a determination that the first input is a third type of gesture (e.g., the input satisfies third gesture criteria, such as double squeeze gesture criteria that require two single squeeze gestures performed within a threshold amount of time of each other) (1216): in accordance with a determination that the first input is detected while playing, via the wearable audio output device, the first media audio component that is based on the first media (e.g., in combination with providing the one or more pass-through audio components (e.g., if the device is operating in the first mode) or the one or more cancellation audio components (e.g., if the device is operating in the second mode)), the wearable audio output device ceases to play the first media audio component that is based on the first media; and the wearable audio output device plays, via the wearable audio output device, a second media audio component that is based on second media (e.g., from the electronic device) that is independent of the ambient sound from the physical environment and that is different from the first media (e.g., music or video). In some embodiments, the media audio component is combined with one or more pass through audio components (e.g., if the device is operating in the first mode) or one or more cancellation audio components (e.g., if the device is operating in the second mode). In some embodiments, detecting the third type of gesture while providing a respective media audio component (e.g., a first audio track from the electronic device) skips any remaining portion of the respective media audio component and instead plays a different respective audio component (e.g., a second, next audio track from the electronic device). For example, as shown in and described with reference to FIGS. 8G-8H, in response to double squeeze input 813, device 100 skips ahead to the next audio track.

Changing the media being played (e.g., from a first audio track to a second audio track) in response to a particular type of gesture, where the particular type of gesture is different from both the gesture associated with changing audio output mode and the gesture associated with toggling playback of media, provides the user with additional control over audio outputs that can be achieved with a single, unique gesture. Providing additional control options for controlling audio outputs without cluttering the user interface with additional displayed controls, as well as reducing the number of inputs needed to perform the additional control options, enhances the operability of the device and makes the user-device interface more efficient (e.g., by helping the user to achieve an intended outcome and reducing user mistakes when operating/interacting with the device), which, additionally, reduces power usage and improves battery life of the device by enabling the user to use the device more quickly and efficiently.

In some embodiments, an operation associated with the first type of gesture is (1218) configurable using a settings user interface (e.g., displayed on a display of an electronic device that is in communication with the wearable audio output device) and selected from a first set of operations that includes transitioning a respective audio output mode of the wearable audio output device; an operation associated with the second type of gesture is configurable using the settings user interface and selected from a second set of operations that includes toggling playing a respective media audio component; an operation associated with the third type of gesture is configurable using the settings user interface and selected from a third set of operations that includes ceasing to play a first respective media audio component in combination with playing a second respective media audio component. For example, as shown in and described with reference to FIG. 9A-9B, the respective operations to be performed in response to click, double click, and click-and-hold gestures are configurable via settings user interface 900; wherein the set of available operations for click gestures includes the currently-assigned "Play/Pause" operation type, the set of available operations for double click gestures includes the currently-assigned "Next Track" operation type, and the set of available operations for click-and-hold gestures includes the currently-assigned "Noise Management" operation type.

Allowing a user to configure the operation that is performed in response to a particular type of gesture (or, conversely, allowing a user to configure the type of gesture that causes performance of a particular operation) provides the user with flexibility to customize his or her interactions with the audio output device (e.g., so that particular operation(s), such as those that the user performs more often, can be performed using a gesture via the audio output device without requiring the user to navigate through complex settings menu hierarchies on a separate device, and so that the interactions are more intuitive for the user). Providing flexible and more intuitive user interactions for performing audio output control operations, and reducing the number of inputs needed to perform those operations, enhances the operability of the device and makes the user-device interface more efficient (e.g., by helping the user to achieve an intended outcome and reducing user mistakes when operating/interacting with the device), which, additionally, reduces power usage and improves battery life of the device by enabling the user to use the device more quickly and efficiently.

In some embodiments, the electronic device includes a display (e.g., touch-sensitive display system 112 in FIG. 1A or display 340 in FIG. 3A) and a second input device (e.g., a touch-sensitive surface, such as touch-sensitive display system 112 in FIG. 1A or touchpad 355 in FIG. 3A), and detects (1220) a second input via the second input device (e.g., input 701 via touch screen 112 of device 100, FIGS. 7A-7B). In some embodiments, in response to detecting the second input, the electronic device displays, on the display, a settings user interface, and displays, in the settings user interface, an output-mode affordance for controlling an audio output mode of the wearable audio output device. In some embodiments, the settings user interface includes a volume affordance, and in response to activation of the volume affordance (e.g., by a hard press or long press, on the second input device, where the second input device includes a touch-sensitive surface such as touch screen 112 in FIG. 7D), the electronic device updates the settings user interface (or, stated another way, replaces display of the (e.g., first) settings user interface with display of a second settings user interface) to include the output-mode affordance. For example, as described herein with reference to FIGS. 7D-7E, settings user interface 702 includes volume control 703, and in response to activation of volume control 703 by input 704 (FIG. 7D), device 100 displays enhanced volume control user interface 705, which includes noise management control 707-1 that indicates the audio output mode in which earbuds 502 are currently operating (FIG. 7E).

Providing control options for audio output mode in a settings user interface provides the user with quick access to additional control over audio outputs without requiring the user to navigate through complex settings menu hierarchies. Reducing the number of inputs needed to access the control options enhances the operability of the device and makes the user-device interface more efficient (e.g., by helping the user to achieve an intended outcome and reducing user mistakes when operating/interacting with the device), which, additionally, reduces power usage and improves battery life of the device by enabling the user to use the device more quickly and efficiently.

In some embodiments, the output-mode affordance is (1222) displayed in the settings user interface in accordance with a determination that the wearable audio output device is in communication with the electronic device. In some embodiments, the output-mode affordance is displayed in the settings user interface in accordance with a determination that the wearable audio output device is in communication with the electronic device and that the wearable audio output device is in use (e.g., by playing audio or being prepared to play audio). For example, noise management control 707-1 in FIG. 7E is displayed in accordance with a determination that earbuds 502 are paired to device 100 (and, optionally, in accordance with a determination that earbuds 502 are being used to play audio as indicated by pause button 715, FIG. 7E). In some embodiments, while the wearable audio output device is not in communication with the electronic device, the output-mode affordance is not displayed in the settings user interface (e.g., noise management control 707-1 is not displayed in enhanced volume control user interface 705 if earbuds 502 are not connected to device 100).

Conditionally displaying control options for audio output mode (e.g., an audio output mode control) in a settings user interface based on whether the audio output device and the device on which the settings user interface is displayed are in communication with each other, such that the control options are only displayed when the two devices are in communication, provides the user with quick access to the control options when relevant (e.g., while the two devices are in communication) but not when those control options would be ineffectual (e.g., while the devices are not in communication). Providing additional control options without unnecessarily cluttering the user interface with additional displayed controls enhances the operability of the device and makes the user-device interface more efficient (e.g., by helping the user to achieve an intended outcome and reducing user mistakes when operating/interacting with the device), which, additionally, reduces power usage and improves battery life of the device by enabling the user to use the device more quickly and efficiently.

In some embodiments, the output-mode affordance includes (1224) a representation of a first respective audio output mode that is a current audio output mode of the wearable audio output device without including representations of any other audio output modes of the wearable audio output device. For example, the output-mode affordance includes a representation of the first audio output mode if the audio output device is operating in the first mode (e.g., without including a representation of the second audio output mode or any other output modes), or a representation of the second audio output mode if the audio output device is operating in the second mode (e.g., without including a representation of the first audio output mode or any other output modes). For example, as described herein with reference to FIG. 7E, noise management control 707-1 includes pass-through icon 711 representing the pass-through audio output mode to indicate that earbuds 502 are in the pass-through audio output mode. Alternatively, noise management control 707-1 includes active noise control icon 709 if earbuds 502 are in the active noise control audio output mode, and bypass icon 710 if earbuds 502 are in the bypass audio output mode.

Displaying an indication of the current audio output mode of the audio output device in an audio output mode control provides visual feedback to the user clearly indicating in which audio output mode the audio output device is currently operating, without displaying other audio output mode options that may distract or mislead the user. Providing improved feedback to the user without unnecessarily cluttering the user interface with additional displayed controls enhances the operability of the device and makes the user-device interface more efficient (e.g., by helping the user to achieve an intended outcome and reducing user mistakes when operating/interacting with the device), which, additionally, reduces power usage and improves battery life of the device by enabling the user to use the device more quickly and efficiently.

In some embodiments, the electronic device detects (1226), via the second input device, a third input that corresponds to the output-mode affordance; and, in response to detecting the third input, the electronic device displays respective representations of a plurality of audio output modes of the wearable audio output device (e.g., including the representation of the first respective audio output mode that is the current audio output mode). For example, as described herein with reference to FIGS. 7E-7F, in response to detecting input 708 at noise management control 707-1, device 100 displays expanded noise management control 707-2, which includes pass-through icon 711 representing the pass-through mode, bypass icon 710 representing the bypass mode, and active noise control icon 709 representing the active noise control mode. In some embodiments, (e.g., while displaying the representations of the plurality of audio output modes), a selection indicator (e.g., selection indicator 713, FIG. 7F) is displayed on or over the representation of the first respective audio output mode (or the representation of the first respective audio output mode is otherwise visually distinguished from the other representations of available audio output modes) to indicate that the first respective audio output mode is the current audio output mode of the wearable audio output device. In some embodiments, the electronic device detects, via the second input device, a fourth input that corresponds to a representation of a second respective audio output mode that is distinct from the first respective audio output mode; and, in response to detecting the fourth input: the wearable audio output device transitions from the first respective audio output mode to the second respective audio output mode (e.g., making the second respective audio output mode the current audio output mode). For example, as described herein with reference to FIGS. 7G-7H, in response to input 712 at active noise control icon 709, the audio output mode of earbuds 502 is changed from the pass-through mode to the active noise control mode. In some embodiments, in response to detecting the fourth input, the electronic device ceases to display representations of audio output modes other than the second respective audio output mode (e.g., as described herein with reference FIG. 7I, regarding collapsing expanded noise management control 707-2). In some embodiments, (e.g., where the electronic device continues to display representations of the other audio output modes), in response to detecting the fourth input, the selection indicator is displayed on or over the representation of the second respective audio output mode instead of the first respective audio output mode (or the representation of the second respective audio output mode is otherwise visually distinguished, and the representation of the first respective audio output mode ceases to be visually distinguished, from the other representations of available audio output modes) to indicate that the second respective audio output mode is now the current audio output mode of the wearable audio output device. For example, as described herein with reference to FIGS. 7G-7H, in response to selection of active noise control icon 709 by input 712 (FIG. 7G), selection indicator 713 ceases to be displayed over pass-through icon 711 and is instead displayed over active noise control icon 709 (FIG. 7H).

Displaying additional options for audio output mode in response to selection of the audio output mode control, and then transitioning the audio output mode of the audio output device in response to selection of a different audio output mode option, provides the user with access to additional audio output modes when requested, without prematurely displaying the other audio output mode options, which may be distracting or misleading to the user. Providing additional control options without unnecessarily cluttering the user interface with additional displayed controls enhances the operability of the device and makes the user-device interface more efficient (e.g., by helping the user to achieve an intended outcome and reducing user mistakes when operating/interacting with the device), which, additionally, reduces power usage and improves battery life of the device by enabling the user to use the device more quickly and efficiently.

In some embodiments, the first respective audio output mode is (1228) distinct from a third audio output mode in which the wearable audio output device provides audio outputs independently of the ambient sound from the physical environment (e.g., an audio output mode in which the wearable audio output device provides neither pass-through audio components nor cancellation audio components, such as the bypass mode represented by bypass icon 710, FIG. 7G), and the second respective audio output mode is distinct from the third audio output mode.

Allowing the user to change the audio output mode of an audio output device between two different audio output modes (e.g., between an audio pass-through mode and an audio cancellation mode or vice versa), neither of which is independent of ambient sound from the physical environment, provides the user with flexibility between different levels of audio immersion or audio transparency that can be achieved with a single input, rather than requiring the user to toggle audio immersion on or off separately from toggling audio transparency on or off. Providing this flexibility while reducing the number of inputs needed to access this flexibility enhances the operability of the device and makes the user-device interface more efficient (e.g., by helping the user to achieve an intended outcome and reducing user mistakes when operating/interacting with the device), which, additionally, reduces power usage and improves battery life of the device by enabling the user to use the device more quickly and efficiently.

In some embodiments, detecting the first input includes (1230) detecting an increase in intensity that satisfies an activation intensity threshold, and the wearable audio output device: in response to detecting the increase in intensity that satisfies the activation intensity threshold (e.g., an increase in intensity to or above the activation intensity threshold), provides an activation audio output; detects a decrease in intensity that satisfies a release intensity threshold; and, in response to detecting the decrease in intensity that satisfies the release intensity threshold (e.g., a decrease in intensity to or below the release intensity threshold), provides a release audio output. In some embodiments, the activation intensity threshold is the same as the release intensity threshold. In some embodiments, the activation intensity threshold is different from the release intensity threshold. For example, setting the activation intensity threshold above the release intensity threshold provides hysteresis so that inadvertent fluctuations in input intensity (e.g., due to unsteadiness of a user's fingers when applying pressure to the input device) do not result in the wearable audio output device detecting release of the input. In some embodiments, the activation audio output is the same as the release audio output. In some embodiments, the activation audio output is different from the release audio output (e.g., so the user can differentiate between detection of activation and detection of release). Inputs that include increases to or above an intensity threshold (e.g., "down clicks") and decreases to or below the same (or in some embodiments a different) intensity threshold (e.g., "up clicks"), and corresponding audio outputs are described herein with reference to FIG. 8A. In some embodiments, in response to detecting an input that does not include an increase in intensity above the activation intensity threshold, in accordance with a determination that the input does not include an increase in intensity above the activation intensity threshold, the wearable audio output device does not provide (e.g., forgoes providing) the activation audio output. In some embodiments, before detecting the decrease in intensity below the release intensity threshold, the device does not provide (e.g., forgoes providing) the release audio output.

Providing audio outputs when an increase in the intensity of an input meets an activation intensity threshold and when a decrease in the intensity of the input meets a release intensity threshold provides audio feedback to the user that these thresholds have been satisfied and that any operation(s) associated with these thresholds will be performed in response to the input. Providing improved feedback to the user enhances the operability of the device and makes the user-device interface more efficient (e.g., by helping the user to achieve an intended outcome and reducing user mistakes when operating/interacting with the device), which, additionally, reduces power usage and improves battery life of the device by enabling the user to use the device more quickly and efficiently.

In some embodiments, the wearable audio output device includes (1232) a first wearable audio output component having a first respective input device and a second wearable audio output component having a second respective input device (e.g., first and second earpieces with respective pressure-sensitive input devices, such earbuds 502-1 and 502-2 with respective stems as described herein with reference to FIG. 8A). In some embodiments, detecting a respective input via the input device includes detecting the input via the first respective input device of the first wearable audio output component or detecting the input via the second respective input device of the second wearable audio output component; and providing a respective audio output via the wearable audio output device includes providing the respective audio output via the first wearable audio output component and providing the respective audio output component via the second wearable audio output component (e.g., as described herein with reference to FIG. 8A). In some embodiments, the first wearable audio output component and the second wearable audio component have different behaviors. For example, the first wearable audio output component has a different set of assignments between type of input gesture and operation performed in response than the second wearable audio output component (e.g., a long squeeze gesture via the first wearable audio output component changes the audio output mode of the wearable audio output device, while a different gesture, such as a short squeeze (e.g., single squeeze) gesture, via the second wearable audio output component changes the audio output mode of the wearable audio output device, and/or a long squeeze gesture via the second wearable audio output component performs a different operation, such as toggling playback of media content instead of changing audio output mode).

Providing the same behavior for both components of an audio output device (e.g., one component for a user's left ear and one component for the user's right ear), including providing outputs via both components and responding to inputs the same way regardless of which component is used to provide a respective input, provides the user with improved audio feedback and enables symmetric operation of the audio output device (e.g., regardless of whether the user is left-handed or right-handed) without requiring additional computing resources to perform component-specific input processing. Providing improved feedback to the user and enabling more intuitive user interactions without requiring additional computing resources enhances the operability of the device and makes the user-device interface more efficient (e.g., by helping the user to achieve an intended outcome and reducing user mistakes when operating/interacting with the device), which, additionally, reduces power usage and improves battery life of the device by enabling the user to use the device more quickly and efficiently.

In some embodiments, the wearable audio output device includes (1234) a first wearable audio output component that is in a first position relative to a first ear of a user (e.g., in the user's ear when the component is an in-ear earphone or earbud, or over the user's ear when the component is an over-ear earcup), and a second wearable audio output component that is in a second position relative to a second ear of the user (e.g., in the user's ear when the component is an in-ear earphone or earbud, or over the user's ear when the component is an over-ear earcup). In some embodiments, the second audio output includes a respective media audio component that is based on respective media (e.g., from the electronic device) that is independent of the ambient sound from the physical environment. In some embodiments, while the wearable audio output device is in the second audio output mode: in accordance with a determination that the first wearable audio output component is removed from the first position relative to the first ear of the user (e.g., while the second wearable audio output component remains in the second position relative to the second ear of the user), the wearable audio output device: pauses the respective media audio component; and transitions from the second audio output mode to the first audio output mode, and, while the wearable audio output device is in the first audio output mode, provides (e.g., via the second wearable audio output component that has not been removed from the second position relative to the second ear of the user) the first audio output based at least in part on the ambient sound from the physical environment (e.g., wherein the first audio output includes one or more pass-through audio components selected so as to increase audio pass-through of the ambient sound from the physical environment). For example, as described herein with reference to FIG. 7J, in accordance with a determination that earbud 502-2 is removed from ear 528-2, media content playback is paused as indicated by play button 714, and earbuds 502 are transitioned to the pass-through mode as indicated by pass-through icon 711.

In some embodiments, in accordance with a determination that the first wearable audio output component is replaced in the first position relative to the first ear of the user (e.g., after being removed), playing of the respective media audio component is resumed. For example, as described herein with reference to FIG. 7K, in accordance with a determination that earbud 502-2 is replaced in ear 528-2, media content playback is resumed as indicated by pause button 715, and earbuds 502 are transitioned back to the active noise control mode as indicated by active noise control icon 709. In some embodiments, the same behavior that occurs in accordance with the first wearable audio output component being removed (e.g., while the second wearable audio output component remains in the second position relative to the second ear of the user) occurs in accordance with a determination that the second wearable audio output component is removed from the second position relative to the second ear of the user (e.g., while the first wearable audio output component remains in the first position relative to the first ear of the user).

Transitioning the audio output mode of the audio output device to a pass-through mode and pausing media content that is being played, in response to a user removing a first component (e.g., an in-ear earphone, earbud, or earcup) of the audio output device from an ear of the user, provides the user with increased audio transparency of the audio output device in the second component (e.g., the other in-ear earphone, earbud, or earcup) while it remains in the other ear of the user. Performing these operations in response to a single action (e.g., removing a component from an ear) that is likely an indication that the user wants to hear more ambient sound from his or her surrounding physical environment allows the user to adjust multiple different aspects of audio transparency (e.g., audio output mode as well as media playback) at once without requiring the user to provide separate inputs to adjust each aspect individually. Performing multiple operations (e.g., automatically) when a set of conditions has been met without requiring further user input reduces the number of inputs needed to perform the multiple operations, which enhances the operability of the device and makes the user-device interface more efficient (e.g., by helping the user to achieve an intended outcome and reducing user mistakes when operating/interacting with the device), which, additionally, reduces power usage and improves battery life of the device by enabling the user to use the device more quickly and efficiently.

In some embodiments, while the wearable audio output device is in the second audio output mode, the wearable audio output device detects (1236) speech by a user (e.g., the wearer) of the wearable audio output device; and in response to detecting the speech by the user, the wearable audio output device transitions from the second audio output mode to the first audio output mode. For example, as described herein with reference to FIG. 7L, in response to earbuds 502 detecting speech 718 by user 716, earbuds 502 transition from the active noise control mode (e.g., indicated by active noise control icon 709, FIG. 7K) to the pass-through mode as indicated by pass-through icon 711 in FIG. 7L. In some embodiments, where the second audio output, which is provided while the wearable audio output device is in the second audio output mode, includes a respective media audio component that is based on respective media (e.g., from the electronic device) that is independent of the ambient sound from the physical environment, the respective media audio component is paused in response to detecting the speech by the user (e.g., as indicated by play button 714, FIG. 7L). In some embodiments, the respective media audio component continues to be played as the wearable audio output device is transitioned from second audio output mode to the first audio output mode as well as while the wearable audio output device is in the first audio output mode, optionally at a reduced volume.

Transitioning the audio output mode of the audio output device to a pass-through mode in response to the user speaking provides the user with increased audio transparency of the audio output device in a situation in which the user likely wants to hear more ambient sound from his or her surrounding physical environment (e.g., during a conversation with another person), without requiring the user to provide separate input(s) to change the audio output mode. Performing an operation when a set of conditions has been met without requiring further user input reduces the number of inputs needed to perform the operation, which enhances the operability of the device and makes the user-device interface more efficient (e.g., by helping the user to achieve an intended outcome and reducing user mistakes when operating/interacting with the device), which, additionally, reduces power usage and improves battery life of the device by enabling the user to use the device more quickly and efficiently.

In some embodiments, while the wearable audio output device is in the second audio output mode (1238): in accordance with a determination that the ambient sound from the physical environment includes a name of a user (e.g., the wearer) of the wearable audio output device, the wearable audio output device transitions from the second audio output mode to the first audio output mode. For example, as described herein with reference to FIG. 7O, in accordance with a determination that ambient sound including speech 720 includes a name (e.g., "Delilah") of user 716, earbuds 502 transition from the active noise control mode (e.g., indicated by active noise control icon 709, FIG. 7N) to the pass-through mode as indicated by pass-through icon 711 in FIG. 7O. In some embodiments, where the second audio output, which is provided while the wearable audio output device is in the second audio output mode, includes a respective media audio component that is based on respective media (e.g., from the electronic device) that is independent of the ambient sound from the physical environment, the respective media audio component is paused in accordance with the determination that the ambient sound includes a name of the user (e.g., as indicated by play button 714, FIG. 7O). In some embodiments, the respective media audio component continues to be played as the wearable audio output device is transitioned from second audio output mode to the first audio output mode as well as while the wearable audio output device is in the first audio output mode, optionally at a reduced volume.

Transitioning the audio output mode of the audio output device to a pass-through mode in response to hearing the user's name provides the user with increased audio transparency of the audio output device in a situation in which the user likely wants to hear more ambient sound from his or her surrounding physical environment (e.g., when the user is being spoken to or when the user's name is called), without requiring the user to provide separate input(s) to change the audio output mode. Performing an operation when a set of conditions has been met without requiring further user input reduces the number of inputs needed to perform the operation, which enhances the operability of the device and makes the user-device interface more efficient (e.g., by helping the user to achieve an intended outcome and reducing user mistakes when operating/interacting with the device), which, additionally, reduces power usage and improves battery life of the device by enabling the user to use the device more quickly and efficiently.

In some embodiments, in accordance with the determination that the first input is the first type of gesture, the wearable audio output device provides (1240) an audio output associated with transitioning an audio output mode of the wearable audio output device (e.g., audible tone 806-1, FIG. 8B). In some embodiments, in response to each detected input that is the first type of gesture, in combination with transitioning the audio output mode of the wearable audio output device, the audio output associated with transitioning the audio output mode is provided (e.g., audible tones 806-1 (FIG. 8B), 806-2 (FIG. 8C), and 917 (FIG. 9C)).

Providing audio outputs in response to detecting inputs that are a particular type of gesture associated with transitioning the audio output mode of the audio output device provides audio feedback to the user indicating that the particular type of gesture has been recognized and that the audio output mode of the audio output device is being transitioned. Providing improved feedback to the user enhances the operability of the device and makes the user-device interface more efficient (e.g., by helping the user to achieve an intended outcome and reducing user mistakes when operating/interacting with the device), which, additionally, reduces power usage and improves battery life of the device by enabling the user to use the device more quickly and efficiently.

In some embodiments, a set of (e.g., one or more) audio output modes, through which the wearable audio output device is configured to transition in response to inputs that are the first type of gesture, is (1242) configurable using a settings user interface (e.g., the settings user interface referenced in operation 1218) (e.g., as described herein with reference to FIGS. 9B-9C).

Allowing a user to select which audio output mode(s) through which the audio output device will transition in response to inputs that are a particular type of gesture (e.g., where the type of gesture itself may be configurable, as described herein with reference to operation 1218) enables the user subsequently to access these preselected audio output mode(s) (e.g., preferred modes that the user frequently uses) with gestures via the audio output device, rather than requiring repeated display of and interaction with a settings user interface on a separate electronic device. Enabling customized and intuitive user interactions for controlling audio outputs, and reducing the number of inputs needed to perform the additional control options while reducing the amount of time that a display needs to be powered on, enhances the operability of the device and makes the user-device interface more efficient (e.g., by helping the user to achieve an intended outcome and reducing user mistakes when operating/interacting with the device), and, additionally, reduces power usage and improves battery life of the device by enabling the user to use the device more quickly and efficiently.

In some embodiments, the set of audio output modes includes (1244) a plurality of audio output modes. In some embodiments, while displaying the settings user interface on the display of the electronic device, the electronic device detects, via the second input device of the electronic device, an input to reorder two or more audio output modes in the set of audio output modes to form a modified set of audio output modes. In some embodiments, after detecting the input to reorder the two or more audio output modes in the set of audio output modes to form the modified set of audio output modes, the wearable audio output device detects, via the input device of the wearable audio output device, a subsequent input that is the first type of gesture; and, in response to detecting the subsequent input that is the first type of gesture, the wearable audio output device transitions from a current audio output mode to a next audio output mode in the modified set of audio output modes (e.g., as described herein with reference to FIG. 9B).

Allowing a user to change the order of the audio output modes through which the audio output device will transition in response to inputs that are a particular type of gesture (e.g., where the type of gesture itself may be configurable, as described herein) enables the user to organize the preselected audio output modes into a preferred order (e.g., so that a next audio output mode is one that the user is more likely to use following the current audio output mode) and subsequently to access these preselected audio output modes with gestures via the audio output device, rather than requiring repeated display of and interaction with a settings user interface on a separate electronic device to transition to a desired next audio output mode. Enabling customized and intuitive user interactions for controlling audio outputs, and reducing the number of inputs needed to perform the additional control options while reducing the amount of time that a display needs to be powered on, enhances the operability of the device and makes the user-device interface more efficient (e.g., by helping the user to achieve an intended outcome and reducing user mistakes when operating/interacting with the device), and, additionally, reduces power usage and improves battery life of the device by enabling the user to use the device more quickly and efficiently.

It should be understood that the particular order in which the operations in FIGS. 12A-12E have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 1000, 1100, 1800, 1900, 2000, 2400, and 2600) are also applicable in an analogous manner to method 1200 described above with respect to FIGS. 12A-12E. For example, the devices, user interfaces, audio outputs, audio output modes, alerts, adjustments, and attachments described above with reference to method 1200 optionally have one or more of the characteristics of the devices, user interfaces, audio outputs, audio output modes, alerts, adjustments, and attachments described herein with reference to other methods described herein (e.g., methods 1000, 1100, 1800, 1900, 2000, 2400, and 2600). For brevity, these details are not repeated here.

FIGS. 13A-13D illustrate example user interfaces for pairing wearable audio output devices in accordance with some embodiments.

FIG. 13A illustrates an example user interface, displayed subsequent to the user interface in FIG. 5A, and in some embodiments in response to detecting movement of a peripheral (e.g., earbud 502-1, FIG. 5A) or set of peripherals (e.g., earbud set 503), from outside of threshold distance 508 to within threshold distance 508, for initiating pairing of device 100 with the peripheral (e.g. earbud 502-1) or set of peripherals (e.g., earbud set 503). In FIG. 13A, device 100 detects a pairing request from a peripheral (e.g., earbud 502-1, which is shown in FIG. 5A and part of earbud set 503 in FIG. 13A) within threshold distance 508. In some embodiments, in response to detecting the pairing request from earbud 502-1, device 100 determines whether earbud 502-1 meets coupling criteria. In the example shown in FIG. 13A, coupling criteria is met when an earbud (e.g., earbud 502-1) is placed within and/or is electrically coupled to an earbud case (e.g., earbud case 502-3) (e.g., to form earbud set 503). After device 100 determines that earbud 502-1 meets coupling criteria (e.g., in response to device 100 determining that earbud 502-1 meets the coupling criteria), device 100 displays window 1320-1 overlaid on the user interface of FIG. 5A. Window 1320-1 includes a representation of earbud set 503 and button 522-1 (labeled "Connect"), which, when activated by a user input (e.g., a tap gesture), initiates pairing of device 100 with the peripherals (e.g., earbuds 502-1 and 502-2 and earbud case 502-3 shown in FIG. 5A) of earbud set 503. In some embodiments, the user interface(s) shown in window 1320 are instead displayed on the entirety (or substantially all, e.g., greater than 95%, 96%, 97%, 98%, or 99%) of touch screen 112. Device 100 also displays an exit button 524-1 that, when activated by a user input, such as a tap gesture, causes window 1320-1 to cease to be displayed so that the user can perform other operations on device 100. Where exit button 524-1 accompanies another user interface described herein (e.g., a user interface that is part of the pairing process or fit test), exit button 524-1, when activated by a user input (e.g., a tap gesture), causes that user interface to cease to be displayed. In some embodiments, selection of exit button 524-1 causes the device 100 not to be paired with the peripherals of earbud set 503.

FIGS. 13B-13C illustrate that, in some embodiments, during the pairing process, device 100 displays instructional information to teach the user how to use earbuds 502-1 and 502-2. FIG. 13B illustrates window 1320-2, which replaces window 1320-1, that includes a representation of earbud 502-1 and earbud 502-2. In addition, window 1320-2 includes a first instruction (e.g., "Click the stem to play or pause"), and click indicators 1321-1 and 1321-2 representing clicking the stems of earbuds 502-1 and 502-2, to indicate to the user that clicking a stem of an earbud will toggle playback of media content (e.g., by playing content or resuming paused content, or by pausing content that is playing). Additionally, in the example shown in FIG. 13B, button 522-2 (labeled "Connect") continues to be displayed, as the user has not yet initiated pairing of device 100 with the peripherals of earbud set 503. In some embodiments, the instructional information is displayed after detecting movement of earbud set 503 within threshold distance 508 and prior to pairing being initiated by activation of button 522-2. Alternatively or in addition, in some embodiments, the instructional information is displayed after activation of button 522-2 during pairing.

FIG. 13C illustrates window 1320-3, which replaces window 1320-2, that includes a representation of earbud 502-1 and earbud 502-2. In addition, window 1320-3 includes a second instruction (e.g., "Click and hold for noise management") that is different from the first instruction presented in window 1320-2 in FIG. 13B, and click and hold indicators 1322-1 and 1322-2 representing click-and-hold gestures via the stems of earbuds 502-1 and 502-2, to indicate to the user that performing a click-and-hold gesture on a stem of an earbud will allow the user to control a noise management setting or operation of earbuds 502-1 and 502-2. Additionally, in the example shown in FIG. 13C, button 522-3 (labeled "Connect") continues to be displayed as described above with reference to FIG. 13B.

Figure 13D:
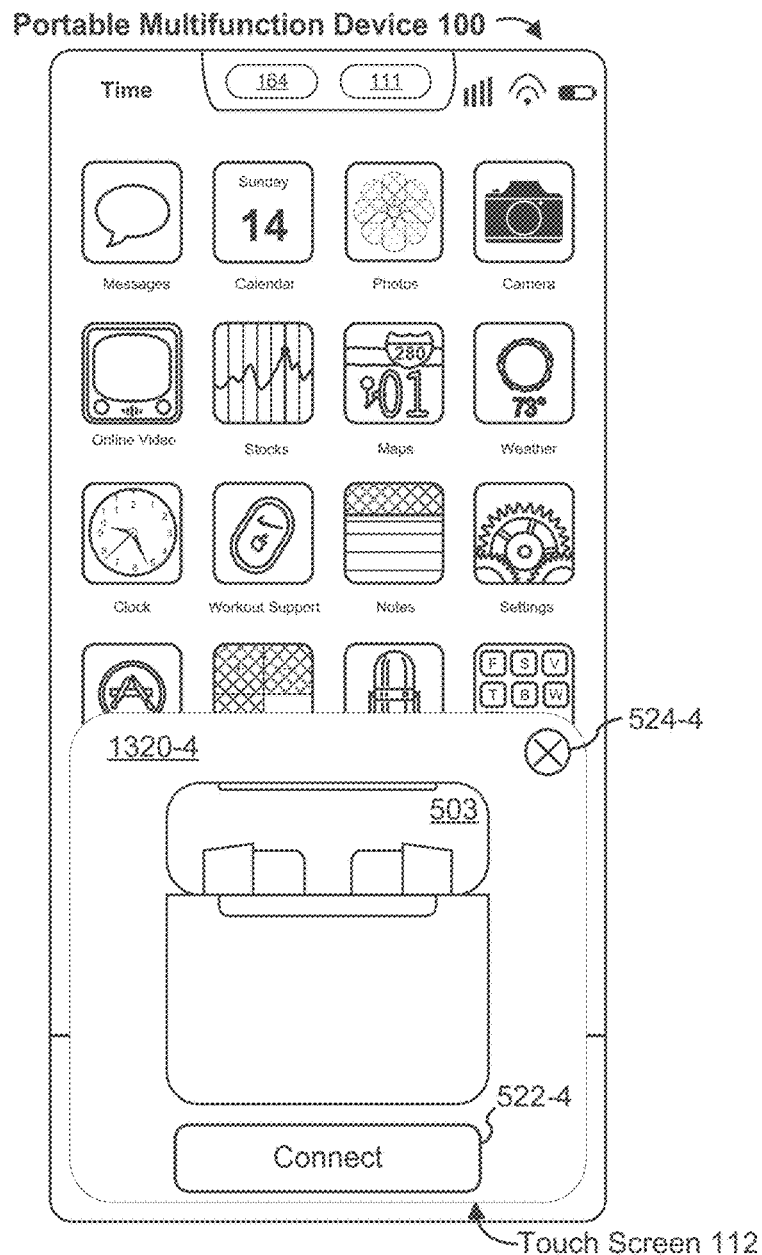
Figure 14A:
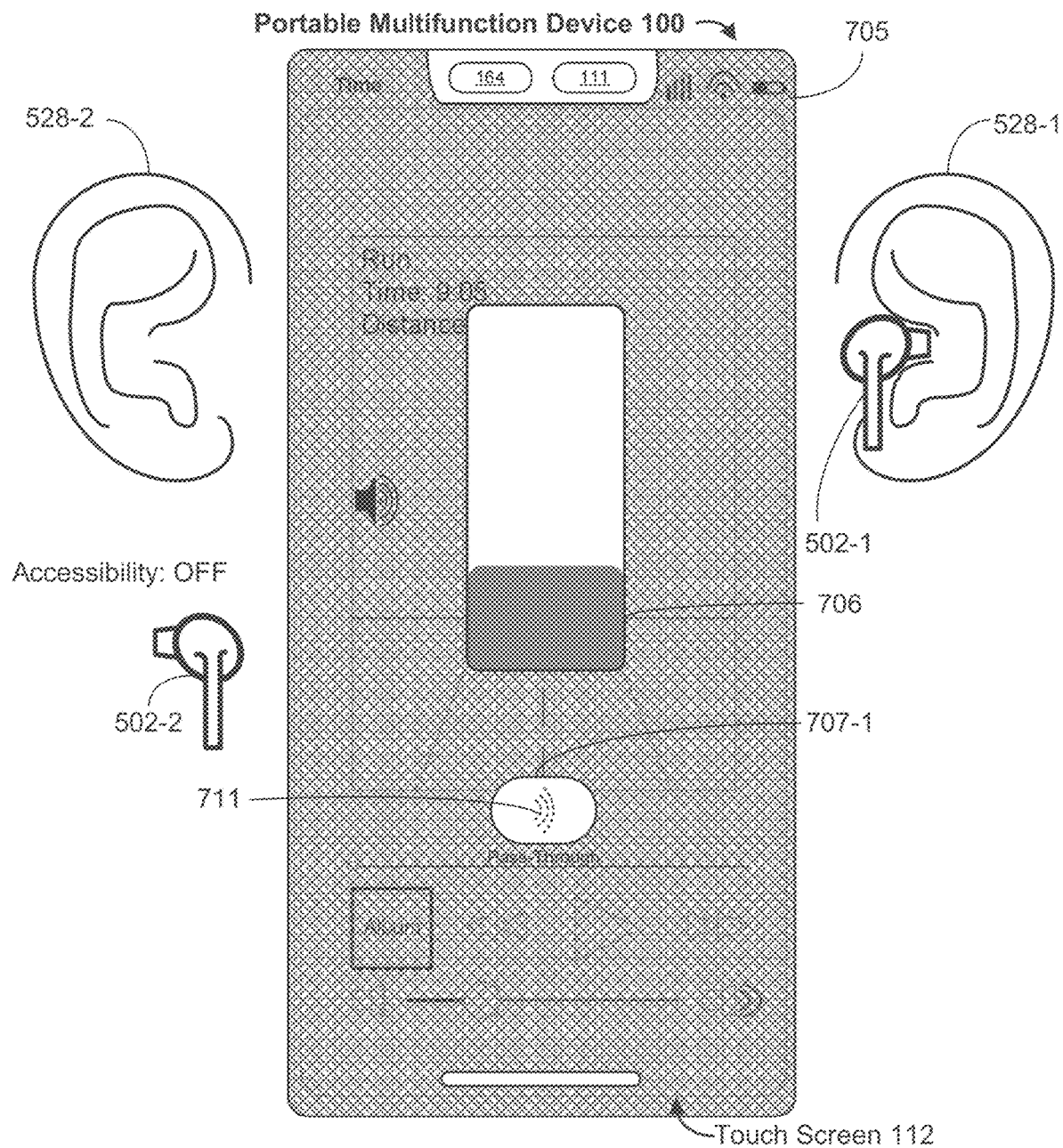
FIGS. 14A-14Z illustrate example user interfaces and user interactions for changing the audio output mode of wearable audio output devices in accordance with some embodiments.

FIG. 13D illustrates that in some embodiments, after displaying one or more instructional user interfaces such as those described with reference to FIGS. 13B-13C, device 100 redisplays a user interface that includes a representation of earbud set 503 and button 522-4 (labeled "Connect"), which, when activated by a user input (e.g., a tap gesture), initiates pairing of device 100 with the peripherals of earbud set 503. Accordingly, FIG. 13D illustrates that window 1320-4, which is the same as window 1320-1 in FIG. 13A, replaces window 1320-3.

FIGS. 14A-14Z illustrate example user interfaces and user interactions for changing the audio output mode of wearable audio output devices (e.g., depending on whether the user has activated accessibility mode or not) in accordance with some embodiments.

FIGS. 14A-14L illustrate changing audio output mode while, as indicated in FIGS. 14A-14L, the accessibility mode is set to the "OFF" state. FIG. 14A shows an enhanced volume control user interface (e.g., as described herein with reference to FIG. 7E), and is optionally a transition from FIG. 7E. FIG. 14A further illustrates earbud 502-2 removed from ear 528-2 of the user, and earbud 502-1 placed in the ear 528-1 of the user. Additionally, the currently selected audio output mode of earbuds 502-2 and 502-1 is the pass-through mode, which is indicated by pass-through icon 711 displayed in noise management control 707-1. In some embodiments, as illustrated in FIG. 14A, both earbuds 502-1 and 502-2 switch to the pass-through mode in response to either earbud 502-1 or 502-2 being removed from an ear of the user (e.g., based on an assumption that the user removed an earbud to hear ambient audio better), and media content being played to the user via earbuds 502-1 and 502-2 is paused.

Figure 14B:
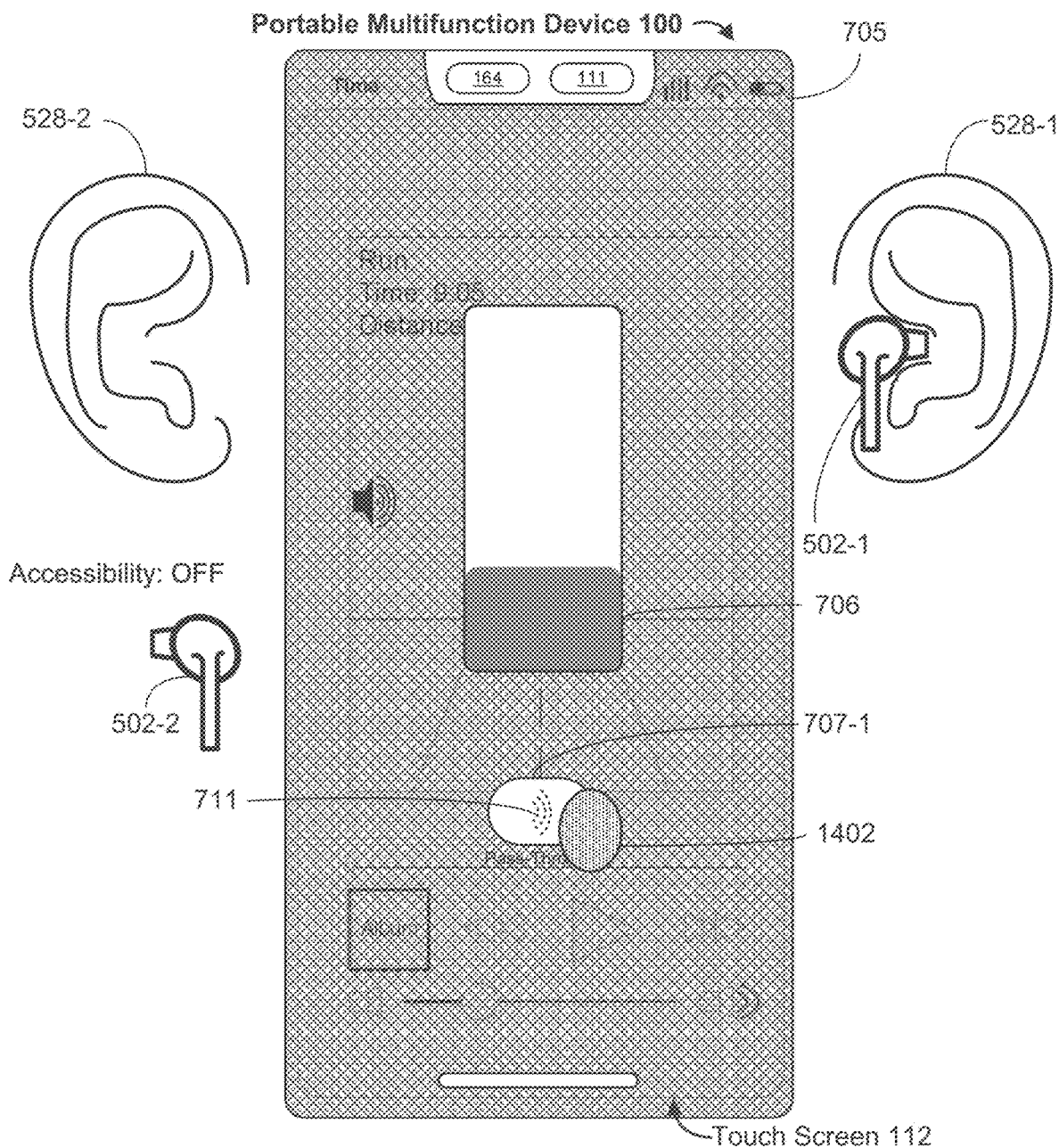

FIG. 14B illustrates a transition from FIG. 14A and shows input 1402 (e.g., a tap gesture) at noise management control 707-1, while the accessibility mode is set to the "OFF" state.

Figure 14C:
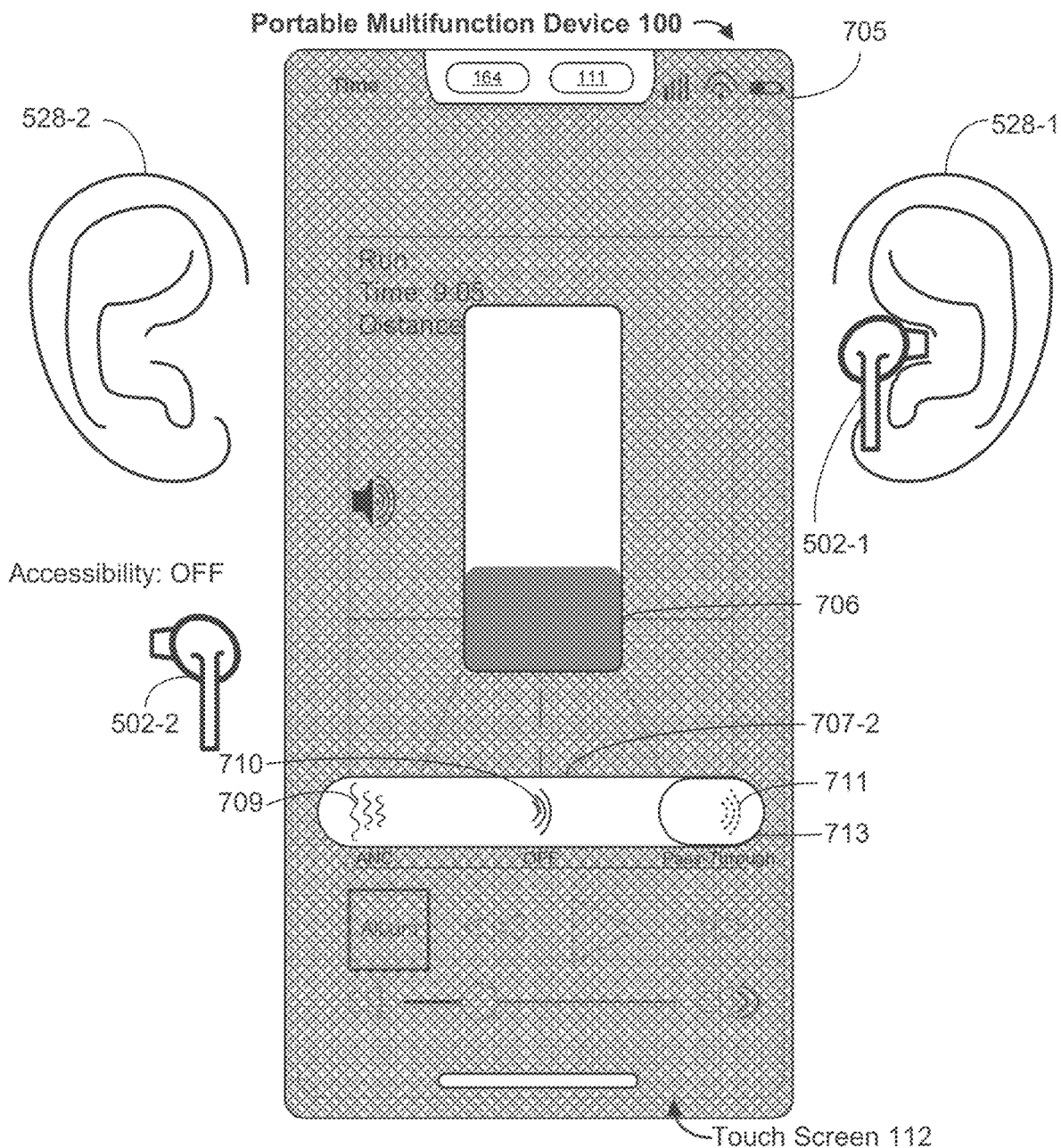

FIG. 14C illustrates that, in response to input 1402, expanded noise management control 707-2 is displayed. As described herein with reference to FIG. 7F, expanded noise management control 707-2 includes representations of three available audio output modes for earbuds 502: pass-through icon 711, bypass icon 710, and active noise control icon 709. Selection indicator 713 displayed over pass-through icon 711 (e.g., and not displayed over either bypass icon 710 or active noise control icon 709) indicates that the audio pass-through mode represented by pass-through icon 711 is the mode in which earbuds 502 are currently operating.

Figure 14D:
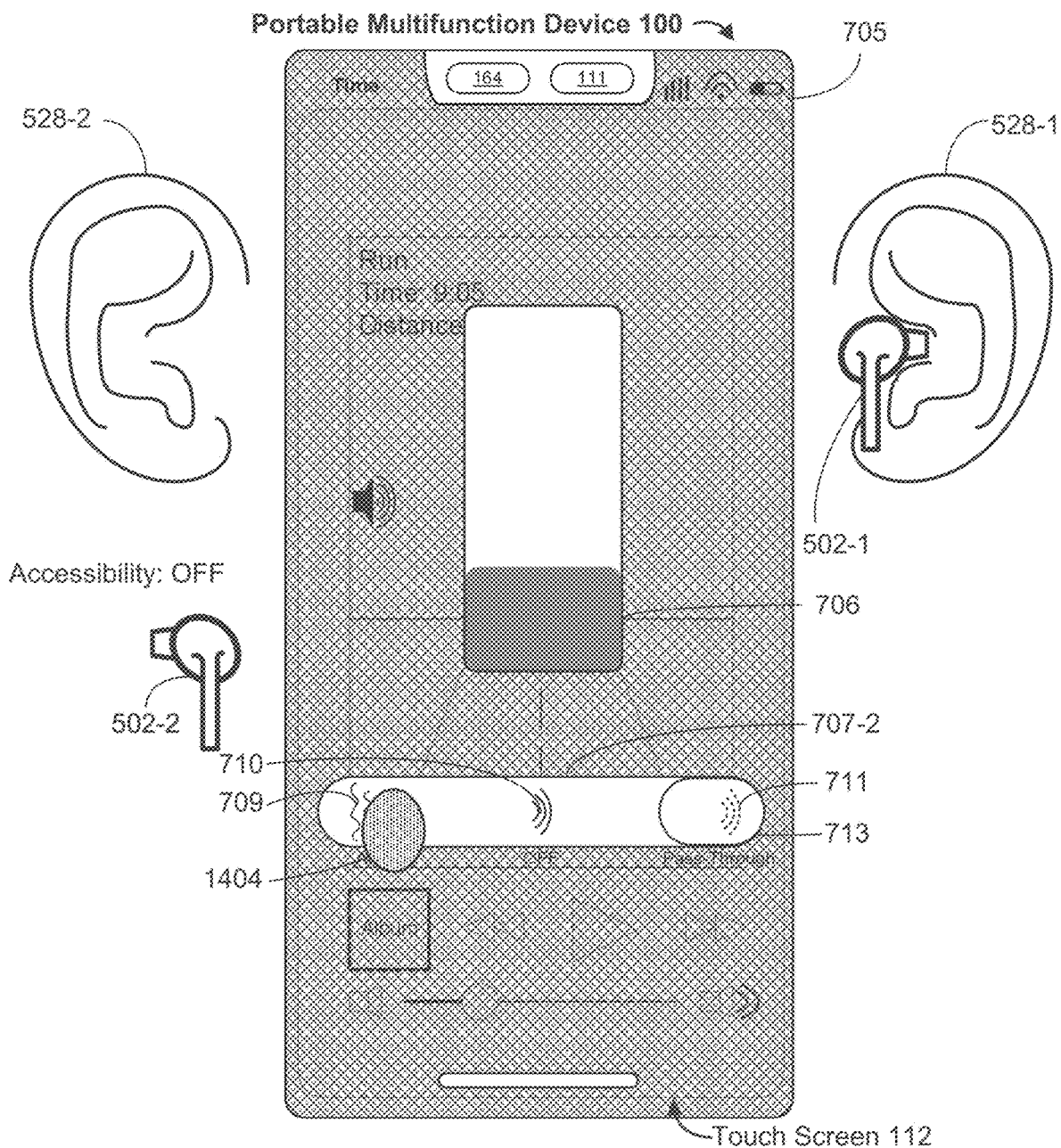

FIG. 14D illustrates that, while the accessibility mode is set to the "OFF" state, and earbud 502-2 is removed from ear 528-2 of the user while earbud 502-1 is in ear 528-1, input 1404 (e.g., a tap gesture) is received at active noise control icon 709.

Figure 14E:
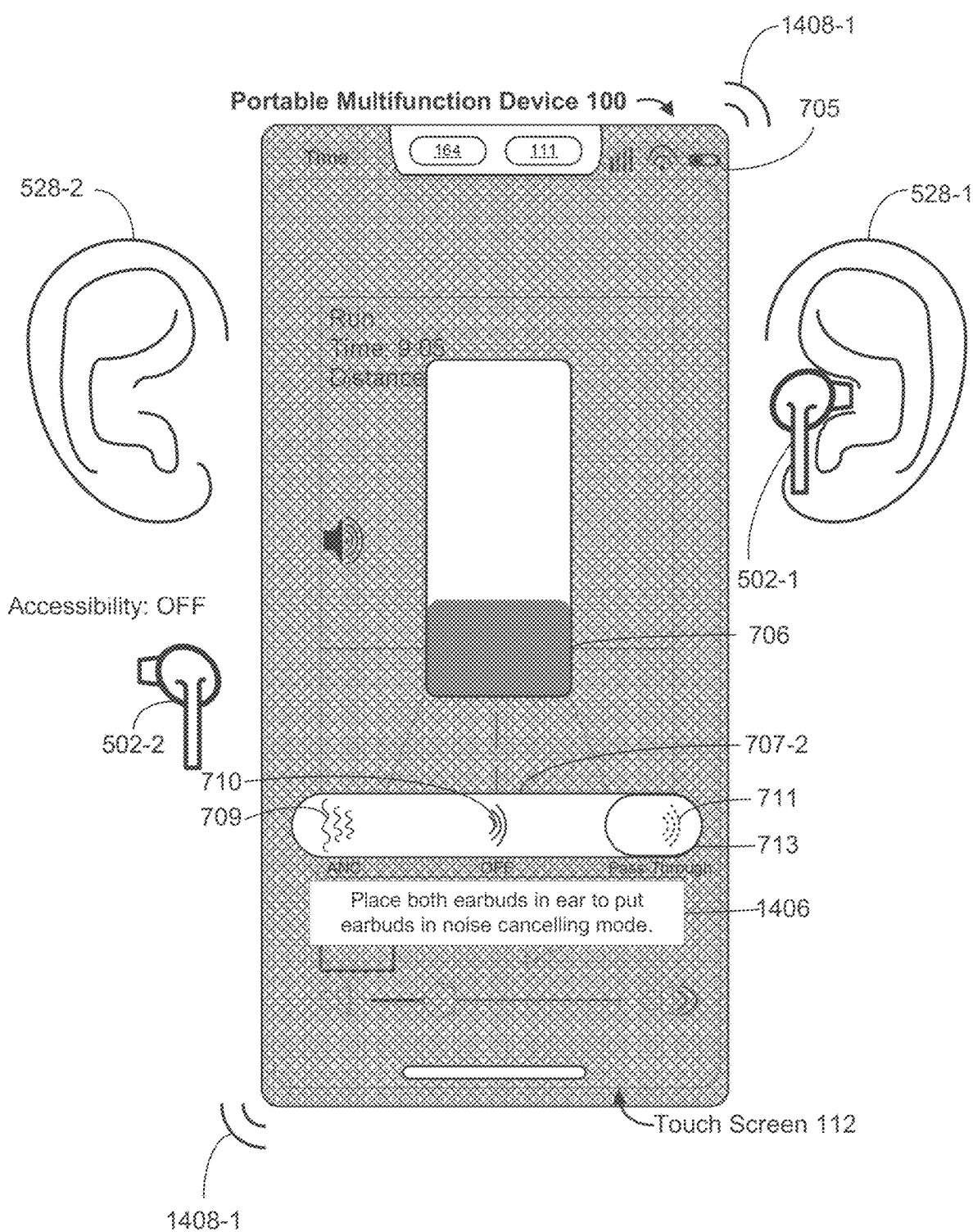

FIG. 14E illustrates that, in response to detecting input 1404 (e.g., a tap gesture) at active noise control icon 709, while the accessibility mode is set to the "OFF" state, and earbud 501-1 is in ear 528-1, but earbud 502-2 is removed from ear 528-2, selection indicator 713 continues to be displayed over pass-through icon 711 and selection indicator 713 is not displayed over active noise control icon 709. In addition, the audio output mode of earbuds 502 is not changed to the active noise control mode represented by active noise control icon 709 in response to input 1404 (e.g., a tap gesture). Instead, the audio pass-through mode represented by pass-through icon 711 remains selected, and earbuds 502 remain in the pass-through mode. In some embodiments, the selection indicator may be briefly displayed over active noise control icon 709, before being automatically redisplayed over pass-through icon 711. Additionally, FIG. 14E illustrates instruction 1406, which states: "Place both earbuds in ear to put earbuds in noise cancelling mode." Instruction 1406 indicates to the user that, while the accessibility mode is in the "OFF" state, the active noise control mode is not an available audio output mode while at least one earbud is removed. FIG. 14E also shows that, in combination with instruction 1406 being displayed, tactile output 1408 (e.g., elements 1408-1 and 1408-2) is provided. Although earbud 502-2 is shown as being removed in the example shown in FIG. 14E, instruction 1406 would also be displayed if, alternatively, earbud 502-1 was removed from the ear 528-1 of the user, and earbud 502-2 was placed in ear 528-2 of the user.

Figure 14F:
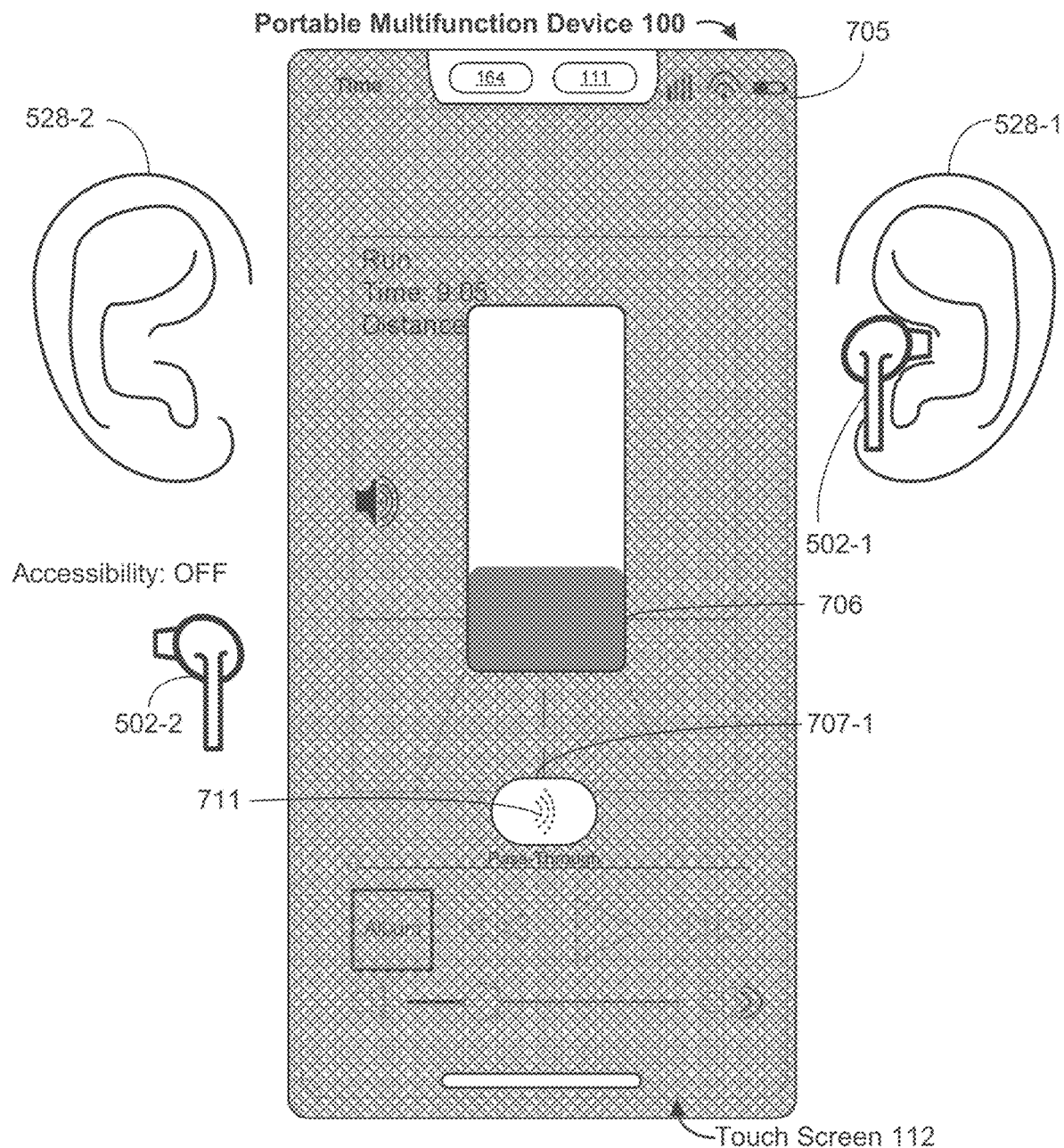

FIG. 14F illustrates that, in some embodiments, if no further input is received at the user interface in FIG. 14E, and device 100 does not detect placement of earbud 502-2 in ear 528-2 of the user (while earbud 502-1 is maintained in ear 528-1), expanded noise management control 707-2 collapses to pass-through icon 711. In some embodiments, in accordance with a determination that earbud 502-2 is placed in ear 528-2 of the user (e.g., in response to instruction 1406), the audio output mode of earbuds 502 switches to the active noise control mode as requested by input 1404, and earbuds 502 begin operating in the active noise control mode. In some such embodiments, active noise control icon 709 is displayed in place of pass-through icon 711 in FIG. 14F (e.g., as shown in FIG. 14L).

Figure 14G:
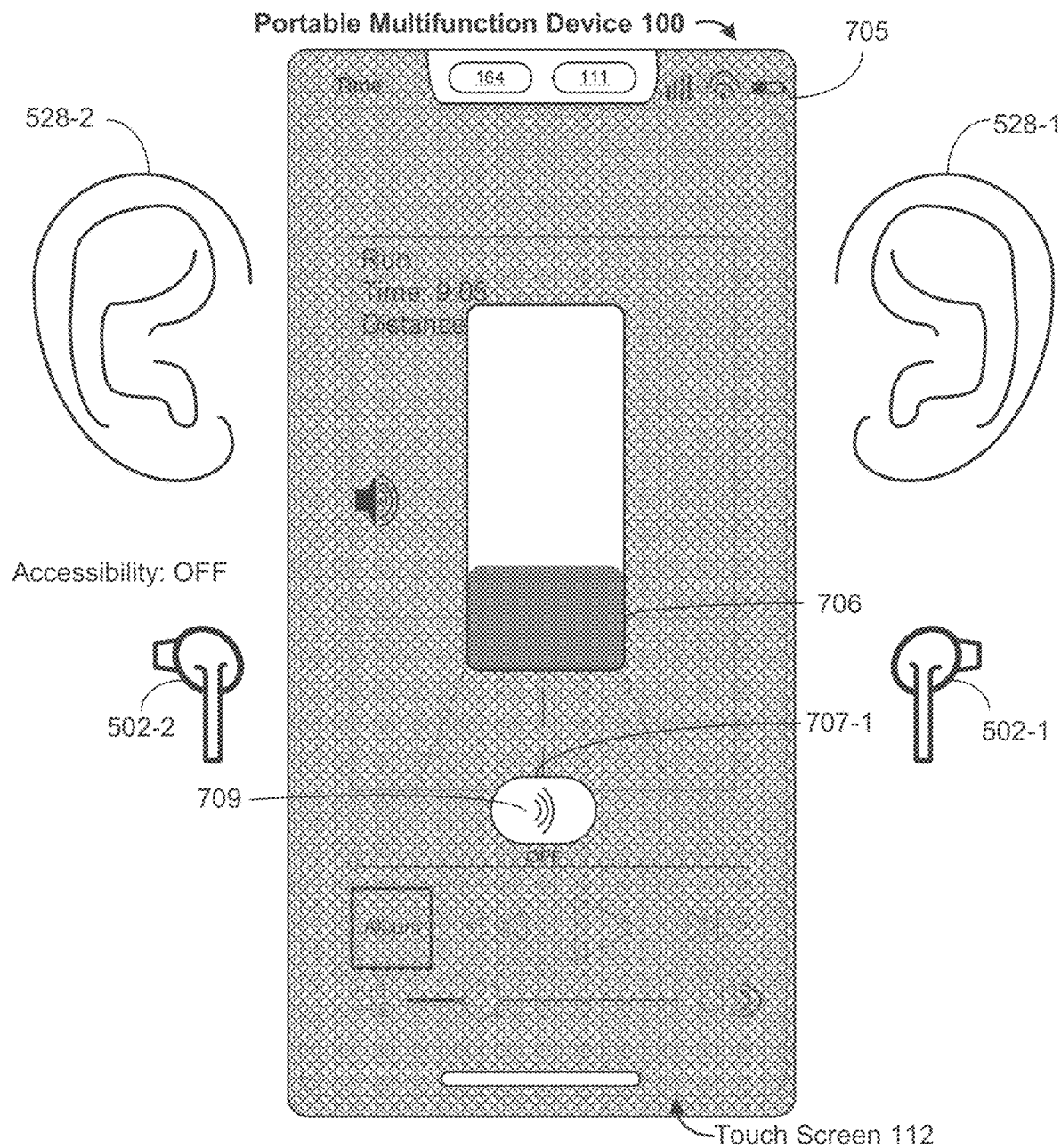

FIG. 14G illustrates both earbuds 502-1 and 502-2 removed from ears 528-1 and 528-2 of the user. In some embodiments, in accordance with a determination that both earbuds are removed from the ears of the user, the audio output mode switches from the pass-through mode to the bypass (e.g., noise control off or "OFF") mode. Accordingly, FIG. 14G shows bypass icon 710 displayed instead of pass-through icon 711 (FIG. 14F).

Figure 14H:
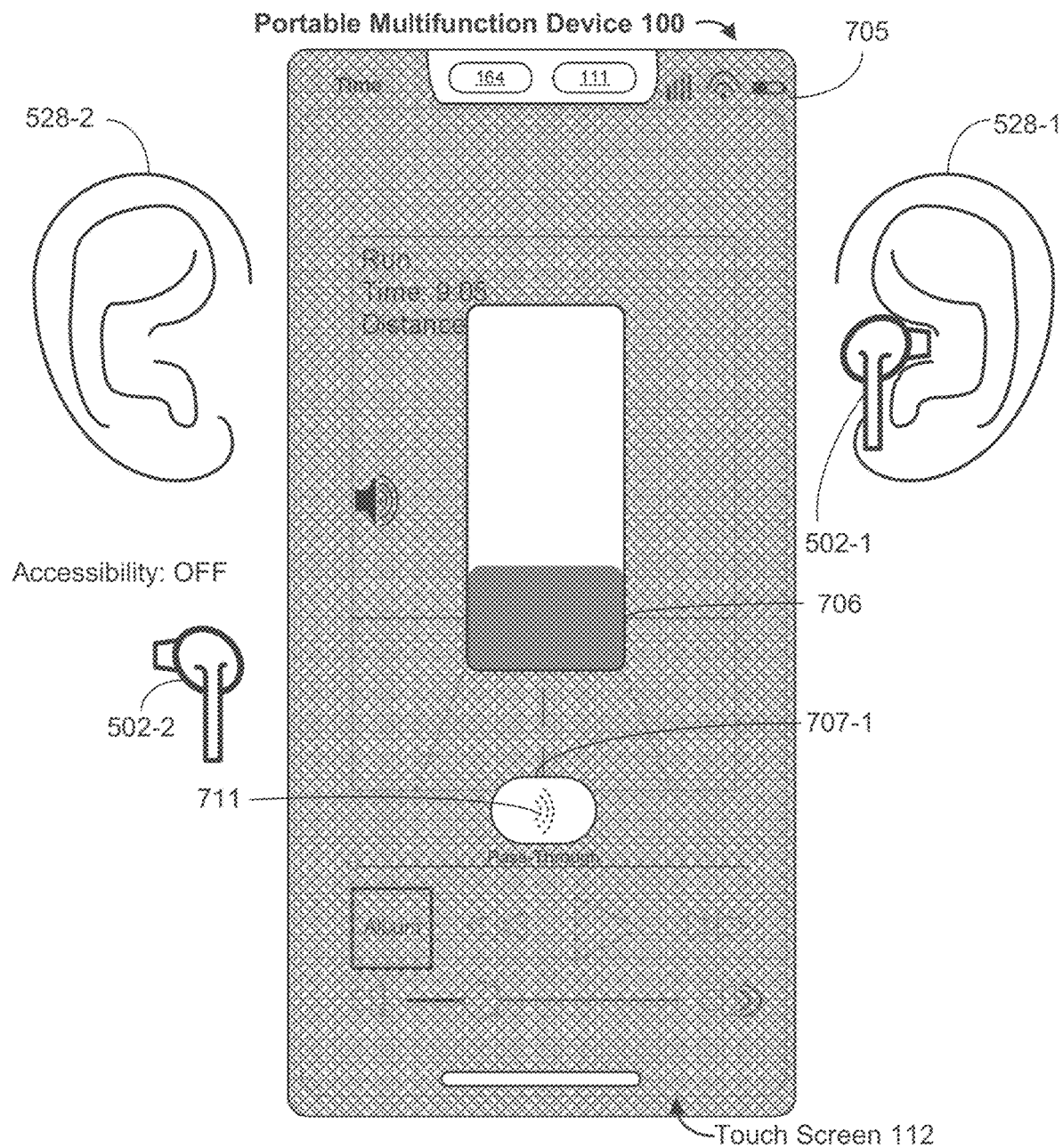

FIG. 14H illustrates earbud 502-1 replaced in ear 528-1 of the user (e.g., in an optional transition from FIG. 14G). In accordance with a determination that one earbud has been placed in the ear of the user, the audio output mode of earbuds 502 transitions to the pass-through mode. Accordingly, FIG. 14H shows pass-through icon 711 redisplayed instead of bypass icon 710 (FIG. 14G).

Figure 14I:
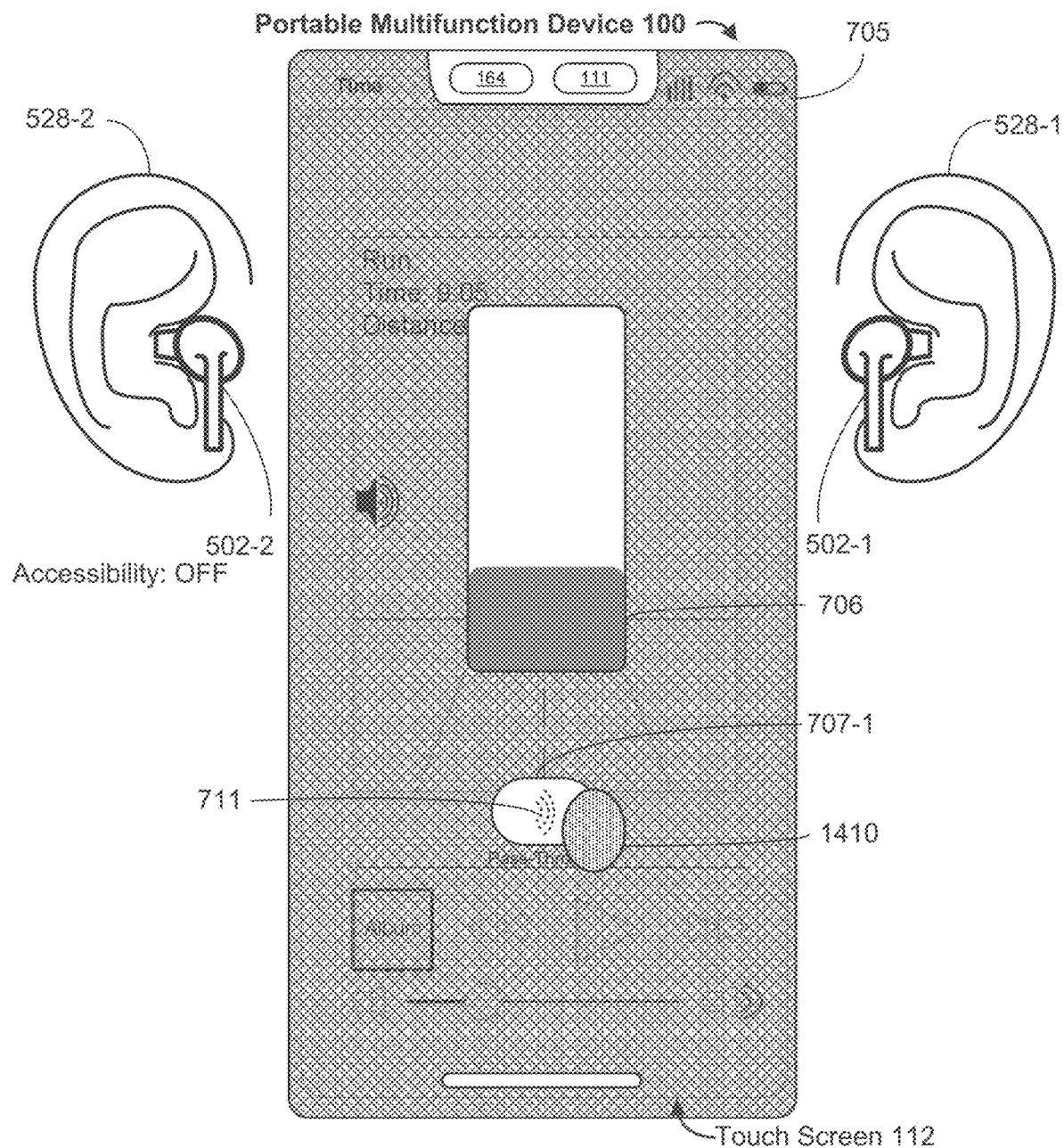

FIG. 14I illustrates, in a transition from FIG. 14H, earbud 502-2 also replaced in ear 528-2 of the user (e.g., while earbud 502-1 is maintained in ear 528-1). In response, earbuds 502 transition from the current audio output mode to a previous audio output mode that is the audio output mode in which earbuds 502 were operating during a most-recent prior instance that both earbuds 502 were in-ear. In the example shown in FIG. 14I, the previous audio output was the pass-through mode, and thus earbuds 502 remain in the pass-through audio output mode. One of ordinary skill will readily appreciate that, had the previous audio output mode been the active noise control mode, earbuds 502 would have transitioned from the pass-through audio output mode as shown in FIG. 14H to the active noise control mode (e.g., FIG. 14I would have indicated earbuds 502 as being in the active noise control mode). In addition, FIG. 14I illustrates that device 100 receives input 1410 (e.g., a tap gesture) over the noise management control 707-1, which currently indicates that earbuds 502 are in the pass-through mode (as indicated by pass-through mode icon 711).

Figure 14J:
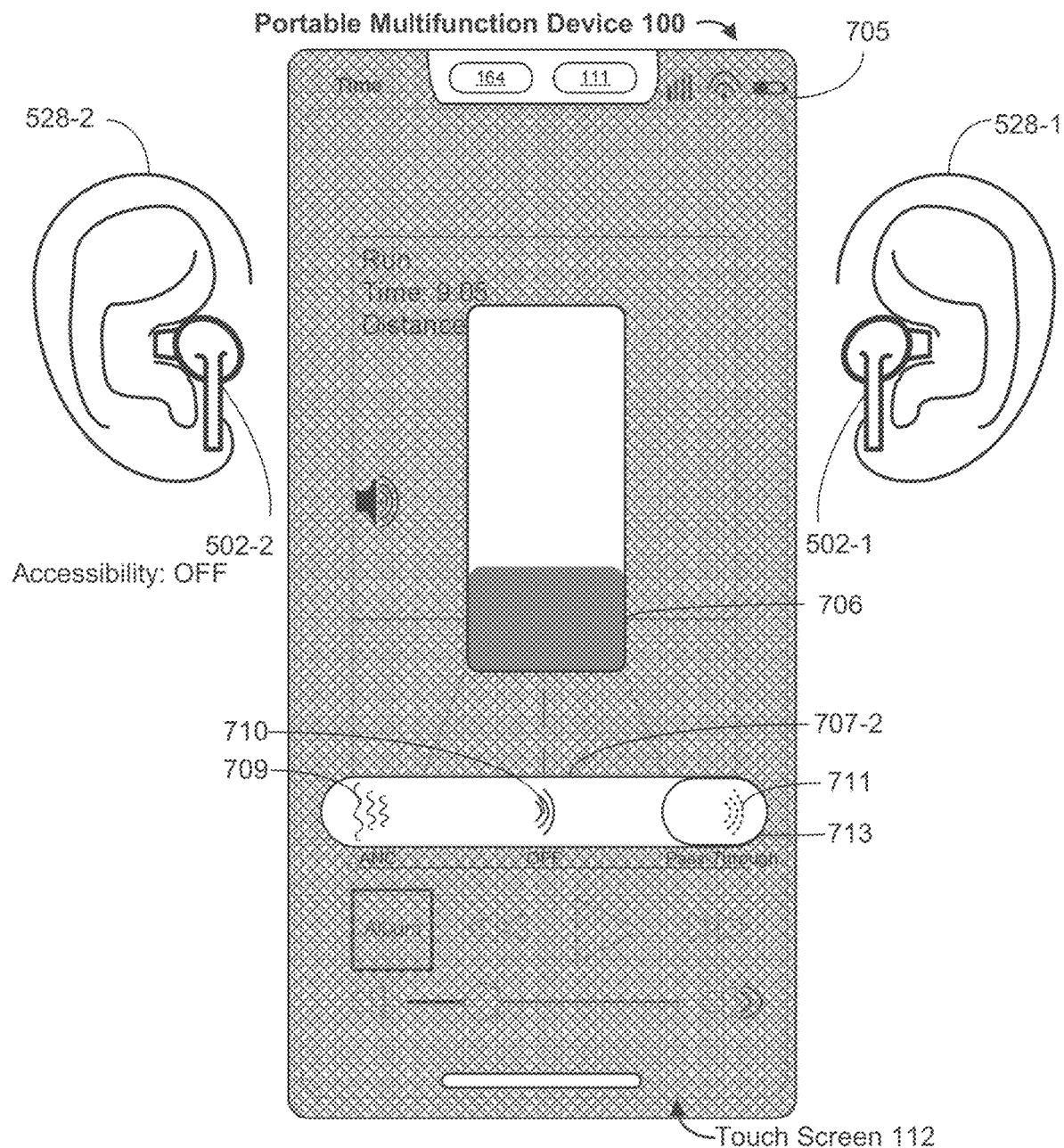

FIG. 14J illustrates expanded noise management control 707-2 displayed in response to input 1410 (FIG. 14I). Selection indicator 713 displayed over pass-through icon 711 (e.g., and not displayed over either bypass icon 710 or active noise control icon 709) indicates that the audio pass-through mode represented by pass-through icon 711 is the mode in which earbuds 502 are currently operating.

Figure 14K:
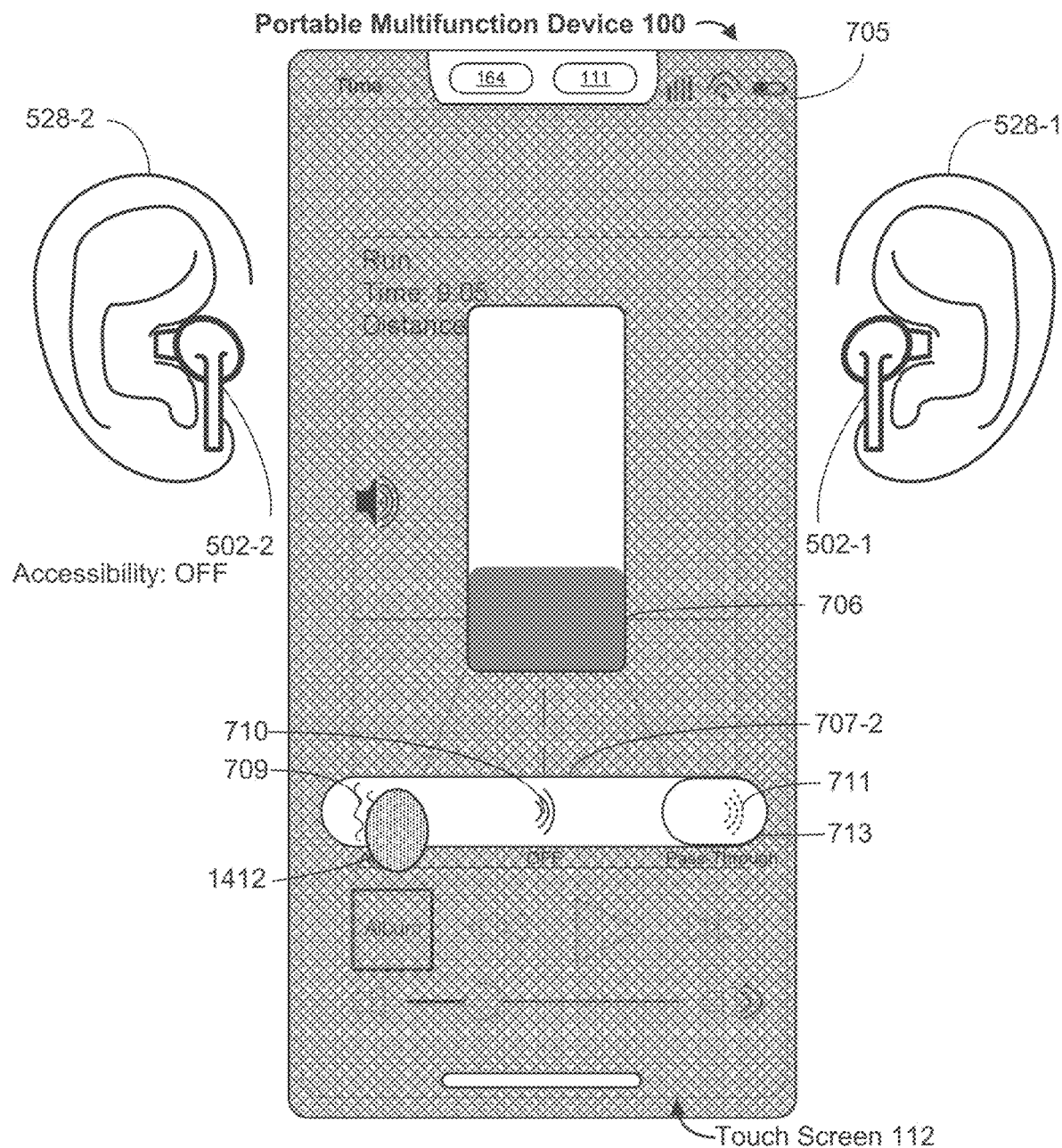
Figure 14L:
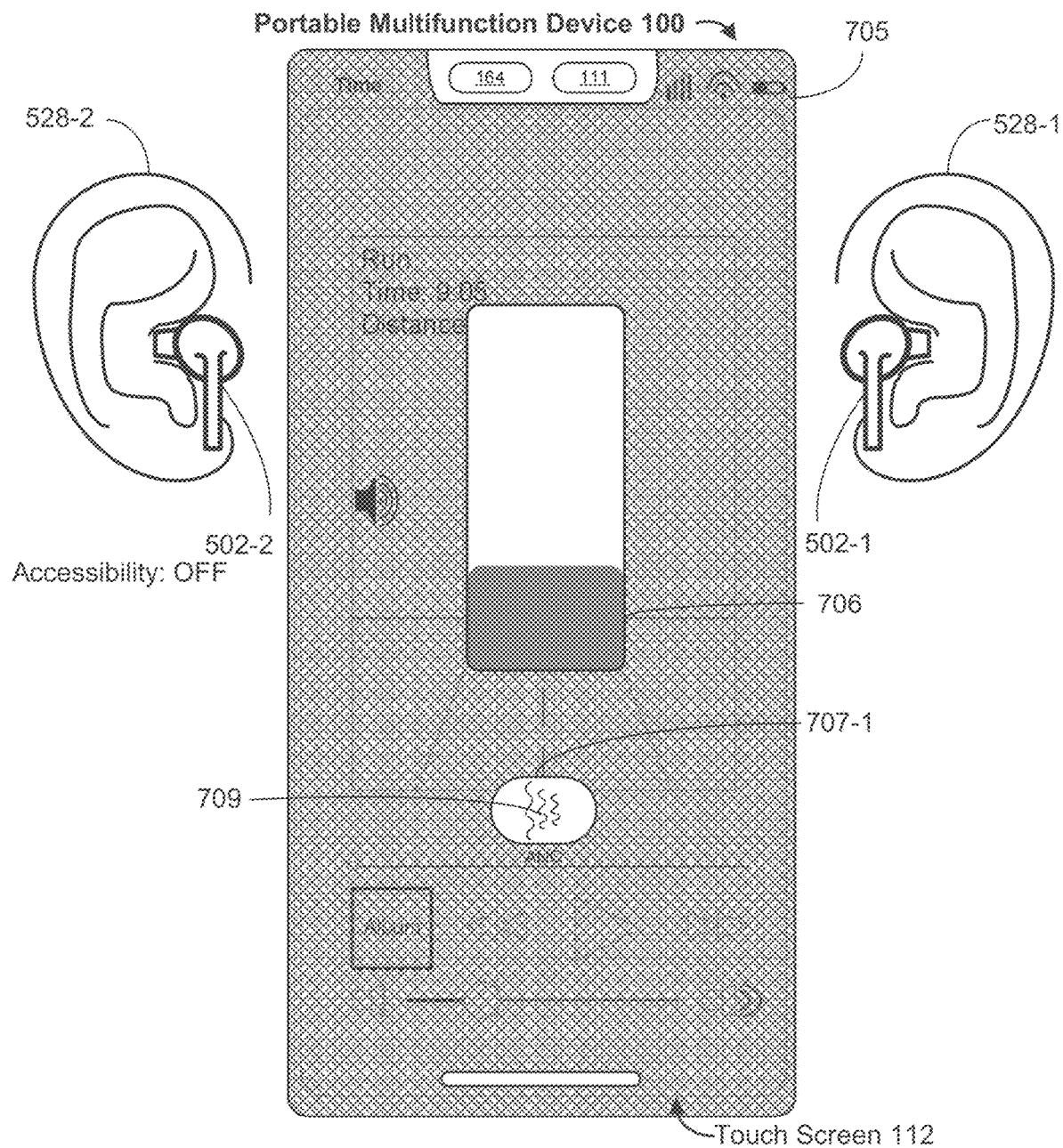

FIG. 14K illustrates that, while both earbuds 502-1 and 502-2 are in ears 528-1 and 528-2 of the user, input 1412 (e.g., a tap gesture) is received at active noise control icon 709. FIG. 14L illustrates that, in response to detecting input 1412 of FIG. 14K at active noise control icon 709, earbuds 502 transition from the pass-through mode to the active noise control mode. Accordingly, noise management control 707-1 now displays active noise control icon 709 in place of pass-through icon 711, to indicate that the active noise control mode is currently selected.

FIGS. 14M-14P illustrate changing audio output mode while, as indicated in FIGS. 14M-14P, the accessibility mode is in the "ON" state. In some embodiments, the accessibility mode allows users, such as those who are deaf in one ear, to access and use various noise management controls without having to place both earbuds in their ears. Activating the accessibility mode thus enables the user to override the requirement that both earbuds be placed in-ear in order to transition to the active noise control mode.

Figure 14M:
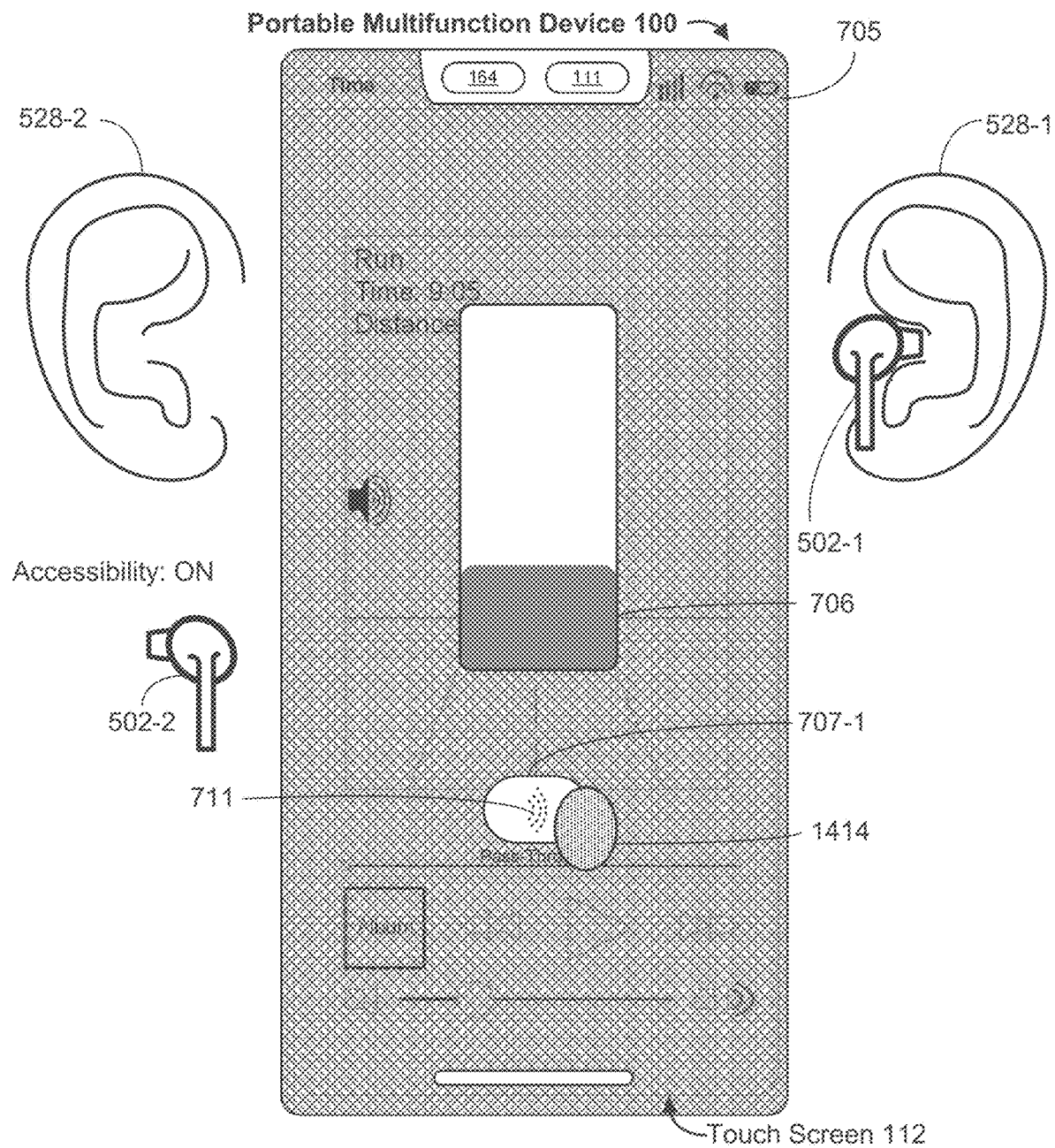

FIG. 14M illustrates that earbud 502-2 is not placed in ear 528-2 of the user, while earbud 502-1 is placed in ear 528-1 of the user. FIG. 14M also shows input 1414 (e.g., a tap gesture) being detected over noise management control 707-1, which currently indicates that earbuds 502-1 and 502-2 are in the pass-through mode, as indicated by pass-through icon 711.

Figure 14N:
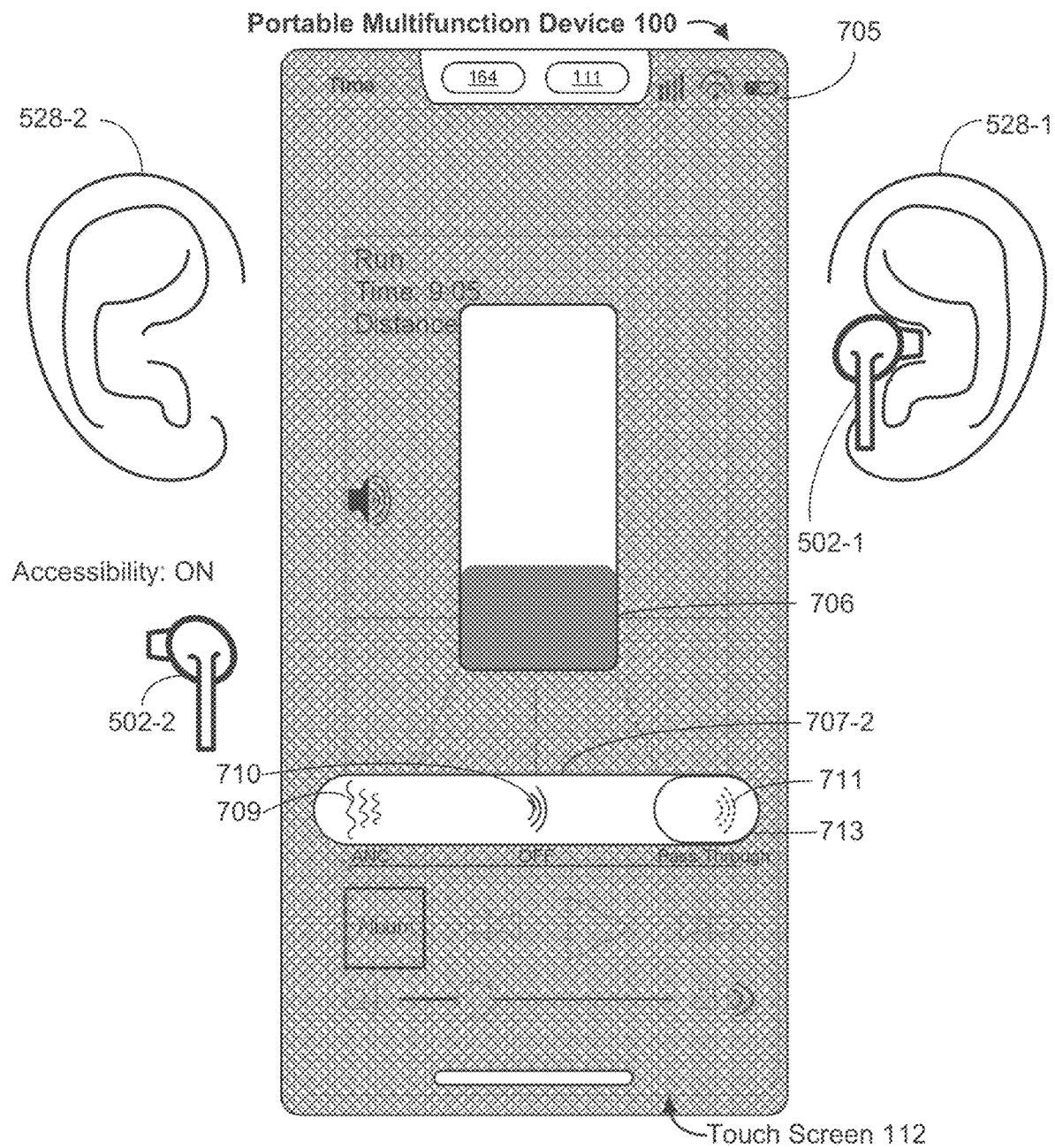

FIG. 14N illustrates expanded noise management control 707-2 displayed in response to input 1414, and selection indicator 713 displayed over pass-through icon 711 (e.g., and not displayed over either bypass icon 710 or active noise control icon 709) indicating that the audio pass-through mode represented by pass-through icon 711 is the mode in which earbuds 502 are currently operating.

Figure 14O:
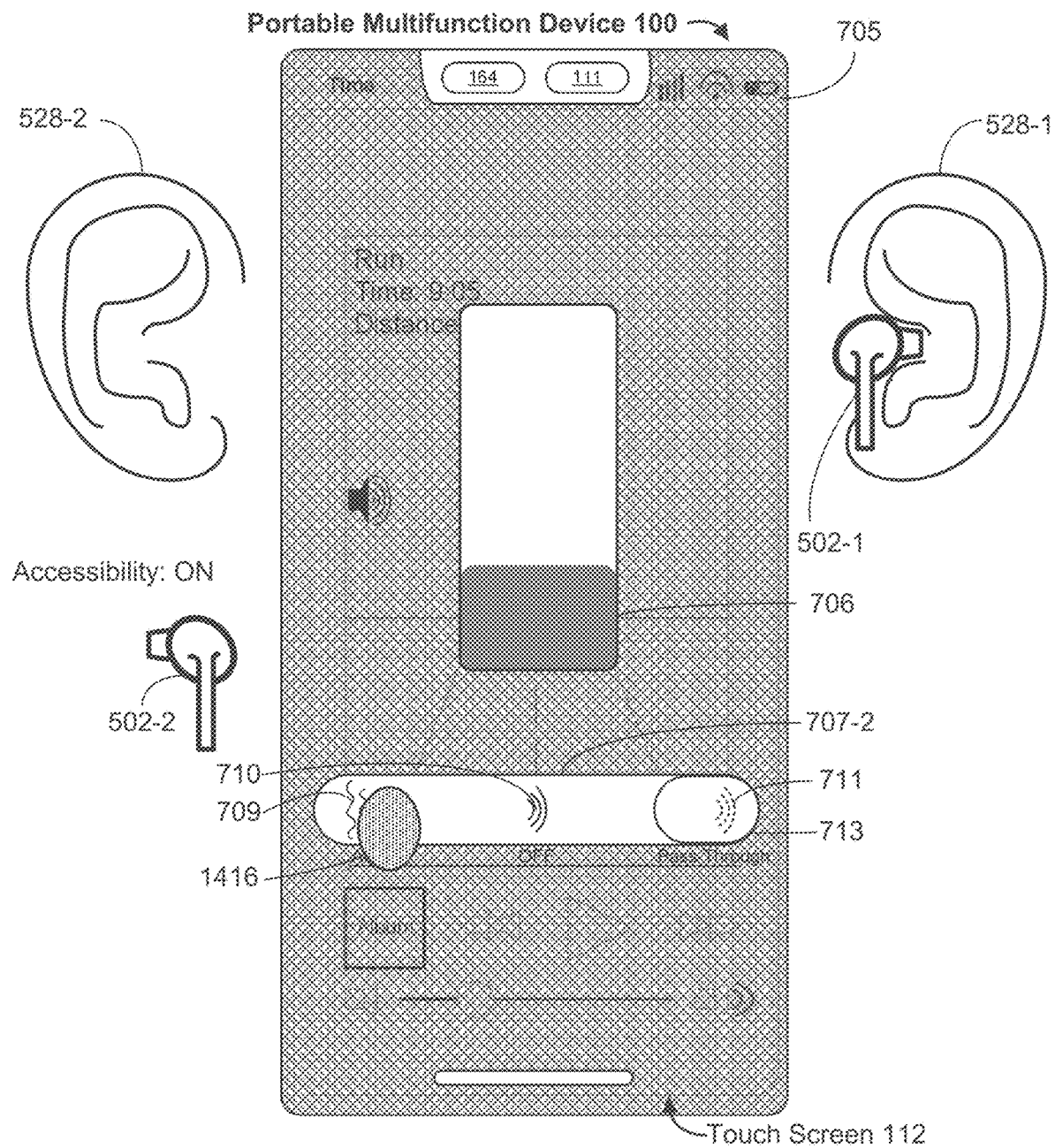

FIG. 14O illustrates that, while the accessibility mode is set to the "ON" state, and earbud 502-2 is removed from ear 528-2 of the user while earbud 502-1 is in ear 528-1, input 1416 (e.g., a tap gesture) is received at active noise control icon 709.

Figure 14P:
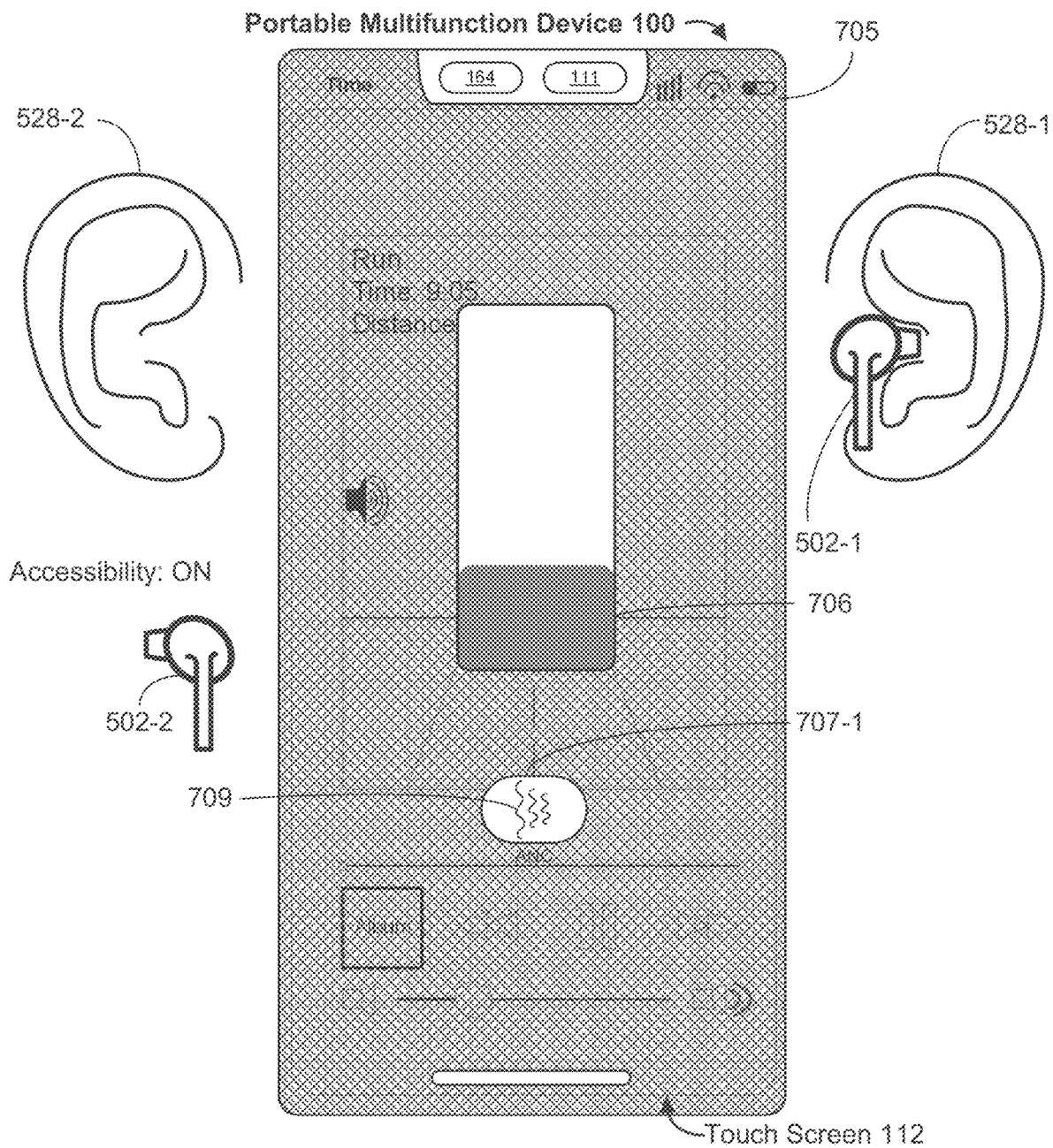

FIG. 14P illustrates that, in response to detecting input 1416 while the accessibility mode is set to the "ON" state and earbud 502-2 is removed from ear 528-2 while earbud 502-1 is in ear 528-1, earbuds 502 transition to the active noise control mode, as indicated by noise management control 707-1 displaying active noise control icon 709. This indicates that the user was able to select active noise control icon 709 and transition earbuds 502 to the active noise control mode without having to place both earbuds in-ear. This result is due to the accessibility mode overriding the default restriction of requiring both earbuds to be placed in the ears of the user before allowing the user to activate the active noise control mode.

Figure 14Q:
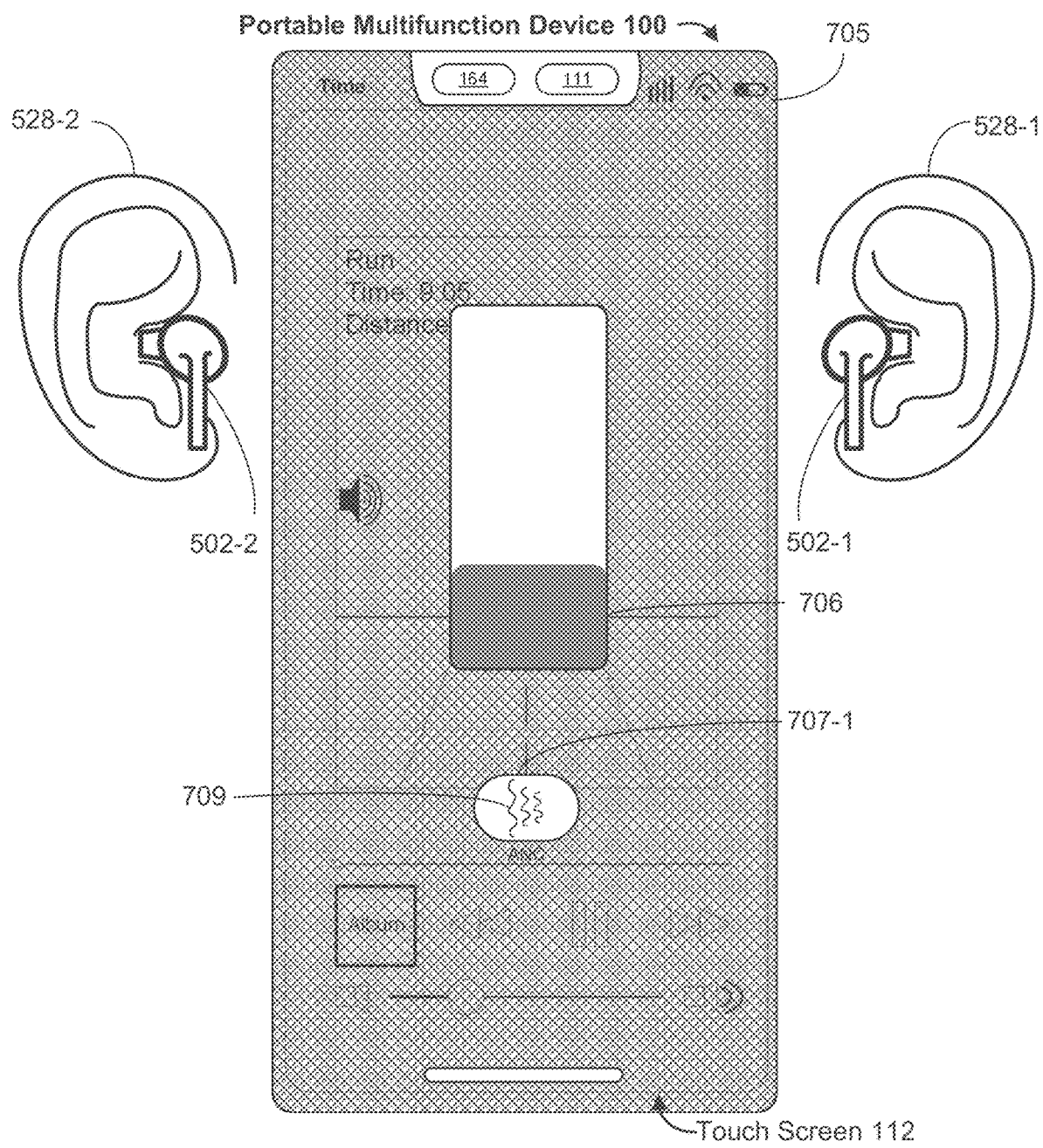

FIGS. 14Q-14V illustrate changing audio output mode in response to certain triggering events, such as receiving a phone call. FIG. 14Q shows an enhanced volume control user interface, and that both earbuds 502-1 and 502-2 are placed in ears 528-1 and 528-2 of the user, respectively. FIG. 14Q also illustrates that, within the noise management control 707-1, active noise control icon 709 is displayed, indicating that earbuds 502 are operating in the active noise control mode.

Figure 14R:
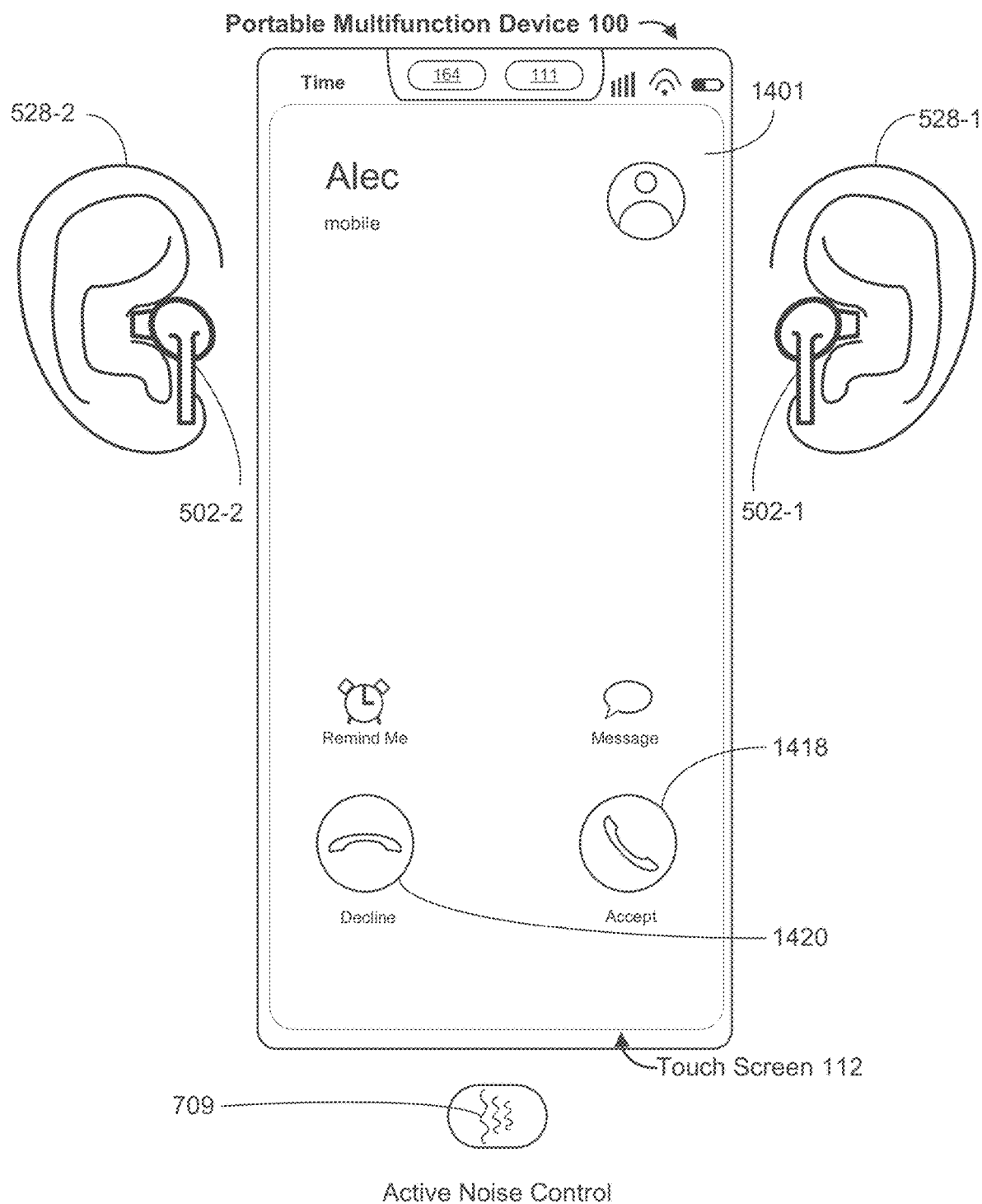

FIG. 14R shows incoming phone call user interface 1401 replacing the enhanced volume control user interface shown in FIG. 14Q. Incoming phone call user interface 1401 indicates receipt of an incoming phone call (e.g., a phone call from "Alec"), and includes respective user interface elements for accepting or declining the call. A first user interface element (e.g., labeled "Accept"), when activated, answers the incoming call, and a second user interface element (e.g., labeled "Decline"), when activated, declines the call (and/or sends the call to voicemail). Optionally, corresponding audio and/or tactile outputs are provided (e.g., via device 100 and/or earbuds 502) in combination with display of the incoming phone call user interface. While incoming phone call user interface 1401 is displayed, earbuds 502-1 and 502-2 continue to operate in their current audio output mode (e.g., the active noise control mode), as indicated below device 100 for illustrative purposes (e.g., because incoming phone call user interface 1401 includes no visual indication as to which audio output mode the earbuds are currently operating in).

Figure 14S:
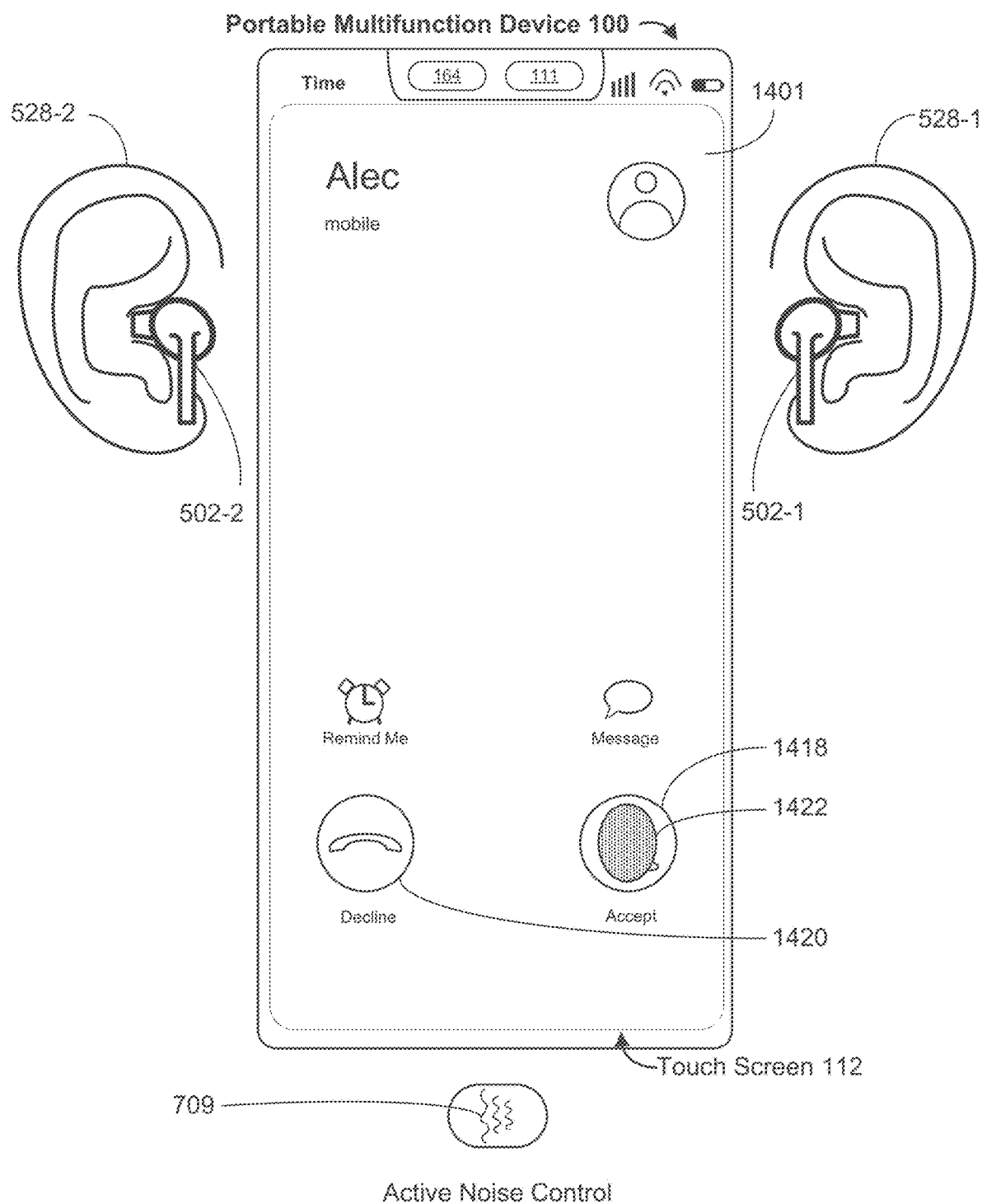

FIG. 14S illustrates input 1422 (e.g., a tap gesture) over user interface element 1418 (e.g., labeled "Accept"). Earbuds 502-1 and 502-2 continue to operate in the active noise control mode until the call is accepted (e.g., by receipt of input 1422 at user interface element 1418 or by input 1422 being removed from touch screen 112).

Figure 14T:
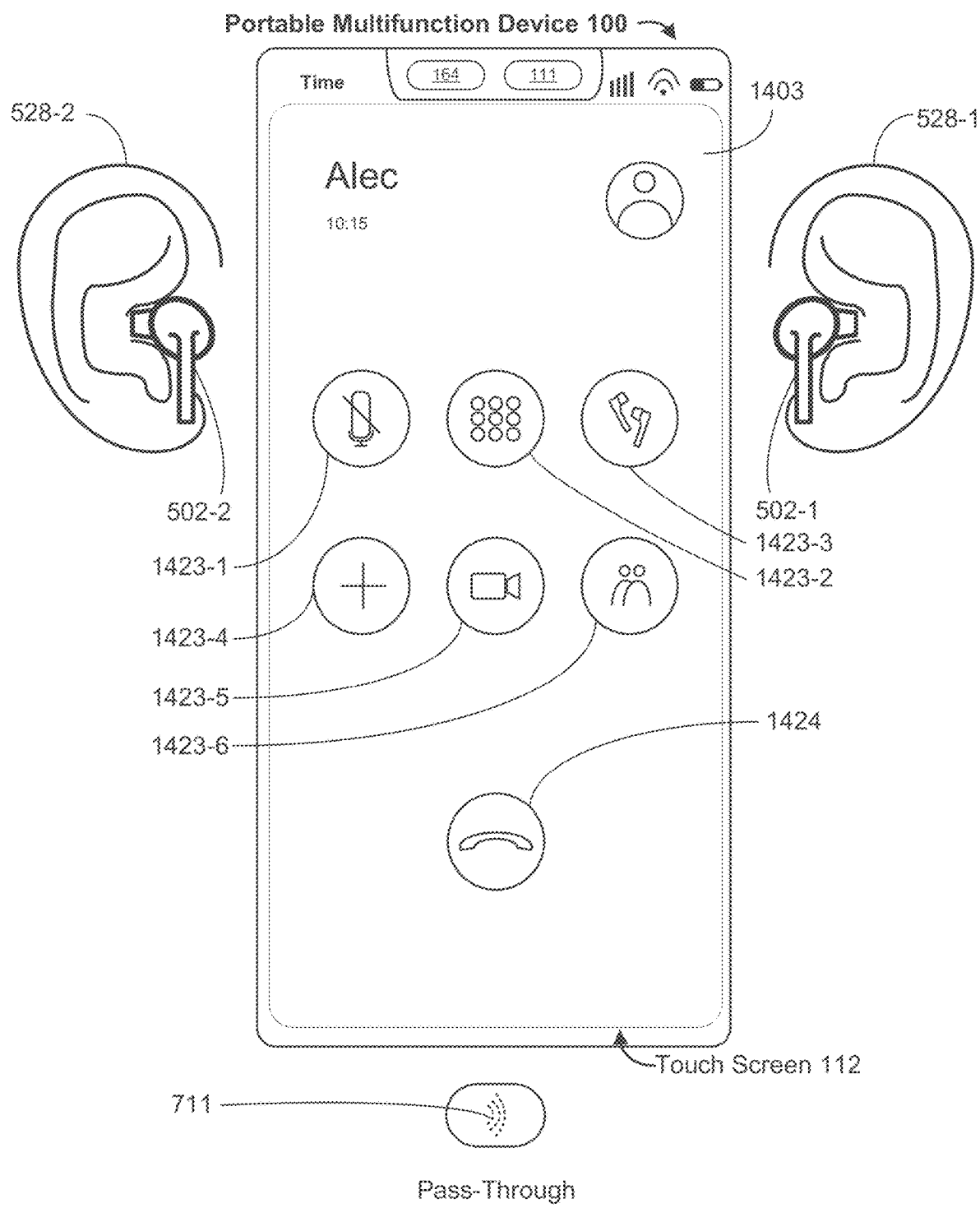

FIG. 14T shows call user interface 1403 displayed in response to input 1422 over user interface element 1418 (e.g., in a transition from FIG. 14S). Call user interface 1403 includes a plurality of controls for adjusting parameters of the phone call (e.g., a switch 1423-1 for muting the device's microphone (e.g., microphone 113, FIG. 1A), an icon 1423-2 for displaying a keypad (e.g., a telephone keypad), an icon 1423-3 for illustrating audio output controls 1401-3, an add callers icon 1423-4, a video call switch 1423-5, and a contacts switch 1423-6), and end call icon 1424. Once the phone call has been accepted, earbuds 502 switch audio output mode from the previous mode (e.g., the active noise control mode) to the pass-through mode, as indicated by pass-through icon 711 shown below device 100 for illustrative purposes. Transitioning earbuds 502 to the pass-through mode while the user is engaged in a phone call allows the user to hear ambient sound while on the call (e.g., including the user's own voice, so as to mitigate unwanted occlusive effects of wearing earbuds).

Figure 14U:
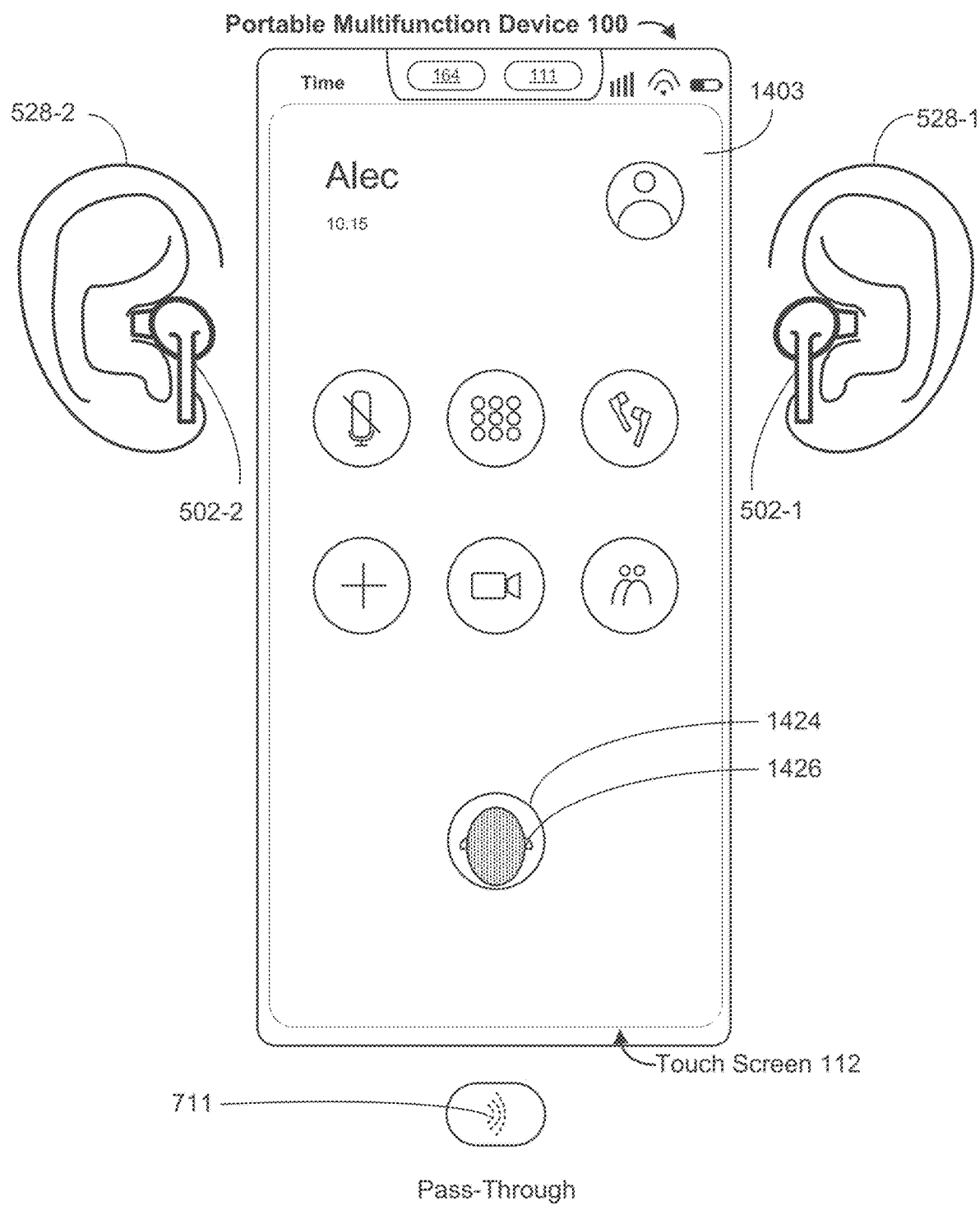
Figure 14V:
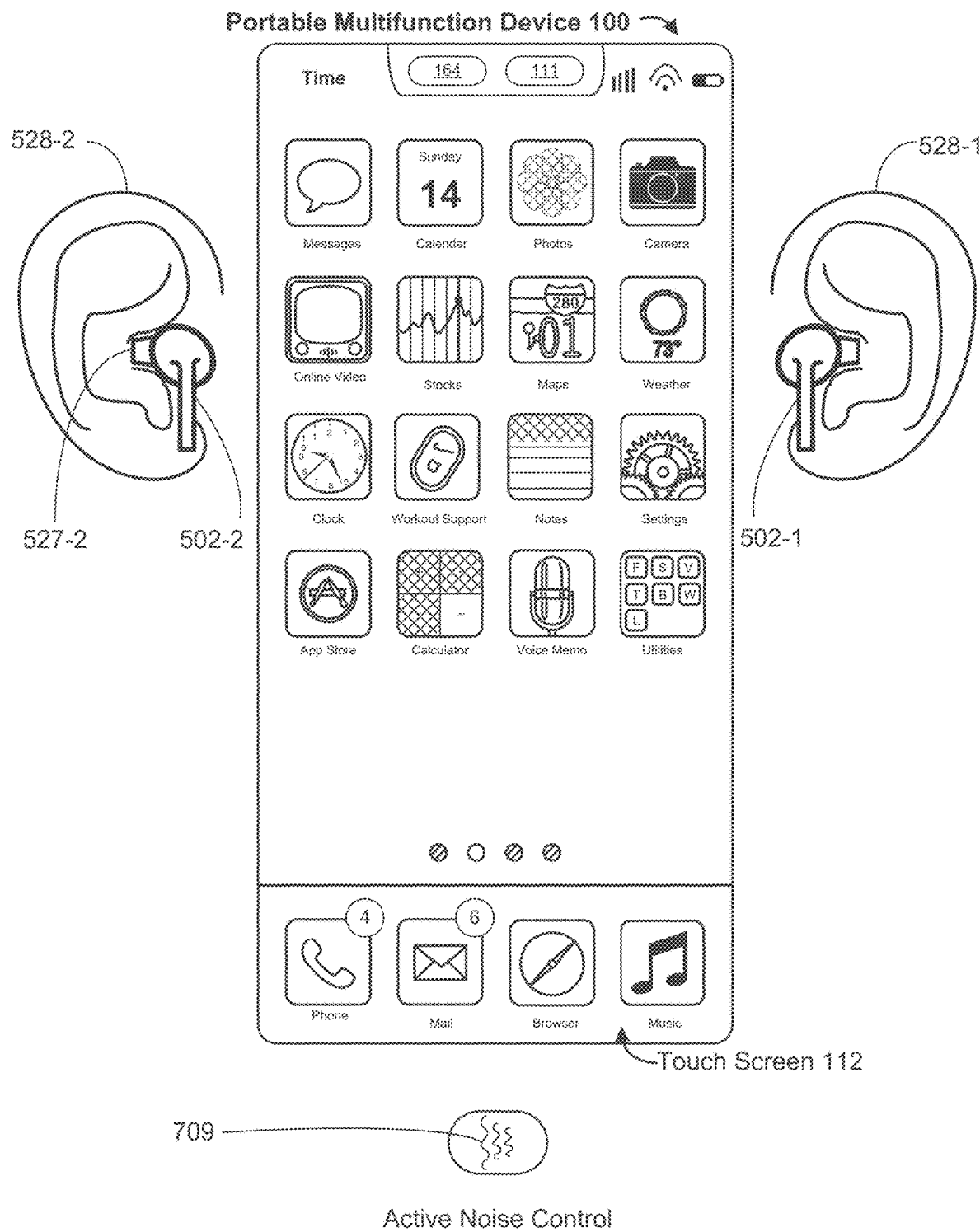

FIG. 14U shows earbuds 502-1 and 502-2 remaining in the pass-through mode as the phone call continues. FIG. 14U also shows input 1426 (e.g., a tap gesture) received at end call icon 1424. In response to input 1426 over end call icon 1424, device 100 terminates the call, as shown in FIG. 14V. Accordingly, earbuds 502-1 and 502-2 return to their previous mode (e.g., in this example, the active noise control mode), and device 100 ceases to display call user interface 1403 and instead displays an application menu user interface (e.g., as described herein with reference to FIG. 4A), sometimes called a home screen or main, home, or root menu.

Figure 14W:
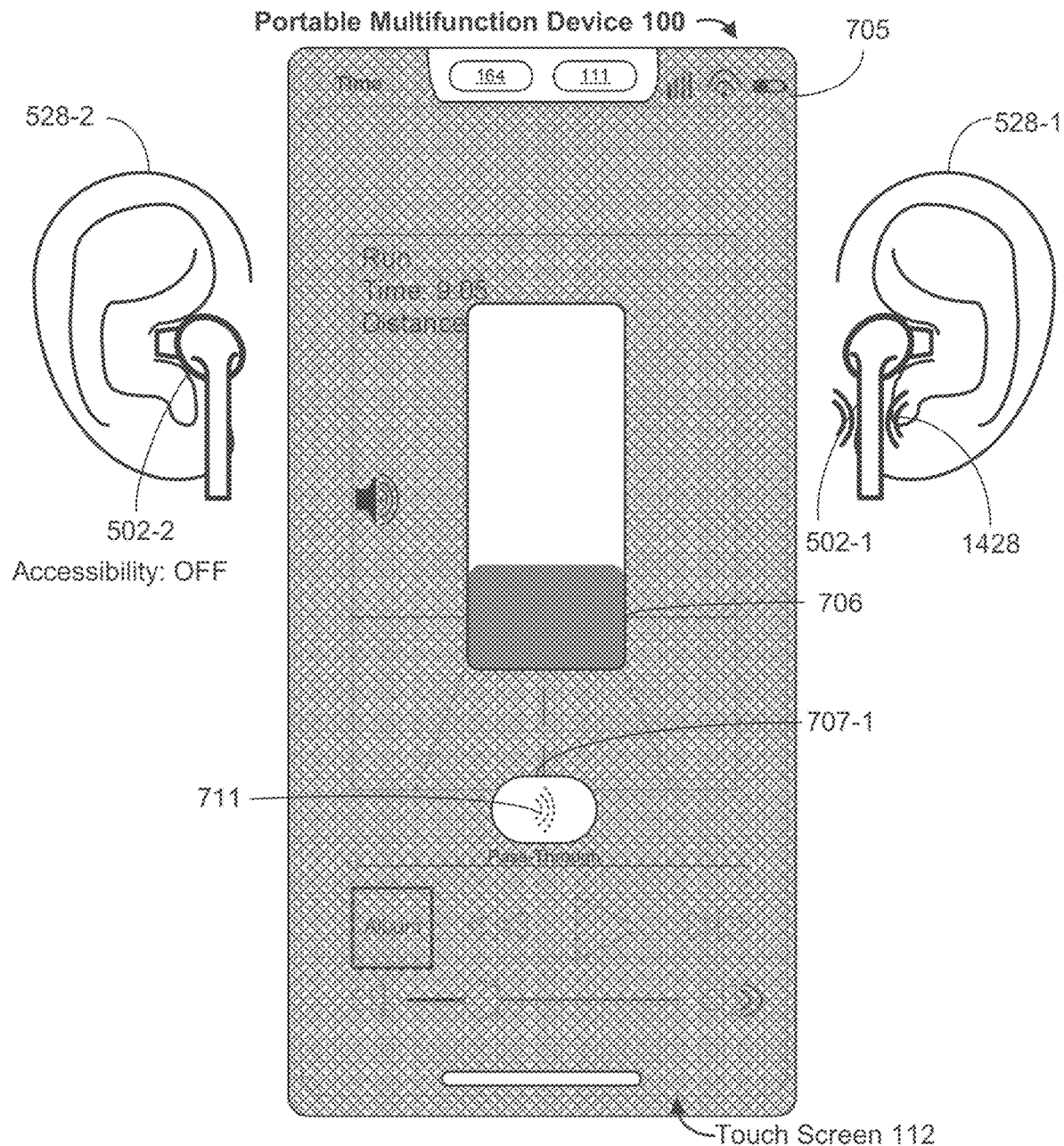
Figure 14X:
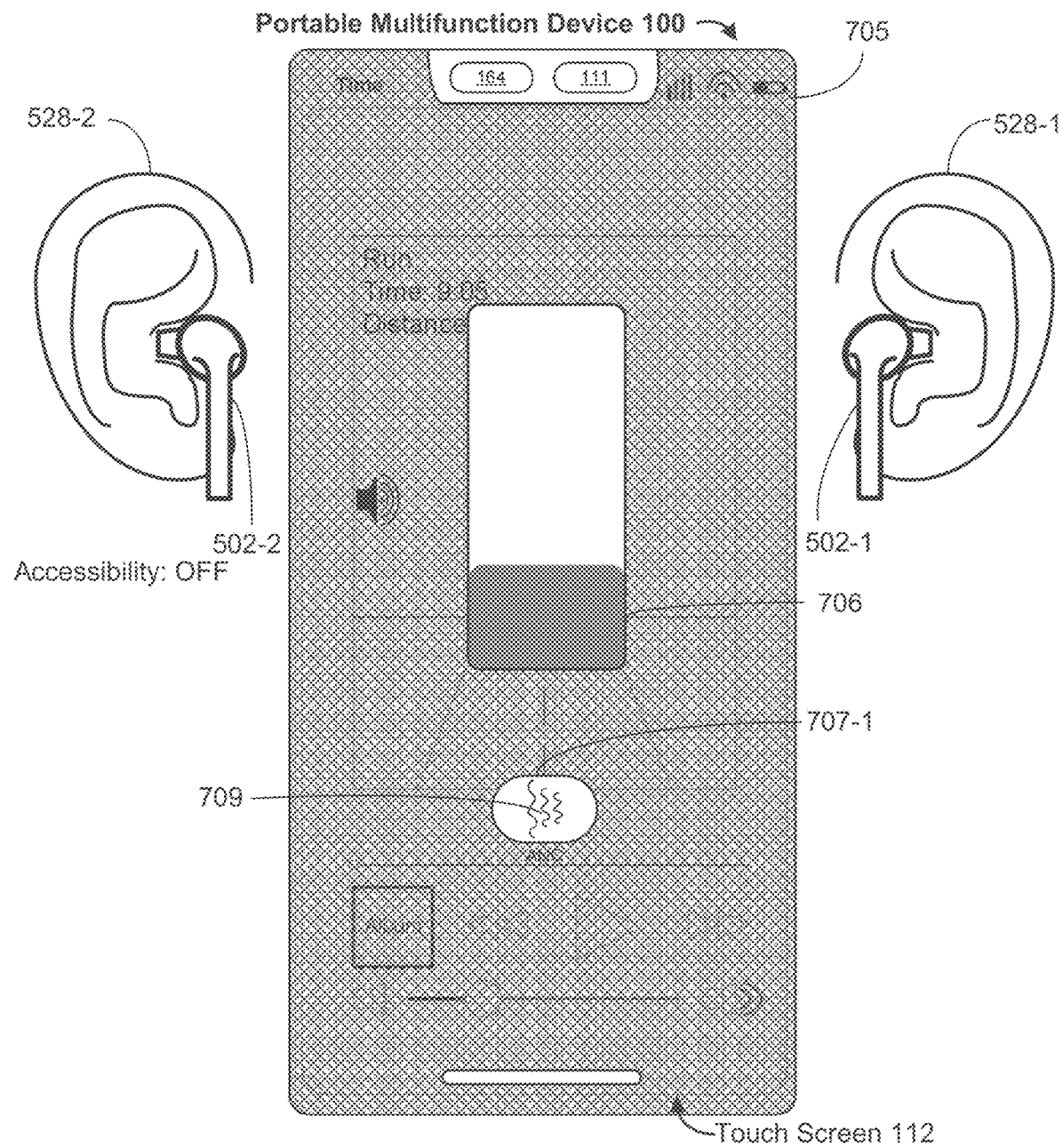
Figure 14Y:
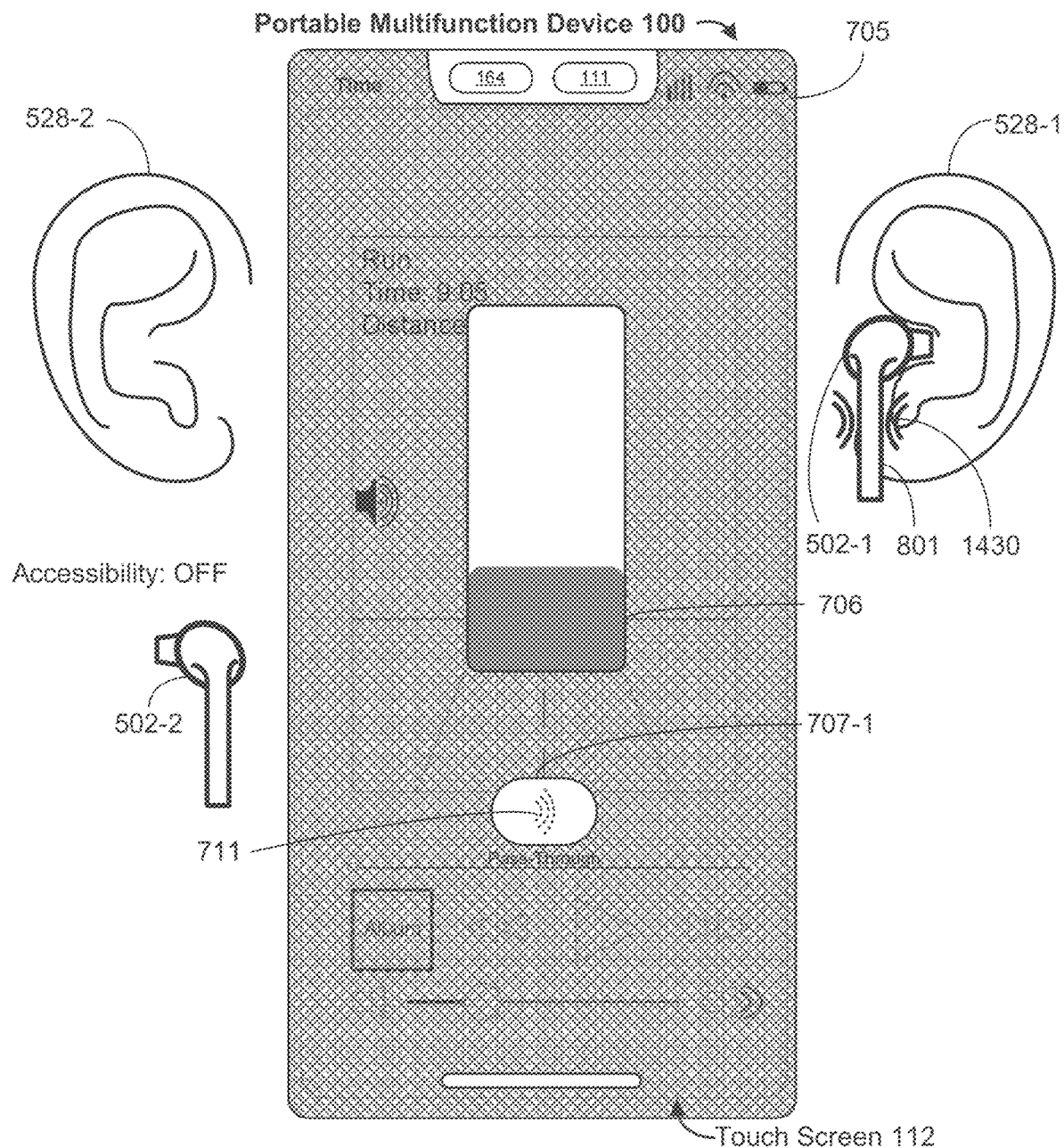
Figure 14Z:
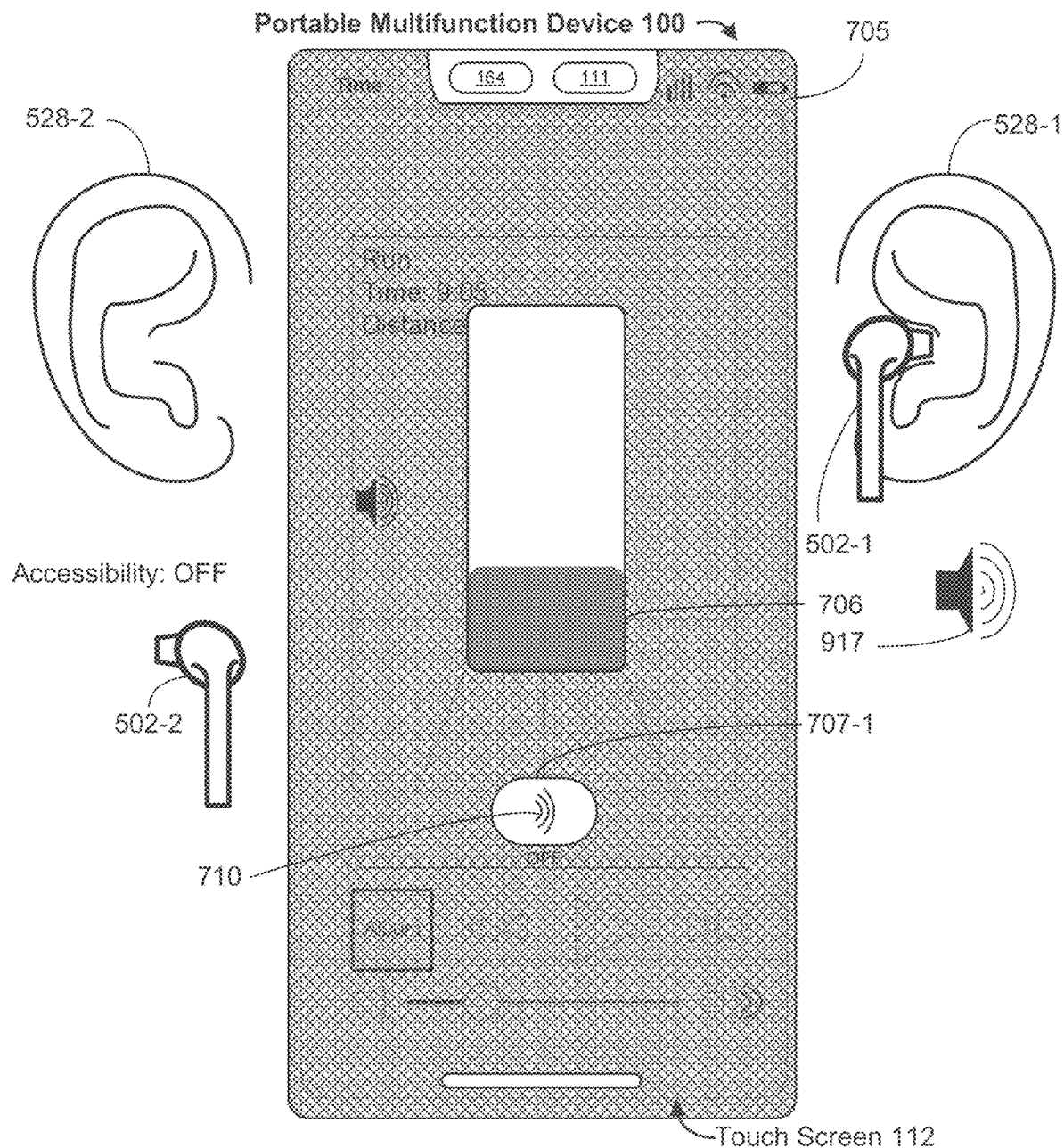

FIGS. 14W-14Z illustrate performance of noise management operations to switch between audio output modes in response to click-and-hold gestures (also sometimes herein called long squeeze gestures) on a stem of an earbud 502-1 or 502-2, while the accessibility mode is set to the "OFF" state as indicated in FIGS. 14W-14Z. Click-and-hold gesture functionality is described in more detail herein for example with reference to FIG. 9C, which illustrates that a user can cycle through a set of available audio output modes by clicking-and-holding the stem of an earbud 502. FIGS. 14W-14X illustrate that, while both earbuds 502 are in-ear, click-and-hold gestures received via a stem of an earbud transition earbuds 502 through a first set of audio output modes, while FIGS. 14Y-14Z illustrate that click-and-hold gestures received via a stem of an earbud while one earbud is not in-ear transitions earbuds 502 through a second, different set of audio output modes. Although example user interfaces are shown on touch screen 112 of device 100 for illustrative purposes, in some embodiments the inputs received at and resulting behavior of earbuds 502 described with reference to FIGS. 14W-14Z occurs while touch screen 112 of device 100 is turned off.

In particular, FIG. 14W shows enhanced volume control user interface 705, in which pass-through icon 711 within noise management control 707-1 indicates that earbuds 502 are operating in a pass-through mode. FIG. 14W also shows click-and-hold gesture 1428 received at earbud 502-1.

FIG. 14X shows that, while the accessibility mode is set to the "OFF" state, in response to click-and-hold gesture 1428, earbuds 502 switch from operating in the pass-through mode to operating in the active noise control mode, as indicated by the noise management control 707-1 showing active noise control icon 709 instead of pass-through icon 711. Transitioning to the active noise control mode is permitted because both earbuds 502 are in-ear.

FIGS. 14Y-14Z illustrates that, while the accessibility mode is in the "OFF" state, and one earbud 502-2 is removed, earbuds 502 will not operate in the active noise control mode. In FIG. 14Y, since earbud 502-2 is removed from ear 528-2 of the user, earbuds are operating in the pass-through mode. FIG. 14Y also shows click-and-hold gesture 1430 received at stem 801 of earbud 502-1.

FIG. 14Z illustrates that, in response to click-and-hold gesture 1430 at stem 801 of earbud 502-1 in FIG. 14Y, earbuds 502 do not transition to the active noise control mode as requested by click-and-hold gesture 1430, because earbud 502-2 is still removed from ear 528-2. Instead, in response to the click-and-hold gesture 1430 in shown in FIG. 14Y, earbuds 502 transition to the bypass mode, as indicated by bypass icon 710, rather than cycling to the active noise control mode (as it is now unavailable). Additionally, in some embodiments, audible feedback (e.g., indicated by audio icon 917) is provided at earbud(s) 502 in combination with the audio output mode change.

FIGS. 15A-15E illustrate example settings user interfaces for controlling various features associated with wearable audio output devices and examples of controlling audio output mode in accordance with some embodiments. FIGS. 15A-15E also show example settings user interfaces for controlling the response to click-and-hold gestures at the stems of earbuds in accordance with some embodiments.

Figure 15A:
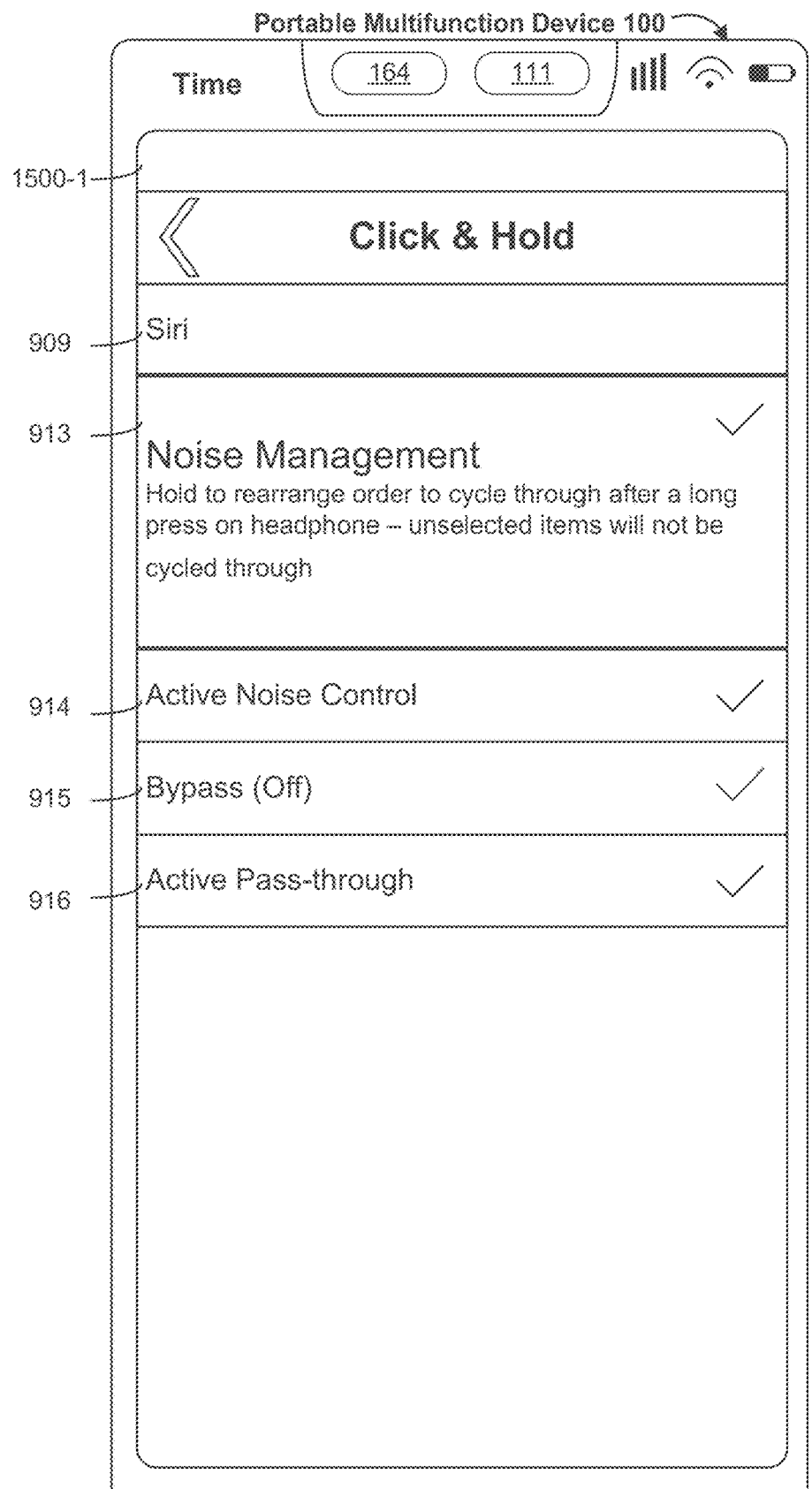
FIGS. 15A-15E illustrate an example settings user interface for controlling various features associated with wearable audio output devices and examples of controlling audio output mode in accordance with some embodiments.

FIG. 15A illustrates user interface 1500-1, which allows the user to select a type of operation to be performed in response to click-and-hold gestures (e.g., on stem 801 or other input device 308 (FIG. 3B) of an earbud 502). The options for the type of operation to be performed include the following, or a subset or superset thereof:
  Option 909, labeled "Siri," selection of which configures click-and-hold gestures to invoke a virtual assistant;
  Option 913, labeled "Noise Management," selection of which configures click-and-hold gestures to switch between selected options for audio output mode listed under option 913, such as:
    Active noise control mode option 914, labeled "Active Noise Control," in which the earbuds output one or more audio-cancelling audio components to at least partially cancel ambient sound;
    Bypass mode option 915, labeled "Bypass (Off)," in which the earbuds output neither audio-cancelling audio components nor pass-through audio components; and
    Pass-through mode option 916, labeled "Active Pass-through," in which the earbuds output one or more pass-through audio components so that the user can hear a greater amount of ambient sound (e.g., a greater amount of ambient sound than would be audible with the passive attenuation of the earbuds placed in the ears).

In some embodiments, selecting an option above assigns the selected type of operation to the operation of both earbuds in a pair of earbuds (e.g., both earbud 502-1 and 502-2 of earbuds 502). In some embodiments, the two earbuds in a pair of earbuds can be configured (e.g., via settings user interface 1500-1) to perform different operations in response to a particular input gesture.

Figure 15B:
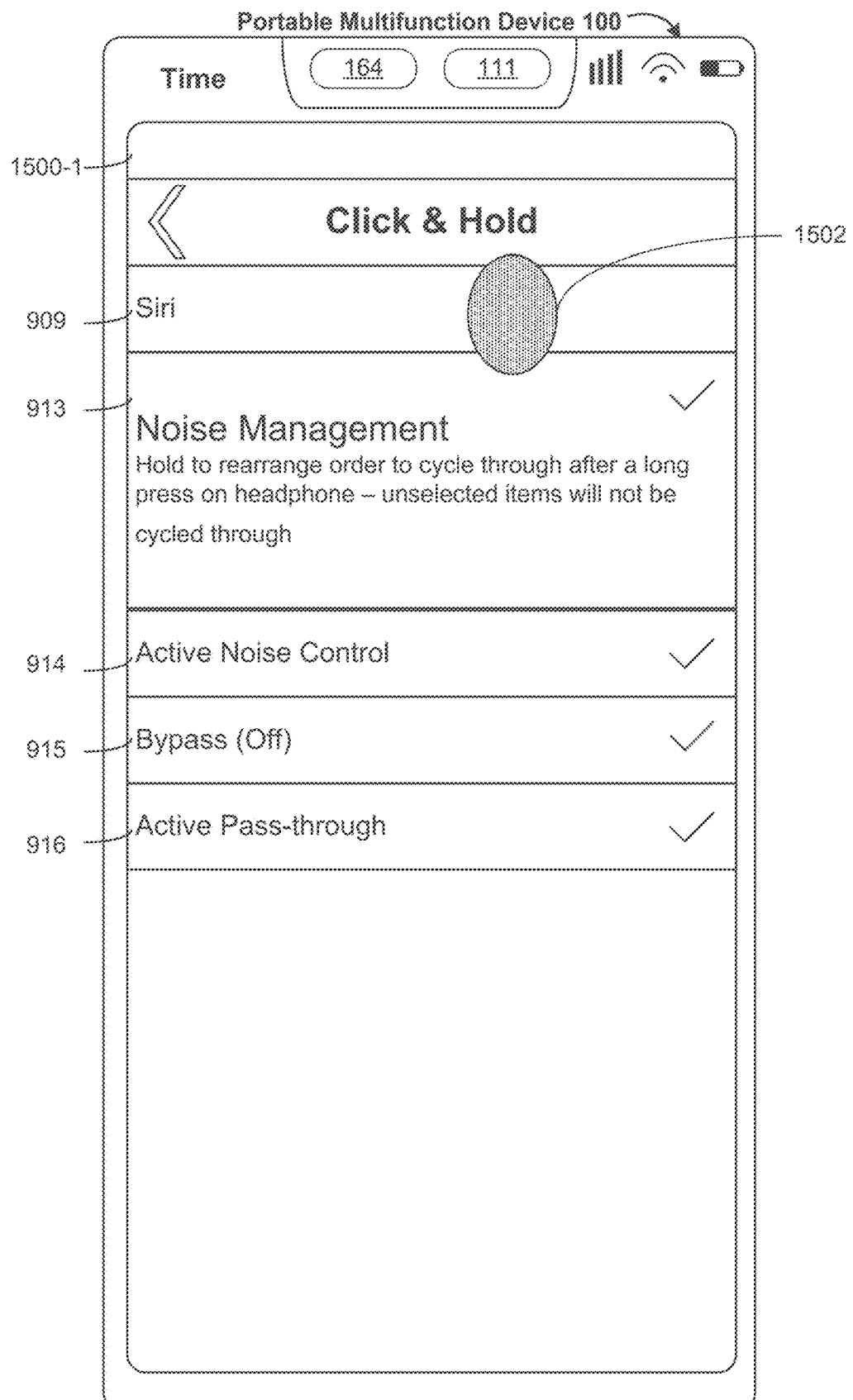

FIG. 15B shows input 1502 (e.g., a tap gesture) over option 909 labeled "Siri."

Figure 15C:
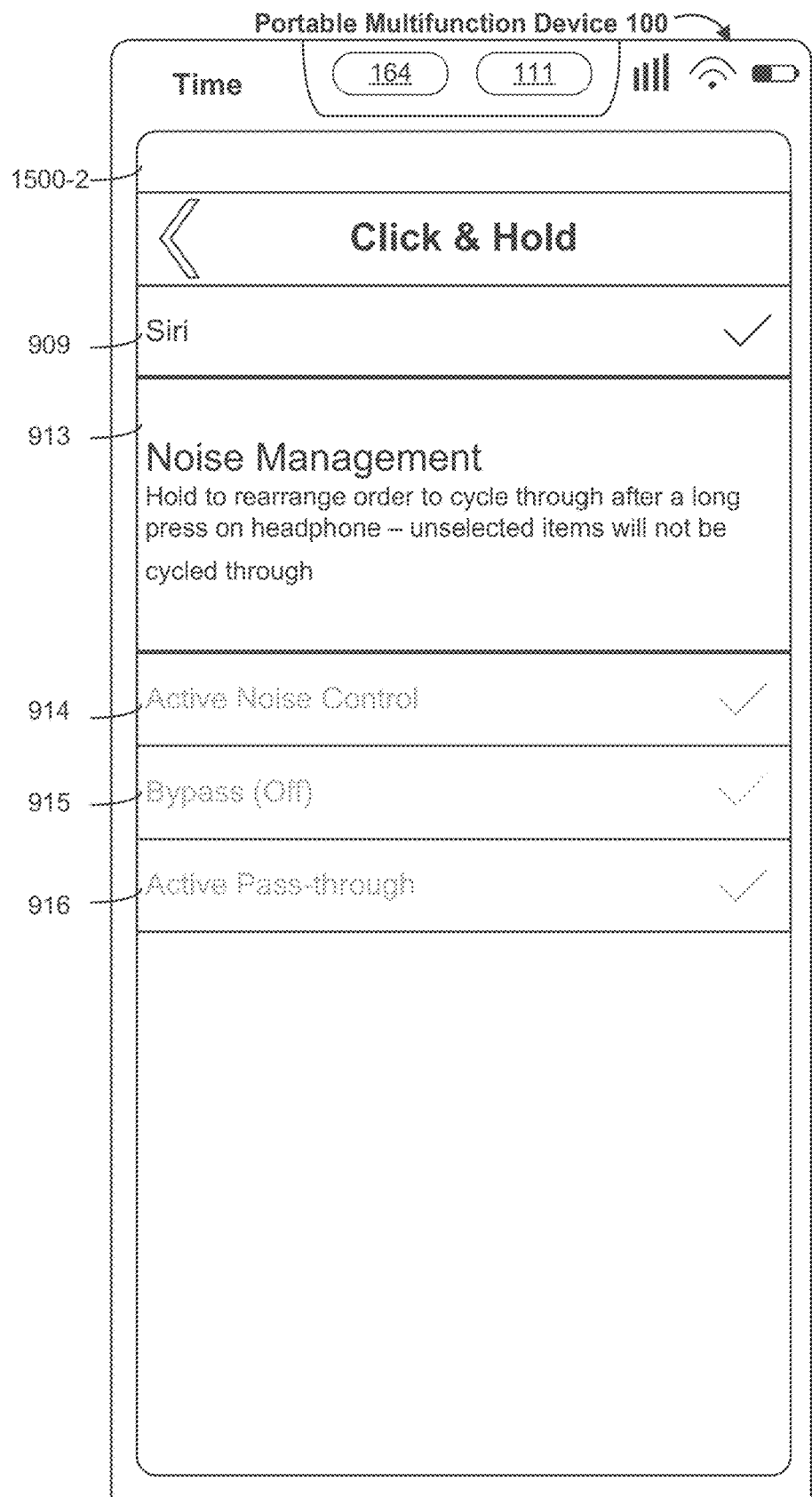

FIG. 15C shows that, in response to input 1502 over option 909 labeled "Siri," option 913 labeled "Noise Management" is no longer selected (indicated by the removed checkmark), and the option labeled "Siri" is selected (indicated by the added checkmark) as being associated with click-and-hold gestures. Active noise control mode option 914, bypass mode option 915, and active pass-through mode option 916 remain selected, but are displayed in a grayed-out state. In some embodiments, this is done out of convenience to keep the user's preferences saved in the event that the user later decides to reselect option 913 labeled "Noise Management." In some embodiments, in combination with deselection of option 913 labeled "Noise Management," active noise control mode option 914, bypass mode option 915, and active pass-through mode option 916 cease to be displayed.

Figure 15D:
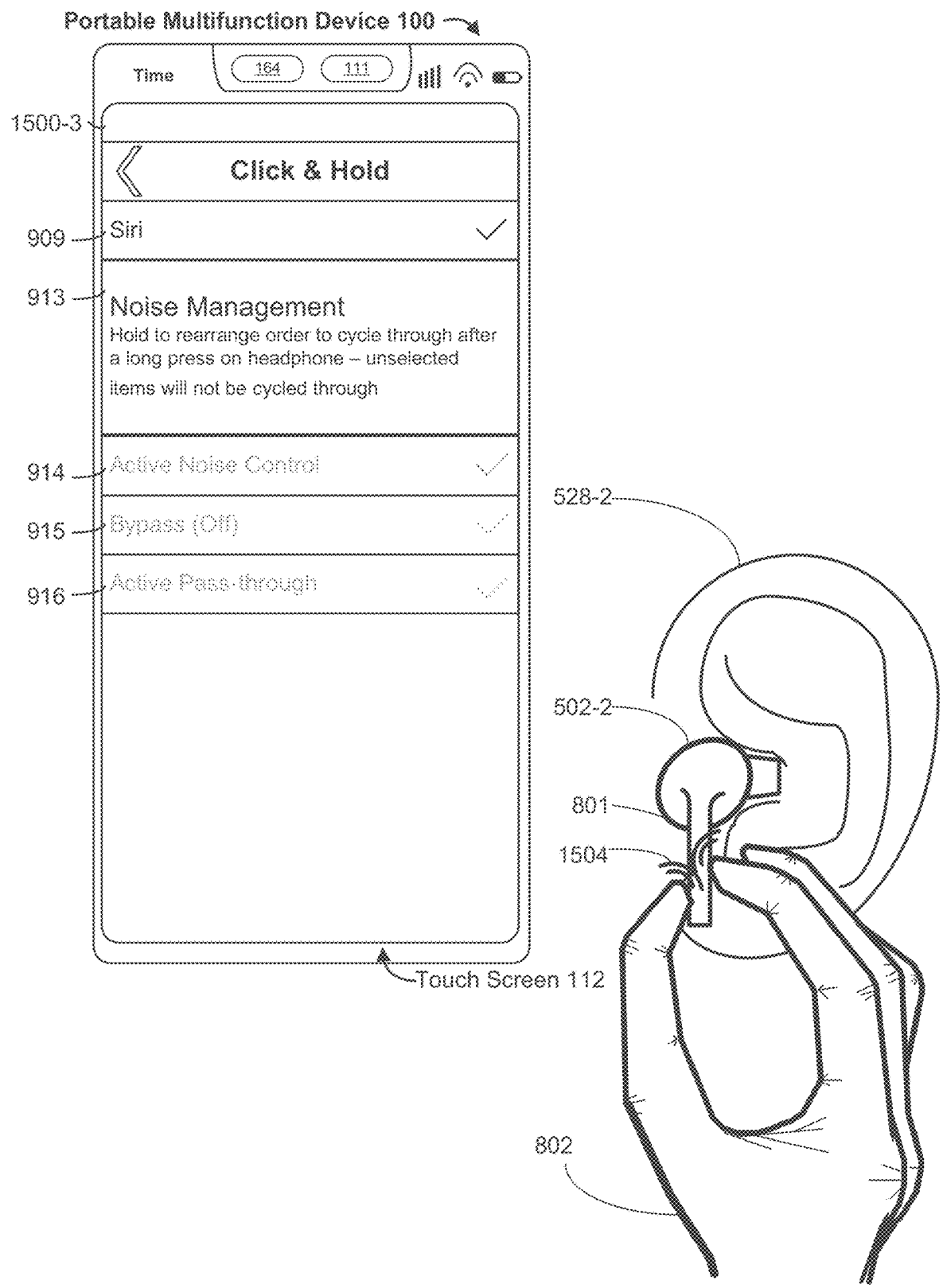

FIG. 15D illustrates that while option 909 labeled "Siri" is selected, click-and-hold gesture 1504 is received at stem 801 of earbud 502-2.

Figure 15E:
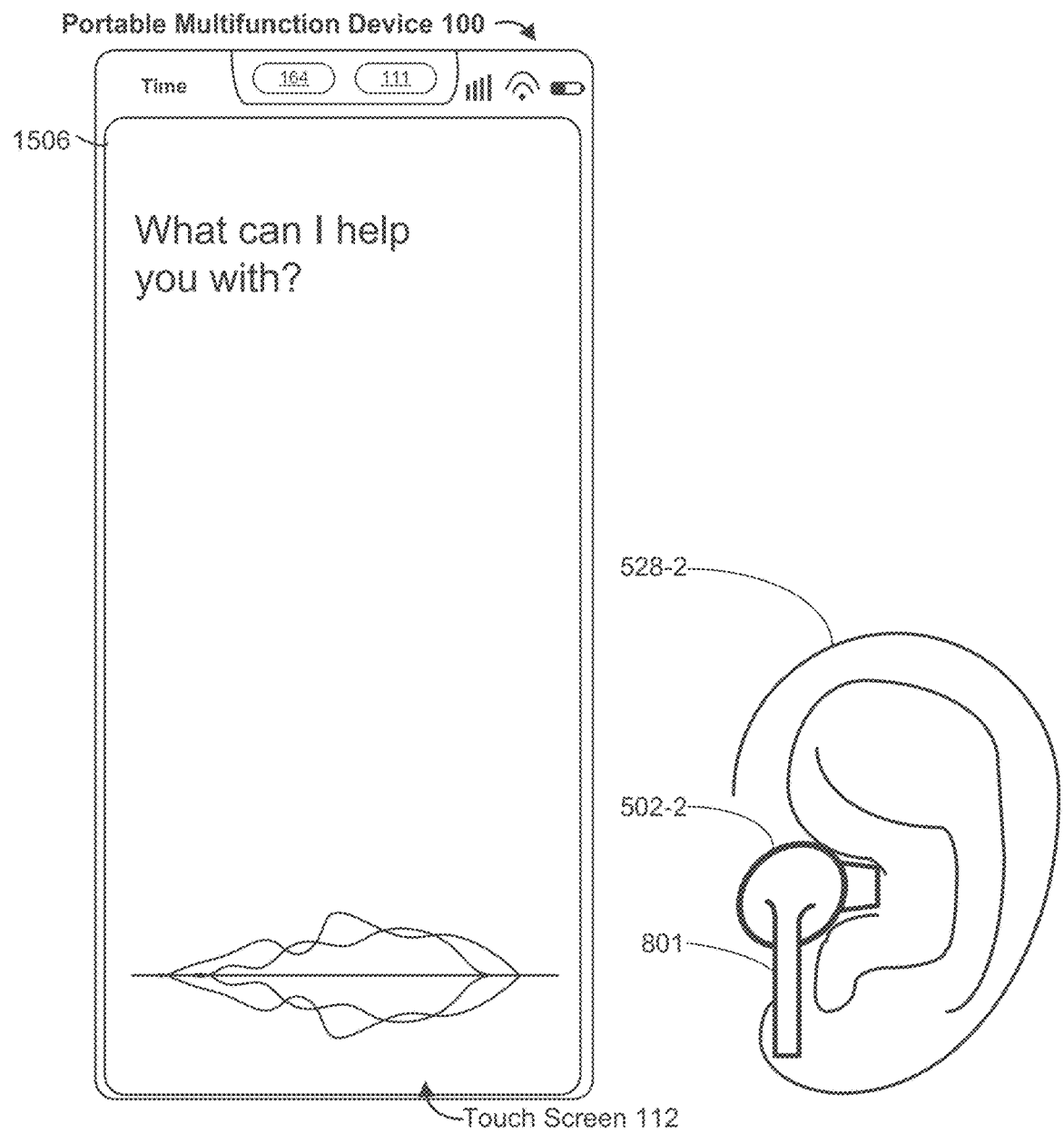

FIG. 15E illustrates that, in response to click-and-hold gesture 1504 in FIG. 15D, and while option 909 labeled "Siri" is selected, virtual assistant user interface 1506 is displayed (e.g., instead of the audio output mode of earbuds 502 being changed).

FIGS. 16A-16G illustrate example user interfaces for calibrating and displaying information about acoustic seal quality of wearable audio output devices in accordance with some embodiments.

Figure 16A:
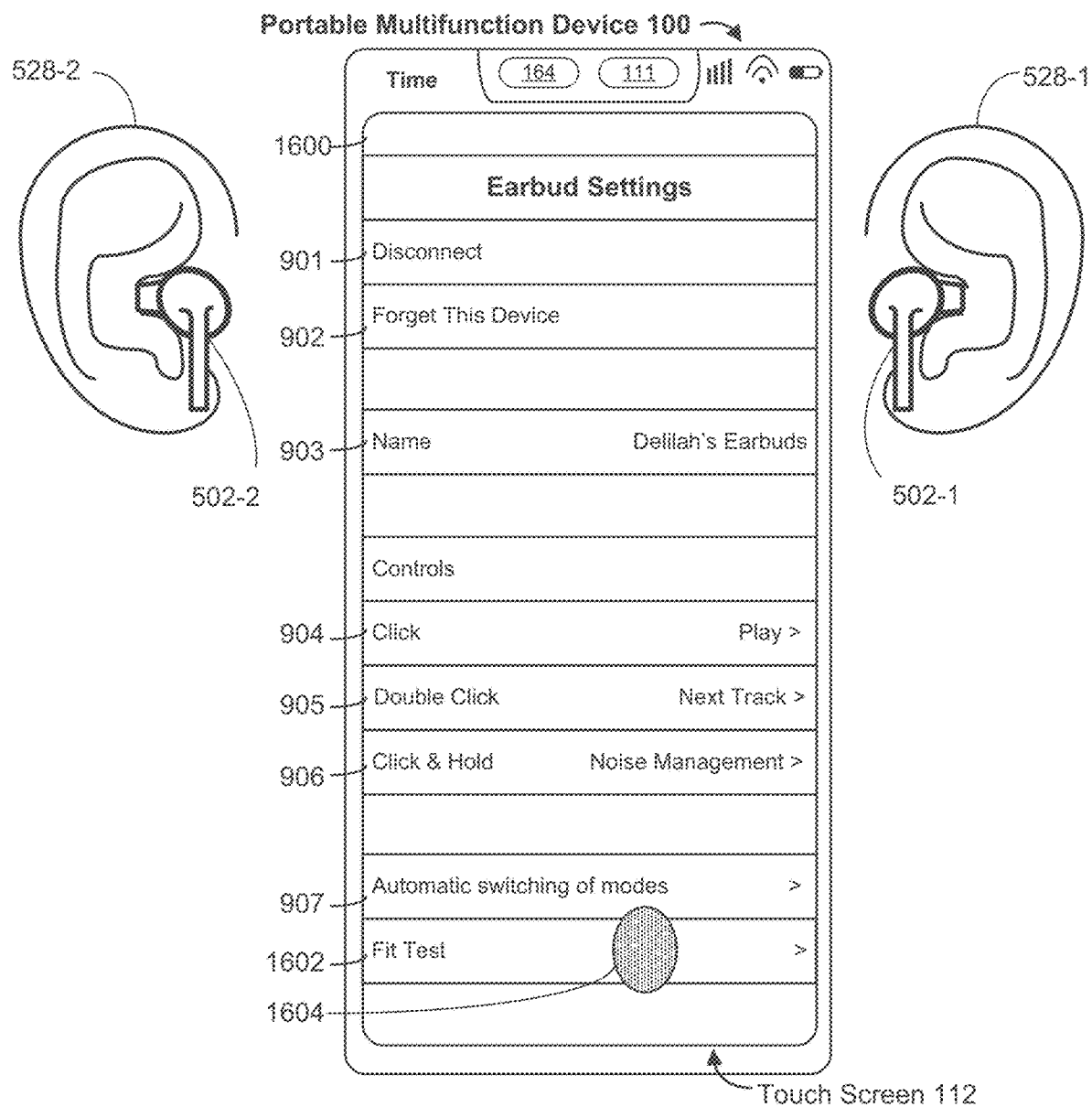
FIGS. 16A-16G illustrate example user interfaces for calibrating and displaying information about acoustic seal quality of wearable audio output devices in accordance with some embodiments.

FIG. 16A illustrates settings user interface 1600 for controlling various features associated with earbuds (e.g., earbuds 502). In particular, FIG. 16A shows settings user interface 1600, which includes a plurality of activatable control options, such as the following, or a subset or superset thereof:
  Control option 901, labeled "Disconnect," for disconnecting the earbuds from device 100;
  Control option 902, labeled "Forget This Device," for dissociating (e.g., unpairing) the earbuds from device 100;
  Control option 903, labeled "Name," for assigning a name to the earbuds (e.g., "Delilah's Earbuds" in the example shown in FIG. 16A);
  Control option 904, labeled "Click," for assigning a type of operation (e.g., currently the "Play/Pause" operation type) to be performed in response to receiving single click (e.g., herein also called "single squeeze") gestures at an earbud (e.g., using a stem of the earbud);
  Control option 905, labeled "Double Click," for assigning a type of operation (e.g., currently the "Next Track" operation type) to be performed in response to receiving double click (e.g., herein also called "double squeeze") gestures at an earbud (e.g., using a stem of the earbud);
  Control option 906, labeled "Click & Hold," for assigning a type of operation (e.g., currently the "Noise Management" operation type) to be performed in response to receiving click-and-hold (e.g., herein also called "long squeeze") gestures at an earbud (e.g., using a stem of the earbud);
  Control option 907, labeled "Automatic switching of modes," for controlling automatic switching (e.g., by the earbuds) between different audio output modes; and
  Control option 1602, labeled "Fit Test," for performing a test to determine the fit of the earbuds and/or the quality of acoustic seals between the earbuds and the ears of the user, and in some embodiments for making suggestions to improve the fit and/or acoustic seals of the earbuds.

In addition, FIG. 16A shows input 1604 (e.g., a tap gesture) received at control option 1602.

Figure 16B:
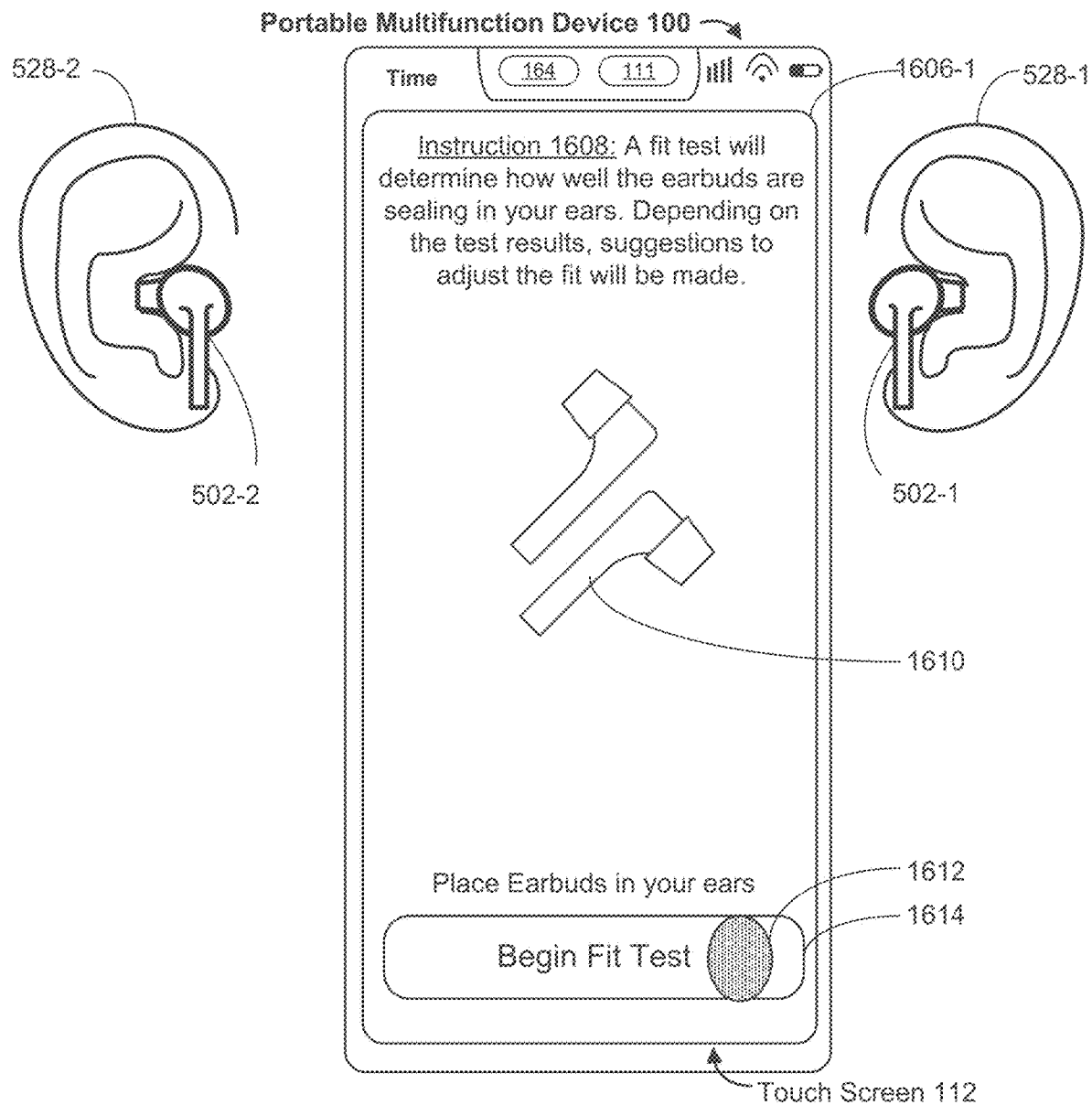

FIG. 16B shows that, in response to input 1604 over control option 1602, fit test user interface 1606-1 is displayed. Fit test user interface 1606-1 includes instruction 1608, which states "A fit test will determine how well the earbuds are sealing in your ears. Depending on the test results, suggestions to adjust the fit will be made." Additionally, a representation 1610 of earbuds 502 is optionally displayed, and in some embodiments, an instruction to the user to place earbuds 502 in the user's ears 528 is also displayed (e.g., via an animation). FIG. 16B also shows button 1614, labeled "Begin Fit Test," which when activated begins the fit test to determine how well the earbuds (and eartips) form acoustic seals with the ears of the user. FIG. 16A also shows input 1612 (e.g., a tap gesture) at button 1614 labeled "Begin Fit Test."

Figure 16C:
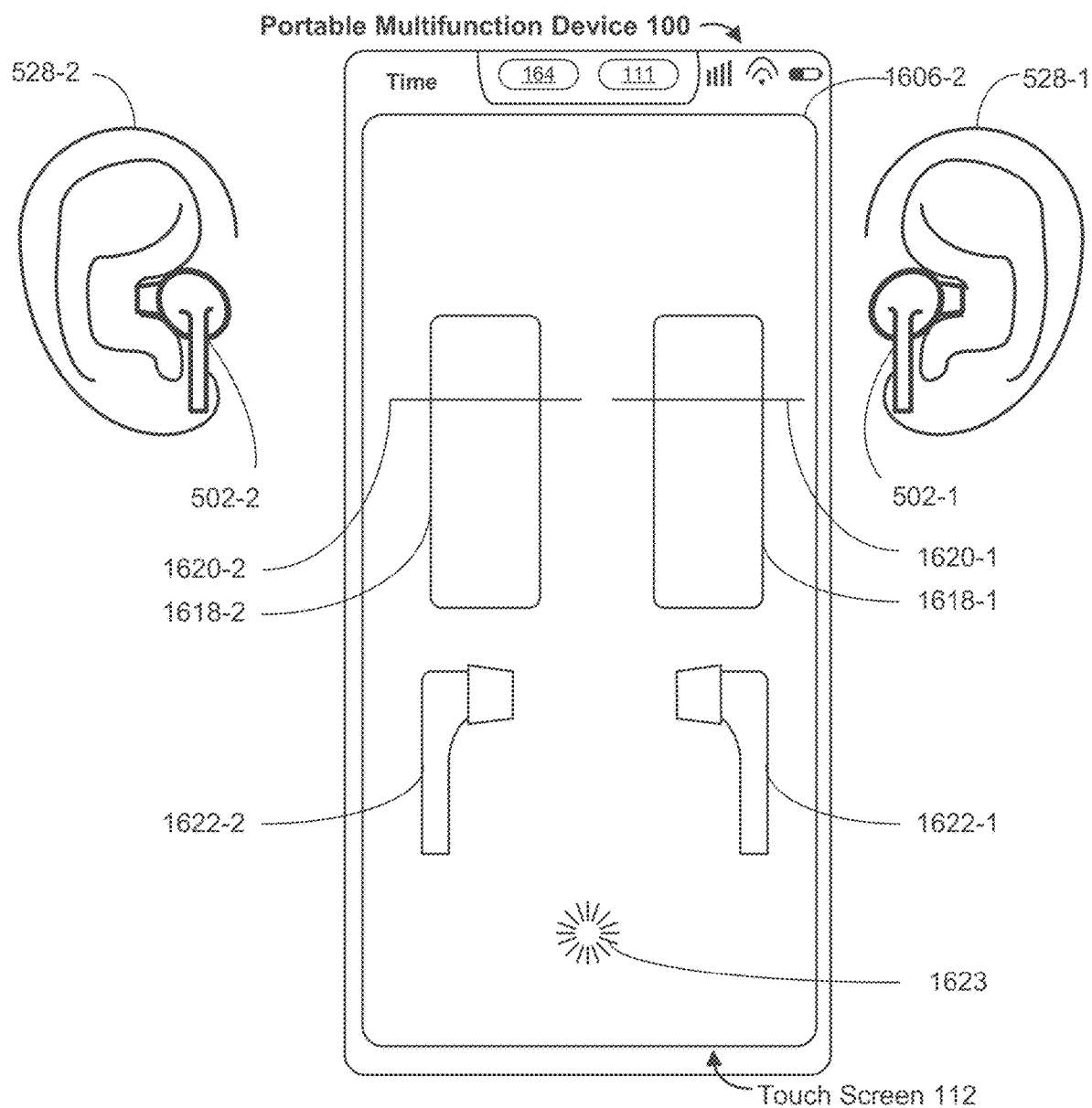

FIG. 16C shows fit-test user interface 1606-2 that is displayed in response to detecting input 1612 at button 1614 labeled "Begin Test." Specifically, FIG. 16C shows that a fit-test is currently in progress. In some embodiments, during the fit test, a calibration tone is played, and earbuds 502 detect the calibration tone using microphones in earbuds 502 to determine how well each earbud and its corresponding eartip forms an acoustic seal with the ear in which the earbud is placed (e.g., as described herein with reference to FIGS. 5A-5V). Fit-test user interface 1606-2 optionally shows respective representations 1622-1 and 1622-2 of earbuds 502, which are currently placed in the ears of the user. Above earbud representations 1622-1 and 1622-2 (or, alternatively, other designators, such as designators that include the words "left" and "right") are displayed two seal quality scales 1618-1 and 1618-2 (collectively 1618), which correspond to earbuds 502-1, and 502-2, respectively. In some embodiments, seal quality scales 1618 are displayed with respective circles (or other indicators, such as filling of a bar up to a certain level) indicating how well the earbuds form acoustic seals in the ears of the user. Additionally, threshold markers 1620-1 and 1620-2 are optionally displayed to indicate a threshold seal quality. In FIG. 16C, no indications of seal quality are displayed because the fit test is still in progress, as indicated by progress wheel 1623.

Figure 16D:
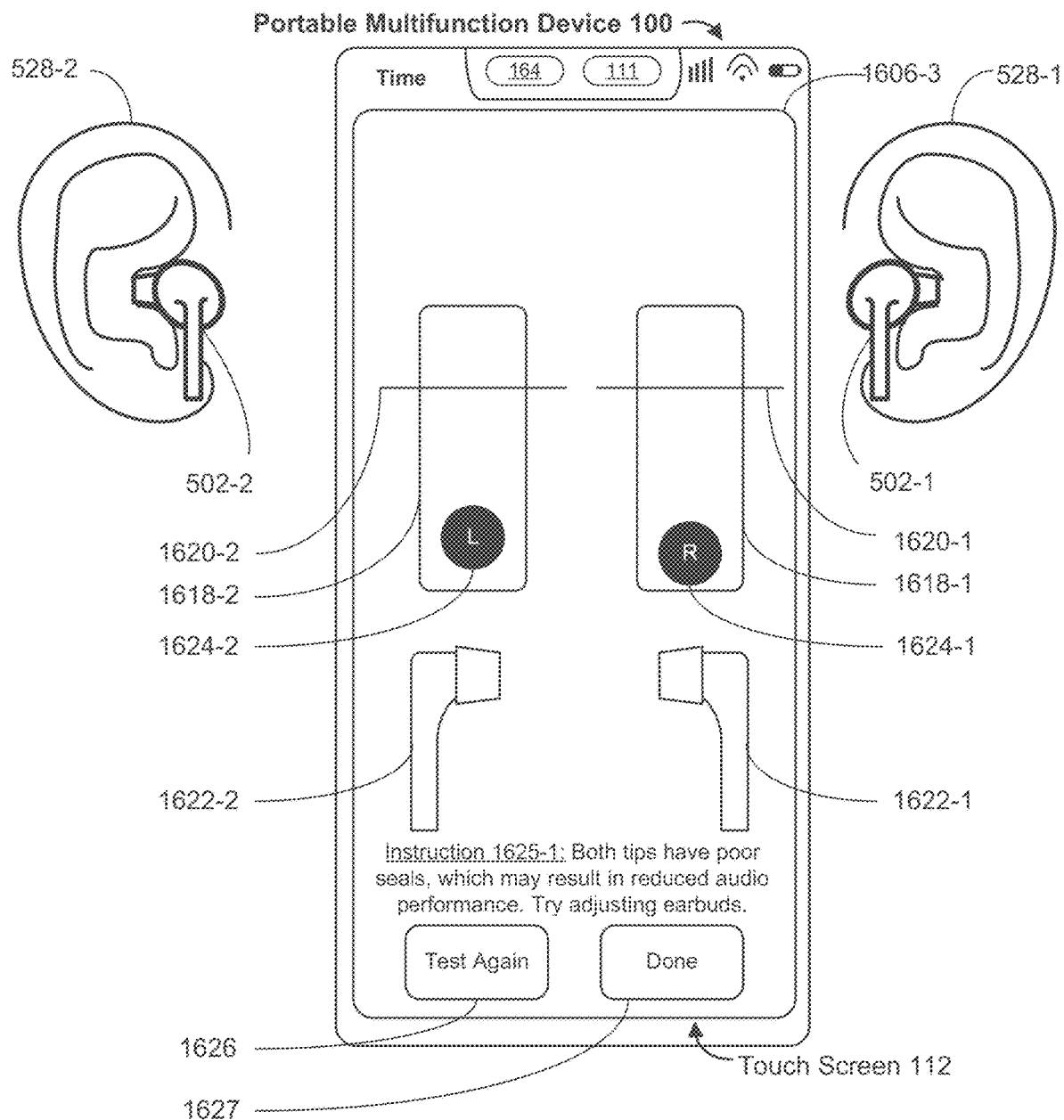

FIGS. 16D-16G illustrate examples of different resulting user interfaces displayed once the fit test is completed and the quality of acoustic seals between earbuds 502 and the user's ears have been determined. FIG. 16D shows an example of resulting user interface 1606-3, which replaces fit test user interface 1606-2. Resulting user interface 1606-3 includes indicators 1624-1 and 1624-2 of acoustic seal quality between earbud 502-1 and ear 528-1, and between earbud 502-2 and ear 528-2, respectively. The (e.g., black or red) color of indicators 1624-1 and 1624-2 indicates that the acoustic seals of earbuds 502 do not meet seal quality threshold criteria. The poor seal between earbuds 502 and the user's ears is further illustrated by indicators 1624-1 and 1624-2 being below (e.g., far below) seal quality threshold markers 1620-1 and 1620-2, respectively. In addition, the seal quality of earbud 502-1 relative to the seal quality of earbud 502-2 is indicated by the (e.g., slightly) different vertical positions of indicators 1624-1 and 1624-2. Resulting user interface 1606-3 also includes instruction 1625-1, which states: "Both tips have a poor seal, which may result in reduced audio performance. Try adjusting the earbuds." Results user interface 1606-3 further includes button 1626 labeled "Test Again" for repeating the fit test, and button 1627 labeled "Done" to exit the fit test user interface.

Figure 16E:
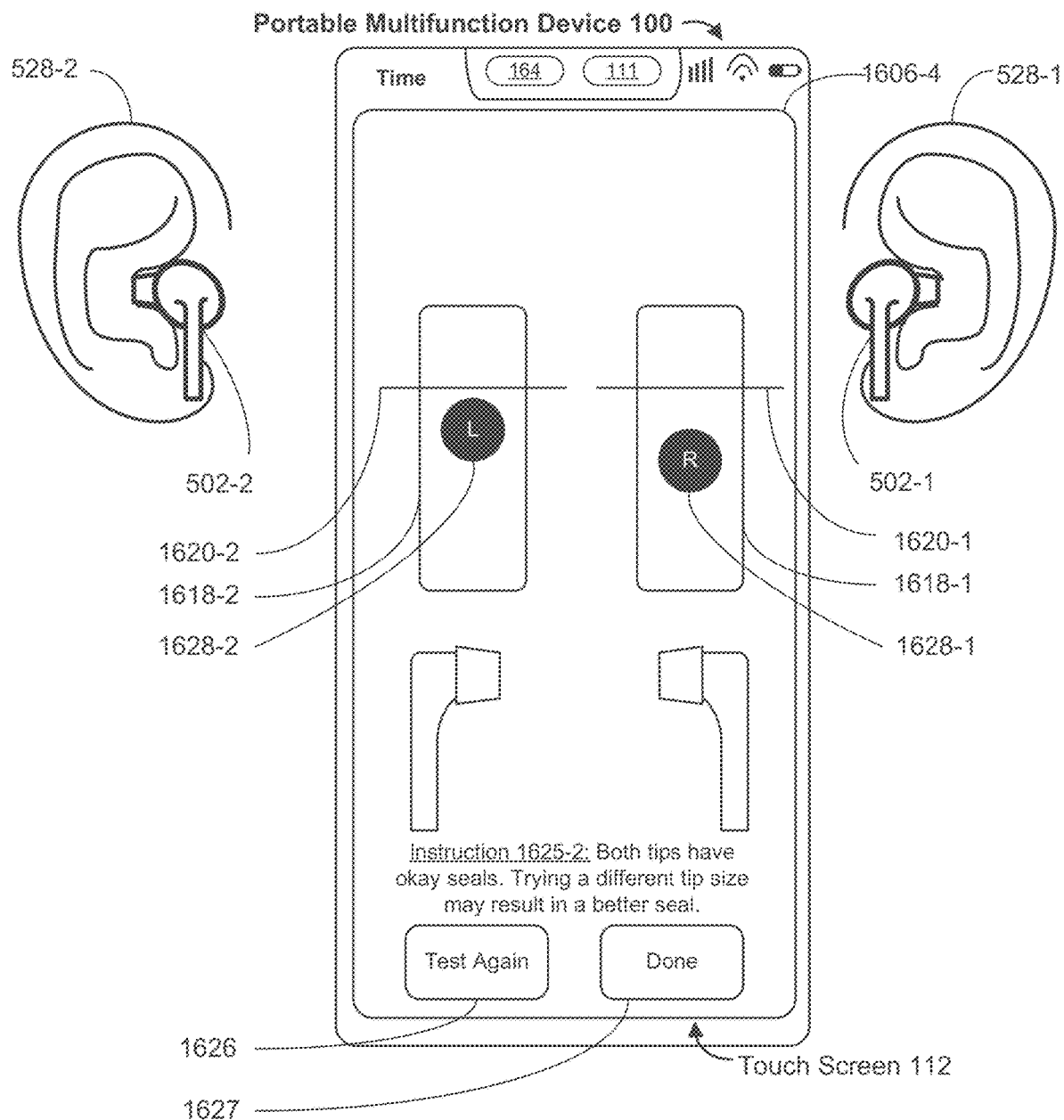

FIG. 16E shows another example of resulting user interface 1606-4. In some embodiments, resulting user interface 1606-4 illustrates a transition from fit test user interface 1606-2. In some embodiments, resulting user interface 1606-4 is displayed in response to activation of "Test Again" button 1626 in FIG. 16D, and optionally also in response to detecting adjustment (e.g., removal and replacement) of one or both earbuds 502 prior to activation of button 1626. Resulting user interface 1606-4 includes indicators 1628-1 and 1628-2 of acoustic seal quality between earbud 502-1 and ear 528-1, and between earbud 502-2 and ear 528-2, respectively. The (e.g., black, red, or yellow) color of indicators 1628-1 and 1628-2 indicates that the acoustic seals of earbuds 502 do not meet seal quality threshold criteria, but optionally is a different color than indicators of poor acoustic seals. The mediocre seal quality between earbuds 502 and the user's ears is further illustrated by the position of indicators 1628-1 and 1628-2 below but within a threshold distance of seal quality threshold markers 1620-1 and 1620-2, respectively (e.g., within a middle region, vertically, of seal quality scales 1618). In addition, the seal quality of earbud 502-1 relative to the seal quality of earbud 502-2 is indicated by the different vertical positions of indicators 1628-1 and 1628-2. Resulting user interface 1606-4 also includes instruction 1625-2, which states: "Both tips have okay seals. Trying a different size tip size may result in a better seal." Results user interface 1606-4 also includes button 1626 labeled "Test Again" and button 1627 labeled "Done."

Figure 16F:
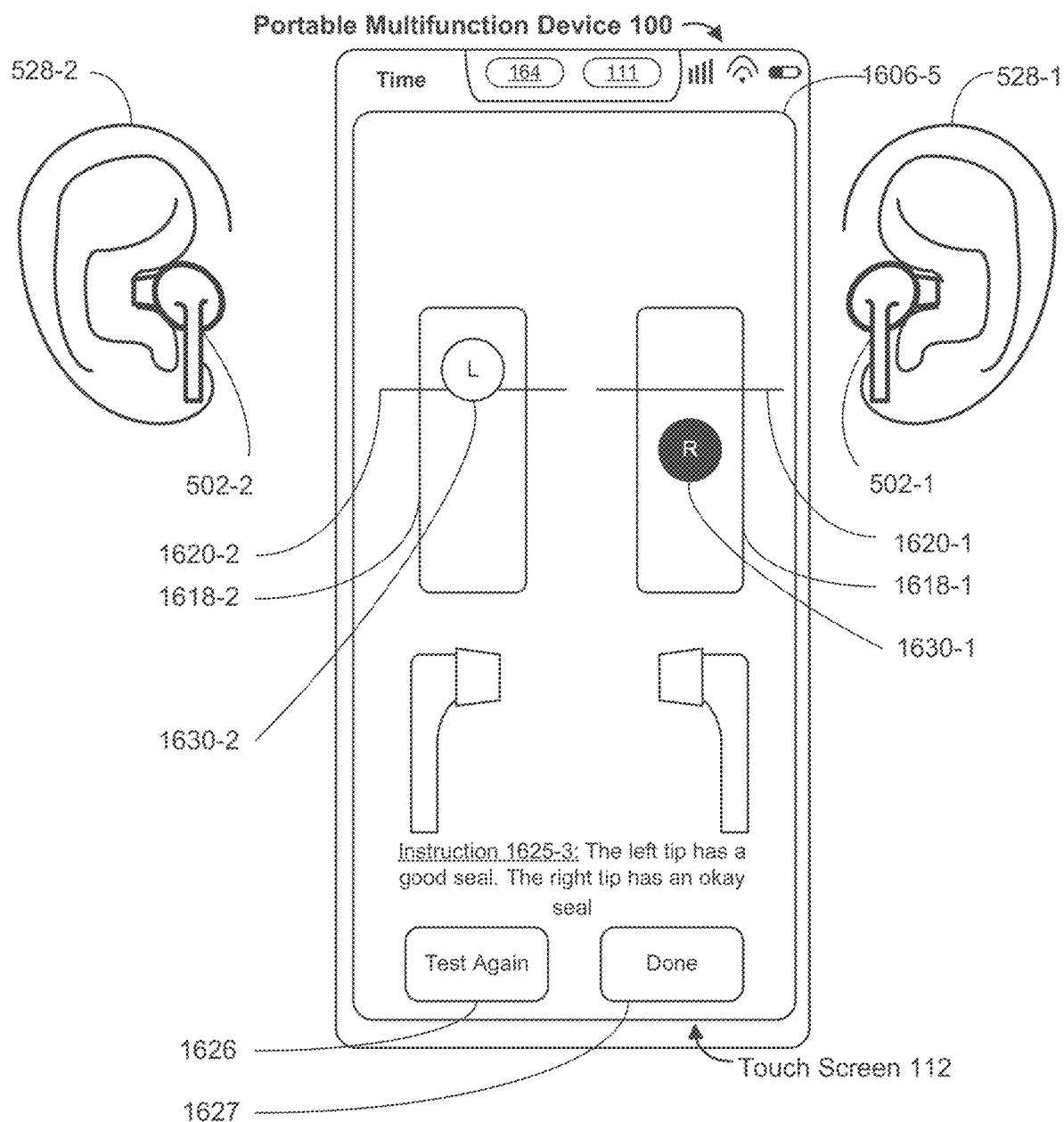

FIG. 16F shows yet another example of resulting user interface 1606-5. In some embodiments, resulting user interface 1606-5 replaces fit test user interface 1606-2. In some embodiments, resulting user interface 1606-5 is displayed in response to activation of "Test Again" button 1626 in FIG. 16D or 16E, and optionally also in response to detecting adjustment (e.g., removal and replacement) of one or both earbuds 502 prior to activation of button 1626. Resulting user interface 1606-5 includes instruction 1625-3, which states: "The left tip has a good seal. The right tip has an okay seal." Resulting user interface 1606-5 also includes indicators 1630-1 and 1630-2 of acoustic seal quality between earbud 502-1 and ear 528-1, and between earbud 502-2 and ear 528-2, respectively. Additionally, one or more properties of indicators 1630-1 and 1630-2 provide a visual indication of their respective seal qualities. The "okay" seal of earbud 502-2 is indicated by the color (e.g., black, or yellow) of indicator 1630-1 and the position of indicator 1630-1 below the threshold marker 1620-1. The "good" seal of earbud 502-2 is indicated by the white color of indicator 1630-2 (optionally, another color, such as green, that is different from the color(s) used for "okay" and "poor" seals, could be used instead to indicate that the seal is "good"), and by the position of indicator 1630-2 above threshold marker 1620-2 (e.g., indicated by more than half of indicator 1630-2 being above threshold marker 1620-2 or by a centroid of indicator 1630-2 being above threshold marker 1620-2). In addition, the seal quality of earbud 502-1 relative to the seal quality of earbud 502-2 is indicated by the different vertical positions of indicator 1630-1 and 1630-2. Results user interface 1606-5 also includes button 1626 labeled "Test Again" and button 1627 labeled "Done."

Figure 16G:
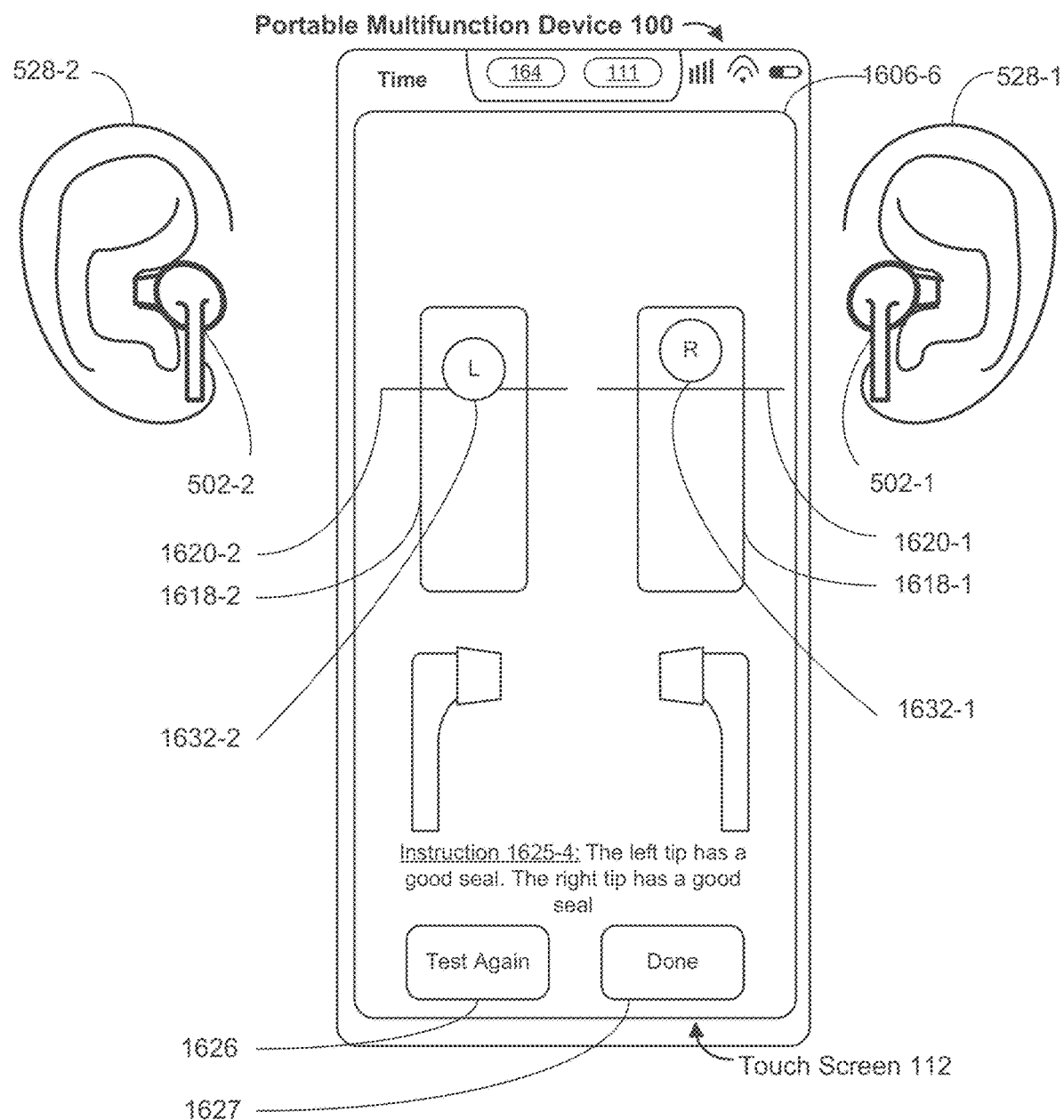

FIG. 16G shows another example of resulting user interface 1606-6. In some embodiments, resulting user interface 1606-6 replaces fit test user interface 1606-2. In some embodiments, resulting user interface 1606-6 is displayed in response to activation of "Test Again" button 1626 in FIG. 16D, 16E, or 16F, and optionally also in response to detecting adjustment (e.g., removal and replacement) of one or both earbuds 502 prior to activation of button 1626. Resulting user interface 1606-5 includes instruction 1625-4, which states: "The left tip has a good seal. The right tip has a good seal." Resulting user interface 1606-6 also includes indicators 1632-1 and 1632-2 of acoustic seal quality between earbud 502-1 and ear 528-1, and between earbud 502-2 and ear 528-2, respective. Additionally, one or more properties of indicators 1632-1 and 1632-2 provide a visual indication of their respective seal qualities. The "good" seals between both earbuds 502 and the user's ears is indicated by the white color of indicators 1632 (optionally, another color, such as green, that is different from the color(s) used for "okay" and "poor" seals, could be used instead), and by the positions of indicators 1632-1 and 1632-2 above threshold markers 1620-1 and 1620-2, respectively. In addition, the seal quality of earbud 502-1 relative to the seal quality of earbud 502-2 is indicated by the different vertical positions of indicator 1632-1 and 1632-2. Results user interface 1606-6 also includes button 1626 labeled "Test Again" and button 1627 labeled "Done."

In some embodiments, each time the user requests that the fit test be repeated (e.g., by activating "Test Again" button 1626 in any of FIGS. 16D-16G, FIG. 16C is optionally redisplayed, and an updated resulting user interface similar to those shown in FIGS. 16D-16G is displayed.

FIGS. 17A-17J illustrate example user interfaces and user interactions for changing the audio output mode of a wearable audio output device selected via a wearable electronic device such as a watch.

Figure 17A:
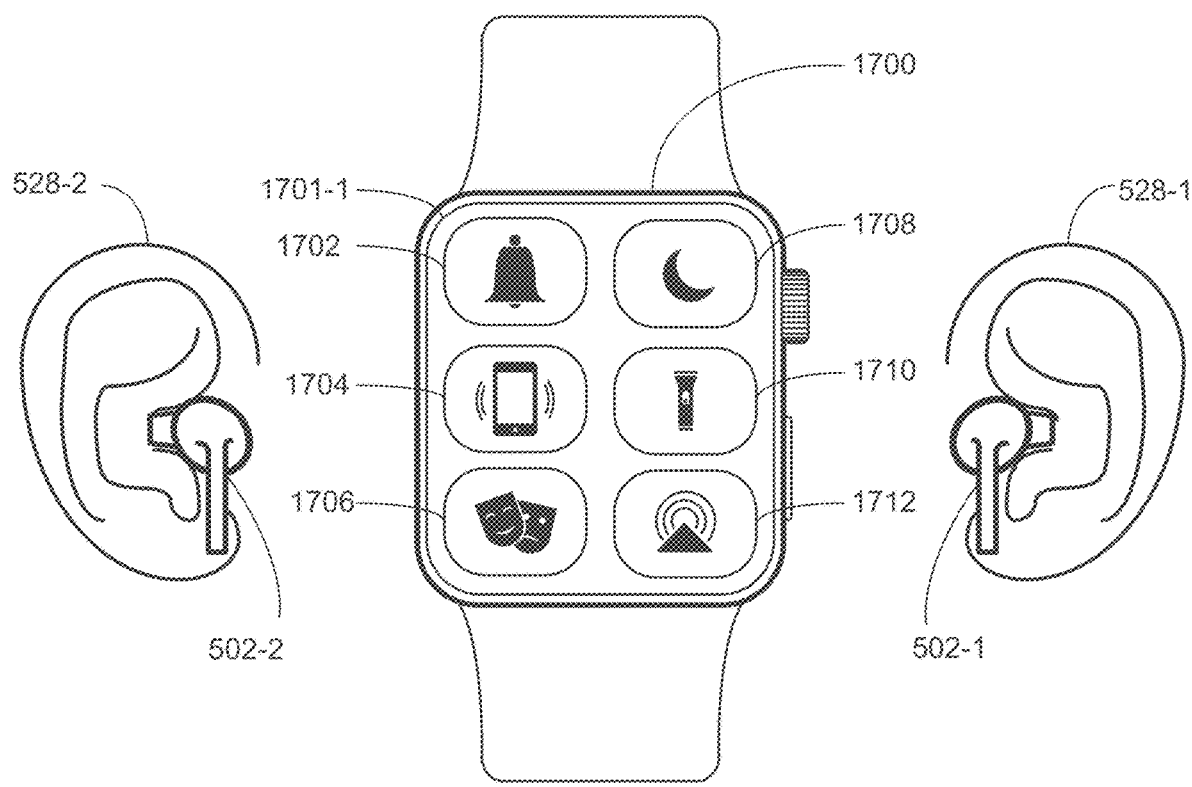
FIGS. 17A-17J illustrate example user interfaces and user interactions for selecting an audio output device, such as a wearable audio output device, and changing the audio output mode of the selected audio output device via a wearable electronic device in accordance with some embodiments.

FIG. 17A shows control panel user interface 1701-1, displayed on a display of watch 1700, for controlling various aspects of watch 1700. Control panel user interface 1701-1 provides a user with access to a plurality of controls. In some embodiments, due to limited display area on watch 1700, some of the controls are displayed (e.g., in an array or list), as shown for example in FIG. 17A, and other controls are not displayed. In some embodiments, the plurality of controls are part of a scrollable region, such that in some embodiments any controls not displayed can be accessed by scrolling (e.g., the scrollable region of) control panel user interface 1701-1 (e.g., in response to which one or more additional controls are displayed and one or more (e.g., a corresponding number of) currently-displayed controls cease to be displayed (e.g., due to no longer being within the displayed subset of the plurality of controls)). In the example shown in FIG. 17A, the displayed controls in control panel user interface 1701-1 include:

control 1702 for toggling silencing of audio outputs of watch 1700;

control 1704 for causing another device (e.g., a phone) to alert the user of the location of the other device;

a theater mode control 1706 for toggling whether the display of watch 1700 turns on automatically in response to watch 1700 being lifted (e.g., as the user lifts the arm on which watch 1700 is worn);

a do-not-disturb control 1708 for toggling silencing of notifications;

a flashlight control 1710 for toggling a flashlight function; and audio output control 1712 for controlling various aspects of audio outputs from the wearable watch device.

FIG. 17A also shows earbuds 502-1 and 502-2 placed in ears 528-1 and 528-2 of the user, respectively.

Figure 17B:
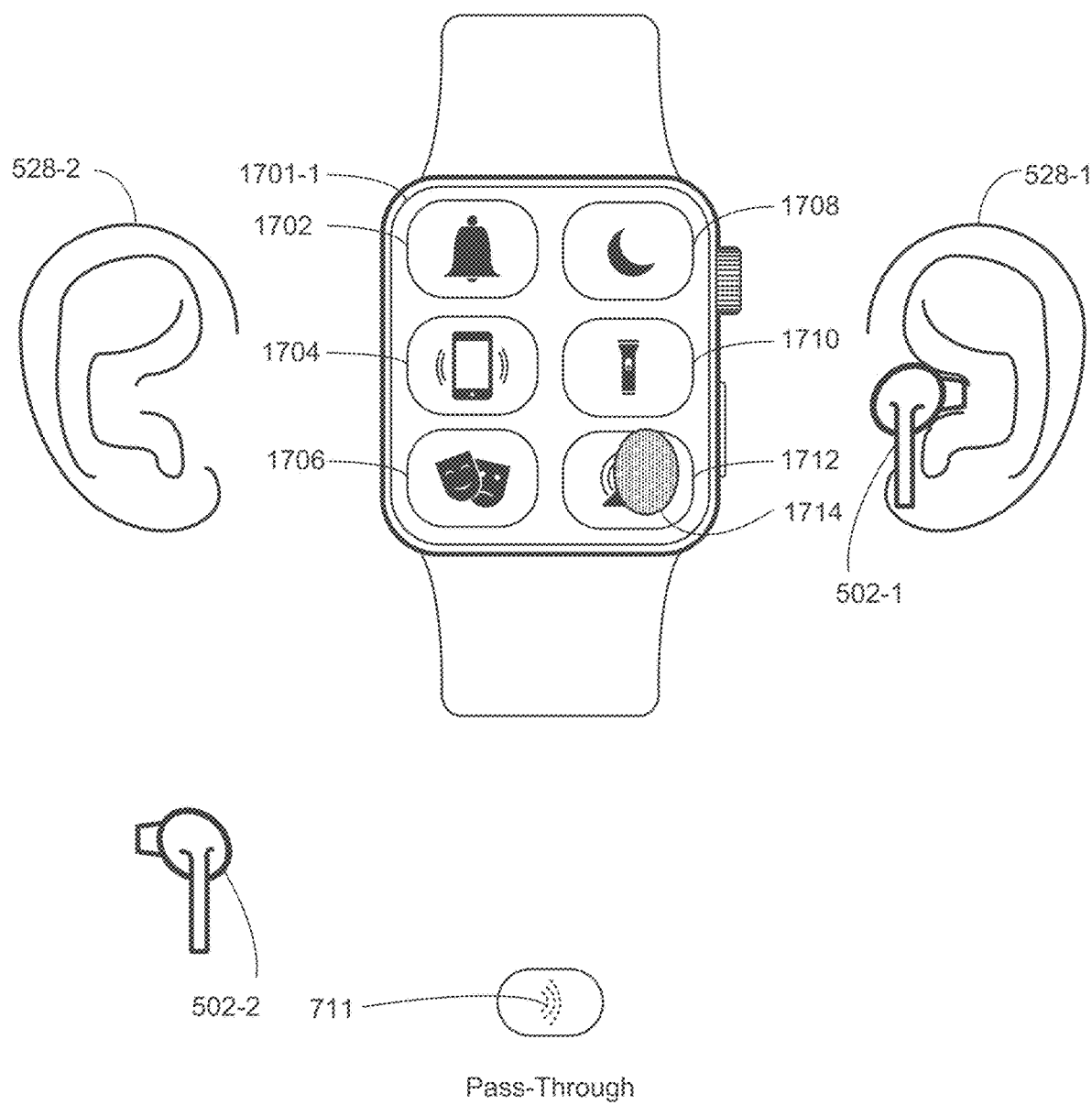

FIG. 17B illustrates the same user interface 1701-1 as shown in FIG. 17A. FIG. 17B also illustrates user input 1714 (e.g., a tap gesture) over displayed audio output control 1712 while earbud 502-2 is removed from ear 528-2 of the user, and while the current audio output mode of earbuds 502 is the pass-through mode, as represented by pass-through icon 711.

Figure 17C:
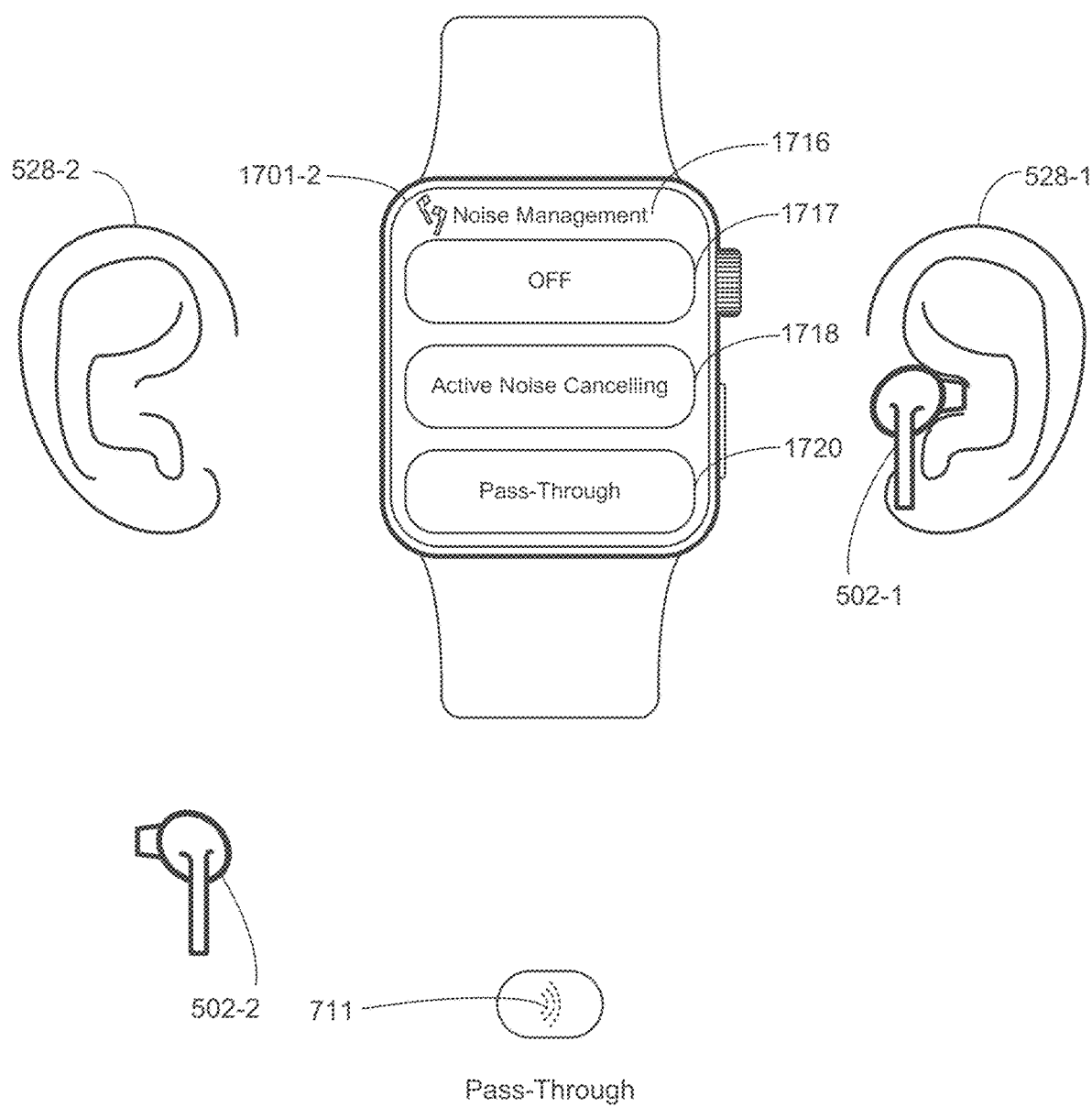

FIG. 17C shows audio output user interface 1701-2 that is displayed in response to input 1714 over audio output control 1712 (FIG. 17B). User interface 1701-2 includes a plurality (e.g., a list or array) of audio output controls for controlling various aspects of how audio is output from watch 1700. In some embodiments, the plurality of audio output controls are part of a scrollable region in user interface 1701-2, such that in some embodiments at least some of the plurality of audio controls are displayed, and any audio output controls not displayed can be accessed by scrolling (e.g., the scrollable region of) user interface 1701-2 to reveal more controls (e.g., and to scroll some currently-displayed controls away). As shown in FIG. 17C, a displayed portion of user interface 1701-2 includes, in noise management portion 1716, noise management controls for controlling the audio output mode of earbuds 502, which are the currently-selected audio output devices for watch 1700. Specifically, noise management portion 1716 of user interface 1701-2 displays controls that in some embodiments perform analogous functions to those shown in the enhanced audio control user interface shown in FIG. 14C. The controls in noise management portion 1716 include buttons for each of three available audio output modes for earbuds 502, including bypass ("OFF") button 1717, active noise control button 1718, and pass-through button 1720. Active noise control button 1718 corresponds to the active noise control audio output mode, bypass ("OFF") button 1717 corresponds to the bypass audio output mode, and pass-through button 1720 corresponds to the pass-through audio output mode, which is the mode in which earbuds 502 are currently operating (e.g., as represented by pass-through icon 711). In some embodiments, the pass-through button may be shown in a different color (e.g., blue) or highlighted to indicate that it is the currently-selected audio output mode.

Figure 17D:
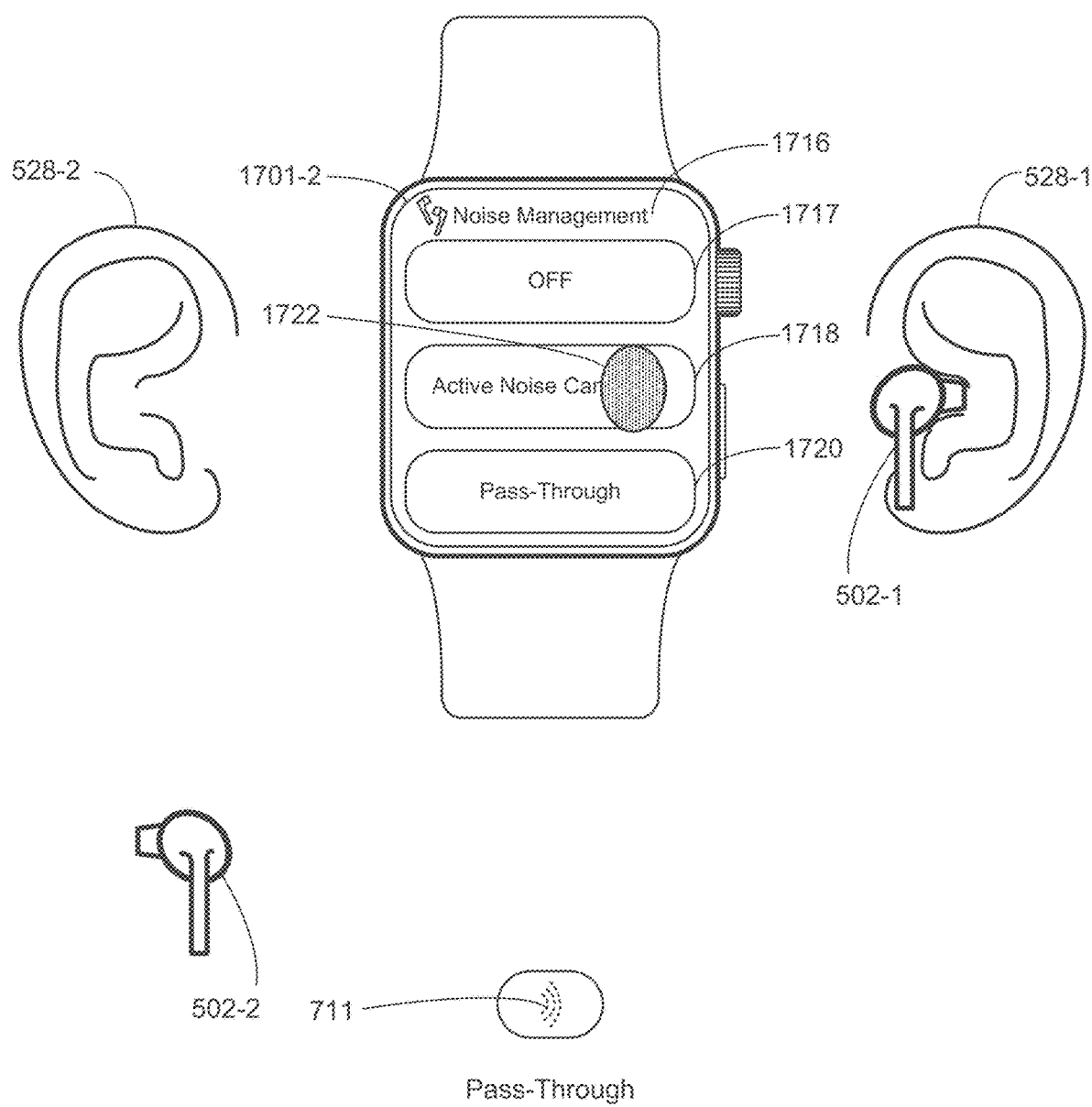

FIG. 17D illustrates that, while earbud 502-2 is removed from ear 528-2 of the user, input 1722 (e.g., a tap gesture) over the active noise control button 1718 is received at watch 1700.

Figure 17E:
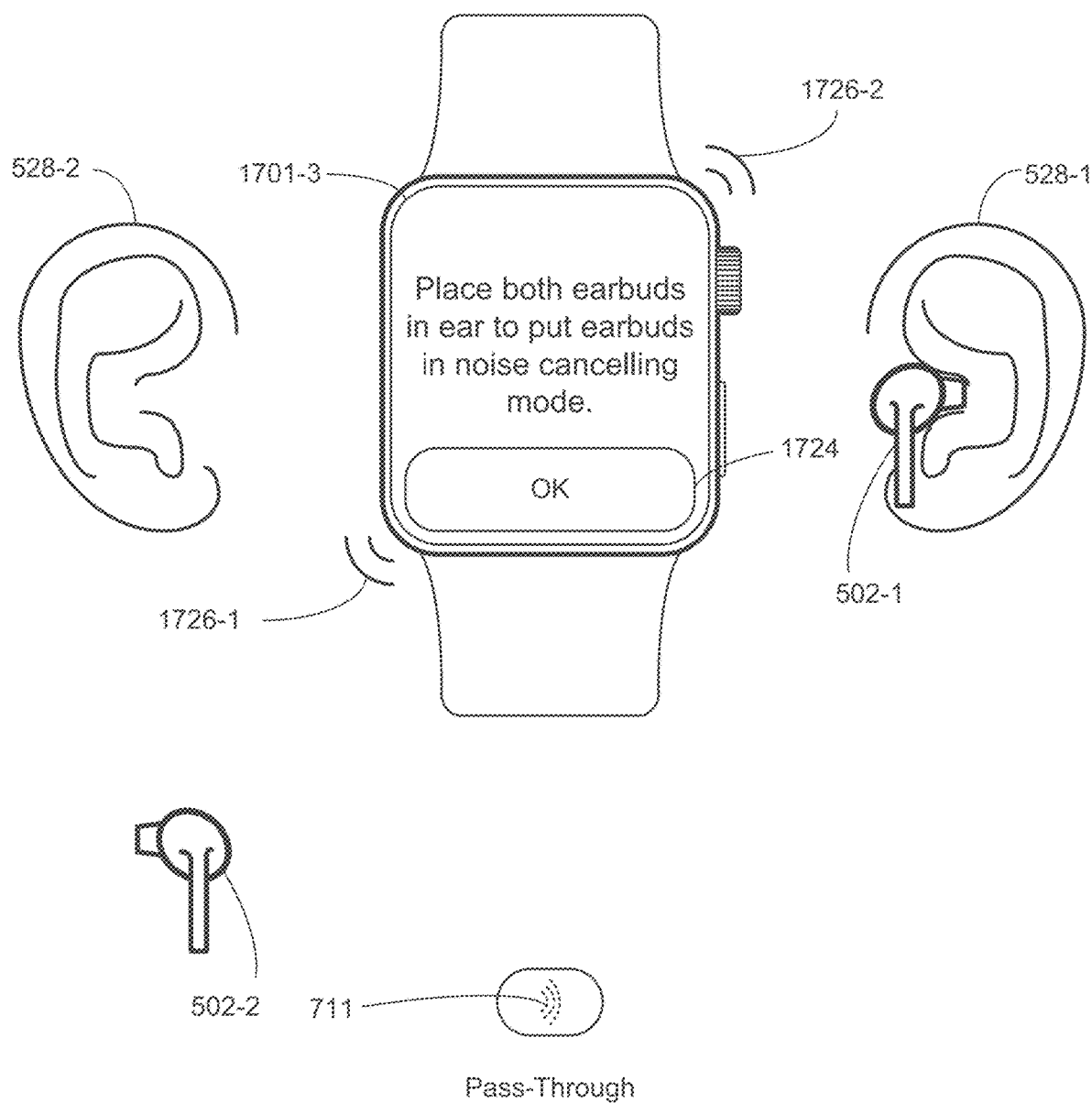

FIG. 17E shows user interface 1701-3 displayed in response to input 1722 over the active noise control button 1718 in FIG. 17D. Since one of the earbuds (e.g., earbud 502-2) is removed from the user's ears (e.g., and since the accessibility mode is not enabled), earbuds 502 are not transitioned to the active noise control mode as requested but instead remain in the pass-through mode. User interface 1701-3 accordingly includes a visual alert, which states, "Place both earbuds in ear to put earbuds in noise cancelling mode." In combination with the visual alert, watch 1700 optionally also provides tactile feedback 1726, as indicated by elements 1726-1 and 1726-2. User interface 1701-3 also includes "OK" button 1725 for dismissing the visual alert.

Figure 17F:
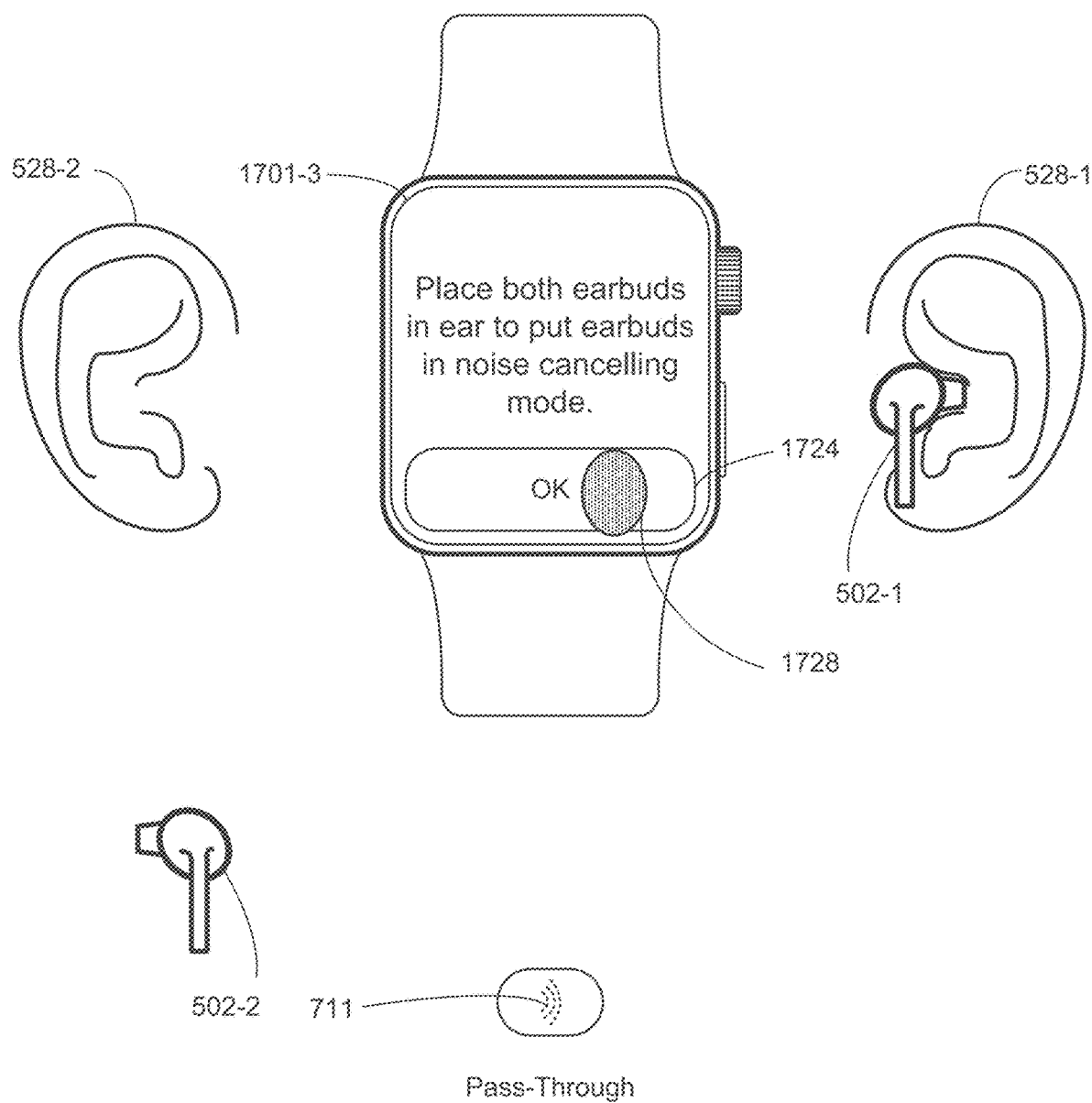

FIG. 17F shows input 1728 over "OK" button 1725 to dismiss the visual alert without replacing earbud 502-2 in ear 528-2.

Figure 17G:
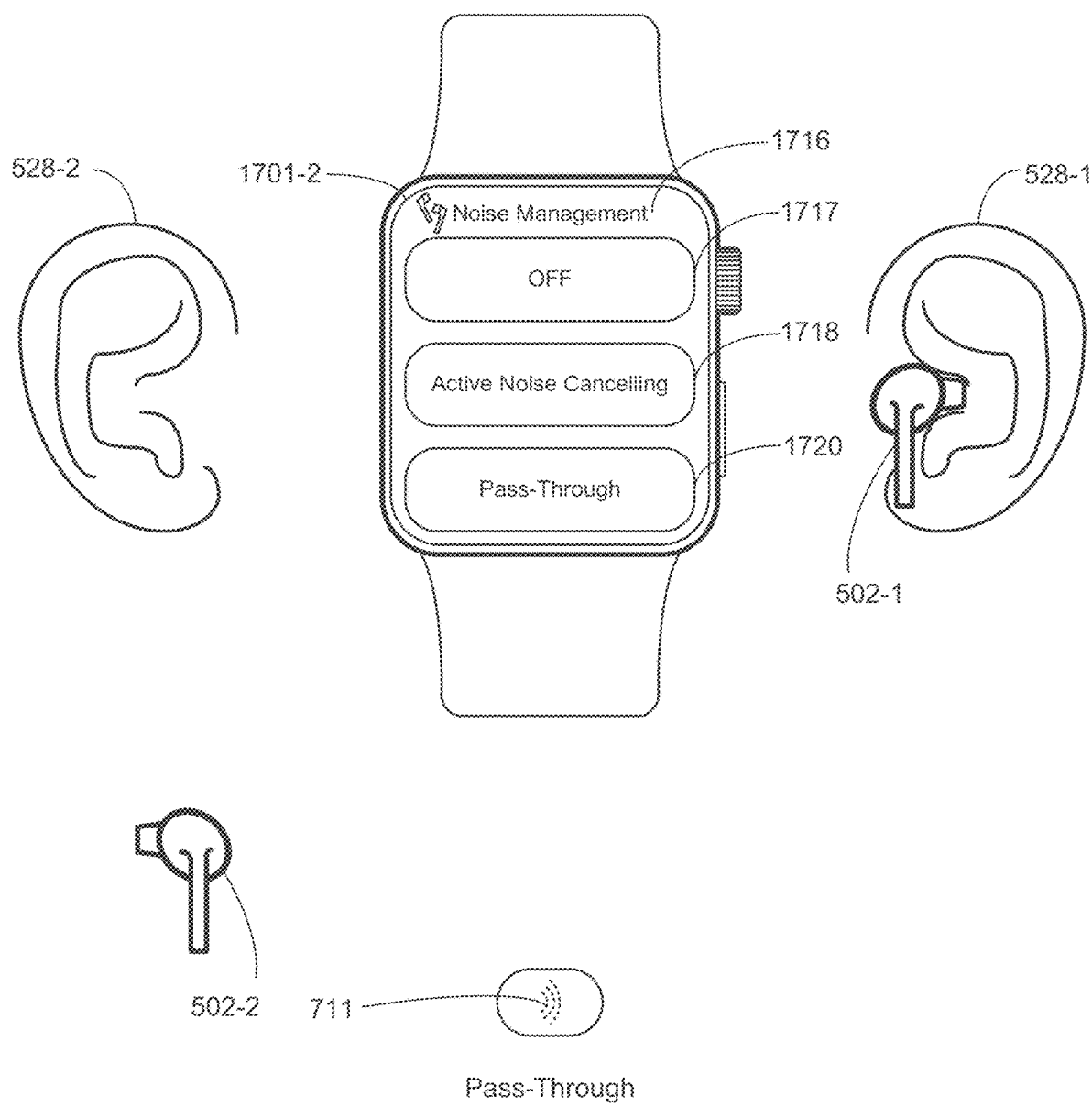

FIG. 17G shows user interface 1701-2 redisplayed in accordance with dismissing the visual alert shown in FIGS. 17E-17F and in response to input 1728. FIG. 17G also shows that, as indicated by pass-through icon 711, the pass-through mode is still the audio output mode in which earbuds 502 are operating, because earbud 502-2 was not replaced in ear 528-2, and thus earbuds 502 did not transition to the active noise control mode. In some embodiments, had earbud 502-2 been placed in ear 528-2 (e.g., while earbud 502-1 was maintained in ear 528-1) while the visual alert shown in FIG. 17E was displayed, earbuds 502 would have transitioned to the active noise control mode in response.

Figure 17H:
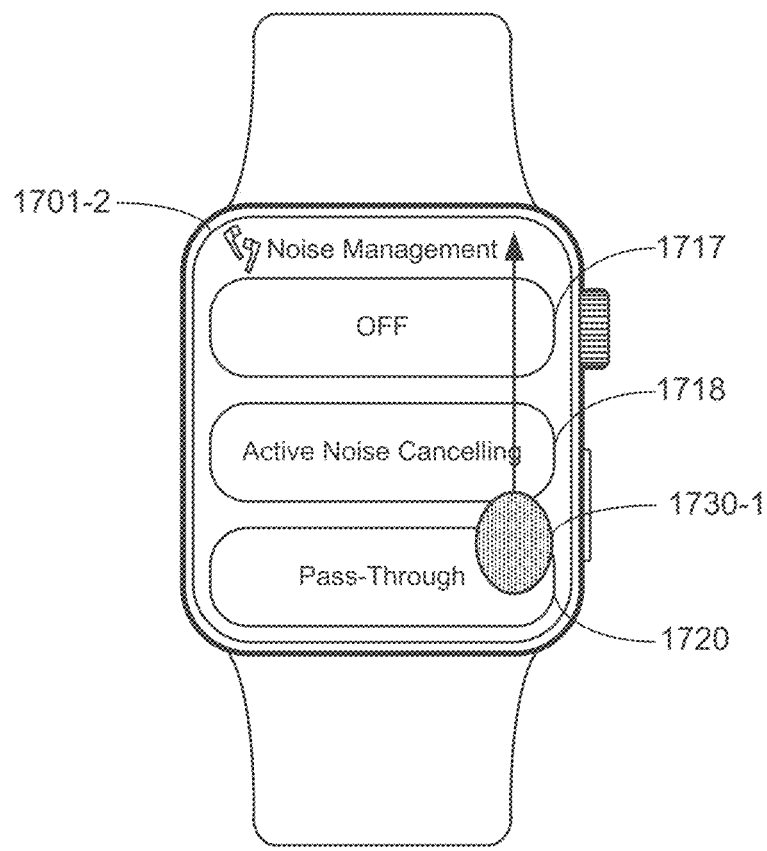
Figure 17I:
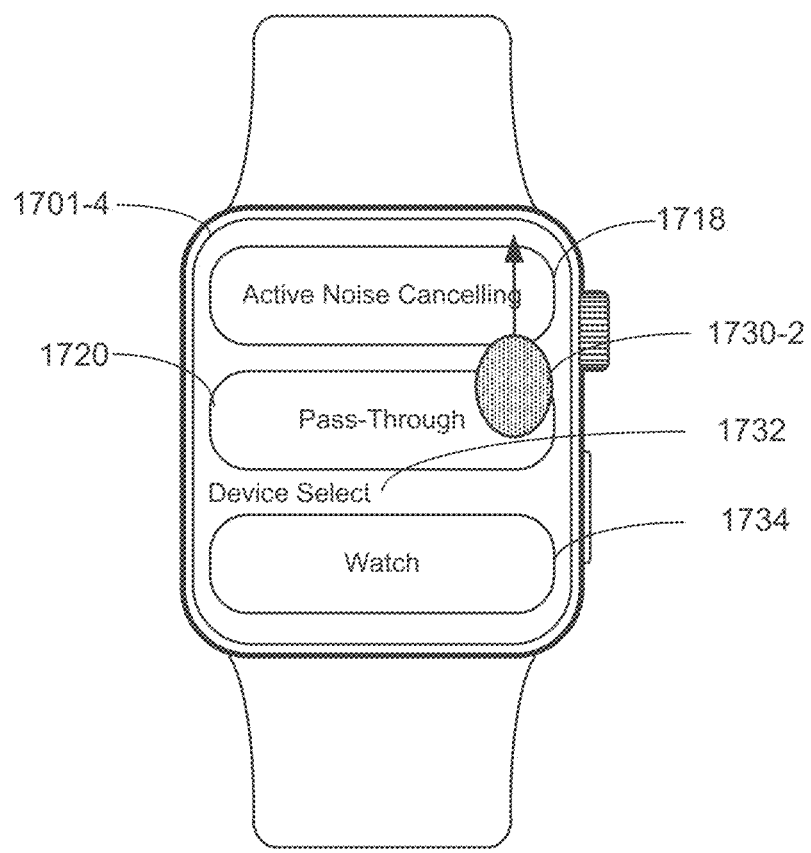
Figure 17J:
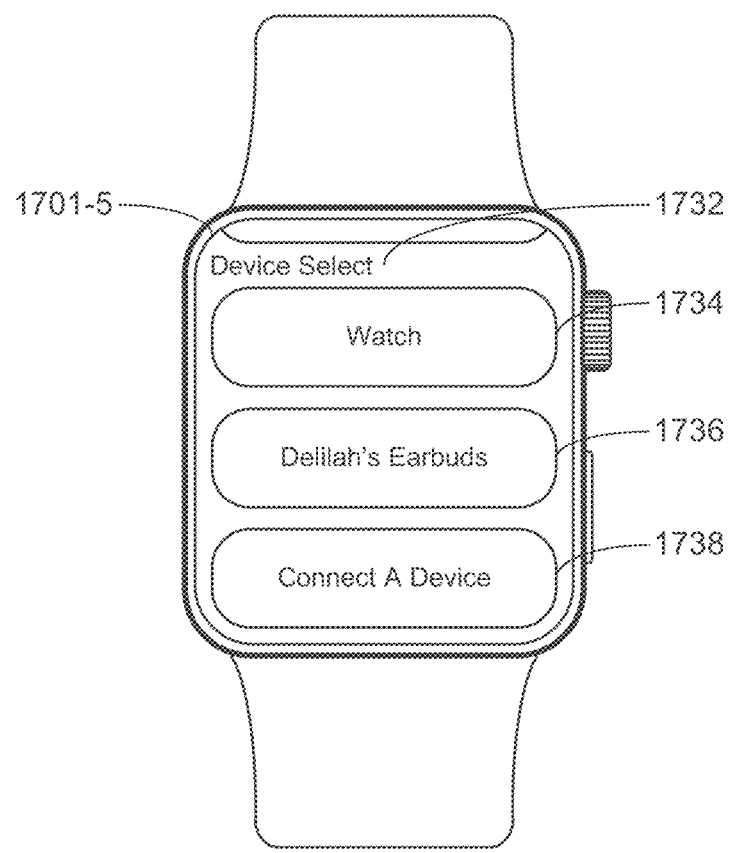
Figure 18A:
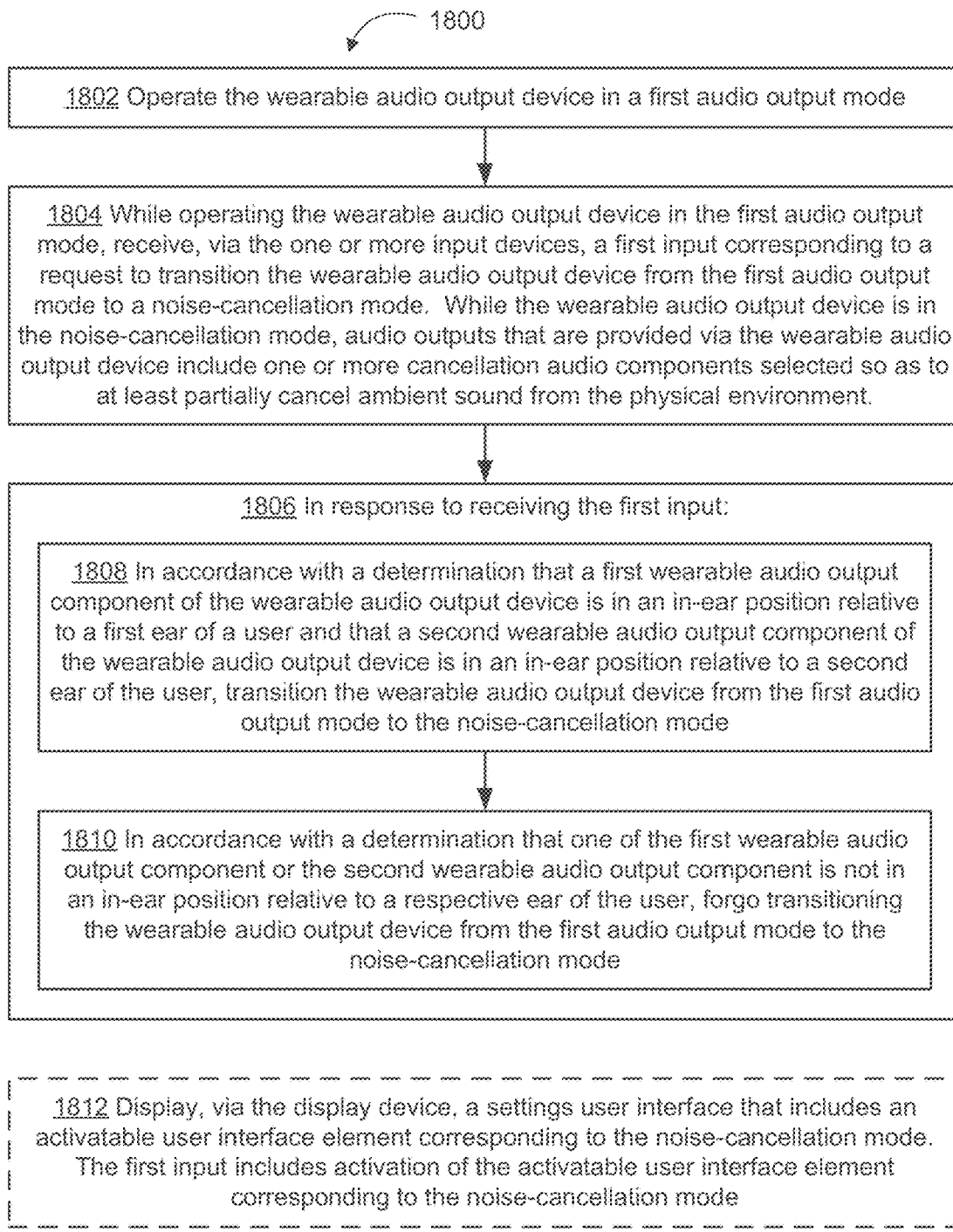

FIGS. 17H-17J illustrate display of additional audio output controls within audio output user interface 1701-2. FIG. 17H illustrates drag input 1730-1 at user interface 1701-2. In response to the movement of drag input 1730-1, FIG. 17I illustrates display of a first portion of output device selection portion 1732 (e.g., labeled "Device Select") of user interface 1701-4. The first portion of output device selection portion 1732 includes first selectable option 1734, which when selected configures watch 1700 to output audio using one or more speakers in watch 1700 (e.g., internal speakers). FIG. 17I also indicates continued movement of drag input 1730-1. In response to the continued movement of drag input 1730-1 indicated in FIG. 17I, FIG. 17J illustrates display of an additional portion (e.g., the entirety) of output device selection portion 1732, which includes, in addition to first selectable option 1734, second selectable option 1736, which when selected configures watch 1700 to output audio using paired earbuds 502, and third selectable option 1738, which when selected initiates a process to wirelessly connect to watch 1700 an external device with which to output audio.

FIGS. 18A-18H are flow diagrams illustrating method 1800 of controlling audio output mode of a wearable audio output device in accordance with some embodiments. Method 1800 is performed at a computer system that includes a wearable audio output device (e.g., wearable audio output device 301, FIG. 3B) that is in a physical environment and one or more input devices (e.g., an input device that is part of the wearable audio output device, such as input device 308 (FIG. 3B), and/or an input device that is touch-sensitive and that in some embodiments is part of a separate electronic device that is also included in the computer system, such as touch-sensitive display system 112 of portable multifunction device 100 in FIG. 1A or display 340 of device 300 in FIG. 3A). Some operations in method 1800 are, optionally, combined and/or the order of some operations is, optionally, changed.

As described below, method 1800 conditionally transitions a wearable audio output device to a noise-cancellation mode in response to a request to transition to the noise-cancellation mode if both wearable audio output components (e.g., earbuds) of the wearable audio output device are in-ear, but does not transition the wearable audio output device to the noise-cancellation mode if at least one component is not in-ear. Operating the wearable audio output device in the noise-cancellation mode while both components are in-ear enables audio to be played at a lower volume to produce the same effective audio volume perceived by the user (e.g., relative to when hearing ambient sound interferes with the user's ability to hear the desired audio, which may cause the user to increase the audio output volume). However, operating the wearable audio output device in the noise-cancellation mode while only one component is in-ear results in undesired acoustic effects from noise-cancellation being performed with respect to only one ear (e.g., ambient sound will be heard by the ear in which a component has not been placed, regardless of how effectively ambient sound is cancelled with respect to the ear in which a component has been placed), and may result in excessive power usage by the wearable audio output device while attempting to cancel ambient sound that cannot be canceled due to lack of an acoustic seal by the component that is not in-ear. Requiring both components to be in-ear in order to transition the wearable audio output device to the noise-cancellation mode, and forgoing transitioning the wearable audio output device to the noise-cancellation mode if at least one component is not in-ear, avoids the undesired acoustic effects of operating the wearable audio output device in the noise-cancellation mode while only one component is in-ear. Preventing operation of the wearable audio output device in an audio output mode that is incompatible with the in-ear status of the wearable audio output components enhances the operability of the device and makes the user-device interface more efficient (e.g., by reducing user mistakes when operating/interacting with the device), which, additionally, reduces power usage and improves battery life of the device by enabling the user to use the device more quickly and efficiently.

The computer system operates (1802) the wearable audio output device in a first audio output mode (e.g., an audio output mode other than a noise-cancellation mode). While operating the wearable audio output device in the first audio output mode (1804), the computer system receives, via the one or more input devices, a first input corresponding to a request to transition the wearable audio output device from the first audio output mode to a noise-cancellation mode (e.g., from an audio output mode other than the noise-cancellation mode). While the wearable audio output device is in the noise-cancellation mode (e.g., an active noise control mode), audio outputs that are provided via the wearable audio output device include one or more cancellation audio components selected (e.g., generated) so as to at least partially cancel ambient sound from the physical environment (e.g., the ambient sound being detected using one or more microphones of the wearable audio output device (e.g., microphone(s) 302, FIG. 3B, and canceled as described herein with reference to FIG. 3C). Examples of the first input corresponding to a request to transition the wearable audio output device from the first audio output mode to a noise-cancellation mode include input 1404 in FIG. 14D, input 1412 in FIG. 14K, input 1428 in FIG. 14W, input 1430 in FIG. 14Y, and input 1722 in FIG. 17D.

In response to receiving the first input (1806): in accordance with a determination that a first wearable audio output component of the wearable audio output device is in an in-ear position relative to a first ear of a user and that a second wearable audio output component of the wearable audio output device is in an in-ear position relative to a second ear of the user, the computer system transitions (1808) the wearable audio output device from the first audio output mode to the noise-cancellation mode; and, in accordance with a determination that one of the first wearable audio output component or the second wearable audio output component is not in an in-ear position relative to a respective ear of the user (e.g., one of the wearable audio output components is detected as being in-ear and the other is not detected as being in-ear, or neither wearable audio output component is detected as being in-ear), the computer system forgoes (1810) transitioning the wearable audio output device from the first audio output mode to the noise-cancellation mode. For example, in response to input 1412 in FIG. 14K or input 1428 in FIG. 14W, received while earbuds 502 are both in ears 528 of the user, earbuds 502 are transitioned to the active noise control mode. In contrast, in response to input 1404 in FIG. 14D, input 1430 in FIG. 14Y, or input 1722 in FIG. 17D while only earbud 502-1 is in-ear, earbuds 502 are not transitioned to the active noise control mode.

In some embodiments, the computer system includes a display device (e.g., touch-sensitive display system 112 in FIG. 1A or display 340 in FIG. 3A) and displays (1812), via the display device, a settings user interface that includes an activatable user interface element corresponding to the noise-cancellation mode (e.g., an activatable icon or button, optionally including a graphical and/or textual representation of the noise-cancellation mode). In some embodiments, the first input (e.g., corresponding to the request to transition the wearable audio output device to the noise-cancellation mode) includes activation of (e.g., or a request to activate) the activatable user interface element corresponding to the noise-cancellation mode. For example, input 1404 in FIG. 14D and input 1412 in FIG. 14K include (e.g., attempted) activation of active noise control icon 709 corresponding to the active noise control audio output mode, and input 1722 in FIG. 17D includes (e.g., attempted) activation of active noise control button 1718.

Providing a control option for selecting the noise-cancellation mode in a settings user interface provides the user with access to control over audio output mode without requiring the user to navigate through complex settings menu hierarchies. Reducing the number of inputs needed to access the control options enhances the operability of the device and makes the user-device interface more efficient (e.g., by helping the user to achieve an intended outcome and reducing user mistakes when operating/interacting with the device), which, additionally, reduces power usage and improves battery life of the device by enabling the user to use the device more quickly and efficiently.

In some embodiments, the wearable audio output device includes (1814) a respective input device (e.g., of the one or more input devices) (e.g., an input device 308, FIG. 3B), and the first input (e.g., corresponding to the request to transition the wearable audio output device to the noise-cancellation mode) includes a predefined gesture detected via the respective input device of the wearable audio output device (e.g., a squeeze gesture, such as a long squeeze gesture, via a stem of an earbud). For example, input 1428 in FIG. 14W and input 1430 in FIG. 14Y are click-and-hold (also called "long squeeze" gestures_received via stem 801 of earbud 502-1. Optionally, the computer system is configured such that the predefined gesture transitions the wearable audio output device through a set of (e.g., one or more) predefined audio output modes, and the noise-cancellation mode is a next mode, in the set of audio output modes, following the current audio output mode in which the wearable audio output device is being operated when the predefined gesture is detected. In some embodiments, while both wearable audio output components are in in-ear positions relative to respective ears of the user, the set of predefined audio output modes includes a pass-through mode, in which audio outputs that are provided via the wearable audio output device include one or more pass-through audio components that include at least a portion of ambient sound from the physical environment, and the noise-cancellation mode. In some embodiments, while one wearable audio output component is in an in-ear-position relative to a first ear of the user and the other wearable audio output component is not in an in-ear position relative to a second ear of the user, the set of predefined audio output modes includes the pass-through mode and a noise control off mode, in which audio outputs that are provided via the wearable audio output device include neither any pass-through audio components nor any cancellation audio components (e.g., the noise control off mode replaces the noise-cancellation mode in the set of predefined audio output modes while only one wearable audio output component is in-ear, as opposed to when both wearable audio output components are in-ear). In some embodiments, the noise-cancellation mode is included in the set of predefined audio output modes while both wearable audio output components are in-ear and removed from the set of predefined audio output modes while only one wearable audio output component is in-ear.

Enabling selection of the noise-cancellation mode using a particular type of gesture via an input device of the wearable audio output device provides quick access to control options for controlling audio output mode without requiring the controls to be displayed on a displayed user interface, thus reducing the amount of time that a display device needs to be powered on, thereby reducing power usage and improving battery life of the computer system. In addition, reducing the number of inputs needed to access the control options enhances the operability of the device and makes the user-device interface more efficient (e.g., by helping the user to achieve an intended outcome and reducing user mistakes when operating/interacting with the device), which, additionally, reduces power usage and improves battery life of the device by enabling the user to use the device more quickly and efficiently.

In some embodiments, the first input is received (1816) while the predefined gesture is associated with one or more noise control operations (e.g., while the computer system is configured such that the predefined gesture transitions the wearable audio output device through a set of predefined audio output modes), and: the computer system receives, via the one or more input devices, an input to associate the predefined gesture with (e.g., an operation invoking) a virtual assistant (e.g., and to dissociate the predefined gesture from the one or more noise control operations); while the predefined gesture is associated with the virtual assistant, the computer system receives, via the respective input device of the wearable audio output device, a second input that includes the predefined gesture; and in response to receiving the second input, the computer system invokes the virtual assistant. For example, FIGS. 15A-15C illustrate associating click-and-hold gestures with a virtual assistant corresponding to option 909 instead of with noise management operations corresponding to option 913, and FIGS. 15D-15E illustrate subsequently invoking the virtual assistant using click-and-hold gesture 1504 on stem 801 of earbud 502-2. In some embodiments, invoking the virtual assistant is performed without performing any of the one or more noise control operations previously associated with the predefined gesture. However, in some embodiments where a respective audio output mode (e.g., pass-through mode) is associated with invoking or using the virtual assistant, transitioning the wearable audio output device to the respective audio output mode is performed in combination with or as part of invoking the virtual assistant.

Allowing a user to configure the operation that is performed in response to a particular type of gesture provides the user with flexibility to customize his or her interactions with the wearable audio output device (e.g., so that a preferred operation, such as one that the user performs more often, can be performed using the gesture via the wearable audio output device without requiring the user to navigate through complex settings menu hierarchies on a separate device, and so that the interactions are more intuitive for the user). Providing flexible and more intuitive user interactions for performing audio output control operations, and reducing the number of inputs needed to perform those operations, enhances the operability of the device and makes the user-device interface more efficient (e.g., by helping the user to achieve an intended outcome and reducing user mistakes when operating/interacting with the device), which, additionally, reduces power usage and improves battery life of the device by enabling the user to use the device more quickly and efficiently.

In some embodiments, the first input is received (1818) while the predefined gesture is associated with one or more noise control operations; transitioning the wearable audio output device from the first audio output mode to the noise-cancellation mode is performed (e.g., in accordance with the determination that the first wearable audio output component is in an in-ear position relative to the first ear of the user and that the second wearable audio output component is in an in-ear position relative to the second ear of the user and further) in accordance with a determination that the predefined gesture is associated with one or more noise control operations; and forgoing transitioning the wearable audio output device from the first audio output mode to the noise-cancellation mode is performed (e.g., in accordance with the determination that one of the first wearable audio output component or the second wearable audio output component is not in an in-ear position relative to a respective ear of the user and further) in accordance with the determination that the predefined gesture is associated with one or more noise control operations. For example, FIGS. 14W-14X illustrate changing audio output mode in response to click-and-hold gesture 1428 on stem 801 of earbud 502-1, without invoking a virtual assistant, while click-and-hold gestures are associated with noise management operations (e.g., in accordance with option 913 being selected and option 909 being deselected in FIG. 15A). In some embodiments, in response to receiving the first input, and in accordance with a determination that the predefined gesture is associated with a virtual assistant, the computer system invokes the virtual assistant. For example, FIGS. 15D-15E illustrate invoking a virtual assistant in response to click-and-hold gesture 1504 on stem 801 of earbud 502-2, in accordance with a determination that click-and-hold gestures are (e.g., now) associated with a virtual assistant (e.g., in accordance with option 909 being selected and option 913 being deselected in FIG. 15A). In some embodiments, invoking the virtual assistant is performed without performing any of the one or more noise control operations that alternatively could have been associated with the predefined gesture (e.g., forgoing transitioning the audio output mode of the wearable audio output device also occurs in combination with invoking the virtual assistant). However, in some embodiments where a respective audio output mode (e.g., pass-through mode) is associated with invoking or using the virtual assistant, transitioning the wearable audio output device to the respective audio output mode is performed in combination with or as part of invoking the virtual assistant.

Performing one or more noise control operations in response to a predefined gesture if the predefined gesture is detected while being associated with one or more noise control operations, versus invoking a virtual assistant in response to the predefined gesture if the predefined gesture is detected while being associated with the virtual assistant, provides the user with additional control options by allowing a same predefined gesture to be assigned to one of multiple different operations (e.g., so that a preferred operation, such as one that the user performs more often, can be assigned to and performed using the predefined gesture via the wearable audio output device without requiring the user to navigate through complex settings menu hierarchies on a separate device, and so that the interactions are more intuitive for the user). Providing flexible and more intuitive user interactions for performing audio output control operations, and reducing the number of inputs needed to perform those operations, enhances the operability of the device and makes the user-device interface more efficient (e.g., by helping the user to achieve an intended outcome and reducing user mistakes when operating/interacting with the device), which, additionally, reduces power usage and improves battery life of the device by enabling the user to use the device more quickly and efficiently.

In some embodiments, the computer system includes one or more tactile output generators (e.g., tactile output generator(s) 167 in FIG. 1A or tactile output generator(s) 357 in FIG. 3B), and, in response to receiving the first input, and in accordance with the determination that one of the first wearable audio output component or the second wearable audio output component is not in an in-ear position relative to a respective ear of the user (e.g., one or both wearable audio output components is/are not detected as being in-ear), the computer system provides (1820), via the one or more tactile output generators, a tactile output indicating that one of the first wearable audio output component or the second wearable audio output component is not in an in-ear position relative to a respective ear of the user (e.g., tactile output 1408 in FIG. 14E or tactile output 1726 in FIG. 17E). In some embodiments, the tactile output is provided (e.g., in accordance with the determination that one of the first wearable audio output component or the second wearable audio output component is not in an in-ear position and) in accordance with a determination that the first input is received via an input device that is separate from the wearable audio output device (e.g., the input device and tactile output generator(s) are part of a separate electronic device included in the computer system). For example, the tactile output is provided, via tactile output generator(s) of a phone, tablet, watch, or laptop, in response to inputs via a touch-sensitive surface of the phone, tablet, watch, or laptop (e.g., tactile output 1408 in FIG. 14E is provided in response to input 1404 (FIG. 14D) via device 100; and tactile output 1726 in FIG. 17E is provided in response to input 1722 (FIG. 17D) via watch 1700), but not in response to inputs via (e.g., a stem of) an earbud of the wearable audio output device (e.g., in embodiments where the wearable audio output device does not include any tactile output generators) (e.g., as indicated in FIG. 14Z, a tactile output is not generated in response to input 1430 (FIG. 14Y) via earbud 502-1).

Providing a tactile output indicating that a wearable audio output component is not in-ear in response to an input requesting to transition the wearable audio output device to the noise-cancellation mode provides non-visual feedback to the user indicating that an error condition is preventing performance of the user's requested operation. Providing improved feedback to the user that avoids cluttering the user interface with displayed alerts or that supplements displayed alerts enhances the operability of the device and makes the user-device interface more efficient (e.g., by helping the user to achieve an intended outcome and reducing user mistakes when operating/interacting with the device), and, additionally, reduces power usage and improves battery life of the device by enabling the user to use the device more quickly and efficiently.

In some embodiments, the computer system includes a display device (e.g., touch-sensitive display system 112 in FIG. 1A or display 340 in FIG. 3A), and, in response to receiving the first input, and in accordance with the determination that one of the first wearable audio output component or the second wearable audio output component is not in an in-ear position relative to a respective ear of the user, the computer system displays (1822), via the display device, a visual alert (e.g., a notification displayed over at least a portion of the display device, such as instruction 1406 in FIG. 14E or the visual alert in user interface 1701-3 in FIG. 17E) indicating that one of the first wearable audio output component or the second wearable audio output component is not in an in-ear position relative to a respective ear of the user. In some embodiments, the visual alert is displayed (e.g., in accordance with the determination that one of the first wearable audio output component or the second wearable audio output component is not in an in-ear position and) in accordance with a determination that the first input is received via an input device that is separate from the wearable audio output device (e.g., the input device and display device are part of a separate electronic device included in the computer system). For example, the visual alert is displayed via a display device of a phone, tablet, watch, or laptop, in response to inputs via a touch-sensitive surface of the phone, tablet, watch, or laptop (e.g., instruction 1406 in FIG. 14E is displayed in response to input 1404 (FIG. 14D) via device 100, and the visual alert in user interface 1701-3 in FIG. 17E is displayed in response to input 1722 (FIG. 17D) via watch 1700), but not in response to inputs via (e.g., a stem of) an earbud of the wearable audio output device (e.g., as indicated in FIG. 14Z, a visual alert is not provided in response to input 1430 (FIG. 14Y) via earbud 502-1, in some embodiments due to touch screen 112 of device 100 being turned off).

Providing a visual alert indicating that a wearable audio output component is not in-ear in response to an input requesting to transition the wearable audio output device to the noise-cancellation mode provides visual feedback to the user indicating that an error condition is preventing performance of the user's requested operation. Providing improved feedback to the user enhances the operability of the device and makes the user-device interface more efficient (e.g., by helping the user to achieve an intended outcome and reducing user mistakes when operating/interacting with the device), which, additionally, reduces power usage and improves battery life of the device by enabling the user to use the device more quickly and efficiently.

In some embodiments, in response to receiving the first input, and in accordance with the determination that one of the first wearable audio output component or the second wearable audio output component is not in an in-ear position relative to a respective ear of the user, the computer system provides (1824), via the wearable audio output device (e.g., via speaker(s) 306 of wearable audio output device 301, FIG. 3B), an audio output (e.g., an audio alert, such as the audible feedback indicated by audio icon 917 in FIG. 14Z) indicating that one of the first wearable audio output component or the second wearable audio output component is not in an in-ear position relative to a respective ear of the user. In some embodiments, the audio output is provided (e.g., in accordance with the determination that one of the first wearable audio output component or the second wearable audio output component is not in an in-ear position and) in accordance with a determination that the first input is received via an input device of the wearable audio output device. For example, the audio output is provided in response to squeeze gestures via a stem of an earbud of the wearable audio output device (e.g., the audible feedback indicated by audio icon 917 is provided in response to input 1430 (FIG. 14Y) via earbud 502-1), but not in response to inputs via a touch-sensitive surface of a phone, tablet, watch, or laptop (e.g., as indicated in FIG. 14E, an audio alert is not provided in response to input 1404 (FIG. 14D) via device 100; and as indicated in FIG. 17E, an audio alert is not provided in response to input 1722 (FIG. 17D) via watch 1700). Typically, a phone, tablet, watch, or laptop includes a display device on which visual alerts (e.g., instruction 1406 in FIG. 14E or the visual alert in user interface 1701-3 in FIG. 17E) can be displayed to alert the user that a component is not in-ear (e.g., particularly where the input requesting the transition to the noise-cancellation mode includes interaction with a displayed user interface). However, a wearable audio output device typically does not include a display device and thus cannot itself display visual alerts. Providing the audio output serves to alert the user that a component is not in-ear where the request to transition to the noise-cancellation mode was received via an input device of the wearable audio output device and no display device is available. Even in cases where the wearable audio output device is in communication with a separate electronic device (e.g., that is also part of the computer system and) that is or includes a display device, providing the audio output alerts the user without requiring the display device of the separate electronic device to be powered on. In some embodiments (e.g., particularly where the wearable audio output device does not include any tactile output generators), the audio output is provided instead of the tactile output described above with reference to operation 1820.

Providing an audio output indicating that a wearable audio output component is not in-ear in response to an input requesting to transition the wearable audio output device to the noise-cancellation mode provides non-visual feedback to the user indicating that an error condition is preventing performance of the user's requested operation. Providing improved feedback to the user without cluttering the user interface with additional displayed alerts and without requiring a separate display device or that the display device be powered on enhances the operability of the device and makes the user-device interface more efficient (e.g., by helping the user to achieve an intended outcome and reducing user mistakes when operating/interacting with the device), and, additionally, reduces power usage and improves battery life of the device by enabling the user to use the device more quickly and efficiently.

In some embodiments, while at least one of the first wearable audio output component or the second wearable audio output component is in an in-ear position relative to a respective ear of the user (e.g., one or both wearable audio output components is/are detected as being in-ear), the computer system receives (1826), via the one or more input devices, a third input corresponding to a request to transition the wearable audio output device to a pass-through mode (e.g., from an audio output mode other than the pass-through mode). In some embodiments, while the wearable audio output device is in the pass-through mode, audio outputs that are provided via the wearable audio output device include one or more pass-through audio components that include at least a portion of ambient sound from the physical environment. In some embodiments, the one or more pass-through audio components are generated as part of the audio outputs provided via the wearable audio output device based on ambient sound detected via one or more microphones of the wearable audio output device. In some embodiments, the third input is a request to transition the wearable audio output device from a respective audio output mode (which is a mode other than the pass-through mode) to the pass-through mode and is detected while operating the wearable audio output device in the respective audio output mode. In some embodiments, in response to receiving the third input, the computer system transitions the wearable audio output device to the pass-through mode (e.g., even if only one of the wearable audio output components is detected as being in-ear). For example, if earbuds 502 were in the bypass mode indicated by bypass mode icon 710 in FIG. 14C, an input on pass-through icon 711 would result in transitioning of earbuds 502 to the pass-through mode (e.g., in contrast to earbuds 502 not transitioning to the active noise control mode in response to input 1404 on active noise control icon 709 in FIG. 14D).

In some embodiments, the third input (e.g., corresponding to the request to transition the wearable audio output device to the pass-through mode) includes activation of an activatable user interface element that corresponds to the pass-through mode and is displayed in a settings user interface (e.g., an input on pass-through icon 711, FIG. 15C). In some embodiments, the third input (e.g., corresponding to the request to transition the wearable audio output device to the pass-through mode) includes a predefined gesture detected via an input device of the wearable audio output device (e.g., a squeeze gesture via a stem of an earbud). For example, in response to a subsequent click-and-hold gesture on earbud 502-1 in FIG. 14Z, earbuds 502 would transition to the pass-through mode. Optionally, the computer system and wearable audio output device are configured such that the predefined gesture transitions the wearable audio output device through a set of (e.g., one or more) predefined audio output modes, and the pass-through mode is a next mode, in the set of audio output modes, following the current audio output mode in which the wearable audio output device is being operated when the predefined gesture is detected (e.g., the pass-through mode is the next mode after the bypass mode indicated in FIG. 14Z).

Allowing transitioning of the wearable audio output device to the pass-through mode in response to a request to transition to the pass-through mode while at least one wearable audio output component is in-ear (e.g., even if only one component is in-ear) provides the user with access to control over audio output mode when the quality of audio outputs and the risk of undesired acoustic effects while operating in the requested audio output mode is not dependent on whether one or both components are in-ear. Providing the user with additional control options enhances the operability of the device and makes the user-device interface more efficient (e.g., by helping the user to achieve an intended outcome and reducing user mistakes when operating/interacting with the device), which, additionally, reduces power usage and improves battery life of the device by enabling the user to use the device more quickly and efficiently.

In some embodiments, in response to receiving the first input, and in accordance with the determination that one of the first wearable audio output component or the second wearable audio output component is not in an in-ear position relative to a respective ear of the user, the computer system transitions (1828) the wearable audio output device from the first audio output mode to a third audio output mode, where the first audio output mode and the third audio output mode are distinct from the noise-cancellation mode. For example, input 1430 in FIG. 14Y transitions earbuds 502 from the pass-through mode to the bypass mode (e.g., and a subsequent click-and-hold gesture would transition earbuds 502 from the bypass mode back to the pass-through mode). In some embodiments, the first input is a predefined gesture via an input device of the wearable audio output device (e.g., a squeeze gesture, such as a click-and-hold gesture, via a stem of an earbud) that is configured to transition the wearable audio output device through a set of predefined audio output modes. In some embodiments, while both wearable audio output components are in-ear, the set of predefined audio output modes includes at least the first audio output mode (e.g., a pass-through mode) and the noise-cancellation mode, and optionally also a third audio output mode (e.g., a noise control off mode). In some embodiments, while one wearable audio output component is not in-ear, the set of predefined audio output modes includes the first audio output mode (e.g., the pass-through mode) and the third audio output mode (e.g., the noise control off mode), and does not include the noise-cancellation mode. In some such embodiments, while one wearable audio output component is not in-ear, the predefined gesture transitions the wearable audio output device between the first audio output mode and the third audio output mode and vice versa without transitioning the wearable audio output device to the noise-cancellation mode.

While only one wearable audio output component is in-ear, transitioning the wearable audio output device from a current audio output mode to a different audio output mode that is not a noise-cancellation mode, despite receiving a request to transition to the noise-cancellation mode, transitions the wearable audio output device between audio output modes that are compatible with the in-ear status of the wearable audio output components while preventing operation of the wearable audio output device in an audio output mode that is incompatible with the in-ear status of the wearable audio output components. Providing additional control options that are limited to those appropriate for a current status of the wearable audio output device enhances the operability of the device and makes the user-device interface more efficient (e.g., by reducing user mistakes when operating/interacting with the device), which, additionally, reduces power usage and improves battery life of the device by enabling the user to use the device more quickly and efficiently.

In some embodiments, the computer system receives (1830), via the one or more input devices, a fourth input corresponding to a request to transition the wearable audio output device to a noise control off mode (e.g., from an audio output mode other than the noise control off mode). In some embodiments, while the wearable audio output device is in the noise control off mode, audio outputs that are provided via the wearable audio output device do not include one or more (e.g., any) pass-through audio components that include at least a portion of ambient sound from the physical environment and do not include one or more (e.g., any) cancellation audio components selected (e.g., generated) so as to at least partially cancel ambient sound from the physical environment. In some embodiments, the fourth input is a request to transition the wearable audio output device from a respective audio output mode (which is a mode other than the noise control off mode) to the noise control off mode and is detected while operating the wearable audio output device in the respective audio output mode. In some embodiments, in response to receiving the fourth input, the computer system transitions the wearable audio output device to the noise control off mode (e.g., without regard to whether both, either, or neither wearable audio output component is detected as being in-ear). For example, input 1430 in FIG. 14Y transitions earbuds 502 to the bypass mode, as indicated by bypass mode icon in FIG. 14Z, even though earbud 502-2 is not in-ear. In some embodiments, the fourth input (e.g., corresponding to the request to transition the wearable audio output device to the noise control off mode) includes activation of an activatable user interface element that corresponds to the noise control off mode and is displayed in a settings user interface. In some embodiments, the fourth input (e.g., corresponding to the request to transition the wearable audio output device to the noise control off mode) includes a predefined gesture detected via an input device of the wearable audio output device (e.g., a squeeze gesture via a stem of an earbud). Optionally, the computer system and wearable audio output device are configured such that the predefined gesture transitions the wearable audio output device through a set of (e.g., one or more) predefined audio output modes, and the noise control off mode is a next mode, in the set of audio output modes, following the current audio output mode in which the wearable audio output device is being operated when the predefined gesture is detected.

Allowing transitioning of the wearable audio output device to the noise control off mode in response to a request to transition to the noise control off mode, regardless of how many wearable audio output components are in-ear, provides the user with access to control over audio output mode when the quality of audio outputs and the risk of undesired acoustic effects while operating in the requested audio output mode is not dependent on whether one or both components are in-ear. Providing the user with additional control options enhances the operability of the device and makes the user-device interface more efficient (e.g., by helping the user to achieve an intended outcome and reducing user mistakes when operating/interacting with the device), which, additionally, reduces power usage and improves battery life of the device by enabling the user to use the device more quickly and efficiently.

In some embodiments, forgoing transitioning the wearable audio output device from the first audio output mode to the noise-cancellation mode is performed (e.g., in accordance with the determination that one of the first wearable audio output component or the second wearable audio output component is not in an in-ear position relative to a respective ear of the user and) in accordance with a determination that the computer system is not in a predefined mode of operation (e.g., an accessibility mode). For example, as indicated in FIGS. 14D-14E, forgoing transitioning earbuds 502 to the active noise control mode in response to input 1404 is performed because earbud 502-2 is not in-ear and also in accordance with the accessibility mode being set to the "OFF" state. In some embodiments, in accordance with the determination that the first wearable audio output component or the second wearable audio output component is not in an in-ear position relative to a respective ear of the user (e.g., the first wearable audio output component is not in the respective position and the second wearable audio output component is in the respective position, or vice versa, such that exactly one of the two components is not in the respective position), and in accordance with a determination that the computer system is in the predefined mode of operation (e.g., an accessibility mode), the computer system transitions (1832) the wearable audio output device from the first audio output mode to the noise-cancellation mode. For example, as indicated in FIGS. 14O-14P, earbuds 502 are transitioned to the active noise control mode in response to input 1416, even though earbud 502-2 is not in-ear, because the accessibility mode is set to the "ON" state.

Typically, providing audio outputs in the noise-cancellation mode while only one wearable audio output component is in-ear results in undesired acoustic effects (e.g., due to lack of an acoustic seal by the other wearable audio output component, which is not in-ear), as ambient sound cannot be effectively cancelled. For example, ambient sound will be heard by the ear in which a wearable audio output component has not been placed, regardless of how effectively ambient sound is cancelled with respect to the ear in which a wearable audio output component has been placed. However, in some cases, the user is only able to hear sounds with one ear and is unable to hear sounds with the other ear. In such cases, the user may wish to operate the wearable audio output device with the first wearable audio output component placed in the ear that is able to hear and without placing the second wearable audio output component in the ear that is unable to hear. In such cases, the wearable audio output device (and in particular the first wearable audio output component that is in-ear) can be transitioned to the noise-cancellation mode, and audio outputs can be provided in the noise-cancellation mode, without the undesired acoustic effects being perceived.

Where a user is able to hear sounds with only one ear, and the computer system is in a predefined mode of operation such as an accessibility mode, allowing transitioning of the wearable audio output device to the noise-cancellation mode while only one wearable audio output component is in-ear (e.g., in the ear with which the user is able to hear sounds) provides the user with access to control over audio output mode when the risk of undesired acoustic effects is reduced or eliminated by the user not being able to hear sounds with the other ear. Providing the user with additional control options enhances the operability of the device and makes the user-device interface more efficient (e.g., by helping the user to achieve an intended outcome and reducing user mistakes when operating/interacting with the device), which, additionally, reduces power usage and improves battery life of the device by enabling the user to use the device more quickly and efficiently.

In some embodiments, the computer system includes a wearable electronic device (e.g., a wristwatch, as represented for example by portable multifunction device 100 in FIG. 1A, and illustrated for example as watch 1700 in FIG. 17A) that includes a display device (e.g., touch-sensitive display system 112 in FIG. 1A) and that is in communication with one or more audio output devices including the wearable audio output device. In some embodiments, the wearable electronic device is distinct from the wearable audio output device (e.g., portable multifunction device 100 in FIG. 1A, or alternatively illustrated as watch 1700 in FIG. 17A, is distinct from wearable audio output device 301 in FIG. 3B). In some embodiments, the wearable electronic device includes at least one of the one or more audio output devices (e.g., the wearable electronic device includes one or more speakers, such as speaker 111 in FIG. 1A). In some embodiments, the computer system displays (1834), via the display device (e.g., of the wearable electronic device) (e.g., touch-sensitive display system 112 in FIG. 1A), a settings user interface, including displaying one or more first activatable user interface elements each corresponding to a respective audio output mode (e.g., the one or more first activatable user interface elements including at least an activatable user interface element corresponding to the first audio output mode) in a first portion of the settings user interface. For example, audio output user interface 1701-2 in FIG. 17C includes, in noise management portion 1716 of user interface 1701-2, bypass button 1717 corresponding to the noise control off mode, active noise control button 1718 corresponding to the active noise control mode (also called the noise-cancellation mode), and pass-through button 1720 corresponding to the pass-through mode.

In some embodiments, while displaying the settings user interface, the computer system detects an input corresponding to a request to scroll at least the first portion of the settings user interface (also called herein a "scroll input"). In some embodiments, the scroll input is a touch input via a touch-sensitive surface (which in some embodiments is integrated with the display device to form a touch-sensitive display) of the wearable electronic device (e.g., touch-sensitive display system 112 in FIG. 1A). In some embodiments where the wearable electronic device is a watch, the scroll input is rotation of a crown of the watch. In some embodiments, in response to detecting the input corresponding to the request to scroll at least the first portion of the settings user interface, the computer system scrolls at least the first portion of the settings user interface, including: ceasing to display at least one of the one or more first activatable user interface elements; and displaying, via the display device, one or more second activatable user interface elements each corresponding to a respective audio output device of the one or more audio output devices that are in communication with the wearable electronic device. For example, in response to movement of input 1730 in FIG. 17H, watch 1700 scrolls user interface 1701-2, including displaying selectable option 1734 and ceasing to display bypass button 1717 in user interface 1701-4 in FIG. 17I; and, in response to continued movement of input 1730 in FIG. 7I, watch 1700 continues to scroll user interface 1701-4, including displaying selectable options 1736 and 1738 and ceasing to display active noise control button 1718 and pass-through button 1720 in FIG. 7J. By contrast, in some embodiments where the computer system includes an electronic device (e.g., such as a phone, tablet, or laptop) that is not a wearable electronic device, the one or more first activatable user interface elements and the one or more second activatable user interface elements are displayed in different submenus of a settings user interface (e.g., in different user interfaces accessed via different activatable user interface elements on the settings user interface) rather than in the same scrollable region of the same settings user interface.

Providing options for controlling audio output mode and options for selecting an audio output device in a same scrollable portion of a same settings user interface provides the user with access to additional control options without requiring the user to navigate through complex settings menu hierarchies (e.g., which can be particularly cumbersome when interacting with user interfaces displayed on wearable electronic devices with limited display area). Reducing the number of inputs needed to access the control options enhances the operability of the device and makes the user-device interface more efficient (e.g., by helping the user to achieve an intended outcome and reducing user mistakes when operating/interacting with the device), which, additionally, reduces power usage and improves battery life of the device by enabling the user to use the device more quickly and efficiently.

In some embodiments, the computer system includes an electronic device (e.g., portable multifunction device 100 in FIG. 1A, or device 300 in FIG. 3A) that includes a display device (e.g., touch-sensitive display system 112 in FIG. 1A or display 340 in FIG. 3A), and operating the wearable audio output device in any respective audio output mode is performed (1836) after establishing a wireless (e.g., or wired) connection between the electronic device and the wearable audio output device. In some embodiments, prior to establishing the wireless connection between the electronic device and the wearable audio output device, the computer system receives, at the electronic device, an input to initiate a process to establish the wireless connection between the wearable audio output device and the electronic device (e.g., as described herein with respect to FIG. 13A). In some embodiments, the input to initiate the process to establish the wireless connection includes bringing at least the wearable audio output device in proximity with (e.g., within a predefined threshold distance of) the electronic device. In some embodiments, the electronic device displays an activatable user interface element that, when activated, initiates the process to establish the wireless connection, and the input includes activation of the activatable user interface element (e.g., via a tap input at a location, on a touch-sensitive surface, that corresponds to the displayed activatable user interface element).

In some embodiments, while performing the process to establish the wireless connection in response to receiving the input (e.g., prior to establishing the wireless connection between the electronic device and the wearable audio output device), the computer system displays a series (e.g., a plurality) of user interfaces, including: displaying a first user interface that includes information about a first type of input for performing a first operation with the wearable audio output device (e.g., via an input device of the wearable audio output device, such as a single squeeze input for toggling media playback); and, after displaying the first user interface, displaying a second user interface that includes information about a second type of input for performing a second type of operation with the wearable audio output device (e.g., via an input device of the wearable audio output device, such as a long squeeze gesture for changing an audio output mode of the wearable audio output device). Example user interfaces with information about types of inputs that can be used to perform operations with a wearable audio output device are illustrated in and described herein with reference to FIGS. 13B-13C.

Providing information, before and/or during the pairing process for the wearable audio output device, about different types of operations that can be performed with the wearable audio output device (e.g., including different types of inputs that can be provided via an input device of the wearable audio output device to perform the different operations) informs the user as to different control options for operating the wearable audio output device. Providing improved feedback to the user, and providing the user with additional control options enhances the operability of the device and makes the user-device interface more efficient (e.g., by helping the user to achieve an intended outcome and reducing user mistakes when operating/interacting with the device), which, additionally, reduces power usage and improves battery life of the device by enabling the user to use the device more quickly and efficiently.

Figure 21A:
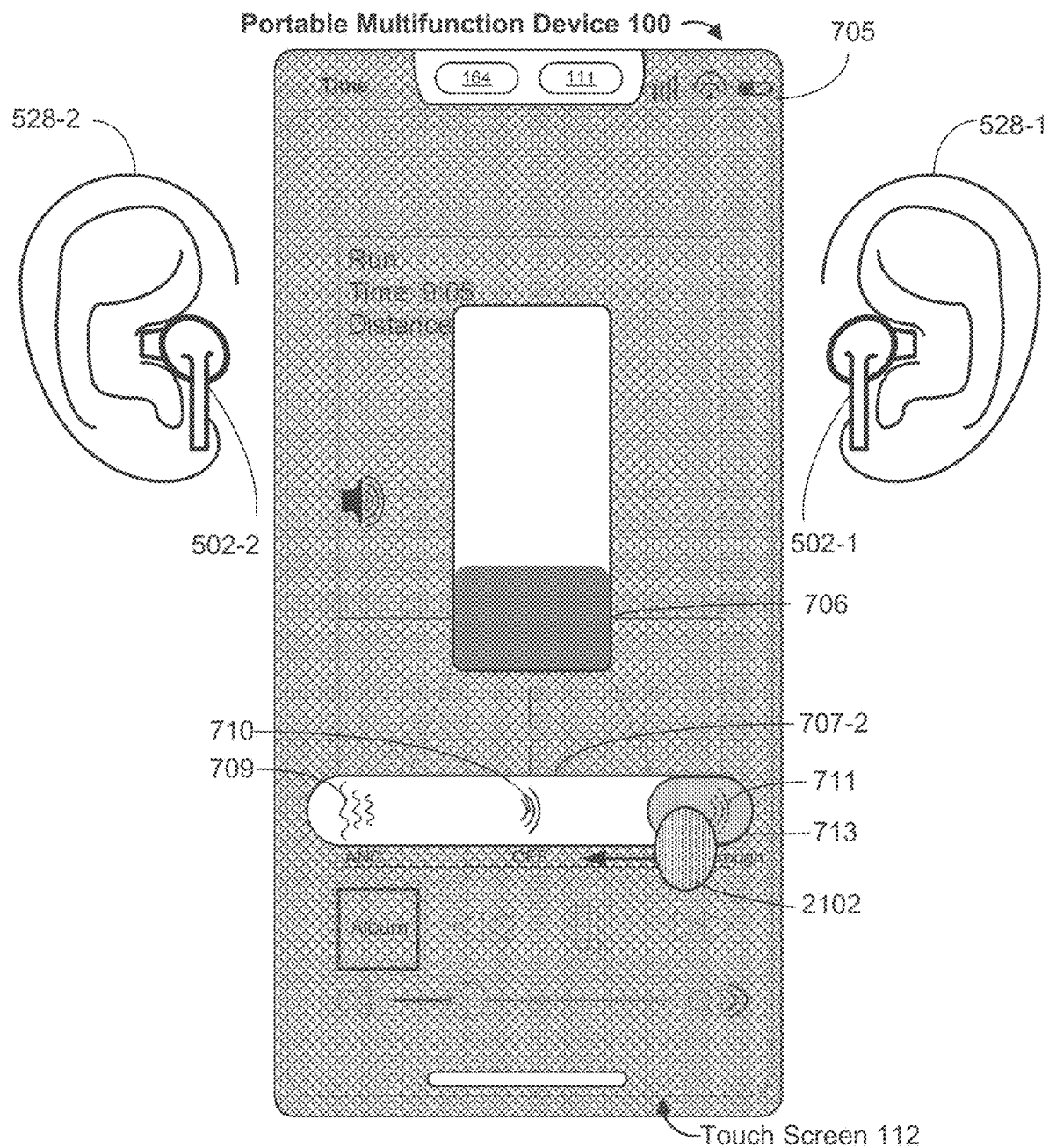
FIGS. 21A-21J illustrate example user interfaces and user interactions for changing the audio output mode of wearable audio output devices in accordance with some embodiments.

In some embodiments, the computer system includes an electronic device (e.g., portable multifunction device 100 in FIG. 1A, or device 300 in FIG. 3A) that includes one or more tactile output generators (e.g., tactile output generator(s) 167 in FIG. 1A or tactile output generator(s) 357 in FIG. 3A) and that is in communication with the wearable audio output device. In some embodiments, in conjunction with transitioning the wearable audio output device from a first respective audio output mode to a second respective audio output mode, the computer system (e.g., the electronic device of the computer system) generates (1838), via the one or more tactile output generators of the electronic device, a tactile output. For example, tactile output 2104 in FIG. 21C, tactile output 2106 in FIG. 21D, and tactile output 2110 in FIG. 21G are generated in combination with earbuds 502 transitioning audio output mode. In some embodiments, the tactile output that is generated in conjunction with (e.g., to indicate) transitioning the audio output mode of the wearable audio output device is different (e.g., in one or more tactile output properties, such as amplitude, frequency, pattern, etc.) from the tactile output generated to indicate that at least one wearable audio output component is not detected as being in-ear in response to receiving a request to transition the wearable audio output device to the noise-cancellation mode.

Providing a tactile output indicating that the wearable audio output device is being transitioned to a different audio output mode provides non-visual feedback to the user indicating that a requested operation was, or is being, successfully performed. Providing improved feedback to the user that avoids cluttering the user interface with displayed visual feedback or that supplements displayed visual feedback enhances the operability of the device and makes the user-device interface more efficient (e.g., by helping the user to achieve an intended outcome and reducing user mistakes when operating/interacting with the device), and, additionally, reduces power usage and improves battery life of the device by enabling the user to use the device more quickly and efficiently.

In some embodiments, the computer system includes a display device (e.g., touch-sensitive display system 112 in FIG. 1A or display 340 in FIG. 3A), a touch-sensitive surface (e.g., touch-sensitive display system 112 in FIG. 1A, or display 340 or touchpad 355 in FIG. 3A) (e.g., as one of the one or more input devices), and one or more tactile output generators (e.g., tactile output generator(s) 167 in FIG. 1A or tactile output generator(s) 357 in FIG. 3A). In some embodiments, the computer system displays (1840), via the display device, a settings user interface that includes a plurality of user interface elements each corresponding to a respective audio output mode of the wearable audio output device, including a first user interface element corresponding to the first audio output mode and a second user interface element corresponding to the noise-cancellation mode. In some embodiments, prior to receiving the first input, the computer system displays a selection indicator indicating selection of the first user interface element, where the selection indicator has a first appearance (e.g., selection indicator 713, displayed over pass-through icon 711, has a first appearance in FIGS. 21A and 21F). In some embodiments, receiving the first input includes, while displaying the settings user interface: receiving the first input at an initial location on the touch-sensitive surface that corresponds to the selection indicator (e.g., input 2102 received at an initial location on touch screen 112 in FIG. 21A, or input 2108 received at an initial location on touch screen 112 in FIG. 21F); and detecting movement of the first input across the touch-sensitive surface (e.g., movement of input 2102 in FIGS. 21B-21D, or movement of input 2108 in FIGS. 21G-21I).

Figure 21B:
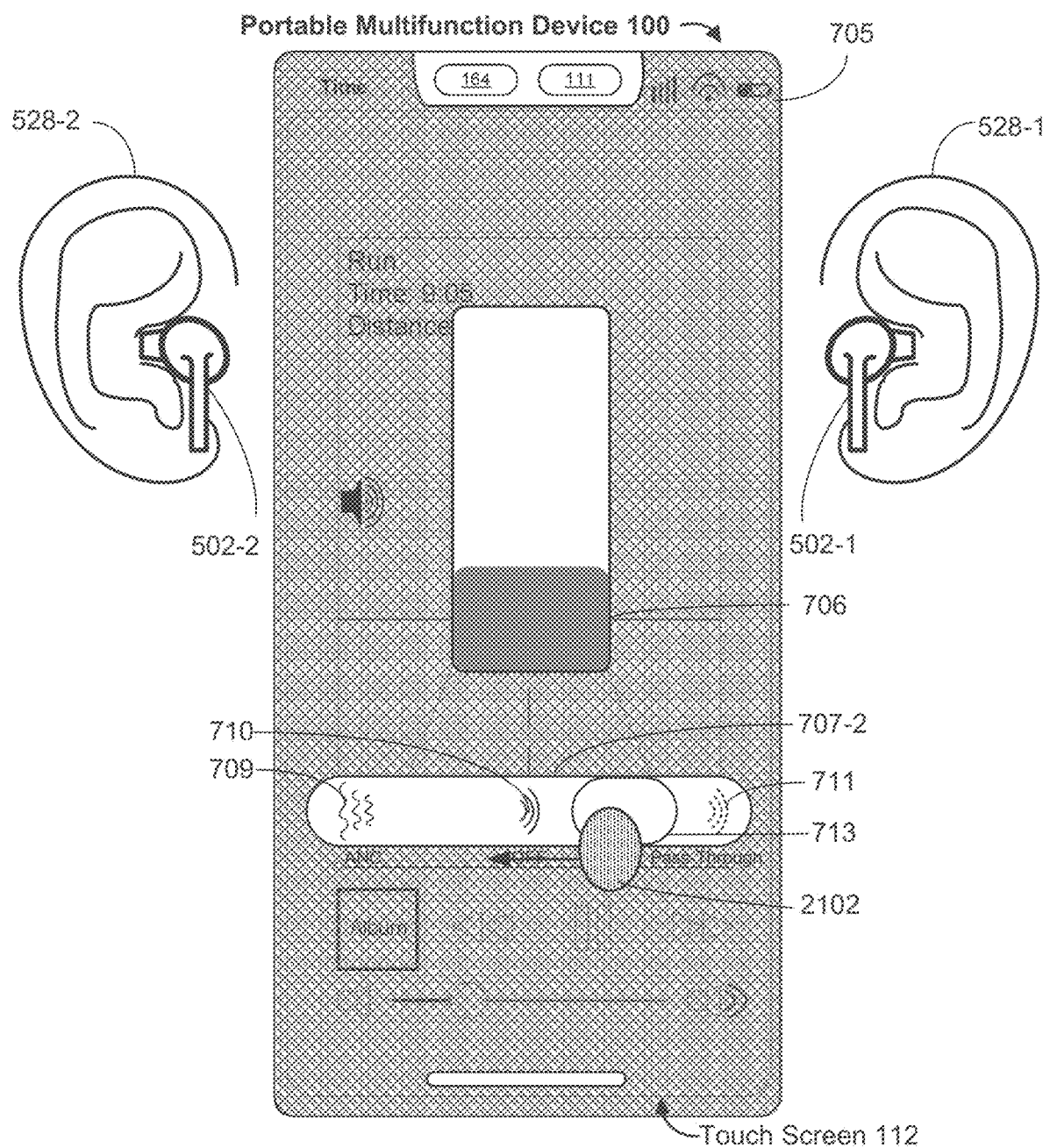
Figure 21C:
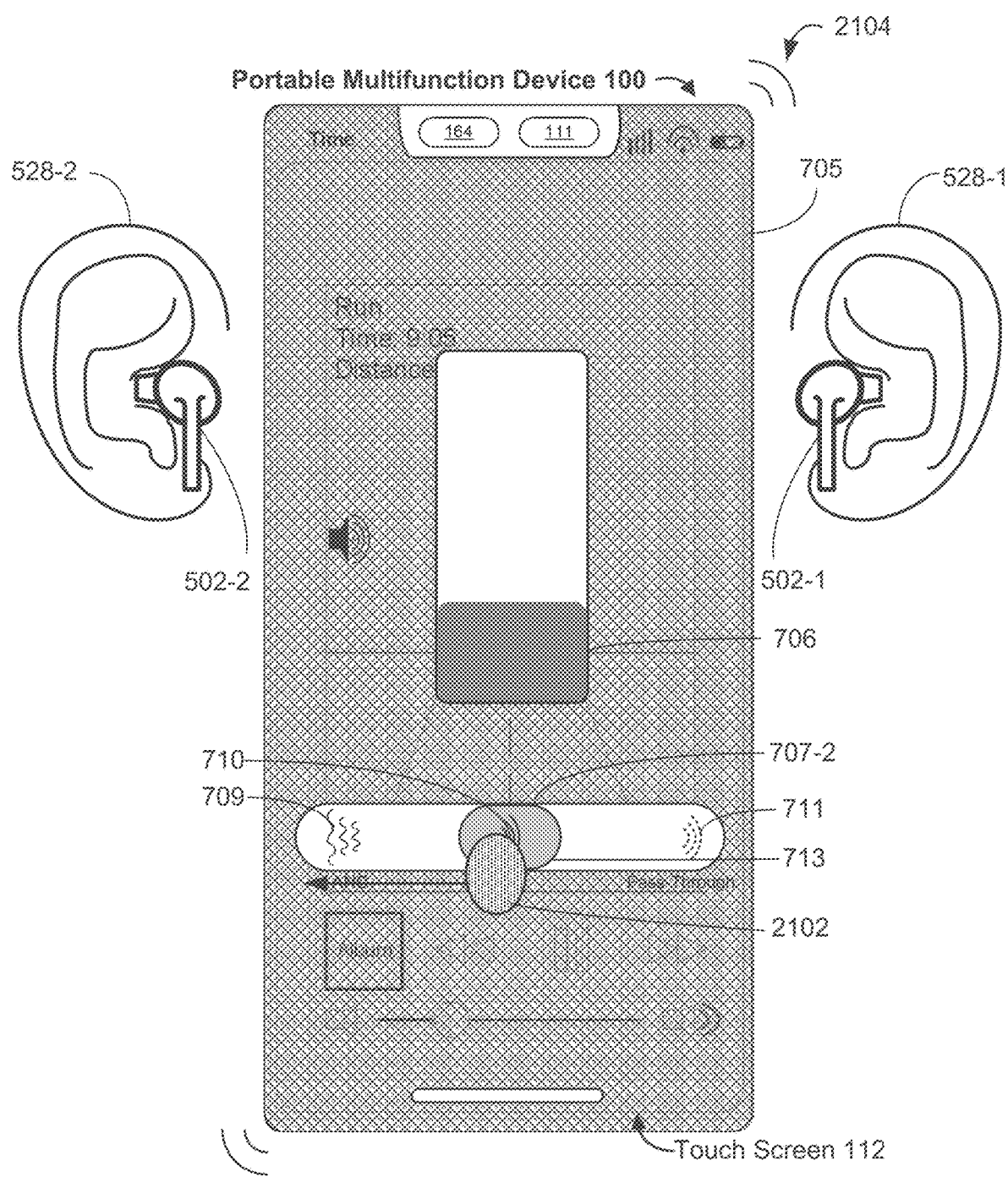
Figure 21D:
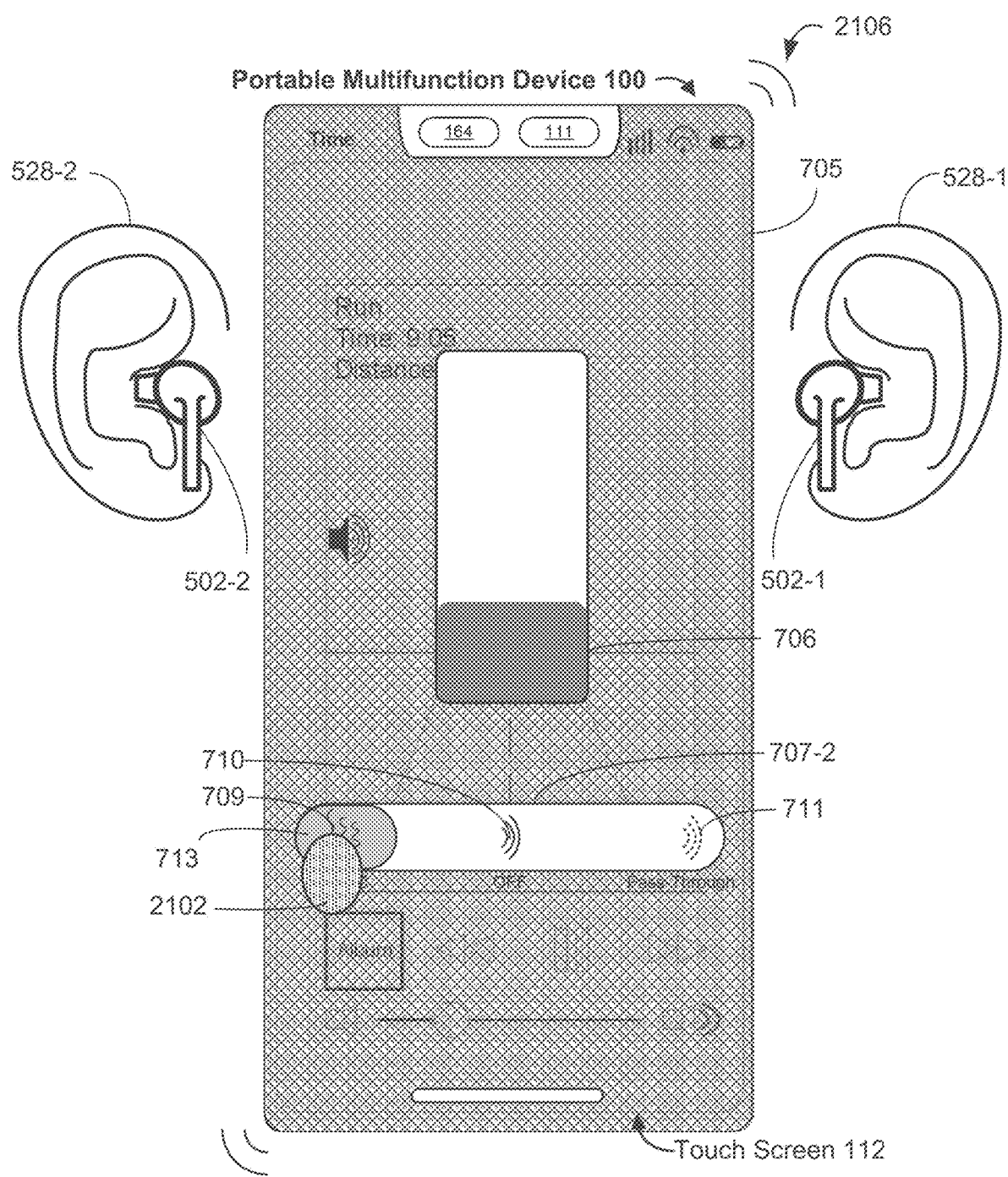
Figure 21E:
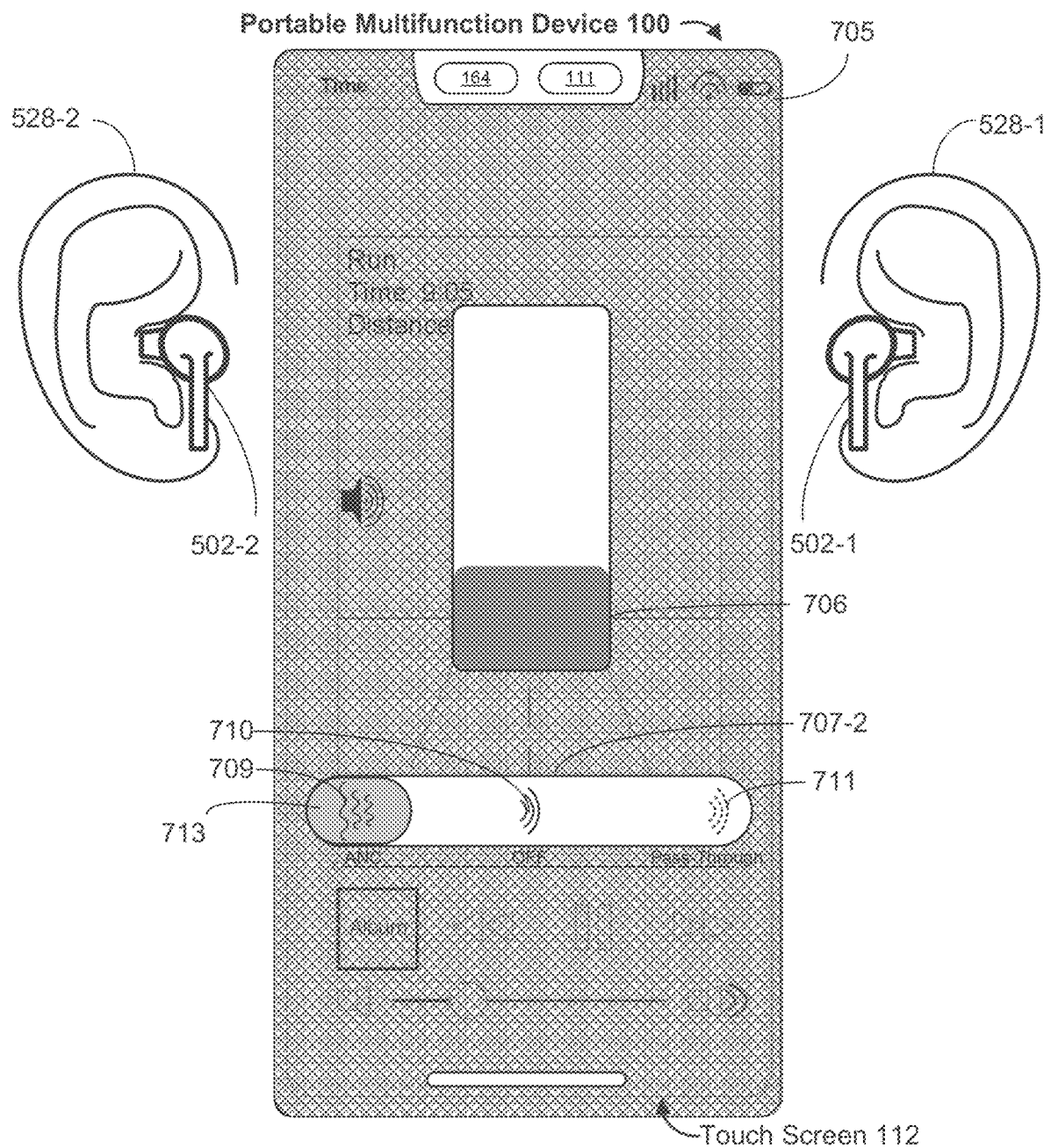
Figure 21F:
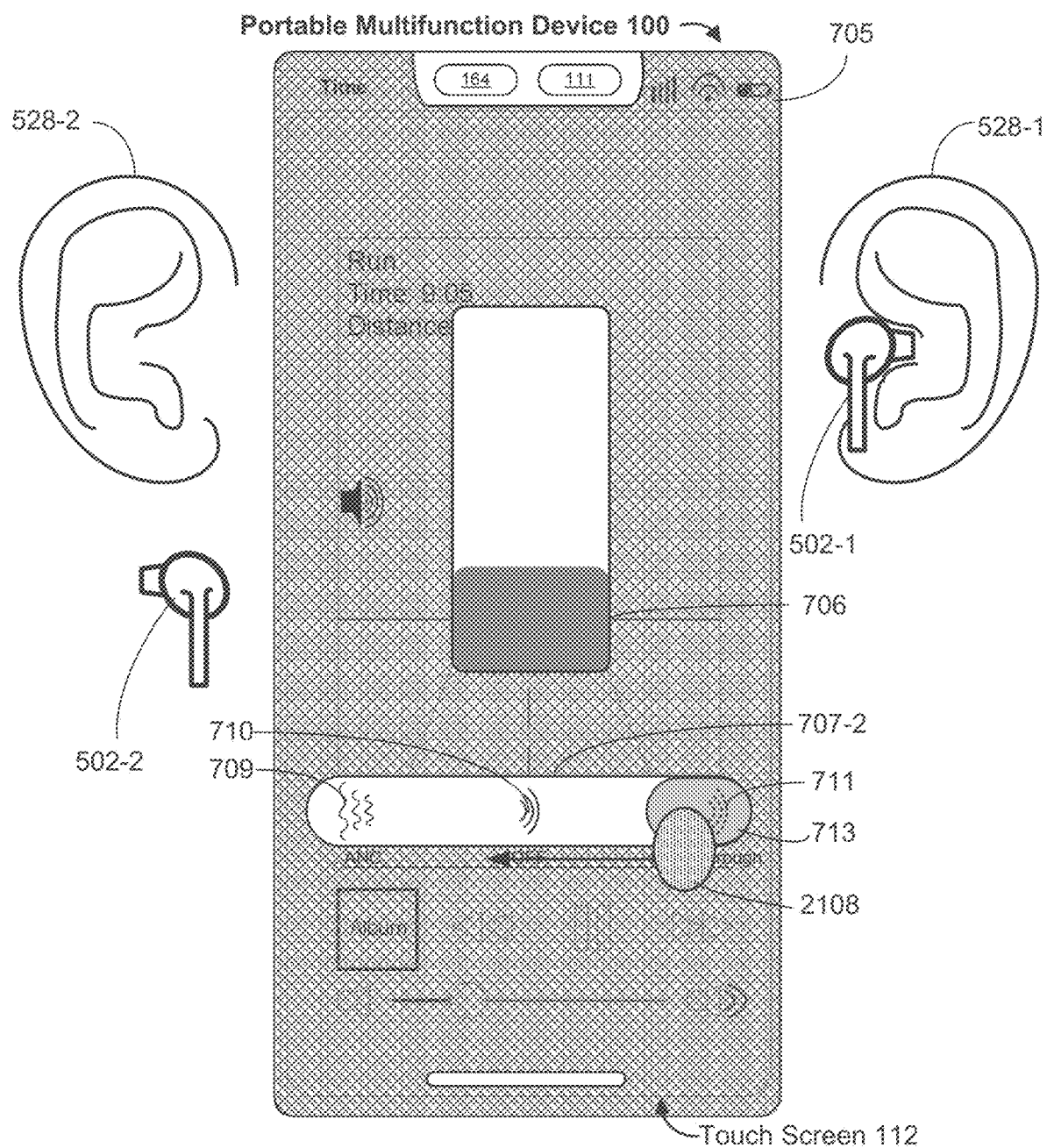
Figure 21G:
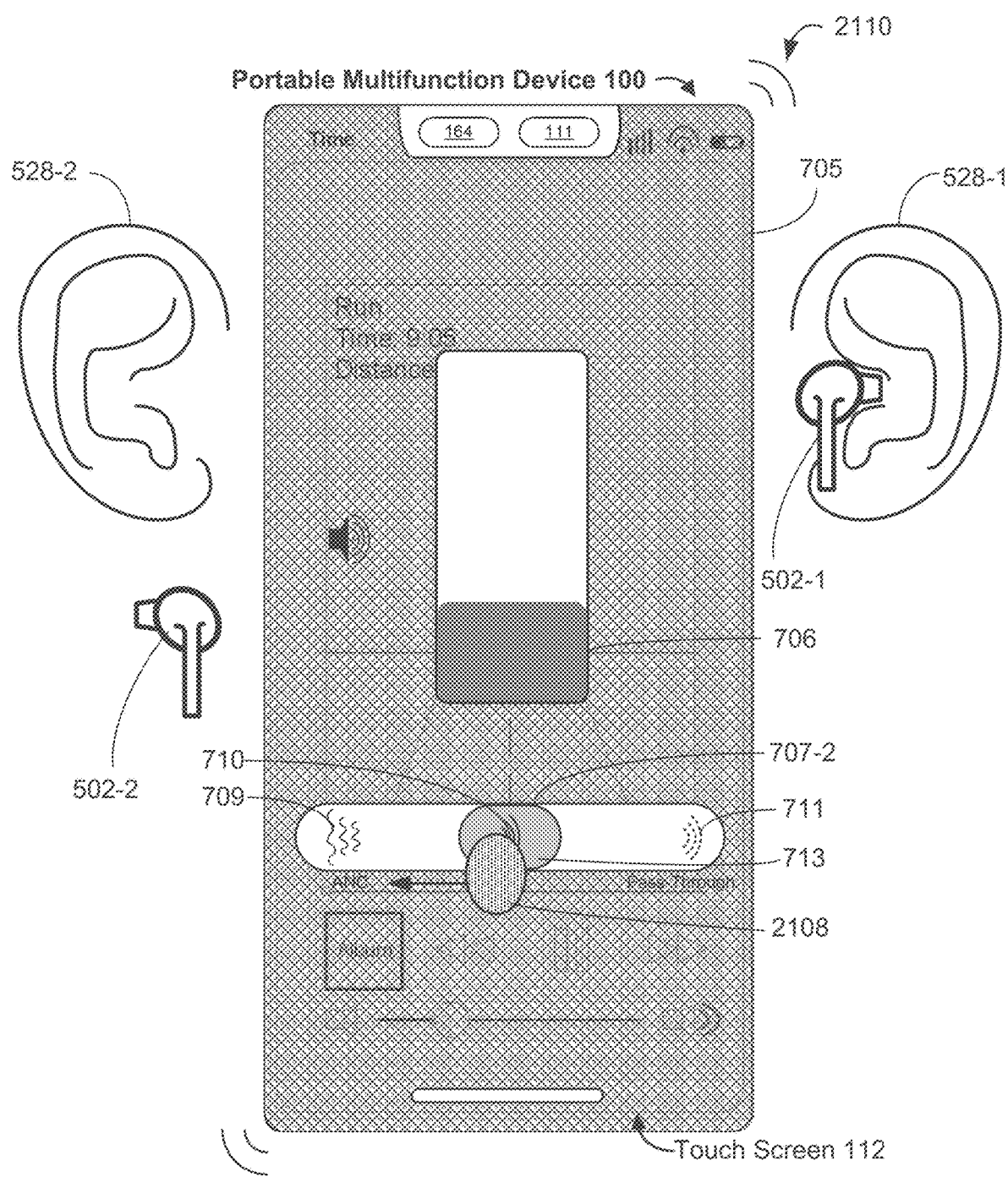

In some embodiments, in response to detecting the movement of the first input: the computer system moves the selection indicator based at least in part on the movement of the first input (e.g., movement of selection indicator 713 in FIGS. 21B-21D or 21G-21I). In some embodiments, in accordance with a determination that movement of the selection indicator based at least in part on the movement of the first input includes movement of the selection indicator settling into a predetermined snap position corresponding to a respective user interface element of the plurality of user interface elements, the computer system generates, via the one or more tactile output generators, a tactile output (e.g., indicating selection of a respective user interface element that corresponds to a respective audio output mode of the wearable audio output device). For example, tactile output 2104 in FIG. 21C and tactile output 2106 in FIG. 21D are generated in accordance with selection indicator 713 being moved to audio output mode icons 710 and 709, respectively, and tactile output 2110 in FIG. 21G is generated in accordance with selection indicator 713 being moved to audio output mode icon 710.

In some embodiments, the selection indicator is moved from being displayed over a first respective user interface element to being displayed over a second respective user interface element (e.g., optionally via an animated transition, and optionally including the selection indicator snapping away from the first respective user interface element and/or snapping to the second respective user interface element) in response to movement of the input that corresponds to a request to move the selection indicator across a predefined boundary between the first respective user interface element and a second respective user interface element. In some embodiments, in response to movement of the input that corresponds to a request to move the selection indicator without crossing the predefined boundary between the first respective user interface element and a second (e.g., or any other) respective user interface element, the selection indicator is maintained as displayed over the first respective user interface element. In some embodiments, the first input corresponds to the request to transition the wearable audio output device to the noise-cancellation mode by ceasing to be detected while the selection indicator is displayed over a user interface element corresponding to the noise-cancellation mode.

In some embodiments, as described herein with reference to FIG. 21C for example, the audio output mode of the wearable audio output device is transitioned in response to the movement of the selection indicator to a different audio output mode icon (e.g., corresponding to an available audio output mode). In some embodiments, the audio output mode of the wearable audio output device is not transitioned until the input that moved the selection indicator to the audio output mode icon ceases to be detected. In some embodiments, as the selection indicator moves based at least in part on the movement of the input, a tactile output is generated each time the selection indicator settles into a predetermined snap position corresponding to a respective audio output mode user interface element (e.g., in accordance with the changing of the audio output mode of the wearable audio output device, or alternatively without regard to whether the audio output mode of the wearable audio output device is transitioned). In some embodiments, the tactile output that is generated in conjunction with (e.g., to indicate) the selection indicator settling into a predetermined snap position corresponding to an audio output mode user interface element is different (e.g., in one or more tactile output properties, such as amplitude, frequency, pattern, etc.) from the tactile output that is generated in conjunction with transitioning the audio output mode of the wearable audio output device, and/or different from the tactile output generated to indicate that at least one wearable audio output component is not detected as being in-ear in response to receiving a request to transition the wearable audio output device to the noise-cancellation mode.

In some embodiments, a tactile output is generated in conjunction with the selection indicator settling into a predetermined snap position corresponding to an available audio output mode but not in conjunction with the selection indicator settling into a predetermined snap position corresponding to an unavailable audio output mode (e.g., because the wearable audio output device does not satisfy criteria required for transitioning to the unavailable audio output mode, for example because at least one wearable audio output component is not detected as being in-ear). For example, as indicated in FIG. 21I, a tactile output is not generated in conjunction with selection indicator 713 being moved to active noise control icon 709 (e.g., because the active noise control mode is not an available audio output mode and/or because earbuds 502 have not transitioned to the active noise control mode). In some embodiments, a tactile output (e.g., to indicate an error condition) is generated in conjunction with the selection indicator settling into a predetermined snap position corresponding to an unavailable audio output mode, and in some such embodiments the tactile output generated for the unavailable audio output mode is different from the tactile output generated for an available audio output mode (and optionally also different from other types of tactile outputs discussed herein).

Providing a tactile output as a selection indicator settles into a predetermined snap position associated with an audio output mode provides non-visual feedback to the user indicating that the selection indicator now corresponds to an activatable user interface element. Providing a tactile output as the selection indicator settles into a predetermined snap position associated with an available audio output mode but not as the selection indicator settles into a predetermined snap position associated with an unavailable audio output mode, or alternatively providing a different tactile output when settling into a predetermined snap position associated with an unavailable audio output mode, provides non-visual feedback to the user indicating whether the selection indicator now corresponds to a selectable audio output mode or to an audio output mode that cannot be selected. Providing improved feedback to the user that avoids cluttering the user interface with displayed visual feedback or that supplements displayed visual feedback enhances the operability of the device and makes the user-device interface more efficient (e.g., by helping the user to achieve an intended outcome and reducing user mistakes when operating/interacting with the device), and, additionally, reduces power usage and improves battery life of the device by enabling the user to use the device more quickly and efficiently.

In some embodiments, the computer system includes a display device and a touch-sensitive surface. In some embodiments, the computer system displays (1842), via the display device, a settings user interface that includes a plurality of user interface elements each corresponding to a respective audio output mode of the wearable audio output device, including a first user interface element corresponding to the first audio output mode and a second user interface element corresponding to the noise-cancellation mode. In some embodiments, prior to receiving the first input, the computer system displays a selection indicator corresponding to (e.g., indicating selection of, for example by being displayed over, optionally with partial transparency, or circumscribing) the first user interface element, where the selection indicator has a first appearance. In some embodiments, receiving the first input includes, while displaying the settings user interface: receiving the first input at an initial location on the touch-sensitive that corresponds to the selection indicator; and detecting movement of the first input across the touch-sensitive surface. In some embodiments, in response to detecting the movement of the first input, the computer system moves the selection indicator based at least in part on the movement of the first input.

In some embodiments, in accordance with a determination that the selection indicator corresponds to (e.g., indicates selection of, for example by being displayed over or circumscribing) a respective user interface element that corresponds to a respective audio output mode to which the wearable audio output device can be transitioned (e.g., based on whether the wearable audio output device satisfies criteria required for transitioning to the respective audio output mode, such as whether both wearable audio output components are in-ear), the computer system displays the selection indicator with the first appearance (e.g., a first color, first fill pattern or first outer boundary style). For example, selection indicator 713 has the first appearance in FIGS. 21A, 21C-21E, 21F-21G, and 21J while selection indicator 713 is displayed over the icons for available audio output modes. In some embodiments, in accordance with a determination that the selection indicator does not correspond to a respective user interface element that corresponds to a respective audio output mode to which the wearable audio output device can be transitioned (e.g., the location of the selection indicator corresponds to a respective user interface element that corresponds to a respective audio output mode to which the wearable audio output device cannot be transitioned, for example because the wearable audio output device does not satisfy criteria required for transitioning to the respective audio output mode; or the location of the selection indicator does not correspond to any respective user interface element that corresponds to a respective audio output mode, for example because the selection indicator is at an empty location between two audio output mode user interface elements), the computer system displays the selection indicator with a second appearance that is different from the first appearance (e.g., a second color that is different from the first color, or a second fill pattern from the first fill pattern, or a second outer boundary style different from the first outer boundary style). For example, selection indicator 713 has the second appearance in FIGS. 21B and 21H while selection indicator 713 is not displayed over an icon for an audio output mode. In another example, selection indicator 713 has the second appearance in FIG. 21I while selection indicator 713 is displayed over an icon for an unavailable audio output mode. In some embodiments, the appearance of the selection indicator is updated as the selection indicator is moved based at least in part on the movement of the input (e.g., as described herein with reference to FIGS. 21A-21J).

Changing the appearance of the selection indicator based on whether the selection indicator corresponds to an available audio output mode or an unavailable audio output mode provides improved visual feedback to the user indicating whether the audio output mode to which the selection indicator currently corresponds can be selected for outputting audio. Providing improved feedback to the user enhances the operability of the device and makes the user-device interface more efficient (e.g., by helping the user to achieve an intended outcome and reducing user mistakes when operating/interacting with the device), which, additionally, reduces power usage and improves battery life of the device by enabling the user to use the device more quickly and efficiently.

In some embodiments, the determination that the selection indicator does not correspond to a respective user interface element that corresponds to (e.g., indicates selection of) a respective audio output mode to which the wearable audio output device can be transitioned includes (1844) a determination that the selection indicator corresponds to the second user interface element corresponding to the noise-cancellation mode and that one of the first wearable audio output component or the second wearable audio output component is not in an in-ear position relative to a respective ear of the user (e.g., as shown in and described herein with reference to FIG. 21I).

While at least one earbud is not in-ear, and while the selection indicator corresponds to the noise-cancellation mode, displaying the selection indicator with an appearance indicating that the noise-cancellation mode cannot be selected preemptively provides visual feedback to the user indicating that the noise-cancellation mode is not available for outputting audio (e.g., earlier than any feedback provided in response to the user providing an input requesting transitioning of the wearable audio output device to the noise-cancellation mode). Providing improved feedback to the user sooner enhances the operability of the device and makes the user-device interface more efficient (e.g., by helping the user to achieve an intended outcome more quickly and reducing user mistakes when operating/interacting with the device), which, additionally, reduces power usage and improves battery life of the device by enabling the user to use the device more quickly and efficiently.

Figure 22A:
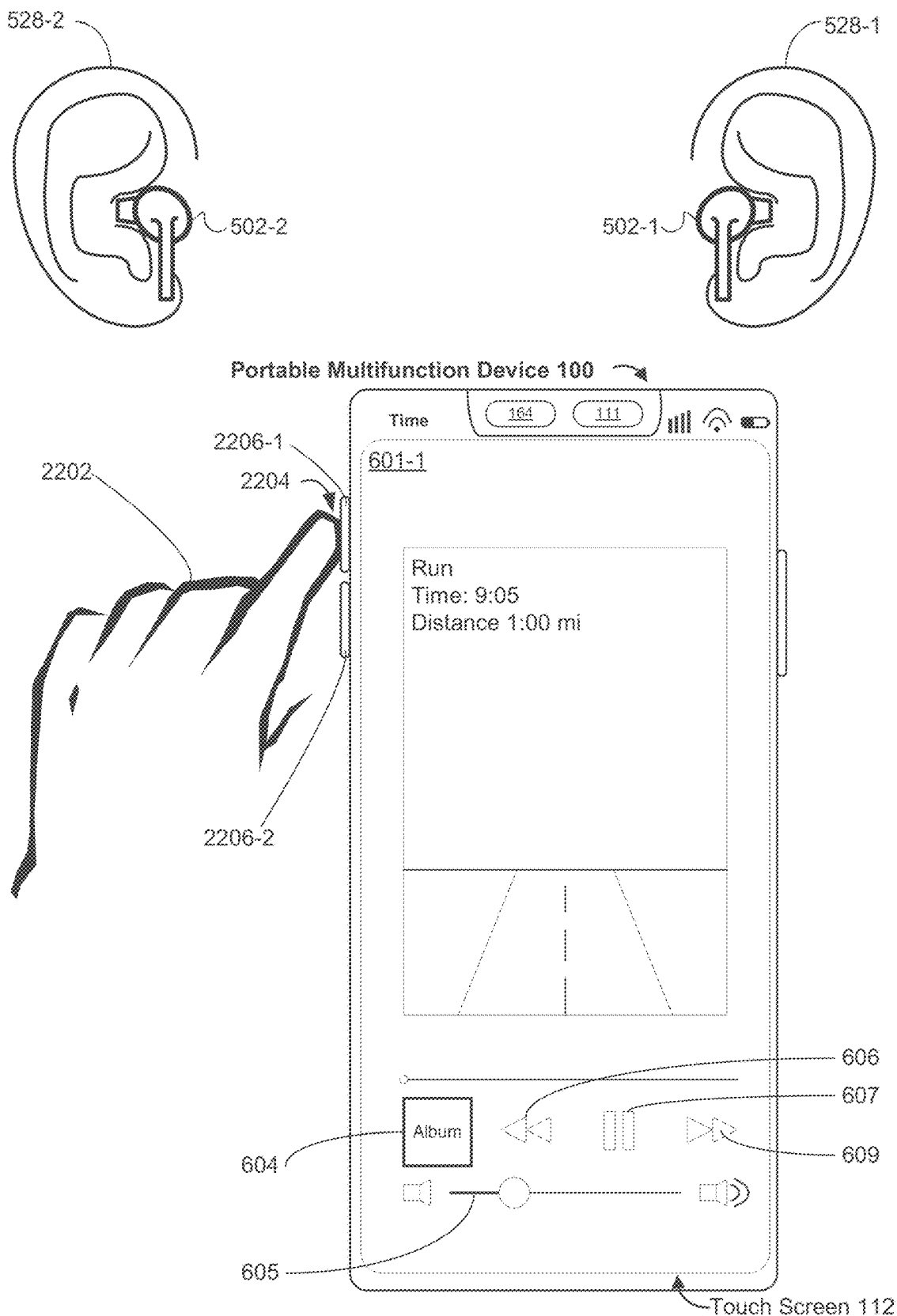
Figure 23A:
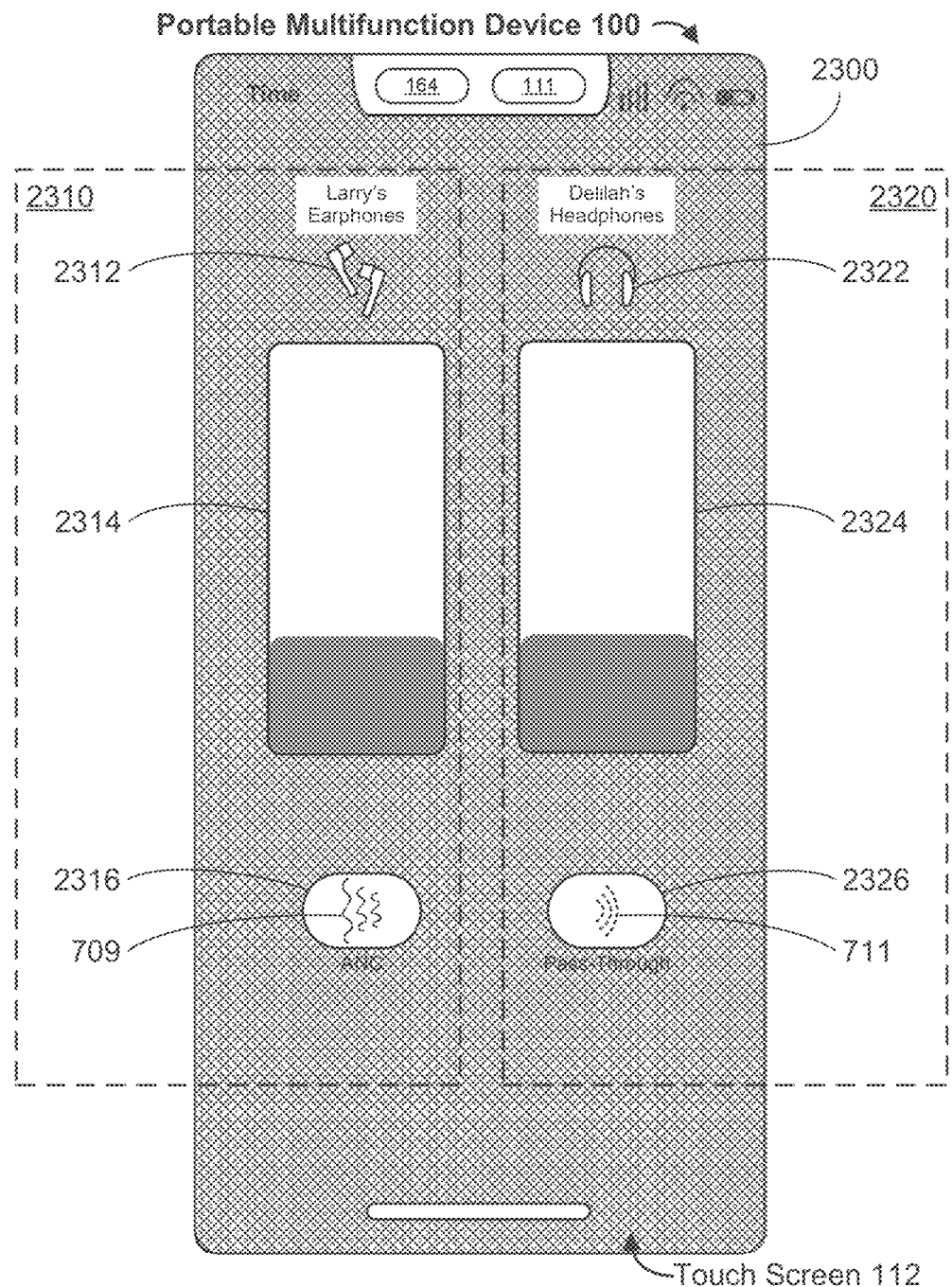
FIGS. 23A-23AA illustrate example user interfaces and user interactions for controlling audio output settings for multiple wearable audio output devices using a single settings user interface in accordance with some embodiments.

In some embodiments, the computer system includes a volume control hardware element (e.g., an up/down button for volume control, as described herein with reference to FIG. 1A, illustrated for example by volume button 2206 in FIG. 22A). In some embodiments, the computer system detects (1846) an input (e.g., input 2204, FIG. 22A) via the volume control hardware element (e.g., volume button 2206, FIG. 22A), and, in response to detecting the input via the volume control hardware element, displays a volume control (e.g., volume control 2208, FIG. 22B). In some embodiments, the volume control includes a graphical representation (e.g., glyph 2210) of the respective audio output device with which the computer system is configured to output audio (e.g., the wearable audio output device, one or more speakers in the computer system (e.g., internal speakers), or one or more external speakers that are in communication with the computer system). In some embodiments, the settings user interface (e.g., enhanced volume control user interface 705, FIG. 22D) is displayed in response to an input corresponding to the displayed volume control (e.g., input 2214, FIG. 22C) (e.g., in accordance with a determination that the input corresponding to the displayed volume control is a particular type of input, such as a long press gesture).

Displaying the settings user interface in response to an input on a volume control invoked using a volume control hardware element (e.g., volume up/down button(s)) provides an additional and quick way to access the settings user interface for controlling audio outputs using an intuitive interaction. Providing additional control options and reducing the number of inputs needed to access the additional control options enhances the operability of the device and makes the user-device interface more efficient (e.g., by helping the user to achieve an intended outcome and reducing user mistakes when operating/interacting with the device), which, additionally, reduces power usage and improves battery life of the device by enabling the user to use the device more quickly and efficiently.

In some embodiments, in accordance with a determination that the computer system is (e.g., currently) configured to output audio via a respective audio output device (e.g., the wearable audio output device, one or more speakers in the computer system (e.g., internal speakers), or one or more external speakers that are in communication with the computer system) (1848), the settings user interface includes a graphical representation of the respective audio output device. For example, enhanced volume control user interface 705 in FIG. 22D includes glyph 2210 that is a graphical representation of earbuds 502, because device 100 is currently configured to output audio via earbuds 502.

Displaying a graphical representation of the audio output device via which the computer system is configured to output audio provides improved visual feedback to the user indicating which audio output device is currently selected for outputting audio. Providing improved feedback to the user enhances the operability of the device and makes the user-device interface more efficient (e.g., by helping the user to achieve an intended outcome and reducing user mistakes when operating/interacting with the device), which, additionally, reduces power usage and improves battery life of the device by enabling the user to use the device more quickly and efficiently.

In some embodiments, the computer system includes a display device and a touch-sensitive surface. In some embodiments, the computer system displays (1850), via the display device, a settings user interface that includes a plurality of user interface elements including a first user interface element corresponding to the first audio output mode of the wearable audio output device and a second user interface element corresponding to a second audio output mode of the wearable audio output device, where the second audio output mode is the noise-cancellation mode. In some embodiments, the plurality of user interface elements includes a third user interface element corresponding to a third audio output mode of the wearable audio output device. In some embodiments, prior to receiving the first input, the computer system displays a selection indicator over (e.g., corresponding to, or indicating selection of) the first user interface element (e.g., wherein the selection indicator has a first appearance). In some embodiments, in response to receiving a first portion of the first input that includes an initial contact (e.g., touchdown of the contact, such as touchdown of input 1412 in FIG. 14K) at a location on the touch-sensitive surface that corresponds to selection of a respective user interface element of the plurality of user interface elements (e.g., that is different from the first user interface element) (e.g., and prior to receiving a second portion of the first input that includes lift off of the contact from the touch-sensitive surface), the computer system displays a selection indicator over (e.g., corresponding to, or indicating selection of) the respective user interface element (e.g., the appearance of the selection indicator is based on a determination of whether the respective user interface element corresponds to a respective audio output mode to which the wearable audio output device can be transitioned); and, in accordance with a determination that the respective user interface element corresponds to a respective audio output mode to which the wearable audio output device can be transitioned, the computer system transitions the wearable audio output device to the respective audio output mode (e.g., and in accordance with a determination that the respective audio output mode is not one to which the wearable audio output device can be transitioned, the computer system forgoes transitioning the wearable audio output device to the respective audio output mode).

Displaying a selection indicator over a selected audio output mode representation provides visual feedback to the user indicating which audio output mode is being selected, and transitioning the wearable audio output device to the selected audio output mode, if the selected audio output mode is one to which the wearable audio output device can be transitioned, in response to an initial portion of an input, enables the requested transition to be performed more quickly without regard to remaining portions of the input. Providing improved feedback to the user and performing an operation when a set of conditions has been met without requiring further user input enhances the operability of the computer system and makes the user-device interface more efficient (e.g., by helping the user to achieve an intended outcome and reducing user mistakes when operating/interacting with the system), which, additionally, reduces power usage and improves battery life of the system by enabling the user to use the system more quickly and efficiently.

Figure 21H:
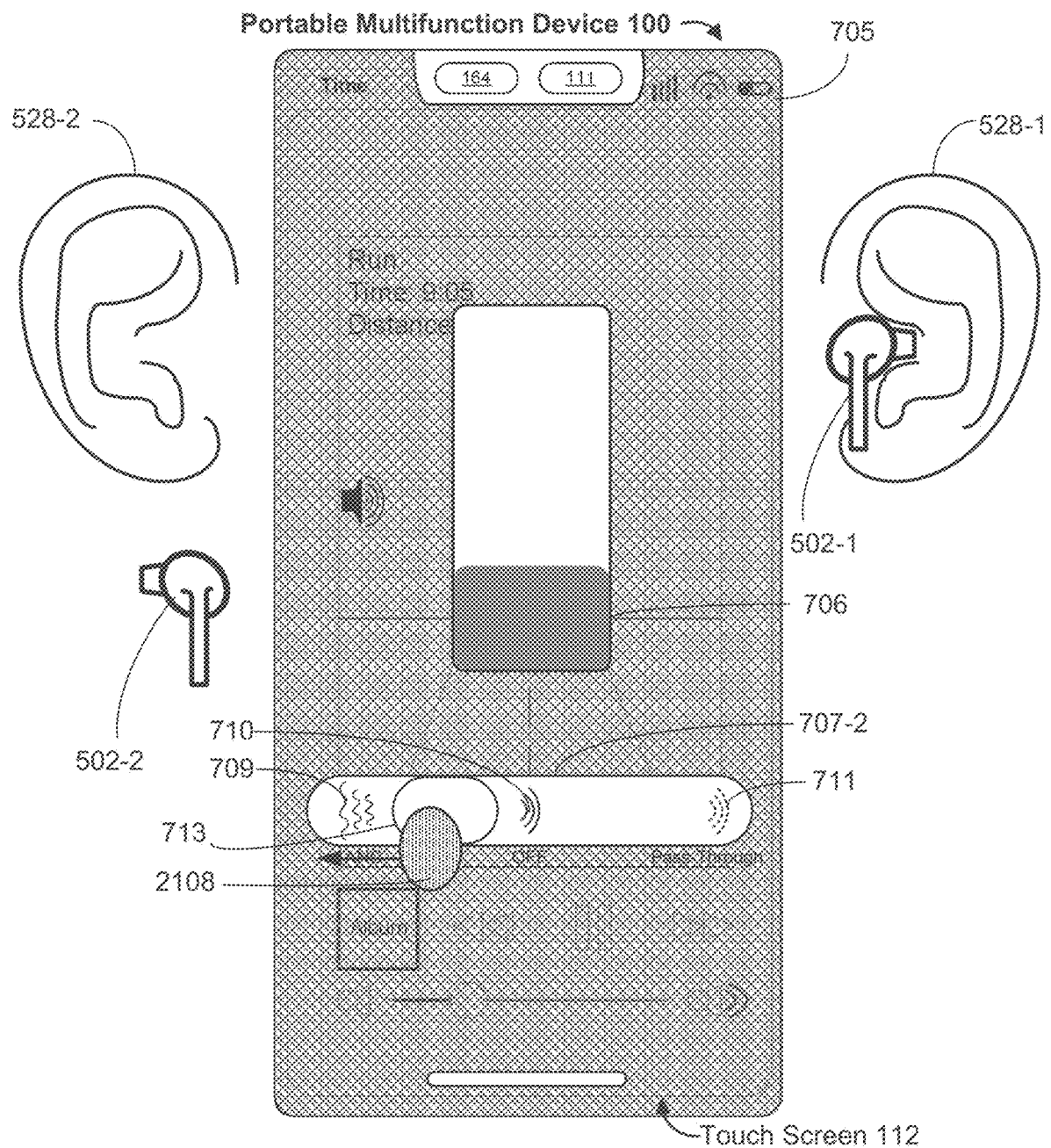
Figure 21I:
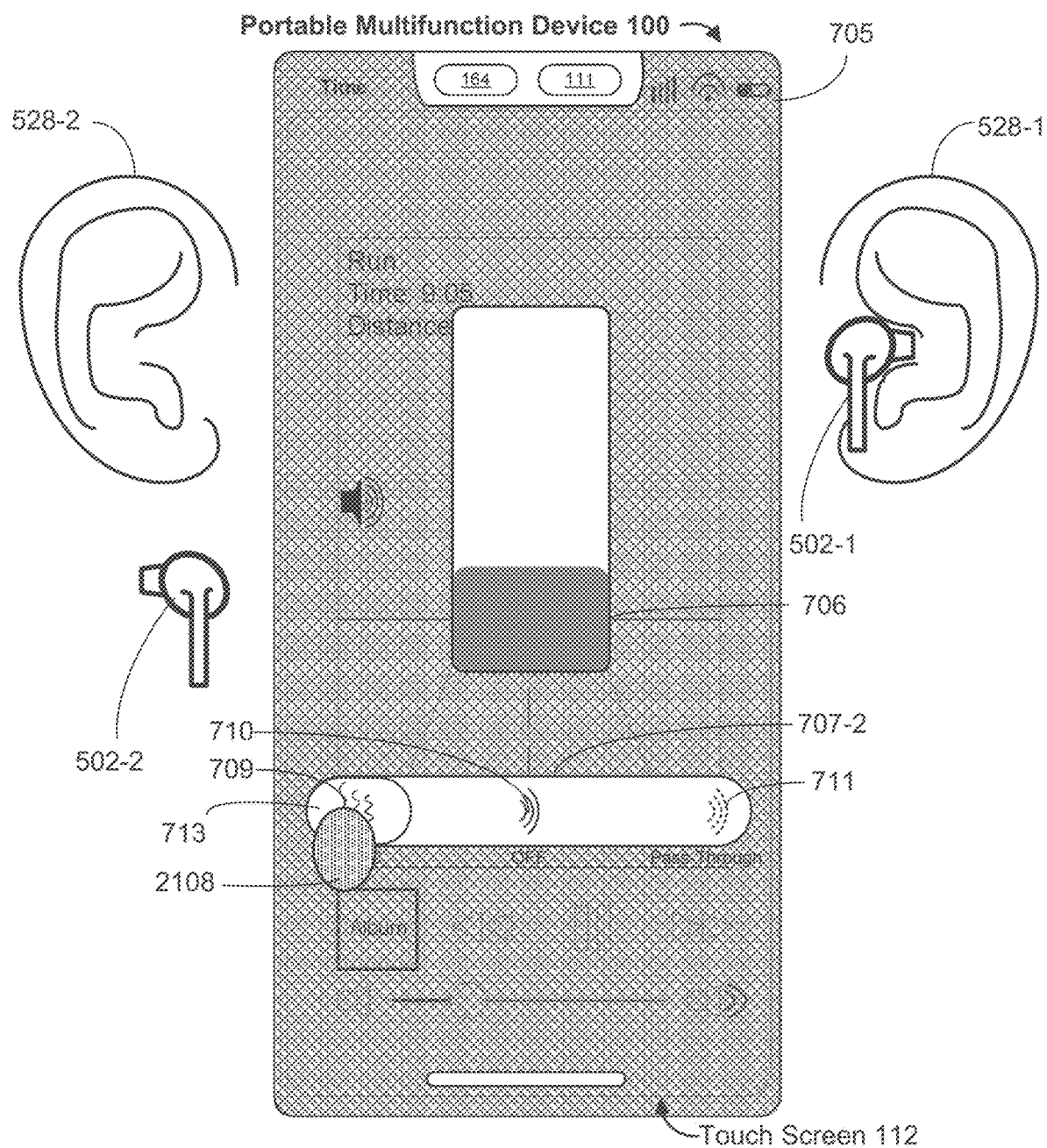
Figure 21J:
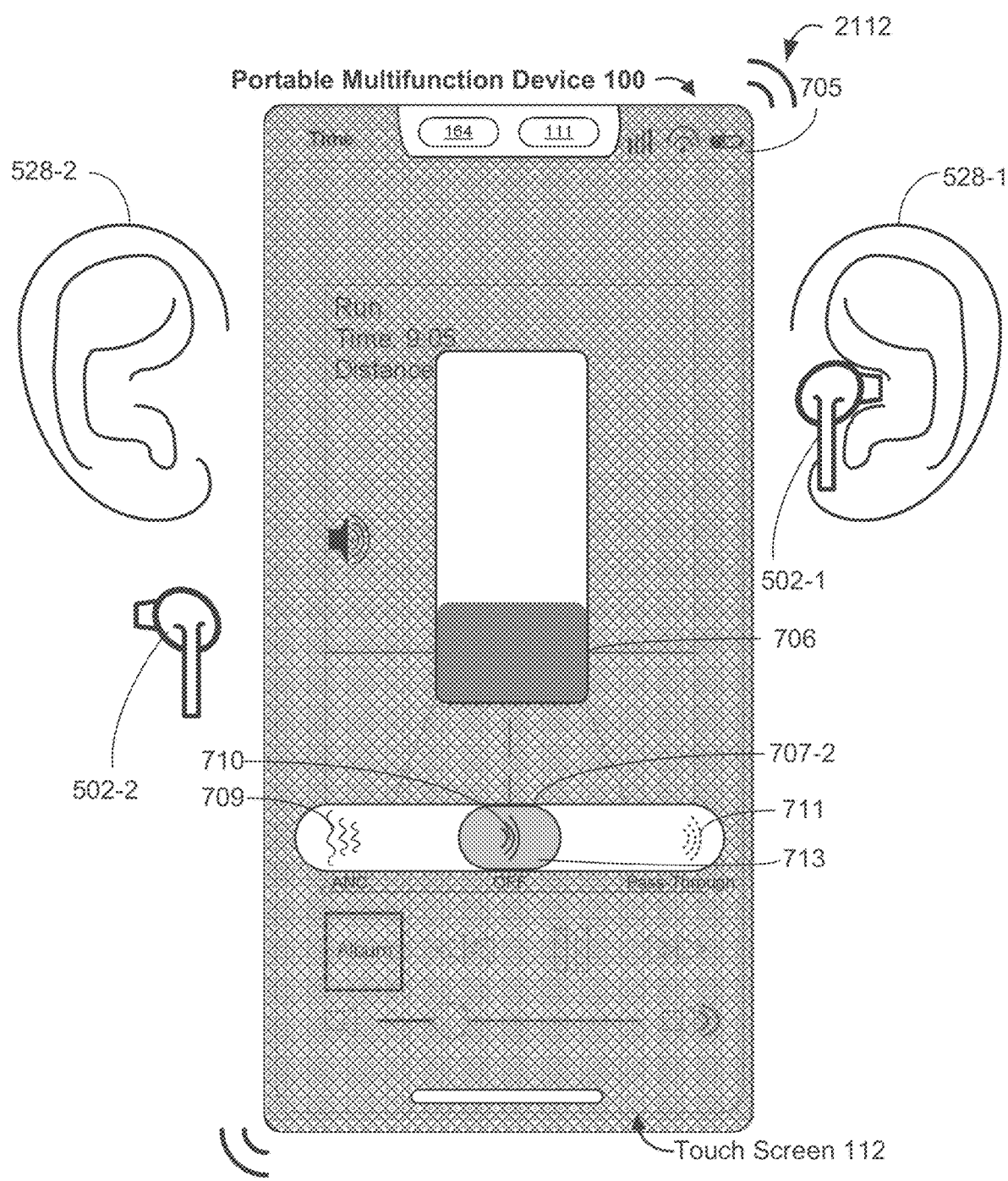

In some embodiments, the computer system includes one or more tactile output generators, and, in response to detecting a second portion of the first input that follows the first portion of the first input and that includes lift off of the contact from the touch-sensitive surface while the selection indicator is displayed over a respective user interface element of the plurality of user interface elements that corresponds to the noise-cancellation mode (1852): in accordance with a determination that the noise-cancellation mode is an audio output mode to which the wearable audio output device cannot be transitioned (e.g., in accordance with the determination that one of the first wearable audio output component or the second wearable audio output component is not in an in-ear position relative to a respective ear of the user), the computer system provides (e.g., generates), via the one or more tactile output generators, an error tactile output (e.g., indicating that the respective user interface element corresponds to a respective audio output mode to which the wearable audio output device cannot be transitioned) (e.g., as described herein with reference to error tactile output 2112 in FIG. 21J). In some embodiments, in accordance with a determination that the respective user interface element corresponds to a respective audio output mode to which the wearable audio output device can be transitioned, the computer system forgoes providing an error tactile output. For example, as shown in FIG. 21E, an error tactile output is not generated in response to input 2102 ending, because input 2102 ended while selection indicator 713 was displayed over active noise control icon 709, which corresponds to an audio output mode, the active noise control mode, to which earbuds 502 can be transitioned. In some embodiments, the error tactile output is a different type of tactile output (e.g., in amplitude, frequency, pattern, etc.) from tactile outputs generated in accordance with the selection indicator snapping to respective user interface elements (e.g., as described herein with reference to operation 1840 of method 1800).

Providing an error tactile output in response to the end of an input requesting transition to an audio output mode to which the wearable audio output device cannot be transitioned provides tactile feedback to the user indicating that the requested operation could not be performed. Providing improved feedback to the user enhances the operability of the computer system and makes the user-device interface more efficient (e.g., by helping the user to achieve an intended outcome and reducing user mistakes when operating/interacting with the system), which, additionally, reduces power usage and improves battery life of the system by enabling the user to use the system more quickly and efficiently.

In some embodiments, the plurality of user interface elements is displayed (1854) in response to receiving a prior input corresponding to activation of an output-mode affordance, wherein the output-mode affordance includes a representation of the first audio output mode without including representations of any other audio output modes of the wearable audio output device (e.g., to indicate that the first audio output mode is the current audio output mode of the wearable audio output device), and, after at least a predetermined amount of time has elapsed since detecting the first input, the computer system ceases to display the plurality of user interface elements and redisplays the output-mode affordance, where the output-mode affordance includes a representation of a respective audio output mode corresponding to a respective user interface element over which the selection indicator was displayed when the predetermined amount of time elapsed (e.g., as described herein with reference to FIGS. 23N-23Q). In some embodiments, the first input is a most recent prior input corresponding to (e.g., any of) the plurality of user interface elements. In some embodiments, the first input is a subsequent input corresponding to the plurality of user interface elements that is received within a predefined threshold amount of time from a most recent of one or more other inputs, received prior to the first input, corresponding to the plurality of user interface elements.

In some embodiments, the first input corresponds to the request to transition the wearable audio output device to the noise-cancellation mode by ceasing to be detected while the selection indicator is displayed over a user interface element corresponding to the noise-cancellation mode. In some such embodiments, in response to ceasing to detect the first input, if the wearable audio output device can be transitioned to the noise-cancellation mode (e.g., because both wearable audio output components are in-ear), the selection indicator is maintained over the user interface element corresponding to the noise-cancellation mode, and, in some such embodiments, after the predetermined amount of time elapses, the output-mode affordance includes a representation of the noise-cancellation mode. In some embodiments, in response to ceasing to detect the first input, if the wearable audio output device cannot be transitioned to the noise-cancellation mode (e.g., because at least one wearable audio output component is not in-ear), the selection indicator is moved from being displayed over the user interface element corresponding to the noise-cancellation mode to being displayed over a most recent prior user interface element (e.g., of the plurality of user interface elements) over which the selection indicator was displayed (e.g., just prior to moving the selection indicator to the user interface element corresponding to the noise-cancellation mode) (e.g., as described herein with reference to FIGS. 21I-21J). In some such embodiments, after the predetermined amount of time elapses, and in combination with ceasing to display the plurality of user interface elements, the output-mode affordance includes a representation of the audio output mode corresponding to that most recent prior user interface element.

Ceasing to display audio output mode options after a predetermined amount of time has elapsed since a most recent user input interacting with any of the audio output mode options avoids unnecessarily displaying controls that the user may no longer need and/or with which the user may no longer want to interact, and that may be distracting or misleading to the user. Providing additional control options without cluttering the user interface with additional displayed controls when not needed enhances the operability of the computer system and makes the user-device interface more efficient (e.g., by helping the user to achieve an intended outcome and reducing user mistakes when operating/interacting with the system), which, additionally, reduces power usage and improves battery life of the system by enabling the user to use the system more quickly and efficiently.

In some embodiments, while displaying the selection indicator over a respective user interface element, the computer system animates (1856) at least a portion of the respective user interface element (e.g., where the respective user interface element includes a representation of its corresponding respective audio output mode, by animating the representation of the corresponding respective audio output mode). In some embodiments, the animation is performed once following (e.g., in response to) initial display of the selection indicator over the respective user interface element (e.g., bypass icon 710 in FIG. 21C is optionally animated once upon input 2102 initially moving selection indicator 713 over bypass icon 710). In some embodiments, the animation is performed (e.g., repeatedly) as long as the selection indicator is displayed over the respective user interface element (e.g., bypass icon 710 in FIG. 21C is optionally repeatedly animated while selection indicator 713 is displayed over bypass icon 710). Animating at least a portion of a selected representation of audio output mode provides visual feedback to the user indicating (or, where a selection indicator is also displayed, emphasizing) which audio output mode is being selected. Providing improved feedback to the user enhances the operability of the computer system and makes the user-device interface more efficient (e.g., by helping the user to achieve an intended outcome and reducing user mistakes when operating/interacting with the system), which, additionally, reduces power usage and improves battery life of the system by enabling the user to use the system more quickly and efficiently.

In some embodiments, in response to receiving a respective portion of the first input that corresponds to selection of a respective user interface element of the plurality of user interface elements (e.g., in response to selection of another user interface element, different from a currently-selected user interface element, by the initial contact or by movement of the contact and resulting snapping of a selection indicator to the other user interface element), the computer system provides (1858) a respective selection tactile output (e.g., as described herein with reference to FIGS. 21C-21D and 21G). In some embodiments, each time the selection indicator is moved (e.g., snaps) to a different user interface element of the plurality of user interface elements, the (e.g., same) selection tactile output is generated. In some embodiments, the selection tactile output is the same type of tactile output (e.g., in amplitude, frequency, pattern, etc.) as the tactile outputs described herein with reference to operation 1840 of method 1800. In some embodiments, the selection tactile output is a different type of tactile output from the error tactile output (e.g., described herein with reference to operation 1852 of method 1800).

Providing a selection tactile output indicating that a representation of audio output mode has been selected provides tactile feedback to the user acknowledging the user's request to transition the wearable audio output device to the selected audio output mode. Where provision of the selection tactile output is dependent on whether the requested audio output mode is one to which the wearable audio output device can be transitioned, providing the selection tactile output further indicates to the user that the requested audio output mode is available (and, in some embodiments, that the wearable audio output device has already been transitioned to the requested audio output mode). Providing improved feedback to the user enhances the operability of the computer system and makes the user-device interface more efficient (e.g., by helping the user to achieve an intended outcome and reducing user mistakes when operating/interacting with the system), which, additionally, reduces power usage and improves battery life of the system by enabling the user to use the system more quickly and efficiently.

In some embodiments, the selection tactile output is provided (1860) without regard to whether the selected respective user interface element corresponds to a respective audio output mode to which the wearable audio output device can be transitioned (e.g., as described herein with reference to optional embodiments described herein with reference to FIG. 21I). Providing a selection tactile output indicating that a representation of audio output mode has been selected provides tactile feedback to the user acknowledging the user's request to transition the wearable audio output device to the selected audio output mode. Providing improved feedback to the user enhances the operability of the computer system and makes the user-device interface more efficient (e.g., by helping the user to achieve an intended outcome and reducing user mistakes when operating/interacting with the system), which, additionally, reduces power usage and improves battery life of the system by enabling the user to use the system more quickly and efficiently.

It should be understood that the particular order in which the operations in FIGS. 18A-18H have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 1000, 1100, 1200, 1900, 2000, 2400, and 2600) are also applicable in an analogous manner to method 1800 described above with respect to FIGS. 18A-18H. For example, the devices, components, positions, gestures, user interfaces, selection indicators, audio outputs, audio output modes, and alerts described above with reference to method 1800 optionally have one or more of the characteristics of the devices, components, positions, gestures, user interfaces, selection indicators, audio outputs, audio output modes, and alerts described herein with reference to other methods described herein (e.g., methods 1000, 1100, 1200, 1900, 2000, 2400, and 2600). For brevity, these details are not repeated here.

Figure 19A:
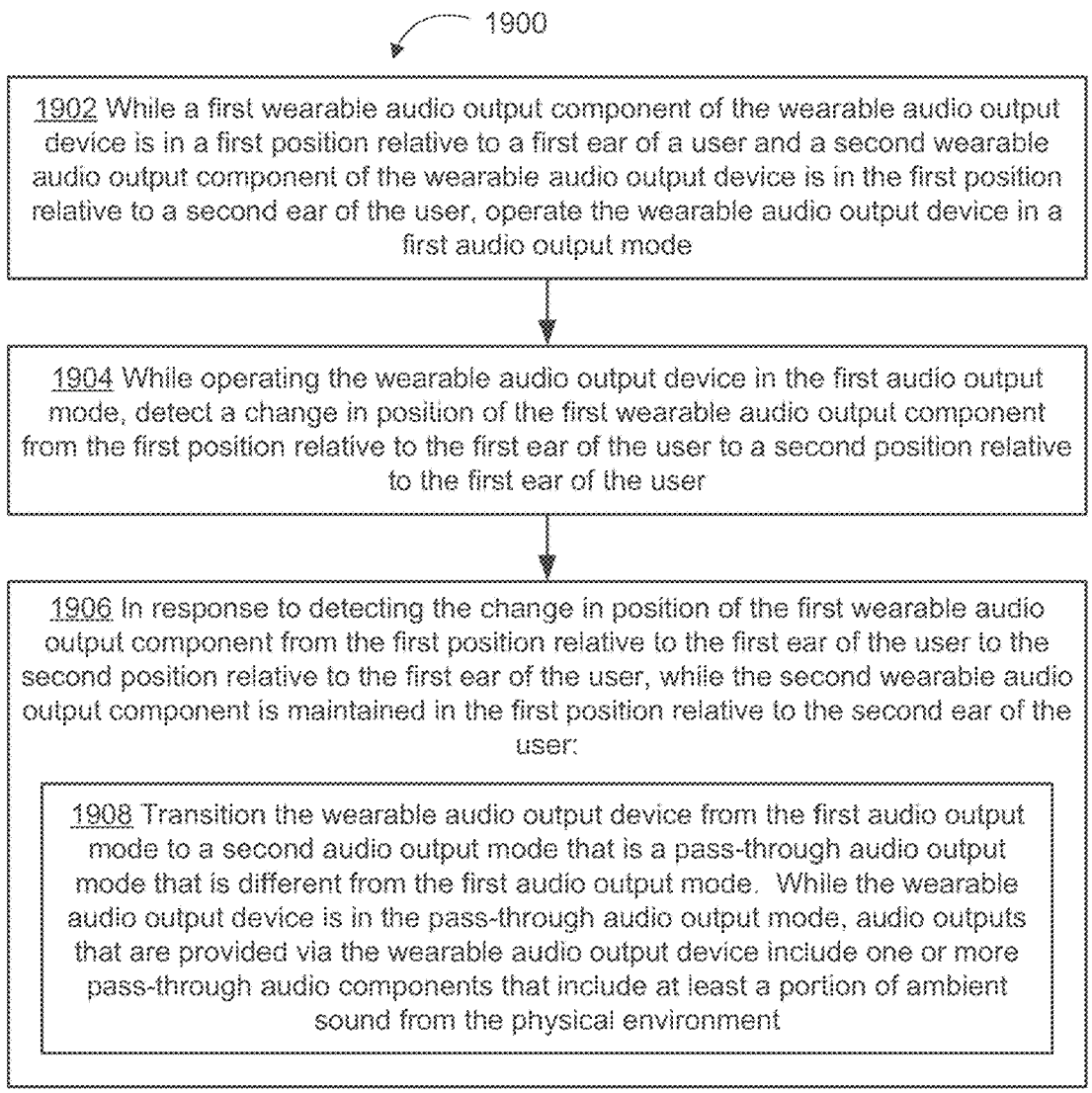

FIGS. 19A-19C are flow diagrams illustrating method 1900 of transitioning audio output mode of a wearable audio output device in response to detected events in accordance with some embodiments. Method 1900 is performed at a computer system that includes a wearable audio output device (e.g., wearable audio output device 301, FIG. 3B) that is in a physical environment. Some operations in method 1900 are, optionally, combined and/or the order of some operations is, optionally, changed.

As described below, method 1900 automatically transitions a wearable audio output device (e.g., headphones) to a pass-through audio output mode in response to certain types of events, such as detected changes in position of a component (e.g., an earbud) of the wearable audio output device, that are likely indications that the user wants to hear more ambient sound from the surrounding physical environment. Transitioning the audio output mode of the wearable audio output device (e.g., automatically) when a set of conditions has been met without requiring further user input reduces the number of inputs needed to achieve the change in audio output mode, which enhances the operability of the device and makes the user-device interface more efficient (e.g., by helping the user to achieve an intended outcome and reducing user mistakes when operating/interacting with the device), which, additionally, reduces power usage and improves battery life of the device by enabling the user to use the device more quickly and efficiently.

While a first wearable audio output component of the wearable audio output device is in a first position relative to a first ear of a user and a second wearable audio output component of the wearable audio output device is in the first position relative to a second ear of the user, the computer system operates (1902) the wearable audio output device in a first audio output mode.

While operating the wearable audio output device in the first audio output mode, the computer system detects (1904) a change in position of the first wearable audio output component from the first position relative to the first ear of the user to a second position relative to the first ear of the user. In some embodiments, the change in position of the first wearable audio output component from the first position to the second position relative to the first ear includes removal of the first wearable audio output component from an in-ear position to a position that is not an in-ear position (e.g., removal of earbud 502-2 from ear 528-2, FIGS. 7I-7J and FIGS. 14X-14Y). In some embodiments, the change in position of the first wearable audio output component from the first position to the second position relative to the first ear includes placement of the first wearable audio output component into an in-ear position from a position that is not an in-ear position (e.g., placement of earbud 502-1 in ear 528-1, FIGS. 14G-14H).

In response to detecting the change in position of the first wearable audio output component from the first position relative to the first ear of the user to the second position relative to the first ear of the user (1906), while the second wearable audio output component is maintained in the first position relative to the second ear of the user, the computer system transitions (1908) the wearable audio output device from the first audio output mode to a second audio output mode that is a pass-through audio output mode that is different from the first audio output mode (e.g., the first mode being an audio output mode other than a pass-through mode, such as a noise-cancellation mode or a noise control off mode, and the second mode being the pass-through mode). For example, FIGS. 7I-7J illustrate that, in response to removal of earbud 502-2 from ear 528-2, earbuds 502 transition from the active noise control mode to the pass-through mode. In another example, FIGS. 14X-14Y illustrate similar behavior. In another example, FIGS. 14G-14H illustrate that, in response to placement of earbud 502-1 in ear 528-1 while earbud 502-2 is maintained outside of ear 528-2, earbuds 502 transition from the bypass mode to the pass-through mode. While the wearable audio output device is in the pass-through audio output mode, audio outputs that are provided via the wearable audio output device include one or more pass-through audio components that include at least a portion of ambient sound from the physical environment.

In some embodiments, a respective wearable audio output component being in the first position relative to a respective ear of the user includes (1910) the respective wearable audio output component being placed at least partially within the respective ear (e.g., within the outer ear and at least partially within the ear canal so as to form an acoustic seal between the ear and the surrounding physical environment, or on or in the ear and shaped so as to form an acoustic seal regardless of whether the device extends at least partially within the ear canal) (e.g., earbud 502-2 is in-ear in FIGS. 7I and 14X), and a respective wearable audio output component being in the second position relative to a respective ear of the user includes the respective wearable audio output component being outside of the respective ear (e.g., with no part of the respective wearable audio output device being in the respective ear) (e.g., earbud 502-2 is not in-ear in FIGS. 7J and 14Y).

Transitioning the wearable audio output device to a pass-through mode in response to detecting removal of a first component (e.g., a first earbud) of the wearable audio output device from an in-ear position to a position outside of the user's ears, while the second component (e.g., the other earbud) remains in the other ear of the user, provides the user with increased audio transparency of the wearable audio output device in the second component in accordance with the likelihood that removal of an earbud indicates that the user wants to hear more ambient sound from the surrounding physical environment. Performing an operation (e.g., automatically) when a set of conditions has been met without requiring further user input reduces the number of inputs needed to perform the operation, which enhances the operability of the device and makes the user-device interface more efficient (e.g., by helping the user to achieve an intended outcome and reducing user mistakes when operating/interacting with the device), which, additionally, reduces power usage and improves battery life of the device by enabling the user to use the device more quickly and efficiently.

In some embodiments, in response to detecting a change in position of the second wearable audio output component from the first position relative to the second ear of the user (e.g., an in-ear position) to the second position relative to the second ear of the user (e.g., an out-of-ear position, also called a not-in-ear position), while the first wearable audio output component is maintained in the second position relative to the first ear of the user (e.g., an out-of-ear position) (e.g., after transitioning the wearable audio output device from the first audio output mode to the second audio output mode that is the pass-through audio output mode, and while operating the wearable audio output device in the second audio output mode), the computer system transitions (1912) the wearable audio output device from the second audio output mode (e.g., that is the pass-through mode) to a third audio output mode that is a noise control off mode. In some embodiments, while the wearable audio output device is in the noise control off mode, audio outputs that are provided via the wearable audio output device do not include one or more (e.g., any) pass-through audio components that include at least a portion of ambient sound from the physical environment and do not include one or more (e.g., any) cancellation audio components selected so as to at least partially cancel ambient sound from the physical environment. For example, FIGS. 14F-14G illustrate that after earbud 502-2 is removed from ear 528-2 as shown in FIG. 14F, if the other earbud 502-1 is also removed from ear 528-1 as shown in FIG. 14G, earbuds 502 are transitioned to the bypass mode in response, as indicated by bypass icon 710 in FIG. 14G. It is noted that the scenario illustrated in FIG. 14F corresponds to the scenario illustrated in FIG. 7J or FIG. 14Y, which were referenced above for operation 1910. Accordingly, FIGS. 14F-14G illustrate a possible transition from the scenario illustrated in FIG. 7J or 14Y.

Transitioning the wearable audio output device to a noise control off mode in response to detecting removal of the second component (e.g., the other earbud) from an in-ear position while the first component remains outside of the user's ears avoids the power usage that would otherwise result from the wearable audio output device providing audio outputs during operation in the pass-through or noise-cancellation modes (e.g., due to the use of microphone(s) to detect ambient sound and the use of speaker(s) to output at least a portion of the detected ambient sound or to output audio that cancels at least a portion of the detected ambient sound) and improves battery life of the device, as it is not necessary to provide such outputs while both components are removed from the user's ears. In addition, performing an operation (e.g., automatically) when a set of conditions has been met without requiring further user input reduces the number of inputs needed to perform the operation, which enhances the operability of the device and makes the user-device interface more efficient (e.g., by helping the user to achieve an intended outcome and reducing user mistakes when operating/interacting with the device), thereby further reducing power usage and improving battery life of the device by enabling the user to use the device more quickly and efficiently.

In some embodiments, after detecting the change in position of the first wearable audio output component from the first position relative to the first ear of the user to a second position relative to the first ear of the user, in response to detecting a change in position of the first wearable audio output component from the second position relative to the first ear of the user back to the first position relative to the first ear of the user, while the second wearable audio output component is maintained in the first position relative to the first ear of the user (e.g., while operating the wearable audio output device in the second audio output mode that is a pass-through audio output mode), the computer system transitions (1914) the wearable audio output device from the second audio output mode to the first audio output mode. For example, as illustrated in FIGS. 7J-7K, earbuds 502 transition from the pass-through mode back to the prior (e.g., active noise control) mode in response to earbud 502-2 being replaced in ear 528-2, as shown in FIG. 7K, after being removed as shown in FIG. 7J.

Where the wearable audio output device was operating in a first audio output mode during a most recent prior instance that both components were detected as being in-ear, transitioning the wearable audio output device back to the first audio output mode in response to detecting placement of the first component back in an ear of the user, while the second component is maintained in the other ear of the user, enables the wearable audio output device to resume operation in the same first mode as before the interruption by the removal of the first component, without requiring the user to reselect the first audio output mode. Performing an operation (e.g., automatically) when a set of conditions has been met without requiring further user input reduces the number of inputs needed to perform the operation, which enhances the operability of the device and makes the user-device interface more efficient (e.g., by helping the user to achieve an intended outcome and reducing user mistakes when operating/interacting with the device), which, additionally, reduces power usage and improves battery life of the device by enabling the user to use the device more quickly and efficiently.

In some embodiments, a respective wearable audio output device being in the first position relative to a respective ear of the user includes (1916) the respective wearable audio output device being outside of the respective ear (e.g., with no part of the respective wearable audio output device being in the respective ear), and a respective wearable audio output device being in the second position relative to a respective ear of the user includes the respective wearable audio output device being placed at least partially in the respective ear (e.g., in the outer ear and at least partially within the ear canal). In some such embodiments, the first audio output mode is a noise control off mode in which neither pass-through audio components nor cancellation audio components are provided via the wearable audio output device (e.g., no audio outputs are provided, or any audio outputs that are provided via the wearable audio output device do not include any pass-through audio components and also do not include any cancellation audio components). For example, FIGS. 14G-14H illustrate that, in response to placement of earbud 502-1 in ear 528-1, earbuds 502 transition from the bypass (e.g., noise control off) mode to the pass-through mode.

Transitioning the wearable audio output device to a pass-through mode in response to detecting placement of a first component (e.g., a first earbud) of the wearable audio output device in an in-ear position, while the second component (e.g., the other earbud) remains outside of the user's ears, provides the user with increased audio transparency of the wearable audio output device in the first component that is in-ear, to provide a smoother audio transition between hearing the physical environment and becoming acoustically more isolated from the physical environment as the user places one component and then the next in-ear, and in accordance with the likelihood that, before placing the second component in-ear, the user wants to continue to hear ambient sound from the surrounding physical environment. Performing an operation (e.g., automatically) when a set of conditions has been met without requiring further user input reduces the number of inputs needed to perform the operation, which enhances the operability of the device and makes the user-device interface more efficient (e.g., by helping the user to achieve an intended outcome and reducing user mistakes when operating/interacting with the device), which, additionally, reduces power usage and improves battery life of the device by enabling the user to use the device more quickly and efficiently.

In some embodiments, prior to operating the wearable audio output device in the first audio output mode (e.g., which occurs while the first and second audio output components are in the first position relative to the user's ears), while the first wearable audio output component is in the second position relative to the first ear of the user (e.g., an in-ear position) and the second wearable audio output component is in the second position relative to the second ear of the user (e.g., an in-ear position), the computer system operates (1918) the wearable audio output device in a respective audio output mode (e.g., a previous audio output mode, in which the wearable audio output device operated during a most recent prior time that the first wearable audio output component was in the second position relative to the first ear of the user and the second wearable audio output component was in the second position relative to the second ear of the user). In some embodiments, after detecting the change in position of the first wearable audio output component from the first position relative to the first ear of the user to the second position relative to the first ear of the user (e.g., from a not-in-ear position to an in-ear position) (e.g., and after transitioning the wearable audio output device from the first audio output mode to the second audio output mode that is the pass-through audio output mode, and while operating the wearable audio output device in the second audio output mode), in response to detecting a change in position of the second wearable audio output component from the first position relative to the second ear of the user to the second position relative to the second ear of the user (e.g., from a not-in-ear position to an in-ear position), while the first wearable audio output component is maintained in the second position (e.g., an in-ear position) relative to the first ear of the user, the computer system transitions the wearable audio output device from the second audio output mode to the respective audio output mode (e.g., the previous audio output mode, in which the wearable audio output device was operated during a most recent prior time that both the first and second wearable audio output components were in-ear). For example, as described herein with reference to FIGS. 14H-14I, in response to placement of earbud 502-2 back in ear 528-2 (e.g., after earbud 502-1 was also replaced in ear 528-1), earbuds 502 transition to the previous audio output mode (or, as in the example shown in FIG. 14I, are maintained in the pass-through mode because the pass-through mode was the previous audio output mode).

Where the wearable audio output device was operating in a respective audio output mode during a most recent prior instance that both components were detected as being in-ear, transitioning the wearable audio output device back to the respective audio output mode in response to detecting placement of the first component back in an ear of the user after the second component has already been placed back in an ear of the user, and while the second component is maintained in the other ear of the user, enables the wearable audio output device to resume operation in the same respective mode as before the interruption by the removal of one or both components, without requiring the user to reselect the respective audio output mode. Performing an operation (e.g., automatically) when a set of conditions has been met without requiring further user input reduces the number of inputs needed to perform the operation, which enhances the operability of the device and makes the user-device interface more efficient (e.g., by helping the user to achieve an intended outcome and reducing user mistakes when operating/interacting with the device), which, additionally, reduces power usage and improves battery life of the device by enabling the user to use the device more quickly and efficiently.

In some embodiments, while operating the wearable audio output device in a respective audio output mode (e.g., an audio output mode other than the pass-through mode, such as a noise-cancellation mode or a noise control off mode) (e.g., while the first and second wearable audio output components are both in in-ear positions relative to the user's ears), the computer system receives (1920) an alert of an incoming phone call (e.g., a voice or video call from an external device). For example, FIGS. 14Q-14R illustrate receipt of a phone call while operating earbuds 502 in the active noise control mode. In some embodiments, the computer system detects an input that corresponds to a request to answer the incoming phone call (e.g., input 1422 on "Accept" button 1418, FIG. 14S), and, in response to detecting the input corresponding to a request to answer the incoming phone call, the computer system transitions the wearable audio output device from the respective audio output mode to the second audio output mode (e.g., from the noise-cancellation mode or noise control off mode to the pass-through mode) (e.g., in combination with connecting the phone call by establishing a connection with the external device). For example, as described herein with reference to FIGS. 14S-14T, earbuds 502 are transitioned from the active noise control mode to the pass-through mode in response to input 1422 in FIG. 14S to answer the incoming call.

Transitioning the wearable audio output device to a pass-through mode in response to the user answering an incoming phone call provides the user with increased audio transparency of the wearable audio output device in accordance with the indication that the user is likely about to speak (e.g., engage in the phone conversation), as operating in the pass-through mode mitigates the undesirable occlusion effect that wearable audio output devices (e.g., whether over-ear headphones, earbuds, or in-ear earphones) often have on the user's perception of his or her own voice while talking. Performing an operation (e.g., automatically) when a set of conditions has been met without requiring further user input reduces the number of inputs needed to perform the operation, which enhances the operability of the device and makes the user-device interface more efficient (e.g., by helping the user to achieve an intended outcome and reducing user mistakes when operating/interacting with the device), which, additionally, reduces power usage and improves battery life of the device by enabling the user to use the device more quickly and efficiently.

In some embodiments, the computer system detects (1922) termination of the phone call (e.g., an input that corresponds to a request to end the ongoing connected phone call, such as input 1426 on end call icon 1424 in FIG. 14U, or loss of connection with the external device), and, in response to detecting the termination of the phone call, the computer system transitions the wearable audio output device from the second audio output mode to the respective audio output mode (e.g., from the pass-through mode back to the audio output mode in which the wearable audio output device was operating when the incoming phone call was received). For example, as described herein with reference to FIGS. 14U-14V, earbuds 502 are transitioned from the pass-through mode back to the active noise control mode (e.g., the previous audio output mode, in which earbuds 502 were operating when the incoming call was received) in response to input 1426 in FIG. 14U to end the call.

Where the wearable audio output device was operating in a respective audio output mode just prior to the user answering the incoming phone call, transitioning the wearable audio output device from the pass-through mode back to the respective audio output mode in response to detecting termination of the phone call enables the wearable audio output device to resume operation in the same respective mode as before the interruption by the phone call, without requiring the user reselect the respective audio output mode. Performing an operation (e.g., automatically) when a set of conditions has been met without requiring further user input reduces the number of inputs needed to perform the operation, which enhances the operability of the device and makes the user-device interface more efficient (e.g., by helping the user to achieve an intended outcome and reducing user mistakes when operating/interacting with the device), which, additionally, reduces power usage and improves battery life of the device by enabling the user to use the device more quickly and efficiently.

It should be understood that the particular order in which the operations in FIGS. 19A-19C have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 1000, 1100, 1200, 1800, 2000, 2400, and 2600) are also applicable in an analogous manner to method 1900 described above with respect to FIGS. 19A-19C. For example, the devices, components, positions, events, user interfaces, audio outputs, and audio output modes described above with reference to method 1900 optionally have one or more of the characteristics of the devices, components, positions, events, user interfaces, audio outputs, and audio output modes described herein with reference to other methods described herein (e.g., methods 1000, 1100, 1200, 1800, 2000, 2400, and 2600). For brevity, these details are not repeated here.

Figure 20A:
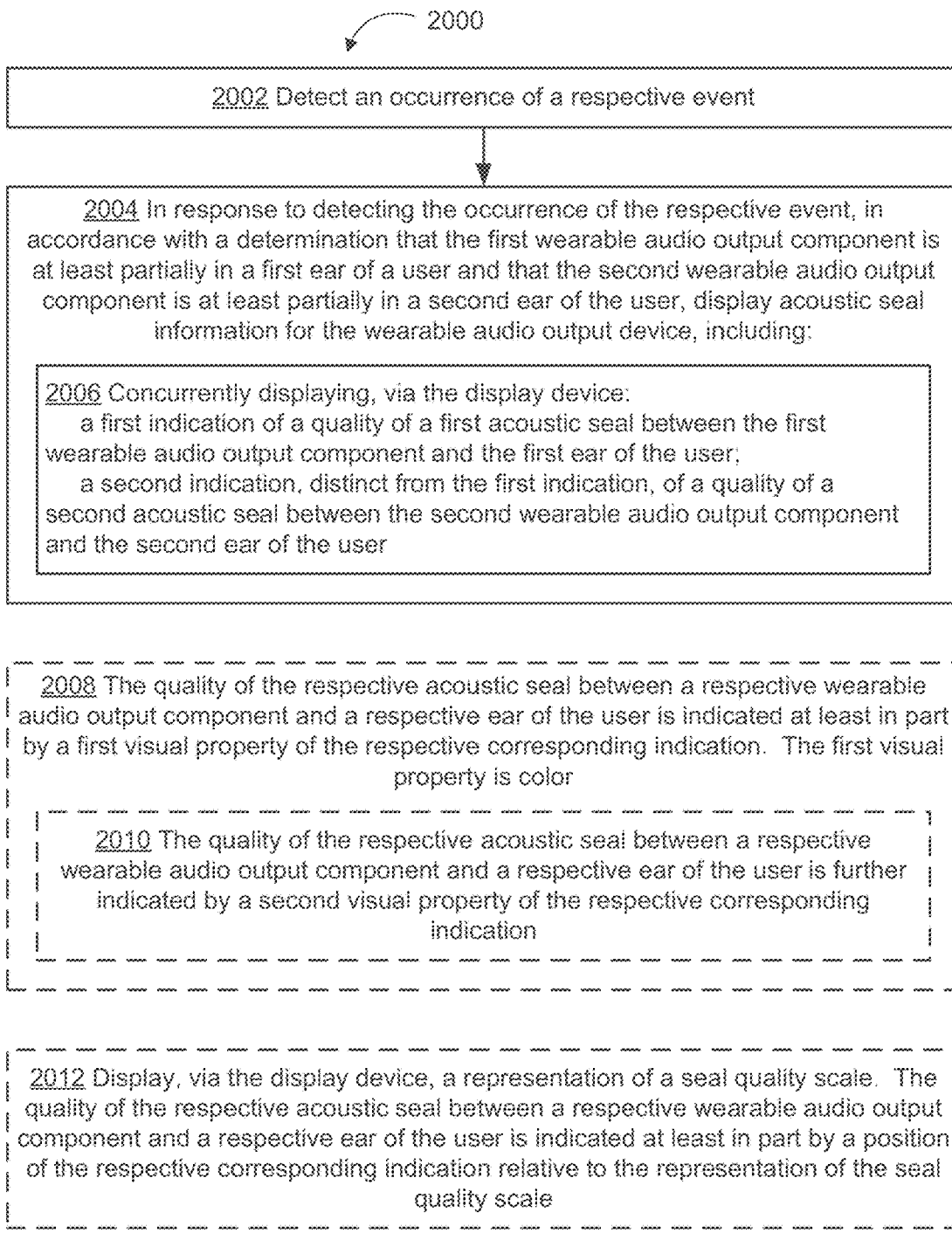

FIGS. 20A-20B are flow diagrams illustrating method 2000 of displaying information about acoustic seal quality of a wearable audio output device in accordance with some embodiments. Method 2000 is performed at a computer system that includes a display device (e.g., touch-sensitive display system 112 in FIG. 1A or display 340 in FIG. 3A) and a wearable audio output device (e.g., wearable audio output device 301, FIG. 3B). The wearable audio output device includes a first wearable audio output component (e.g., earbud 502-1, FIG. 5A) and a second wearable audio output component (e.g., earbud 502-2, FIG. 5B). Some operations in method 2000 are, optionally, combined and/or the order of some operations is, optionally, changed.

As described below, method 2000 provides an improved user interface for conveying information about the quality of acoustic seals formed between components (e.g., earbuds) of a wearable audio output device and a user's ears, to help the user optimize the fit and thereby optimize the audio experience of the wearable audio output device components. Displaying information about acoustic seals provides the user with visual feedback as to whether the wearable audio output device components are properly fitted and prompts the user to improve the acoustic seals when the acoustic seals are poor. Providing improved feedback to the user enhances the operability of the wearable audio output device and makes the user-device interface more efficient (e.g., by helping the user to achieve an intended outcome and reducing user mistakes when operating/interacting with the device), which, additionally, reduces power usage and improves battery life of the device by enabling the user to use the device more quickly and efficiently. In addition, improving the acoustic seals between the wearable audio output device components and the user's ears enables audio to be played at a lower volume to produce the same effective audio volume perceived by the user (e.g., relative to when the wearable audio output device components are not properly fitted, in which case hearing some ambient sound may cause the user to increase the audio output volume), thereby further reducing power usage and improving battery life of the device.

The computer system detects (2002) an occurrence of a respective event (e.g., a sequence of one or more inputs that corresponds to a request to display acoustic seal information for the wearable audio output device, such as by activation of a user interface element for initiating a process to determine fit of the first and second wearable audio output components, or automatic detection that there is an acoustic seal problem with one or both components of the wearable audio output device). FIGS. 16A-16B illustrate at least a portion of a sequence of one or more inputs that correspond to a request to display acoustic seal information for earbuds 502, including input 1604 in FIG. 16A to display the fit test user interface and input 1612 in FIG. 16B to initiate the fit test.

In response to detecting the occurrence of the respective event (e.g., receiving at least input 1612 in FIG. 16B), in accordance with a determination that the first wearable audio output component is at least partially in a first ear of the user (e.g., the first wearable audio output component is in an in-ear position relative to the first ear) and that the second wearable audio output component is at least partially in a second ear of the user (e.g., the second wearable audio output component is in an in-ear position relative to the second ear) (e.g., earbuds 502 are both in-ear in FIG. 16B), the computer system displays (2004) acoustic seal information for the wearable audio output device, including: concurrently displaying (2006), via the display device: a first indication of a quality of a first acoustic seal between the first wearable audio output component and the first ear of the user; and a second indication, distinct from the first indication, of a quality of a second acoustic seal between the second wearable audio output component and the second ear of the user. For example, FIGS. 16D-16G illustrates user interfaces that indicate acoustic seal quality for earbuds 502 and that are displayed in response to input 1612 in FIG. 16B (optionally after an intervening progress user interface, such as user interface 1606-2 in FIG. 16C, being displayed to indicate that the fit test (also called an acoustic seal quality test) is in progress). The example user interfaces in FIGS. 16D-16G include pairs of indicators 1624, 1628, 1630, and 1632 of acoustic seal quality between respective earbuds 502 and respective ears 528. In some embodiments, the first indication includes a first graphical indication and first text. In some embodiments, the second indication includes a second graphical indication and second text. In some embodiments, after concurrently displaying the first and second indications of seal quality of the first and second wearable audio output components, the computer system detects the occurrence of a second event (e.g., a sequence of one or more inputs that corresponds to a request to display acoustic seal information for the wearable audio output device, such as by activation of a user interface element for initiating, or reinitiating, a process to determine the fit of the first and second wearable audio output components) and, in response to detecting the occurrence of the second event, displays updated acoustic seal information for the first and second wearable audio output components in accordance with a determination that the components are in-ear. In some embodiments, the process to determine fit can be repeated any number of times, each time updating the acoustic seal information for the first and second wearable audio output components.

In some embodiments, the quality of the respective acoustic seal between a respective wearable audio output component and a respective ear of the user is indicated at least in part by a first visual property of (e.g., a graphical portion of) the respective corresponding indication, where the first visual property is color (e.g., green indicates a good seal). For example, as described herein with reference to FIGS. 16D-16G, the respective colors of indicators 1624, 1628, 1630, and 1632 are varied to indicate different acoustic seal qualities.

Indicating acoustic seal quality by the color of an acoustic seal quality indicator provides intuitive visual feedback to the user so that the user can quickly assess the fit of the wearable audio output device and determine which, if any, acoustic seals need to be improved. Providing improved feedback to the user enhances the operability of the device and makes the user-device interface more efficient (e.g., by helping the user to achieve an intended outcome and reducing user mistakes when operating/interacting with the device), which, additionally, reduces power usage and improves battery life of the device by enabling the user to use the device more quickly and efficiently. In addition, prompting the user to improve the acoustic seals between the wearable audio output device and the user's ears enables audio to be played at a lower volume to produce the same effective audio volume perceived by the user (e.g., relative to when the wearable audio output device is not properly fitted, in which case hearing some ambient sound may cause the user to increase the audio output volume), thereby further reducing power usage and improving battery life of the device.

In some embodiments, the quality of the respective acoustic seal between a respective wearable audio output component and a respective ear of the user is further indicated by a second visual property (e.g., position) of (e.g., the graphical portion of) the respective corresponding indication. For example, as described herein with reference to FIGS. 16D-16G, the respective positions of indicators 1624, 1628, 1630, and 1632 are varied to indicate different acoustic seal qualities (e.g., the closer the position of the graphical indication to the top edge of the display device, the better the seal indicated). In some embodiments, a representation of a seal quality threshold is displayed via the display device, and a position of the graphical indication relative to the representation of the seal quality threshold indicating the quality of the respective corresponding acoustic seal. For example, a horizontal line representing the seal quality threshold is displayed, and positioning of the graphical indication above the horizontal line indicates a good (e.g., or at least sufficient) acoustic seal, whereas positioning of the graphical indication below the horizontal line indicates a poor (e.g., or insufficient) acoustic seal.

Indicating acoustic seal quality by a different visual property of an acoustic seal quality indicator in addition to color provides additional visual feedback to the user so that the user can even more quickly assess the fit of the wearable audio output device and determine which, if any, acoustic seals need to be improved. Providing improved feedback to the user enhances the operability of the device and makes the user-device interface more efficient (e.g., by helping the user to achieve an intended outcome and reducing user mistakes when operating/interacting with the device), which, additionally, reduces power usage and improves battery life of the device by enabling the user to use the device more quickly and efficiently. In addition, prompting the user to improve the acoustic seals between the wearable audio output device and the user's ears enables audio to be played at a lower volume to produce the same effective audio volume perceived by the user (e.g., relative to when the wearable audio output device is not properly fitted, in which case hearing some ambient sound may cause the user to increase the audio output volume), thereby further reducing power usage and improving battery life of the device.

In some embodiments, the computer system displays (2012), via the display device, a representation of a seal quality scale (e.g., including one or more marks representing a seal quality threshold, such as a line segment corresponding to the first indication and the second indication, or two collinear segments each corresponding to a respective indication, such as threshold marker 1620-1 corresponding to the indicator for earbud 502-1 and threshold marker 1620-2 corresponding to the indicator for earbud 502-2; and/or including a plurality of marks at different intervals representing different levels of seal quality and corresponding to one or both indications). In some embodiments, the quality of the respective acoustic seal between a respective wearable audio output component and a respective ear of the user is indicated at least in part by (e.g., a respective visual property such as) a position of the respective corresponding indication (e.g., or at least a portion, such as a graphical portion, of the respective corresponding indication) relative to the representation of the seal quality scale (e.g., the positions of indicators 1624, 1628, 1630, and 1632 relative to threshold markers 1620 in FIGS. 16D-16G).

Indicating acoustic seal quality by displaying acoustic seal quality indicators relative to a displayed seal quality scale and optionally relative to a displayed acoustic seal threshold provides intuitive visual feedback to the user so that the user can quickly assess the fit of the wearable audio output device and determine which, if any, acoustic seals need adjustment due to failing to meet a threshold acoustic seal quality. Providing improved feedback to the user enhances the operability of the device and makes the user-device interface more efficient (e.g., by helping the user to achieve an intended outcome and reducing user mistakes when operating/interacting with the device), which, additionally, reduces power usage and improves battery life of the device by enabling the user to use the device more quickly and efficiently. In addition, prompting the user to improve the acoustic seals between the wearable audio output device and the user's ears enables audio to be played at a lower volume to produce the same effective audio volume perceived by the user (e.g., relative to when the wearable audio output device is not properly fitted, in which case hearing some ambient sound may cause the user to increase the audio output volume), thereby further reducing power usage and improving battery life of the device.

In some embodiments, the computer system indicates (2014) the quality of the first acoustic seal relative to the quality of the second acoustic seal. In some embodiments, the relative quality of the acoustic seals is indicated via a portion of the first indication and/or a portion of the second indication (e.g., graphical portions and/or text portions). In some embodiments, the relative quality of the acoustic seals is indicated via relative values of a respective visual property of the first indication and the second indication (e.g., relative colors, relative positions, etc.). For example, as described herein with reference to FIG. 16D, the position of indicator 1624-1 relative to the position of indicator 1624-2 indicates the relative quality between the acoustic seal of earbud 502-1 with ear 528-1 and the acoustic seal of earbud 502-2 with ear 528-2 (and similarly for indicator pairs 1628, 1630, and 1632 in FIGS. 16E-16G). In some embodiments, the relative quality of the acoustic seals is indicated via a third indication that is distinct from the first and second indications (e.g., via a separate graphical indication or separate text). In some embodiments, the relative quality of the acoustic seals is indicated in accordance with a determination that one or both seals fail to satisfy an acoustic seal quality threshold. In some embodiments, the relative quality of the acoustic seals is indicated without regard to whether one or both seals fail to satisfy the acoustic seal quality threshold.

Indicating acoustic seal quality of the acoustic seals relative to each other provides intuitive visual feedback to the user so that the user can quickly assess the fit of the wearable audio output device and determine which acoustic seal needs adjustment more. Providing improved feedback to the user enhances the operability of the device and makes the user-device interface more efficient (e.g., by helping the user to achieve an intended outcome and reducing user mistakes when operating/interacting with the device), which, additionally, reduces power usage and improves battery life of the device by enabling the user to use the device more quickly and efficiently. In addition, prompting the user to improve the acoustic seals between the wearable audio output device and the user's ears enables audio to be played at a lower volume to produce the same effective audio volume perceived by the user (e.g., relative to when the wearable audio output device is not properly fitted, in which case hearing some ambient sound may cause the user to increase the audio output volume), thereby further reducing power usage and improving battery life of the device.

In some embodiments, the quality of the first acoustic seal relative to the quality of the second acoustic seal is indicated (2016) using text (e.g., text that is part of the first text of the first indication and/or the second text of the second indication, or, alternatively or in addition, text that is separate from the first and second indications, such as instructions 1625 in FIGS. 16D-16G).

Indicating acoustic seal quality with a text description provides intuitive and unambiguous visual feedback to the user so that the user can quickly assess the fit of the wearable audio output device and determine which, if any, acoustic seals need to be improved. Providing improved feedback to the user enhances the operability of the device and makes the user-device interface more efficient (e.g., by helping the user to achieve an intended outcome and reducing user mistakes when operating/interacting with the device), which, additionally, reduces power usage and improves battery life of the device by enabling the user to use the device more quickly and efficiently. In addition, prompting the user to improve the acoustic seals between the wearable audio output device and the user's ears enables audio to be played at a lower volume to produce the same effective audio volume perceived by the user (e.g., relative to when the wearable audio output device is not properly fitted, in which case hearing some ambient sound may cause the user to increase the audio output volume), thereby further reducing power usage and improving battery life of the device.

In some embodiments, displaying the acoustic seal information for the wearable audio output device includes (2018), in accordance with a determination that the quality of the first acoustic seal does not meet (e.g., is below, or at or below) an acoustic seal quality threshold and/or that the quality of the second acoustic seal does not meet the acoustic seal quality threshold, displaying, via the display device, one or more instructions prompting the user to perform one or more adjustments of the wearable audio output device (e.g., adjustments for adjusting the acoustic seal(s) of one or both wearable audio output components). For example, instruction 1625-1 in FIG. 16D and instruction 1625-2 in FIG. 16E include suggestions for adjustments to make to earbuds 502 to improve the fit and the quality of the acoustic seals of earbuds 502. In some embodiments, after displaying the one or more instructions, the computer system detects that one or more adjustments have made to one or both wearable audio output components of the wearable audio output device (e.g., by detecting removal of a respective wearable audio component from an in-ear position and replacement of the respective component in an in-ear position).

(Automatically) displaying instructions prompting the user to adjust the wearable audio output device when the acoustic seal quality of the acoustic seals fail to meet a threshold acoustic seal quality provides the user with visual feedback as to actions to perform to improve the fit of the wearable audio output device. Providing improved feedback to the user enhances the operability of the device and makes the user-device interface more efficient (e.g., by helping the user to achieve an intended outcome and reducing user mistakes when operating/interacting with the device), which, additionally, reduces power usage and improves battery life of the device by enabling the user to use the device more quickly and efficiently. In addition, prompting the user to improve the acoustic seals between the wearable audio output device and the user's ears enables audio to be played at a lower volume to produce the same effective audio volume perceived by the user (e.g., relative to when the wearable audio output device is not properly fitted, in which case hearing some ambient sound may cause the user to increase the audio output volume), thereby further reducing power usage and improving battery life of the device.

In some embodiments, displaying the acoustic seal information for the wearable audio output device includes (2020), in accordance with a determination that the quality of the first acoustic seal meets an acoustic seal quality threshold and that the quality of the second acoustic seal meets the acoustic seal quality threshold, forgoing displaying one or more (e.g., any) instructions prompting the user to perform one or more adjustments of the wearable audio output device (e.g., adjustments for adjusting the acoustic seal(s) of one or both wearable audio output components). For example, user interface 1606-6 in FIG. 16G does not include any suggestions for adjustments to make to earbuds 502, because the acoustic seal qualities of earbuds 502 are both good (e.g., above threshold markers 1620). In the example shown in FIG. 16F, user interface 1606-5 does not include any suggestions for adjustments to make to earbuds 502 (e.g., one earbud has a good seal and the other earbud has at least an okay seal). In some embodiments, user interface 1606-5 in 16F includes a suggestion to adjust the earbud with the okay seal but does not include any suggestion to adjust the earbud with the good seal.

Forgoing displaying instructions prompting the user to adjust the wearable audio output device when the acoustic seal quality of both acoustic seals meet a threshold acoustic seal quality reduces clutter in the user interface while, by implication, indicating to the user that no action needs to be taken with respect to the fit of the wearable audio output device. Providing improved feedback to the user without cluttering the user interface with additional displayed elements enhances the operability of the device and makes the user-device interface more efficient (e.g., by helping the user to achieve an intended outcome and reducing user mistakes when operating/interacting with the device), which, additionally, reduces power usage and improves battery life of the device by enabling the user to use the device more quickly and efficiently.

In some embodiments, displaying the acoustic seal information for the wearable audio output device includes (2022) indicating the quality of the first acoustic seal relative to the quality of the second acoustic seal without regard to whether the quality of the first acoustic seal meets an acoustic seal quality threshold and without regard to whether the quality of the second acoustic seal meets the acoustic seal quality threshold. For example, as described herein with reference to FIG. 16G, the relative positions of indicators 1632-1 and 1632-2 indicate the relative acoustic seal qualities for earbuds 502-1 and 502-2, even though both earbuds 502 have good seals.

Indicating acoustic seal quality of the acoustic seals relative to each other without regard to the acoustic seal quality provides intuitive visual feedback to the user so that the user can quickly assess the fit of the wearable audio output device and determine which acoustic seal would benefit more from adjustment, or may need adjustment sooner (e.g., even if both acoustic seals are currently good seals). Providing improved feedback to the user without cluttering the user interface with additional displayed elements enhances the operability of the device and makes the user-device interface more efficient (e.g., by helping the user to achieve an intended outcome and reducing user mistakes when operating/interacting with the device), which, additionally, reduces power usage and improves battery life of the device by enabling the user to use the device more quickly and efficiently. In addition, prompting the user to further improve the acoustic seals between the wearable audio output device and the user's ears, even if the acoustic seals already satisfy an acoustic seal quality threshold, enables audio to be played at an even lower volume to produce the same effective audio volume perceived by the user (e.g., relative to when the wearable audio output device is not properly fitted, in which case hearing some ambient sound may cause the user to increase the audio output volume), thereby further reducing power usage and improving battery life of the device.

It should be understood that the particular order in which the operations in FIGS. 20A-20B have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 1000, 1100, 1200, 1800, 1900, 2400, and 2600) are also applicable in an analogous manner to method 2000 described above with respect to FIGS. 20A-20B. For example, the devices, components, fits and seal qualities, user interfaces, audio outputs, audio output modes, alerts, and adjustments described above with reference to method 2000 optionally have one or more of the characteristics of the devices, components, fits and seal qualities, user interfaces, audio outputs, audio output modes, alerts, and adjustments described herein with reference to other methods described herein (e.g., methods 1000, 1100, 1200, 1800, 1900, 2400, and 2600). For brevity, these details are not repeated here.

FIGS. 21A-21J illustrate example user interfaces and user interactions for changing the audio output mode of wearable audio output devices in accordance with some embodiments.

FIG. 21A illustrates enhanced volume control user interface 705, as described herein, displayed on touch screen 112 of device 100. Enhanced volume control user interface 705 includes selection indicator 713 displayed at a first position over pass-through icon 711 to indicate that the pass-through mode is the audio output mode in which earbuds 502, which are both in-ear with respect to ears 528, are currently operating. Because selection indicator 713 corresponds to an audio output mode in which earbuds 502 are currently able to operate (e.g., based on earbuds 502 both being in-ear), selection indicator 713 is displayed with a first color (e.g., gray fill). FIG. 21A also shows input 2102 received at a location (e.g., on touch screen 112) corresponding to selection indicator 713.

FIG. 21B illustrates a transition from FIG. 21A. In particular, FIG. 21B illustrates movement of input 2102 (e.g., along touch screen 112). In accordance with the movement of input 2102, selection indicator 713 is displayed as having moved from its position in FIG. 21A to a second position as shown in FIG. 21B. Because selection indicator 713 in FIG. 21B does not correspond to an audio output mode in which earbuds 502 are currently able to operate (e.g., because the position of selection indicator 713 in FIG. 21B does not correspond to an audio output mode), selection indicator 713 is displayed with a different, second color (e.g., no fill or white fill).

FIG. 21C illustrates a transition from FIG. 21B (or optionally from 21A). In particular, FIG. 21C illustrates (e.g., further) movement of input 2102, in accordance with which selection indicator 713 is displayed as having moved to a third position that corresponds to bypass icon 710. Because selection indicator 713 in FIG. 21C corresponds to an audio output mode in which earbuds 502 are currently able to operate (also called an "available" or a "selectable" audio output mode), selection indicator 713 is displayed with the first color. In some embodiments, earbuds 502 are transitioned to the audio output mode selected by selection indicator 713 (e.g., here, the noise control off mode) in response to and upon movement of selection indicator 713 to the position corresponding to the selected audio output mode without regard to whether input 2102 has ended. In some such embodiments, as in the example shown in FIG. 21C, in accordance with earbuds 502 transitioning audio output mode in response to selection indicator 713 moving to selectable bypass icon 710, tactile output 2104 is generated. In some embodiments, earbuds 502 are transitioned to the selected audio output mode upon input 2102 ending (e.g., here, upon liftoff of input 2102 from touch screen 112). In some embodiments, selection indicator 713 "snaps" into the third position corresponding to bypass icon 710 as shown in FIG. 21C by moving into the third position in response to input 2102 moving selection indicator 713 within a threshold distance of the third position. In some embodiments, selection indicator 713 "snaps" out of the third position by remaining in the third position until input 2102 requests movement of selection indicator 713 to beyond a threshold distance of the third position.

FIG. 21D illustrates a transition from FIG. 21C (or optionally from 21A or 21B). In particular, FIG. 21D illustrates (e.g., further) movement of input 2102, in accordance with which selection indicator 713 is displayed as having moved to a fourth position that corresponds to active noise control icon 709. Because selection indicator 713 in FIG. 21D corresponds to an audio output mode in which earbuds 502 are currently able to operate (e.g., because the active noise control mode is an available audio output mode while both earbuds 502 are in-ear), selection indicator 713 is displayed with the first color. In some embodiments, as described above with reference to FIG. 21C, earbuds 502 are transitioned to the audio output mode selected by selection indicator 713 (e.g., here, the active noise control mode) upon movement of selection indicator 713 to the position corresponding to the selected audio output mode without regard to whether input 2102 has ended, or upon input 2102 ending (e.g., via liftoff of a touch input). In some embodiments, selection indicator 713 "snaps" into or out of the fourth position corresponding to active noise control icon 709 as described above with reference to bypass icon 710 in FIG. 21C. In addition, in the example shown in FIG. 21D, tactile output 2106 is generated (e.g., in accordance with earbuds 502 transitioning to the active noise control mode in response to selection indicator 713 moving to selectable active noise control icon 709).

FIG. 21E illustrates a transition from FIG. 21D. In particular, FIG. 21E illustrates that input 2102 has ended (e.g., has ceased to be detected on touch screen 112). Because selection indicator 713 in FIG. 21E corresponds to an audio output mode in which earbuds 502 are currently able to operate (e.g., because the active noise control mode is an available audio output mode while both earbuds 502 are in-ear), selection indicator 713 continues to be displayed over active noise control icon 709, with the first color, after input 2102 ends. In some embodiments, as described above with reference to FIGS. 21C-D, earbuds 502 are transitioned to the active noise control mode upon input 2102 ending as shown in FIG. 21E. In other words, in such embodiments, earbuds 502 have not yet been transitioned to the active noise control mode in the scenarios shown in FIGS. 21C-21D, and earbuds 502 are not transitioned to the active noise control mode until the scenario shown in FIG. 21E.

FIG. 21F illustrates an alternate scenario to FIG. 21A in which earbud 502-1 is in-ear and earbud 502-2 is not in-ear. FIG. 21F illustrates enhanced volume control user interface 705, as described herein, including selection indicator 713 displayed over pass-through icon 711 to indicate that the pass-through mode is the audio output mode in which earbuds 502 are currently operating. Selection indicator 713 corresponds to an audio output mode in which earbuds 502 are currently able to operate (e.g., the pass-through mode is available because earbud 502-1 is in-ear, even though earbud 502-2 is not in-ear), and thus selection indicator 713 is displayed with the first color (e.g., gray fill). FIG. 21F also shows input 2108 received at a location (e.g., on touch screen 112) corresponding to selection indicator 713.

FIG. 21G illustrates a transition from FIG. 21F. In particular, FIG. 21G illustrates movement of input 2108 (e.g., along touch screen 112). In accordance with the movement of input 2108, selection indicator 713 is displayed as having moved from its position in FIG. 21F to a position as shown in FIG. 21G that corresponds to bypass icon 710. Because selection indicator 713 in FIG. 21G corresponds to an audio output mode in which earbuds 502 are currently able to operate, selection indicator 713 is displayed with the first color. In addition, tactile output 2110 is generated (e.g., because earbuds 502 have transitioned audio output mode in response to selection indicator 713 being moved to an audio output mode icon that corresponds to an available audio output mode).

FIG. 21H illustrates a transition from FIG. 21G. In particular, FIG. 21H illustrates movement of input 2108, in accordance with which selection indicator 713 is displayed as having moved from a position over bypass icon 710 to a position between bypass icon 710 and active noise control icon 709. Because selection indicator 713 in FIG. 21H does not correspond to an audio output mode in which earbuds 502 are currently able to operate (e.g., because the position of selection indicator 713 in FIG. 21H does not correspond to an audio output mode), selection indicator 713 is displayed with the second color.

FIG. 21I illustrates a transition from FIG. 21H (or optionally from 21G). In particular, FIG. 21I illustrates (e.g., further) movement of input 2108 to a position over active noise control icon 709. Because selection indicator 713 in FIG. 21I does not correspond to an audio output mode in which earbuds 502 are currently able to operate (e.g., because the active noise control mode is not an available audio output mode while at least earbud 502-2 is not in-ear, and, in accordance with some embodiments, an accessibility mode of device 100 is disabled), selection indicator 713 is displayed with the second color. In some embodiments, as indicated in the FIG. 21I example, a tactile output is not generated in accordance with selection indicator 713 moving to the position over active noise control icon 709 (e.g., because, even though active noise control icon 709 corresponds to an audio output mode, active noise control icon 709 does not correspond to a currently available audio output mode to which earbuds 502 may transition). In other embodiments, a tactile output (e.g., a selection tactile output that is a same type of tactile output as tactile output 2104 (FIG. 21C), tactile output 2106 (FIG. 21D), and/or tactile output 2110 (FIG. 21G)) is generated in accordance with selection indicator 713 moving to the position over active noise control icon 709 (e.g., without regard to whether the corresponding active noise control audio output mode is currently available).

FIG. 21J illustrates a transition from FIG. 21I. In particular, FIG. 21J illustrates that input 2108 has ended (e.g., has ceased to be detected on touch screen 112) while selection indicator 713 was displayed over active noise control icon 709 for the active noise control mode. Because selection indicator 713 was displayed over the icon for an unavailable audio output mode when input 2108 ended, FIG. 21J illustrates that device 100 ceases to display selection indicator 713 over the icon for the unavailable audio output mode (e.g., here, device 100 ceases to display selection indicator 713 over active noise control icon 709). In some embodiments, selection indicator 713 is displayed instead over bypass icon 710, the icon over which selection indicator 713 was most-recently displayed that corresponds to an available audio output mode (e.g., without regard to whether earbuds 502 were in fact transitioned to that available audio output mode). In some embodiments in which the audio output mode of earbuds 502 is not transitioned until an input such as input 2108 ends, selection indicator 713 is redisplayed over the icon for the audio output mode in which earbuds 502 are maintained (e.g., because earbuds 502 were not transitioned to the requested-but-unavailable active noise control mode) (e.g., without regard to whether selection indicator 713 was displayed over any intervening icons corresponding to other available audio output modes during user input 2108, prior to being displayed over active noise control icon 709 when input 2108 ended). In addition, as shown in FIG. 21J, device 100 generates error tactile output 2112 in response to input 2108 ending, to indicate to the user that selection indicator 713 was displayed over the icon for an unavailable audio output mode when input 2108 ended.

FIGS. 22A-22D illustrate example user interfaces and user interactions for accessing a settings user interface for controlling various features associated with wearable audio output devices in accordance with some embodiments.

FIG. 22A illustrates user interface 601-1, as described herein, displayed on touch screen 112 of device 100. FIG. 22A also shows a user's hand 2202 providing input 2204 at a respective volume button 2206 (e.g., to change the volume of audio outputs from device 100). Although FIG. 22A shows input 2204 provided at volume-up button 2206-1, input 2204 could similarly be provided at volume-down button 2206-2, and in some embodiments volume-up button 2206-1 and volume-down button 2206-2 are sub-elements of a single hardware element, volume button 2206.

FIG. 22B illustrates a transition from FIG. 22A. In particular, FIG. 22B illustrates that, in response to input 2204 at volume button 2206, volume control 2208 is displayed. Volume control 2208 indicates a current volume of audio outputs from device 100 (e.g., via earbuds 502) and in some embodiments is updated as the audio output volume is changed using further inputs via volume button 2206 or volume control 2208. For example, upward and downward swipe inputs on volume control 2008 may be provided to increase or decrease, respectively, the volume of audio outputs from device 100. In the example shown in FIG. 22B, device 100 is currently configured to output (e.g., and is currently outputting, as indicated by pause button 607 being displayed) audio outputs using earbuds 502. Accordingly, volume control 2208 includes glyph 2210, which is a graphical representation of earbuds 502, and text 2212, labeled "Earbuds."

FIG. 22C illustrates a transition from FIG. 22B. In particular, FIG. 22C illustrates input 2214 received at volume control 2208.

FIG. 22D illustrates a transition from FIG. 22C. In particular, FIG. 22D illustrates that, in response to input 2214, enhanced volume control user interface 705 is displayed. As shown in FIG. 22D, enhanced volume control user interface 705 optionally includes glyph 2210 to indicate the currently-selected audio output device. In some embodiments, enhanced volume control user interface 705 is displayed in accordance with a determination that input 2214 is a particular type of input on volume control 2208 (e.g., a long press gesture). It is noted that FIGS. 22A-22D illustrate a way to access enhanced volume control user interface 705 that in some embodiments is an alternative to other ways described herein (e.g., as illustrated in and described with reference to FIGS. 7A-7E).

FIGS. 23A-23AA illustrate example user interfaces and user interactions for controlling audio output settings for multiple wearable audio output devices using a single settings user interface.

FIG. 23A illustrates enhanced volume control user interface 2300, which is similar to enhanced volume control user interface 705 described herein, except that enhanced volume control user interface 2300 includes two sets of audio output controls 2310, 2320, for two different wearable audio output devices (e.g., a first wearable audio output device that is a pair of earphones, and a second wearable audio output device that is a set of headphones), respectively. First set of audio output controls 2310 includes representation 2312 of the earphones controlled by first set of audio output controls 2310 (e.g., optionally including a glyph of the earphones and/or a text description of the earphones ("Larry's Earphones")); volume control 2314 for controlling an audio output volume level of the earphones; and noise management control 2316 that indicates the audio output mode in which the earphones are currently operating. In the example shown in FIG. 23A, noise management control 2316 includes active noise control icon 709, thus indicating that the earphones are currently operating in the active noise control mode. Second set of audio output controls 2320 includes representation 2322 of the headphones controlled by second set of audio output controls 2320 (e.g., optionally including a glyph of the headphones and/or a text description of the headphones ("Delilah's Earphones")); volume control 2324 for controlling an audio output volume level of the headphones; and noise management control 2326 that indicates the audio output mode in which the headphones are currently operating. In the example shown in FIG. 23A, noise management control 2326 includes pass-through icon 711, thus indicating that the headphones are currently operating in the pass-through mode.

Figure 23B:
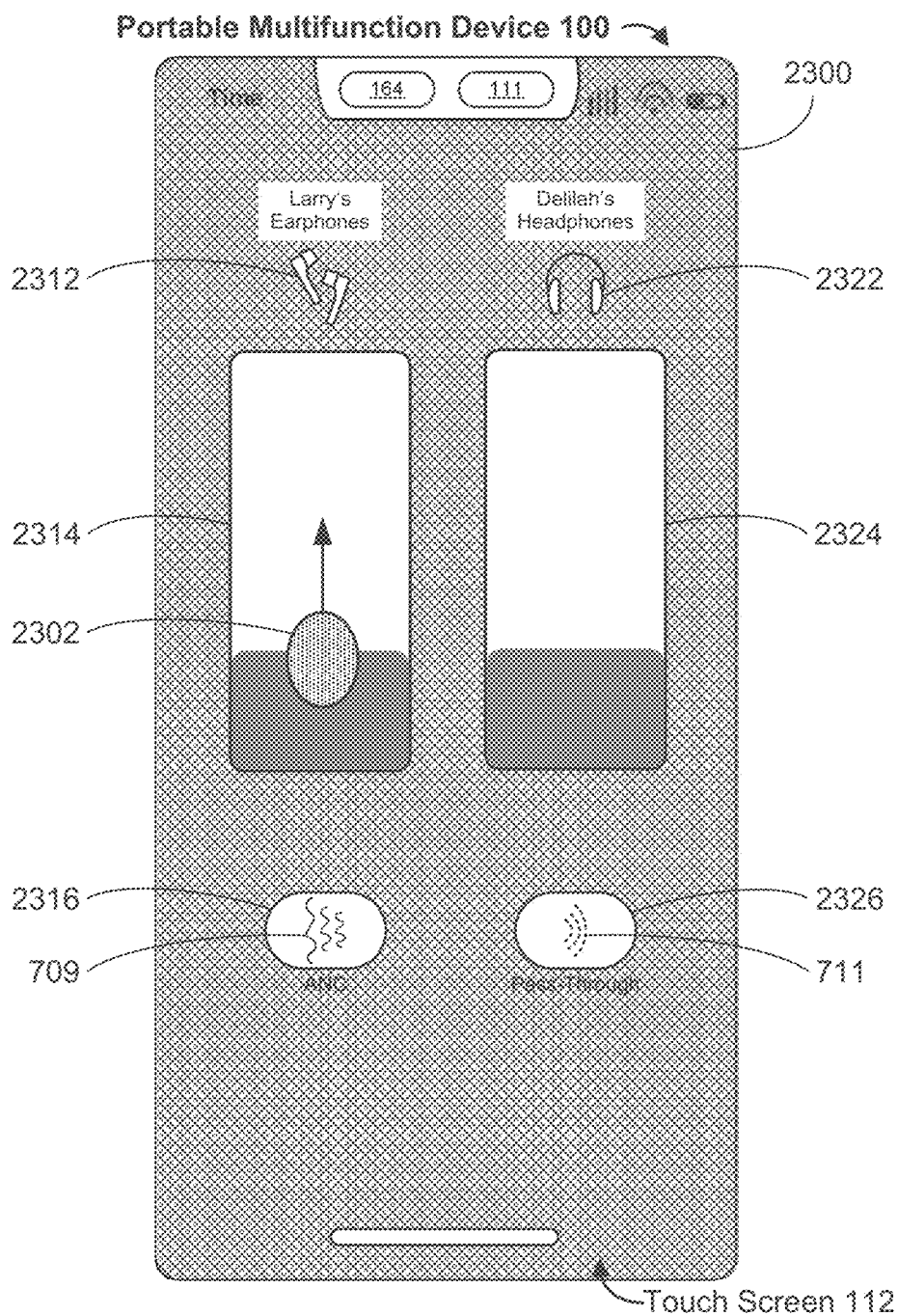

FIG. 23B illustrates a transition from FIG. 23A. In particular, FIG. 23B illustrates drag input 2302 corresponding to volume control 2314 and including a contact and movement of the contact upward along touch screen 112 to increase the volume of the earphones.

Figure 23C:
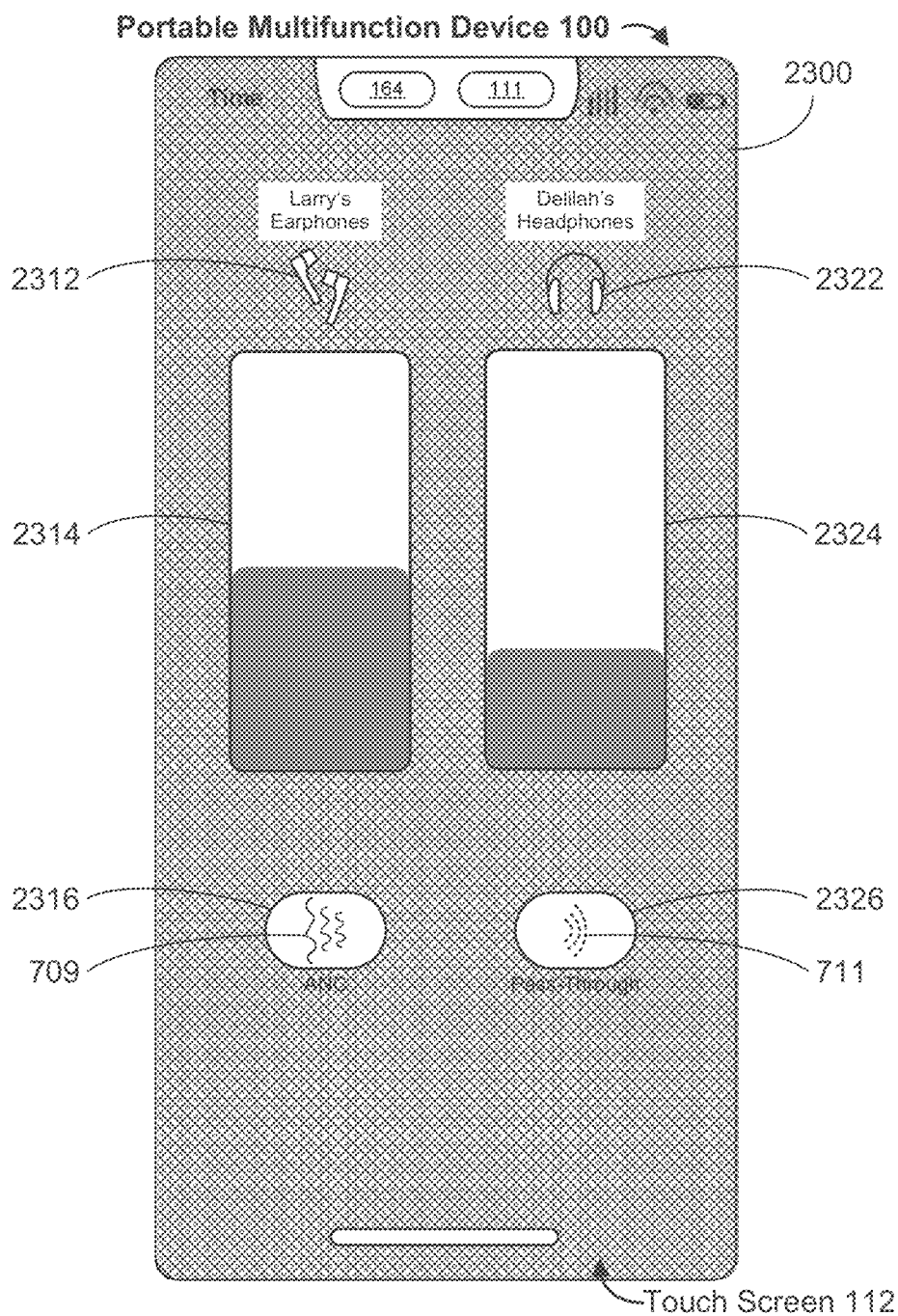

FIG. 23C illustrates a transition from FIG. 23B. In particular, FIG. 23C illustrates that, in response to drag input 2302, the volume of the earphones is increased and the increased volume is reflected in volume control 2314. As reflected in volume control 2324, the volume of the other wearable audio output device, the headphones, is unaffected by drag input 2302 corresponding to the earphones.

Figure 23D:
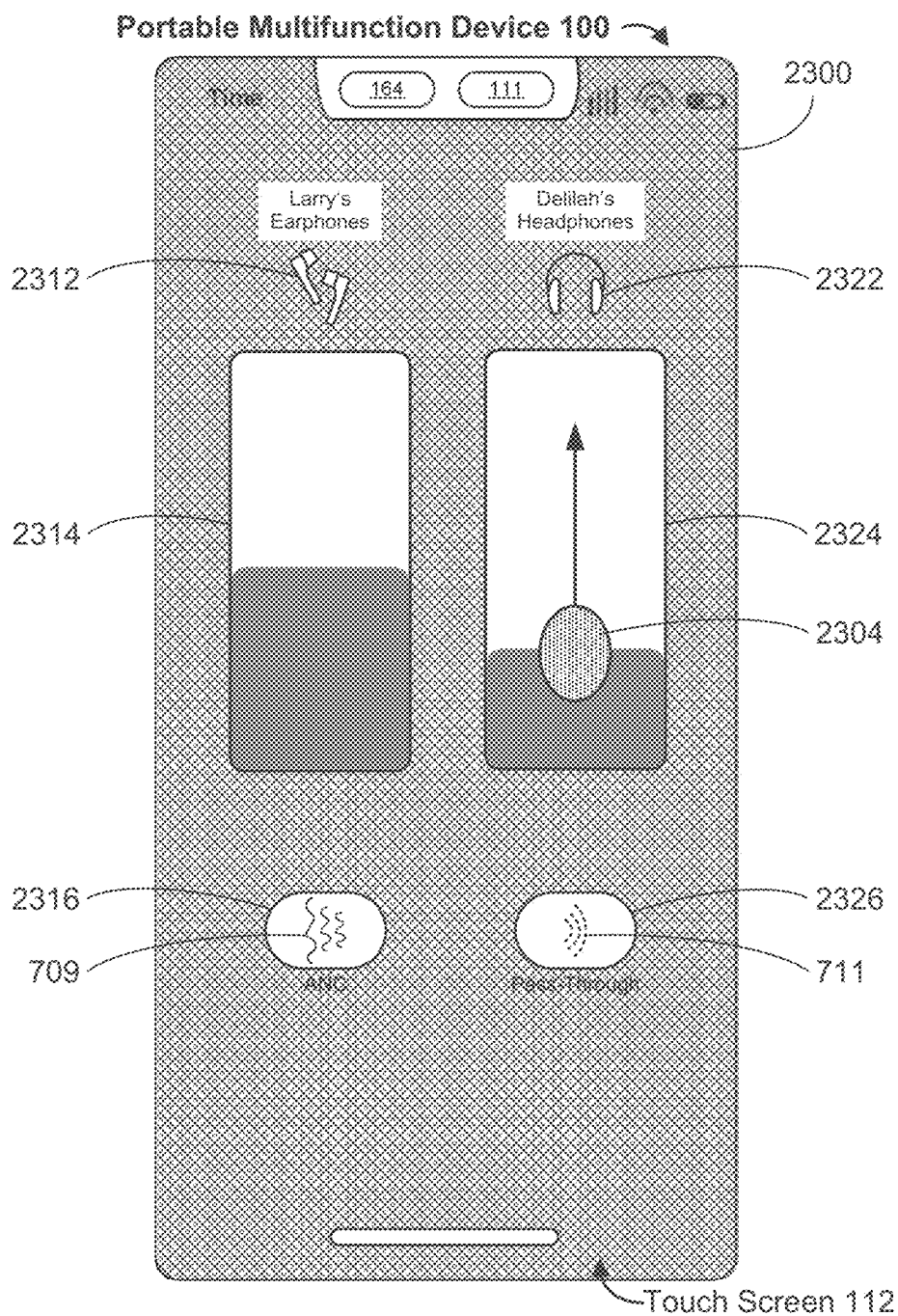

FIG. 23D illustrates a transition from FIG. 23A (or optionally from 23C). In particular, FIG. 23D illustrates drag input 2304 corresponding to volume control 2324 and including a contact and movement of the contact upward along touch screen 112 to increase the volume of the headphones.

Figure 23E:
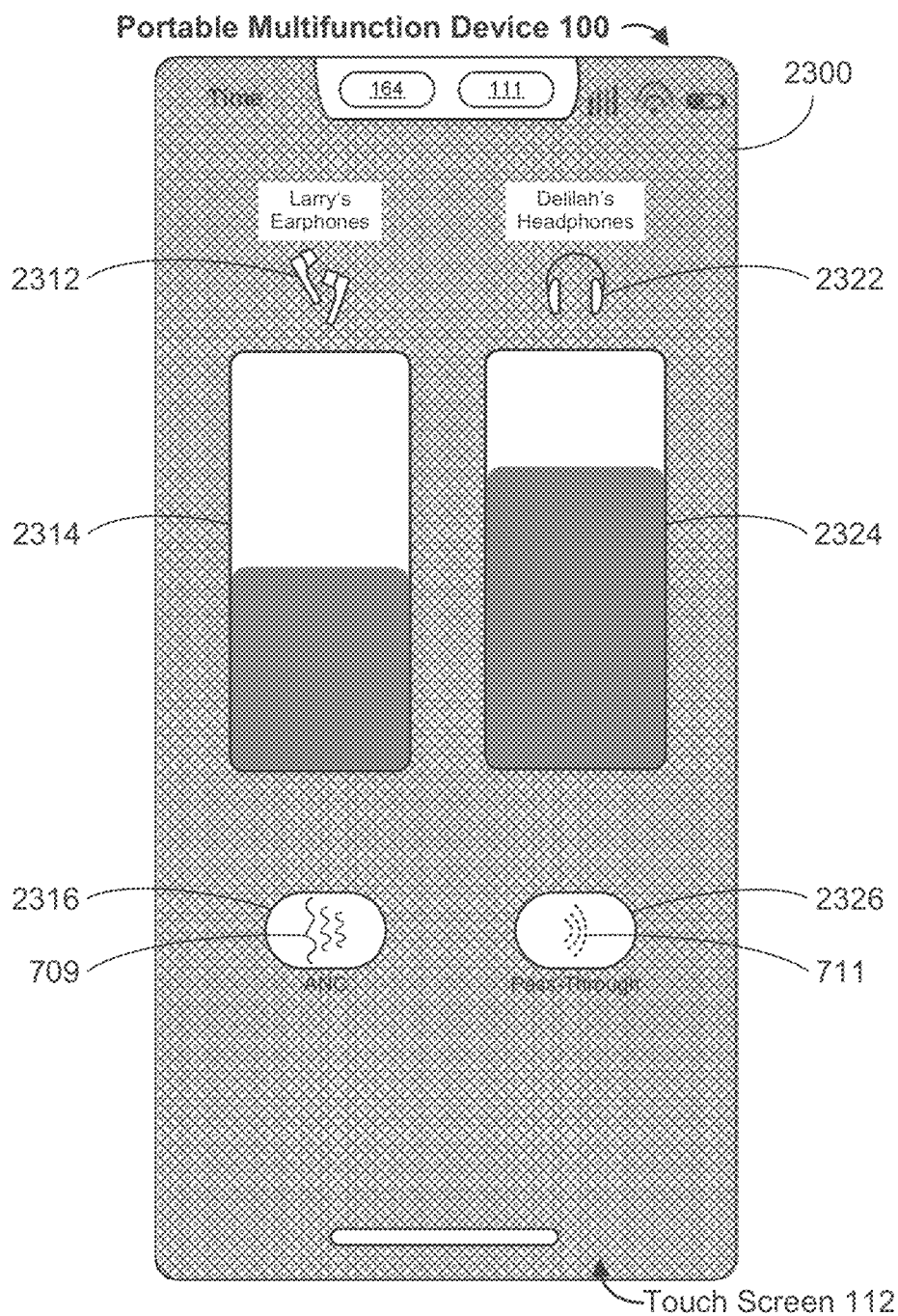

FIG. 23E illustrates a transition from FIG. 23D. In particular, FIG. 23E illustrates that, in response to drag input 2304, the volume of the headphones is increased and the increased volume is reflected in volume control 2324. As reflected in volume control 2314, the volume of the other wearable audio output device, the earphones, is unaffected by drag input 2304 corresponding to the headphones.

Figure 23F:
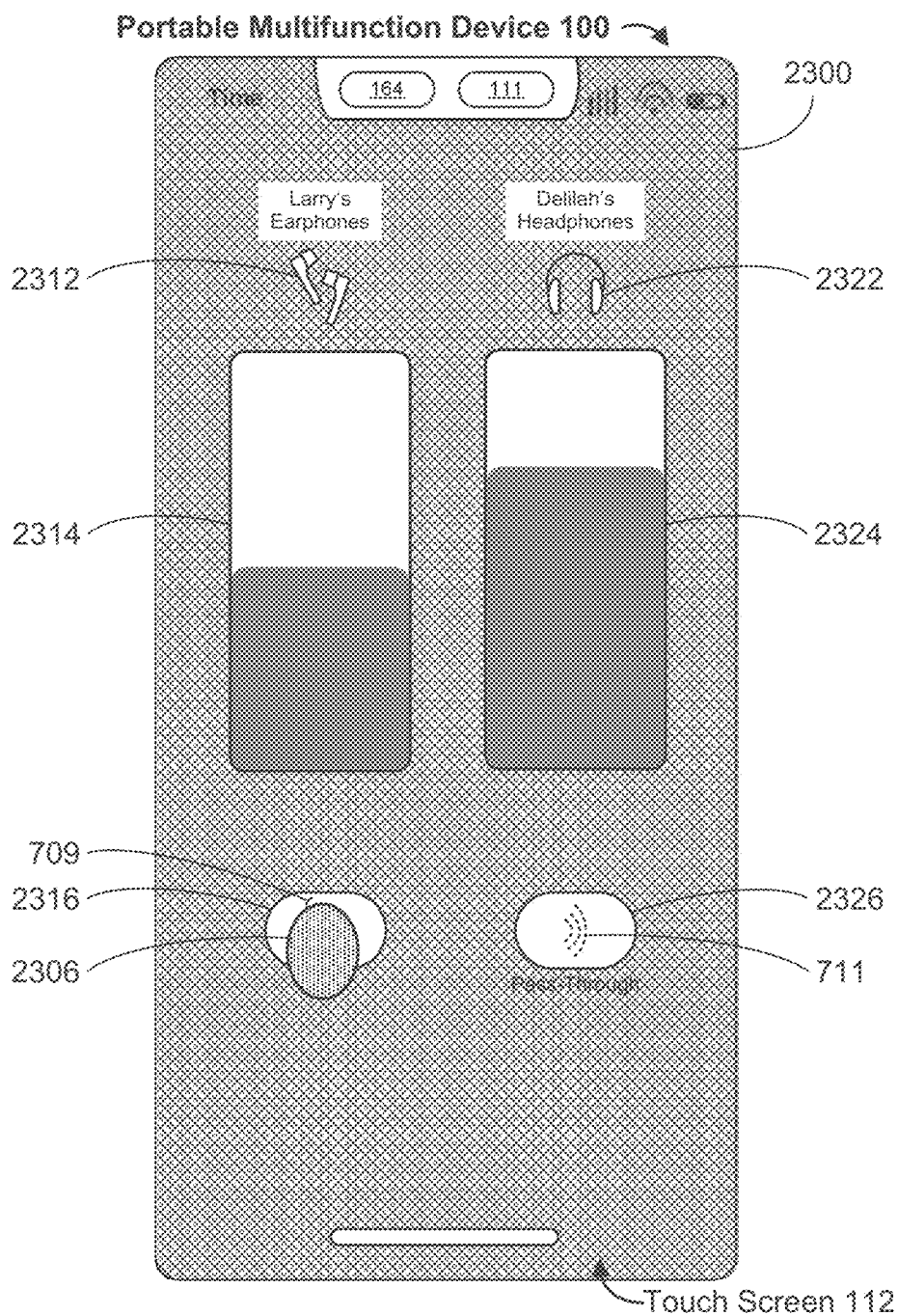

FIG. 23F illustrates a transition from FIG. 23E (or optionally from any preceding FIG. 23A-23E). In particular, FIG. 23F illustrates input 2306 (e.g., a tap gesture) activating noise management control 2316 for the earphones.

Figure 23G:
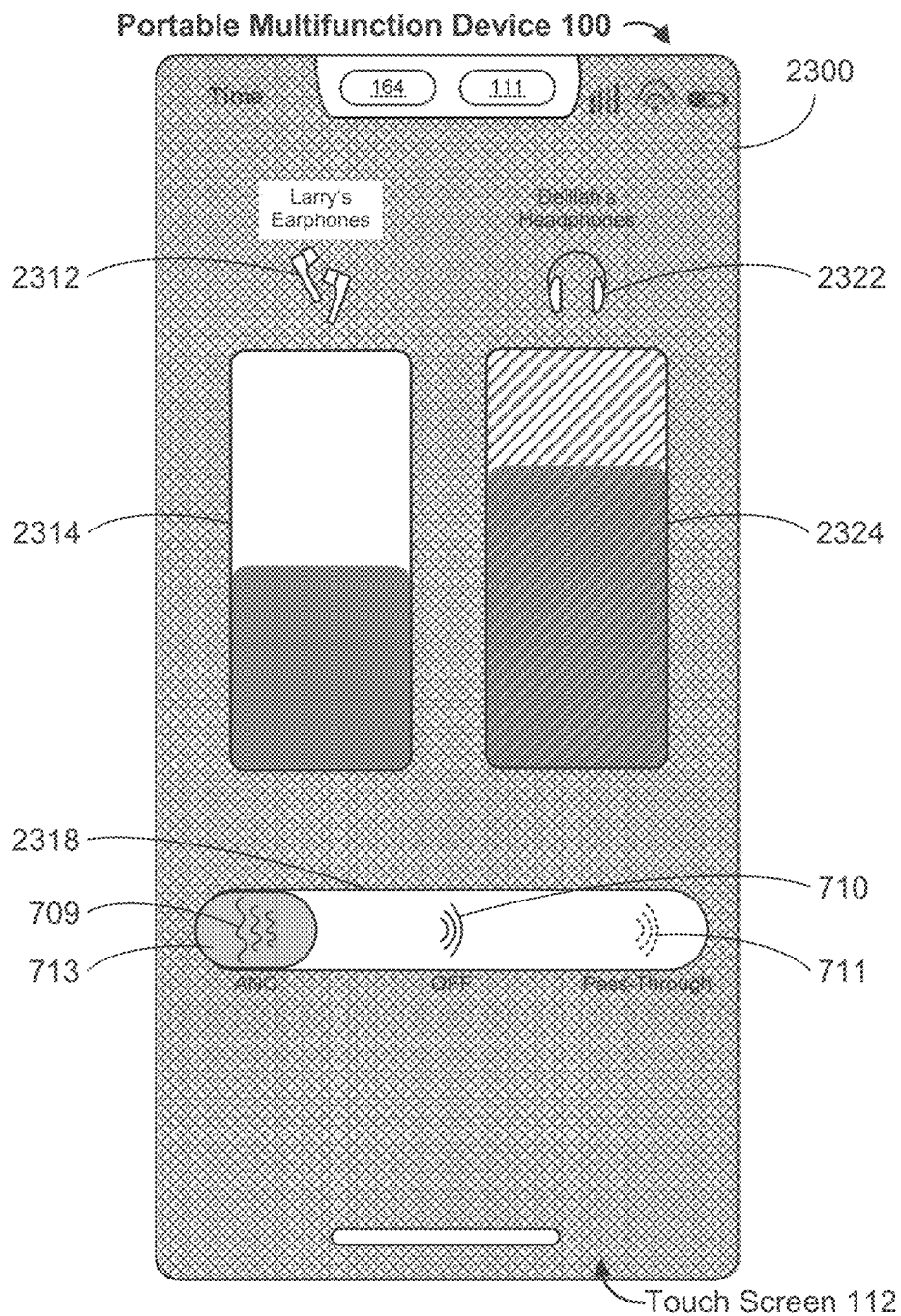

FIG. 23G illustrates a transition from FIG. 23F. In particular, FIG. 23G illustrates that, in response to the activation of noise management control 2316 by input 2306, expanded noise management control 2318 is displayed. Expanded noise management control 2318 includes representations of three available audio output modes for the earphones: active noise control icon 709 representing the active noise control mode, bypass icon 710 representing the noise control off mode, and pass-through icon 711 representing the pass-through mode. Because the earphones are currently operating in the active noise control mode (e.g., as indicated by active noise control icon 709 being displayed in noise management control 2316 in FIG. 23E just prior to detecting input 2306), selection indicator 713 is displayed over active noise control icon 709 in expanded noise management control 2318. Because the user is interacting with the audio output controls for the earphones, noise management control 2326 for the headphones ceases to be displayed. In addition, the appearance of the audio output controls for the earphones are visually emphasized relative to the appearance of the audio output controls for the headphones by, in the example of FIG. 23G, displaying volume control 2324 for the headphones and representation 2322 of the headphones with an inactive appearance (e.g., by dimming or graying out these elements). More generally, in some embodiments, while a user of the device is interacting with the audio output controls for a respective device, the audio output controls for another set of wearable audio output devices with which the user is not interacting are displayed with deemphasized or inactive appearance (e.g., dimmed, grayed out, blurred, obscured, etc.), to indicate that those controls are currently unavailable for user interaction, while the audio output controls for the respective set of wearable audio output devices with which the user is interacting are displayed with emphasized appearance relative to the appearance of the audio output controls of the other device (which may, nevertheless, be the "normal" appearance for such controls), to indicate that those controls are currently available for user interaction.

Figure 23H:
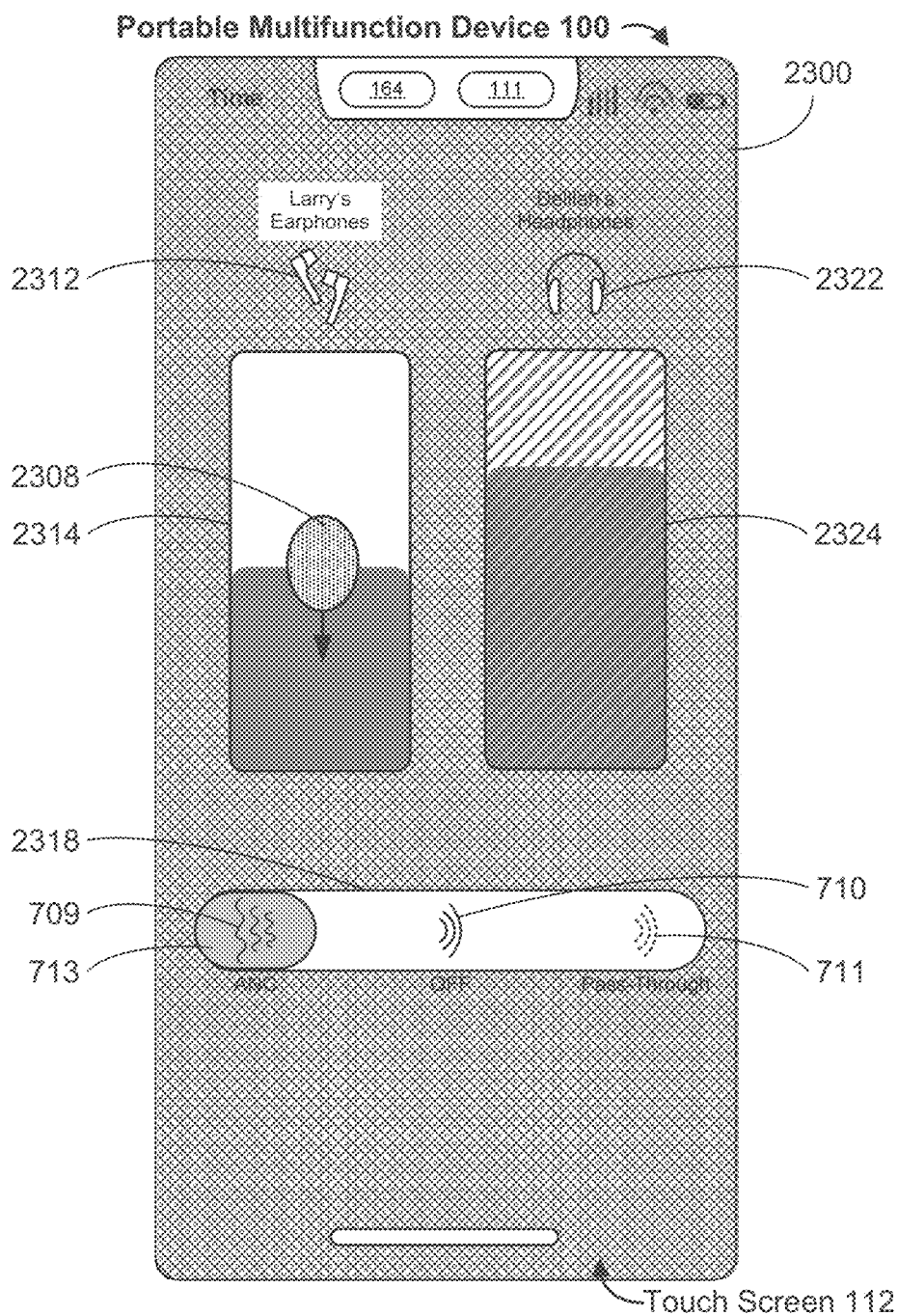

FIG. 23H illustrates a transition from FIG. 23G. In particular, FIG. 23H illustrates drag input 2308 corresponding to volume control 2314 and including a contact and movement of the contact downward along touch screen 112 to decrease the volume of the earphones. Drag input 2308 is detected while expanded noise management control 2318 for the earphones is displayed.

Figure 23I:
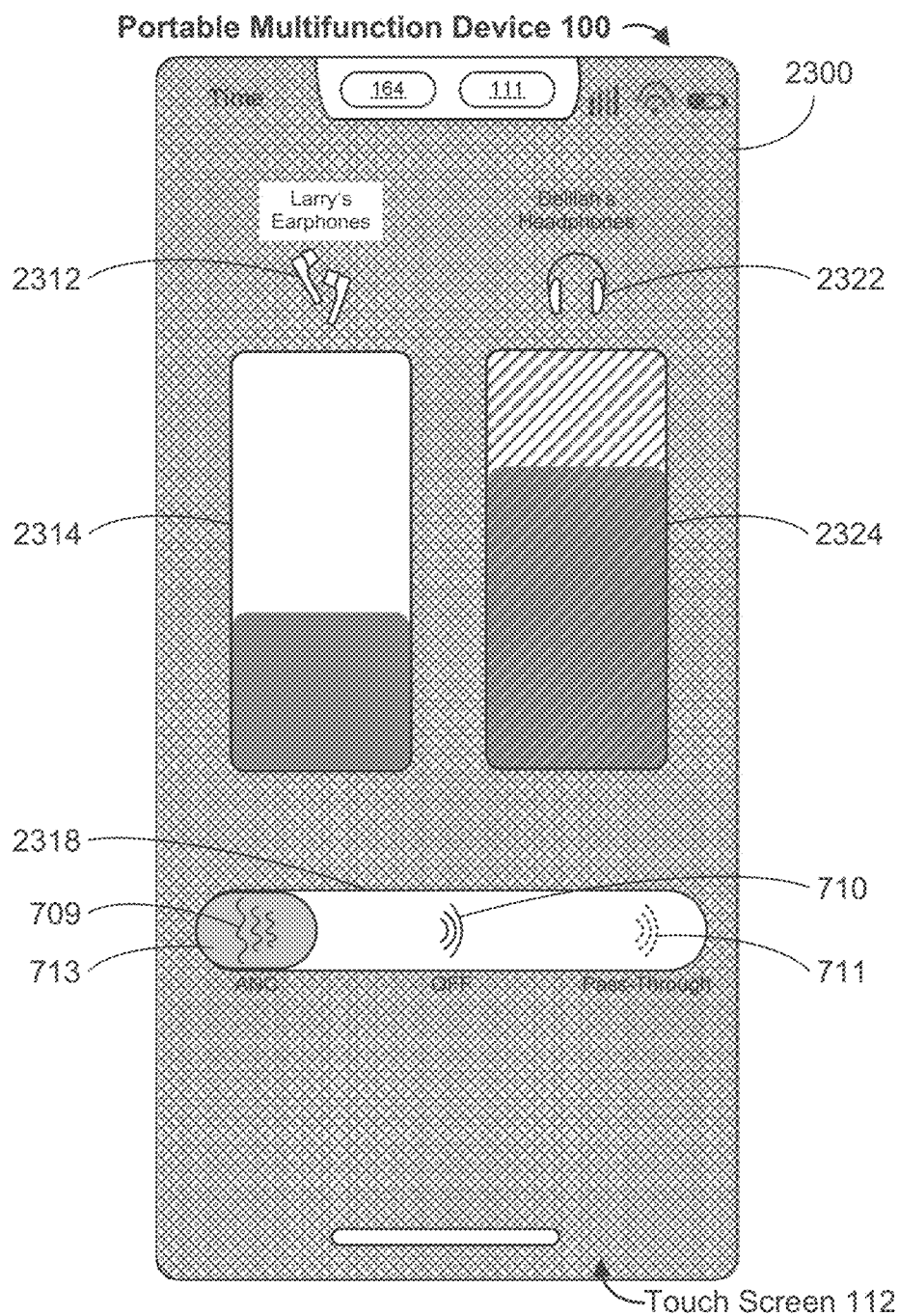

FIG. 23I illustrates a transition from FIG. 23H. In particular, FIG. 23I illustrates that, in response to drag input 2308 detected while expanded noise management control 2318 for the earphones is displayed, the volume of the earphones is decreased and the decreased volume is reflected in volume control 2314. As reflected in volume control 2324, the volume of the other wearable audio output device, the headphones, is unaffected by drag input 2308 corresponding to the earphones.

Figure 23J:
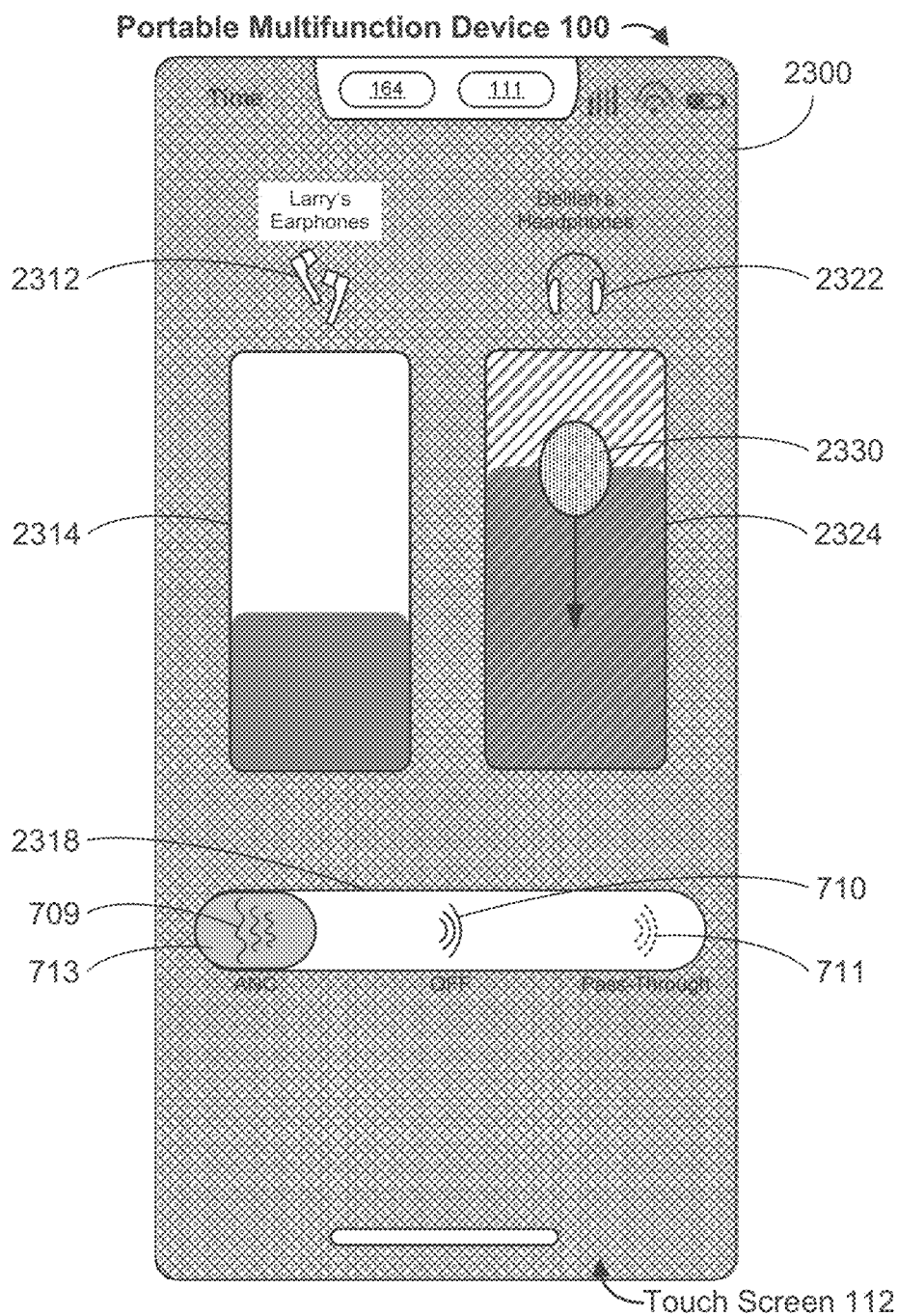

FIG. 23J illustrates a transition from FIG. 23I (or optionally from 23G). In particular, FIG. 23J illustrates drag input 2330 corresponding to volume control 2324 and including a contact and movement of the contact downward along touch screen 112 to decrease the volume of the headphones. Drag input 2330 corresponding to the headphones is detected while expanded noise management control 2318 for the earphones is displayed.

Figure 23K:
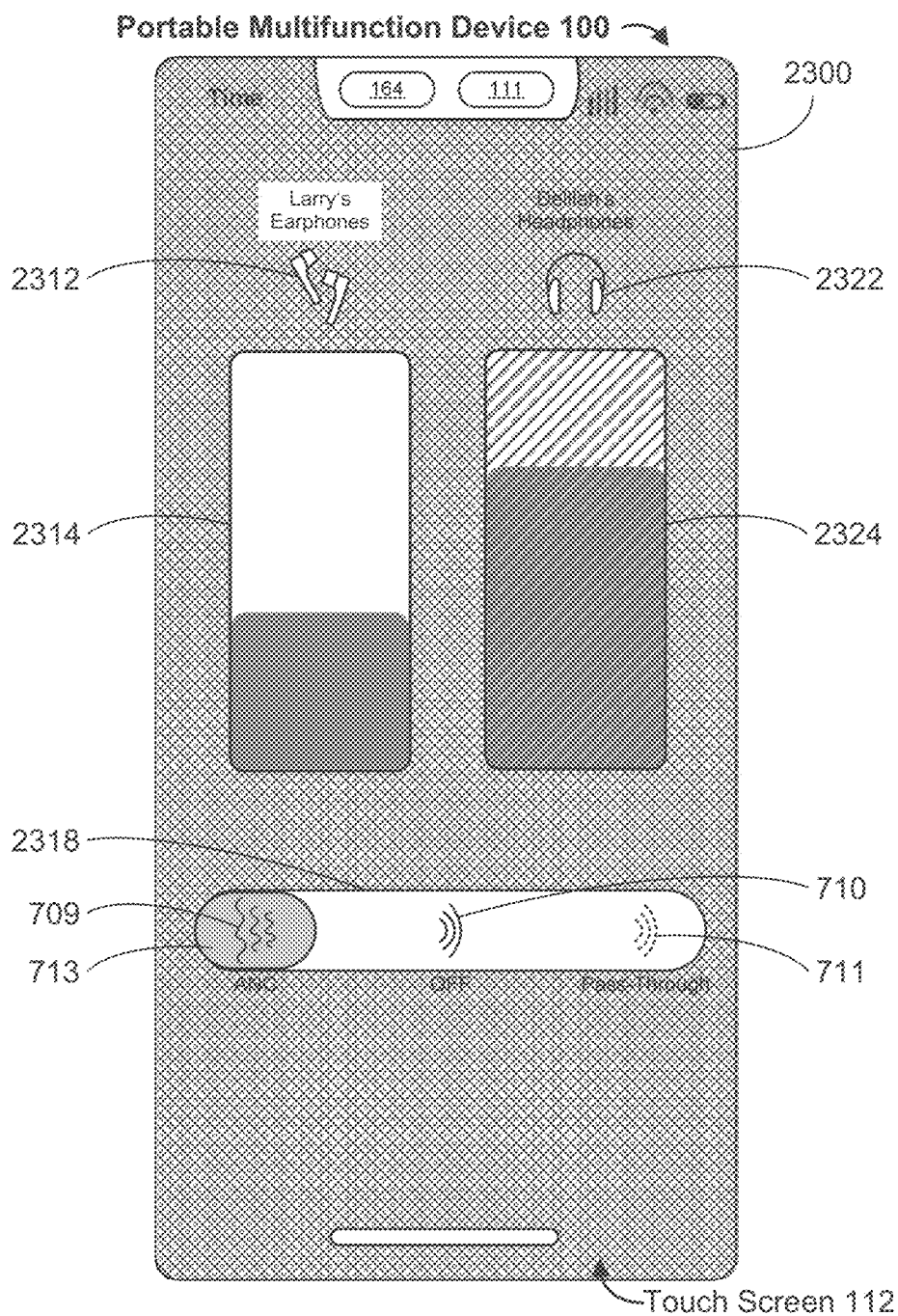

FIG. 23K illustrates a transition from FIG. 23J. In particular, FIG. 23K illustrates that, in response to drag input 2330 detected while expanded noise management control 2318 for the earphones is displayed, the volume of the headphones is not changed by drag input 2330. As reflected in volume control 2314, the volume of the other wearable audio output device, the earphones, is also unaffected.

Figure 23L:
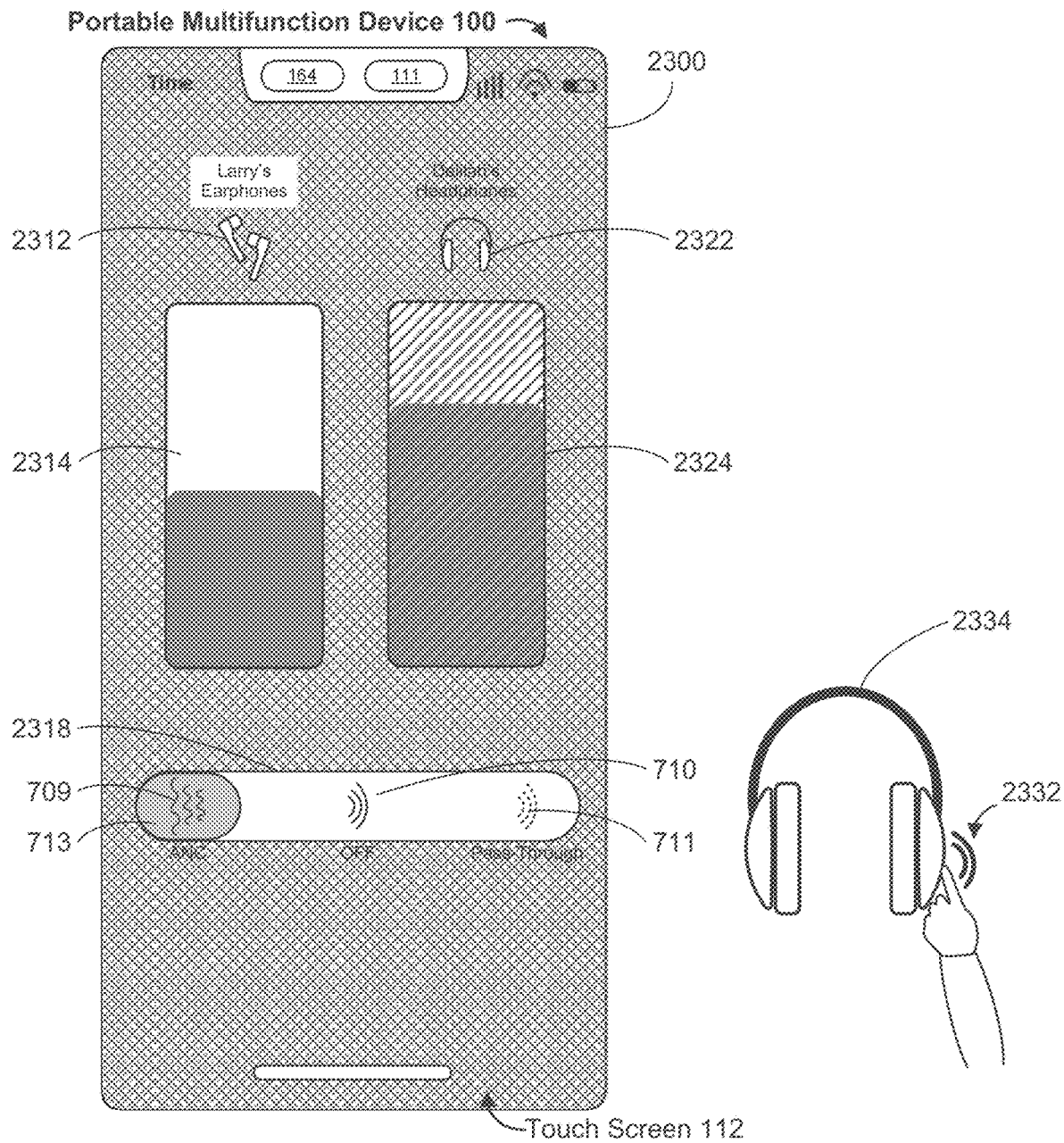

FIG. 23L illustrates a transition from FIG. 23K (or optionally from any preceding FIG. 23G-23K). In particular, FIG. 23L illustrates input 2332 (e.g., a press input on a volume down button) on headphones 2334 corresponding to second set of audio output controls 2320 (FIG. 23A) to decrease the output volume level of headphones 2334. Input 2332 is received at headphones 2334 while expanded noise management control 2318 for the earphones is displayed.

Figure 23M:
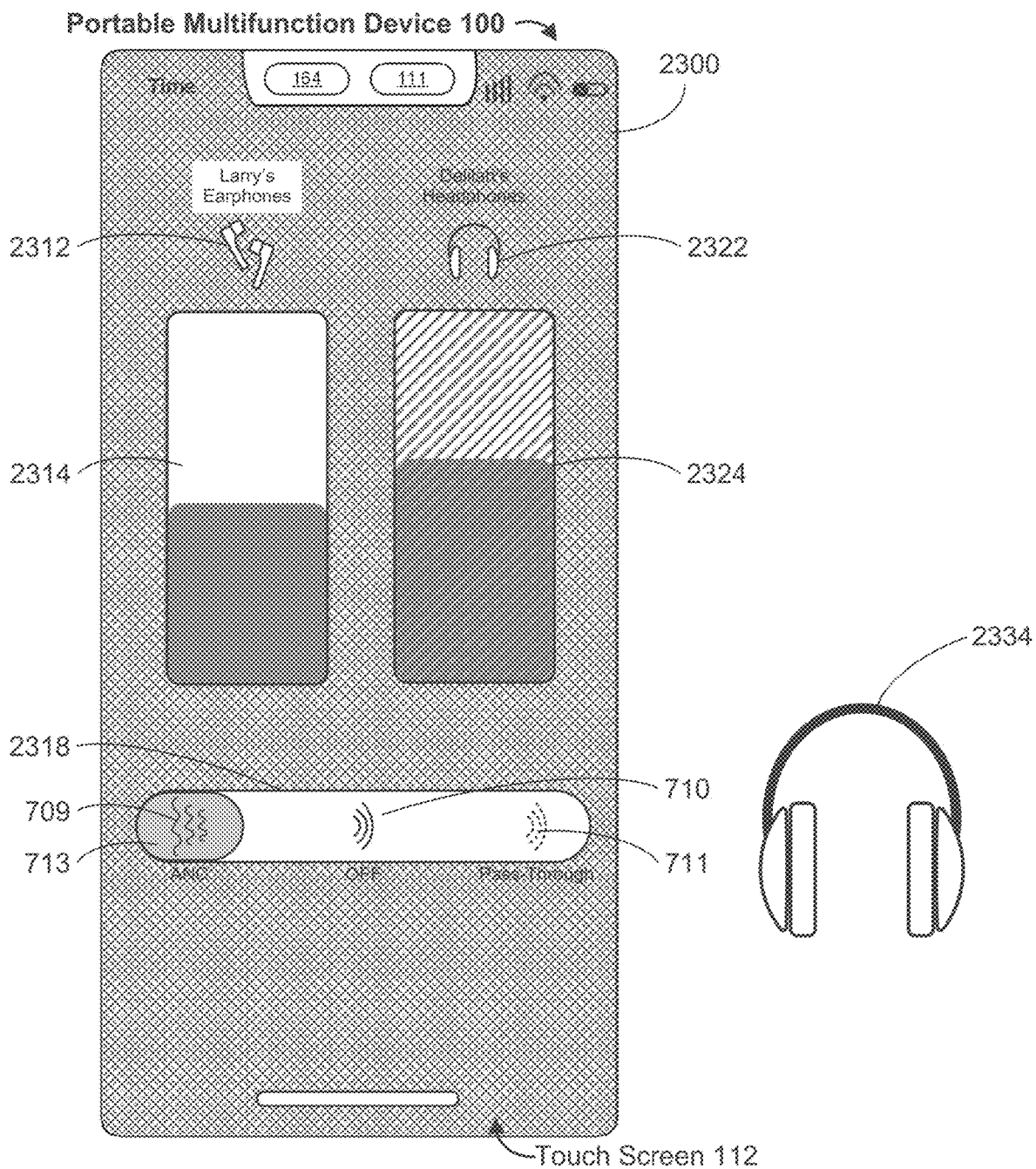

FIG. 23M illustrates a transition from FIG. 23L. In particular, FIG. 23M illustrates that, in response to input 2332, the output volume level of headphones 2334 is decreased, and the decreased volume is reflected in volume control 2324.

Figure 23N:
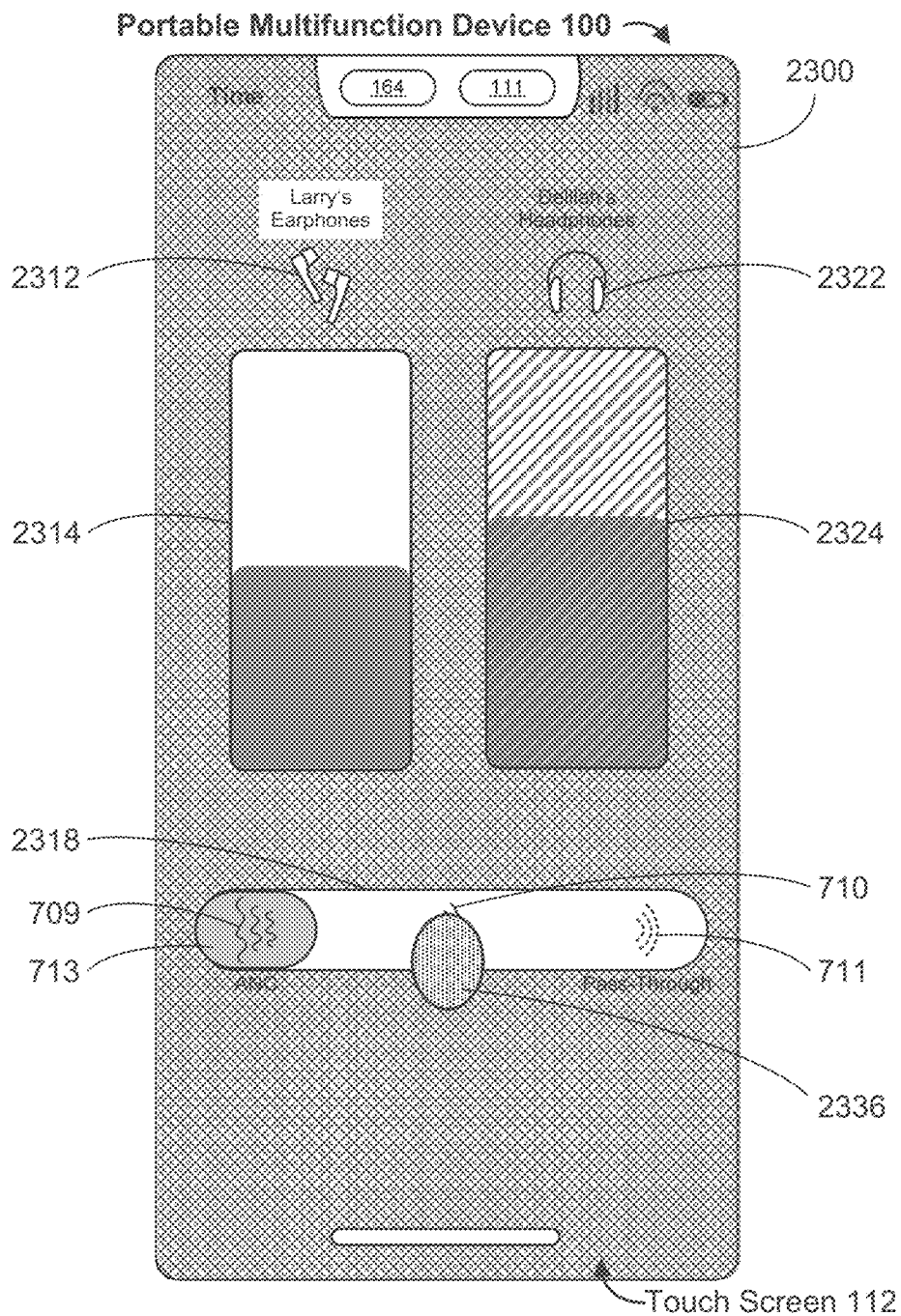

FIG. 23N illustrates a transition from FIG. 23M (or optionally from any preceding FIG. 23G-23M). In particular, FIG. 23N illustrates input 2336 (e.g., a tap gesture) selecting bypass icon 710.

Figure 23O:
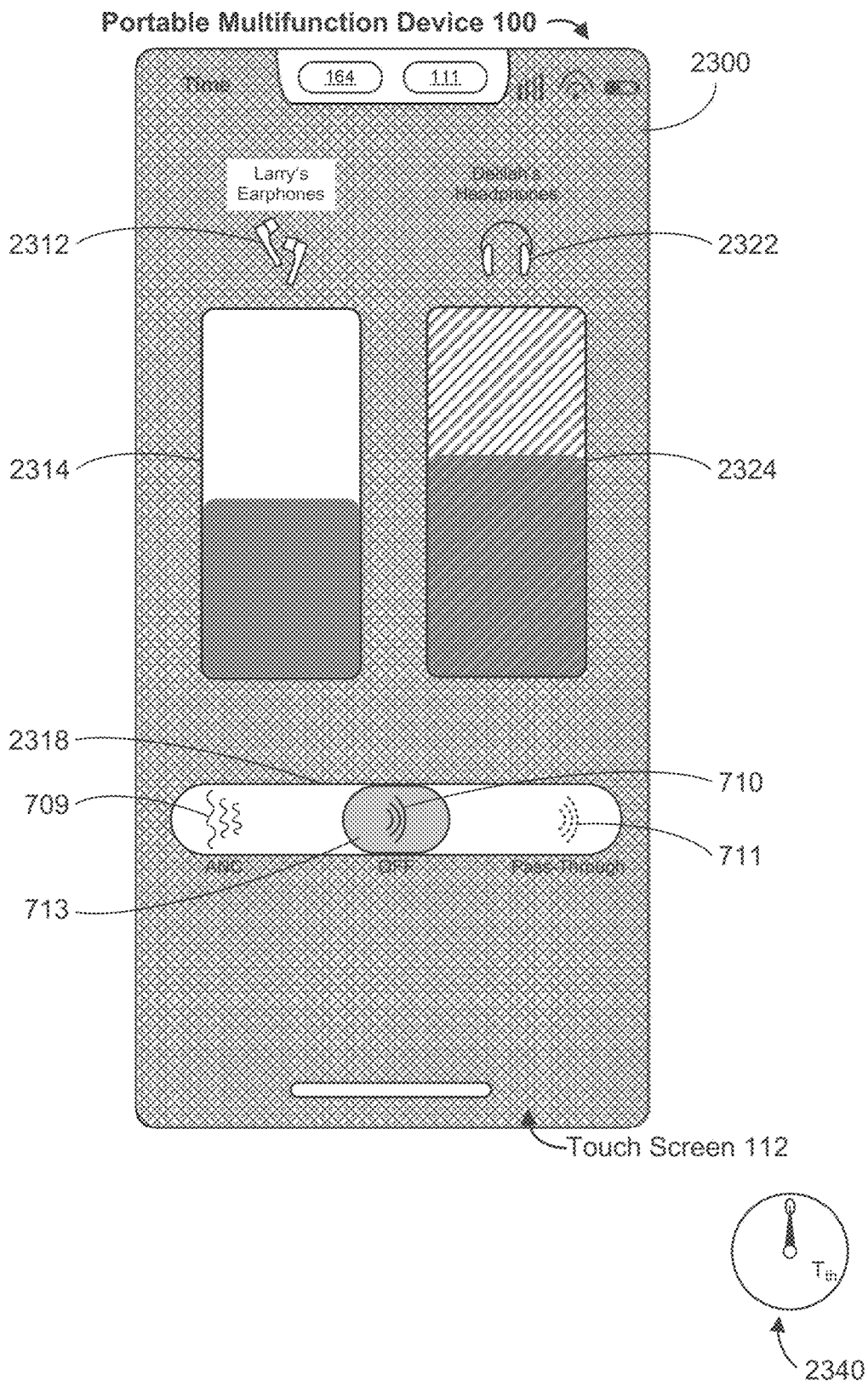

FIG. 23O illustrates a transition from FIG. 23N. In particular, FIG. 23O illustrates selection indicator 713 displayed over bypass icon 710 in response to input 2336 (FIG. 23N). FIG. 23O also shows that input 2336 has ceased to be detected at a time indicated by time t=0 of timer 2340.

Figure 23P:
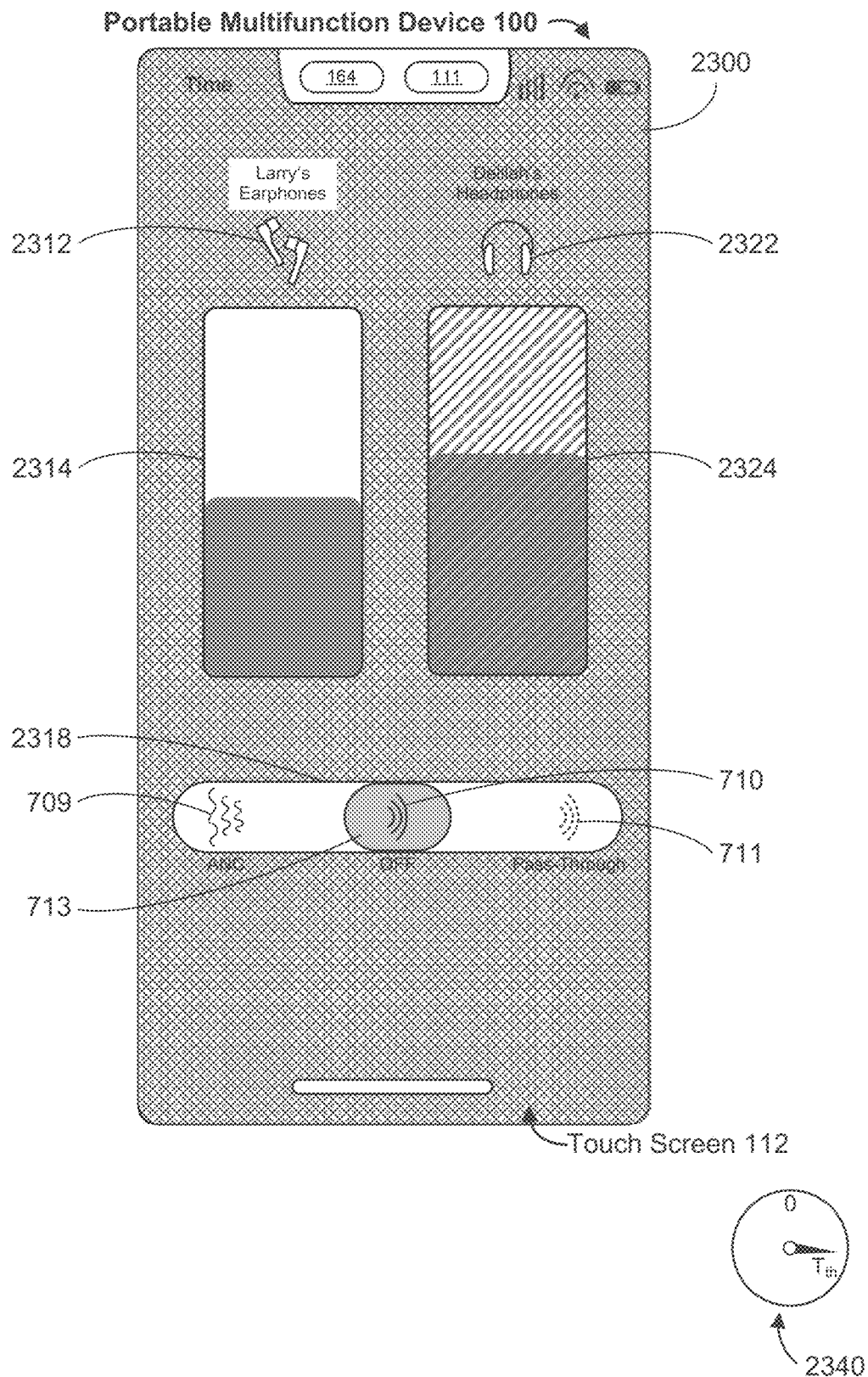

FIG. 23P illustrates a transition from FIG. 23O. In particular, FIG. 23P illustrates that, in the absence of any further inputs (e.g., on expanded noise management control 2318), the state of selection indicator 713 and expanded noise management control 2318 is the same as that shown in FIG. 23O while the amount of time t that has elapsed since input 2336 has ceased to be detected is less than a threshold amount of time such that $t<T_{th}$, as indicated by timer 2340.

Figure 23Q:
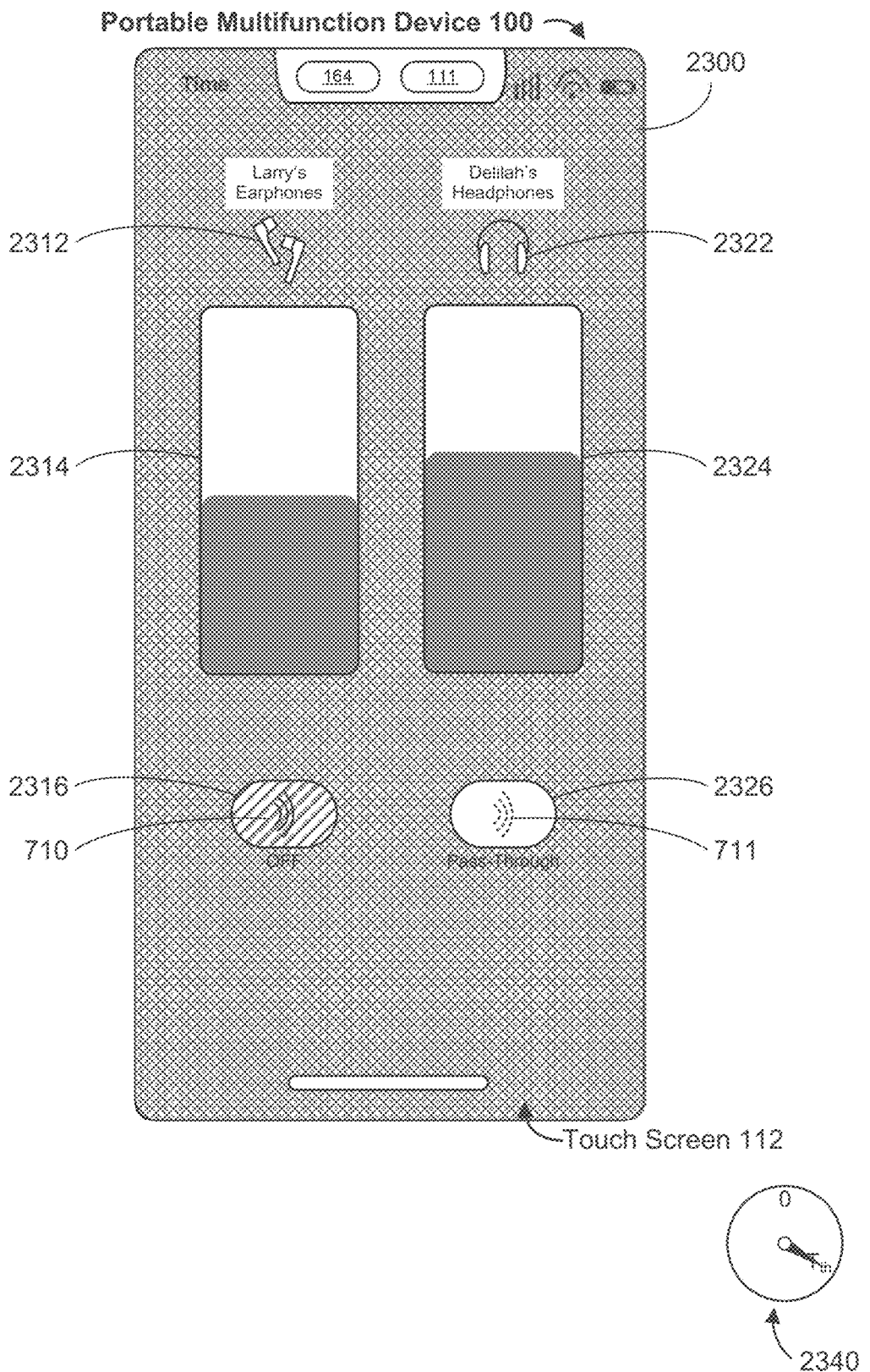

FIG. 23Q illustrates a transition from FIG. 23P. In particular, FIG. 23Q illustrates that, in the absence of any further inputs (e.g., on expanded noise management control 2318), when the amount of time t that has elapsed since input 2336 has ceased to be detected reaches the threshold amount of time such that $t=T_{th}$, as indicated by timer 2340, expanded noise management control 2318 for the earphones ceases to be displayed (e.g., collapses). Noise management control 2316 for the earphones is redisplayed, and includes bypass icon 710 to indicate that the earphones are currently operating in the noise control off mode. Noise management control 2326 for headphones 2334 is also redisplayed. In addition, the appearance of the audio output controls for the earphones is no longer visually emphasized relative to the audio output controls for headphones 2334 (e.g., in the example of FIG. 23Q, the change in the appearance of volume control 2324 for headphones 2334 and representation 2322 of headphones 2334 to the inactive appearance is reversed or undone, such that the appearances of volume control 2324 and representation 2322 of headphones 2334 is restored to the appearances shown for example in FIG. 23E, prior to the activation of noise management control 2316 for the earphones). Accordingly, the ability to change the volume of headphones 2334 using inputs (e.g., drag gestures) directed to volume control 2324 is restored. One of ordinary skill in the art will recognize that the behavior of the expanded noise management control described with reference to FIGS. 23N-23Q applies analogously to embodiments in which only one set of audio output controls is displayed for a single connected set of wearable audio output devices (e.g., as described herein with reference to FIGS. 7E-7I, 14A-14Z, and 21A-21J).

Figure 23R:
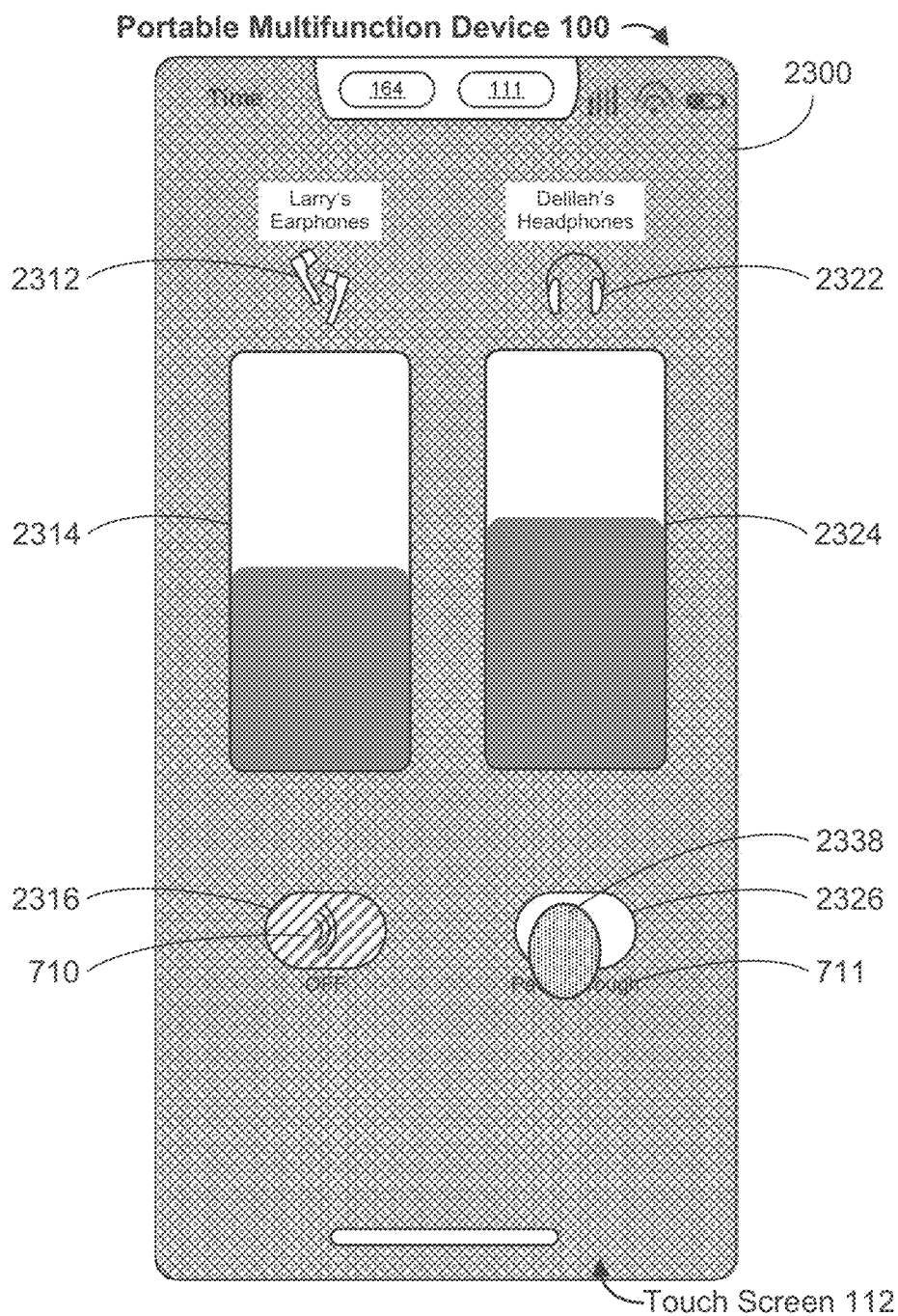

FIG. 23R illustrates a transition from 23Q (or optionally from any preceding FIG. 23A-23E). In particular, FIG. 23R illustrates input 2338 (e.g., a tap gesture) activating noise management control 2326 for headphones 2334.

Figure 23S:
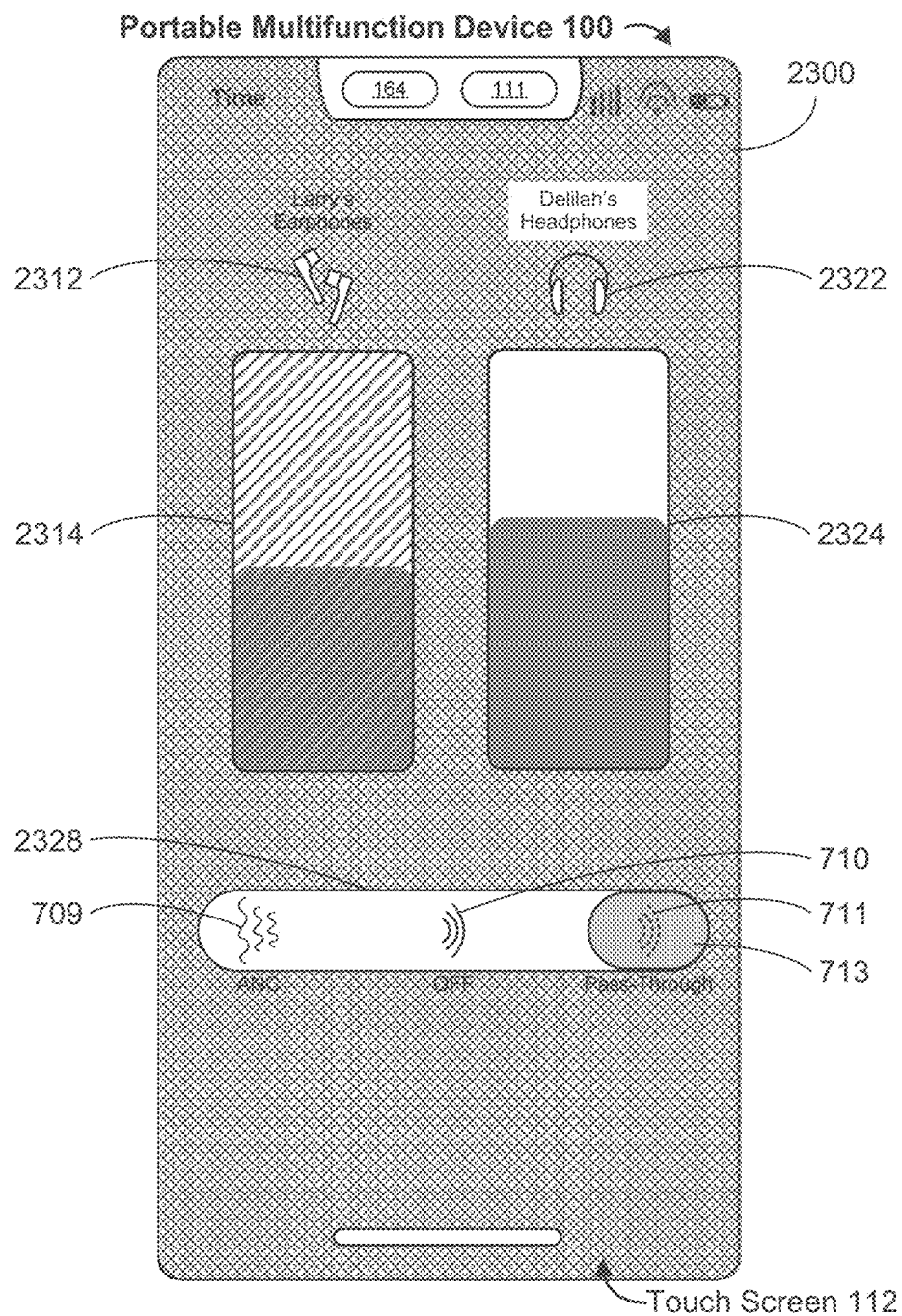

FIG. 23S illustrates a transition from FIG. 23R. In particular, FIG. 23S illustrates that, in response to the activation of noise management control 2326 by input 2338, expanded noise management control 2328 for headphones 2334 is displayed. Expanded noise management control 2328 includes representations of three available audio output modes for the headphones 2334: active noise control icon 709 representing the active noise control mode, bypass icon 710 representing the noise control off mode, and pass-through icon 711 representing the pass-through mode. Because headphones 2334 are currently operating in the pass-through mode (e.g., as indicated by pass-through icon 711 being displayed in noise management control 2326 in FIG. 23Q just prior to detecting input 2338), selection indicator 713 is displayed over pass-through icon 711 in expanded noise management control 2328. Because the user is interacting with the audio output controls for headphones 2334, noise management control 2316 for the earphones ceases to be displayed. In addition, the appearance of the audio output controls for headphones 2334 are visually emphasized relative to the appearance of the audio output controls for the earphones by, in the example of FIG. 23S, displaying volume control 2314 for the earphones and representation 2312 of the earphones with an inactive appearance (e.g., by dimming, blurring, graying out, or otherwise obscuring these elements).

Figure 23T:
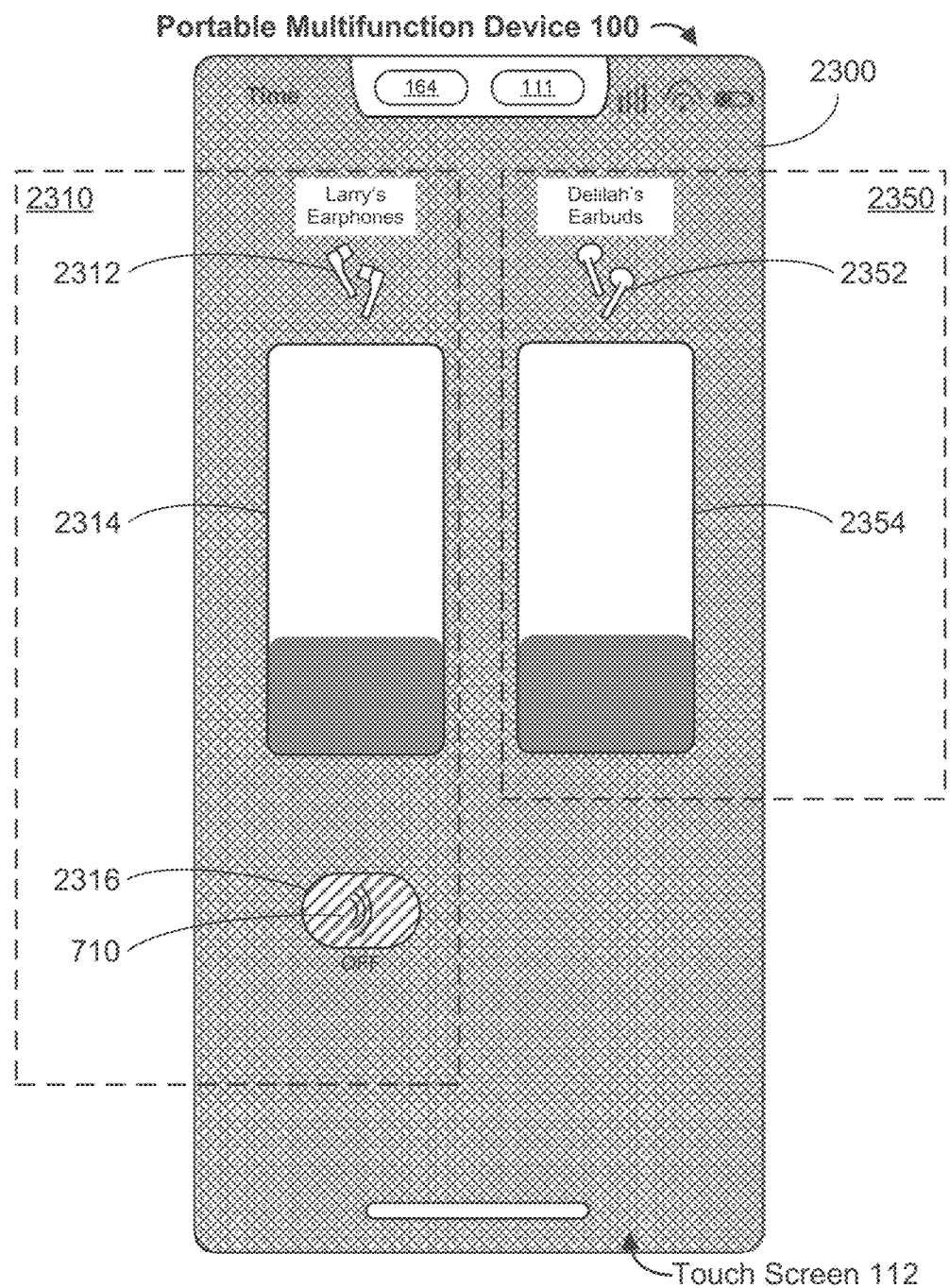
Figure 23U:
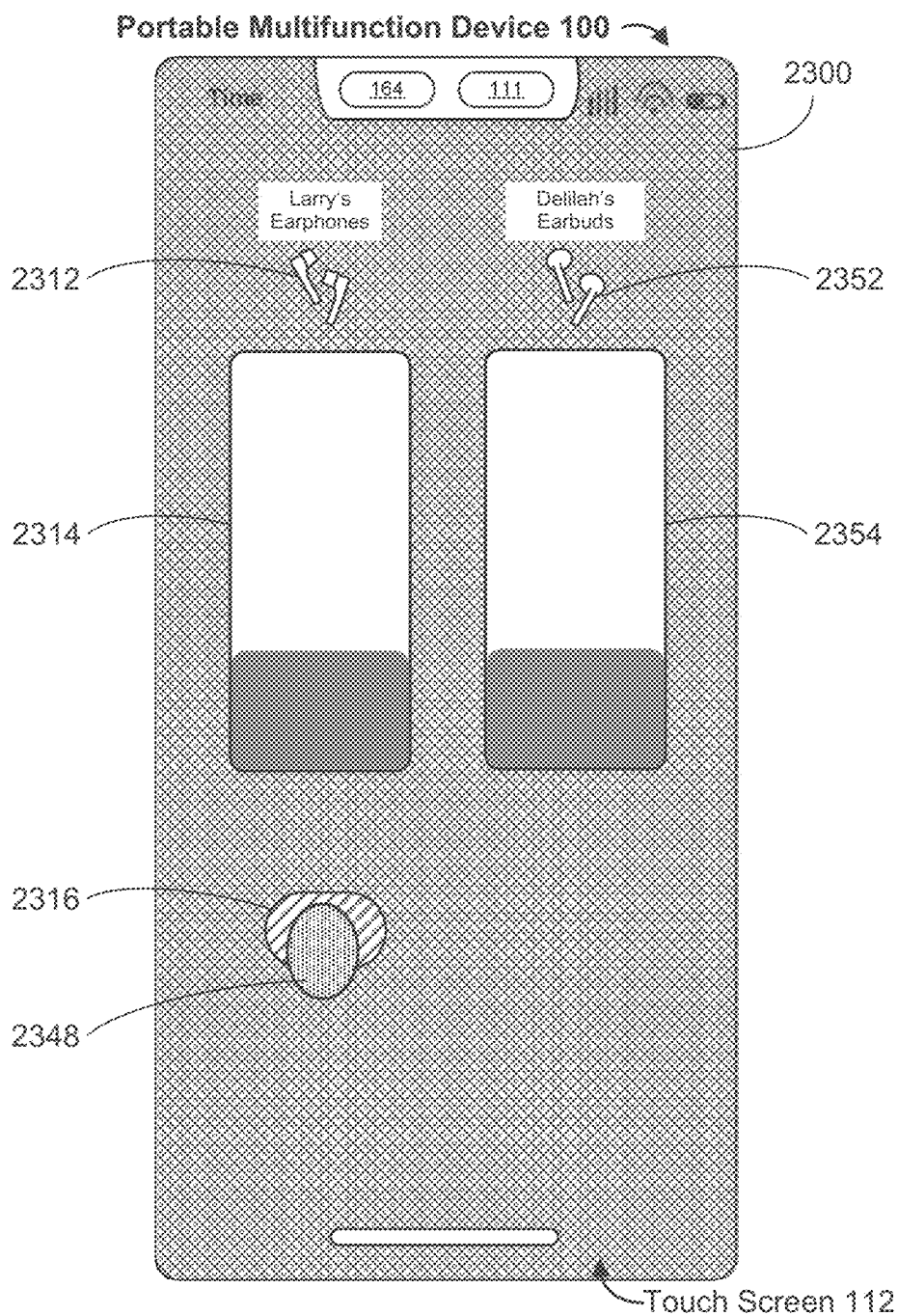
Figure 23V:
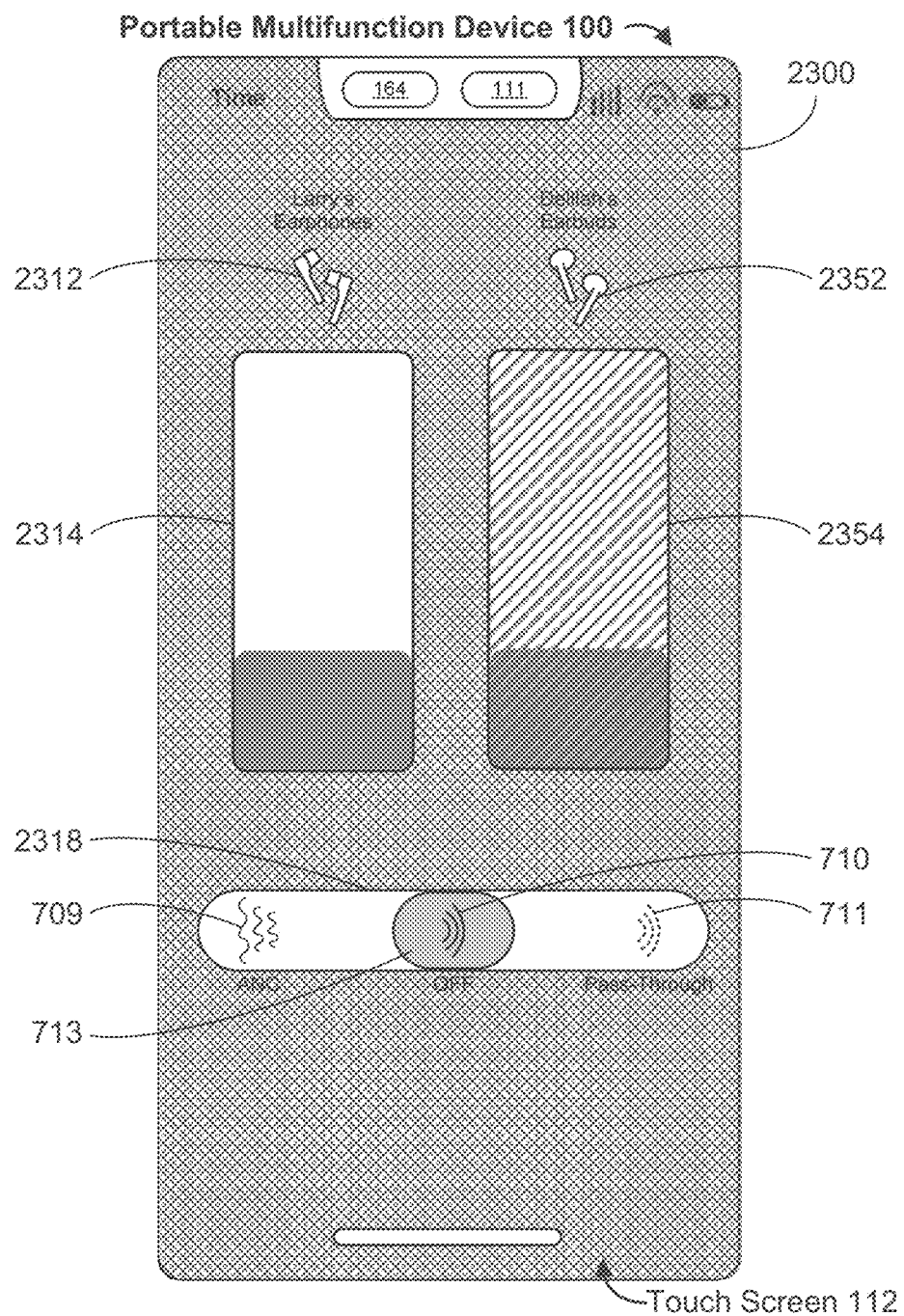

FIGS. 23T-23V illustrate an example enhanced volume control user interface 2300 for embodiments in which a respective wearable audio output device does not support multiple audio output modes (e.g., the respective wearable audio output device is only capable of outputting audio in a single audio output mode, which is typically a noise control off mode). In the example shown in FIG. 23T, the earphones (e.g., labeled "Larry's Earphones") support multiple audio output modes as described herein with reference to FIGS. 23A-23Q, and, accordingly, noise management control 2316 is displayed as part of first set of audio output controls 2310 for the earphones. The earbuds (e.g., labeled "Delilah's Earbuds"), however, do not support multiple audio output modes; accordingly, no noise management control is displayed as part of second set of audio output controls 2350 for the earbuds. Alternatively, in some embodiments, a noise management control is displayed even for a wearable audio output device that does not support multiple audio output modes; in some such embodiments, the noise management control that is displayed (which typically includes bypass icon 710 representing the noise control off mode) is visually deemphasized relative to a noise management control for a wearable audio output device that supports multiple audio output modes, to indicate to the user that the deemphasized noise management control cannot be activated to access additional audio output mode options. Like first set of audio output controls 2310 for the earphones, however, second set of audio output controls 2350 for the earbuds includes representation 2352 of the earbuds (e.g., optionally including a glyph of the earphones and/or a text description of the earbuds ("Delilah's Earbuds")) and volume control 2354 for controlling an audio output volume level of the earbuds.

FIG. 23U illustrates a transition from FIG. 23T. In particular, FIG. 23U illustrates input 2348 (e.g., a tap gesture) activating noise management control 2316 for the earphones.

FIG. 23V illustrates a transition from FIG. 23U. In particular, FIG. 23V illustrates that, in response to the activation of noise management control 2316 by input 2348, expanded noise management control 2328 for the earphones is displayed, as described herein with reference to FIGS. 23F-23G. In the example shown in FIG. 23V, because the earphones are currently operating in the noise control off mode (e.g., as indicated by bypass icon 710 being displayed in noise management control 2316 in FIG. 23T just prior to detecting input 2348), selection indicator 713 is displayed over bypass icon 710 in expanded noise management control 2318. Because the user is interacting with the audio output controls for the earphones, the appearance of the audio output controls for the earphones are visually emphasized relative to the appearance of the audio output controls for the earbuds by, in the example of FIG. 23V, displaying volume control 2354 for the earbuds and representation 2352 of the earbuds with an inactive appearance (e.g., by dimming, blurring, graying out, or otherwise obscuring these elements).

Figure 23W:
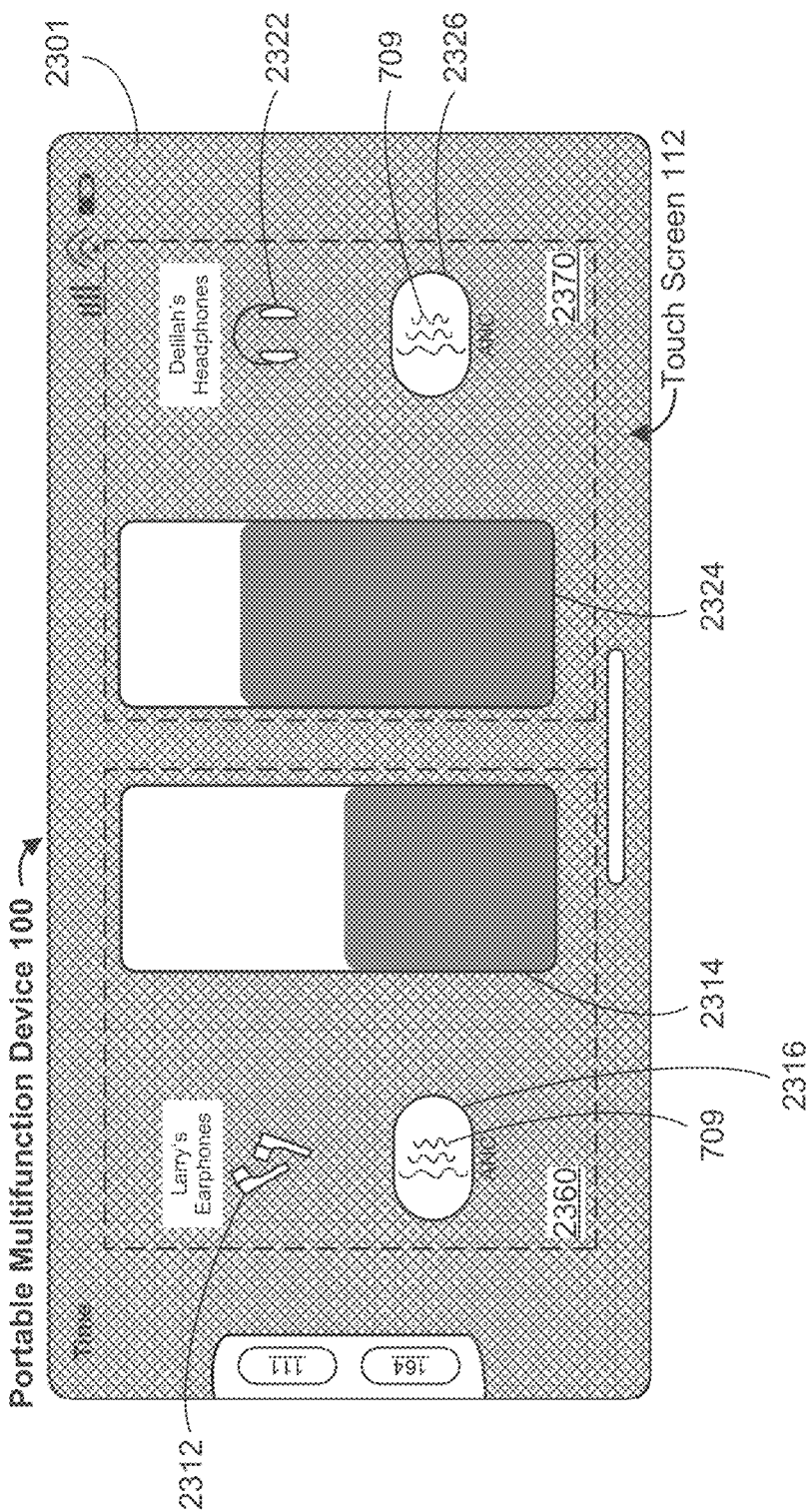

FIGS. 23W-23AA illustrate example enhanced volume control user interfaces 2301 that are displayed while device 100 is oriented in landscape mode, in contrast to FIGS. 23A-23T, which illustrate example enhanced volume control user interfaces 2300 that are displayed while device 100 is oriented in portrait mode.

FIG. 23W illustrates that first set of audio output controls 2360 for the earphones are displayed in a left-hand region of touch screen 112, and second set of audio output controls 2370 are displayed in a right-hand region of touch screen 112. First set of audio output controls 2360 includes the same elements (e.g., representation 2312 of the earphones, volume control 2314, and noise management control 2316) as first set of audio output controls 2310 in FIG. 23A; however, the elements in set 2360 are arranged in a different configuration than the elements in set 2310 in FIG. 23A due to the different orientation of device 100. Similarly, second set of audio output controls 2370 includes the same elements (e.g., representation 2322 of a pair of headphones, volume control 2324, and noise management control 2326) as second set of audio output controls 2320 in FIG. 23A; however, the elements in set 2370 are arranged in a different configuration than the elements in set 2320 in FIG. 23A due to the different orientation of device 100.

Figure 23X:
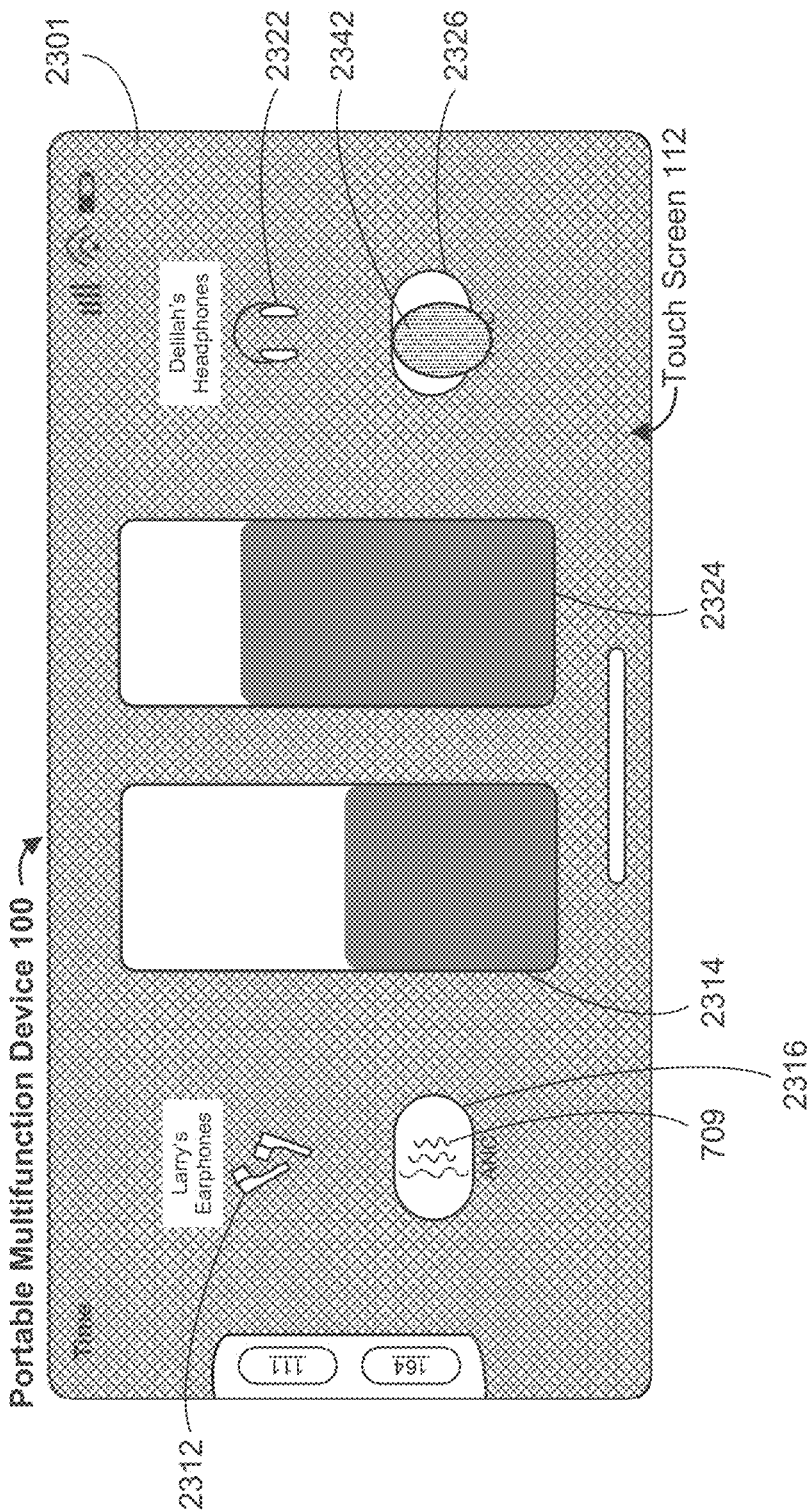

FIG. 23X illustrates a transition from FIG. 23W. In particular, FIG. 23X illustrates input 2342 (e.g., a tap gesture) activating noise management control 2326 for the headphones.

Figure 23Y:
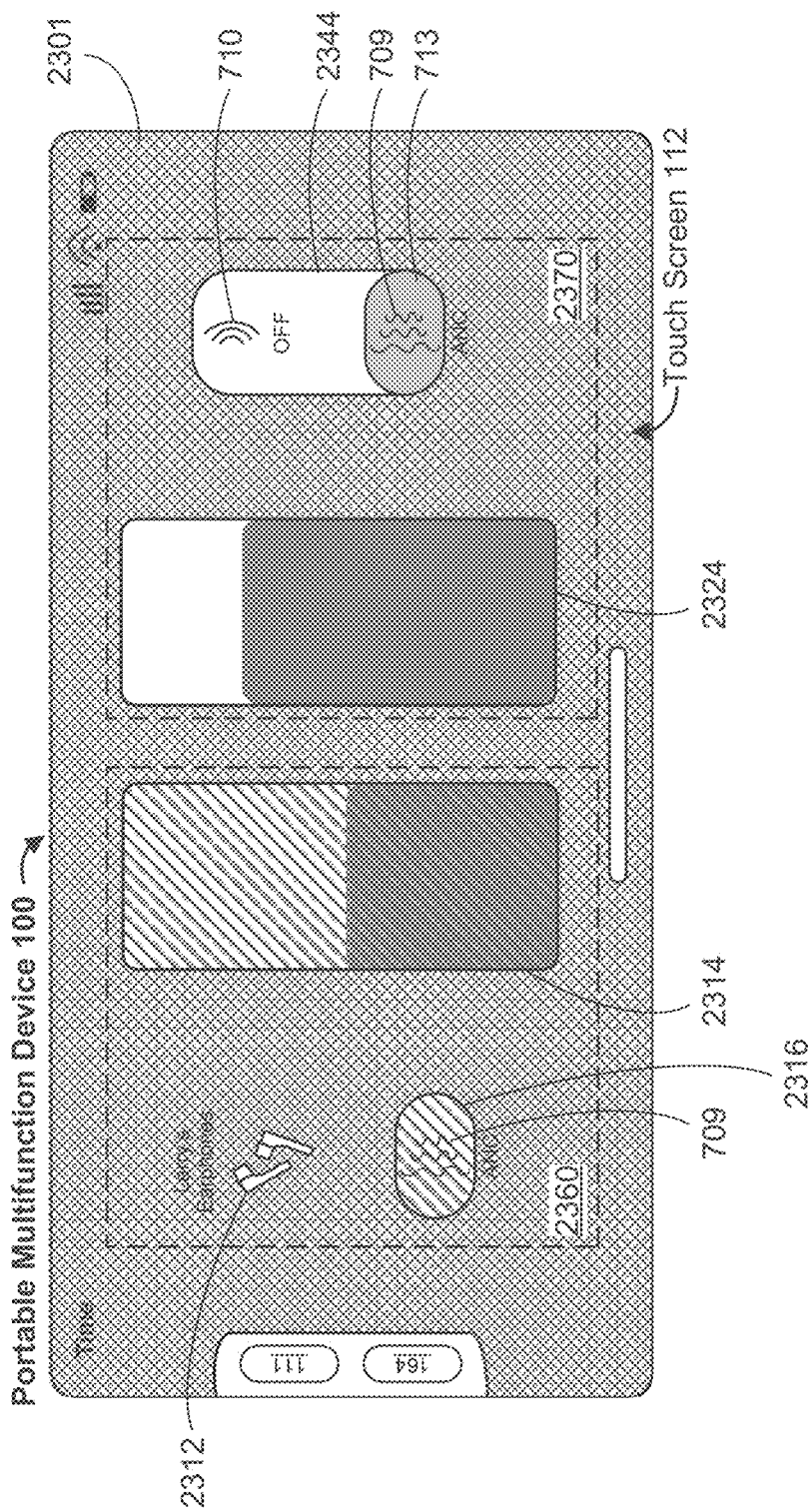

FIG. 23Y illustrates a transition from FIG. 23X. In particular, FIG. 23Y illustrates that, in response to the activation of noise management control 2326 by input 2342, expanded noise management control 2344 is displayed. Expanded noise management control 2344 includes representations of available audio output modes for the headphones. In the example shown in FIG. 23Y, the headphones are capable of operating in an active noise control mode or a noise control off mode, but not a pass-through mode (e.g., the headphones represented in FIGS. 23W-23AA are different from headphones 2334 shown in FIGS. 23L-23M and referenced in other FIGS. 23A-23S). Accordingly, expanded noise management control 2344 includes active noise control icon 709 representing the active noise control mode and bypass icon 710 representing the noise control off mode, but not pass-through icon 711. Because the headphones are currently operating in the active noise control mode (e.g., as indicated by active noise control icon 709 being displayed in noise management control 2326 in FIG. 23W just prior to detecting input 2342), selection indicator 713 is displayed over active noise control icon 709 in expanded noise management control 2344. Because the user is interacting with the audio output controls for the headphones, the appearance of second set of audio output controls 2370 is visually emphasized relative to the appearance of first set of audio output controls 2360 for the earphones by, in the example of FIG. 23Y, displaying first set of audio output controls 2360 with an inactive appearance, including dimming (or graying out) representation 2312 of the earphones, volume control 2314, and noise management control 2316. Noise management control 2316 continues to be displayed because, while device 100 is oriented in landscape mode, display of expanded noise management control 2344 of second set of audio output controls 2370 is confined to the right-hand region of touch screen 112, such that display of first set of audio output controls 2360 in the left-hand region of touch screen 112 is unaffected. To accommodate the display of expanded noise management control 2344, representation 2322 of the headphones in second set of audio output controls 2370 ceases to be displayed (e.g., instead of ceasing to display noise management control 2316 of first set of audio output controls 2360, as described herein with reference to the portrait mode examples in FIGS. 23F-23G and 23R-23S).

Figure 23Z:
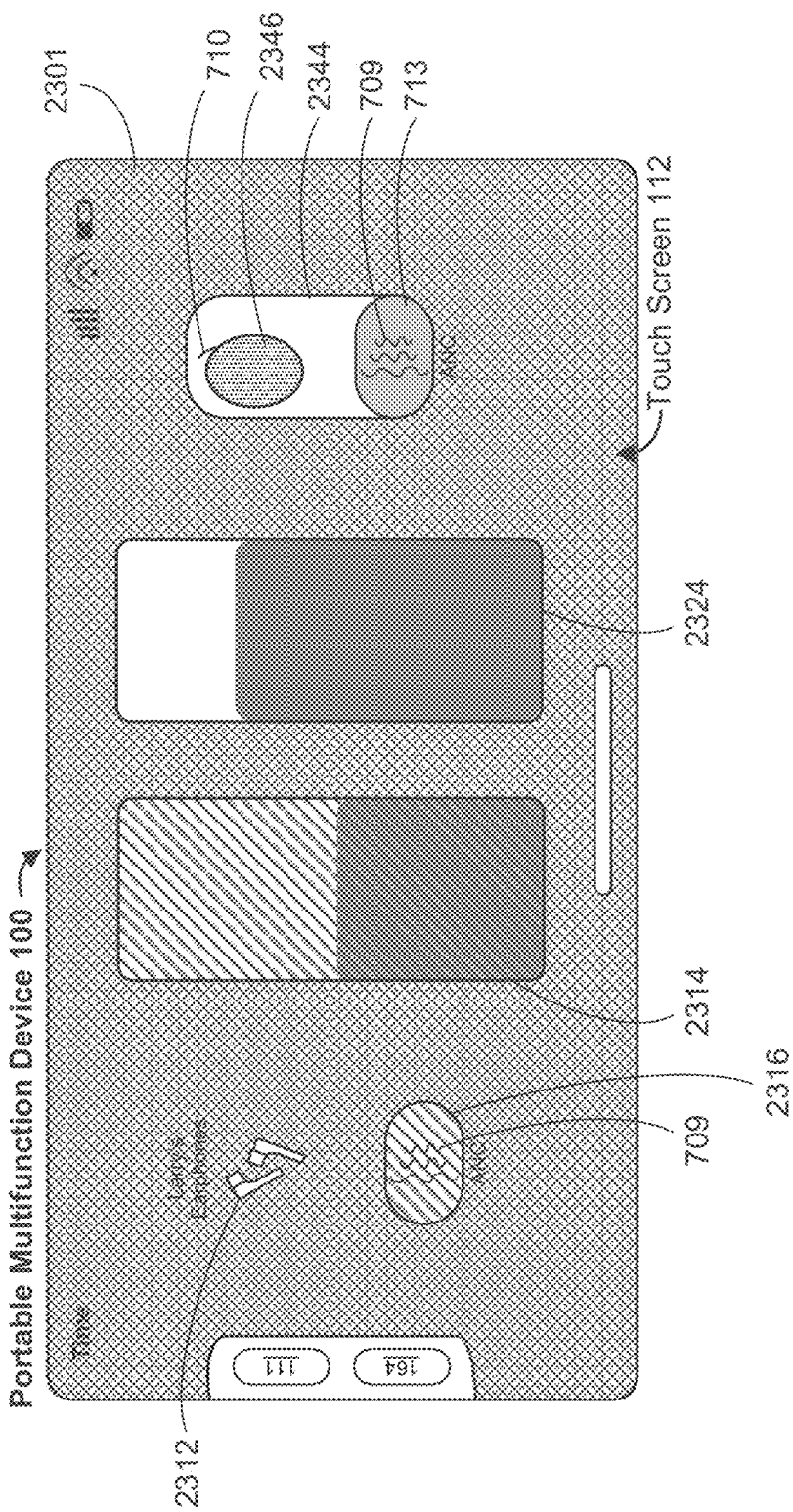
Figure 23A:
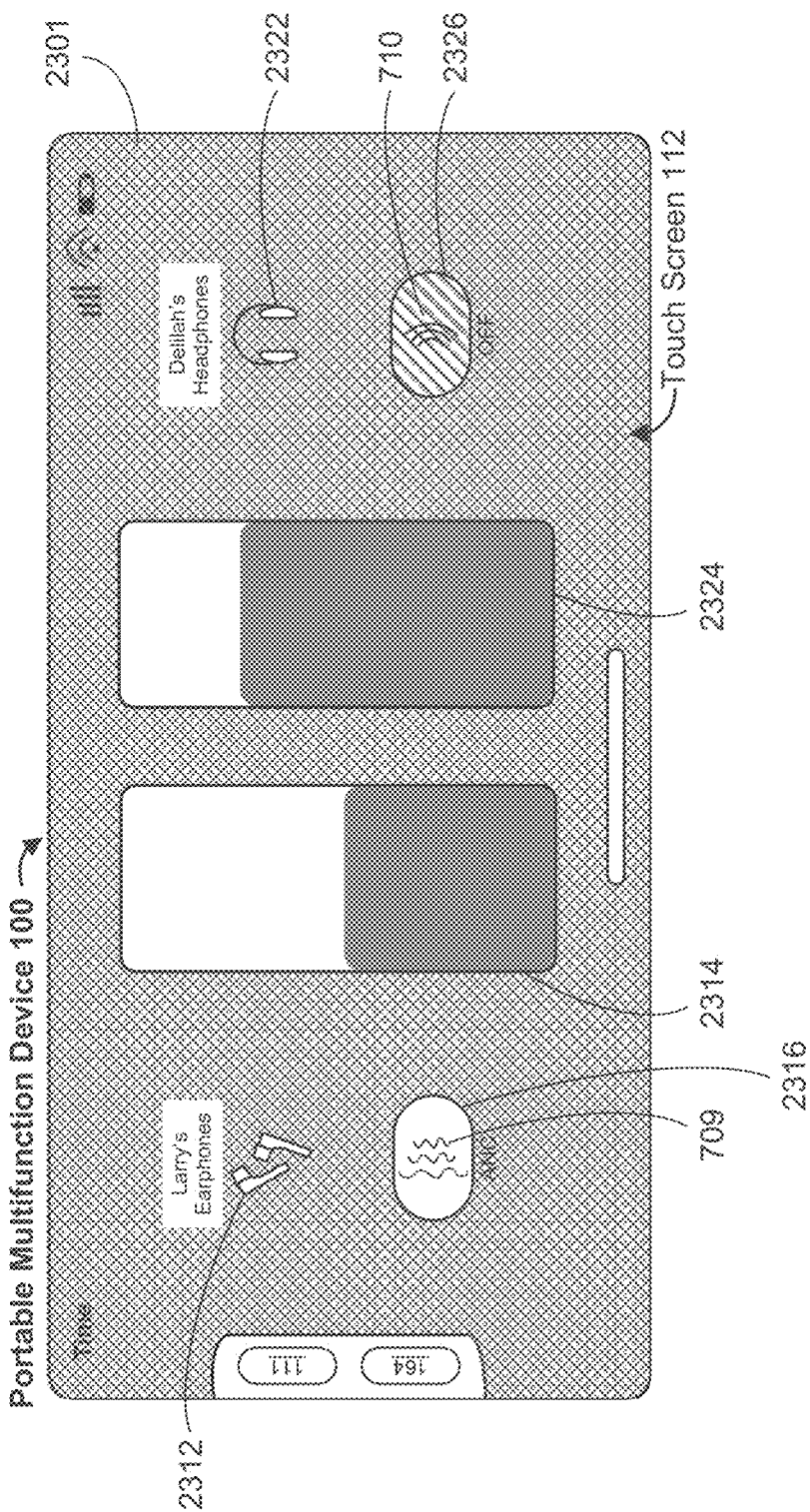
Figure 24A:
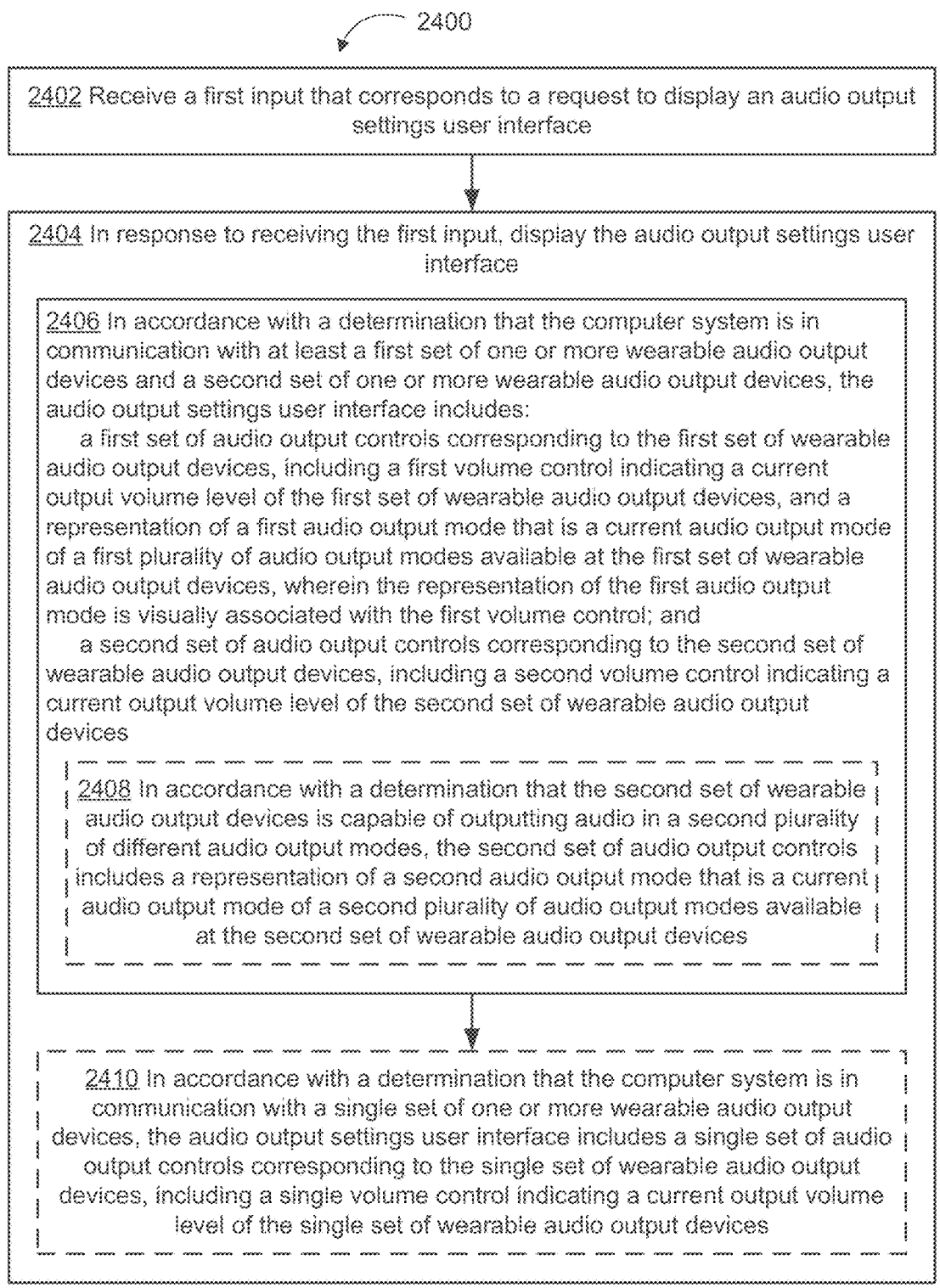

FIG. 23Z illustrates a transition from FIG. 23Y. In particular, FIG. 23Z illustrates input 2346 (e.g., a tap gesture) selecting bypass icon 710 in expanded noise management control 2344.

FIG. 23AA illustrates a transition from FIG. 23Z (e.g., in some embodiments, after a predetermined amount of time has elapsed since ceasing to detect input 2346 in FIG. 23Z, as described herein with reference to FIG. 23N-23Q). In particular, FIG. 23AA illustrates that, in response to input 2346 selecting bypass icon 710, expanded noise management control 2344 ceases to be displayed and noise management control 2326 is redisplayed. In addition, the audio output mode of the headphones has been transitioned from the active noise control mode (e.g., as indicated by active noise control icon 709 in noise management control 2326 in FIG. 23X) to the noise control off mode (e.g., as indicated by bypass icon 710 in noise management control 2326 in FIG. 23AA). Representation 2322 of the headphones is redisplayed, and the appearance of second set of controls 2370 is no longer visually emphasized relative to the appearance of first set of controls 2360 (e.g., the change in the appearance of first set of controls 2360 to the inactive appearance, for example by dimming, is reversed or undone such that the appearance of first set of controls 2360 is restored to the (e.g., active) appearance shown for example in FIG. 23Y, prior to the activation of noise management control 2326 for the headphones).

FIGS. 24A-24D are flow diagrams of a process for controlling audio output settings for multiple wearable audio output devices using a single settings user interface in accordance with some embodiments. Method 2400 is performed at a computer system that includes a display device (e.g., touch-sensitive display system 112 in FIG. 1A or display 340 in FIG. 3A) and that is in communication with one or more sets of wearable audio output devices (e.g., one or more wearable audio output devices 301, FIG. 3B, where each wearable audio output device optionally includes a respective pair of earbuds or headphones). Some operations in method 2400 are, optionally, combined and/or the order of some operations is, optionally, changed.

As described below, method 2400 displays, on a display device of a computer system, multiple sets of audio output controls in a single audio output settings user interface when multiple sets of (e.g., wearable) audio output devices are in communication with (e.g., paired with) the computer system. Displaying respective sets of audio output controls for each of two or more sets of audio output devices provides the user with visual feedback as to the states of the multiple sets of audio output devices and access to control over audio output settings for the multiple sets of audio output devices at once, without requiring the user to navigate through complex settings menu hierarchies or switch between multiple different user interfaces for different sets of audio output devices. Providing improved feedback to the user and reducing the number of inputs needed to perform an operation enhances the operability of the computer system and connected audio output devices and makes the user-device interface more efficient (e.g., by helping the user to achieve an intended outcome and reducing user mistakes when operating/interacting with the system), which, additionally, reduces power usage and improves battery life of the system by enabling the user to use the system more quickly and efficiently.

The computer system receives (2402) a first input that corresponds to a request to display an audio output settings user interface (e.g., an input, such as a long press or force press, on a volume control that is displayed in a settings user interface (e.g., as described herein with reference to FIGS. 7D-7E and operation 1220 of method 1200), or on a volume control that is displayed in response to one or more inputs via a volume control hardware element (e.g., as described herein with reference to FIGS. 22C-22D and operation 1846 of method 1800)).

In response to receiving the first input, the computer system displays (2404) the audio output settings user interface. In accordance with a determination that the computer system is in (e.g., wired or wireless) communication with at least a first set of one or more wearable audio output devices (e.g., a first pair of earbuds or earphones, or a first set of headphones, sometimes also (e.g., collectively) referred to herein as a "first wearable audio output device") and a second set of one or more wearable audio output devices (e.g., a second pair of earbuds or earphones, or a second set of headphones, sometimes also (e.g., collectively) referred to herein as a "second wearable audio output device"), the audio output settings user interface includes (2406): a first set of audio output controls corresponding to the first set of wearable audio output devices, including a first volume control indicating a current output volume level of the first set of wearable audio output devices, and a representation of a first audio output mode that is a current audio output mode of a first plurality of audio output modes available at the first set of wearable audio output devices, where the representation of the first audio output mode is visually associated with the first volume control (and is not associated with the second volume control); and a second set of audio output controls corresponding to the second set of wearable audio output devices, including a second volume control indicating a current output volume level of the second set of wearable audio output devices (e.g., as described herein with reference to user interface 2300 in FIG. 23A or user interface 2301 in FIG. 23W).

In some embodiments, each respective set of wearable audio output devices (e.g., also (e.g., collectively) referred to herein as a "respective wearable audio output device") includes a pair of wearable audio output components such as earphones, earbuds, or earcups. In some embodiments, the computer system is in wired communication with both the first and second sets of wearable audio output devices. In some embodiments, the computer system is in wireless communication with both the first and second sets of wearable audio output devices. In some embodiments, the computer system is in wireless communication with one set of wearable audio output devices and wired communication with another set of wearable audio output devices.

In some embodiments, the first volume control includes a plurality of state options that correspond to a plurality of available values for output volume level for the first set of wearable audio output devices. In some embodiments, the audio output settings user interface includes, in combination with the first set of audio output controls, a representation of the first set of wearable audio output devices. In some embodiments, the representation of the first audio output mode is visually associated with the first volume control by being displayed near (e.g., adjacent to) the first volume control, and/or within a same region of the display device as the first volume control, the region being used to display controls for the first set of one or more wearable audio output devices (e.g., by default, subject to exceptions described herein with reference to display of representations of a respective plurality of audio output modes of a respective wearable audio output device).

In some embodiments, the second volume control includes a plurality of state options that correspond to a plurality of available values for output volume level of the second set of wearable audio output devices. In some embodiments, the audio output settings user interface includes, in combination with the second set of audio output controls, a representation of the second set of wearable audio output devices. In some embodiments, in accordance with a determination that the computer system includes one wearable audio output device (e.g., a single pair of earbuds or a single set of headphones), the audio output settings user interface includes only a single set of audio output controls corresponding to the one wearable audio output device. In some embodiments, the first set of controls corresponding to the first set of wearable audio output devices includes a subset of the single set of controls corresponding to the one wearable audio output device (e.g., at least initially). In some embodiments, the second set of controls corresponding to the second set of wearable audio output devices includes a subset of the single set of controls corresponding to the one wearable audio output device (e.g., at least initially).

In some embodiments, (e.g., in accordance with the determination that the computer system is in communication with at least the first and second sets of wearable audio output devices, and further) in accordance with a determination that the second set of wearable audio output devices is capable of outputting audio in a second plurality of different audio output modes (e.g., a second plurality of two or more distinct audio output modes), the second set of audio output controls includes (2408) a representation of a second audio output mode that is a current audio output mode of a second plurality of audio output modes available at the second set of wearable audio output devices. For example, noise management control 2326 is displayed in second set of audio output controls 2320 in FIG. 23A in accordance with a determination that corresponding headphones 2334 are capable of outputting audio in multiple different audio output modes. In some embodiments, the second audio output mode that is the current audio output mode of the second set of wearable audio output devices is the same or different from the first audio output mode that is the current audio output mode of the first set of wearable audio output devices.

In some embodiments, the current audio output mode of the first set of wearable audio output devices can be selected independently from the current audio output mode of the second set of wearable audio output devices, and vice versa. In some embodiments, the representation of the first audio output mode that is the current audio output mode of the first set of wearable audio output devices is displayed (e.g., in accordance with the determination that the computer system is in communication with at least the first and second sets of wearable audio output devices, and further) in accordance with a determination that the first set of wearable audio output devices is capable of outputting audio in each of the first plurality of audio output modes. In some embodiments, a respective wearable audio output device is capable of outputting audio in a plurality of different audio output modes when the respective wearable audio output device is capable of outputting audio in each of the plurality of audio output modes (e.g., the respective wearable audio output device need not be capable of outputting audio in multiple audio output modes simultaneously).

In some embodiments, in accordance with a determination that the first set of wearable audio output devices is capable of outputting audio in only one audio output mode (e.g., a noise control off mode in which neither cancellation audio components nor pass-through audio components are provided), the representation of the current audio output mode of the first set of wearable audio output devices is not displayed, or, alternatively, the representation of the current audio output mode of the first set of wearable audio output devices is a representation of the one audio output mode. In some embodiments, in accordance with a determination that the second set of wearable audio output devices is capable of outputting audio in only one audio output mode (e.g., the noise control off mode), the representation of the current audio output mode of the second set of wearable audio output devices is not displayed (e.g., as described herein with reference to FIG. 23T), or, alternatively, the representation of the current audio output mode of the second set of wearable audio output devices is a representation of the one audio output mode.

In some embodiments, the first plurality of audio output modes includes two or more of: the noise control off mode, an active noise control mode, or a pass-through mode (e.g., the first plurality of audio output modes includes an active noise control mode and/or a pass-through mode in addition to a noise control off mode). In some embodiments, the second plurality of audio output modes includes two or more of: the noise control off mode, an active noise control mode, or a pass-through mode (e.g., the second plurality of audio output modes includes an active noise control mode and/or a pass-through mode in addition to a noise control off mode). In some embodiments, the first plurality of audio output modes includes the same audio output modes as the second plurality of audio output modes. In some embodiments, the first plurality of audio output modes includes a subset or superset of the audio output modes in the second plurality of audio output modes (e.g., the first plurality of audio output modes includes a noise control off mode, an active noise control mode, and a pass-through mode, and the second plurality of audio output modes includes the noise control off mode and the active noise control mode but not the pass-through mode).

Displaying a current audio output mode indicator for a set of audio output devices based on the ability of the set of audio output devices to support multiple audio output modes provides visual feedback to the user that the audio output mode of the set of audio output devices can be changed. Inversely, forgoing displaying any current audio output mode indicator for a set of audio output devices that does not support multiple audio output modes provides visual feedback to the user (e.g., by the absence of the visual feedback) that the audio output mode of the set of audio output devices cannot be changed, and avoids misleading the user into believing that the audio output mode of the set of audio output devices can be changed. Providing improved feedback to the user enhances the operability of the computer system and connected audio output devices and makes the user-device interface more efficient (e.g., by helping the user to achieve an intended outcome and reducing user mistakes when operating/interacting with the system), which, additionally, reduces power usage and improves battery life of the system by enabling the user to use the system more quickly and efficiently.

In some embodiments, in accordance with a determination that the computer system is in communication with a single (e.g., exactly one) set of one or more wearable audio output devices, the audio output settings user interface includes (2410) a single (e.g., exactly one) set of audio output controls corresponding to the single set of wearable audio output devices, including a single (e.g., exactly one) volume control indicating a current output volume level of the single set of wearable audio output devices, as illustrated for example by settings user interface 705 in FIG. 7E. In some embodiments, in accordance with a determination that the single set of wearable audio output devices is capable of outputting audio in each of a respective plurality of audio output modes, the computer system displays a single (e.g., exactly one) representation of a respective audio output mode that is a current audio output mode of the respective plurality of audio output modes available at the single set of wearable audio output devices, where the single representation of the respective audio output mode is visually associated with the single volume control. In some embodiments, in accordance with a determination that the single set of wearable audio output devices is capable of outputting audio in only one audio output mode (e.g., the noise control off mode), the computer system displays a single representation that is a representation of the one audio output mode, or, alternatively, the computer system forgoes displaying a representation of the current audio output mode of the single set of wearable audio output devices.

In some embodiments, the single volume control includes a plurality of state options that correspond to a plurality of available values for output volume level for the single set of wearable audio output devices. In some embodiments, the audio output settings user interface includes, in combination with the single set of audio output controls, a representation of the single set of wearable audio output devices. In some embodiments, the single set of wearable audio output devices is the first set of wearable audio output devices, and the single set of audio output controls is the first set of audio output controls as described herein. In some embodiments, the single set of wearable audio output devices is the second set of wearable audio output devices, and the single set of audio output controls is the second set of audio output controls as described herein.

Displaying a single set of audio output controls when only a single set of audio output devices is connected provides the user with visual feedback as to the state of the set of audio output devices and access to control over audio output settings for the set of audio output devices, without displaying unnecessary inoperative controls, which may be distracting or misleading to the user, for additional sets of audio output devices that are not connected. Providing improved feedback to the user without cluttering the user interface with additional displayed controls enhances the operability of the computer system and connected audio output devices and makes the user-device interface more efficient (e.g., by helping the user to achieve an intended outcome and reducing user mistakes when operating/interacting with the system), which, additionally, reduces power usage and improves battery life of the system by enabling the user to use the system more quickly and efficiently.

In some embodiments, while displaying the audio output settings user interface, the computer system receives (2412) a second input corresponding to a request to change an output volume level of a respective set of wearable audio output devices. In some embodiments, the input corresponding to a request to change an output volume level of a respective wearable audio output device includes a drag input on the respective volume control of the respective wearable audio output device. In some embodiments, in response to receiving the second input: in accordance with a determination that the second input corresponds to (e.g., the first volume control of) the first set of wearable audio output devices, the computer system changes the output volume level of the first set of wearable audio output devices and updates the first volume control to indicate the changed output volume level of the first set of wearable audio output devices without changing the output volume level of the second set of wearable audio output devices (e.g., and without changing the indication displayed in the second volume control of the output volume level of the second set of wearable audio output devices); and, in accordance with a determination that the second input corresponds to (e.g., the second volume control of) the second set of wearable audio output devices, the computer system changes the output volume level of the second set of wearable audio output devices and updates the second volume control to indicate the changed output volume level of the second set of wearable audio output devices without changing the output volume level of the first set of wearable audio output devices (e.g., and without changing the indication displayed in the first volume control of the output volume level of the first set of wearable audio output devices). For example, as discussed herein, FIGS. 23B-23E illustrate that volume control 2314 for one device (e.g., the earphones) is adjustable independently of volume control 2324 for another device (e.g., headphones 2334).

Changing the output volume level of one set of audio output devices in response to an input corresponding to the volume control for that set of audio output devices without changing the output volume level of another set of audio output devices, and vice versa, allows for the output volume levels of each set of audio output devices to be controlled independently of the output volume level of the other set of audio output devices and provides the user with intuitive control over audio outputs. Providing the user with intuitive control options enhances the operability of the computer system and connected audio output devices and makes the user-device interface more efficient (e.g., by helping the user to achieve an intended outcome and reducing user mistakes when operating/interacting with the system), which, additionally, reduces power usage and improves battery life of the system by enabling the user to use the system more quickly and efficiently. In addition, where the user wishes to increase the volume of just one set of audio output devices (but not the other set(s) of audio output devices), forgoing increasing the volume of the other set(s) of audio output devices enables audio to be played at a lower volume at the other set(s) of audio output devices, thereby further reducing power usage and improving battery life of the system.

In some embodiments, the computer system receives (2414) a third input that corresponds to activation of the representation of the first audio output mode; and, in response to receiving the third input, the computer system displays representations of a first plurality of audio output modes of the first set of wearable audio output devices, where the representations of the first plurality of audio output modes include a representation of the first audio output mode and a representation of a second audio output mode that is different from the first audio output mode (e.g., without displaying respective representations of a second plurality of audio output modes of the second set of wearable audio output devices) (e.g., as described herein with reference to FIGS. 23F-23G and 23U-23V). In some embodiments, in response to receiving an input that corresponds to the representation of the second audio output mode, respective representations of the second plurality of audio output modes of the second set of wearable audio output devices are displayed without displaying the respective representations of the first plurality of audio output modes of the first set of wearable audio output devices (e.g., as described herein with reference to FIGS. 23R-23S and 23X-23Y).

Displaying additional options for audio output mode in response to selection of a current audio output mode indicator provides the user with access to additional audio output modes when requested, without prematurely displaying the other audio output mode options, which may be distracting or misleading to the user. Providing additional control options without cluttering the user interface with additional displayed controls, particularly where display of multiple sets of controls for multiple sets of audio output devices requires judicious use of available display area, enhances the operability of the computer system and connected audio output devices and makes the user-device interface more efficient (e.g., by helping the user to achieve an intended outcome and reducing user mistakes when operating/interacting with the system), which, additionally, reduces power usage and improves battery life of the system by enabling the user to use the system more quickly and efficiently.

In some embodiments, prior to detecting the third input, the second volume control indicating a current output volume level of the second set of wearable audio output devices is concurrently displayed (2416) with a representation of a second audio output mode that is a current audio output mode of the second plurality of audio output modes available at the second set of wearable audio output devices, where the representation of the second audio output mode is visually associated with the second volume control. In some embodiments, in response to receiving the third input, the computer system ceases to display the representation of the second audio output mode (e.g., in combination with displaying the respective representations of the first plurality of audio output modes of the first set of wearable audio output devices) (e.g., as described herein with reference to FIGS. 23F-23G).

In some embodiments, in response to receiving an input that corresponds to the representation of the second audio output mode, the representation of the first audio output mode ceases to be displayed (e.g., optionally in combination with respective representations of the second plurality of audio output modes of the second set of wearable audio output devices being displayed). More generally, in some embodiments, in combination with displaying respective representations of a plurality of audio output modes in response to selection of a respective representation of current audio output mode, one or more displayed controls and/or other user interface elements cease to be displayed (e.g., because display area is limited and/or because the controls/user interface elements that cease to be displayed need not be active while interacting with the respective representations of the plurality of available audio output modes).

In some embodiments, ceasing to display a respective representation of current audio output mode in response to selection of the other representation of current audio output mode (e.g., and display of the respective representations of the plurality of audio output modes associated with the other representation of current audio output mode) is performed in accordance with a determination that the display device is in a first orientation (e.g., portrait orientation). Stated another way, the two representations of current audio output mode are displayed in a predefined region of the audio output settings user interface, and selection of one representation of current audio output mode to display representations of an expanded set of available audio output mode results in at least one other user interface element displayed in the predefined region (e.g., here, the other representation of current audio output mode) ceasing to be displayed (e.g., as described herein with reference to FIGS. 23F-23G).

In some embodiments, in accordance with a determination that the display device is in a second orientation (e.g., landscape orientation) different from the first orientation, display of the respective representation of current audio output mode (and optionally other associated audio output controls for the same wearable audio output device) is maintained for the unselected wearable audio output device, optionally with a changed (e.g., deemphasized or inactive) appearance (e.g., dimmed, grayed out, blurred, obscured, etc.) (e.g., as described herein with reference to FIGS. 23Y-23Z). In some embodiments, in accordance with a determination that the display device is in the second orientation, controls for the first set of wearable audio output devices are displayed (e.g., exclusively) in a first region (e.g., a region encompassing the left half of the display device), and controls for the second set of wearable audio output devices are displayed (e.g., exclusively) in a second region (e.g., a region encompassing the right half of the display device) that is distinct from the first region (e.g., does not overlap with the first region) (e.g., as described herein with reference to FIG. 23W). In some such embodiments, in combination with displaying respective representations of the plurality of audio output modes associated with a respective representation of current audio output mode for a respective wearable audio output device, one or more user interface elements for the corresponding respective wearable audio output device (e.g., displayed in the same region), such as a representation of the respective wearable audio output device, cease to be displayed (e.g., and display of the set of audio output controls for the other device in the other region is maintained) (e.g., as described herein with reference to FIG. 23Y).

In response to selection of a current audio output mode indicator for a first set of audio output devices, ceasing to display the current audio output mode indicator for other set(s) of audio output devices provides visual feedback to the user indicating that control over the audio output mode for the other set(s) of audio output devices is not available while viewing and/or interacting with the audio output mode options for the first set of audio output devices, and avoids displaying inoperative controls that may be distracting or misleading to the user. Providing improved feedback to the user and reducing clutter in the user interface by additional displayed controls, particularly where display of multiple sets of controls for multiple sets of audio output devices requires judicious use of available display area, enhances the operability of the computer system and connected audio output devices and makes the user-device interface more efficient (e.g., by helping the user to achieve an intended outcome and reducing user mistakes when operating/interacting with the system), which, additionally, reduces power usage and improves battery life of the system by enabling the user to use the system more quickly and efficiently.

In some embodiments, while displaying the respective representations of the first plurality of audio output modes of the first set of wearable audio output devices (e.g., while the one or more of the second set of audio output controls such as the second volume control is displayed with the second appearance in accordance with some embodiments), the computer system receives (2418) a fifth input that corresponds to a request to change an output volume level of the second set of wearable audio output devices using the second volume control (e.g., a touch input at a location on a touch-sensitive surface that corresponds to the displayed second volume control). In some embodiments, in response to receiving the fifth input, the computer system forgoes changing the output volume level of the second set of wearable audio output devices (e.g., and forgoes changing the indication displayed in the second volume control of the output volume level of the second set of wearable audio output devices) (e.g., as described herein with reference to FIGS. 23J-23K).

While displaying the audio output mode options for a first set of audio output devices, forgoing changing the output volume level of other set(s) of audio output devices in response to interaction with controls for the other set(s) of audio output devices provides feedback to the user indicating that interaction with those controls is not available while viewing and/or interacting with the audio output mode options for the first set of audio output devices. Providing improved feedback to the user enhances the operability of the computer system and connected audio output devices and makes the user-device interface more efficient (e.g., by helping the user to achieve an intended outcome and reducing user mistakes when operating/interacting with the system), which, additionally, reduces power usage and improves battery life of the system by enabling the user to use the system more quickly and efficiently.

In some embodiments, while displaying the respective representations of the first plurality of audio output modes of the first set of wearable audio output devices (e.g., while the one or more of the second set of audio output controls such as the second volume control is displayed with the second appearance in accordance with some embodiments), in accordance with a determination that the current output volume level of the second set of wearable audio output devices has changed (e.g., for example in response to user interaction with a volume control hardware element of the second set of wearable audio output devices, or in response to adaptive changes in output volume level of the second set of wearable audio output devices, for example due to changes in ambient sound), the computer system updates (2420) the second volume control to indicate the changed output volume level of the second set of wearable audio output devices (e.g., as described herein with reference to FIGS. 23L-23M).

While displaying the audio output mode options for a first set of audio output devices, continually updating volume control(s) for other set(s) of audio output devices to reflect changes in output volume level of the other set(s) of audio output devices (e.g., even though such changes cannot currently be made using inputs directed to a displayed volume control itself) provides visual feedback to the user that includes accurate information about the state of the other set(s) of audio output devices. Providing improved feedback to the user enhances the operability of the computer system and connected audio output devices and makes the user-device interface more efficient (e.g., by helping the user to achieve an intended outcome and reducing user mistakes when operating/interacting with the system), which, additionally, reduces power usage and improves battery life of the system by enabling the user to use the system more quickly and efficiently.

In some embodiments, while displaying the respective representations of the first plurality of audio output modes of the first set of wearable audio output devices, the computer system receives (2422) a sixth input that corresponds to a request to change an output volume level of the first set of wearable audio output devices using the first volume control. In some embodiments, in response to receiving the sixth input, the computer system changes the output volume level of the first set of wearable audio output devices and updates the first volume control to indicate the changed output volume level of the first set of wearable audio output devices (e.g., as described herein with reference to FIGS. 23H-23I). In some embodiments, while displaying the respective representations of the first plurality of audio output modes of the first set of wearable audio output devices, changing the output volume level of the first set of wearable audio output devices using the first volume control is permitted (e.g., as described herein with reference to FIGS. 23H-23I) whereas changing the output volume level of the second set of wearable audio output devices using the second volume control is not permitted (e.g., as described herein with reference to FIGS. 23J-23K, in contrast to FIGS. 23H-23I). For example, in response to an input at a location on a touch-sensitive surface that corresponds to the first volume control, and movement of the input along the first volume control that changes the state of the first volume control from a state associated with an initial output volume level to a state associated with another output volume level, the output volume level of the first set of wearable audio output devices is changed from the initial output volume level to the other output volume level.

While displaying the audio output mode options for a first set of audio output devices, changing the output volume level of the first set of audio output devices in response to interaction with the volume control for the first set of audio output devices provides visual feedback to the user indicating that interaction with the volume control (e.g., and other controls) for the first set of audio output devices continues to be available while viewing and/or interacting with the audio output mode options for the first set of audio output devices. Providing improved feedback to the user enhances the operability of the computer system and connected audio output devices and makes the user-device interface more efficient (e.g., by helping the user to achieve an intended outcome and reducing user mistakes when operating/interacting with the system), which, additionally, reduces power usage and improves battery life of the system by enabling the user to use the system more quickly and efficiently.

In some embodiments, in response to receiving the third input (e.g., described above with reference to operation 2414) (e.g., and while displaying the respective representations of the first plurality of audio output modes of the first wearable audio output device), the computer system emphasizes (2424) an appearance of the first volume control relative to an appearance of the second volume control (e.g., by changing an appearance of one or more of the second set of audio output controls (e.g., the second volume control) from a first appearance to a second appearance) (e.g., by decreasing a visual emphasis of the second volume control, such as by displaying the second control with an inactive appearance, for example by dimming, graying out (e.g., decreasing a saturation of), blurring, and/or obscuring, etc., the second volume control, and/or increasing a visual emphasis of the first volume control such as by brightening, increasing a saturation of, sharpening, and/or drawing an outline around the first volume control) (e.g., to indicate that the one or more of the second set of audio output controls are not currently interactive; for example to indicate that the second volume control is not currently interactive and cannot be used to adjust the output volume level of the second set of wearable audio output devices). An example of emphasizing the appearance of the first volume control relative to the appearance of the second volume control is described herein with reference to FIG. 23G.

More generally, in some embodiments, in response to receiving an input that corresponds to activation of a respective representation of current audio output mode for a respective wearable audio output device, the appearance of one or more of the set of audio output controls corresponding to the other wearable audio output device is deemphasized (e.g., by decreasing a visual emphasis of the volume control for the other wearable audio output device and/or by increasing a visual emphasis of the volume control for the respective wearable audio output device). In some embodiments, the one or more of the set of audio output controls whose appearance is changed (e.g., emphasized or deemphasized) include the volume control and/or the representation of current audio output mode.

In response to selection of a current audio output mode indicator for a first set of audio output devices, emphasizing the appearance of the volume control for the first set of audio output devices relative to the appearance of still-displayed volume control(s) for other set(s) of audio output devices provides visual feedback to the user indicating that interaction with those controls is not available while viewing and/or interacting with the audio output controls for the first set of audio output devices. Providing improved feedback to the user enhances the operability of the computer system and connected audio output devices and makes the user-device interface more efficient (e.g., by helping the user to achieve an intended outcome and reducing user mistakes when operating/interacting with the system), which, additionally, reduces power usage and improves battery life of the system by enabling the user to use the system more quickly and efficiently.

In some embodiments, while displaying the respective representations of the first plurality of audio output modes of the first set of wearable audio output devices, the computer system receives (2426) a fourth input that corresponds to selection of a representation of a respective audio output mode in the first plurality of audio output modes that is different from the first audio output mode (e.g., input 2336, FIG. 23N). In some embodiments, after receiving the fourth input (e.g., in response to receiving the input, and optionally after a predefined threshold amount of time has elapsed since ceasing to detect the input (e.g., unless a subsequent input is received within the predefined threshold amount of time, in which case whether the predefined threshold amount of time has elapsed is determined based on the amount of time that has elapsed since ceasing to detect the subsequent input)), the computer system ceases to emphasize the appearance of the first volume control relative to the appearance of the second volume control (e.g., as described herein with reference to FIG. 23Q). In some embodiments, ceasing to emphasize the appearance of the first volume control relative to the appearance of the second volume control includes restoring the appearance of the first volume control and/or restoring the appearance of the second volume control (e.g., by reversing the brightening, increase in saturation, sharpening, and/or drawing of an outline around the first volume control and/or reversing the change in the appearance of the second volume control to the inactive appearance by restoring an active appearance to the second volume control, for example by reversing the dimming, decrease in saturation, blurring, and/or obscuring of the second volume control).

In some embodiments, after receiving the fourth input, the computer system maintains display of the selected representation of the respective audio output mode and ceases to display the respective representations of audio output modes other than the respective audio output mode (e.g., as described herein with reference to FIG. 23Q) (e.g., and in some embodiments transitions the first set of wearable audio output devices to the respective audio output mode). In some embodiments, after or in combination with ceasing to emphasize the appearance of the first volume control relative to the appearance of the second volume control, in response to inputs corresponding to requests to change the output volume level of the second set of wearable audio output devices using the second volume control (e.g., while the second volume control is not deemphasized relative to the first volume control), the output volume level of the second set of wearable audio output devices is changed (e.g., as described herein with reference to FIGS. 23B-23E).

In response to selection of an audio output mode from a plurality of displayed audio output mode options for a first set of audio output devices, ceasing to emphasize the appearance of the volume control for the first set of audio output devices relative to the appearance of volume control(s) for other set(s) of audio output devices provides visual feedback to the user that the ability to interact with both the first and other volume controls has been restored. Providing improved feedback to the user enhances the operability of the computer system and connected audio output devices and makes the user-device interface more efficient (e.g., by helping the user to achieve an intended outcome and reducing user mistakes when operating/interacting with the system), which, additionally, reduces power usage and improves battery life of the system by enabling the user to use the system more quickly and efficiently.

In some embodiments, after receiving the fourth input, the computer system maintains (2428) display of the selected representation of the respective audio output mode and ceases to display the representations of audio output modes other than the respective audio output mode, and redisplays the representation of the second audio output mode that is the current audio output mode of the second set of wearable audio output devices (e.g., in combination with ceasing to emphasize the appearance of the first volume control relative to the appearance of the second volume control) (e.g., as described herein with reference to FIG. 23Q).

In response to selection of an audio output mode for a set of first audio output devices from a plurality of displayed audio output mode options, ceasing to display other unselected audio output mode options provides visual feedback to the user of which audio output mode has been selected and avoids unnecessarily displaying controls that may be distracting or misleading to the user. Also, redisplaying the current audio output mode indicator for other set(s) of audio output devices, and in some embodiments reversing changes to the appearance of other still-displayed controls for the other set(s) of audio output devices, provides visual feedback to the user indicating that the ability to interact with those controls to control aspects of the other set(s) of audio output devices has been restored. Providing improved feedback to the user and providing additional control options without cluttering the user interface with additional displayed controls enhances the operability of the computer system and connected audio output devices and makes the user-device interface more efficient (e.g., by helping the user to achieve an intended outcome and reducing user mistakes when operating/interacting with the system), which, additionally, reduces power usage and improves battery life of the system by enabling the user to use the system more quickly and efficiently.

In some embodiments, the computer system receives (2430) a respective input directed to the second volume control (e.g., a touch input at a location on a touch-sensitive surface that corresponds to the displayed second volume control). In some embodiments, in response to receiving the respective input directed to the second volume control, in accordance with a determination that the respective representations of the first plurality of audio output modes of the first set of wearable audio output devices are not (e.g., all) displayed (e.g., although the representation of the current audio mode of the first set of wearable audio output devices may be displayed), the computer system changes the output volume level of the second set of wearable audio output devices and updates the second volume control to indicate the changed output volume level of the second set of wearable audio output devices (e.g., as described herein with reference to FIGS. 23D-23E) (e.g., in accordance with changes in the respective input, such as movement of the touch input along the touch-sensitive surface after initial contact by the touch input at the location that corresponds to the second volume control; optionally, the amount of change of the output volume level of the second set of wearable audio output devices is determined based on a magnitude of the respective input). In some embodiments, in response to receiving the respective input directed to the second volume control, in accordance with a determination that the respective representations of the first plurality of audio output modes of the first set of wearable audio output devices are displayed, the computer system forgoes changing the output volume level of the second set of wearable audio output devices (e.g., and forgoes changing the indication displayed in the second volume control of the output volume level of the second set of wearable audio output devices) (e.g., as described herein with reference to FIGS. 23J-23K).

Changing the output volume level of a set of audio output devices in response to interaction with a volume control for that set of audio output devices while audio output mode options for another set of audio output devices is not displayed provides the user with intuitive control over audio outputs, and forgoing changing the output volume level of the set of audio output devices in response to interaction with the volume control for that set of audio output devices while audio output mode options for another set of audio output devices is displayed provides feedback to the user indicating that interaction with those controls is not available while viewing and/or interacting with the audio output mode options for the first set of audio output devices. Providing the user with intuitive control options and providing improved feedback to the user enhances the operability of the computer system and connected audio output devices and makes the user-device interface more efficient (e.g., by helping the user to achieve an intended outcome and reducing user mistakes when operating/interacting with the system), which, additionally, reduces power usage and improves battery life of the system by enabling the user to use the system more quickly and efficiently.

It should be understood that the particular order in which the operations in FIGS. 24A-24D have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 1000, 1100, 1200, 1800, 1900, 2000, and 2600) are also applicable in an analogous manner to method 2400 described above with respect to FIGS. 24A-24D. For example, the devices, components, user interfaces, audio output controls, audio outputs, and audio output modes described above with reference to method 2400 optionally have one or more of the characteristics of the devices, components, user interfaces, audio output controls, audio outputs, and audio output modes described herein with reference to other methods described herein (e.g., methods 1000, 1100, 1200, 1800, 1900, 2000, and 2600). For brevity, these details are not repeated here.

FIGS. 25A-25G illustrate example user interactions for controlling audio outputs from a wearable audio output device and example audio and visual alerts responsive to such user interactions.

FIG. 25A illustrates example user interactions for controlling audio playback at a wearable audio output device. The user interactions and resulting operations in FIG. 25A are described with reference to a wearable audio output device 301b that is a set of over-ear headphones (sometimes herein called "headphones 301b") having a dial 334 that is rotatable (e.g., as indicated by arrow 2502) and that can be pressed (e.g., as indicated by arrow 2504) to provide inputs to headphones 301b, as reproduced in FIG. 25A and described in further detail herein with reference to FIG. 3D.

As shown in FIG. 25A, rotation 2502 of dial 334 controls the sound volume 2506 of audio outputs from headphones 301b. In some embodiments, rotating dial 334 in one direction (e.g., clockwise) changes the audio output volume in one direction (e.g., increases audio output volume), optionally subject to a first audio output limit (e.g., a maximum volume). In some embodiments, rotating dial 334 in the opposite direction (e.g., counterclockwise) changes the audio output volume in the opposite direction (e.g., decreases audio output volume), optionally subject to a second audio output limit (e.g., a minimum volume, which in some embodiments is zero).

Press inputs 2504 via dial 334 control audio playback and navigation, and can be used to invoke a virtual assistant (e.g., a software module or application, executing on an electronic device, that assists a user with performing tasks or operations on the electronic device (e.g., portable multifunction device 100, or device 300, in communication with the wearable audio output device 301b, via a wired or wireless connection) in response to voice inputs recognized as requests to perform such tasks or operations). For example, FIG. 25A illustrates that a single press input 2504-1 on dial 334 (e.g., pressing once on dial 334 as indicated by arrow 2504) toggles between playing audio 2508 from a respective audio track 2512-1 (e.g., labeled "Track 1") and pausing the audio 2514 at the current playback position 2510 in audio track 2512-1 (e.g., a song, audio clip, audio track for a video or movie, etc.). If audio at current playback position 2510 is being played, single press 2504-1 pauses 2514 the audio playback at current playback position 2510. If audio playback is paused 2514 at current playback position 2510, single press 2504-1 resumes audio playback from current playback position 2510. Single press input 2504-1 in FIG. 25A is analogous to single squeeze gestures 810 and 811 on stem 801 in FIGS. 8E-8F.

In another example, FIG. 25A illustrates that a double press input 2504-2 on dial 334 (e.g., pressing twice on dial 334, as indicated by arrow 2504, in quick succession (e.g., within a predefined time period or with less than a predefined time interval between the two presses)) skips audio playback 2508 forward from current playback position 2510 to a later playback position at the start of a second audio track 2512-2 (e.g., labeled "Track 2"). In some embodiments, audio playback is skipped forward to the start of a subsequent audio track (e.g., the immediately following audio track, such as the next song in a playlist). In some embodiments, audio playback is skipped forward to a later playback position in the same audio track (e.g., audio track 2512-1 and audio track 2512-2 are successive portions of the same audio track). Double press input 2504-2 in FIG. 25A is analogous to double squeeze gesture 813 on stem 801 in FIG. 8G.

In yet another example, FIG. 25A illustrates that a triple press input 2504-3 on dial 334 (e.g., pressing three times on dial 334, as indicated by arrow 2504, in quick succession (e.g., within a predefined total time period or with less than a predefined time interval between each pair of presses)) skips audio playback 2508 backward from current playback position 2510 to an earlier playback position at the start of a third audio track 2512-3 (e.g., labeled "Track 3"). In some embodiments, audio playback is skipped backward to the start of a previous audio track (e.g., the immediately preceding audio track, such as the previous song in a playlist). In some embodiments, audio playback is skipped backward (e.g., rewound) to an earlier playback position in the same audio track (e.g., audio track 2512-3 and audio track 2512-1 are successive portions of the same audio track). In some embodiments, audio playback is skipped backward to the beginning of the same audio track (e.g., audio track 2512-3 is an initial portion of an audio track, and audio track 2512-1 is a subsequent portion of the same audio track). Triple press input 2504-3 in FIG. 25A is analogous to triple squeeze gesture 816 on stem 801 in FIG. 8I.

FIG. 25A also illustrates that a press-and-hold input 2504-4 (sometimes called a "long press," involving pressing dial 334 as indicated by arrow 2504 and maintaining the press for at least a threshold amount of time) invokes a virtual assistant 2516. In some embodiments, "invoking a virtual assistant" refers to launching, initializing, or activating the virtual assistant so that a user can issue voice commands to the virtual assistant to perform tasks or operations on headphones 301b or on an electronic device (e.g., device 100, FIG. 1A) that is in communication with headphones 301b. In some embodiments, press-and-hold input 2504-4 launches the virtual assistant 2516 regardless of whether audio is being played 2508 or whether audio playback is paused 2514 at the time press-and-hold input 2504-4 is received. Press-and-hold input 2504-4 in FIG. 25A is analogous to click-and-hold gesture 1504 on stem 801 in FIG. 15D. However, unlike the scenario described with reference to FIG. 15D, in some embodiments where the wearable audio output device includes a separate, dedicated noise control button (e.g., button 336, FIG. 3D), the operation performed in response to a press-and-hold input via dial 334 is not user-configurable.

Figure 25B:
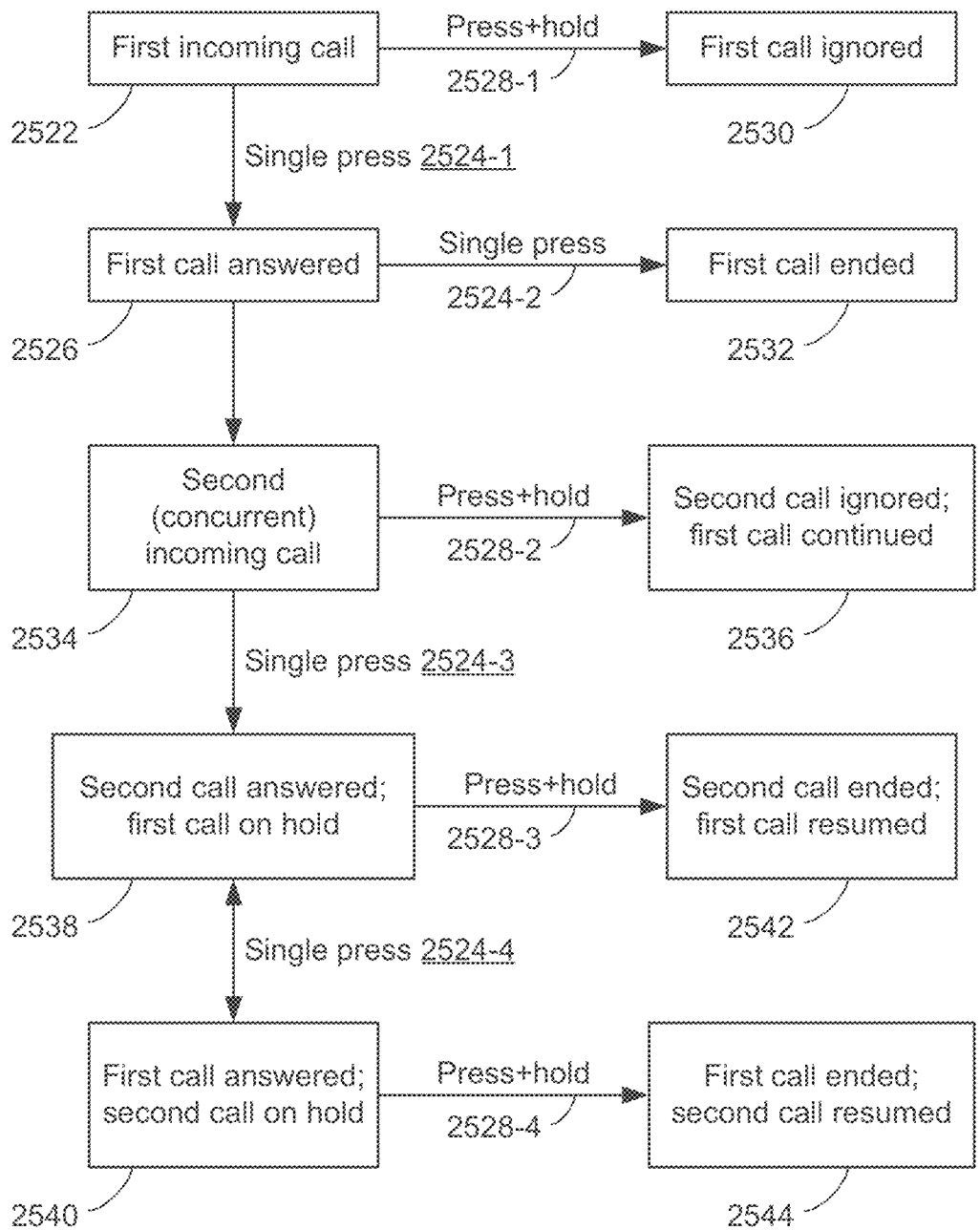

FIG. 25B illustrates example user interactions for managing phone calls using a wearable audio output device. The user interactions and resulting operations in FIG. 25B are described with reference to headphones 301b having dial 334 that is rotatable and that can be pressed (e.g., as described with reference to FIG. 25A) to provide inputs such as single press and press-and-hold inputs to headphones 301b. One of ordinary skill will recognize that similar functionality may be implemented on a different wearable audio output device 301 or a component thereof. For example, the functionality described with reference to FIG. 25B may be implemented using an earbud having a stem (e.g., earbud 303 with stem 305 (FIG. 3C) or earbud 502 with stem 801 (FIG. 8A)) and using inputs on the earbud stem such as single click and click-and-hold gestures.

In FIG. 25B, a first incoming phone call is received (2522). In some embodiments, the first incoming call is received at an electronic device (e.g., device 100, FIG. 1A) that is in communication with headphones 301b, and an alert of the first incoming call, such as a ringtone, is output by headphones 301b. While the first incoming call is ringing (2522), a user may provide a single press input (2524-1) to dial 334 of headphones 301b to answer the first incoming call (e.g., by pressing once on dial 334 as indicated by arrow 2504 (FIG. 25A)), resulting in the first call being answered (2526) (e.g., analogous to tap input 1422 over "Accept" call icon 1418 in FIG. 14S). Alternatively, in some embodiments, while the first incoming call is ringing (2522), the user may provide a press-and-hold input (2528-1) to dial 334 of headphones 301b to ignore the first incoming call (e.g., by pressing on dial 334 as indicated by arrow 2504 (FIG. 25A) and maintaining the press for at least a threshold amount of time before releasing the press), resulting in the first call being ignored (2530) (e.g., the first call is not connected, and optionally redirected to a voice mailbox). If the first call is answered (2526), the user may provide a single press input (2524-2) to end the first call (2532) (e.g., analogous to tap input 1426 over end call icon 1424 in FIG. 14U).

In some circumstances, while the first call is in progress (2526), a second incoming call is received (2534) (e.g., at the same electronic device that received the first call). In some embodiments, an audio alert of the second incoming call is output by headphones 301b, such as a ringtone or other tone (e.g., a beep). In some embodiments, an audio alert of the second incoming call is deemphasized relative to the audio of the ongoing first call. In some embodiments, an audio alert of the second incoming call is not played (e.g., so as not to interfere with the audio of the ongoing first call). While the second incoming call is pending (2534) (e.g., before the second call has been answered or ignored), the user may provide a press-and-hold input (2528-2) to dial 334 to ignore the second incoming call and to remain on the first call (2536).

Alternatively, in some embodiments, while the second incoming call is pending (2534), the user may provide a single press input (2524-3) to dial 334 to answer the second incoming call, resulting in the second call being answered and made the active call and the first call being placed on hold (2538). In some embodiments, the inputs described above with reference to a single connected call perform different operations when multiple calls are connected (including the active call and any call(s) on hold). In the example shown in FIG. 25B, with two calls connected, a single press input swaps which call is the active call. In particular, while the second call is active and the first call is on hold (2538), in response to a single press input (2524-4), the first call is made active and the second call is placed on hold (2540). One of ordinary skill will recognize that a further single press input (2524-4) would result in the second call being made active and the first call being placed on hold again, and so on.

Alternatively, in some embodiments, while the second call is active and the first call is on hold (2538), in response to a press-and-hold input (2528-3), the active second call is ended (e.g., disconnected) and the first call is resumed and made active again (2542). Similarly, in some embodiments, while the first call is active and the second call is on hold (2540), in response to a press-and-hold input (2528-4), the active first call is ended and the second call is resumed and made active again (2544).

Figure 25C:
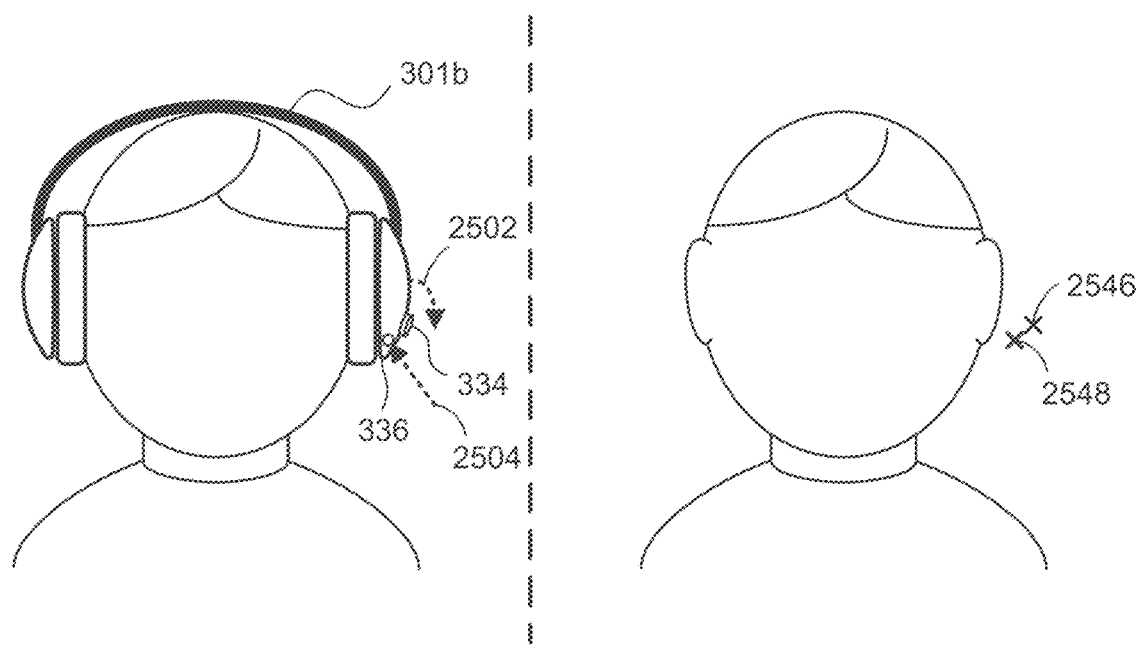

FIG. 25C illustrates example audio alerts that are generated at headphones 301b in response to inputs at dial 334 and button 336. In some embodiments, as dial 334 is rotated (e.g., as indicated by arrow 2502), one or more sounds (e.g., "click" sounds) are played to indicate the rotation of dial 334 (e.g., as dial 334 rotates through different positions corresponding to different values, as described in further detail herein with respect to FIG. 25D). In some embodiments, the sounds played as dial 334 is rotated emulate the sounds made by mechanical detents on a wheel as it rotates. Similarly, in some embodiments, when button 336 is pressed (e.g., as indicated by arrow 2504), a sound (e.g., a "click" sound) is generated to indicate that button 336 has been pressed. In some embodiments, the sounds played as button 336 is pressed emulate the sounds made by pressing and/or releasing a mechanical push button. In some embodiments, sounds are also generated when dial 334 is pressed. Optionally, sounds generated when dial 334 is pressed are different from the sounds generated when dial 334 is rotated. Sounds generated for dial 334 may be the same as or different from sounds generated for button 336.

In some embodiments, as indicated in FIG. 25C, the sounds generated for operating (e.g., rotating, pressing, etc.) dial 334 and/or button 336 are spatial audio sounds that are output so as to sound as though the sounds were coming from specific locations, such as the locations of the corresponding input devices. For example, sounds generated for rotating dial 334 are output to have simulated spatial location 2546 corresponding to the physical location of dial 334, so that the sounds appear to be made by the rotation of dial 334. In another example, sounds generated for pressing button 336 are output to have simulated spatial location 2548 corresponding to the physical location of button 336, so that the sounds appear to be made by the pressing of button 336. In some embodiments, the sounds generated at headphones 301b for dial 334 and/or button 336 supplement sounds naturally produced by mechanical operation of dial 334 and/or button 336.

Figure 25D:
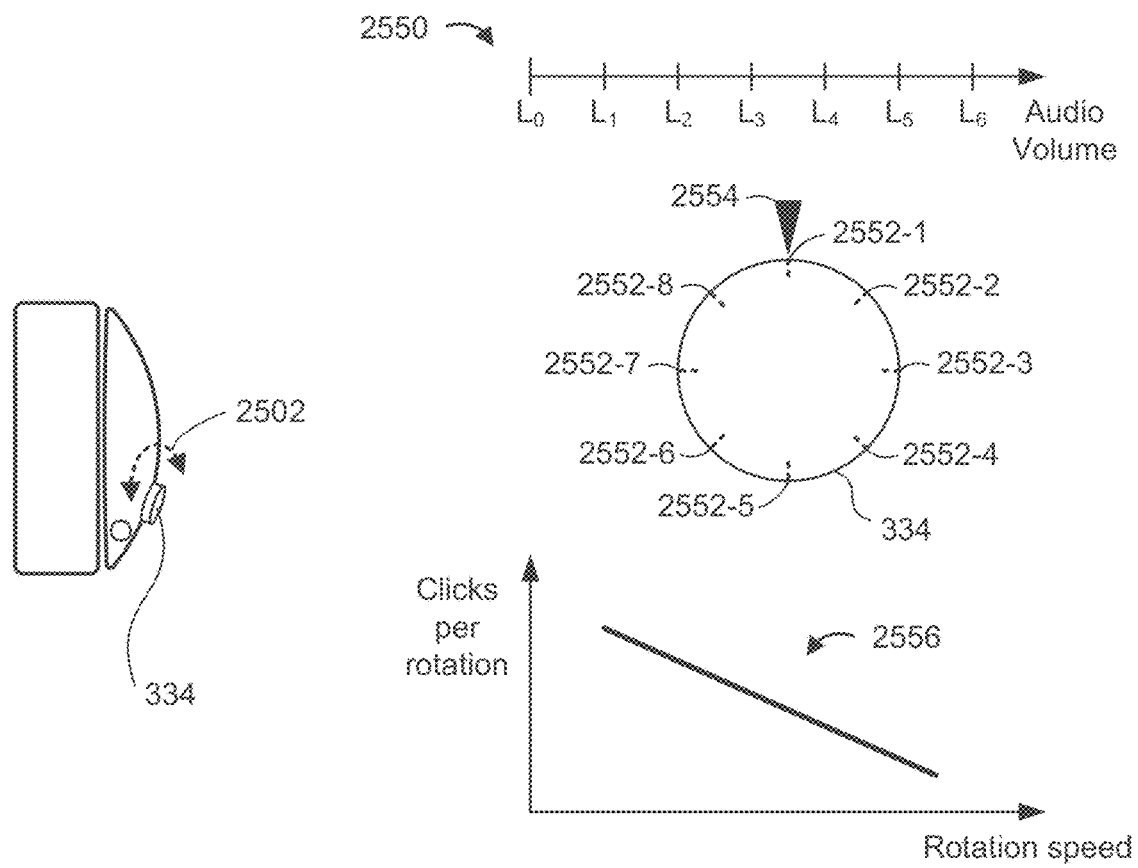

FIG. 25D illustrates example rules for generating audio alerts for the rotation of dial 334. In some embodiments, an audio alert is generated each time the rotation of dial 334 changes the audio output volume to a respective volume level (e.g., any of levels $L_0$ through $L_6$, as indicated in audio volume meter 2550). For example, an audio alert is generated when the audio output volume increases to level $L_3$, and another audio alert is generated when the audio output volume increases further to $L_4$. In some embodiments, although such audio alerts are requested or scheduled to be generated, a predefined time period (e.g., a minimum time period) between audio alerts is enforced. For example, if an audio alert was generated for rotation of dial 334 that increases the audio output volume to volume level $L_3$, and further rotation of dial 334 to increase the audio output volume to volume level $L_4$ occurs less than a threshold amount of time after the rotation of dial 334 that increased the audio output volume to volume level $L_3$ (or, the audio alert for volume level $L_4$ would have been generated less than the threshold amount of time after the audio alert for volume level $L_3$ was generated), an audio alert is not generated for volume level $L_4$. Alternatively, the audio alert for volume level $L_4$ is delayed until the predefined time period has elapsed since the audio alert for volume level $L_3$ was generated. One of ordinary skill will readily understand that analogous principles apply to rotation of dial 334 in the opposite direction to decrease audio output volume.

In some embodiments, an audio alert is generated for a respective amount of rotation of dial 334 (e.g., each time the rotation of dial 334 causes a respective angular position on dial 334, such as any of positions 2552-1 through 2552-8 on dial 334, to cross a reference position, such as position 2554). For example, during counterclockwise rotation of dial 334, an audio alert is generated when position 2552-1 on dial 334 crosses reference position 2554 (e.g., as shown in FIG. 25D), and another audio alert is generated when dial 334 is further rotated such that position 2554-2 on dial 334 crosses reference position 2554. In some embodiments, a predefined time period is enforced between audio alerts for intervals of rotation of dial 334, similar to that described above with reference to changing audio volume levels between audio alerts. For example, if rotation of dial 334 to angular position 2552-3 occurs less than a threshold amount of time after rotation of dial 334 to angular position 2552-2 (e.g., during counterclockwise rotation of dial 334), and an audio alert was generated for angular position 2552-2, an audio alert is not generated for angular position 2552-3, or alternatively the audio alert for angular position 2552-3 is delayed until the predefined time period has elapsed since the audio alert for angular position 2552-2 was generated. One of ordinary skill will recognize that analogous principles apply to clockwise rotation of dial 334.

In some embodiments, the rate at which audio outputs are generated for changes in audio output volume and/or angular position varies based on the speed of rotation of dial 334. As indicated in graph 2556, in some embodiments the number of audio alerts (e.g., "click" sounds) generated for a given amount of rotation of dial 334 decreases as the rotation speed of dial 334 increases. For example, if dial 334 is rotated slowly from angular position 2552-1 through angular positions 2552-2 through 2552-4, more "clicks" are generated than if dial 334 were rotated quickly through the same angular positions. One of ordinary skill will recognize that this behavior is consistent with the enforcement of a minimum time period between audio alerts (e.g., because a minimum time period is enforced, some audio alerts that would have been generated during slower rotation of dial 334 may be skipped during faster rotation of dial 334, thus decreasing the number of audio alerts per unit of rotation).

Figure 25E:
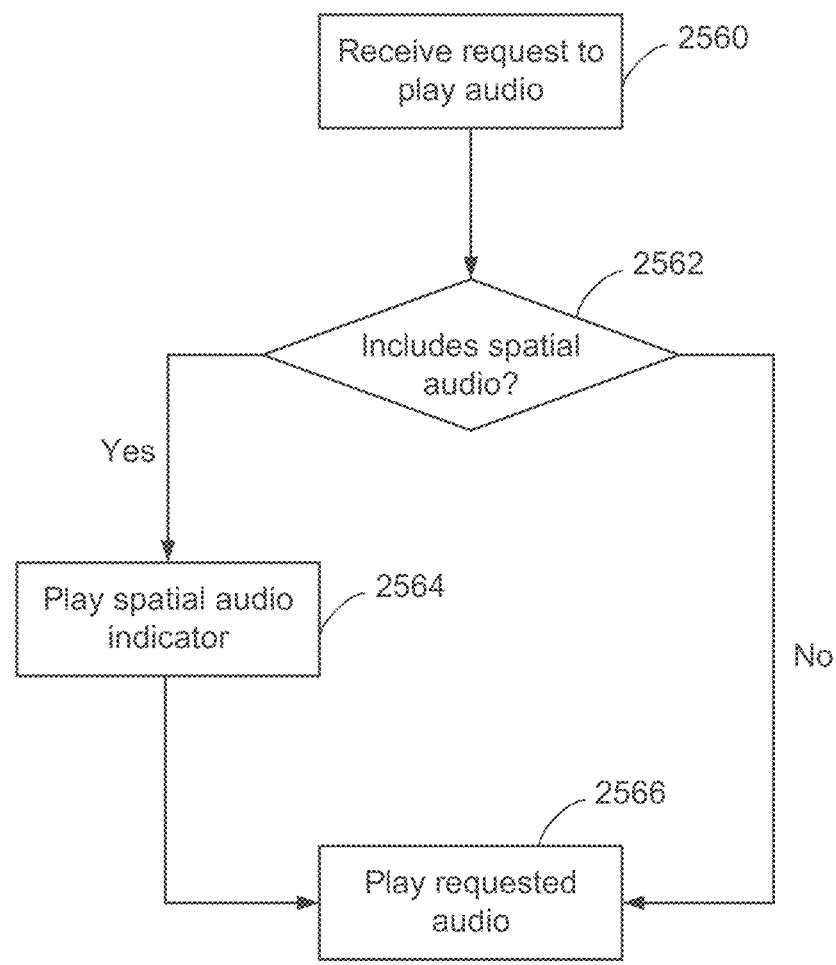

FIG. 25E is a conceptual flow diagram illustrating an example audio alert that is conditionally generated based on the type of audio that a user has requested to be played. In FIG. 25E, a request to play audio is received (2560). In some embodiments, the request to play audio is received at a wearable audio output device 301 such as earbuds 502 or headphones 301b. In some embodiments, the request to play audio is received in response to a corresponding user input that is received at an electronic device (e.g., device 100) that is in communication with wearable audio output device 301, and that requests that audio be played (e.g., selection via a displayed user interface of music or a movie to be played). In accordance with a determination that the requested audio includes spatial audio (e.g., the audio that is to be output is to have one or more simulated spatial locations, so that the sounds seem to come from specific location(s)) (2562—Yes), an audio alert is played to indicate that the requested audio includes spatial audio content (2564). After the spatial audio indicator alert is played (2564), the requested audio (e.g., requested in operation 2560) is played (2566). In accordance with a determination that the requested audio does not include spatial audio (2562—No), the audio alert indicating spatial audio is not played, and the method proceeds directly to playing the requested audio (2566). In some embodiments, the spatial audio indicator alert is played in response to a request to play, from the beginning, the audio that includes spatial audio. In some embodiments, the spatial audio indicator alert is not played in response to a request to resume playback of the requested audio after a first portion of the requested audio has been played and playback has subsequently been paused.

Figure 25F:
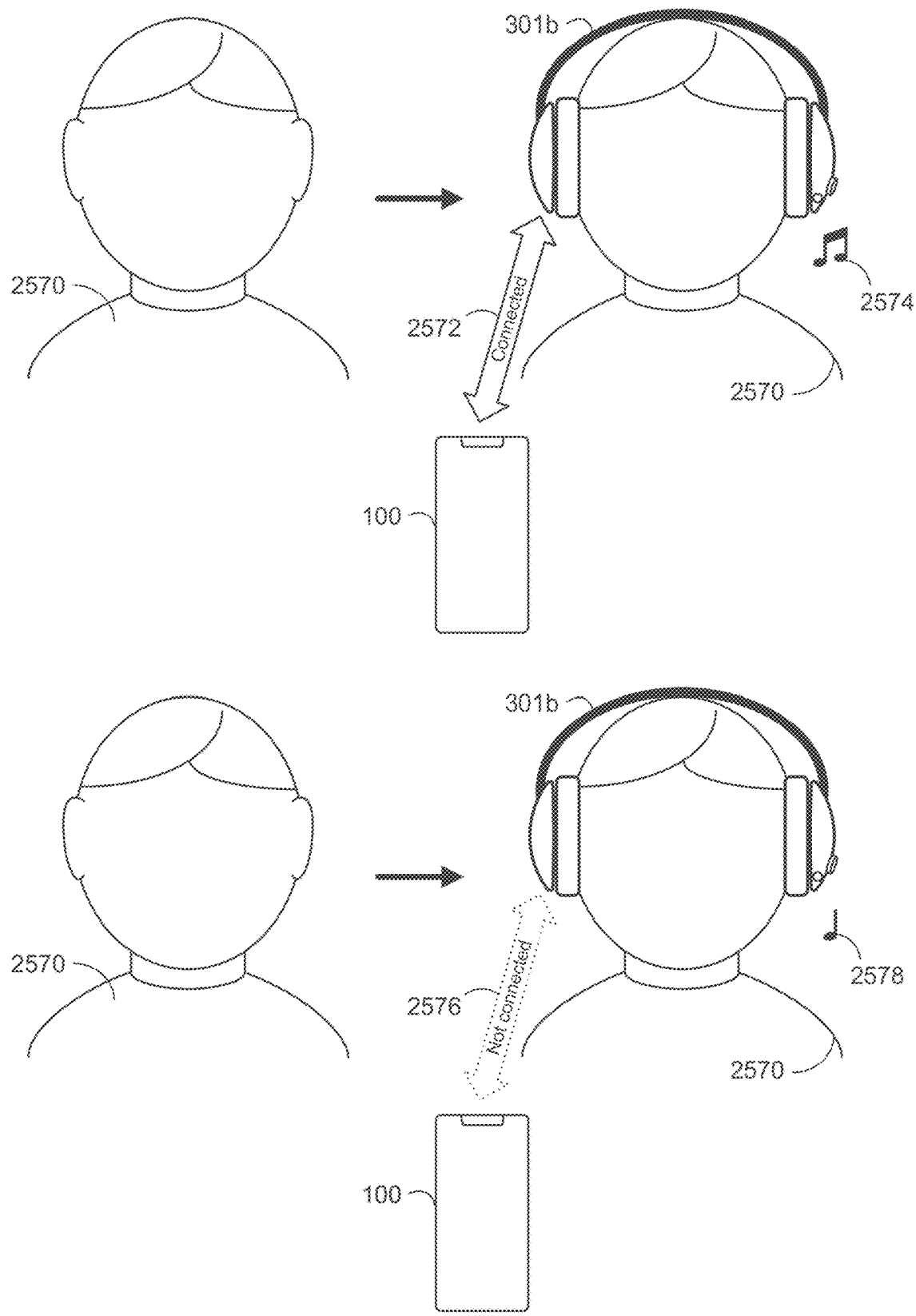

FIG. 25F illustrates example audio alerts to indicate the connection status of a wearable audio output device. In the first example in FIG. 25F, user 2570 is initially not wearing headphones 301b. In response to user 2570 putting on headphones 301b, in accordance with a determination that headphones 301b are connected to a separate electronic device 100 (e.g., from which to receive audio for output), as indicated by arrow 2572, headphones 301b output a first sound 2574 (e.g., a chime, beep, or other audio alert) indicating that headphones 301b are connected to a device. In the second example in FIG. 25F, in response to user 2570 putting on headphones 301b, in accordance with a determination that headphones 301b are not connected to a separate electronic device 100, as indicated by arrow 2576, headphones 301b output a second sound 2578 (e.g., a different chime, beep, or other audio alert) indicating that headphones 301b are not connected to a device. In some embodiments, sound 2578 is a different type of sound from sound 2574. In some embodiments, sound 2578 is a sound indicating that headphones 301b have been placed on a user's head (e.g., sound 2578 is a default "device on head" sound for placement of headphones 301b on a user's head that is replaced with sound 2574 if headphones 301b are connected to another device).

Figure 25G:
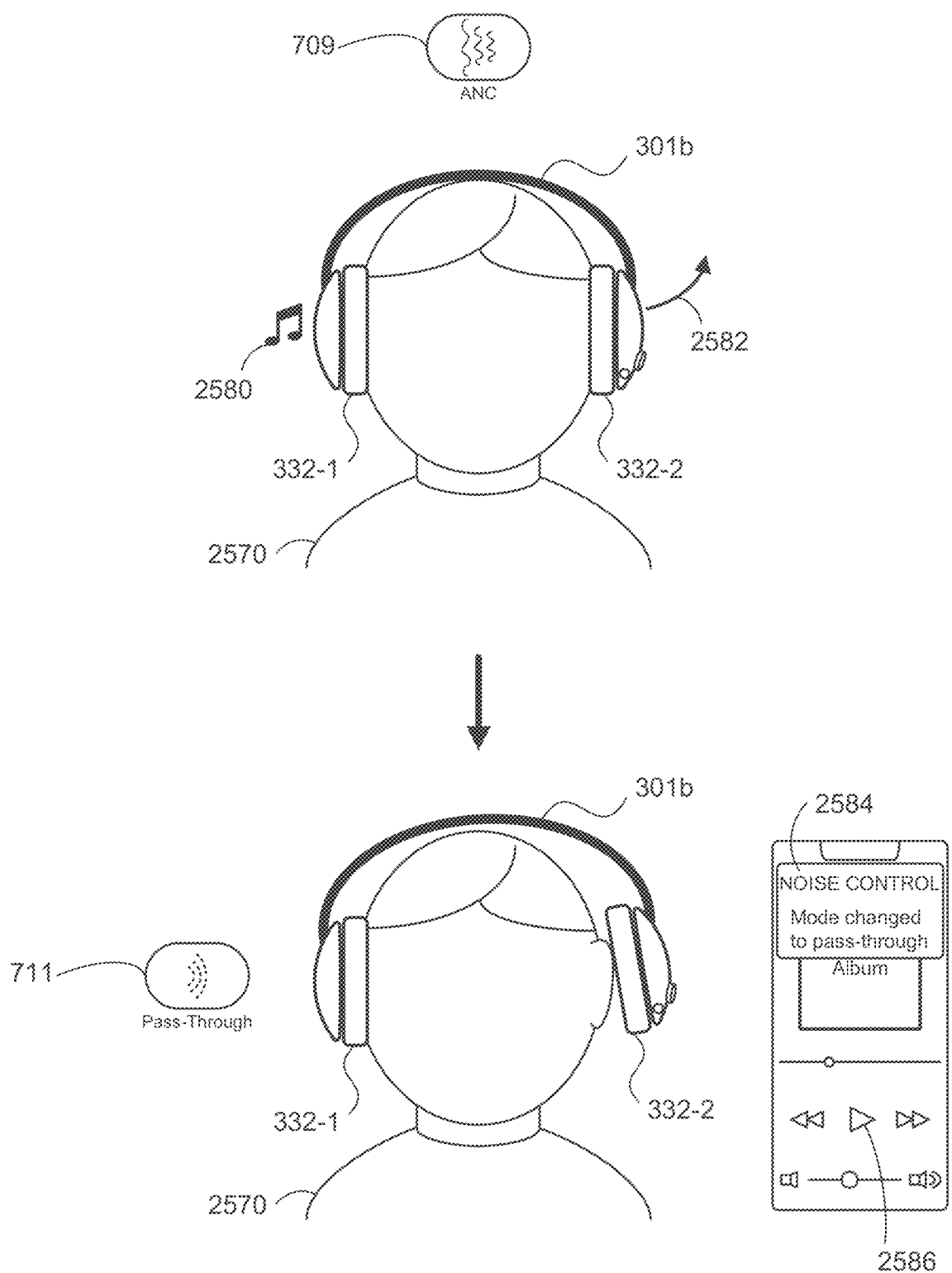
Figure 26A:
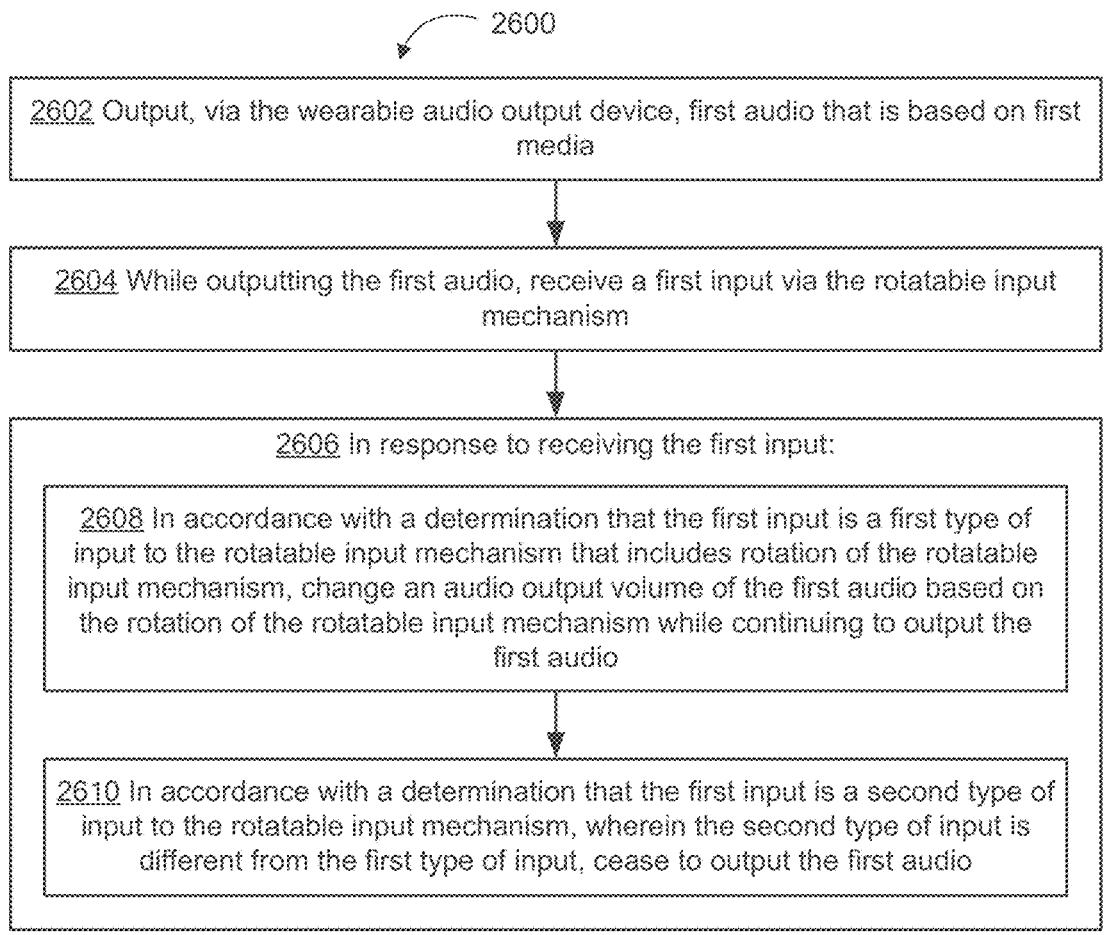

FIG. 25G illustrates example behavior in response to removal of a component of a wearable audio output device from the user's ear. In FIG. 25G, user 2570 is initially wearing headphones 301b with both earcups placed on (e.g., or over) user 2570's ears: earcup 332-1 is on user 2570's right ear, and earcup 332-2 is on user 2570's left ear. User 2570 is using headphones 301b to listen to audio, as indicated by music icon 2580, with headphones 301b operating in the active noise control mode, as indicated by active noise control icon 709.

While headphones 301b are on user 2570's ears, earcup 332-2 is removed from user 2570's left ear (e.g., by user 2570), as indicated by arrow 2582. Arrow 2582 represents any number of ways in which earcup 332-2 is removed from user 2570's ear, including but not limited to the lifting of earcup 332-2 away from user 2570's ear and head, or the repositioning of earcup 332-2 on user 2570's head behind or above the ear rather than on the ear (e.g., for on-ear headphones) or over the ear (e.g., for over-ear headphones).

In response to detecting removal of earcup 332-2 from user 2570's ear, headphones 301b transition to the pass-through mode, as indicated by pass-through icon 711. In some embodiments, headphones 301b transition just earcup 332-1, which remains on user 2570's right ear, to the pass-through mode. Optionally, headphones 301b transition removed earcup 332-2 to the noise control off mode (e.g., which in some embodiments uses less power than either the active noise control mode or the pass-through mode due to the noise control off mode not involving output of additional audio components such as audio-cancelling audio components or pass-through audio components), instead of the pass-through mode.

In some embodiments, as in the example in FIG. 25G, the audio played on headphones 301b is also controlled using a separate device such as device 100. In response to the removal of earcup 332-2, and in combination with headphones 301*b* transitioning to the pass-through mode, device 100 displays a visual alert such as notification 2584 indicating the change in audio output mode. In addition, as in the example in FIG. 25G, playback of audio is paused in response to the removal of earcup 332-2 from user 2570's ear, as indicated by play button 2586 being displayed on device 100 instead of a pause button. Alternatively in some embodiments, playback of audio continues, at least in earcup 332-1, but in the pass-through mode.

FIGS. 26A-26D are flow diagrams of a process for controlling audio outputs from a wearable audio output device. Method 2600 is performed at a wearable audio output device (e.g., wearable audio output device 301, FIG. 3B) with a rotatable input mechanism (e.g., dial 334, FIG. 3D), and optionally one or more additional input devices (e.g., button 336, FIG. 3D). In some embodiments, the wearable audio output device is in communication with an electronic device (e.g., portable multifunction device 100 in FIG. 1A, or device 300 in FIG. 3A) from which audio data is received for output via the wearable audio output device. Some operations in method 2600 are, optionally, combined and/or the order of some operations is, optionally, changed.

As described herein, method 2600 performs different audio control operations in response to different types of inputs to a rotatable input mechanism (e.g., a rotating knob, dial, or crown) to a wearable audio output device, by associating rotational inputs via the rotatable input mechanism with one operation or set of operations, and by associating other types of inputs, such as press, tap, or click inputs, via the rotatable input mechanism with a different operation or set of operations, thus simplifying the user-device interface by enabling the user to provide different types of inputs to perform different operations using a single input device (e.g., without having to switch between different input devices). Providing additional control options without cluttering the user interface with additional displayed controls enhances the operability of the device and makes the user-device interface more efficient (e.g., by helping the user to achieve an intended result and reducing user mistakes when operating/interacting with the device), which, additionally, reduces power usage and improves battery life of the device by enabling the user to use the device more quickly and efficiently.

The wearable audio output device outputs (2602), via the wearable audio output device, first audio that is based on first media (e.g., track 2512-1, FIG. 25A) (e.g., from an electronic device that is in communication (e.g., paired) with the wearable audio output device). In some embodiments, the audio that is based on media is different from audio based on ambient sound (e.g., the audio that is based on media is a media audio component that is not a pass-through audio component). In some embodiments, the audio that is based on media is different from audio that is intended to cancel ambient sound (e.g., the audio that is based on media is a media audio component that is not a cancellation audio component).

While outputting the first audio, the wearable audio output device receives (2604) a first input via the rotatable input mechanism.

In response to receiving the first input (2606), in accordance with a determination that the first input is a first type of input to the rotatable input mechanism that includes (e.g., consists of) rotation of the rotatable input mechanism (2608), the wearable audio output device changes an audio output volume of the first audio based on the rotation of the rotatable input mechanism while continuing to output the first audio. In some embodiments, the audio output volume is increased in response to rotation of the rotatable input mechanism in a first direction (e.g., clockwise). In some embodiments, the audio output volume is progressively increased in accordance with continued rotation of the rotatable input mechanism in the first direction. In some embodiments, increasing the audio output volume is limited by a maximum audio output volume, above which audio output volume is not increased despite further rotation of the rotatable input mechanism in the first direction (e.g., where further rotation is allowed). In some embodiments, the audio output volume is decreased in response to rotation of the rotatable input mechanism in a second direction different from the first direction (e.g., counterclockwise). In some embodiments, the audio output volume is progressively decreased in accordance with continued rotation of the rotatable input mechanism in the second direction. In some embodiments, decreasing the audio output volume is limited by a minimum audio output volume, below which audio output volume is not decreased despite further rotation of the rotatable input mechanism in the second direction (e.g., where allowed). For example, as described herein with reference to FIG. 25A, rotation 2502 of dial 334 of headphones 301*b* changes the volume 2506 of audio outputs from headphones 301*b*.

In response to receiving the first input (2606), in accordance with a determination that the first input is a second type of input to the rotatable input mechanism (2610), wherein the second type of input is different from the first type of input (e.g., the second type of input does not include rotation of the rotatable input mechanism), the wearable audio output device ceases to output the first audio. In some embodiments, the second type of input is a single tap input or short press input on the rotatable input mechanism (e.g., less than a predefined duration) (e.g., single press input 2504-1, FIG. 25A). In some embodiments, the second type of input is a double tap or double press input on the rotatable input mechanism (e.g., double press input 2504-2, FIG. 25A). In some embodiments, the second type of input is a triple tap or triple press input on the rotatable input mechanism (e.g., triple press input 2504-3, FIG. 25A). In some embodiments, the second type of input is a long press or press-and-hold input that is at least the predefined duration (e.g., press-and-hold input 2504-4, FIG. 25A).

In some embodiments, ceasing to output the first audio includes (2612) pausing the first audio (e.g., stopping playback of the first audio at a respective playback position within the first audio) (e.g., with audio paused 2514 at current playback position 2510, FIG. 25A). In some embodiments, the wearable audio output device receives, via the rotatable input mechanism, a second input that is the second type of input (e.g., a single press or tap input, such as a second single press input 2504-1 (FIG. 25A)) to the rotatable input mechanism (e.g., while output of the first audio is paused) and, in response to receiving the second input, resumes outputting the first audio (e.g., resuming playback of the first audio from the respective playback position within the first audio, such as resuming audio playback 2508 of track 2512-1 from current playback position 2510 (FIG. 25A)).

Switching between pausing and playing audio (e.g., toggling audio playback) in response to a particular type of input via the rotatable input mechanism that is different from a rotation-based input via the rotatable input mechanism enables the user to provide different types of inputs to perform different operations using a single input device (e.g., without having to switch between different input devices). Providing additional control options without cluttering the user interface with additional displayed controls enhances the operability of the device and makes the user-device interface more efficient (e.g., by helping the user to achieve an intended result and reducing user mistakes when operating/interacting with the device), which, additionally, reduces power usage and improves battery life of the device by enabling the user to use the device more quickly and efficiently.

In some embodiments, in response to receiving the first input (2614), in accordance with the determination that the first input is the second type of input (e.g., a double press or double tap input) to the rotatable input mechanism (e.g., in combination with ceasing to output the first audio): the wearable audio output device outputs second audio that is different from the first audio and that is associated with second media that follows the first media. In some embodiments, the second media (e.g., immediately) follows the first media in a media collection (e.g., the second media is the next track or next song) (e.g., the second type of input corresponds to a request to skip to the next track or song). In some embodiments, the second media is a later portion of the same track or song (e.g., the second type of input corresponds to a request to skip forward in the same track or song). In some embodiments, outputting the second audio is performed in accordance with a determination that the first input is a third type of input to the rotatable input mechanism, different from the first and second input types, where the third type of input also results in ceasing to output the first audio. For example, as described herein with reference to FIG. 25A, double press input 2504-2 skips audio playback 2508 forward from current playback position 2510 in track 2512-1 to an initial playback position in track 2512-2.

Outputting audio for subsequent media (e.g., skipping forward to later in the same audio track or to the next audio track) in response to a particular type of input via the rotatable input mechanism that is different from a rotation-based input via the rotatable input mechanism enables the user to provide different types of inputs to perform different operations using a single input device (e.g., without having to switch between different input devices). Providing additional control options without cluttering the user interface with additional displayed controls enhances the operability of the device and makes the user-device interface more efficient (e.g., by helping the user to achieve an intended result and reducing user mistakes when operating/interacting with the device), which, additionally, reduces power usage and improves battery life of the device by enabling the user to use the device more quickly and efficiently.

In some embodiments, in response to receiving the first input (2616), in accordance with the determination that the first input is the second type of input (e.g., a triple press or triple tap input) to the rotatable input mechanism (e.g., in combination with ceasing to output the first audio): the wearable audio output device outputs third audio that is different from the first audio and that is associated with third media that precedes the first media. In some embodiments, the third media (e.g., immediately) precedes the first media in a media collection (e.g., the third media is the previous track or previous song) (e.g., the second type of input corresponds to a request to skip to the previous track or song). In some embodiments, the third media is an earlier portion of the same track or song (e.g., the second type of input corresponds to a request to skip backward in the same track or song). In some embodiments, the third media includes some (e.g., an initial portion) or all of the first media, and outputting the third audio results in replaying some or all of the first audio. In some embodiments, outputting the third audio is performed in accordance with a determination that the first input is a fourth type of input to the rotatable input mechanism, different from the first and second input types (and optionally different from the third input type, in embodiments where the third type of input is implemented), where the fourth type of input also results in ceasing to output the first audio. For example, as described herein with reference to FIG. 25A, triple press input 2504-3 skips audio playback 2508 backward from current playback position 2510 in track 2512-1 to an initial playback position in track 2512-3.

Outputting audio for previous media (e.g., skipping backward to earlier in the same audio track or to the previous audio track) in response to a particular type of input via the rotatable input mechanism that is different from a rotation-based input via the rotatable input mechanism enables the user to provide different types of inputs to perform different operations using a single input device (e.g., without having to switch between different input devices). Providing additional control options without cluttering the user interface with additional displayed controls enhances the operability of the device and makes the user-device interface more efficient (e.g., by helping the user to achieve an intended result and reducing user mistakes when operating/interacting with the device), which, additionally, reduces power usage and improves battery life of the device by enabling the user to use the device more quickly and efficiently.

In some embodiments, in response to receiving the first input (2618), in accordance with the determination that the first input is the second type of input (e.g., a long press input) to the rotatable input mechanism (e.g., and in combination with ceasing to output the first audio): the wearable audio output device invokes a virtual assistant. In some embodiments, a virtual assistant assists a user to perform tasks or operations on the electronic device. In some embodiments, a virtual assistant is a software module or application executing on the electronic device. In some embodiments, a user provides voice inputs to the electronic device, and, in accordance with a determination that a respective voice input has been identified as a request to perform a task or an operation on the electronic device (e.g., a request to play selected audio, a request for information, a request to change a setting of the electronic device such as volume, etc.), the virtual assistant causes the requested task or operation to be performed (e.g., initiates playback of the selected audio, provides the requested information (optionally via audio output and/or displayed in a displayed user interface), adjusts the output volume of the electronic device, etc.). In some embodiments, invoking the virtual assistant is performed in accordance with a determination that the first input is a fifth type of input to the rotatable input mechanism, different from the first and second input types (and optionally different from the third input type, in embodiments where the third type of input is implemented, and optionally different from the fourth input type, in embodiments where the fourth type of input is implemented), where the fifth type of input also results in ceasing to output the first audio. For example, as described herein with reference to FIG. 25A, press-and-hold input 2504-4 invokes a virtual assistant 2516.

Invoking a virtual assistant in response to a particular type of input via the rotatable input mechanism that is different from a rotation-based input via the rotatable input mechanism enables the user to provide different types of inputs to perform different operations using a single input device (e.g., without having to switch between different input devices). Providing additional control options without cluttering the user interface with additional displayed controls enhances the operability of the device and makes the user-device interface more efficient (e.g., by helping the user to achieve an intended result and reducing user mistakes when operating/interacting with the device), which, additionally, reduces power usage and improves battery life of the device by enabling the user to use the device more quickly and efficiently.

In some embodiments, the wearable audio output device is (2620) in communication with an electronic device (e.g., portable multifunction device 100 in FIG. 1A, or device 300 in FIG. 3A). In some embodiments, the wearable audio output device receives an alert of a first phone call (e.g., first incoming call 2522, FIG. 25B) received at the electronic device (e.g., an audio and/or video call received at the electronic device from another electronic device). In some embodiments, in response to receiving (e.g., from the electronic device) the alert of the incoming phone call, the wearable audio output device outputs an audio alert, such as a ringtone, to alert a user (e.g., wearer) of the wearable audio output device of the incoming phone call. In some embodiments, while receiving the alert of the first phone call, the wearable audio output device receives, via the rotatable input mechanism, a third input. In some embodiments, in response to receiving the third input: in accordance with a determination that the third input is a first respective type of input to the rotatable input mechanism (e.g., a type of input that corresponds to a request to connect an incoming phone call, such as a single press input of less than a predefined duration), the wearable audio output device outputs audio of the first phone call (e.g., in response to connecting the first phone call, in some embodiments by transmitting instructions to the electronic device to connect the first phone call). For example, as described herein with reference to FIG. 25B, while receiving first incoming call (2522), in response to single press input 2524-1, the first call is answered (2526). In some embodiments, in response to receiving the third input: in accordance with a determination that the third input is a second respective type of input to the rotatable input mechanism (e.g., a type of input that corresponds to a request to forgo connecting an incoming phone call, such as a long press input of at least the predefined duration), wherein the second respective type of input is different from the first respective type of input, the wearable audio output device forgoes outputting audio of the phone call (e.g., and transmitting instructions to the electronic device to forgo connecting the phone call, for example by ignoring the phone call, placing the phone call on hold, transferring the phone call to voicemail, etc.). For example, as described herein with reference to FIG. 25B, while receiving first incoming call (2522), in response to press-and-hold input 2528-1, the first call is ignored (2530).

In some embodiments, the first respective type of input does not include rotation of the rotatable input mechanism. In some embodiments, the second respective type of input does not include rotation of the rotatable input mechanism. In some embodiments, the first respective type of input and the second respective input are any two distinct input types of the types described above with reference to the second type of input (e.g., single press, double press, triple press, long press, etc.).

Answering an incoming call with a first type of input to the rotatable input mechanism and declining the incoming call with a second type of input to the rotatable input mechanism enables the user to provide different types of inputs to perform different operations using a single input device (e.g., without having to switch between different input devices). Providing additional control options without cluttering the user interface with additional displayed controls enhances the operability of the device and makes the user-device interface more efficient (e.g., by helping the user to achieve an intended result and reducing user mistakes when operating/interacting with the device), which, additionally, reduces power usage and improves battery life of the device by enabling the user to use the device more quickly and efficiently.

In some embodiments, while outputting audio of the first phone call (2622) (e.g., in response to receiving the third input and in accordance with a determination that the third input is the first respective type of input, and, optionally, in accordance with a determination that the electronic device is not concurrently connected to a phone call other than the first phone call), the wearable audio output device receives, via the rotatable input mechanism, a fourth input that is the first respective type of input, and, in response to receiving the fourth input, disconnects the first phone call (e.g., by transmitting instructions to the electronic device to disconnect the phone call), and ceases to output audio of the first phone call. For example, as described herein with reference to FIG. 25B, while the first call is active (2526), in response to single press input 2524-2, the first call is ended (2532).

Ending an ongoing call with the first type of input to the rotatable input mechanism (e.g., after answering the call with the same first type of input to the rotatable input mechanism, optionally when only one call is in progress) enables the user to perform different operations using a single input device (e.g., without having to switch between different input devices). Providing additional control options without cluttering the user interface with additional displayed controls enhances the operability of the device and makes the user-device interface more efficient (e.g., by helping the user to achieve an intended result and reducing user mistakes when operating/interacting with the device), which, additionally, reduces power usage and improves battery life of the device by enabling the user to use the device more quickly and efficiently.

In some embodiments, while (e.g., in accordance with a determination that) the electronic device is concurrently connected to the first phone call and a second phone call (2624) (e.g., where the alert of the first phone call was received while the electronic device was connected to a second phone call, and where, in response to the third input that is the first respective type of input, the first phone call was answered and the second phone call was placed on hold), and while outputting audio of the first phone call (e.g., without outputting audio of the second phone call), the wearable audio output device receives, via the rotatable input mechanism, a fifth input. In some embodiments, in response to receiving the fifth input: in accordance with a determination that the fifth input is the first respective type of input, the wearable audio output device: outputs audio of the second phone call (e.g., by transmitting instructions to the electronic device to resume the second phone call), and ceases to output audio of the first phone call (e.g., by transmitting instructions to the electronic device to place the first phone call on hold); and, while outputting audio of the second phone call, receives, via the rotatable input mechanism, a sixth input that is the first respective type of input. In some embodiments, in response to receiving the sixth input: the wearable audio output device ceases to output audio of the second phone call (e.g., by transmitting instructions to the electronic device to place the second phone call on hold (e.g., again)), and outputs audio of the first phone call (e.g., by transmitting instructions to the electronic device to resume the first phone call). For example, as described herein with reference to FIG. 25B, while the first and second calls are connected and one of the calls is active while the other call is on hold (2538), in response to single press input 2524-4, the active call is placed on hold and the call that is on hold is made active (2540).

Switching between multiple ongoing calls with the first type of input to the rotatable input mechanism (e.g., after answering the call with the same first type of input to the rotatable input mechanism) enables the user to perform different operations using a single input device (e.g., without having to switch between different input devices). Providing additional control options without cluttering the user interface with additional displayed controls enhances the operability of the device and makes the user-device interface more efficient (e.g., by helping the user to achieve an intended result and reducing user mistakes when operating/interacting with the device), which, additionally, reduces power usage and improves battery life of the device by enabling the user to use the device more quickly and efficiently.

In some embodiments, in response to receiving the fifth input (2626): in accordance with a determination that the fifth input is the second respective type of input: the wearable audio output device outputs audio of the second phone call (e.g., by transmitting instructions to the electronic device to resume the second phone call), and ceases to output audio of the first phone call (e.g., by transmitting instructions to the electronic device to disconnect the first phone call). In some embodiments, while outputting the audio of the second phone call after transmitting instructions to the electronic device to disconnect the first phone call, the wearable audio output device receives, via the rotatable input mechanism, a seventh input that is the first respective type of input. In some embodiments, in response to receiving the seventh input, the wearable audio output device ceases to output audio of the second phone call without outputting audio of the first phone call (e.g., because the first phone call has already been disconnected). For example, as described herein with reference to FIG. 25B, while one call is active and the other call is on hold (2538 or 2540), in response to a press-and-hold input (2528-3 or 2528-4, respectively), the active call is ended and the call that is on hold is made active and resumed (2542 or 2544, respectively).

Ending an ongoing call with a different type of input to the rotatable input mechanism when multiple calls are in progress than when a single call is in progress (e.g., and a different type of input than is used to switch between the multiple calls) enables the user to perform different operations using a single input device (e.g., without having to switch between different input devices) while avoiding conflicts between which input types (e.g., gestures) are associated with which operations. Providing additional control options without cluttering the user interface with additional displayed controls enhances the operability of the device and makes the user-device interface more efficient (e.g., by helping the user to achieve an intended result and reducing user mistakes when operating/interacting with the device), which, additionally, reduces power usage and improves battery life of the device by enabling the user to use the device more quickly and efficiently.

In some embodiments, the wearable audio output device includes (2628) an input device (e.g., different from the rotatable input mechanism, such as button 336 that is different from dial 334 (FIG. 3D)), and receives, via the input device, an input. In some embodiments, in response to receiving the input via the input device, the wearable audio output device transitions from a first audio output mode to a second audio output mode. In some embodiments, the first and second audio output modes are selected from a set of noise control audio output modes including a noise-cancellation audio output mode, a pass-through audio output mode, and a noise control off mode. In some embodiments, the set of noise control audio output modes includes the noise-cancellation audio output mode and the pass-through audio output mode. In some embodiments, the set of noise control audio output modes includes the noise-cancellation audio output mode and the noise control off mode. In some embodiments, the set of noise control audio output modes includes the pass-through audio output mode and the noise control off mode. For example, as described herein with reference to FIGS. 3D and 9C, activation of button 336 of headphones 301*b* transitions headphones 301*b* from a current audio output mode in a set of selected noise control audio output modes to a next audio output mode in the set of selected noise control audio output modes.

Performing a different set of operations, such as noise control operations, in response to inputs from an input device other than the rotatable input mechanism provides an intuitive user-device interface that associates different classes of inputs (e.g., audio playback control operations versus noise control operations) with different input devices, and avoids assigning too many operations to a single input device, which might require numerous and complex different input types that would be cumbersome for a user to remember and to carry out. Providing additional control options without overburdening a single input device or cluttering the user interface with additional displayed controls enhances the operability of the device and makes the user-device interface more efficient (e.g., by helping the user to achieve an intended result and reducing user mistakes when operating/interacting with the device), which, additionally, reduces power usage and improves battery life of the device by enabling the user to use the device more quickly and efficiently.

In some embodiments, in response to receiving the input via the input device (2630), the wearable audio output device outputs one or more audio outputs that correspond to the input via the input device (e.g., one or more audio outputs (e.g., clicks) indicative of the received input; e.g., in combination with transitioning the audio output mode of the wearable audio output device). In some embodiments, the input via the input device is a press input, and an audio output corresponding to the press input is generated. In some embodiments, an audio output is generated for each press input received via the input device. Examples of audio alerts indicative of inputs received via an input device are described herein with reference to FIG. 25C.

Outputting audio outputs in response to inputs via the input device provides the user with confirmation that such inputs have been registered, particularly where the input device is not itself a mechanical actuator that makes a sound when actuated. Providing improved feedback to the user enhances the operability of the device and makes the user-device interface more efficient (e.g., by helping the user to achieve an intended result and reducing user mistakes when operating/interacting with the device), which, additionally, reduces power usage and improves battery life of the device by enabling the user to use the device more quickly and efficiently.

In some embodiments, in response to receiving the first input (2632): in accordance with the determination that the first input is the first type of input to the rotatable input mechanism that includes rotation of the rotatable input mechanism, the wearable audio output device outputs one or more audio outputs corresponding to the rotation of the rotatable input mechanism. Examples of audio alerts indicative of inputs received via a rotatable input mechanism are described herein with reference to FIGS. 25C-25D.

In some embodiments, the one or more audio outputs include a plurality of (e.g., a series of two or more) audio outputs. For example, a first audio output corresponding to a first point along the rotation of the rotatable input mechanism is generated, a second audio output corresponding to a second point (e.g., later than the first point) along the rotation is generated, and optionally a third audio output corresponding to a third point (e.g., later than the second point) along the rotation is generated, and so on. In some embodiments, an audio output is generated for a respective amount of rotation of the rotatable input mechanism (e.g., an audio output is generated for each time the rotatable input mechanism is rotated by a certain number of degrees, such as 1 degree, 5 degrees, 10 degrees, etc.; e.g., an audio output is generated that is indicative of the amount of rotation of the rotatable input mechanism). In some embodiments, an audio output is generated for a respective amount of rotation of the rotatable input mechanism that corresponds to a respective amount of change in audio output volume.

In some embodiments, a time between successive audio outputs in the plurality of audio outputs is based on a speed of the rotation of the rotatable input mechanism. For example, a time between the first audio output and the second audio output is based on a speed of rotation of the rotatable input mechanism between the first and second points in the rotation (or, alternatively, based on a speed of rotation at the first point, or at the second point). In another example, a time between the second audio output and the third audio output is based on a speed of rotation of the rotatable input mechanism between the second and third points in the rotation (or, alternatively, based on a speed of rotation at the second point, or at the third point). In some embodiments, for a given amount of rotation of the rotatable input mechanism, fewer audio outputs are generated during faster rotation than during slower rotation (e.g., the points along the rotation for which audio outputs are generated are spaced further apart, corresponding to a greater degree of rotation between points for which audio outputs are generated).

In some embodiments, a predefined time period between audio outputs corresponding to rotation is enforced. For example, a time interval from the first point along the rotation to the second point along the rotation is determined. In a scenario where the first audio output is generated, if the time interval between the first point and the second point is less than the predefined time period, the second audio output is not generated; but if the time interval between the first point and the second point is more than the predefined time period, the second audio output is generated. In another example where the first audio output is generated, if a time interval from the first point to the third point is less than the predefined time period, the third audio output is not generated (e.g., in addition to the second audio output not being generated); but if the time interval from the first point to the third point is more than the predefined time period, the third audio output is generated.

In some embodiments, tactile outputs (e.g., corresponding to the audio outputs generated for the rotation of the rotatable input mechanism) are also generated for the rotation of the rotatable input mechanism. In some embodiments, the tactile outputs are subject to analogous timing and/or spacing constraints as those described above for the audio outputs.

Outputting audio outputs in response to inputs via the rotatable input mechanism provides the user with confirmation that such inputs have been registered, particularly where the rotatable input mechanism is not itself a mechanical wheel that generates its own sound when rotated. Providing improved feedback to the user enhances the operability of the device and makes the user-device interface more efficient (e.g., by helping the user to achieve an intended result and reducing user mistakes when operating/interacting with the device), which, additionally, reduces power usage and improves battery life of the device by enabling the user to use the device more quickly and efficiently.

In some embodiments, outputting a respective audio output in response to receiving an input via a respective input device includes (2634) generating the respective audio output with a respective simulated spatial location that corresponds to a physical location (e.g., a physical spatial location) of the respective input device (e.g., so that the audio output sounds as though it were coming from the physical location of the respective input device). For example, an audio output generated in response to rotation (or a press) of the rotatable input mechanism is generated to sound as though the audio is coming from the location of the rotatable input mechanism (e.g., to be perceived as the rotatable input mechanism making sound when being rotated (or pressed)). Similarly, an audio output generated in response to a press of the input device is generated to sound as though the audio is coming from the location of the input device (e.g., to be perceived as the input device making a sound when pressed). Examples of spatial audio alerts indicative of inputs received via a rotatable input mechanism or input device are described herein with reference to FIG. 25C.

Providing audio outputs for inputs to a respective input device at simulated spatial locations that mimic the physical location of the respective input device provides the user with confirmation that such inputs have been registered by the intended respective input device, particularly where the respective input device does not itself make sound when operated. Providing improved feedback to the user enhances the operability of the device and makes the user-device interface more efficient (e.g., by helping the user to achieve an intended result and reducing user mistakes when operating/interacting with the device), which, additionally, reduces power usage and improves battery life of the device by enabling the user to use the device more quickly and efficiently.

In some embodiments, prior to outputting the first audio that is based on first media (e.g., in response to receiving a request to output the first audio) (2636): in accordance with a determination that the first audio includes audio associated with one or more physical spatial locations (e.g., spatial audio content that is to be output so as to sound as though the audio is coming from a particular physical location), the wearable audio output device outputs respective audio indicating that the first audio includes audio associated with one or more physical spatial locations (e.g., as described herein with reference to FIG. 25E). In some embodiments, in accordance with a determination that the first audio does not include audio associated with one or more (e.g., any) physical spatial locations, the wearable audio output device forgoes outputting the respective audio (e.g., as described herein with reference to FIG. 25E).

Providing an audio indication before playing audio content that includes audio content that is to be output at different simulated spatial locations provides the user with feedback that the audio that is about to be played includes spatial audio content. Providing improved feedback to the user enhances the operability of the device and makes the user-device interface more efficient (e.g., by helping the user to achieve an intended result and reducing user mistakes when operating/interacting with the device), which, additionally, reduces power usage and improves battery life of the device by enabling the user to use the device more quickly and efficiently.

In some embodiments, prior to outputting the first audio that is based on first media (2638): the wearable audio output device detects placement of the wearable audio output device on a user (e.g., on the user's head and/or over the user's ears); and, in response to detecting placement of the wearable audio output device on a user, the wearable audio output device plays an audio indication. In accordance with a determination that the wearable audio output device is in communication with an electronic device (e.g., from which to receive audio for output), the audio indication is a first audio indication; and in accordance with a determination that the wearable audio output device is not in communication with an electronic device, the audio indication is a second audio indication that is different from the first audio indication. In some embodiments, the first audio indication indicates that placement of the wearable audio output device on the user has been detected and that the wearable audio output device is connected to an electronic device. In some embodiments, the second audio indication indicates that placement of the wearable audio output device has been detected without the wearable audio output device being connected to an electronic device. For example, as described herein with reference to FIG. 25F, first sound 2574 indicates that placement of headphones 301b on user 2570's head has been detected with headphones 301b being connected to device 100, and second sound 2578 indicates that placement of headphones 301b on user 2570's head has been detected without headphones 301b being connected to device 100.

Providing an audio indication in response to detecting placement of the wearable audio output device on a user, and providing different audio indications based on the connection status between the wearable audio output device and another device, provides the user with feedback that the wearable audio output device is correctly positioned and as to whether the wearable audio output device is ready to output audio. Providing improved feedback to the user enhances the operability of the device and makes the user-device interface more efficient (e.g., by helping the user to achieve an intended result and reducing user mistakes when operating/interacting with the device), which, additionally, reduces power usage and improves battery life of the device by enabling the user to use the device more quickly and efficiently.

In some embodiments, the wearable audio output device includes (2640) a first wearable component (e.g., a first earcup) and a second wearable component (e.g., a second earcup). In some embodiments, while the first wearable component is in a respective position relative to a first ear of a user (e.g., placed on or over an ear of the user, such as the right ear) and the second wearable component is in the respective position relative to a second ear of the user (e.g., placed on or over the other ear of the user, such as the left ear), and while the second wearable component (e.g., or more generally, the wearable audio output device, including also the first wearable component) is operating in a first audio output mode (e.g., in a noise control off audio output mode (sometimes called a bypass audio output mode or a standard audio output mode) or in an active noise control audio output mode), the wearable audio output device detects a change in position of the first wearable component to a position other than the respective position (e.g., detecting removal of the first wearable component from the respective position relative to the user's ear, such as by being lifted away from the user's ear or being placed elsewhere on the user's head, such as next to (e.g., behind, in front of, or above) the user's ear, so that the user's ear is not covered by the first wearable component). In some embodiments, in response to detecting the change in position of the first wearable component to a position other than the respective position: the wearable audio output device operates the second wearable component of the wearable audio output device in a second audio output mode that includes a greater degree of audio transparency than the first audio output mode (e.g., by the wearable audio output device transitioning itself or at least the second wearable component to a pass-through mode from a different mode such as from the noise control off audio output mode or from the active noise control audio output mode). This feature is described herein with reference to FIG. 25G and is analogous to the features described herein with reference to FIG. 7J and operation 1234 of method 1200.

In some embodiments, at least the second wearable component is operated in the pass-through audio output mode. In some embodiments, the removed first wearable component is also operated in the pass-through audio output mode (e.g., the wearable audio output device as a whole is operated in the pass-through audio output mode). In some embodiments, because the first wearable component has been removed, the first wearable component is not operated in the pass-through audio output mode (e.g., no pass-through audio components are provided via the first wearable component, because the user would not hear them while the first wearable component is removed, thereby potentially reducing power usage). In some embodiments, the wearable audio output device, or at least the second wearable component of the wearable audio output device, is maintained in the pass-through mode if the wearable audio output device was already operating in the pass-through mode.

Operating the wearable audio output device in an audio output mode with a greater degree of audio transparency in response to detecting removal of a first wearable component of the wearable audio output device from an ear of the user provides the user with increased audio transparency of the audio output device in at least the second wearable component while it remains in, on, or over the other ear of the user, consistent with the removal of the first wearable component likely being an indication that the user wants to hear more ambient sound from his or her surrounding physical environment, and without requiring the user to manually change the audio output mode of the wearable audio output device. Performing an operation (e.g., automatically) when a set of conditions has been met without requiring further user input enhances the operability of the device and makes the user-device interface more efficient (e.g., by helping the user to achieve an intended result and reducing user mistakes when operating/interacting with the device), which, additionally, reduces power usage and improves battery life of the device by enabling the user to use the device more quickly and efficiently.

It should be understood that the particular order in which the operations in FIGS. 26A-26D have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 1000, 1100, 1200, 1800, 1900, 2000, and 2400) are also applicable in an analogous manner to method 2600 described above with respect to FIGS. 26A-26D. For example, the devices, components, user interfaces, input types, audio output controls, media, audio outputs, and audio output modes described above with reference to method 2600 optionally have one or more of the characteristics of the devices, components, user interfaces, audio output controls, audio outputs, and audio output modes described herein with reference to other methods described herein (e.g., methods 1000, 1100, 1200, 1800, 1900, 2000, and 2400). For brevity, these details are not repeated here.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A method, comprising:
   at a computer system that includes a wearable audio output device in a physical environment:
     while a first wearable audio output component of the wearable audio output device is in a first position relative to a first ear of a user and a second wearable audio output component of the wearable audio output device is in the first position relative to a second ear of the user, operating the wearable audio output device in a first audio output mode;
     while operating the wearable audio output device in the first audio output mode, detecting a change in position of the first wearable audio output component from the first position relative to the first ear of the user to a second position relative to the first ear of the user; and
     in response to detecting the change in position of the first wearable audio output component from the first position relative to the first ear of the user to the second position relative to the first ear of the user, while the second wearable audio output component is maintained in the first position relative to the second ear of the user:
       transitioning the wearable audio output device from the first audio output mode to a second audio output mode that is a pass-through audio output mode that is different from the first audio output mode, wherein, while the wearable audio output device is in the pass-through audio output mode, audio outputs that are provided via the wearable audio output device include one or more pass-through audio components that include at least a portion of ambient sound from the physical environment.

2. The method of claim 1, wherein a respective wearable audio output component being in the first position relative to a respective ear of the user includes the respective wearable audio output component being placed at least partially within the respective ear, and a respective wearable audio output component being in the second position relative to a respective ear of the user includes the respective wearable audio output component being outside of the respective ear.

3. The method of claim 2, including:
   in response to detecting a change in position of the second wearable audio output component from the first position relative to the second ear of the user to the second position relative to the second ear of the user, while the first wearable audio output component is maintained in the second position relative to the first ear of the user:
     transitioning the wearable audio output device from the second audio output mode to a third audio output mode that is a noise control off mode, wherein, while the wearable audio output device is in the noise control off mode, audio outputs that are provided via the wearable audio output device do not include one or more pass-through audio components that include at least a portion of ambient sound from the physical environment and do not include one or more cancellation audio components selected so as to at least partially cancel ambient sound from the physical environment.

4. The method of claim 2, including:
   after detecting the change in position of the first wearable audio output component from the first position relative to the first ear of the user to the second position relative to the first ear of the user, in response to detecting a change in position of the first wearable audio output component from the second position relative to the first ear of the user back to the first position relative to the first ear of the user, while the second wearable audio output component is maintained in the first position relative to the first ear of the user:
     transitioning the wearable audio output device from the second audio output mode to the first audio output mode.

5. The method of claim 1, wherein a respective wearable audio output device being in the first position relative to a respective ear of the user includes the respective wearable audio output device being outside of the respective ear, and a respective wearable audio output device being in the second position relative to a respective ear of the user includes the respective wearable audio output device being placed at least partially in the respective ear.

6. The method of claim 5, including:
   prior to operating the wearable audio output device in the first audio output mode:
     while the first wearable audio output component is in the second position relative to the first ear of the user and the second wearable audio output component is in the second position relative to the second ear of the user, operating the wearable audio output device in a respective audio output mode; and
   after detecting the change in position of the first wearable audio output component from the first position relative to the first ear of the user to the second position relative to the first ear of the user:
     in response to detecting a change in position of the second wearable audio output component from the first position relative to the second ear of the user to the second position relative to the second ear of the user, while the first wearable audio output component is maintained in the second position relative to the first ear of the user:

transitioning the wearable audio output device from the second audio output mode to the respective audio output mode.

7. The method of claim 1, including:
while operating the wearable audio output device in a respective audio output mode, receiving an alert of an incoming phone call;
detecting an input that corresponds to a request to answer the incoming phone call; and
in response to detecting the input corresponding to a request to answer the incoming phone call:
transitioning the wearable audio output device from the respective audio output mode to the second audio output mode.

8. The method of claim 7, including:
detecting termination of the phone call; and
in response to detecting the termination of the phone call:
transitioning the wearable audio output device from the second audio output mode to the respective audio output mode.

9. A computer system, comprising:
a wearable audio output device in a physical environment;
one or more processors; and
memory storing one or more programs, wherein the one or more programs are configured to be executed by the one or more processors, the one or more programs including instructions for:
while a first wearable audio output component of the wearable audio output device is in a first position relative to a first ear of a user and a second wearable audio output component of the wearable audio output device is in the first position relative to a second ear of the user, operating the wearable audio output device in a first audio output mode;
while operating the wearable audio output device in the first audio output mode, detecting a change in position of the first wearable audio output component from the first position relative to the first ear of the user to a second position relative to the first ear of the user; and
in response to detecting the change in position of the first wearable audio output component from the first position relative to the first ear of the user to the second position relative to the first ear of the user, while the second wearable audio output component is maintained in the first position relative to the second ear of the user:
transitioning the wearable audio output device from the first audio output mode to a second audio output mode that is a pass-through audio output mode that is different from the first audio output mode, wherein, while the wearable audio output device is in the pass-through audio output mode, audio outputs that are provided via the wearable audio output device include one or more pass-through audio components that include at least a portion of ambient sound from the physical environment.

10. The computer system of claim 9, wherein a respective wearable audio output component being in the first position relative to a respective ear of the user includes the respective wearable audio output component being placed at least partially within the respective ear, and a respective wearable audio output component being in the second position relative to a respective ear of the user includes the respective wearable audio output component being outside of the respective ear.

11. The computer system of claim 10, wherein the one or more programs include instructions for:
in response to detecting a change in position of the second wearable audio output component from the first position relative to the second ear of the user to the second position relative to the second ear of the user, while the first wearable audio output component is maintained in the second position relative to the first ear of the user:
transitioning the wearable audio output device from the second audio output mode to a third audio output mode that is a noise control off mode, wherein, while the wearable audio output device is in the noise control off mode, audio outputs that are provided via the wearable audio output device do not include one or more pass-through audio components that include at least a portion of ambient sound from the physical environment and do not include one or more cancellation audio components selected so as to at least partially cancel ambient sound from the physical environment.

12. The computer system of claim 10, wherein the one or more programs include instructions for:
after detecting the change in position of the first wearable audio output component from the first position relative to the first ear of the user to the second position relative to the first ear of the user, in response to detecting a change in position of the first wearable audio output component from the second position relative to the first ear of the user back to the first position relative to the first ear of the user, while the second wearable audio output component is maintained in the first position relative to the first ear of the user:
transitioning the wearable audio output device from the second audio output mode to the first audio output mode.

13. The computer system of claim 9, wherein a respective wearable audio output device being in the first position relative to a respective ear of the user includes the respective wearable audio output device being outside of the respective ear, and a respective wearable audio output device being in the second position relative to a respective ear of the user includes the respective wearable audio output device being placed at least partially in the respective ear.

14. The computer system of claim 13, wherein the one or more programs include instructions for:
prior to operating the wearable audio output device in the first audio output mode:
while the first wearable audio output component is in the second position relative to the first ear of the user and the second wearable audio output component is in the second position relative to the second ear of the user, operating the wearable audio output device in a respective audio output mode; and
after detecting the change in position of the first wearable audio output component from the first position relative to the first ear of the user to the second position relative to the first ear of the user:
in response to detecting a change in position of the second wearable audio output component from the first position relative to the second ear of the user to the second position relative to the second ear of the user, while the first wearable audio output component is maintained in the second position relative to the first ear of the user:
transitioning the wearable audio output device from the second audio output mode to the respective audio output mode.

15. The computer system of claim 9, wherein the one or more programs include instructions for:
- while operating the wearable audio output device in a respective audio output mode, receiving an alert of an incoming phone call;
- detecting an input that corresponds to a request to answer the incoming phone call; and
- in response to detecting the input corresponding to a request to answer the incoming phone call:
  - transitioning the wearable audio output device from the respective audio output mode to the second audio output mode.

16. The computer system of claim 15, wherein the one or more programs include instructions for:
- detecting termination of the phone call; and
- in response to detecting the termination of the phone call:
  - transitioning the wearable audio output device from the second audio output mode to the respective audio output mode.

17. A non-transitory computer readable storage medium storing one or more programs, the one or more programs comprising instructions that, when executed by a computer system that includes a wearable audio output device in a physical environment, cause the computer system to:
- while a first wearable audio output component of the wearable audio output device is in a first position relative to a first ear of a user and a second wearable audio output component of the wearable audio output device is in the first position relative to a second ear of the user, operate the wearable audio output device in a first audio output mode;
- while operating the wearable audio output device in the first audio output mode, detect a change in position of the first wearable audio output component from the first position relative to the first ear of the user to a second position relative to the first ear of the user; and
- in response to detecting the change in position of the first wearable audio output component from the first position relative to the first ear of the user to the second position relative to the first ear of the user, while the second wearable audio output component is maintained in the first position relative to the second ear of the user:
  - transition the wearable audio output device from the first audio output mode to a second audio output mode that is a pass-through audio output mode that is different from the first audio output mode, wherein, while the wearable audio output device is in the pass-through audio output mode, audio outputs that are provided via the wearable audio output device include one or more pass-through audio components that include at least a portion of ambient sound from the physical environment.

18. The non-transitory computer readable storage medium of claim 17, wherein a respective wearable audio output component being in the first position relative to a respective ear of the user includes the respective wearable audio output component being placed at least partially within the respective ear, and a respective wearable audio output component being in the second position relative to a respective ear of the user includes the respective wearable audio output component being outside of the respective ear.

19. The non-transitory computer readable storage medium of claim 18, wherein the one or more programs include instructions that, when executed by the computer system, cause the computer system to:
- in response to detecting a change in position of the second wearable audio output component from the first position relative to the second ear of the user to the second position relative to the second ear of the user, while the first wearable audio output component is maintained in the second position relative to the first ear of the user:
  - transition the wearable audio output device from the second audio output mode to a third audio output mode that is a noise control off mode, wherein, while the wearable audio output device is in the noise control off mode, audio outputs that are provided via the wearable audio output device do not include one or more pass-through audio components that include at least a portion of ambient sound from the physical environment and do not include one or more cancellation audio components selected so as to at least partially cancel ambient sound from the physical environment.

20. The non-transitory computer readable storage medium of claim 18, wherein the one or more programs include instructions that, when executed by the computer system, cause the computer system to:
- after detecting the change in position of the first wearable audio output component from the first position relative to the first ear of the user to the second position relative to the first ear of the user, in response to detecting a change in position of the first wearable audio output component from the second position relative to the first ear of the user back to the first position relative to the first ear of the user, while the second wearable audio output component is maintained in the first position relative to the first ear of the user:
  - transition the wearable audio output device from the second audio output mode to the first audio output mode.

21. The non-transitory computer readable storage medium of claim 17, wherein a respective wearable audio output device being in the first position relative to a respective ear of the user includes the respective wearable audio output device being outside of the respective ear, and a respective wearable audio output device being in the second position relative to a respective ear of the user includes the respective wearable audio output device being placed at least partially in the respective ear.

22. The non-transitory computer readable storage medium of claim 21, wherein the one or more programs include instructions that, when executed by the computer system, cause the computer system to:
- prior to operating the wearable audio output device in the first audio output mode:
  - while the first wearable audio output component is in the second position relative to the first ear of the user and the second wearable audio output component is in the second position relative to the second ear of the user, operate the wearable audio output device in a respective audio output mode; and
- after detecting the change in position of the first wearable audio output component from the first position relative to the first ear of the user to the second position relative to the first ear of the user:
  - in response to detecting a change in position of the second wearable audio output component from the first position relative to the second ear of the user to the second position relative to the second ear of the user, while the first wearable audio output component is maintained in the second position relative to the first ear of the user:

transition the wearable audio output device from the second audio output mode to the respective audio output mode.

23. The non-transitory computer readable storage medium of claim 17, wherein the one or more programs include instructions that, when executed by the computer system, cause the computer system to:
   while operating the wearable audio output device in a respective audio output mode, receive an alert of an incoming phone call;
   detect an input that corresponds to a request to answer the incoming phone call; and
   in response to detecting the input corresponding to a request to answer the incoming phone call:
      transition the wearable audio output device from the respective audio output mode to the second audio output mode.

24. The non-transitory computer readable storage medium of claim 23, wherein the one or more programs include instructions that, when executed by the computer system, cause the computer system to:
   detect termination of the phone call; and
   in response to detecting the termination of the phone call:
      transition the wearable audio output device from the second audio output mode to the respective audio output mode.

* * * * *